US011099707B2

(12) United States Patent
Rockel et al.

(10) Patent No.: US 11,099,707 B2
(45) Date of Patent: Aug. 24, 2021

(54) DEVICES, METHODS, AND GRAPHICAL USER INTERFACES FOR SYSTEM-WIDE BEHAVIOR FOR 3D MODELS

(71) Applicant: Apple Inc., Cupertino, CA (US)

(72) Inventors: Philipp Rockel, San Francisco, CA (US); Jonathan R. Dascola, San Francisco, CA (US); Stephen O. Lemay, San Francisco, CA (US); Jeffrey M. Faulkner, San Francisco, CA (US); David J. Addey, Santa Cruz, CA (US); David Lui, Sunnyvale, CA (US); Giancarlo Yerkes, Menlo Park, CA (US)

(73) Assignee: APPLE INC., Cupertino, CA (US)

(*) Notice: Subject to any disclaimer, the term of this patent is extended or adjusted under 35 U.S.C. 154(b) by 0 days.

(21) Appl. No.: 16/145,035

(22) Filed: Sep. 27, 2018

(65) Prior Publication Data

US 2019/0228588 A1 Jul. 25, 2019

Related U.S. Application Data

(60) Provisional application No. 62/679,951, filed on Jun. 3, 2018, provisional application No. 62/621,529, filed on Jan. 24, 2018.

(51) Int. Cl.
*G06F 3/0481* (2013.01)
*G06T 19/20* (2011.01)
(Continued)

(52) U.S. Cl.
CPC .......... *G06F 3/04815* (2013.01); *G06F 3/048* (2013.01); *G06F 3/0482* (2013.01);
(Continued)

(58) Field of Classification Search
CPC .. G06F 3/017; G06F 3/04845; G06F 3/04842; G06F 3/0488; G06F 3/0486;
(Continued)

(56) References Cited

U.S. PATENT DOCUMENTS 6,426,745 B1 6/2002 Isaacs et al.
RE37,812 E 8/2002 Ishikura et al.
(Continued)

FOREIGN PATENT DOCUMENTS

CN 104081317 A 10/2014
EP 2 546 806 A2 7/2012
(Continued)

OTHER PUBLICATIONS

Screenshots of NPL reference "Augmented Reality on the Web, for Everyone" https://www.blog.google/products/google-ar-vr/augmented-reality-web-everyone/, dated Jan. 22, 2018,which was cited in the IDS dated Feb. 8, 2019, created by Examiner Ulrich on Feb. 13, 2019 by accessing the URL.*
(Continued)

*Primary Examiner* — Nicholas Ulrich
(74) *Attorney, Agent, or Firm* — Morgan, Lewis & Bockius LLP

(57) ABSTRACT

A computer system with a display, a touch-sensitive surface, and one or more cameras displays a virtual object in a first user interface region. In response to detecting a first input at a location that corresponds to the virtual object and in accordance with a determination that the first input meets first criteria, the virtual object is displayed in a second user interface region. In response to detecting a second input, in accordance with a determination that the second input corresponds to a request to manipulate the virtual object in the second user interface region, a display property of the virtual object is changed, and in accordance with a deter-
(Continued)

mination that the second input corresponds to a request to display the virtual object in an augmented reality environment, the virtual object is displayed with a representation of a field of view of the one or more cameras.

54 Claims, 273 Drawing Sheets

(51) Int. Cl.

| | |
|---|---|
| ***G06F 3/0484*** | (2013.01) |
| ***G06F 3/0488*** | (2013.01) |
| ***G06T 19/00*** | (2011.01) |
| ***G06T 13/20*** | (2011.01) |
| ***H04M 1/72403*** | (2021.01) |
| ***G06T 7/80*** | (2017.01) |
| ***G06T 7/70*** | (2017.01) |
| ***G06F 3/0482*** | (2013.01) |
| ***G06F 3/0486*** | (2013.01) |
| ***G06F 3/048*** | (2013.01) |

(52) U.S. Cl.

CPC ........ *G06F 3/0486* (2013.01); *G06F 3/04845* (2013.01); *G06F 3/04883* (2013.01); *G06T 7/70* (2017.01); *G06T 7/80* (2017.01); *G06T 13/20* (2013.01); *G06T 19/003* (2013.01); *G06T 19/006* (2013.01); *G06T 19/20* (2013.01); *H04M 1/72403* (2021.01); *G06T 2200/24* (2013.01); *G06T 2207/30244* (2013.01); *G06T 2210/04* (2013.01); *G06T 2219/2012* (2013.01); *G06T 2219/2016* (2013.01)

(58) Field of Classification Search

CPC ............... G06F 3/0482; G06F 3/04815; G06F 3/04883; G06T 2200/24; G06T 19/00; G06T 19/20; G06T 2219/2016; G06T 19/006; G06T 19/003; G06T 7/70; G06Q 30/0601; G06Q 30/0643

See application file for complete search history.

(56) References Cited

U.S. PATENT DOCUMENTS

| | | | | |
|---|---|---|---|---|
| 6,448,964 | B1 | 9/2002 | Isaacs et al. | |
| 8,836,645 | B2 * | 9/2014 | Hoover | G06F 3/0425 345/173 |
| 9,244,562 | B1 | 1/2016 | Rosenberg et al. | |
| 9,383,895 | B1 | 7/2016 | Vinayak et al. | |
| 9,392,212 | B1 | 7/2016 | Ross | |
| 9,646,418 | B1 | 5/2017 | Lotto | |
| 9,720,934 | B1 | 8/2017 | Dube et al. | |
| 9,861,446 | B2 | 1/2018 | Lang | |
| 2002/0044152 | A1 | 4/2002 | Abbott, III et al. | |
| 2008/0071559 | A1 | 3/2008 | Arrasvuori | |
| 2008/0094417 | A1 | 4/2008 | Cohen | |
| 2011/0041098 | A1 | 2/2011 | Kajiya et al. | |
| 2011/0296352 | A1 | 12/2011 | Lobb | |
| 2012/0249416 | A1 | 10/2012 | Maciocci et al. | |
| 2012/0249741 | A1 | 10/2012 | Maciocci et al. | |
| 2012/0250940 | A1 | 10/2012 | Kasahara | |
| 2013/0044141 | A1 | 2/2013 | Markiewicz et al. | |
| 2013/0127825 | A1 | 5/2013 | Joshi | |
| 2013/0178257 | A1 * | 7/2013 | Langseth | G06T 17/05 463/4 |
| 2013/0179108 | A1 | 7/2013 | Joseph et al. | |
| 2013/0234926 | A1 | 9/2013 | Rauber | |
| 2013/0321395 | A1 | 12/2013 | Chen et al. | |
| 2013/0335405 | A1 | 12/2013 | Scavezze et al. | |
| 2014/0047340 | A1 * | 2/2014 | Ravi | G06F 3/0484 715/720 |
| 2014/0104274 | A1 | 4/2014 | Hilliges et al. | |
| 2014/0104316 | A1 | 4/2014 | Sharma et al. | |
| 2014/0132629 | A1 | 5/2014 | Pandey et al. | |
| 2014/0247280 | A1 | 9/2014 | Nicholas et al. | |
| 2014/0267410 | A1 | 9/2014 | Fein et al. | |
| 2014/0282162 | A1 | 9/2014 | Fein et al. | |
| 2014/0282220 | A1 | 9/2014 | Wantland et al. | |
| 2014/0285522 | A1 | 9/2014 | Kim et al. | |
| 2014/0306993 | A1 | 10/2014 | Poulos et al. | |
| 2014/0365882 | A1 * | 12/2014 | Lemay | G06F 3/0488 715/269 |
| 2015/0135115 | A1 * | 5/2015 | Feng | G06F 3/04883 715/771 |
| 2015/0316985 | A1 | 11/2015 | Levesque et al. | |
| 2015/0331970 | A1 | 11/2015 | Jovanovic | |
| 2015/0363966 | A1 | 12/2015 | Well et al. | |
| 2015/0378433 | A1 | 12/2015 | Savastinuk et al. | |
| 2016/0065827 | A1 | 3/2016 | Dye et al. | |
| 2016/0080732 | A1 | 3/2016 | Pedley et al. | |
| 2016/0092080 | A1 | 3/2016 | Swanson et al. | |
| 2016/0148433 | A1 | 5/2016 | Petrovaskaya et al. | |
| 2016/0170624 | A1 | 6/2016 | Zambetti et al. | |
| 2016/0189426 | A1 | 6/2016 | Thomas et al. | |
| 2016/0329006 | A1 | 11/2016 | Weber et al. | |
| 2016/0334879 | A1 | 11/2016 | Hirano et al. | |
| 2016/0350595 | A1 | 12/2016 | Solomin et al. | |
| 2016/0364758 | A1 | 12/2016 | Achhra et al. | |
| 2016/0370956 | A1 | 12/2016 | Penha et al. | |
| 2016/0371398 | A1 | 12/2016 | Sugiura | |
| 2017/0018120 | A1 | 1/2017 | Li et al. | |
| 2017/0173262 | A1 | 6/2017 | Veltz | |
| 2017/0178364 | A1 | 6/2017 | Needham | |
| 2017/0206712 | A1 | 7/2017 | Petrovskaya et al. | |
| 2017/0270715 | A1 | 9/2017 | Lindsay et al. | |
| 2017/0285738 | A1 | 10/2017 | Khalid | |
| 2017/0336941 | A1 * | 11/2017 | Gribetz | G06F 3/04815 |
| 2018/0033210 | A1 | 2/2018 | Vats | |
| 2018/0039377 | A1 * | 2/2018 | Akita | B60K 35/00 |
| 2018/0114372 | A1 * | 4/2018 | Nagy | G06T 19/006 |
| 2018/0143693 | A1 | 5/2018 | Calabrese et al. | |
| 2018/0210628 | A1 * | 7/2018 | McPhee | G06F 3/0488 |
| 2018/0286126 | A1 | 10/2018 | Schwarz et al. | |
| 2018/0300952 | A1 | 10/2018 | Evans et al. | |
| 2018/0330544 | A1 * | 11/2018 | Corso | G06K 9/00671 |
| 2019/0050132 | A1 | 2/2019 | Rawlings et al. | |
| 2019/0065027 | A1 | 2/2019 | Hauenstein et al. | |
| 2019/0228581 | A1 | 7/2019 | Dascola et al. | |
| 2019/0228582 | A1 | 7/2019 | Yerkes et al. | |
| 2019/0228589 | A1 | 7/2019 | Dascola et al. | |

FOREIGN PATENT DOCUMENTS

| | | | |
|---|---|---|---|
| EP | 2 738 743 | A2 | 6/2014 |
| JP | 2011-186536 | A | 9/2011 |
| JP | 2012168798 | A | 9/2012 |
| JP | 2012-212345 | A | 11/2012 |
| JP | 2013-164696 | A | 8/2013 |
| JP | 2014-102819 | A | 6/2014 |
| JP | 2017-162451 | A | 9/2017 |
| WO | WO 2012/076062 | A1 | 6/2012 |
| WO | WO 2013/060085 | A1 | 5/2013 |
| WO | WO 2013/169882 | A2 | 11/2013 |
| WO | WO 2014/124173 | A1 | 8/2014 |
| WO | WO 2014/160651 | A2 | 10/2014 |
| WO | WO 2015/031139 | A1 | 3/2015 |
| WO | WO 2015/192117 | A1 | 12/2015 |
| WO | WO 2016/144975 | A2 | 9/2016 |
| WO | WO 2017/005982 | A1 | 1/2017 |
| WO | WO 2017/139509 | A1 | 8/2017 |
| WO | WO 2017/165705 | A1 | 9/2017 |
| WO | WO 2017/180407 | A1 | 10/2017 |
| WO | WO 2017/199206 | A1 | 11/2017 |

OTHER PUBLICATIONS

Ali, "Augmented Reality on the Web, for Everyone", https://wvvvv.blog.google/products/google-ar-vr/augmented-reality-web-everyone, Jan. 22, 2018, 8 pages.

(56) References Cited

OTHER PUBLICATIONS

BBC Click, "The Augmented Reality Apps for Your Home", https://www.youtube.com/watch?v=aJ251J8nE2U, Nov. 1, 2016, 2 pages.
CVLab Research, "Unity + Vuforia + Gesture Control + Dynamic Light", https://www.youtube.com/watch?v=AJ6Vsx7YGAc, Feb. 1, 2018 2 pages.
Donselaar, "Unity Realtime Reflections in Augmented Reality", https://www.youtube.com/watch?v=bQ8D7rJkH8A, Mar. 1, 2018, 2 pages.
EFTMOnline, "Ikea Place: Genuine Augmented Reality furniture app using Apple ARKit", https://www.youtube.com/watch?v=ZDWR19A1p6s, Aug. 29, 2017, 2 pages.
Feng, "Creating the True Augmented Reality Pokemon Go", https://virtualrealitypop.com/creating-the-true-augmented-reality-p2okemon-go-14d79e9f469d, Aug. 8, 2016, 9 pages.
Feng, "Pokemon Go AR Demo", https//vimeo.com/177996571, Aug. 8, 2016, 2 pages.
Fingo, "Application for Matching Furniture in the Interior Using Augmented Reality", https://www.youtube.com/watch?v=WuE9Y8mKnso, Apr. 23, 2014, 2 pages.
Jardine, "Ikea's AR App Helps You Imagine What Its Furniture Would Look Like in Your Home", http://creativity-online.com/work/ikea-ikea-place/52719, Sep. 19, 2017, 3 pages.
Microsoft HoloLens, "Microsoft HoloLens: Expaning the Spatial Mapping Capabilities of Microsoft HoloLens", https://www.youtube.com/watch?v=iUmTi3_Ynus, Dec. 7, 2016, 2 pages.
Patio Interactive, "Boston Pizza Augmented Reality Menu—Tutorial Demo", https://www.youtube.com/watch?v=f987S_J5Elo, Nov. 1, 2017, 2 pages.
Sattvarise Technologies Pvt Ltd, "Augmented Reality for Furniture & Interior Designing (Google Tango)", https://www.youtube.com/watch?v=08h3EDiTepU, Jun. 23, 2017, 2 pages.
Tech Insider, "Take the guesswork out of furniture buying with Ikea's new AR app", https://www.youtube.com/watch?v=4jrhw_ZRjV4, Sep. 23, 2017, 3 pages.
Office Action, dated Sep. 21, 2018, received in Danish Patent Application No. 201870346, 12 pages.
Office Action, dated Sep. 17, 2018, received in Danish Patent Application No. 201802192, 10 pages.
Office Action, dated Aug. 31, 2018, received in Danish Patent Application No. 201870348, 10 pages.
Office Action, dated Aug. 14, 2018, received in Danish Patent Application No. 201870349, 9 pages.
Billinghurst et al., "Hands in Space, Gesture Interaction with Augmented-Reality Interfaces", IEEE computer graphics and applications, Jan. 2014, 1 page.
Erickson, "Microsoft HoloLens Enables Thyssendrupp to Transform the Global elevator Industry", https://blogs.windows.com/devices/2016/09/15/microsoft-hololens-enable-thyssendrupp-to-transform-the-global-elevator-industry, Sep. 15, 2016, 10 pages.
Kalkofen et al., "Explosion Diagrams in Augmented Reality", Graz University of Technology Institute for Computer Graphics and Vision, Lafayette, Louisiana, USA, Mar. 14-15, 2009, 8 pages.
Kutulakos, "Calibration-Free Augmented Reality", IEEE Transactions on Visualization and Computer Graphics 4.1, Jan. 20, 1998, 20 pages.
Office Action, dated Nov. 22, 2018, received in Australian Patent Application No. 2018101226, which corresponds with U.S. Appl. No. 16/116,276, 7 pages.
Office Action, dated Feb. 15, 2019, received in Australian Patent Application No. 2018101226, which corresponds with U.S. Appl. No. 16/116,276, 3 pages.
Office Action, dated Nov. 27, 2018, received in Danish Patent Application No. 201870548, which corresponds with U.S. Appl. No. 16/116,276, 8 pages.
Office Action, dated Feb. 21, 2019, received in U.S. Appl. No. 16/145,045, 27 pages.
International Search Report and Written Opinion, dated Jan. 29, 2019, received in International Patent Application No. PCT/US2018/048884, which corresponds with U.S. Appl. No. 16/116,276, 21 pages.
Office Action, dated Feb. 5, 2019, received in U.S. Appl. No. 16/145,039, 26 pages.
Office Action, dated Feb. 8, 2019, received in U.S. Appl. No. 16/145,052, 29 pages.
Horizon, "Calibration Guide in Horizon Camera for Android", https://www.youtube.com/watch?v=TWG_zB7yE9s, Jan. 20, 2015, 2 pages.
Saqib, "How to Make 2 Fast 2 Furious Nissan Skyline GTR in Real Racing 3", https://www.youtube.com/watch?v=aFSTTTRn6Tw, Jun. 21, 2015, 3 pages.
Certificate of Examination, dated Apr. 26, 2019, received in Australian Patent Application No. 2018101226, which corresponds with U.S. Appl. No. 16/116,276, 4 pages.
Notice of Allowance, dated Apr. 11, 2019, received in U.S. Appl. No. 16/145,039, 8 pages.
Office Action, dated Apr. 10, 2019, received in Australian Patent Application No. 2019100079, which corresponds with U.S. Appl. No. 16/145,039, 5 pages.
Office Action, dated May 2019, received in Danish Patent Application No. 201802192, which corresponds with U.S. Appl. No. 16/145,039, 7 pages.
Office Action, dated Mar. 14, 2019, received in Danish Patent Application No. 201870348, which corresponds with U.S. Appl. No. 16/145,045, 6 pages.
Office Action, dated Mar. 15, 2019, received in Danish Patent Application No. 201870349, which corresponds with U.S. Appl. No. 16/145,052, 5 pages.
Notice of Allowance, dated Jun. 14, 2019, received in U.S. Appl. No. 16/145,045, which corresponds with U.S. Appl. No. 16/145,045, 5 pages.
Notice of Allowance, dated Jun. 11, 2019, received in U.S. Appl. No. 16/145,052, 15 pages.
Invitation to Pay Additional Fees, dated May 22, 2019, received in International Patent Application No. PCT/US2019014791, which correspond with U.S. Appl. No. 16/145,035, 17 pages.
Certificate of Grant, dated Feb. 13, 2019, received in Australian Patent Application No. 2019100079, which corresponds with U.S. Appl. No. 16/145,039, 4 pages.
Notice of Allowance, dated Sep. 11, 2019, received in U.S. Appl. No. 16/145,045, 5 pages.
Innovation Patent, dated Sep. 25, 2019, received in Australian Patent Application No. 2019101021, which corresonds with U.S. Appl. No. 16/145,052, 9 pages.
Notice of Allowance, dated Aug. 6, 2019, received in U.S. Appl. No. 16/145,052, 8 pages.
International Search Report and Written Opinion, dated Aug. 14, 2019, received in International Patent Application No. PCT/US2019/014791, which corresponds with U.S. Appl. No. 16/145,035, 26 pages.
Office Action, dated Dec. 11, 2019, received in U.S. Appl. No. 16/116,276, 33 pages.
Innovation Patent, dated Sep. 12, 2018, received in Australian Patent Application No. 2018101226, which corresponds with U.S. Appl. No. 16/116,276, 1 page.
Office Action, dated Oct. 16, 2019, received in Danish Patent Application No. 201870548, which corresponds with U.S. Appl. No. 16/116,276, 3 pages.
Office Action, dated Nov. 29, 2019, received in Danish Patent Application No. 201870346, which corresponds with U.S. Appl. No. 16/145,035, 3 pages.
Office Action, dated Nov. 20, 2019, received in Danish Patent Application No. 201802192, which corresponds with U.S. Appl. No. 16/145,039, 10 pages.
Office Action, dated Nov. 25, 2019, received in Japanese Patent Application No. 2018-183940, which corresponds with U.S. Appl. No. 16/145,039, 7 pages.
Innovation Patent, dated Oct. 31, 2019, received in Australian Patent Application No. 2019101021, which corresponds with U.S. Appl. No. 16/145,052, 4 pages.

(56) References Cited

OTHER PUBLICATIONS

Office Action, dated Nov. 4, 2019, received in Danish Patent Application No. 201870348, which corresponds with U.S. Appl. No. 16/145,045, 2 pages.
Office Action, dated Nov. 4, 2019, received in Danish Patent Application No. 201870349, which corresponds with U.S. Appl. No. 16/145,052, 4 pages.
Innovation Patent, dated Jan. 8, 2020, received in Australian Patent Application No. 2019101597, which corresponds with U.S. Appl. No. 16/145,052, 4 pages.
Innovation Patent, dated Mar. 13, 2020, received in Australian Patent Application No. 2019101597, which corresponds with U.S. Appl. No. 16/145,052, 1 page.
Office Action, dated May 25, 2020, received in Chinese Patent Application No. 201911078900.7, which corresponds with U.S. Appl. No. 16/145,039, 5 pages.
Youtube, "Recor Furniture Product Configurator & Wall Planner with Augmented Reality (ENG)", https://www.youtube.com/watch?v=rLClCqR8aA8, Oct. 26, 2016, 3 pages.
Willisau, "Augmented Reality Furniture Tool by ViewAR", https://www.youtube.com/watch?v=ccb9S0a1zoU, Jan. 30, 2017, 2 pages.
Final Office Action, dated Jun. 26, 2020, received in U.S. Appl. No. 16/116,276, 36 pages.
Office Action, dated Nov. 4, 2020, received in U.S. Appl. No. 16/116,276, 32 pages.
Intention to Grant, dated May 29, 2020, received in Danish Patent Application No. 201870548, which corresponds with U.S. Appl. No. 16/116,276, 2 pages.
Decision to Grant, dated Oct. 6, 2020, received in Danish Patent Application No. 201870548, which corresponds with U.S. Appl. No. 16/116,276, 2 pages.
Office Action, dated Oct. 16, 2020, received in Danish Patent Application No. 201870346, which corresponds with U.S. Appl. No. 16/145,035, 2 pages.
Office Action, dated Nov. 25, 2020, received in Chinese Patent Application No 201911078900.7, which corresponds with U.S. Appl. No. 16/145,039, 12 pages.
Office Action, dated Jul. 1, 2020, received in Danish Patent Application No. 201802192, which corresponds with U.S. Appl. No. 16/145,039, 7 pages.
Office Action, dated Jan. 8, 2021, received in Indian Patent Application No. 201814036861, which corresponds with U.S. Appl. No. 16/145,039, 9 pages.
Notice of Allowance, dated Jul. 6, 2020, received in Japanese Patent Application No. 2018-183940, which corresponds with U.S. Appl. No. 16/145,039, 5 pages.
Patent, dated Aug. 6, 2020, received in Japanese Patent Application No. 2018-183940, which corresponds with U.S. Appl. No. 16/145,039, 5 pages.
Office Action, dated Jun. 30, 2020, received in Danish Patent Application No. 201870348, which corresponds with U.S. Appl. No. 16/145,045, 4 pages.
Office Action, dated Jan. 25, 2021, received in Danish Patent Application No. 201870348, which corresponds with U.S. Appl. No. 16/145,045, 4 pages.
Office Action, dated Jun. 29, 2020, received in Danish Patent Application No. 201870349, which corresponds with U.S. Appl. No. 16/145,052, 4 pages.
Office Action, dated Jan. 28, 2021, received in Danish Patent Application No. 201870349, which corresponds with U.S. Appl. No. 16/145,052, 5 pages.
International Preliminary Report on Patentability, dated Jul. 28, 2020, received in International Patent Application No. PCT/US2019/014791, which corresponds with U.S. Appl. No. 16/145,035, 17 pages.
Office Action, dated Apr. 19, 2021, received in Australian Patent Application No. 2018324085, which corresponds with U.S. Appl. No. 16/116,276, 3 pages.
Office Action, dated Apr. 13, 2021, received in European Patent Application No. 18778642.1, which corresponds with U.S. Appl. No. 16/116,276, 10 pages.
Office Action, dated Mar. 18, 2021, received in Chinese Patent Application No. 201911078900.7, which corresponds with U.S. Appl. No. 16/145,039, 12 pages.
English Translation of Office Action, dated Mar. 9, 2021, received in Chinese Patent Application No. 202010919245.X, which corresponds with U.S. Appl. No. 16/116,276, 10 pages.

* cited by examiner

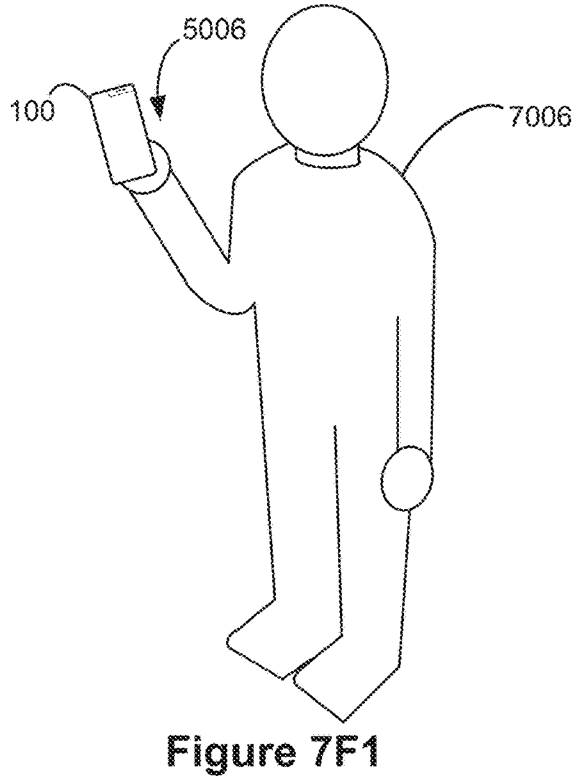
Figure 7F1
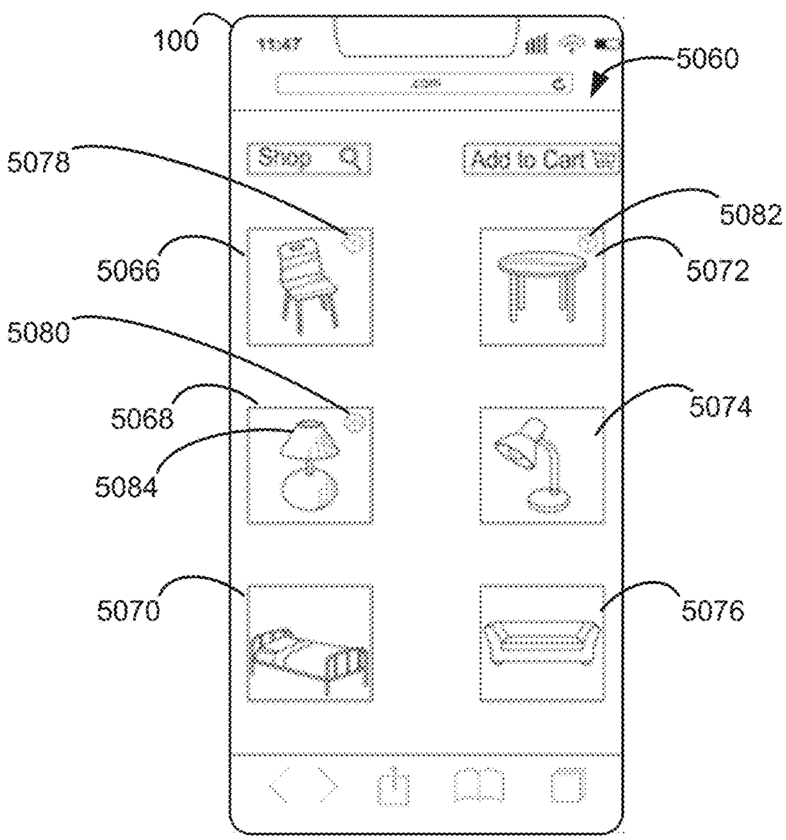
Figure 7F2

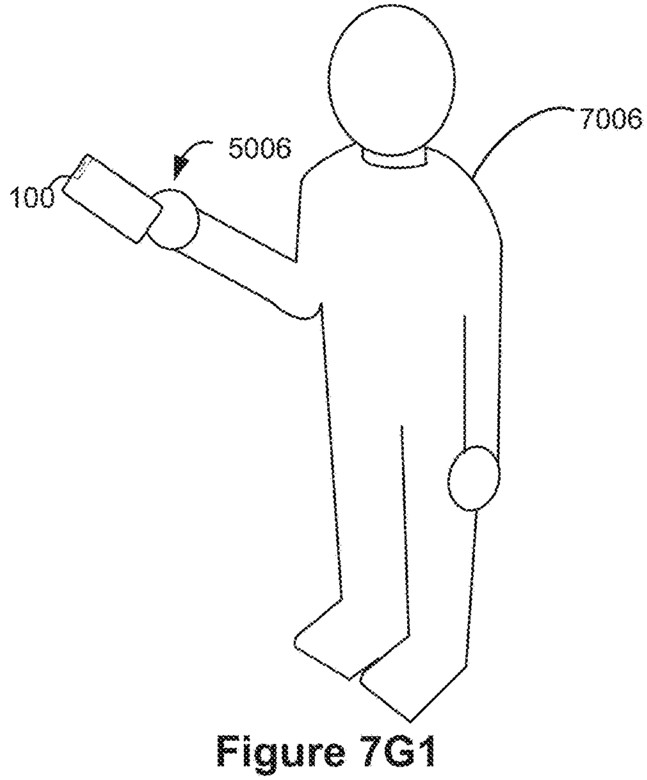
Figure 7G1
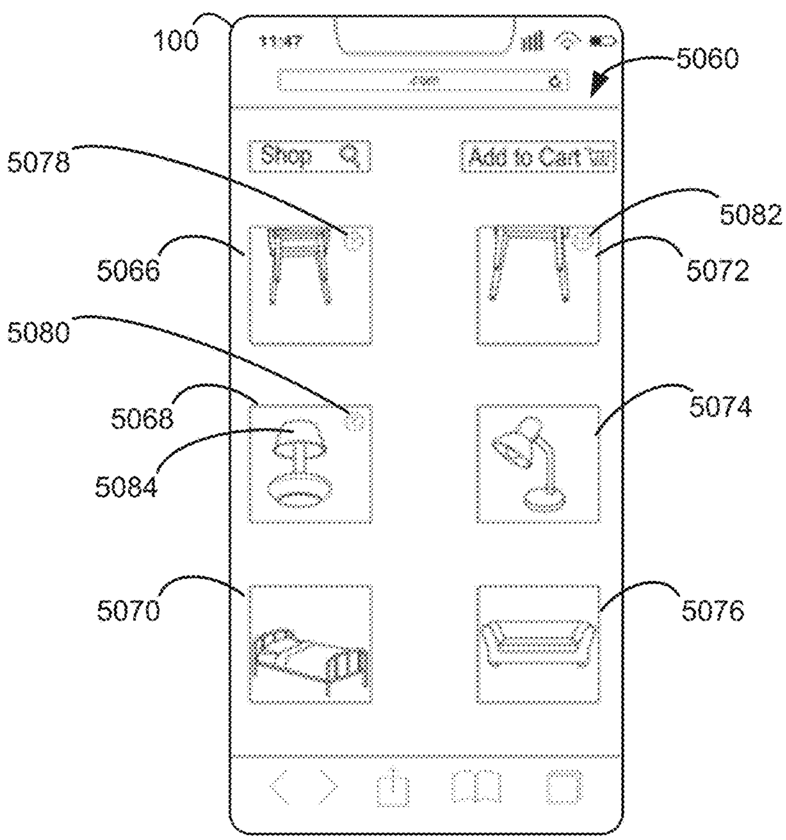
Figure 7G2

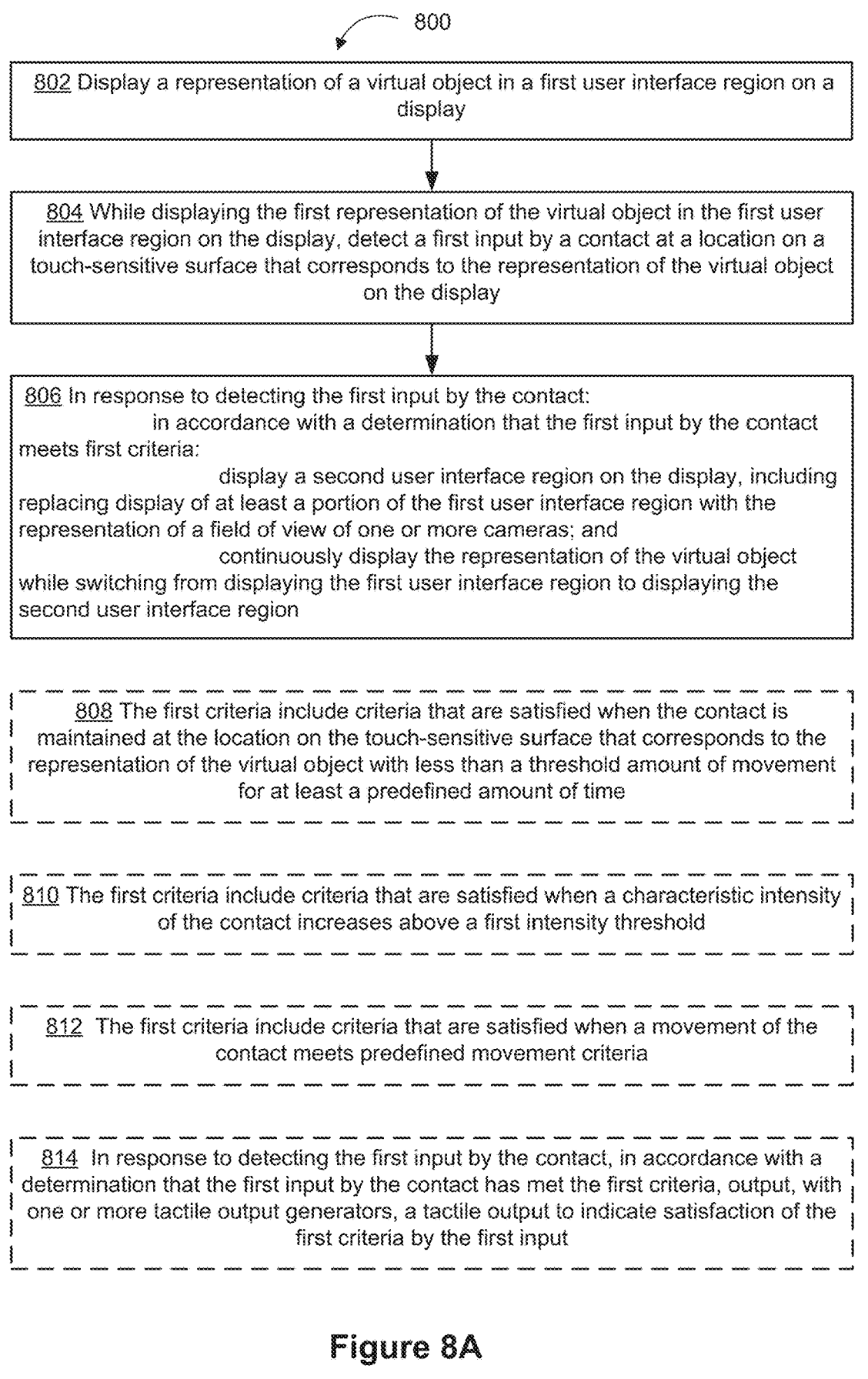

800

802 Display a representation of a virtual object in a first user interface region on a display 804 While displaying the first representation of the virtual object in the first user interface region on the display, detect a first input by a contact at a location on a touch-sensitive surface that corresponds to the representation of the virtual object on the display 806 In response to detecting the first input by the contact:
in accordance with a determination that the first input by the contact meets first criteria:
display a second user interface region on the display, including replacing display of at least a portion of the first user interface region with the representation of a field of view of one or more cameras; and
continuously display the representation of the virtual object while switching from displaying the first user interface region to displaying the second user interface region 808 The first criteria include criteria that are satisfied when the contact is maintained at the location on the touch-sensitive surface that corresponds to the representation of the virtual object with less than a threshold amount of movement for at least a predefined amount of time 810 The first criteria include criteria that are satisfied when a characteristic intensity of the contact increases above a first intensity threshold 812 The first criteria include criteria that are satisfied when a movement of the contact meets predefined movement criteria 814 In response to detecting the first input by the contact, in accordance with a determination that the first input by the contact has met the first criteria, output, with one or more tactile output generators, a tactile output to indicate satisfaction of the first criteria by the first input

Figure 8A

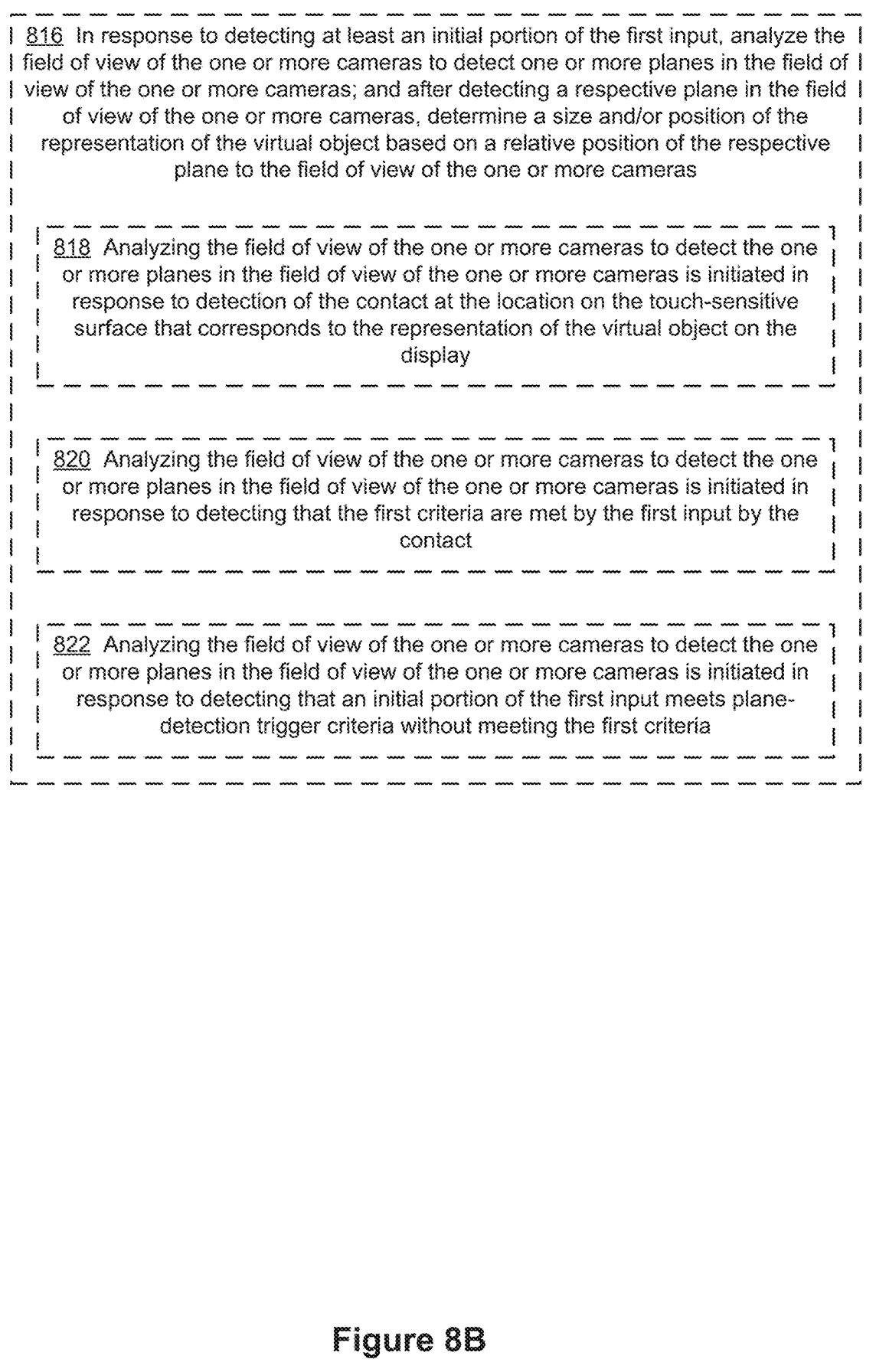

816 In response to detecting at least an initial portion of the first input, analyze the field of view of the one or more cameras to detect one or more planes in the field of view of the one or more cameras; and after detecting a respective plane in the field of view of the one or more cameras, determine a size and/or position of the representation of the virtual object based on a relative position of the respective plane to the field of view of the one or more cameras 818 Analyzing the field of view of the one or more cameras to detect the one or more planes in the field of view of the one or more cameras is initiated in response to detection of the contact at the location on the touch-sensitive surface that corresponds to the representation of the virtual object on the display 820 Analyzing the field of view of the one or more cameras to detect the one or more planes in the field of view of the one or more cameras is initiated in response to detecting that the first criteria are met by the first input by the contact 822 Analyzing the field of view of the one or more cameras to detect the one or more planes in the field of view of the one or more cameras is initiated in response to detecting that an initial portion of the first input meets plane-detection trigger criteria without meeting the first criteria

Figure 8B

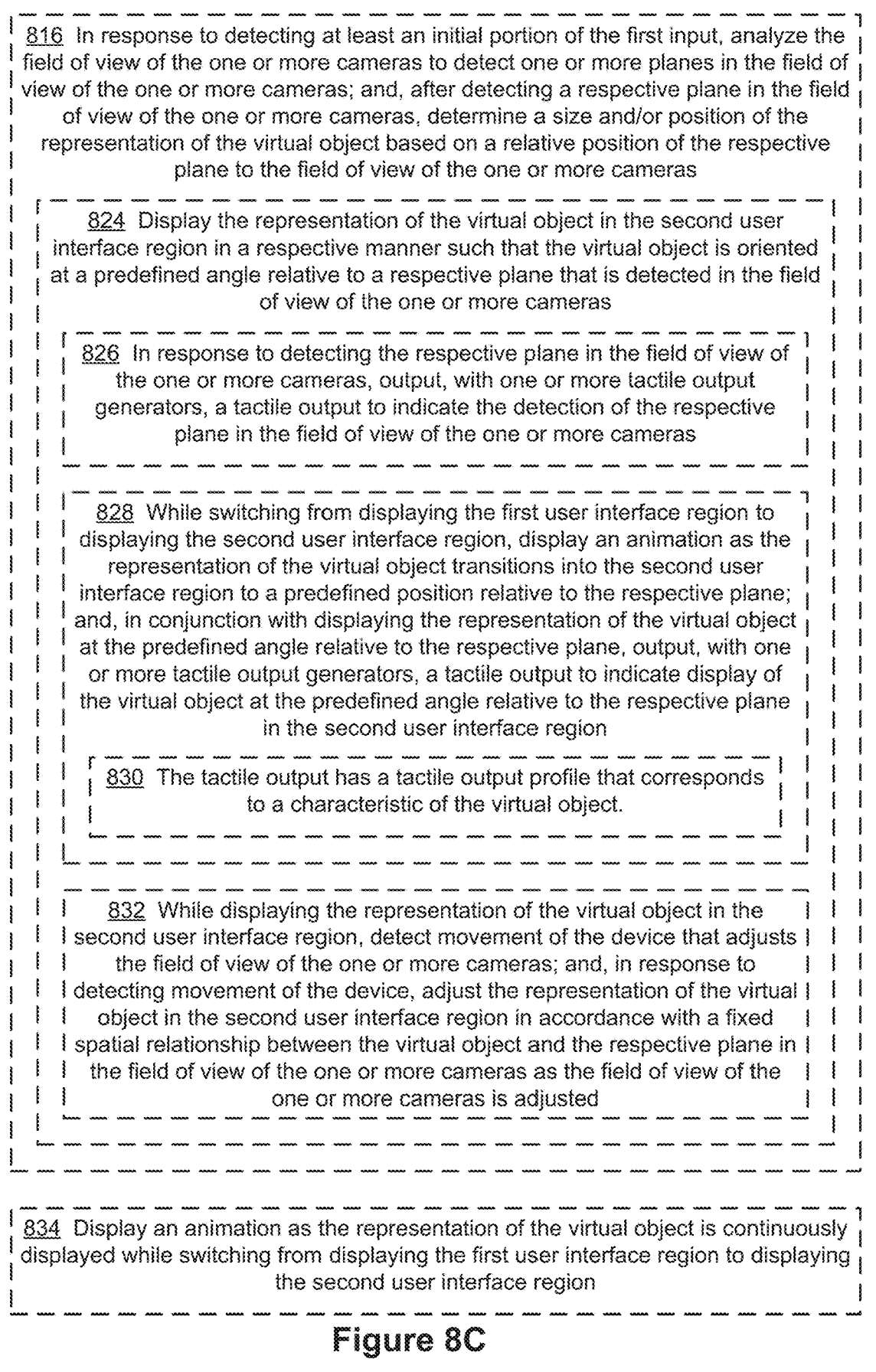

816 In response to detecting at least an initial portion of the first input, analyze the field of view of the one or more cameras to detect one or more planes in the field of view of the one or more cameras; and, after detecting a respective plane in the field of view of the one or more cameras, determine a size and/or position of the representation of the virtual object based on a relative position of the respective plane to the field of view of the one or more cameras 824 Display the representation of the virtual object in the second user interface region in a respective manner such that the virtual object is oriented at a predefined angle relative to a respective plane that is detected in the field of view of the one or more cameras 826 In response to detecting the respective plane in the field of view of the one or more cameras, output, with one or more tactile output generators, a tactile output to indicate the detection of the respective plane in the field of view of the one or more cameras 828 While switching from displaying the first user interface region to displaying the second user interface region, display an animation as the representation of the virtual object transitions into the second user interface region to a predefined position relative to the respective plane; and, in conjunction with displaying the representation of the virtual object at the predefined angle relative to the respective plane, output, with one or more tactile output generators, a tactile output to indicate display of the virtual object at the predefined angle relative to the respective plane in the second user interface region 830 The tactile output has a tactile output profile that corresponds to a characteristic of the virtual object.

832 While displaying the representation of the virtual object in the second user interface region, detect movement of the device that adjusts the field of view of the one or more cameras; and, in response to detecting movement of the device, adjust the representation of the virtual object in the second user interface region in accordance with a fixed spatial relationship between the virtual object and the respective plane in the field of view of the one or more cameras as the field of view of the one or more cameras is adjusted 834 Display an animation as the representation of the virtual object is continuously displayed while switching from displaying the first user interface region to displaying the second user interface region

Figure 8C

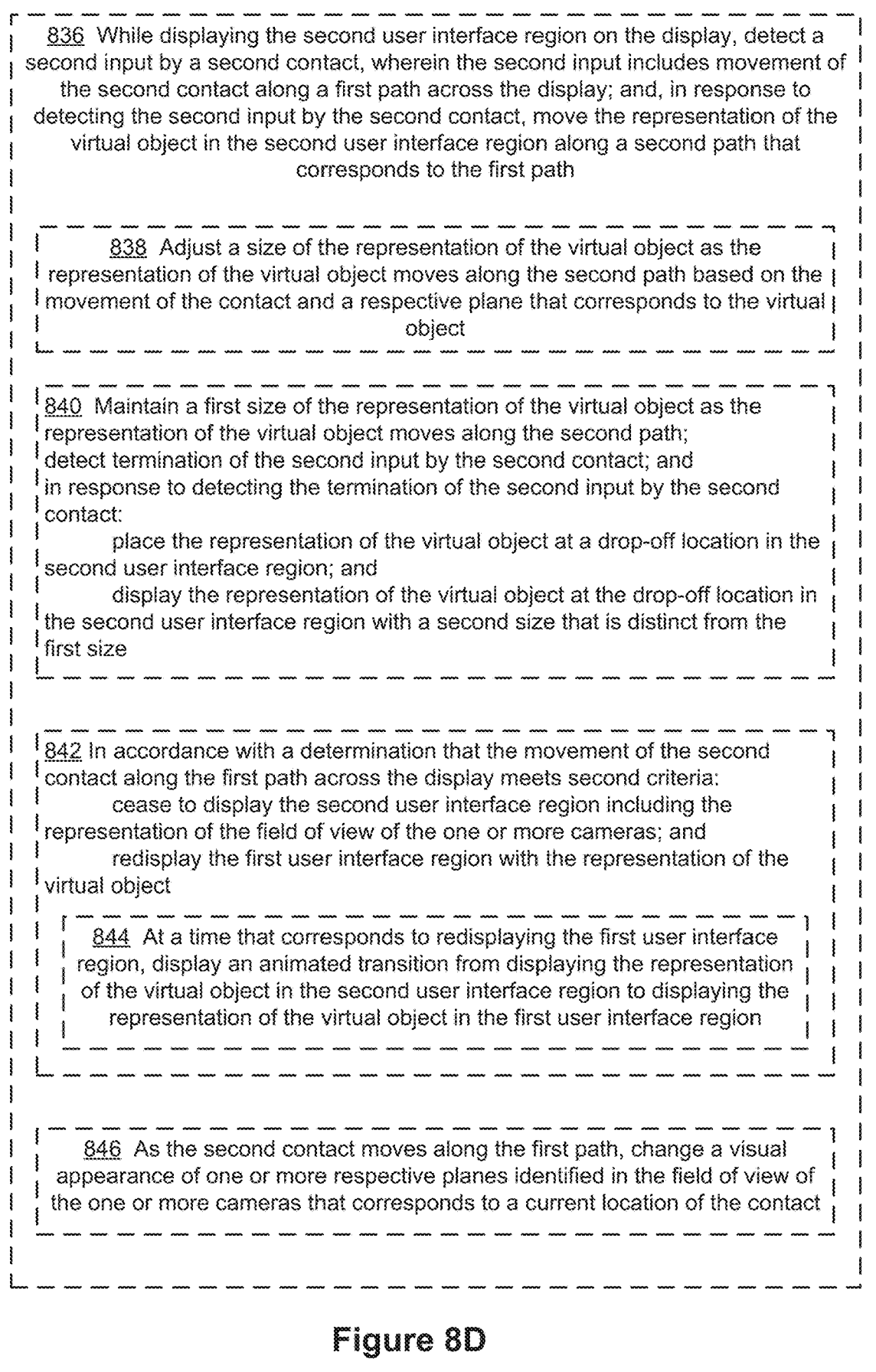

836 While displaying the second user interface region on the display, detect a second input by a second contact, wherein the second input includes movement of the second contact along a first path across the display; and, in response to detecting the second input by the second contact, move the representation of the virtual object in the second user interface region along a second path that corresponds to the first path 838 Adjust a size of the representation of the virtual object as the representation of the virtual object moves along the second path based on the movement of the contact and a respective plane that corresponds to the virtual object 840 Maintain a first size of the representation of the virtual object as the representation of the virtual object moves along the second path;
detect termination of the second input by the second contact; and
in response to detecting the termination of the second input by the second contact:
place the representation of the virtual object at a drop-off location in the second user interface region; and
display the representation of the virtual object at the drop-off location in the second user interface region with a second size that is distinct from the first size 842 In accordance with a determination that the movement of the second contact along the first path across the display meets second criteria:
cease to display the second user interface region including the representation of the field of view of the one or more cameras; and
redisplay the first user interface region with the representation of the virtual object 844 At a time that corresponds to redisplaying the first user interface region, display an animated transition from displaying the representation of the virtual object in the second user interface region to displaying the representation of the virtual object in the first user interface region 846 As the second contact moves along the first path, change a visual appearance of one or more respective planes identified in the field of view of the one or more cameras that corresponds to a current location of the contact

Figure 8D

848 In response to detecting the first input by the contact, in accordance with a determination that the first input by the contact meets third criteria, display a third user interface region on the display, including replacing display of at least a portion of the first user interface region 850 In accordance with a determination that the first input by the contact does not meet the first criteria, maintain display of the first user interface region without replacing display of at least a portion of the first user interface region with the representation of the field of view of the one or more cameras

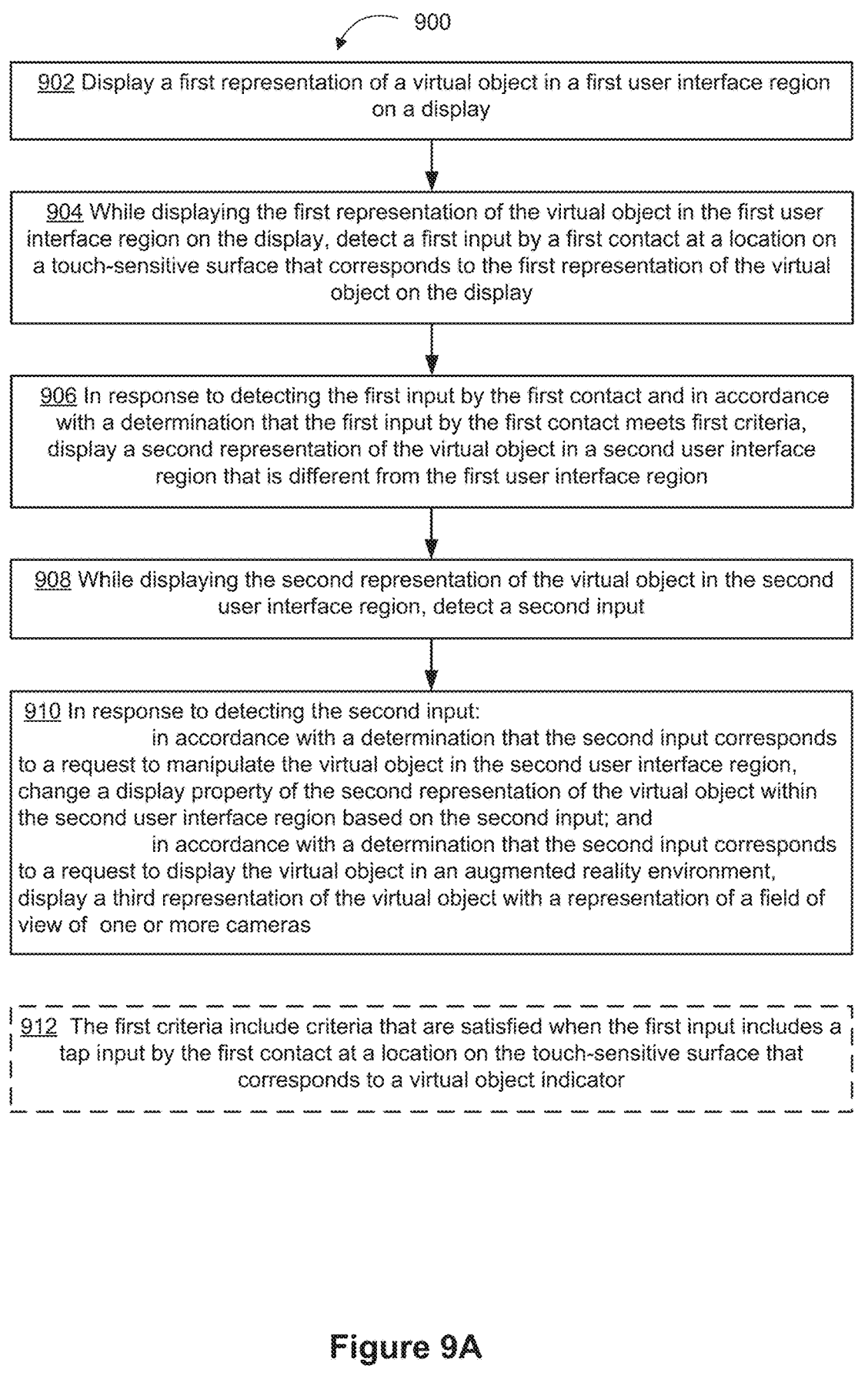

902 Display a first representation of a virtual object in a first user interface region on a display 904 While displaying the first representation of the virtual object in the first user interface region on the display, detect a first input by a first contact at a location on a touch-sensitive surface that corresponds to the first representation of the virtual object on the display 906 In response to detecting the first input by the first contact and in accordance with a determination that the first input by the first contact meets first criteria, display a second representation of the virtual object in a second user interface region that is different from the first user interface region 908 While displaying the second representation of the virtual object in the second user interface region, detect a second input 910 In response to detecting the second input:

in accordance with a determination that the second input corresponds to a request to manipulate the virtual object in the second user interface region, change a display property of the second representation of the virtual object within the second user interface region based on the second input; and in accordance with a determination that the second input corresponds to a request to display the virtual object in an augmented reality environment, display a third representation of the virtual object with a representation of a field of view of one or more cameras 912 The first criteria include criteria that are satisfied when the first input includes a tap input by the first contact at a location on the touch-sensitive surface that corresponds to a virtual object indicator

Figure 9A

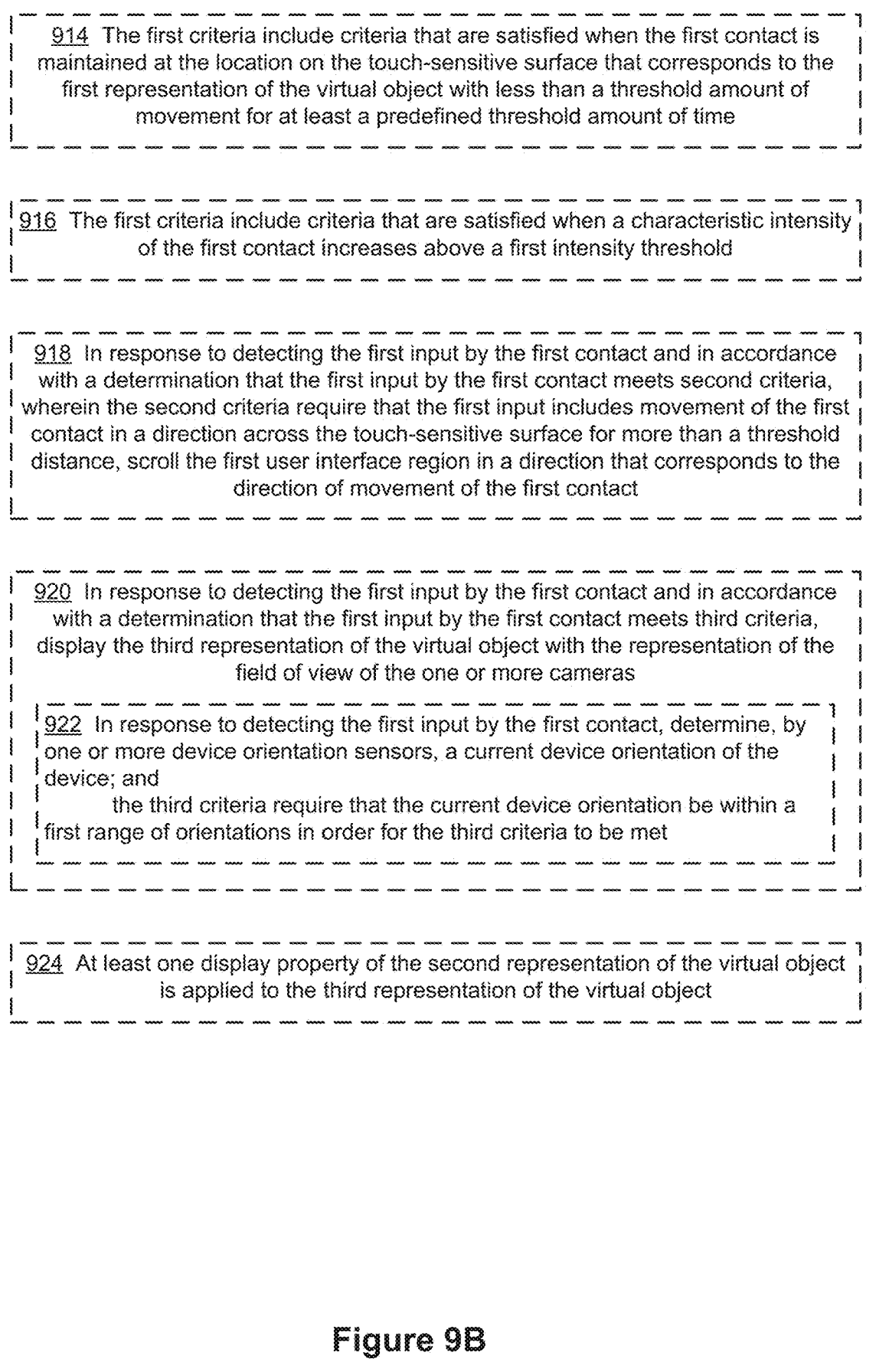

914 The first criteria include criteria that are satisfied when the first contact is maintained at the location on the touch-sensitive surface that corresponds to the first representation of the virtual object with less than a threshold amount of movement for at least a predefined threshold amount of time 916 The first criteria include criteria that are satisfied when a characteristic intensity of the first contact increases above a first intensity threshold 918 In response to detecting the first input by the first contact and in accordance with a determination that the first input by the first contact meets second criteria, wherein the second criteria require that the first input includes movement of the first contact in a direction across the touch-sensitive surface for more than a threshold distance, scroll the first user interface region in a direction that corresponds to the direction of movement of the first contact 920 In response to detecting the first input by the first contact and in accordance with a determination that the first input by the first contact meets third criteria, display the third representation of the virtual object with the representation of the field of view of the one or more cameras 922 In response to detecting the first input by the first contact, determine, by one or more device orientation sensors, a current device orientation of the device; and the third criteria require that the current device orientation be within a first range of orientations in order for the third criteria to be met 924 At least one display property of the second representation of the virtual object is applied to the third representation of the virtual object

Figure 9B

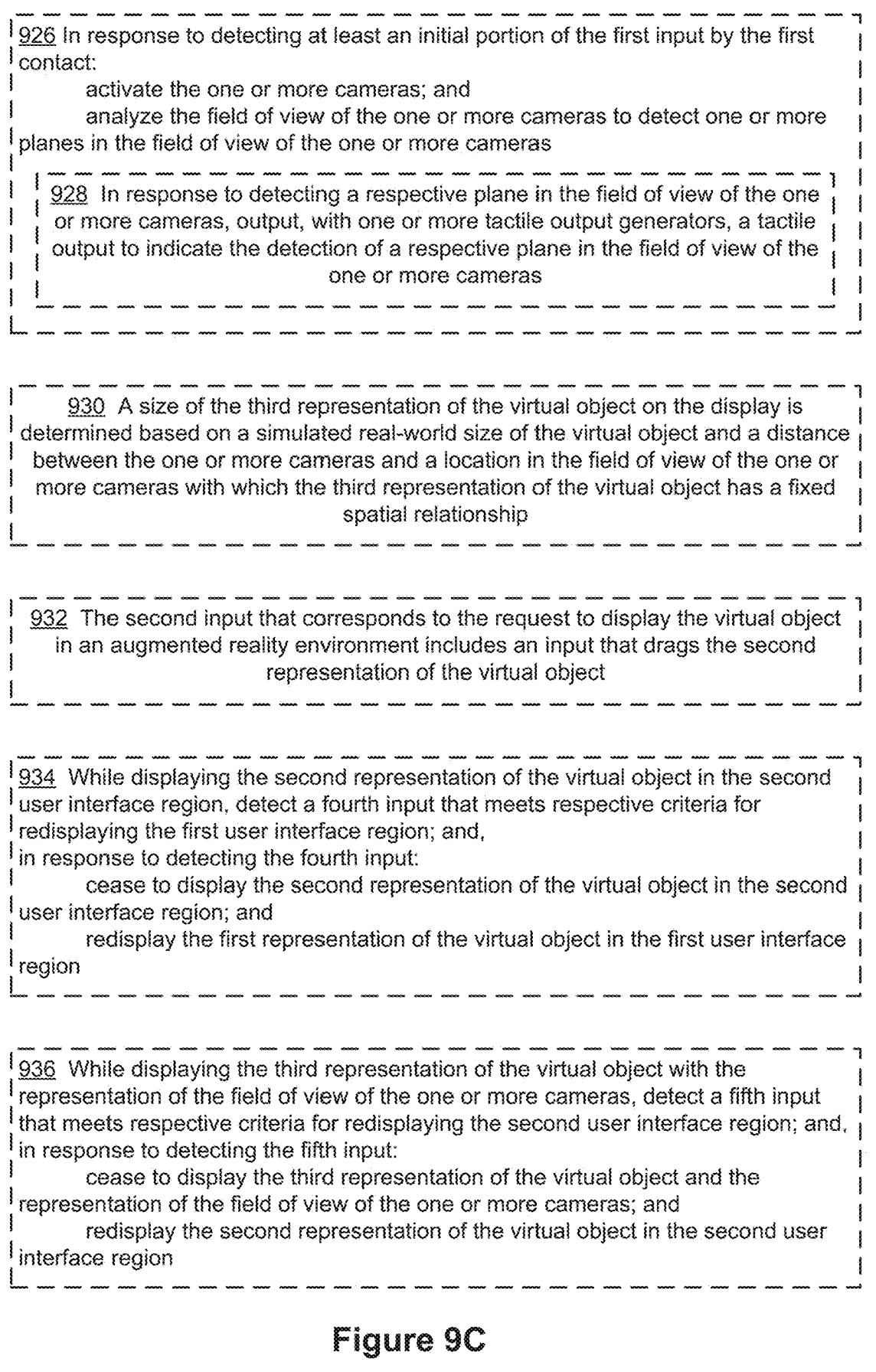

926 In response to detecting at least an initial portion of the first input by the first contact:
activate the one or more cameras; and
analyze the field of view of the one or more cameras to detect one or more planes in the field of view of the one or more cameras 928 In response to detecting a respective plane in the field of view of the one or more cameras, output, with one or more tactile output generators, a tactile output to indicate the detection of a respective plane in the field of view of the one or more cameras 930 A size of the third representation of the virtual object on the display is determined based on a simulated real-world size of the virtual object and a distance between the one or more cameras and a location in the field of view of the one or more cameras with which the third representation of the virtual object has a fixed spatial relationship 932 The second input that corresponds to the request to display the virtual object in an augmented reality environment includes an input that drags the second representation of the virtual object 934 While displaying the second representation of the virtual object in the second user interface region, detect a fourth input that meets respective criteria for redisplaying the first user interface region; and,
in response to detecting the fourth input:
cease to display the second representation of the virtual object in the second user interface region; and
redisplay the first representation of the virtual object in the first user interface region 936 While displaying the third representation of the virtual object with the representation of the field of view of the one or more cameras, detect a fifth input that meets respective criteria for redisplaying the second user interface region; and,
in response to detecting the fifth input:
cease to display the third representation of the virtual object and the representation of the field of view of the one or more cameras; and
redisplay the second representation of the virtual object in the second user interface region

Figure 9C

Figure 9D:
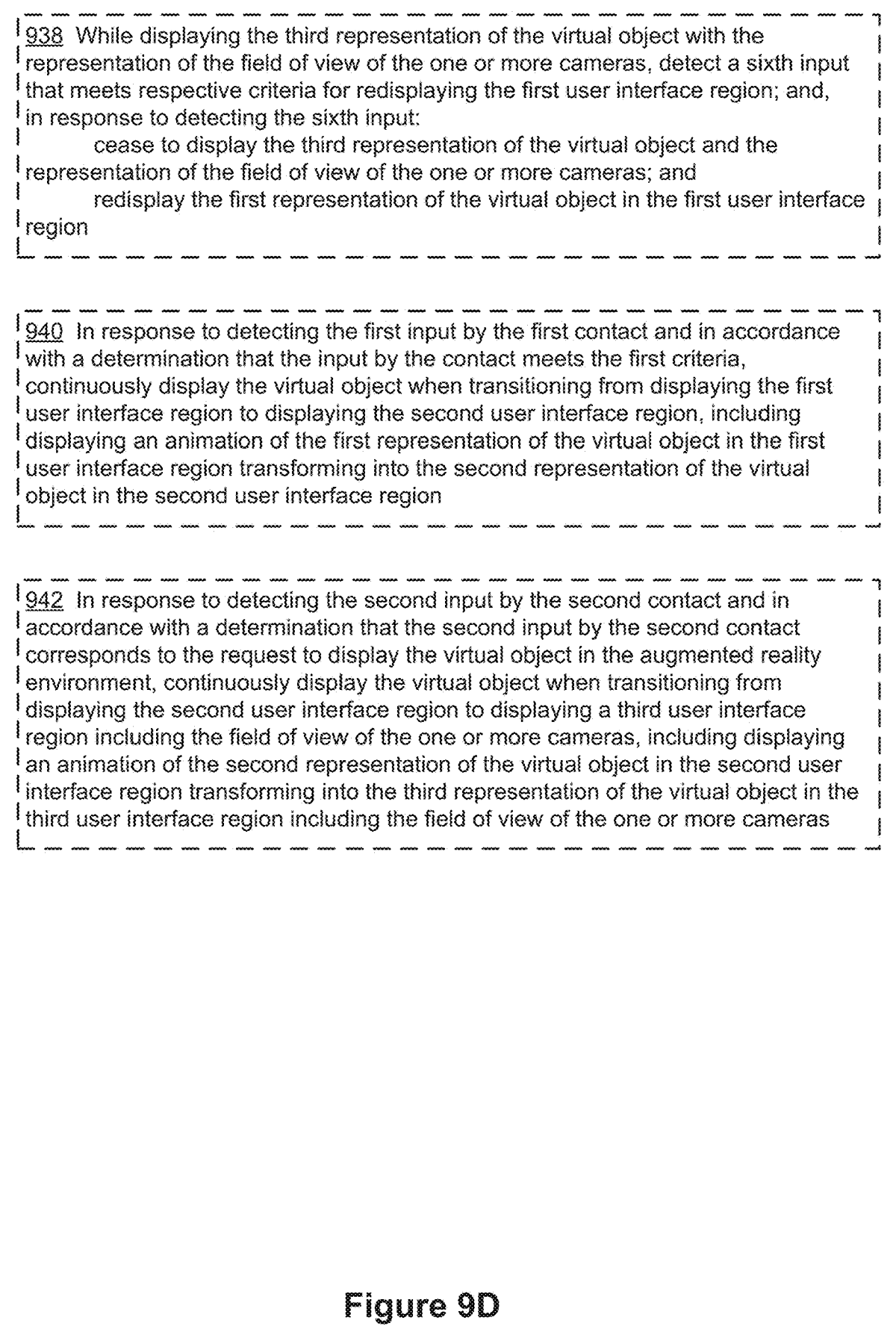

938 While displaying the third representation of the virtual object with the representation of the field of view of the one or more cameras, detect a sixth input that meets respective criteria for redisplaying the first user interface region; and, in response to detecting the sixth input:

cease to display the third representation of the virtual object and the representation of the field of view of the one or more cameras; and redisplay the first representation of the virtual object in the first user interface region 940 In response to detecting the first input by the first contact and in accordance with a determination that the input by the contact meets the first criteria, continuously display the virtual object when transitioning from displaying the first user interface region to displaying the second user interface region, including displaying an animation of the first representation of the virtual object in the first user interface region transforming into the second representation of the virtual object in the second user interface region 942 In response to detecting the second input by the second contact and in accordance with a determination that the second input by the second contact corresponds to the request to display the virtual object in the augmented reality environment, continuously display the virtual object when transitioning from displaying the second user interface region to displaying a third user interface region including the field of view of the one or more cameras, including displaying an animation of the second representation of the virtual object in the second user interface region transforming into the third representation of the virtual object in the third user interface region including the field of view of the one or more cameras

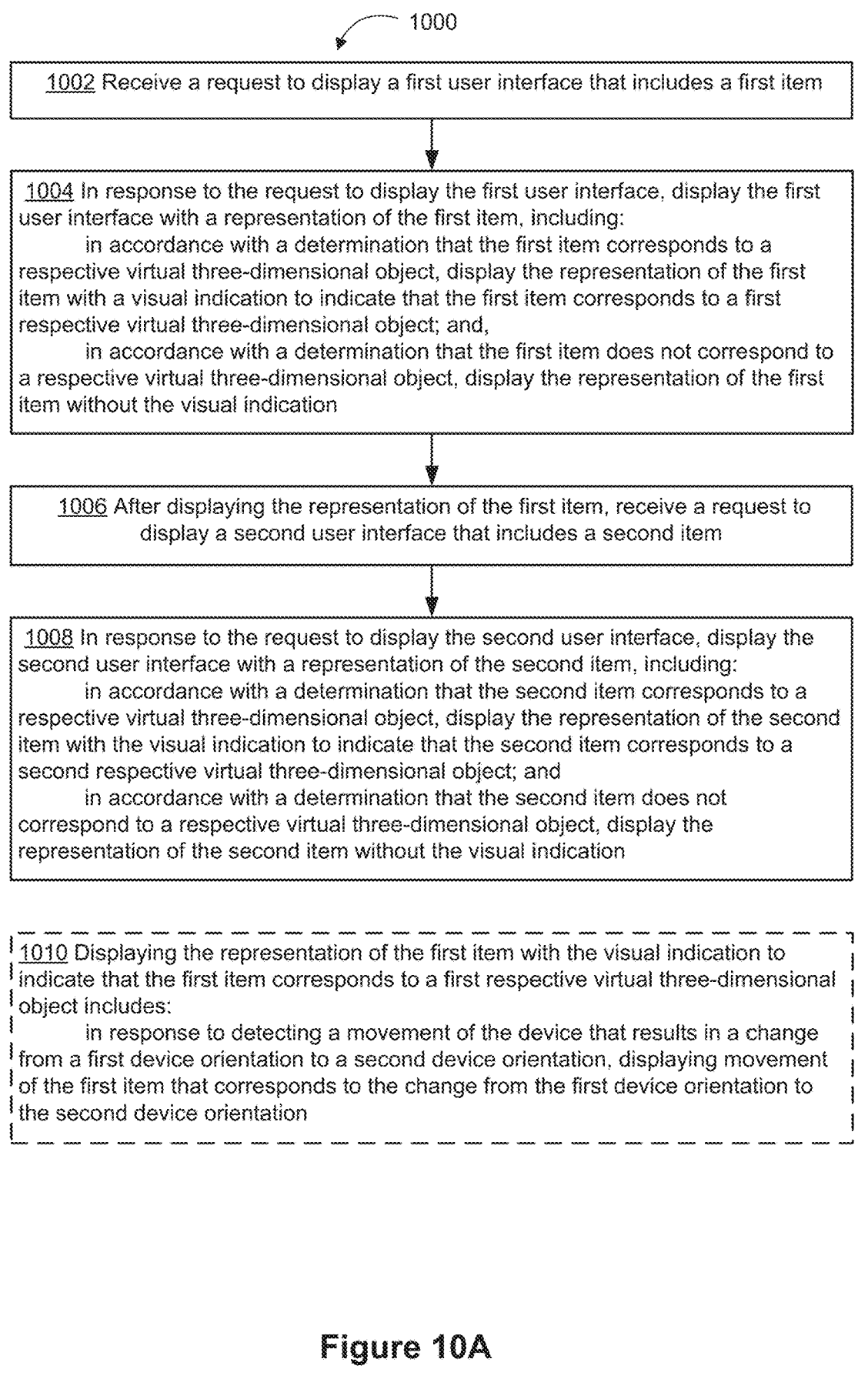

1002 Receive a request to display a first user interface that includes a first item 1004 In response to the request to display the first user interface, display the first user interface with a representation of the first item, including:

in accordance with a determination that the first item corresponds to a respective virtual three-dimensional object, display the representation of the first item with a visual indication to indicate that the first item corresponds to a first respective virtual three-dimensional object; and, in accordance with a determination that the first item does not correspond to a respective virtual three-dimensional object, display the representation of the first item without the visual indication 1006 After displaying the representation of the first item, receive a request to display a second user interface that includes a second item 1008 In response to the request to display the second user interface, display the second user interface with a representation of the second item, including:

in accordance with a determination that the second item corresponds to a respective virtual three-dimensional object, display the representation of the second item with the visual indication to indicate that the second item corresponds to a second respective virtual three-dimensional object; and in accordance with a determination that the second item does not correspond to a respective virtual three-dimensional object, display the representation of the second item without the visual indication 1010 Displaying the representation of the first item with the visual indication to indicate that the first item corresponds to a first respective virtual three-dimensional object includes:

in response to detecting a movement of the device that results in a change from a first device orientation to a second device orientation, displaying movement of the first item that corresponds to the change from the first device orientation to the second device orientation

Figure 10A

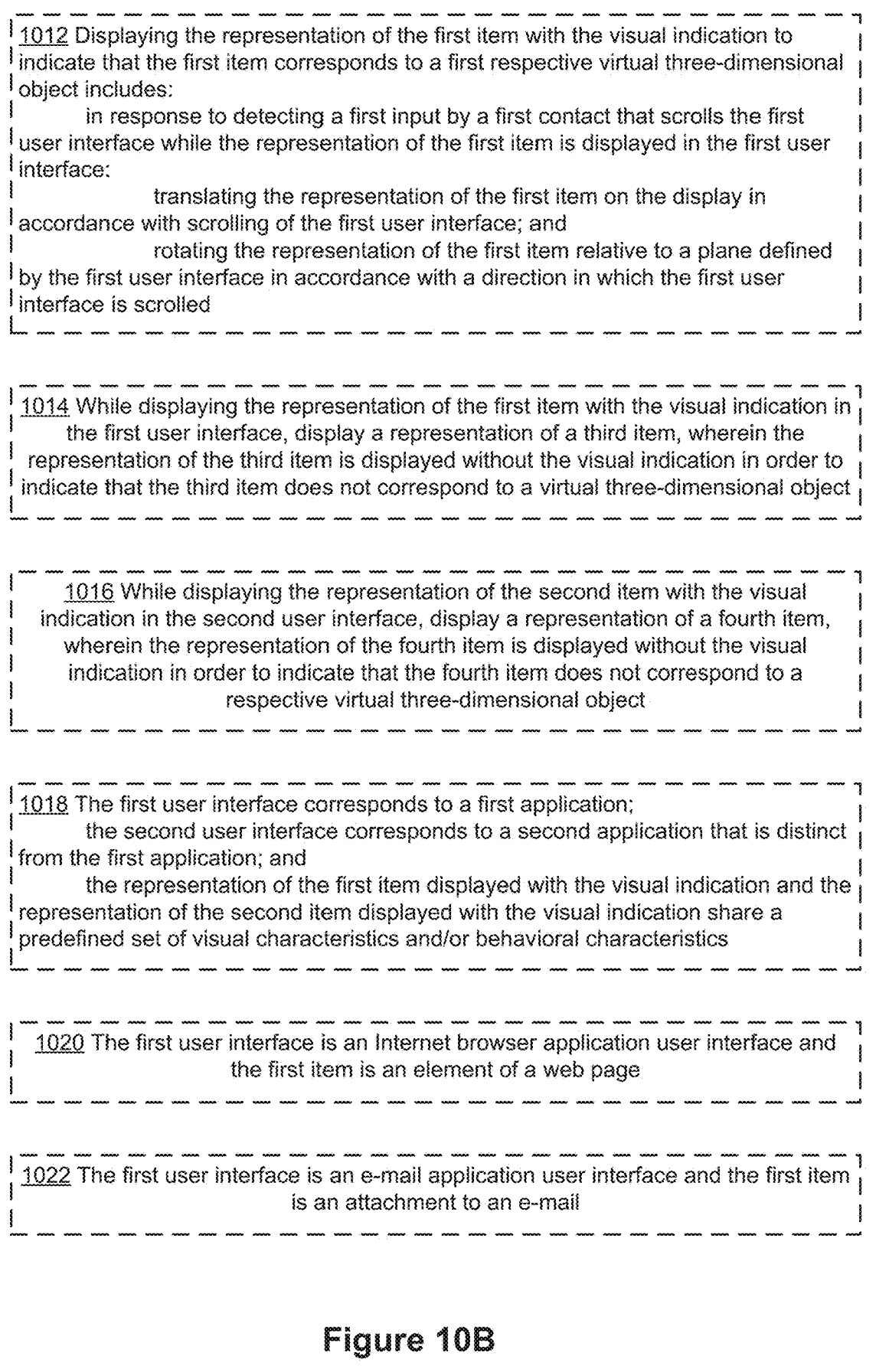

1012 Displaying the representation of the first item with the visual indication to indicate that the first item corresponds to a first respective virtual three-dimensional object includes:

in response to detecting a first input by a first contact that scrolls the first user interface while the representation of the first item is displayed in the first user interface:

translating the representation of the first item on the display in accordance with scrolling of the first user interface; and rotating the representation of the first item relative to a plane defined by the first user interface in accordance with a direction in which the first user interface is scrolled 1014 While displaying the representation of the first item with the visual indication in the first user interface, display a representation of a third item, wherein the representation of the third item is displayed without the visual indication in order to indicate that the third item does not correspond to a virtual three-dimensional object 1016 While displaying the representation of the second item with the visual indication in the second user interface, display a representation of a fourth item, wherein the representation of the fourth item is displayed without the visual indication in order to indicate that the fourth item does not correspond to a respective virtual three-dimensional object 1018 The first user interface corresponds to a first application;

the second user interface corresponds to a second application that is distinct from the first application; and the representation of the first item displayed with the visual indication and the representation of the second item displayed with the visual indication share a predefined set of visual characteristics and/or behavioral characteristics 1020 The first user interface is an Internet browser application user interface and the first item is an element of a web page 1022 The first user interface is an e-mail application user interface and the first item is an attachment to an e-mail

Figure 10B

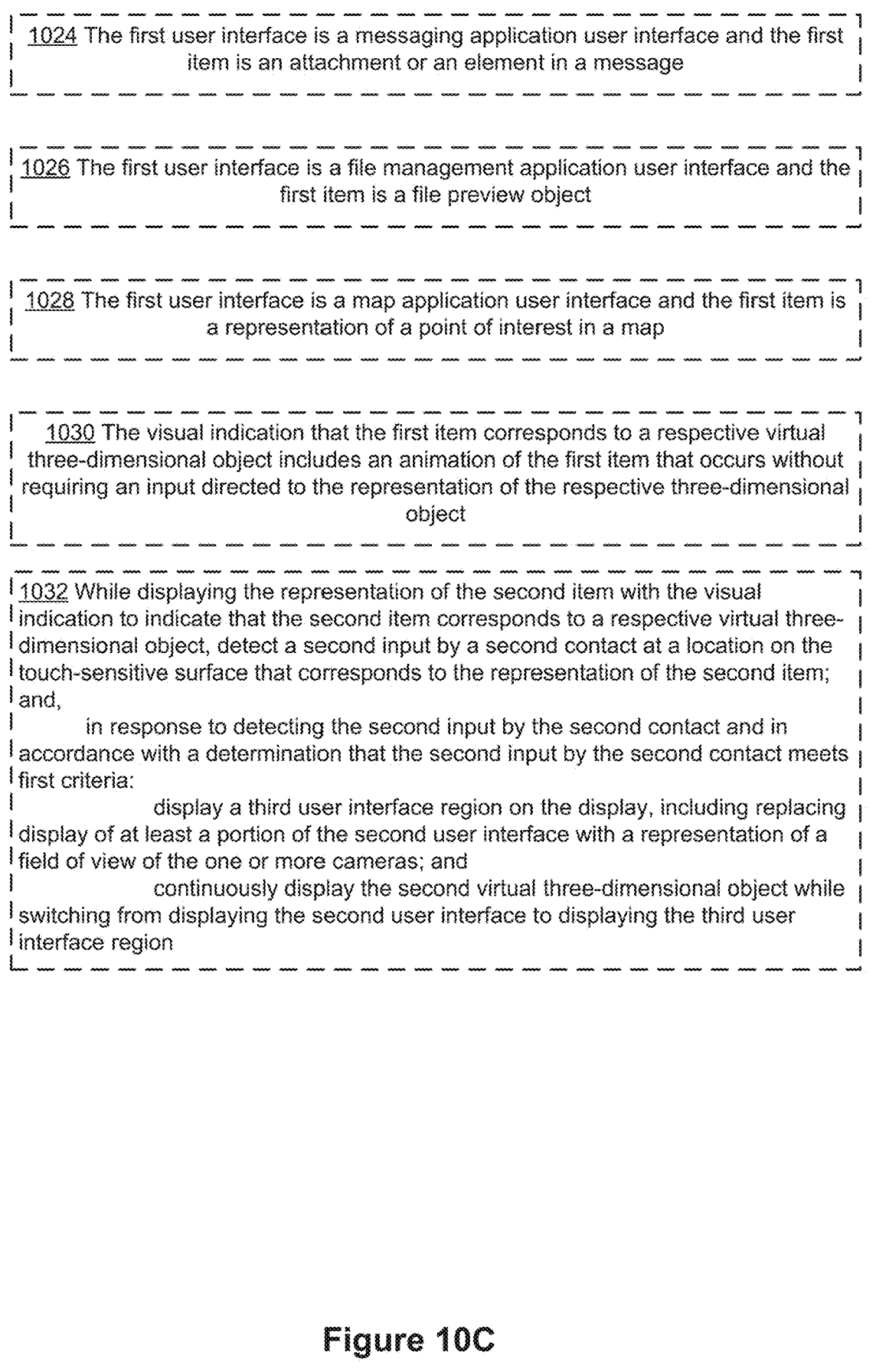

1024 The first user interface is a messaging application user interface and the first item is an attachment or an element in a message 1026 The first user interface is a file management application user interface and the first item is a file preview object 1028 The first user interface is a map application user interface and the first item is a representation of a point of interest in a map 1030 The visual indication that the first item corresponds to a respective virtual three-dimensional object includes an animation of the first item that occurs without requiring an input directed to the representation of the respective three-dimensional object 1032 While displaying the representation of the second item with the visual indication to indicate that the second item corresponds to a respective virtual three-dimensional object, detect a second input by a second contact at a location on the touch-sensitive surface that corresponds to the representation of the second item; and, in response to detecting the second input by the second contact and in accordance with a determination that the second input by the second contact meets first criteria:

display a third user interface region on the display, including replacing display of at least a portion of the second user interface with a representation of a field of view of the one or more cameras; and continuously display the second virtual three-dimensional object while switching from displaying the second user interface to displaying the third user interface region

Figure 10C

1034 While displaying the second item with the visual indication to indicate that the second item corresponds to the respective virtual three-dimensional object, detect a third input by a third contact at a location on the touch-sensitive surface that corresponds to the representation of the second item;

in response to detecting the third input by the third contact and in accordance with a determination that the third input by the third contact meets first criteria, display the second virtual three-dimensional object in a fourth user interface that is different from the second user interface;

while displaying the second virtual three-dimensional object in the fourth user interface, detect a fourth input; and, in response to detecting the fourth input:

in accordance with a determination that the fourth input corresponds to a request to manipulate the second virtual three-dimensional object in the fourth user interface, change a display property of the second virtual three-dimensional object within the fourth user interface based on the fourth input; and in accordance with a determination that the fourth input corresponds to a request to display the second virtual object in an augmented reality environment, display the second virtual three-dimensional object with a representation of a field of view of the one or more cameras

Figure 16B:
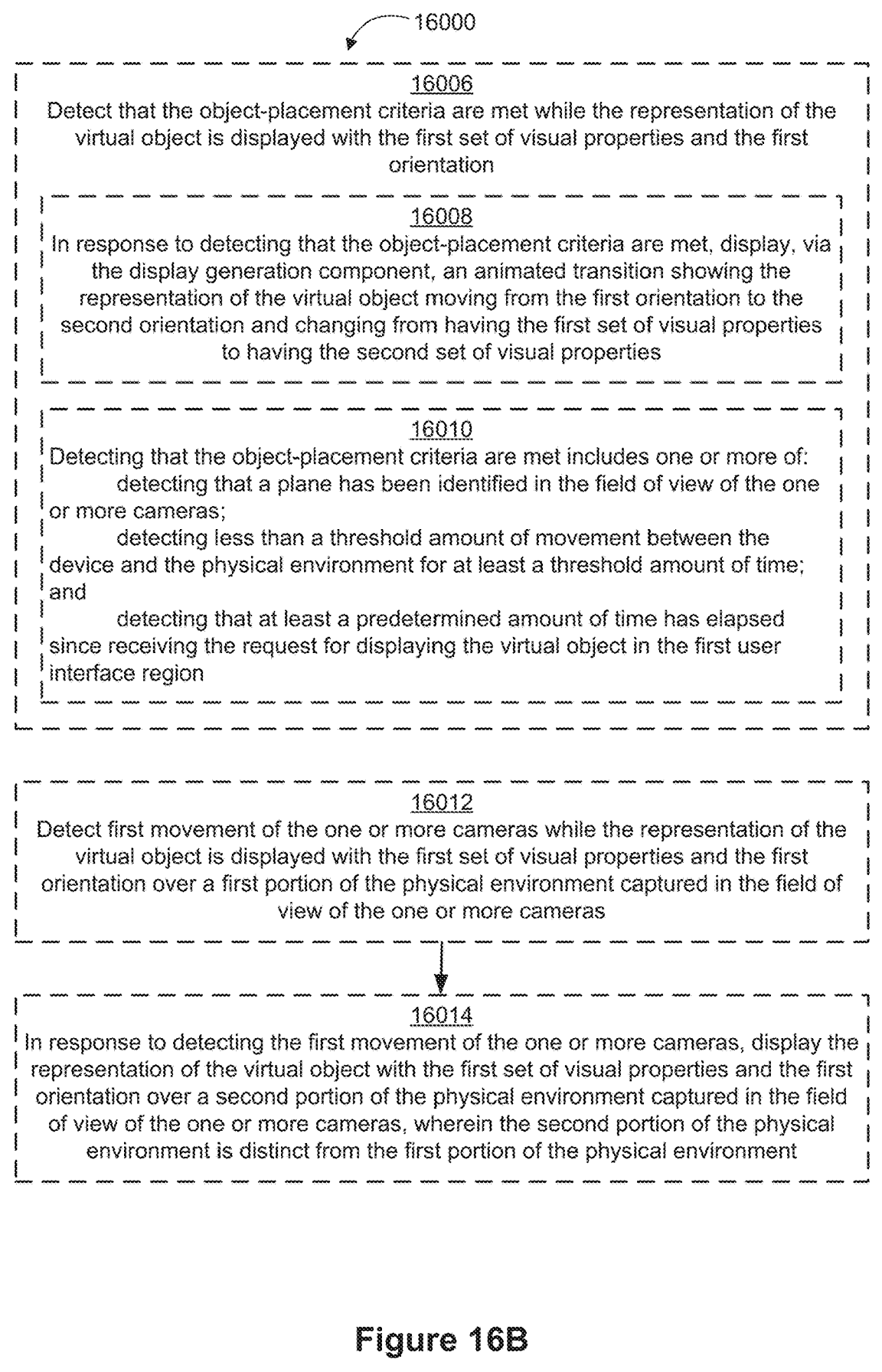

16006
Detect that the object-placement criteria are met while the representation of the virtual object is displayed with the first set of visual properties and the first orientation 16008
In response to detecting that the object-placement criteria are met, display, via the display generation component, an animated transition showing the representation of the virtual object moving from the first orientation to the second orientation and changing from having the first set of visual properties to having the second set of visual properties 16010
Detecting that the object-placement criteria are met includes one or more of:
detecting that a plane has been identified in the field of view of the one or more cameras;
detecting less than a threshold amount of movement between the device and the physical environment for at least a threshold amount of time; and
detecting that at least a predetermined amount of time has elapsed since receiving the request for displaying the virtual object in the first user interface region 16012
Detect first movement of the one or more cameras while the representation of the virtual object is displayed with the first set of visual properties and the first orientation over a first portion of the physical environment captured in the field of view of the one or more cameras

↓

16014
In response to detecting the first movement of the one or more cameras, display the representation of the virtual object with the first set of visual properties and the first orientation over a second portion of the physical environment captured in the field of view of the one or more cameras, wherein the second portion of the physical environment is distinct from the first portion of the physical environment

Figure 16C:
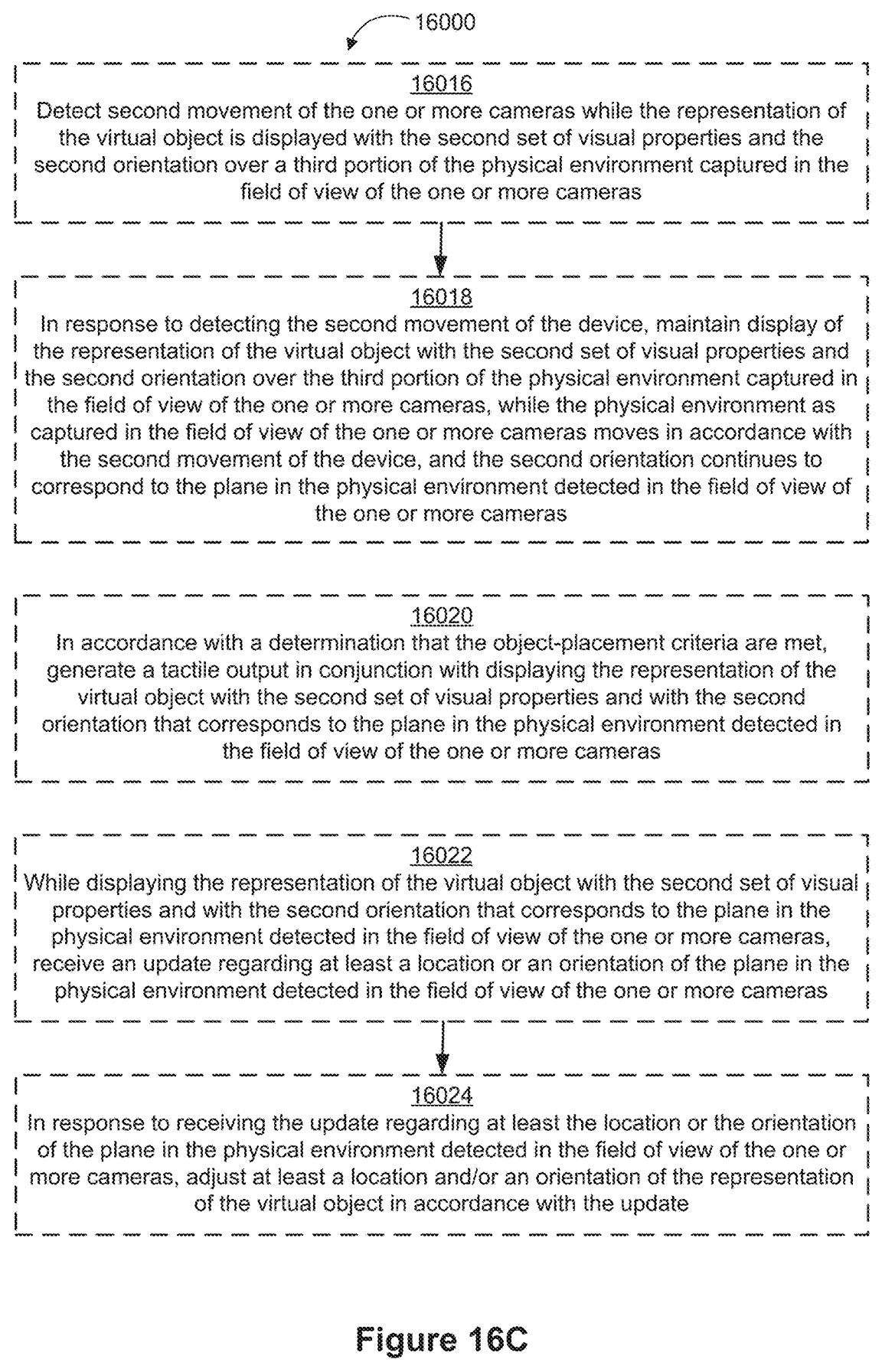

16016
Detect second movement of the one or more cameras while the representation of the virtual object is displayed with the second set of visual properties and the second orientation over a third portion of the physical environment captured in the field of view of the one or more cameras 16018
In response to detecting the second movement of the device, maintain display of the representation of the virtual object with the second set of visual properties and the second orientation over the third portion of the physical environment captured in the field of view of the one or more cameras, while the physical environment as captured in the field of view of the one or more cameras moves in accordance with the second movement of the device, and the second orientation continues to correspond to the plane in the physical environment detected in the field of view of the one or more cameras 16020
In accordance with a determination that the object-placement criteria are met, generate a tactile output in conjunction with displaying the representation of the virtual object with the second set of visual properties and with the second orientation that corresponds to the plane in the physical environment detected in the field of view of the one or more cameras 16022
While displaying the representation of the virtual object with the second set of visual properties and with the second orientation that corresponds to the plane in the physical environment detected in the field of view of the one or more cameras, receive an update regarding at least a location or an orientation of the plane in the physical environment detected in the field of view of the one or more cameras 16024
In response to receiving the update regarding at least the location or the orientation of the plane in the physical environment detected in the field of view of the one or more cameras, adjust at least a location and/or an orientation of the representation of the virtual object in accordance with the update

Figure 16D:
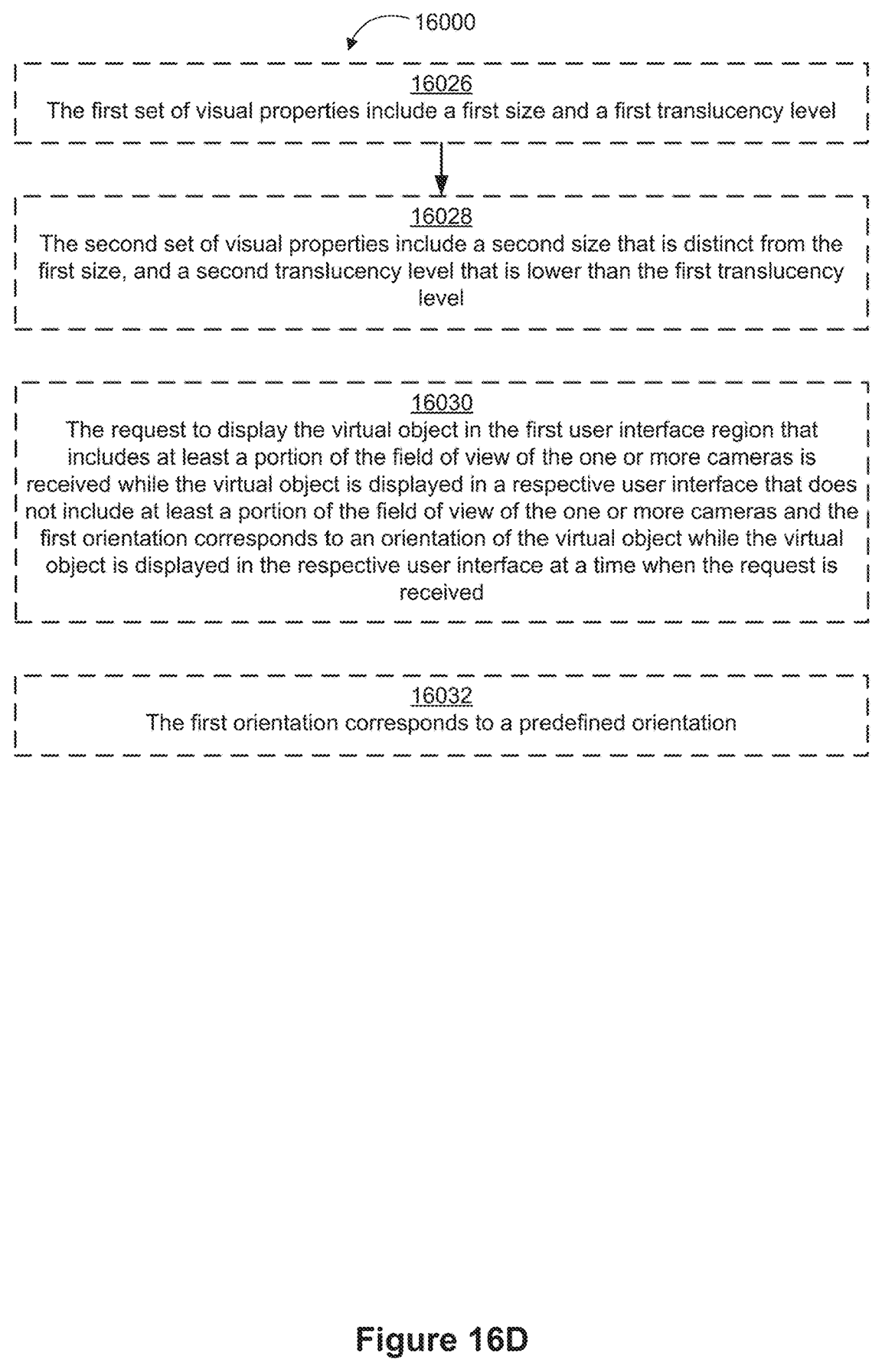

16026
The first set of visual properties include a first size and a first translucency level 16028
The second set of visual properties include a second size that is distinct from the first size, and a second translucency level that is lower than the first translucency level 16030
The request to display the virtual object in the first user interface region that includes at least a portion of the field of view of the one or more cameras is received while the virtual object is displayed in a respective user interface that does not include at least a portion of the field of view of the one or more cameras and the first orientation corresponds to an orientation of the virtual object while the virtual object is displayed in the respective user interface at a time when the request is received 16032
The first orientation corresponds to a predefined orientation

Figure 16E:
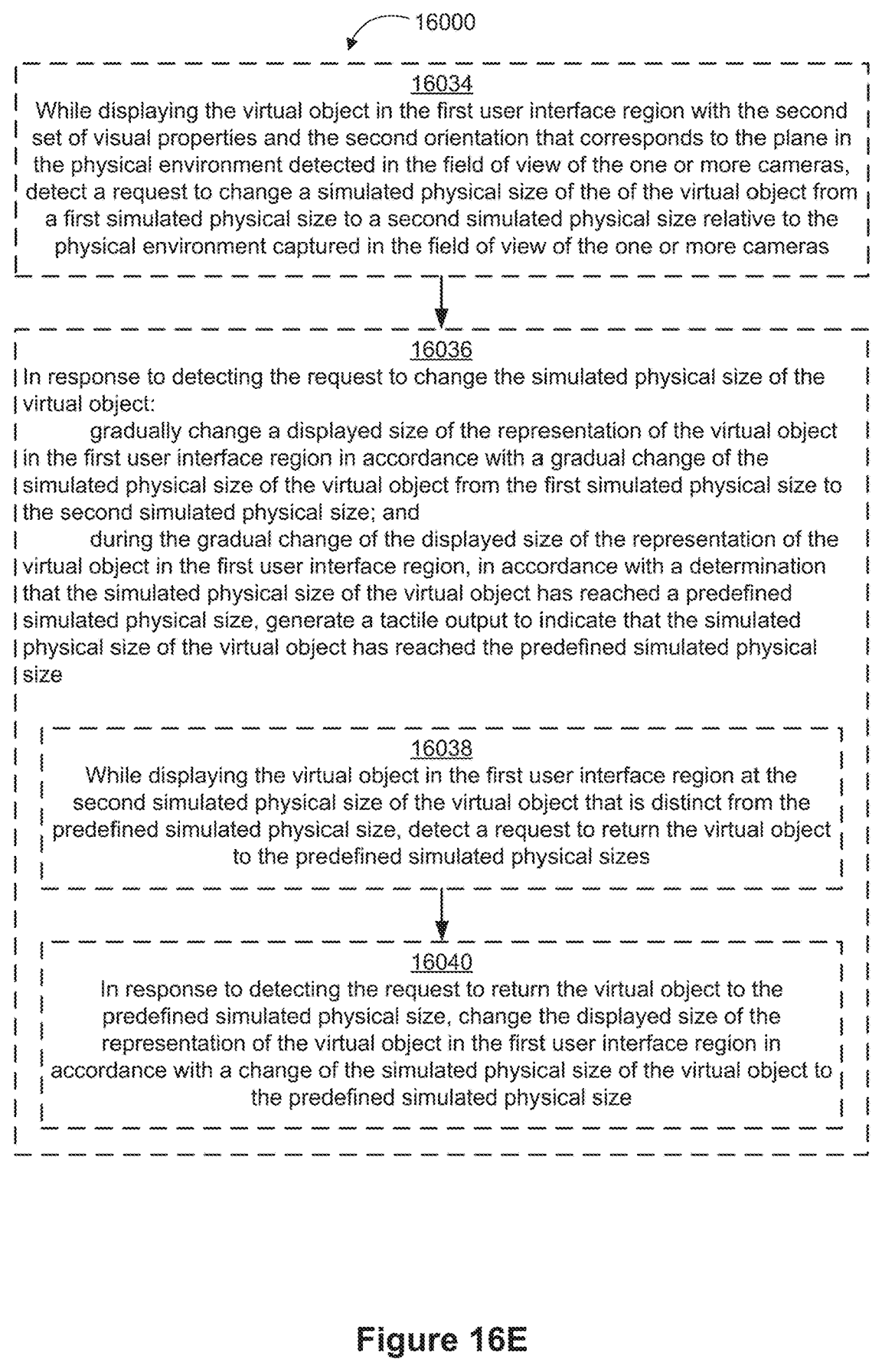

16034
While displaying the virtual object in the first user interface region with the second set of visual properties and the second orientation that corresponds to the plane in the physical environment detected in the field of view of the one or more cameras, detect a request to change a simulated physical size of the of the virtual object from a first simulated physical size to a second simulated physical size relative to the physical environment captured in the field of view of the one or more cameras

↓

16036
In response to detecting the request to change the simulated physical size of the virtual object:

gradually change a displayed size of the representation of the virtual object in the first user interface region in accordance with a gradual change of the simulated physical size of the virtual object from the first simulated physical size to the second simulated physical size; and during the gradual change of the displayed size of the representation of the virtual object in the first user interface region, in accordance with a determination that the simulated physical size of the virtual object has reached a predefined simulated physical size, generate a tactile output to indicate that the simulated physical size of the virtual object has reached the predefined simulated physical size 16038
While displaying the virtual object in the first user interface region at the second simulated physical size of the virtual object that is distinct from the predefined simulated physical size, detect a request to return the virtual object to the predefined simulated physical sizes

↓

16040
In response to detecting the request to return the virtual object to the predefined simulated physical size, change the displayed size of the representation of the virtual object in the first user interface region in accordance with a change of the simulated physical size of the virtual object to the predefined simulated physical size

Figure 16F:
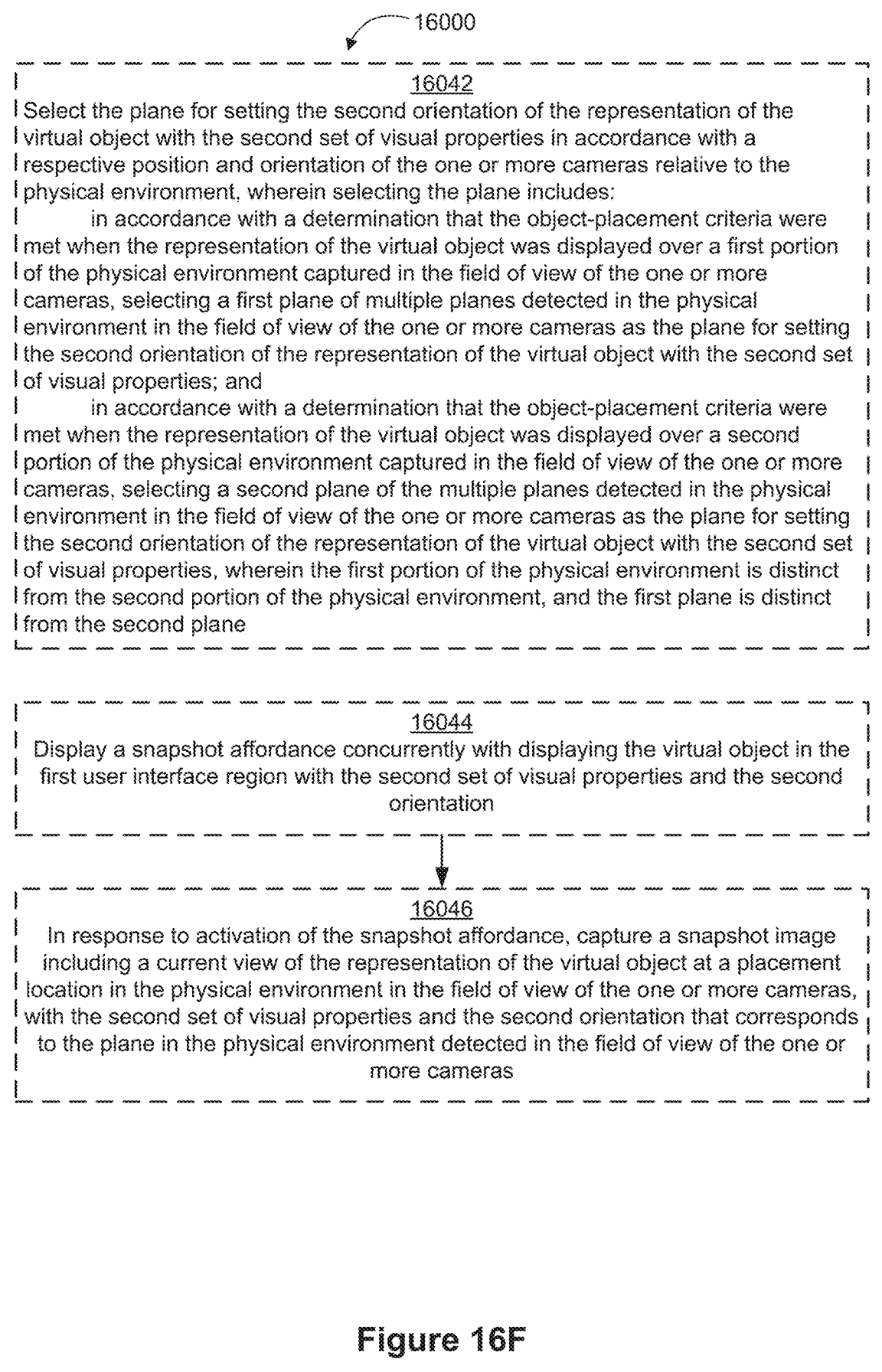

16042
Select the plane for setting the second orientation of the representation of the virtual object with the second set of visual properties in accordance with a respective position and orientation of the one or more cameras relative to the physical environment, wherein selecting the plane includes:

in accordance with a determination that the object-placement criteria were met when the representation of the virtual object was displayed over a first portion of the physical environment captured in the field of view of the one or more cameras, selecting a first plane of multiple planes detected in the physical environment in the field of view of the one or more cameras as the plane for setting the second orientation of the representation of the virtual object with the second set of visual properties; and in accordance with a determination that the object-placement criteria were met when the representation of the virtual object was displayed over a second portion of the physical environment captured in the field of view of the one or more cameras, selecting a second plane of the multiple planes detected in the physical environment in the field of view of the one or more cameras as the plane for setting the second orientation of the representation of the virtual object with the second set of visual properties, wherein the first portion of the physical environment is distinct from the second portion of the physical environment, and the first plane is distinct from the second plane 16044
Display a snapshot affordance concurrently with displaying the virtual object in the first user interface region with the second set of visual properties and the second orientation 16046
In response to activation of the snapshot affordance, capture a snapshot image including a current view of the representation of the virtual object at a placement location in the physical environment in the field of view of the one or more cameras, with the second set of visual properties and the second orientation that corresponds to the plane in the physical environment detected in the field of view of the one or more cameras

Figure 16G:
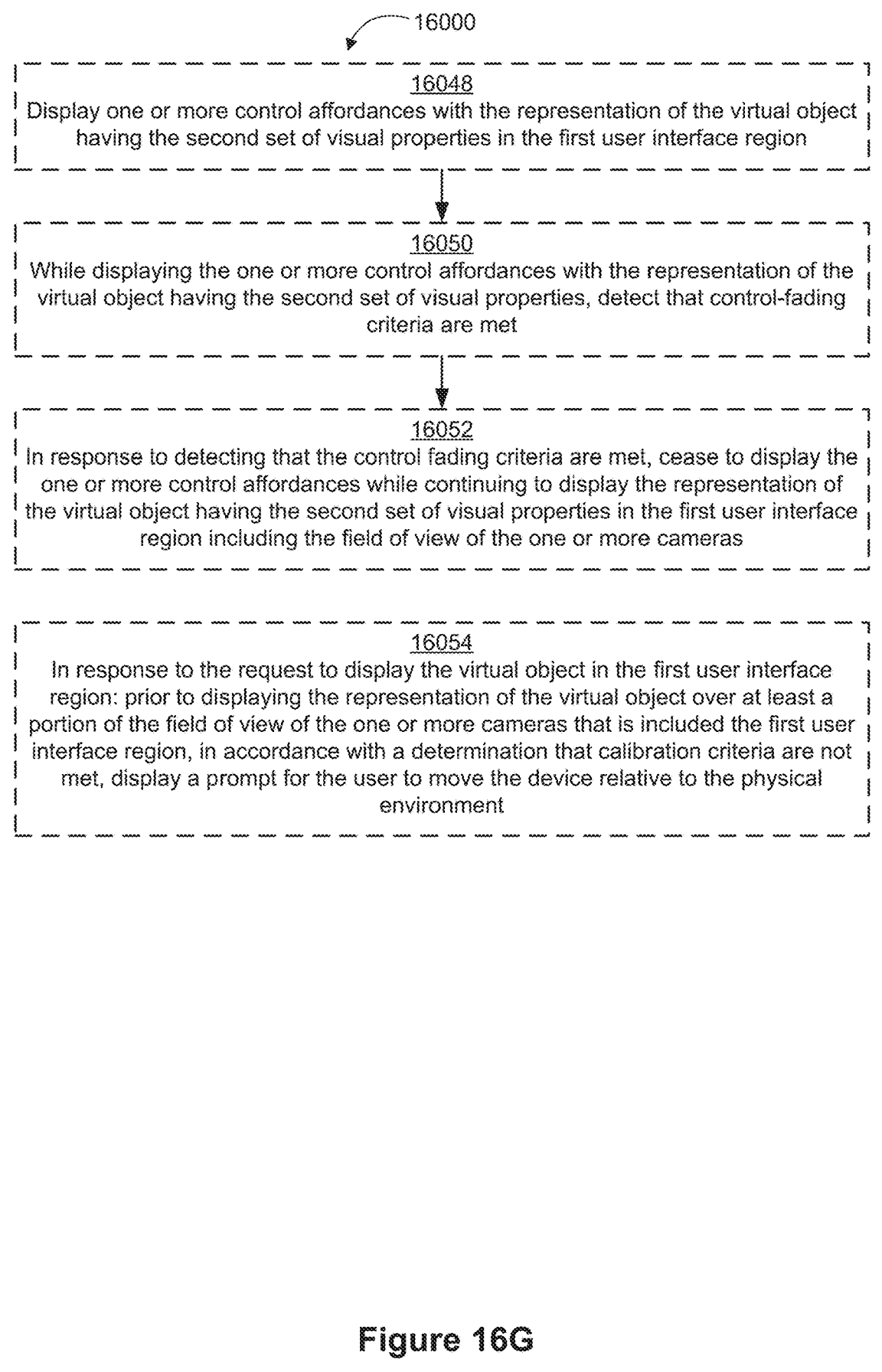

16048
Display one or more control affordances with the representation of the virtual object having the second set of visual properties in the first user interface region

↓

16050
While displaying the one or more control affordances with the representation of the virtual object having the second set of visual properties, detect that control-fading criteria are met

↓

16052
In response to detecting that the control fading criteria are met, cease to display the one or more control affordances while continuing to display the representation of the virtual object having the second set of visual properties in the first user interface region including the field of view of the one or more cameras 16054
In response to the request to display the virtual object in the first user interface region: prior to displaying the representation of the virtual object over at least a portion of the field of view of the one or more cameras that is included the first user interface region, in accordance with a determination that calibration criteria are not met, display a prompt for the user to move the device relative to the physical environment

Figure 17A:
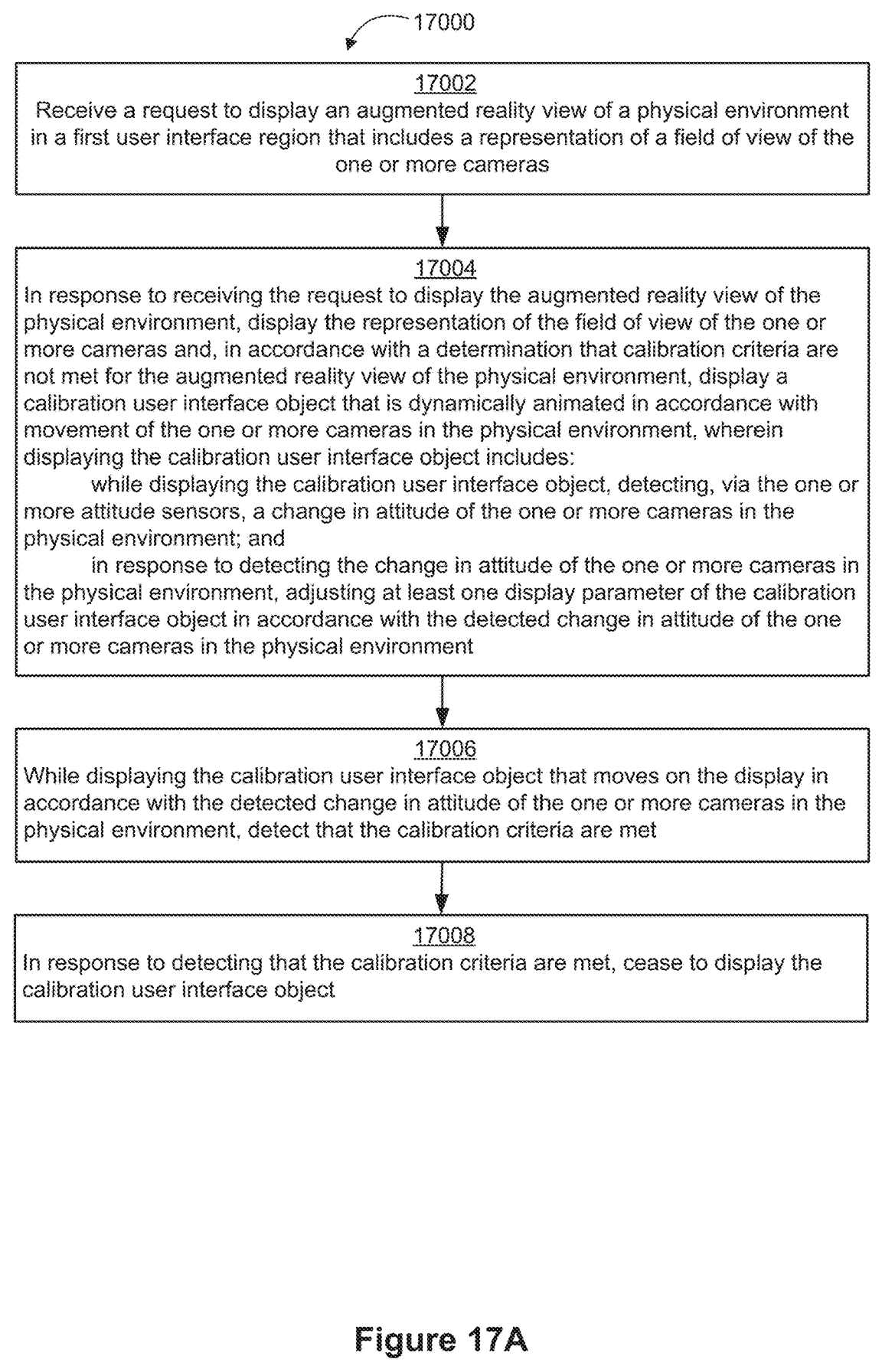

17002
Receive a request to display an augmented reality view of a physical environment in a first user interface region that includes a representation of a field of view of the one or more cameras 17004
In response to receiving the request to display the augmented reality view of the physical environment, display the representation of the field of view of the one or more cameras and, in accordance with a determination that calibration criteria are not met for the augmented reality view of the physical environment, display a calibration user interface object that is dynamically animated in accordance with movement of the one or more cameras in the physical environment, wherein displaying the calibration user interface object includes:

while displaying the calibration user interface object, detecting, via the one or more attitude sensors, a change in attitude of the one or more cameras in the physical environment; and in response to detecting the change in attitude of the one or more cameras in the physical environment, adjusting at least one display parameter of the calibration user interface object in accordance with the detected change in attitude of the one or more cameras in the physical environment 17006
While displaying the calibration user interface object that moves on the display in accordance with the detected change in attitude of the one or more cameras in the physical environment, detect that the calibration criteria are met 17008
In response to detecting that the calibration criteria are met, cease to display the calibration user interface object

Figure 17B:
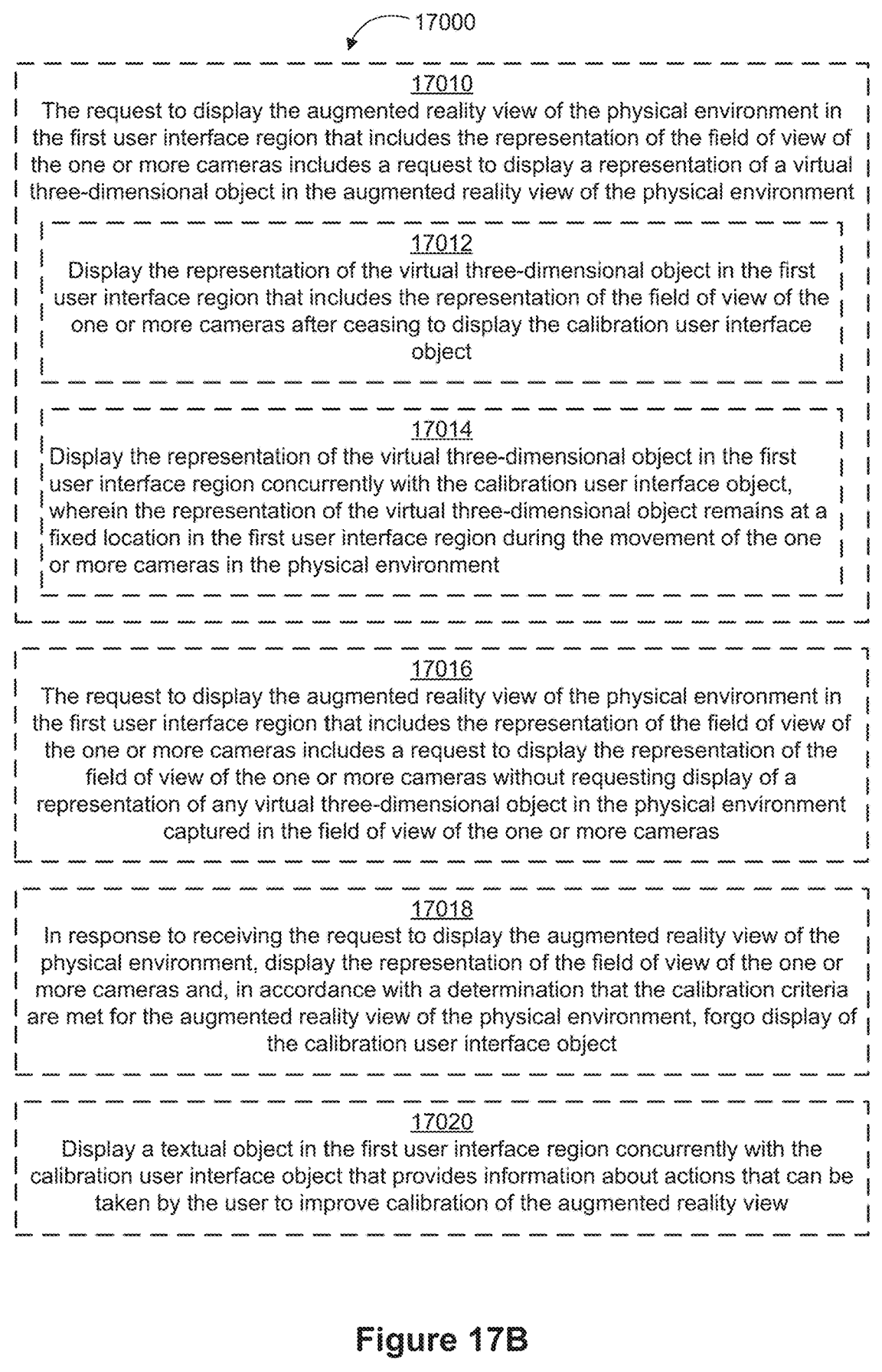

17010
The request to display the augmented reality view of the physical environment in the first user interface region that includes the representation of the field of view of the one or more cameras includes a request to display a representation of a virtual three-dimensional object in the augmented reality view of the physical environment 17012
Display the representation of the virtual three-dimensional object in the first user interface region that includes the representation of the field of view of the one or more cameras after ceasing to display the calibration user interface object 17014
Display the representation of the virtual three-dimensional object in the first user interface region concurrently with the calibration user interface object, wherein the representation of the virtual three-dimensional object remains at a fixed location in the first user interface region during the movement of the one or more cameras in the physical environment 17016
The request to display the augmented reality view of the physical environment in the first user interface region that includes the representation of the field of view of the one or more cameras includes a request to display the representation of the field of view of the one or more cameras without requesting display of a representation of any virtual three-dimensional object in the physical environment captured in the field of view of the one or more cameras 17018
In response to receiving the request to display the augmented reality view of the physical environment, display the representation of the field of view of the one or more cameras and, in accordance with a determination that the calibration criteria are met for the augmented reality view of the physical environment, forgo display of the calibration user interface object 17020
Display a textual object in the first user interface region concurrently with the calibration user interface object that provides information about actions that can be taken by the user to improve calibration of the augmented reality view

Figure 17C:
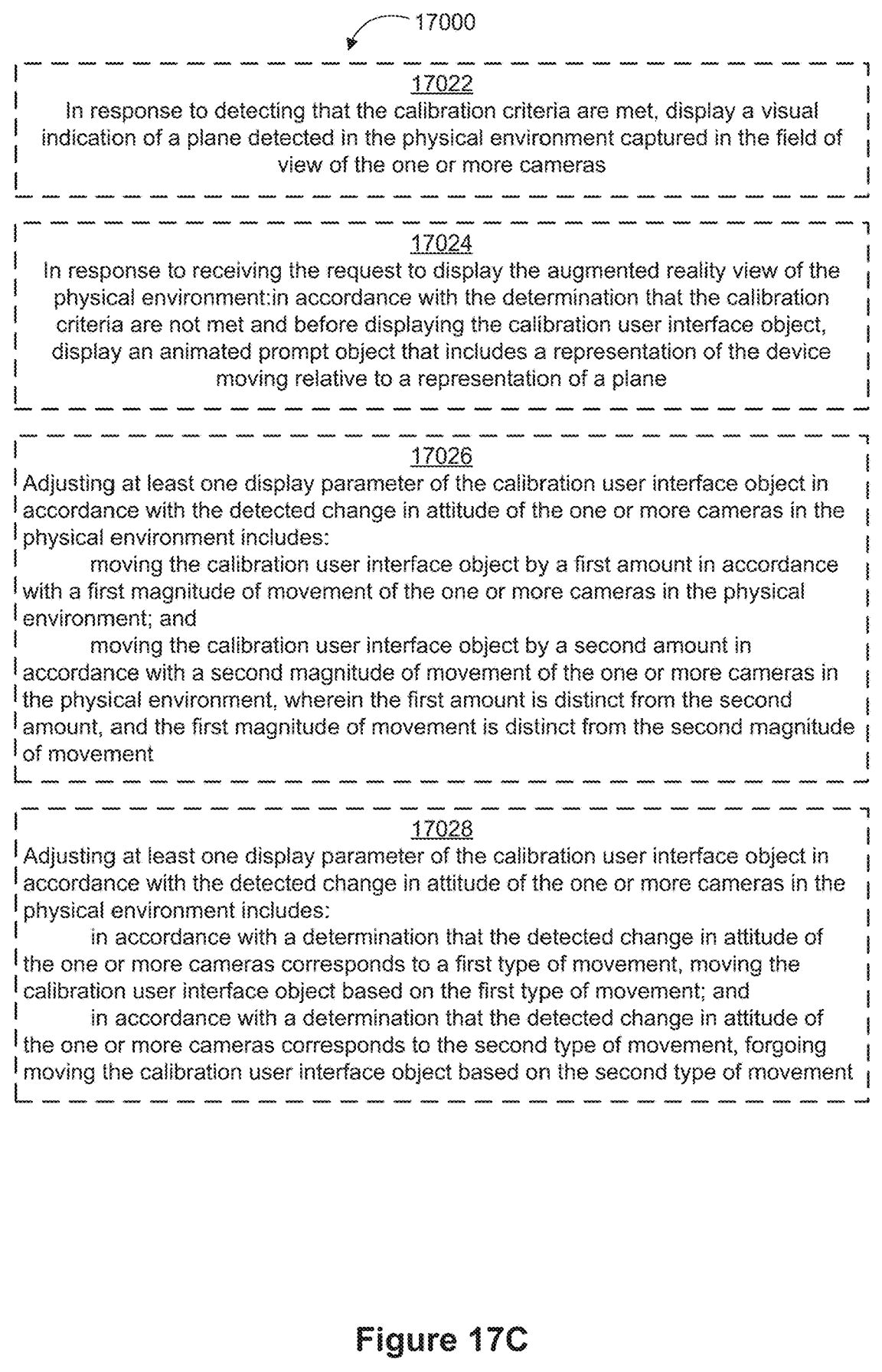

17022
In response to detecting that the calibration criteria are met, display a visual indication of a plane detected in the physical environment captured in the field of view of the one or more cameras 17024
In response to receiving the request to display the augmented reality view of the physical environment:in accordance with the determination that the calibration criteria are not met and before displaying the calibration user interface object, display an animated prompt object that includes a representation of the device moving relative to a representation of a plane 17026
Adjusting at least one display parameter of the calibration user interface object in accordance with the detected change in attitude of the one or more cameras in the physical environment includes:

moving the calibration user interface object by a first amount in accordance with a first magnitude of movement of the one or more cameras in the physical environment; and moving the calibration user interface object by a second amount in accordance with a second magnitude of movement of the one or more cameras in the physical environment, wherein the first amount is distinct from the second amount, and the first magnitude of movement is distinct from the second magnitude of movement 17028
Adjusting at least one display parameter of the calibration user interface object in accordance with the detected change in attitude of the one or more cameras in the physical environment includes:

in accordance with a determination that the detected change in attitude of the one or more cameras corresponds to a first type of movement, moving the calibration user interface object based on the first type of movement; and in accordance with a determination that the detected change in attitude of the one or more cameras corresponds to the second type of movement, forgoing moving the calibration user interface object based on the second type of movement

Figure 17D:
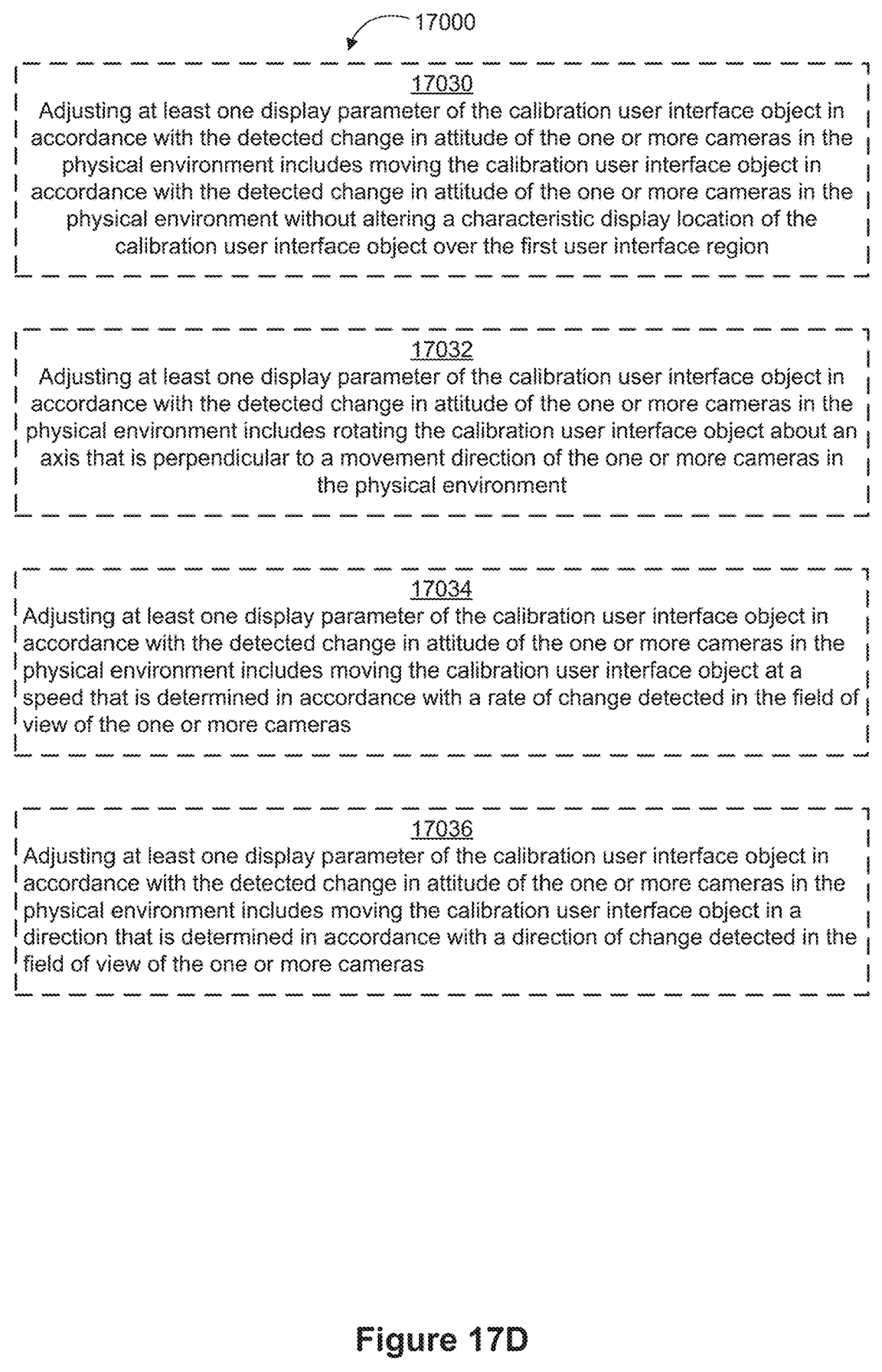

17030
Adjusting at least one display parameter of the calibration user interface object in accordance with the detected change in attitude of the one or more cameras in the physical environment includes moving the calibration user interface object in accordance with the detected change in attitude of the one or more cameras in the physical environment without altering a characteristic display location of the calibration user interface object over the first user interface region 17032
Adjusting at least one display parameter of the calibration user interface object in accordance with the detected change in attitude of the one or more cameras in the physical environment includes rotating the calibration user interface object about an axis that is perpendicular to a movement direction of the one or more cameras in the physical environment 17034
Adjusting at least one display parameter of the calibration user interface object in accordance with the detected change in attitude of the one or more cameras in the physical environment includes moving the calibration user interface object at a speed that is determined in accordance with a rate of change detected in the field of view of the one or more cameras 17036
Adjusting at least one display parameter of the calibration user interface object in accordance with the detected change in attitude of the one or more cameras in the physical environment includes moving the calibration user interface object in a direction that is determined in accordance with a direction of change detected in the field of view of the one or more cameras

Figure 18A:
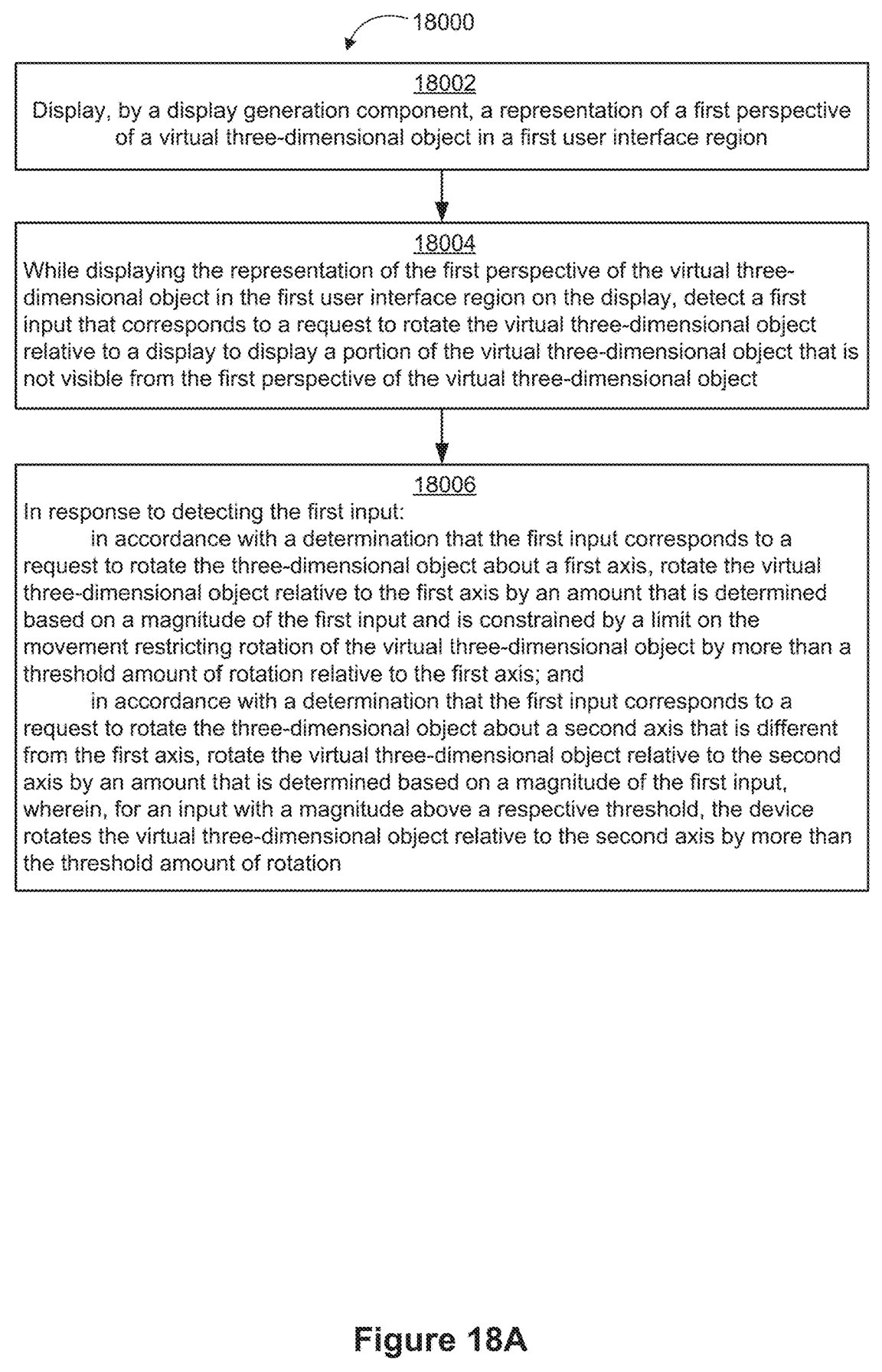

18002
Display, by a display generation component, a representation of a first perspective of a virtual three-dimensional object in a first user interface region 18004
While displaying the representation of the first perspective of the virtual three-dimensional object in the first user interface region on the display, detect a first input that corresponds to a request to rotate the virtual three-dimensional object relative to a display to display a portion of the virtual three-dimensional object that is not visible from the first perspective of the virtual three-dimensional object 18006
In response to detecting the first input:

in accordance with a determination that the first input corresponds to a request to rotate the three-dimensional object about a first axis, rotate the virtual three-dimensional object relative to the first axis by an amount that is determined based on a magnitude of the first input and is constrained by a limit on the movement restricting rotation of the virtual three-dimensional object by more than a threshold amount of rotation relative to the first axis; and in accordance with a determination that the first input corresponds to a request to rotate the three-dimensional object about a second axis that is different from the first axis, rotate the virtual three-dimensional object relative to the second axis by an amount that is determined based on a magnitude of the first input, wherein, for an input with a magnitude above a respective threshold, the device rotates the virtual three-dimensional object relative to the second axis by more than the threshold amount of rotation

Figure 18B:
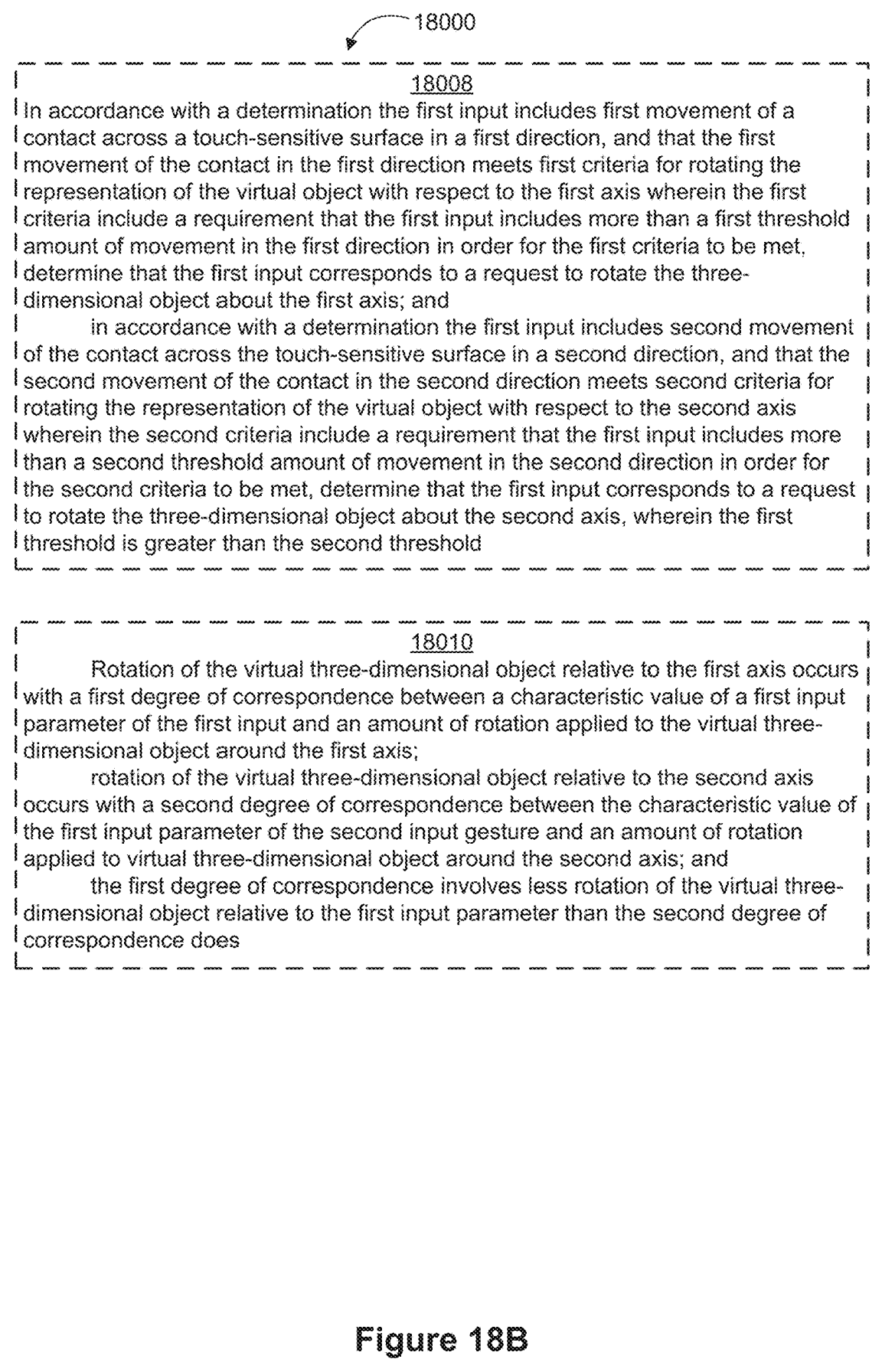

In accordance with a determination the first input includes first movement of a contact across a touch-sensitive surface in a first direction, and that the first movement of the contact in the first direction meets first criteria for rotating the representation of the virtual object with respect to the first axis wherein the first criteria include a requirement that the first input includes more than a first threshold amount of movement in the first direction in order for the first criteria to be met, determine that the first input corresponds to a request to rotate the three-dimensional object about the first axis; and in accordance with a determination the first input includes second movement of the contact across the touch-sensitive surface in a second direction, and that the second movement of the contact in the second direction meets second criteria for rotating the representation of the virtual object with respect to the second axis wherein the second criteria include a requirement that the first input includes more than a second threshold amount of movement in the second direction in order for the second criteria to be met, determine that the first input corresponds to a request to rotate the three-dimensional object about the second axis, wherein the first threshold is greater than the second threshold

18010

Rotation of the virtual three-dimensional object relative to the first axis occurs with a first degree of correspondence between a characteristic value of a first input parameter of the first input and an amount of rotation applied to the virtual three-dimensional object around the first axis;

rotation of the virtual three-dimensional object relative to the second axis occurs with a second degree of correspondence between the characteristic value of the first input parameter of the second input gesture and an amount of rotation applied to virtual three-dimensional object around the second axis; and the first degree of correspondence involves less rotation of the virtual three-dimensional object relative to the first input parameter than the second degree of correspondence does

Figure 18C:
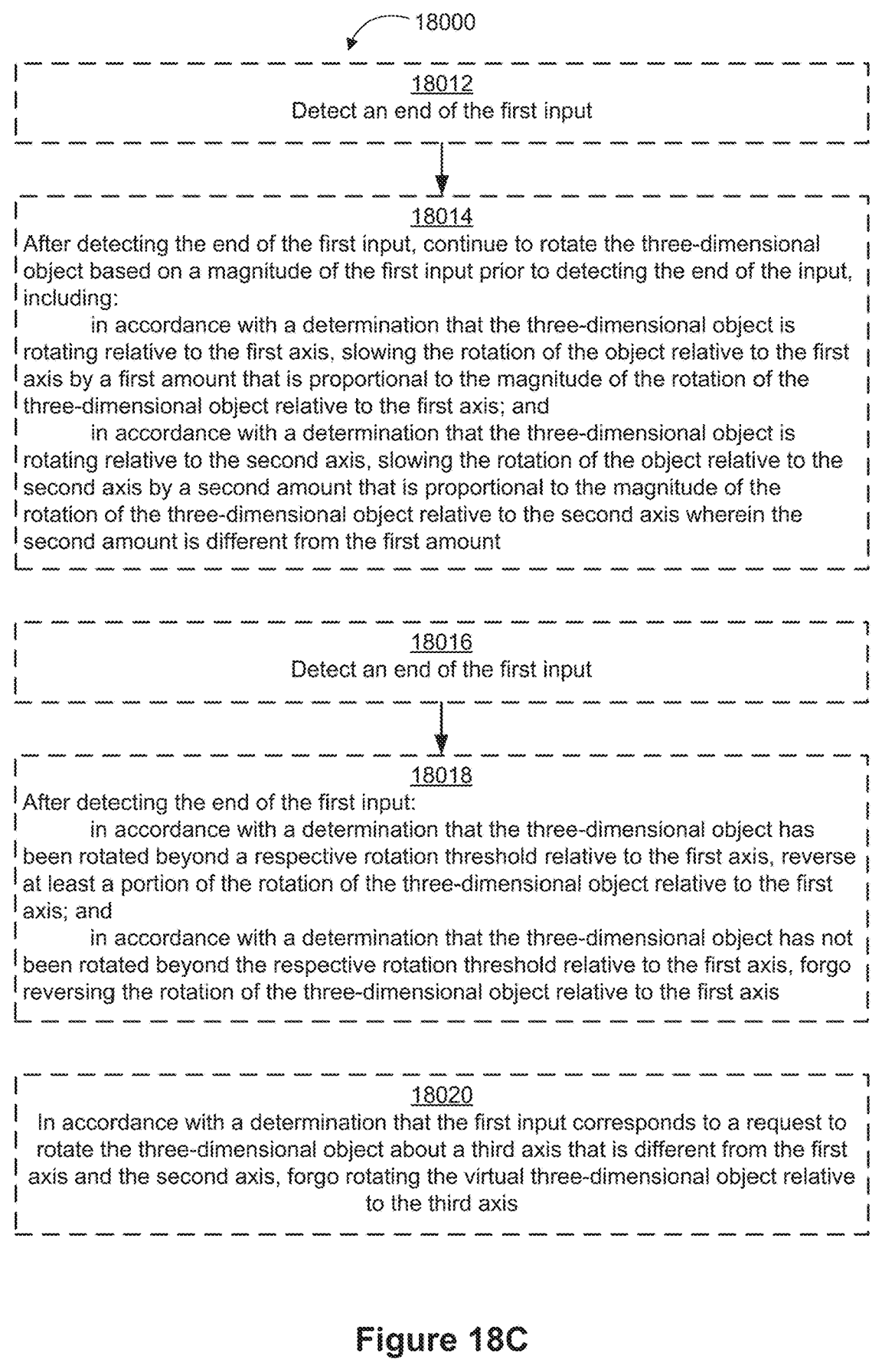

18012
Detect an end of the first input

18014
After detecting the end of the first input, continue to rotate the three-dimensional object based on a magnitude of the first input prior to detecting the end of the input, including:
in accordance with a determination that the three-dimensional object is rotating relative to the first axis, slowing the rotation of the object relative to the first axis by a first amount that is proportional to the magnitude of the rotation of the three-dimensional object relative to the first axis; and
in accordance with a determination that the three-dimensional object is rotating relative to the second axis, slowing the rotation of the object relative to the second axis by a second amount that is proportional to the magnitude of the rotation of the three-dimensional object relative to the second axis wherein the second amount is different from the first amount 18016
Detect an end of the first input 18018
After detecting the end of the first input:
in accordance with a determination that the three-dimensional object has been rotated beyond a respective rotation threshold relative to the first axis, reverse at least a portion of the rotation of the three-dimensional object relative to the first axis; and
in accordance with a determination that the three-dimensional object has not been rotated beyond the respective rotation threshold relative to the first axis, forgo reversing the rotation of the three-dimensional object relative to the first axis 18020
In accordance with a determination that the first input corresponds to a request to rotate the three-dimensional object about a third axis that is different from the first axis and the second axis, forgo rotating the virtual three-dimensional object relative to the third axis

Figure 18D:
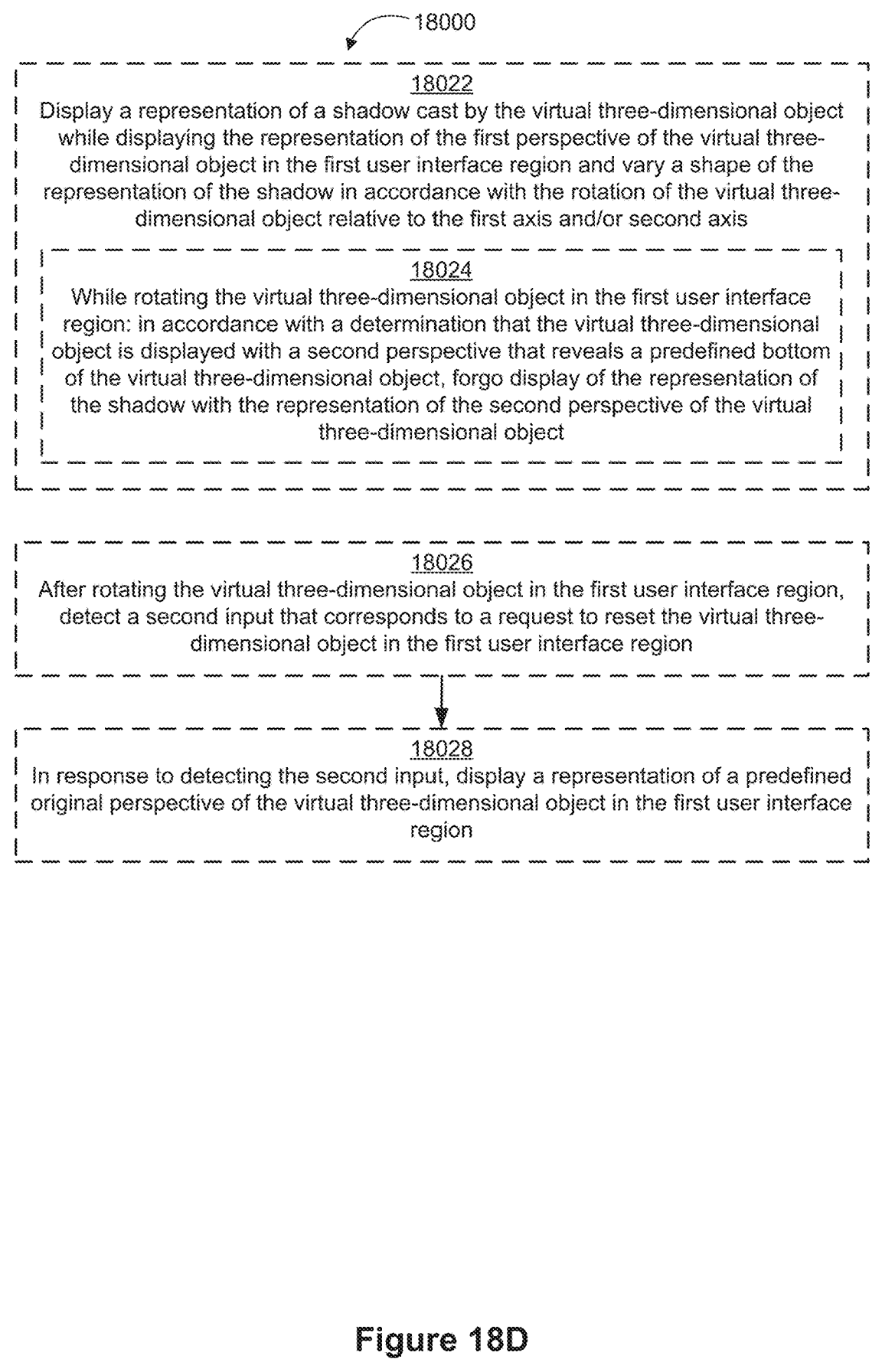

18022
Display a representation of a shadow cast by the virtual three-dimensional object while displaying the representation of the first perspective of the virtual three-dimensional object in the first user interface region and vary a shape of the representation of the shadow in accordance with the rotation of the virtual three-dimensional object relative to the first axis and/or second axis 18024
While rotating the virtual three-dimensional object in the first user interface region: in accordance with a determination that the virtual three-dimensional object is displayed with a second perspective that reveals a predefined bottom of the virtual three-dimensional object, forgo display of the representation of the shadow with the representation of the second perspective of the virtual three-dimensional object 18026
After rotating the virtual three-dimensional object in the first user interface region, detect a second input that corresponds to a request to reset the virtual three-dimensional object in the first user interface region 18028
In response to detecting the second input, display a representation of a predefined original perspective of the virtual three-dimensional object in the first user interface region

Figure 18F:
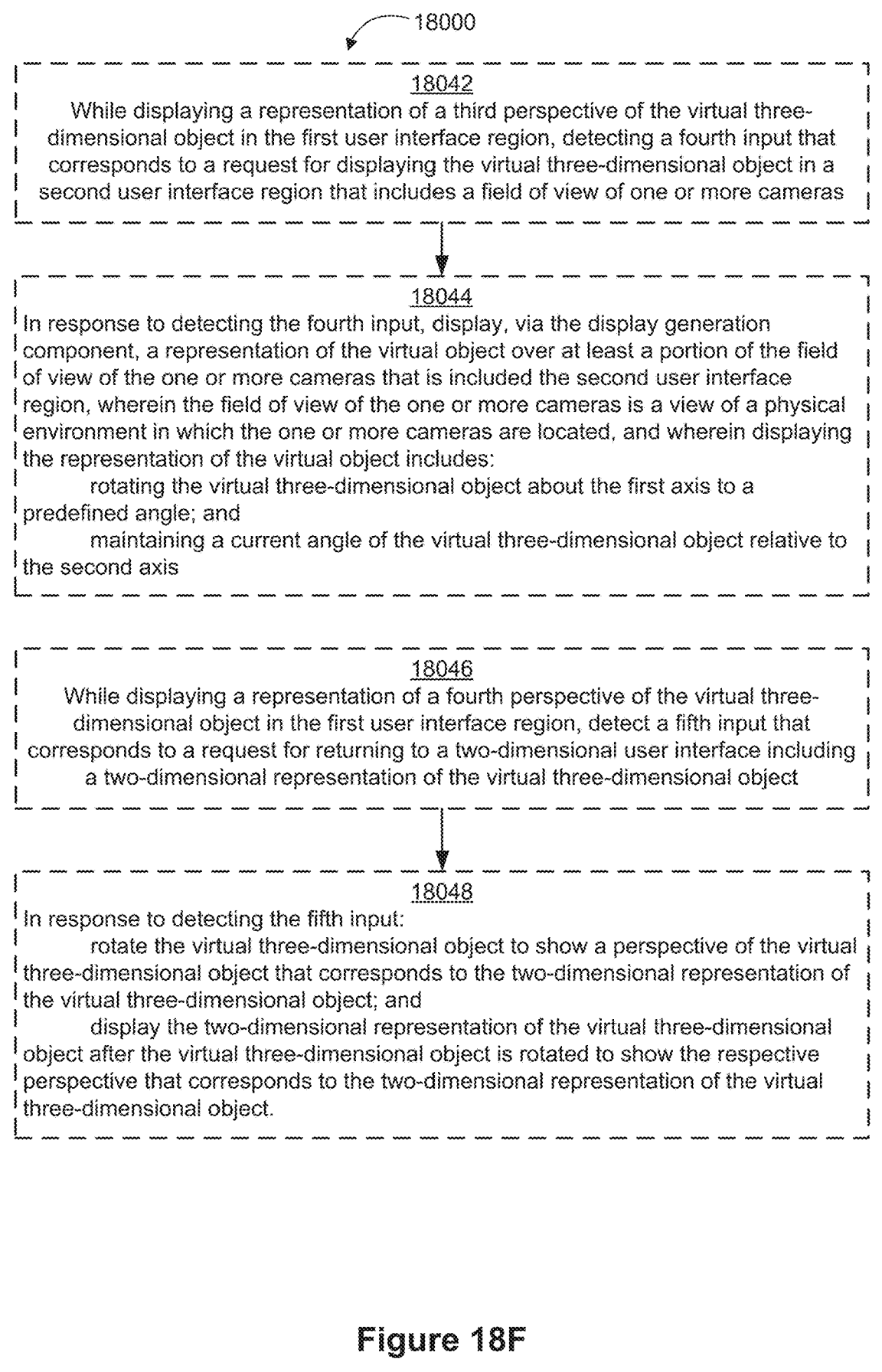

18042
While displaying a representation of a third perspective of the virtual three-dimensional object in the first user interface region, detecting a fourth input that corresponds to a request for displaying the virtual three-dimensional object in a second user interface region that includes a field of view of one or more cameras 18044
In response to detecting the fourth input, display, via the display generation component, a representation of the virtual object over at least a portion of the field of view of the one or more cameras that is included the second user interface region, wherein the field of view of the one or more cameras is a view of a physical environment in which the one or more cameras are located, and wherein displaying the representation of the virtual object includes:
rotating the virtual three-dimensional object about the first axis to a predefined angle; and
maintaining a current angle of the virtual three-dimensional object relative to the second axis 18046
While displaying a representation of a fourth perspective of the virtual three-dimensional object in the first user interface region, detect a fifth input that corresponds to a request for returning to a two-dimensional user interface including a two-dimensional representation of the virtual three-dimensional object 18048
In response to detecting the fifth input:
rotate the virtual three-dimensional object to show a perspective of the virtual three-dimensional object that corresponds to the two-dimensional representation of the virtual three-dimensional object; and
display the two-dimensional representation of the virtual three-dimensional object after the virtual three-dimensional object is rotated to show the respective perspective that corresponds to the two-dimensional representation of the virtual three-dimensional object.

Figure 18H:
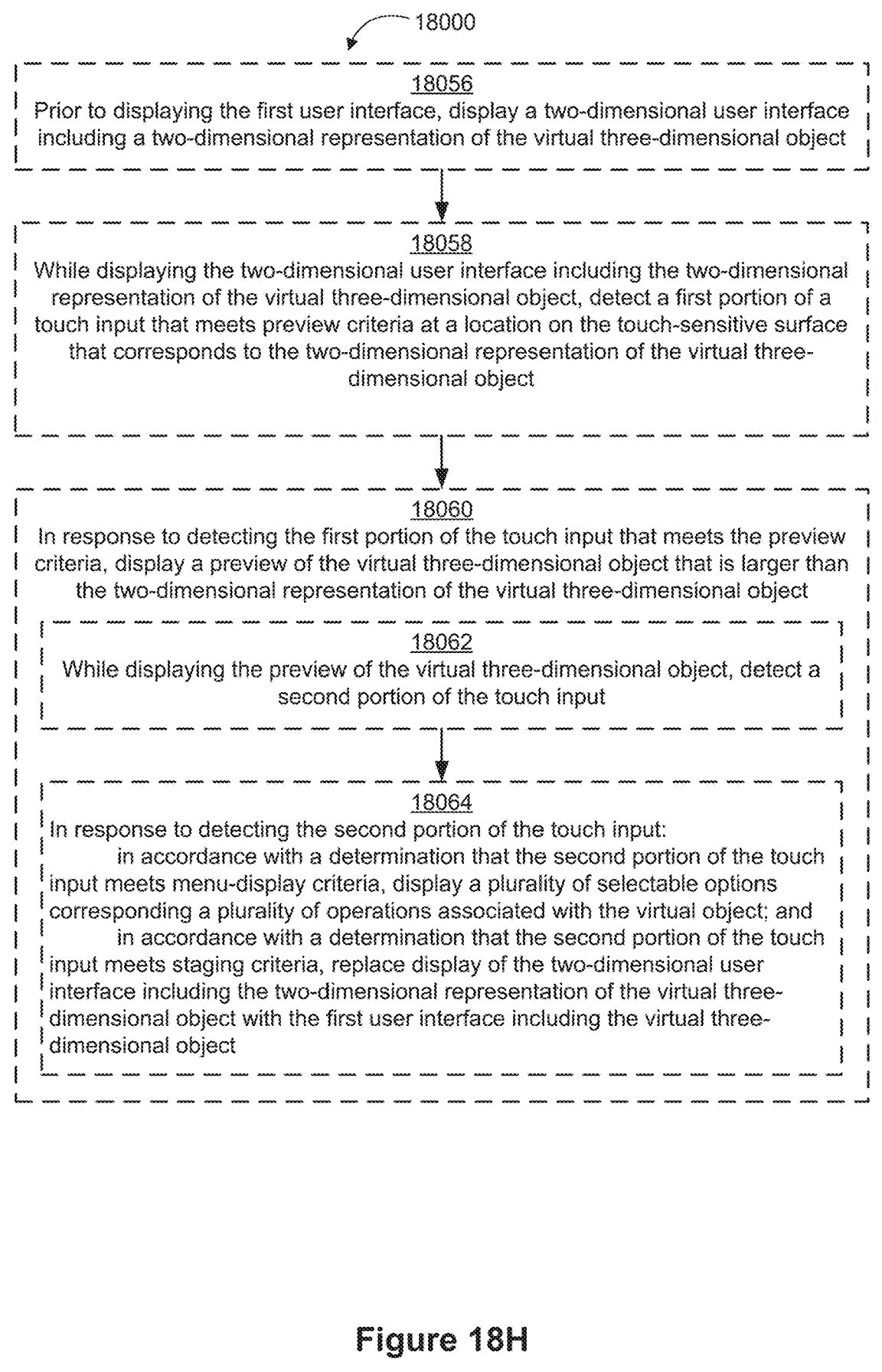

18056
Prior to displaying the first user interface, display a two-dimensional user interface including a two-dimensional representation of the virtual three-dimensional object 18058
While displaying the two-dimensional user interface including the two-dimensional representation of the virtual three-dimensional object, detect a first portion of a touch input that meets preview criteria at a location on the touch-sensitive surface that corresponds to the two-dimensional representation of the virtual three-dimensional object 18060
In response to detecting the first portion of the touch input that meets the preview criteria, display a preview of the virtual three-dimensional object that is larger than the two-dimensional representation of the virtual three-dimensional object 18062
While displaying the preview of the virtual three-dimensional object, detect a second portion of the touch input 18064
In response to detecting the second portion of the touch input:
in accordance with a determination that the second portion of the touch input meets menu-display criteria, display a plurality of selectable options corresponding a plurality of operations associated with the virtual object; and
in accordance with a determination that the second portion of the touch input meets staging criteria, replace display of the two-dimensional user interface including the two-dimensional representation of the virtual three-dimensional object with the first user interface including the virtual three-dimensional object

Figure 18I:
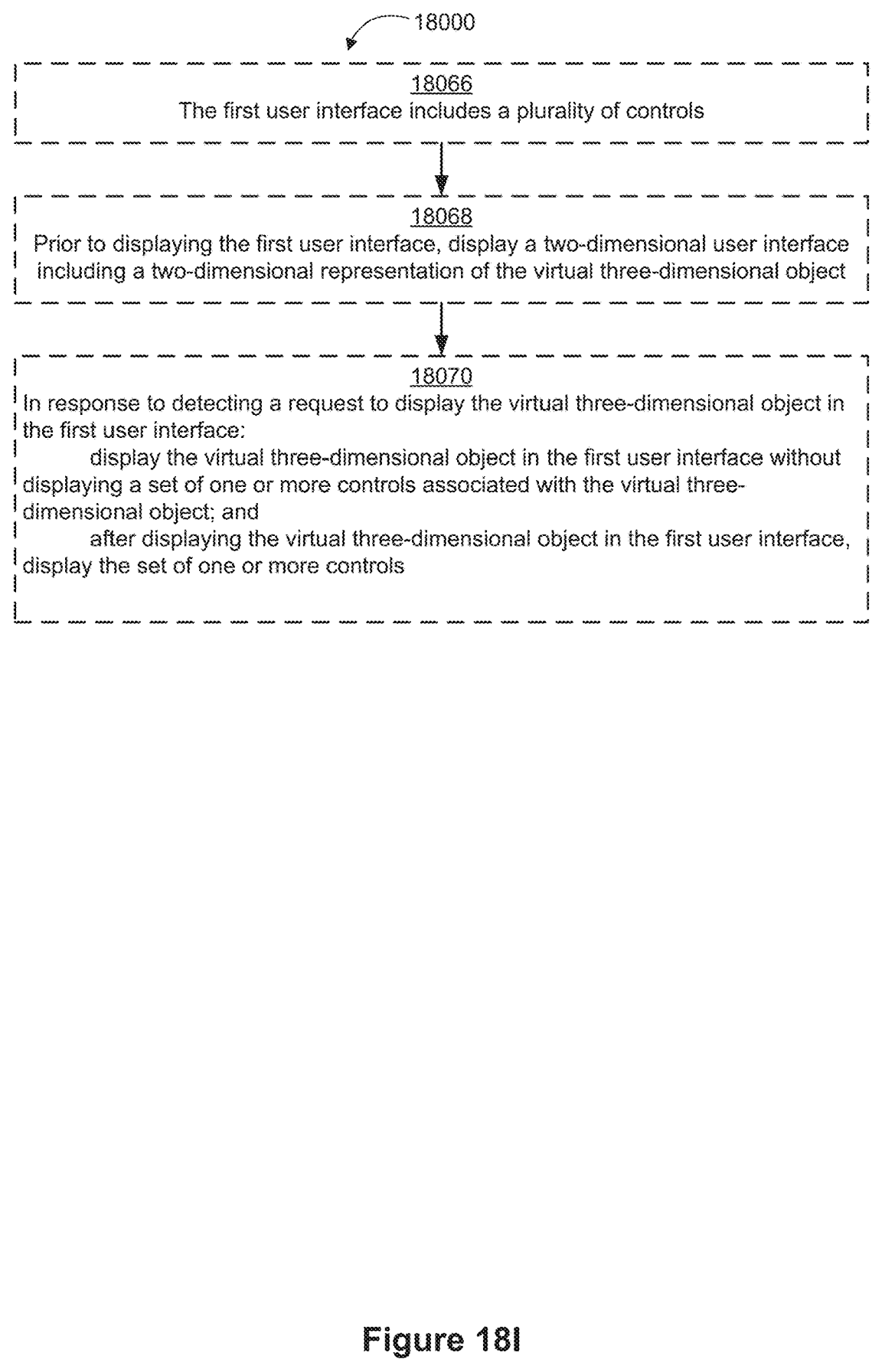

18066
The first user interface includes a plurality of controls

18068
Prior to displaying the first user interface, display a two-dimensional user interface including a two-dimensional representation of the virtual three-dimensional object 18070
In response to detecting a request to display the virtual three-dimensional object in the first user interface:
display the virtual three-dimensional object in the first user interface without displaying a set of one or more controls associated with the virtual three-dimensional object; and
after displaying the virtual three-dimensional object in the first user interface, display the set of one or more controls

Figure 19A:
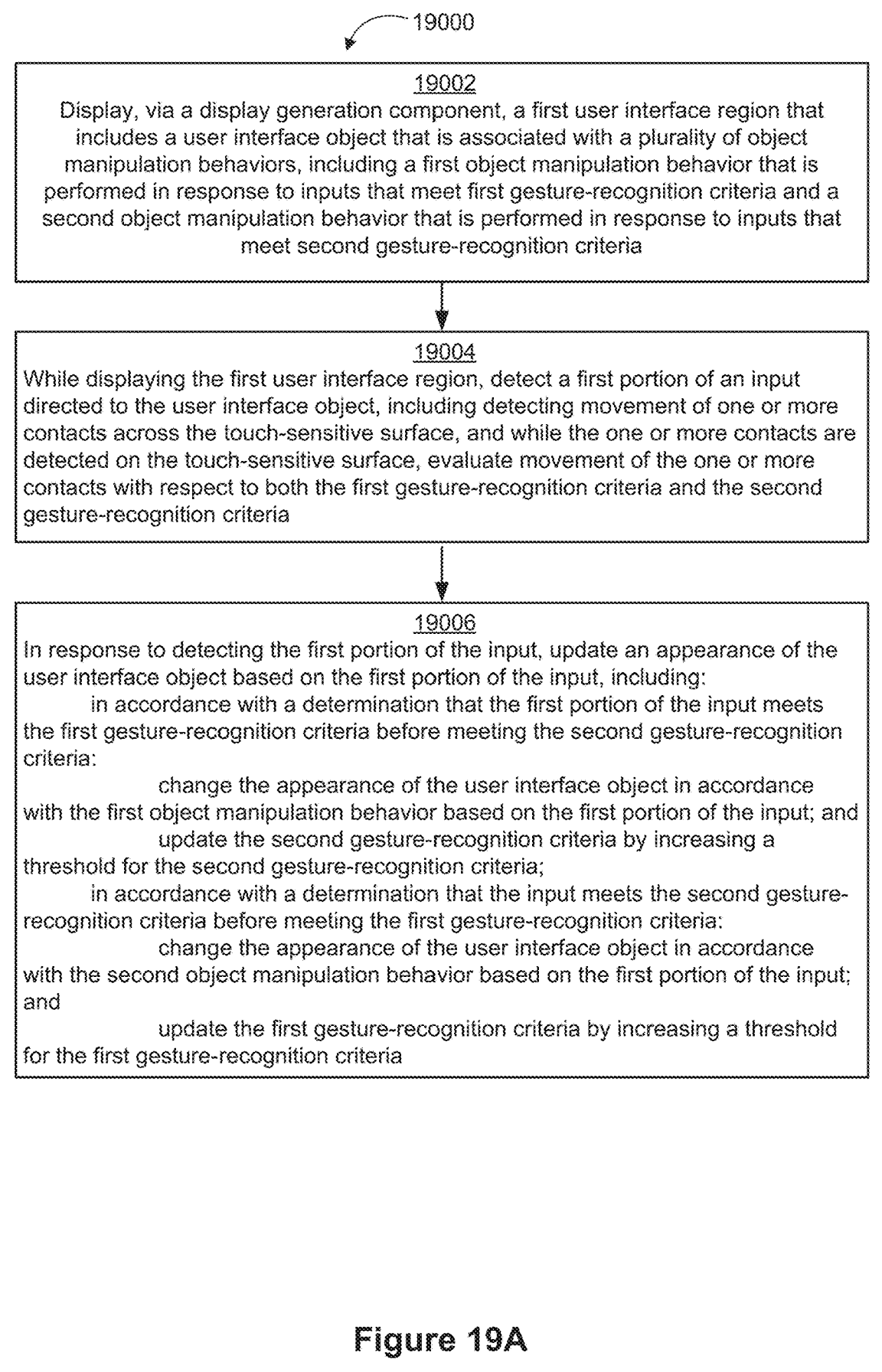

19002
Display, via a display generation component, a first user interface region that includes a user interface object that is associated with a plurality of object manipulation behaviors, including a first object manipulation behavior that is performed in response to inputs that meet first gesture-recognition criteria and a second object manipulation behavior that is performed in response to inputs that meet second gesture-recognition criteria

↓

19004
While displaying the first user interface region, detect a first portion of an input directed to the user interface object, including detecting movement of one or more contacts across the touch-sensitive surface, and while the one or more contacts are detected on the touch-sensitive surface, evaluate movement of the one or more contacts with respect to both the first gesture-recognition criteria and the second gesture-recognition criteria

↓

19006
In response to detecting the first portion of the input, update an appearance of the user interface object based on the first portion of the input, including:

in accordance with a determination that the first portion of the input meets the first gesture-recognition criteria before meeting the second gesture-recognition criteria:

change the appearance of the user interface object in accordance with the first object manipulation behavior based on the first portion of the input; and update the second gesture-recognition criteria by increasing a threshold for the second gesture-recognition criteria;

in accordance with a determination that the input meets the second gesture-recognition criteria before meeting the first gesture-recognition criteria:

change the appearance of the user interface object in accordance with the second object manipulation behavior based on the first portion of the input; and update the first gesture-recognition criteria by increasing a threshold for the first gesture-recognition criteria

Figure 19B:
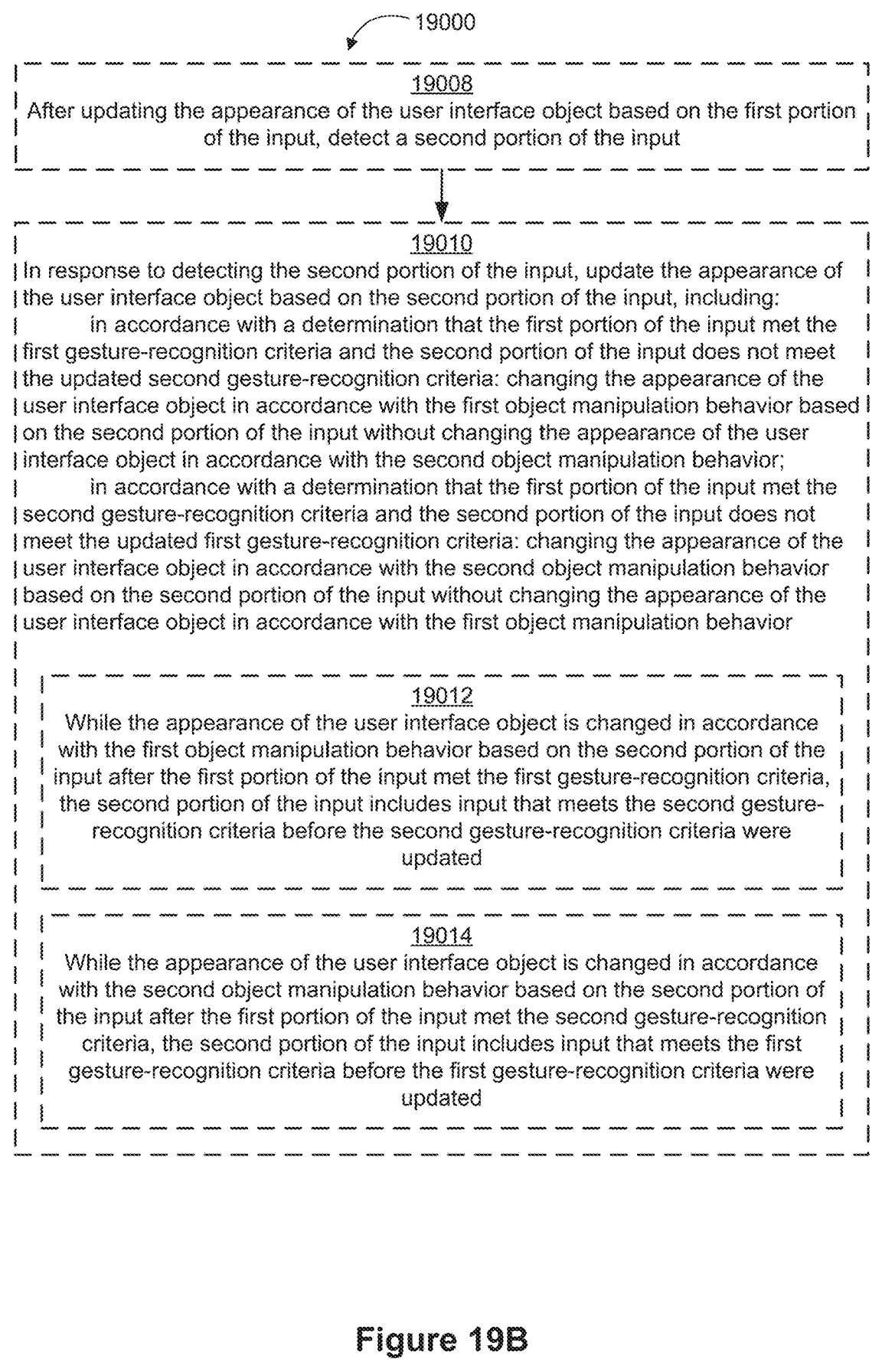

19008
After updating the appearance of the user interface object based on the first portion of the input, detect a second portion of the input 19010
In response to detecting the second portion of the input, update the appearance of the user interface object based on the second portion of the input, including:

in accordance with a determination that the first portion of the input met the first gesture-recognition criteria and the second portion of the input does not meet the updated second gesture-recognition criteria: changing the appearance of the user interface object in accordance with the first object manipulation behavior based on the second portion of the input without changing the appearance of the user interface object in accordance with the second object manipulation behavior;

in accordance with a determination that the first portion of the input met the second gesture-recognition criteria and the second portion of the input does not meet the updated first gesture-recognition criteria: changing the appearance of the user interface object in accordance with the second object manipulation behavior based on the second portion of the input without changing the appearance of the user interface object in accordance with the first object manipulation behavior 19012
While the appearance of the user interface object is changed in accordance with the first object manipulation behavior based on the second portion of the input after the first portion of the input met the first gesture-recognition criteria, the second portion of the input includes input that meets the second gesture-recognition criteria before the second gesture-recognition criteria were updated 19014
While the appearance of the user interface object is changed in accordance with the second object manipulation behavior based on the second portion of the input after the first portion of the input met the second gesture-recognition criteria, the second portion of the input includes input that meets the first gesture-recognition criteria before the first gesture-recognition criteria were updated

Figure 19C:
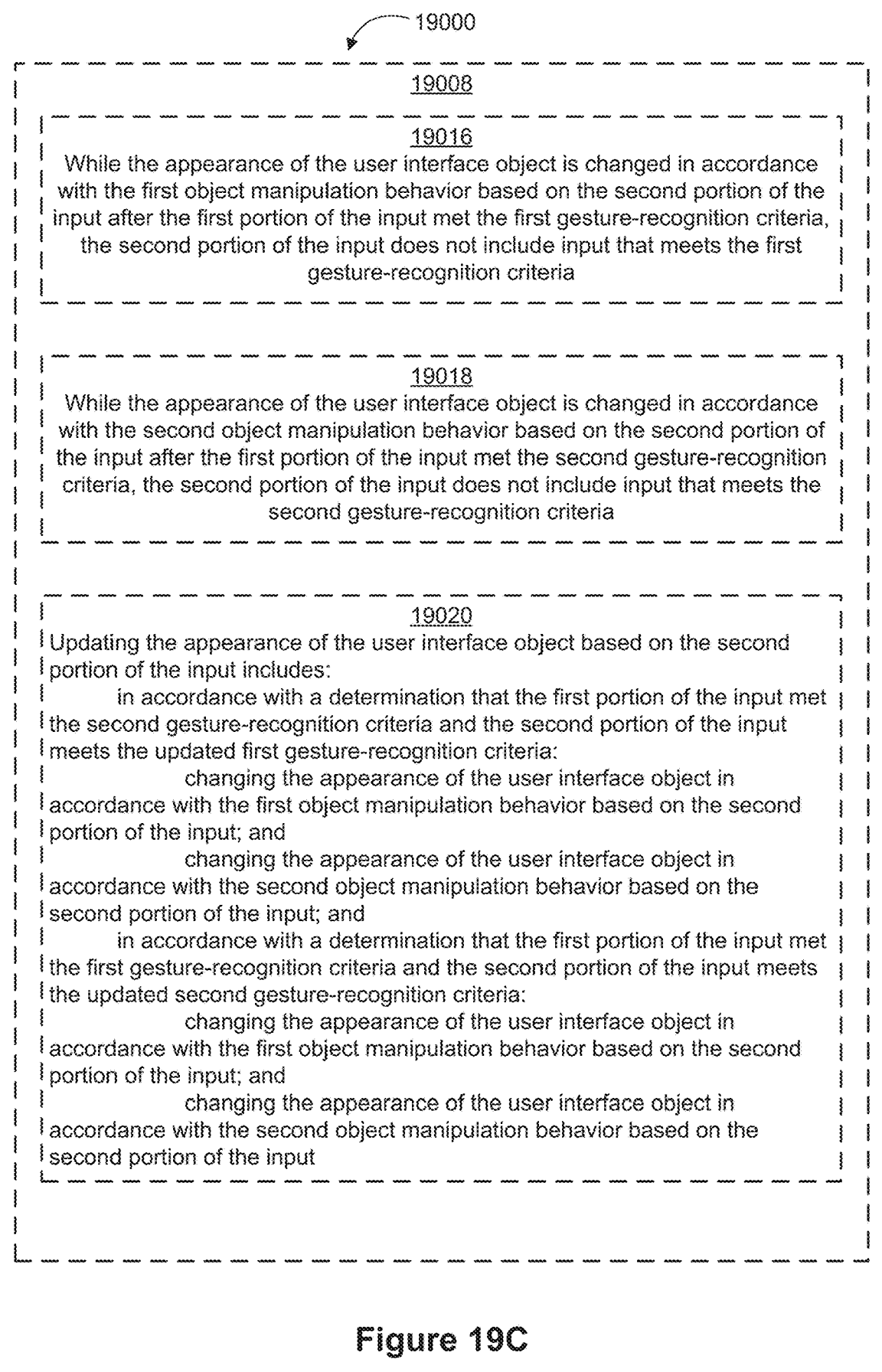

19016
While the appearance of the user interface object is changed in accordance with the first object manipulation behavior based on the second portion of the input after the first portion of the input met the first gesture-recognition criteria, the second portion of the input does not include input that meets the first gesture-recognition criteria 19018
While the appearance of the user interface object is changed in accordance with the second object manipulation behavior based on the second portion of the input after the first portion of the input met the second gesture-recognition criteria, the second portion of the input does not include input that meets the second gesture-recognition criteria 19020
Updating the appearance of the user interface object based on the second portion of the input includes:

in accordance with a determination that the first portion of the input met the second gesture-recognition criteria and the second portion of the input meets the updated first gesture-recognition criteria:

changing the appearance of the user interface object in accordance with the first object manipulation behavior based on the second portion of the input; and changing the appearance of the user interface object in accordance with the second object manipulation behavior based on the second portion of the input; and in accordance with a determination that the first portion of the input met the first gesture-recognition criteria and the second portion of the input meets the updated second gesture-recognition criteria:

changing the appearance of the user interface object in accordance with the first object manipulation behavior based on the second portion of the input; and changing the appearance of the user interface object in accordance with the second object manipulation behavior based on the second portion of the input

Figure 19D:
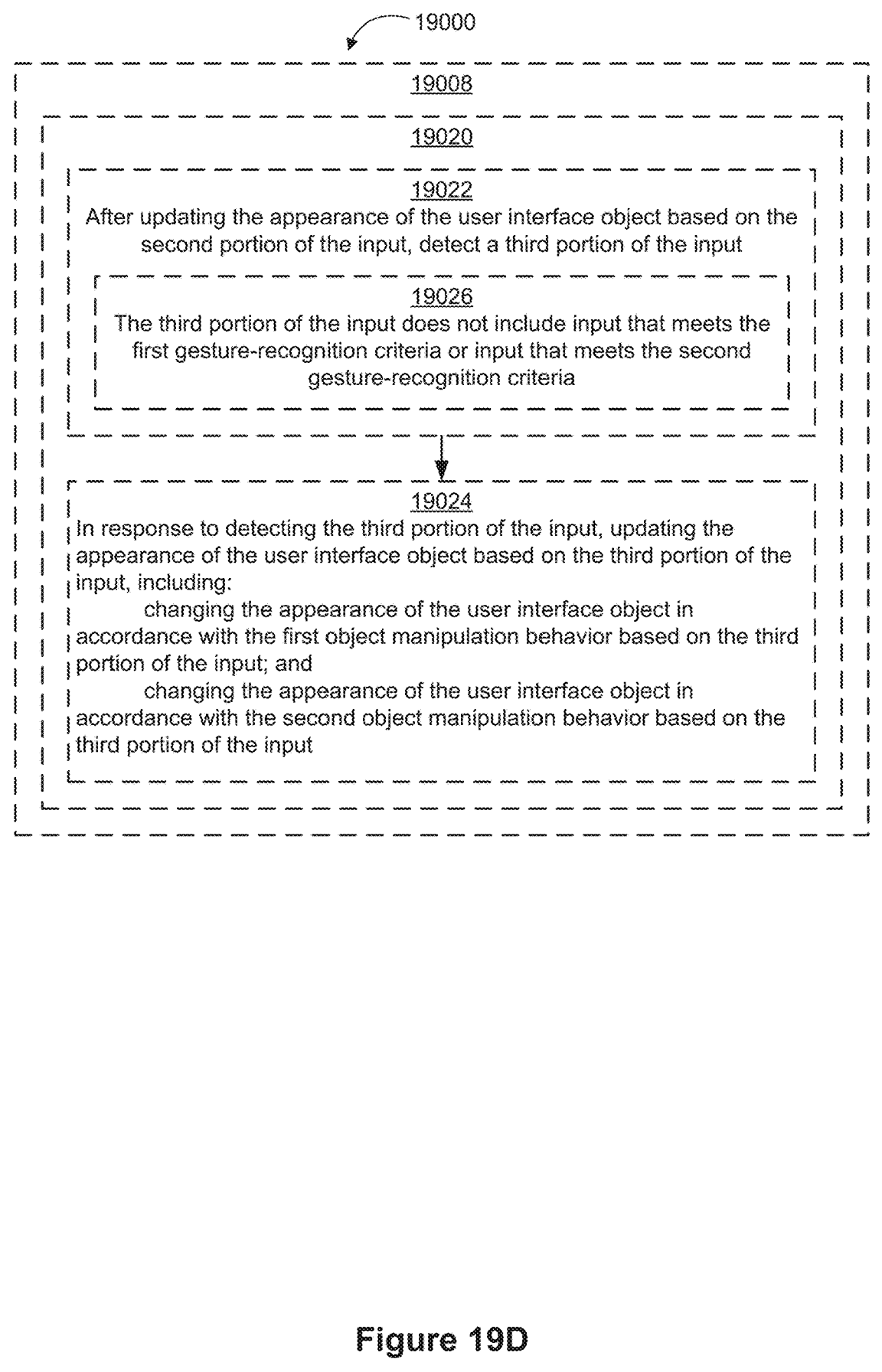

19022
After updating the appearance of the user interface object based on the second portion of the input, detect a third portion of the input 19026
The third portion of the input does not include input that meets the first gesture-recognition criteria or input that meets the second gesture-recognition criteria 19024
In response to detecting the third portion of the input, updating the appearance of the user interface object based on the third portion of the input, including:

changing the appearance of the user interface object in accordance with the first object manipulation behavior based on the third portion of the input; and changing the appearance of the user interface object in accordance with the second object manipulation behavior based on the third portion of the input

Figure 19E:
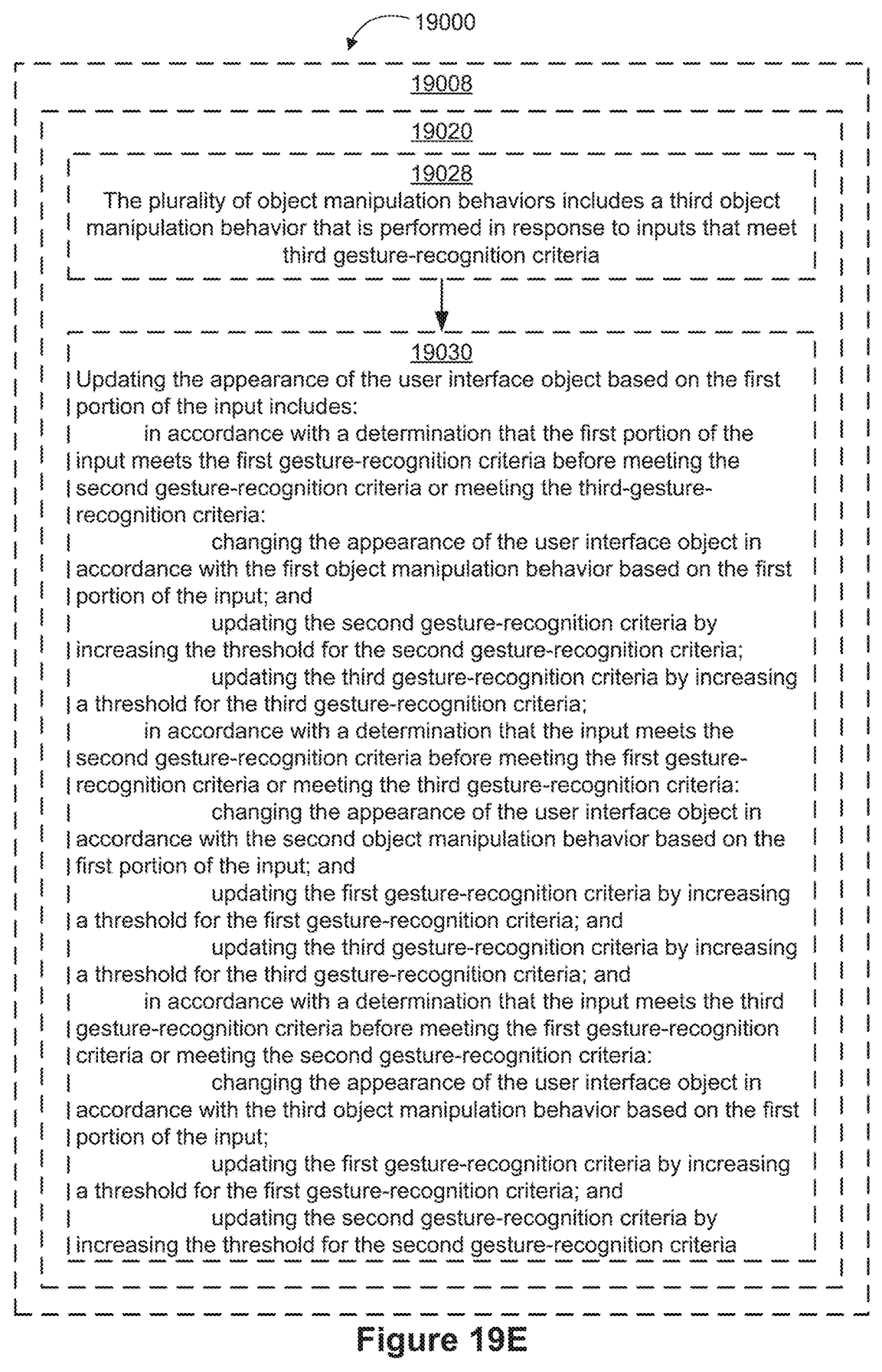

19028
The plurality of object manipulation behaviors includes a third object manipulation behavior that is performed in response to inputs that meet third gesture-recognition criteria

↓

19030
Updating the appearance of the user interface object based on the first portion of the input includes:

in accordance with a determination that the first portion of the input meets the first gesture-recognition criteria before meeting the second gesture-recognition criteria or meeting the third-gesture-recognition criteria:

changing the appearance of the user interface object in accordance with the first object manipulation behavior based on the first portion of the input; and updating the second gesture-recognition criteria by increasing the threshold for the second gesture-recognition criteria;

updating the third gesture-recognition criteria by increasing a threshold for the third gesture-recognition criteria;

in accordance with a determination that the input meets the second gesture-recognition criteria before meeting the first gesture-recognition criteria or meeting the third gesture-recognition criteria:

changing the appearance of the user interface object in accordance with the second object manipulation behavior based on the first portion of the input; and updating the first gesture-recognition criteria by increasing a threshold for the first gesture-recognition criteria; and updating the third gesture-recognition criteria by increasing a threshold for the third gesture-recognition criteria; and in accordance with a determination that the input meets the third gesture-recognition criteria before meeting the first gesture-recognition criteria or meeting the second gesture-recognition criteria:

changing the appearance of the user interface object in accordance with the third object manipulation behavior based on the first portion of the input;

updating the first gesture-recognition criteria by increasing a threshold for the first gesture-recognition criteria; and updating the second gesture-recognition criteria by increasing the threshold for the second gesture-recognition criteria

Figure 19F:
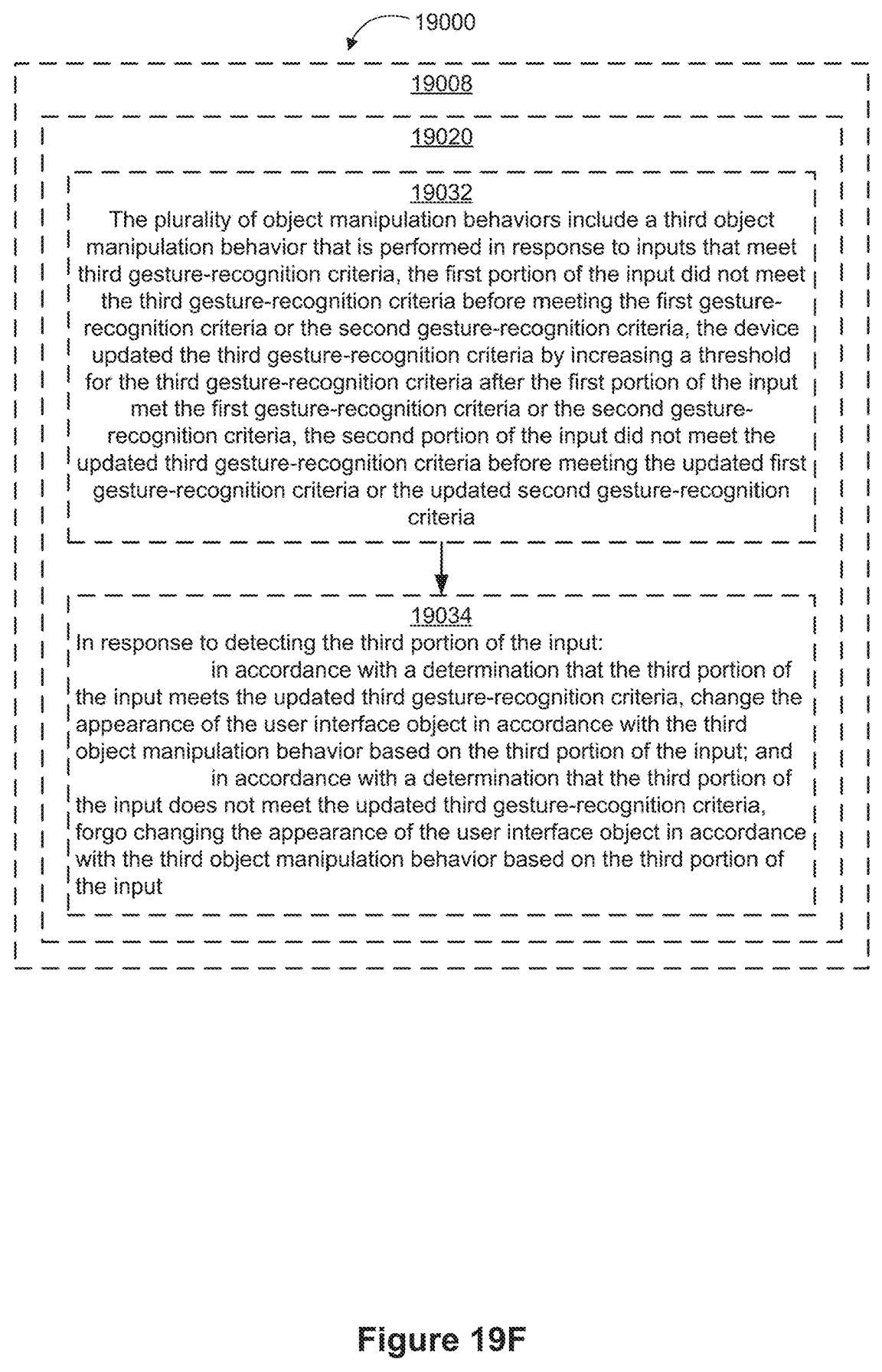

The plurality of object manipulation behaviors include a third object manipulation behavior that is performed in response to inputs that meet third gesture-recognition criteria, the first portion of the input did not meet the third gesture-recognition criteria before meeting the first gesture-recognition criteria or the second gesture-recognition criteria, the device updated the third gesture-recognition criteria by increasing a threshold for the third gesture-recognition criteria after the first portion of the input met the first gesture-recognition criteria or the second gesture-recognition criteria, the second portion of the input did not meet the updated third gesture-recognition criteria before meeting the updated first gesture-recognition criteria or the updated second gesture-recognition criteria

19034

In response to detecting the third portion of the input:

in accordance with a determination that the third portion of the input meets the updated third gesture-recognition criteria, change the appearance of the user interface object in accordance with the third object manipulation behavior based on the third portion of the input; and in accordance with a determination that the third portion of the input does not meet the updated third gesture-recognition criteria, forgo changing the appearance of the user interface object in accordance with the third object manipulation behavior based on the third portion of the input

Figure 19G:
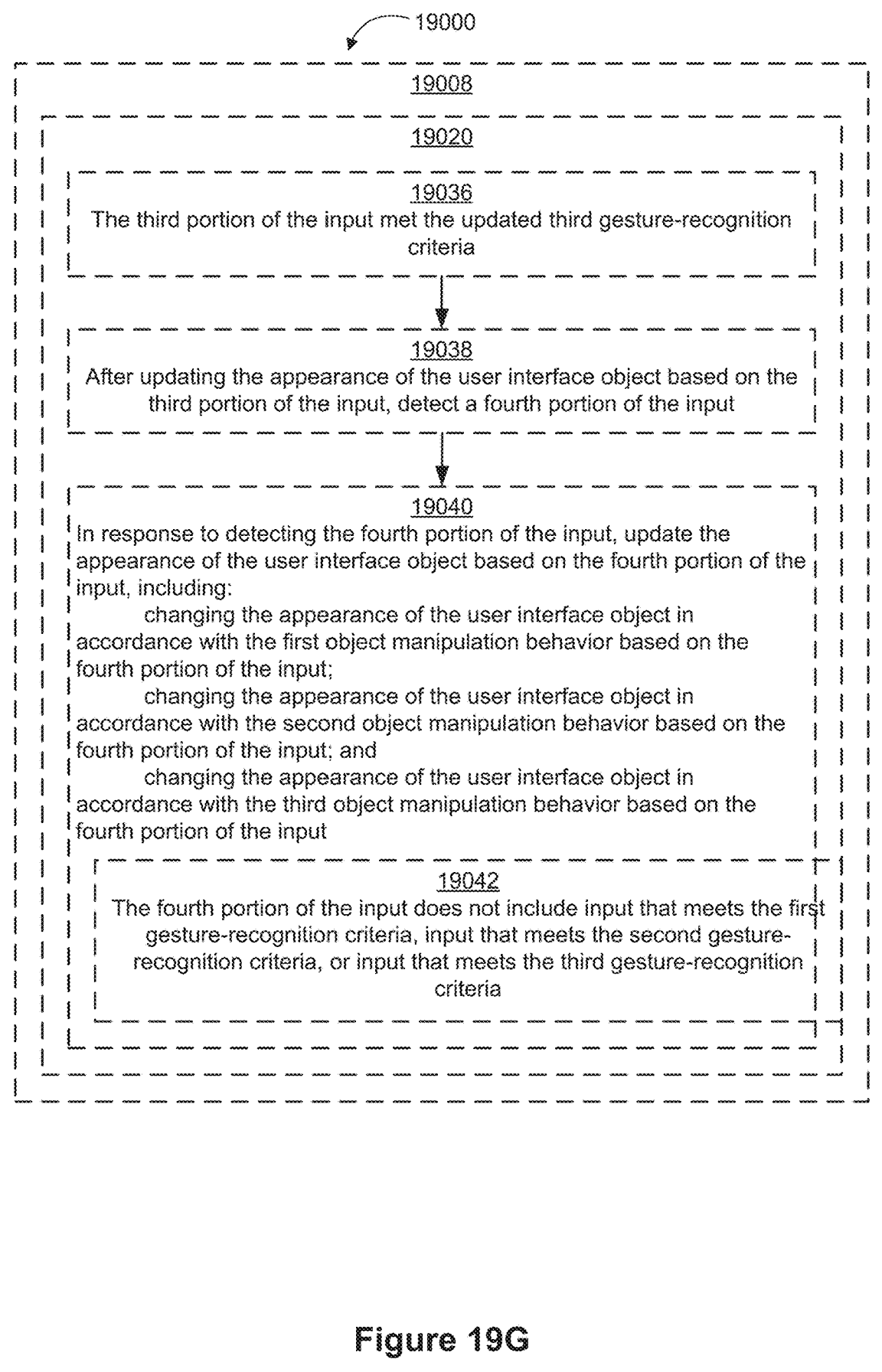

19036
The third portion of the input met the updated third gesture-recognition criteria 19038
After updating the appearance of the user interface object based on the third portion of the input, detect a fourth portion of the input 19040
In response to detecting the fourth portion of the input, update the appearance of the user interface object based on the fourth portion of the input, including:

changing the appearance of the user interface object in accordance with the first object manipulation behavior based on the fourth portion of the input;

changing the appearance of the user interface object in accordance with the second object manipulation behavior based on the fourth portion of the input; and changing the appearance of the user interface object in accordance with the third object manipulation behavior based on the fourth portion of the input 19042
The fourth portion of the input does not include input that meets the first gesture-recognition criteria, input that meets the second gesture-recognition criteria, or input that meets the third gesture-recognition criteria

Figure 19H:
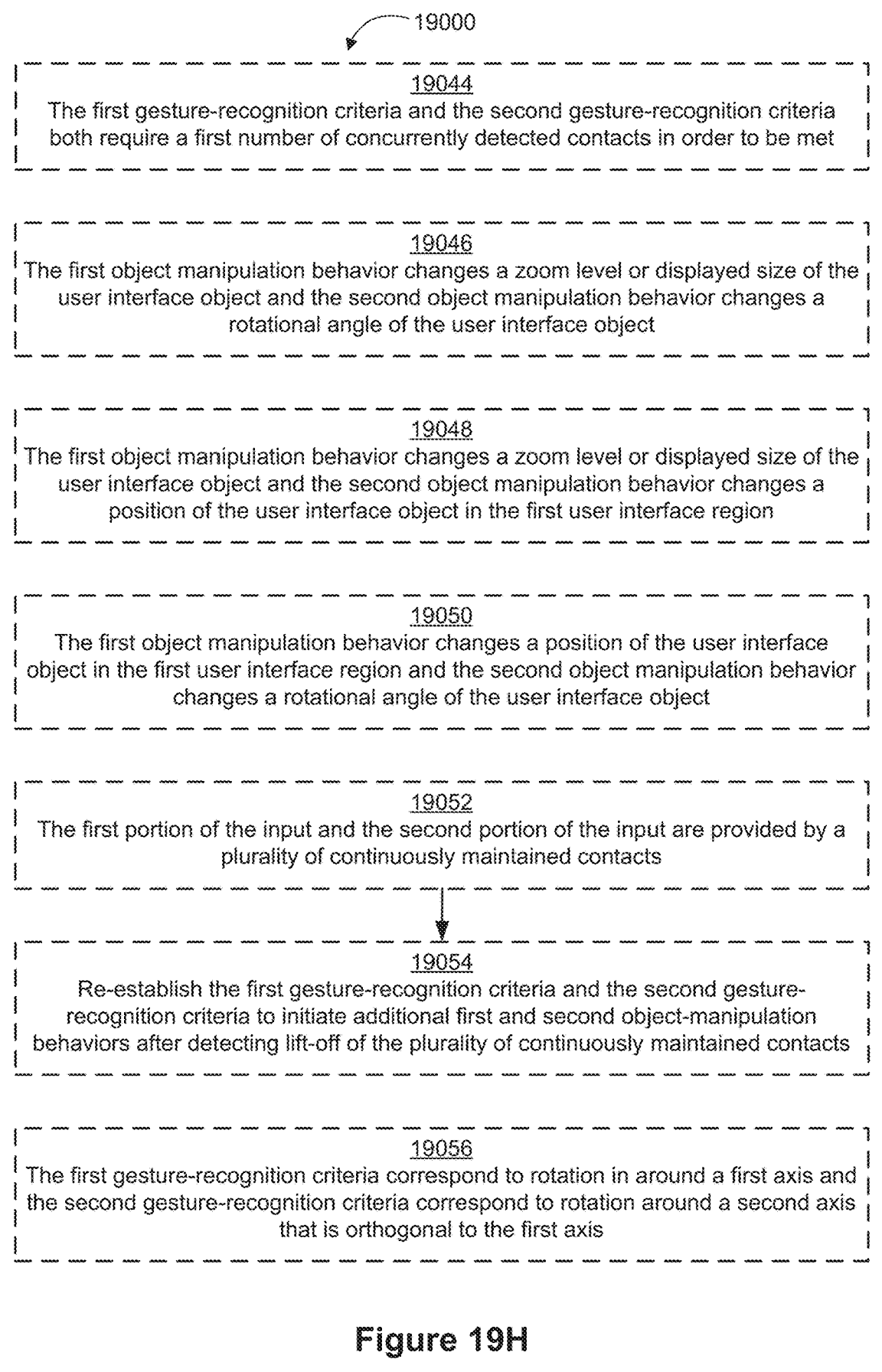

19044
The first gesture-recognition criteria and the second gesture-recognition criteria both require a first number of concurrently detected contacts in order to be met 19046
The first object manipulation behavior changes a zoom level or displayed size of the user interface object and the second object manipulation behavior changes a rotational angle of the user interface object 19048
The first object manipulation behavior changes a zoom level or displayed size of the user interface object and the second object manipulation behavior changes a position of the user interface object in the first user interface region 19050
The first object manipulation behavior changes a position of the user interface object in the first user interface region and the second object manipulation behavior changes a rotational angle of the user interface object 19052
The first portion of the input and the second portion of the input are provided by a plurality of continuously maintained contacts 19054
Re-establish the first gesture-recognition criteria and the second gesture-recognition criteria to initiate additional first and second object-manipulation behaviors after detecting lift-off of the plurality of continuously maintained contacts 19056
The first gesture-recognition criteria correspond to rotation in around a first axis and the second gesture-recognition criteria correspond to rotation around a second axis that is orthogonal to the first axis

Figure 20A:
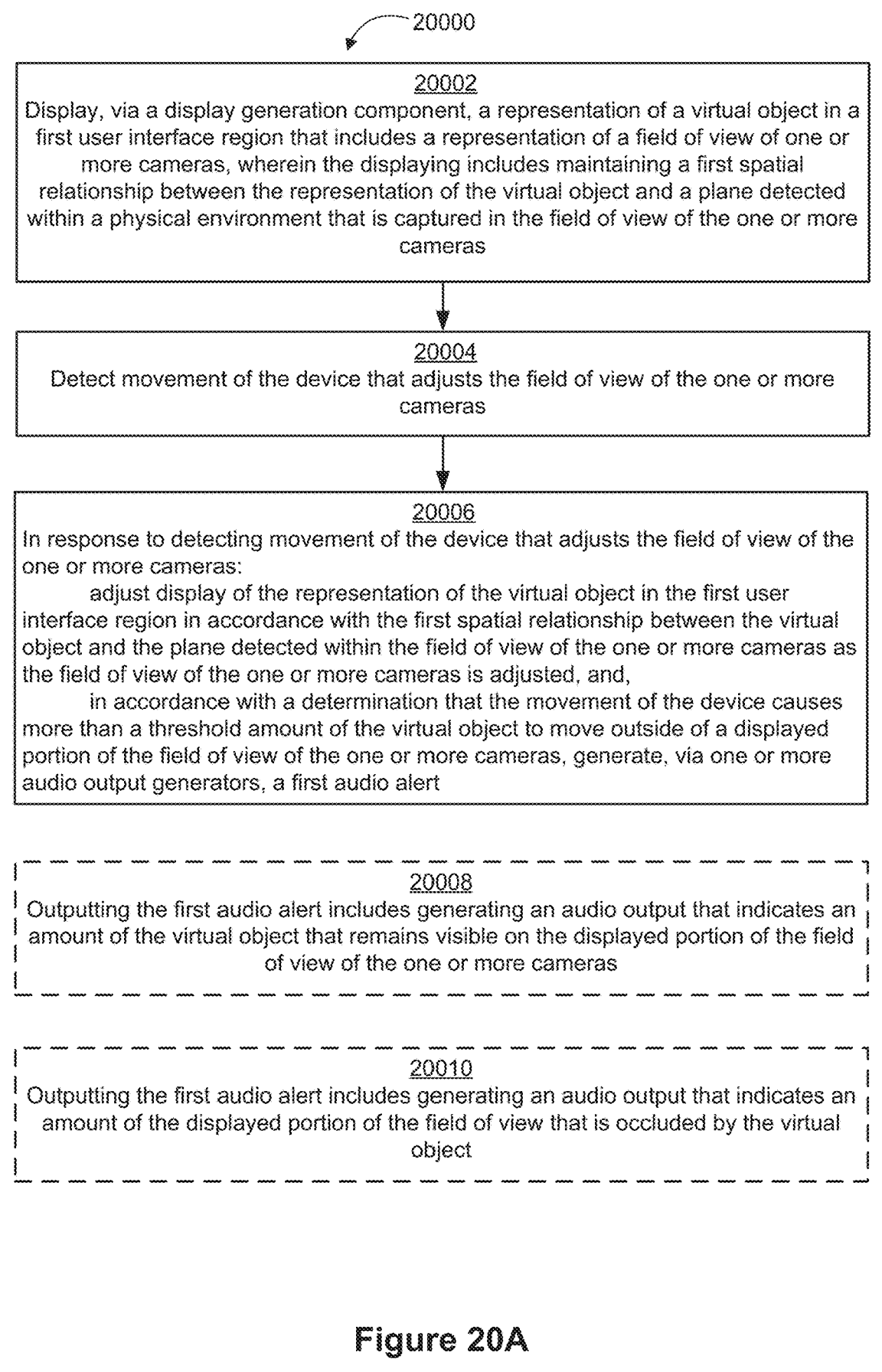

20002
Display, via a display generation component, a representation of a virtual object in a first user interface region that includes a representation of a field of view of one or more cameras, wherein the displaying includes maintaining a first spatial relationship between the representation of the virtual object and a plane detected within a physical environment that is captured in the field of view of the one or more cameras

↓

20004
Detect movement of the device that adjusts the field of view of the one or more cameras

↓

20006
In response to detecting movement of the device that adjusts the field of view of the one or more cameras:
adjust display of the representation of the virtual object in the first user interface region in accordance with the first spatial relationship between the virtual object and the plane detected within the field of view of the one or more cameras as the field of view of the one or more cameras is adjusted, and,
in accordance with a determination that the movement of the device causes more than a threshold amount of the virtual object to move outside of a displayed portion of the field of view of the one or more cameras, generate, via one or more audio output generators, a first audio alert 20008
Outputting the first audio alert includes generating an audio output that indicates an amount of the virtual object that remains visible on the displayed portion of the field of view of the one or more cameras 20010
Outputting the first audio alert includes generating an audio output that indicates an amount of the displayed portion of the field of view that is occluded by the virtual object

Figure 20B:
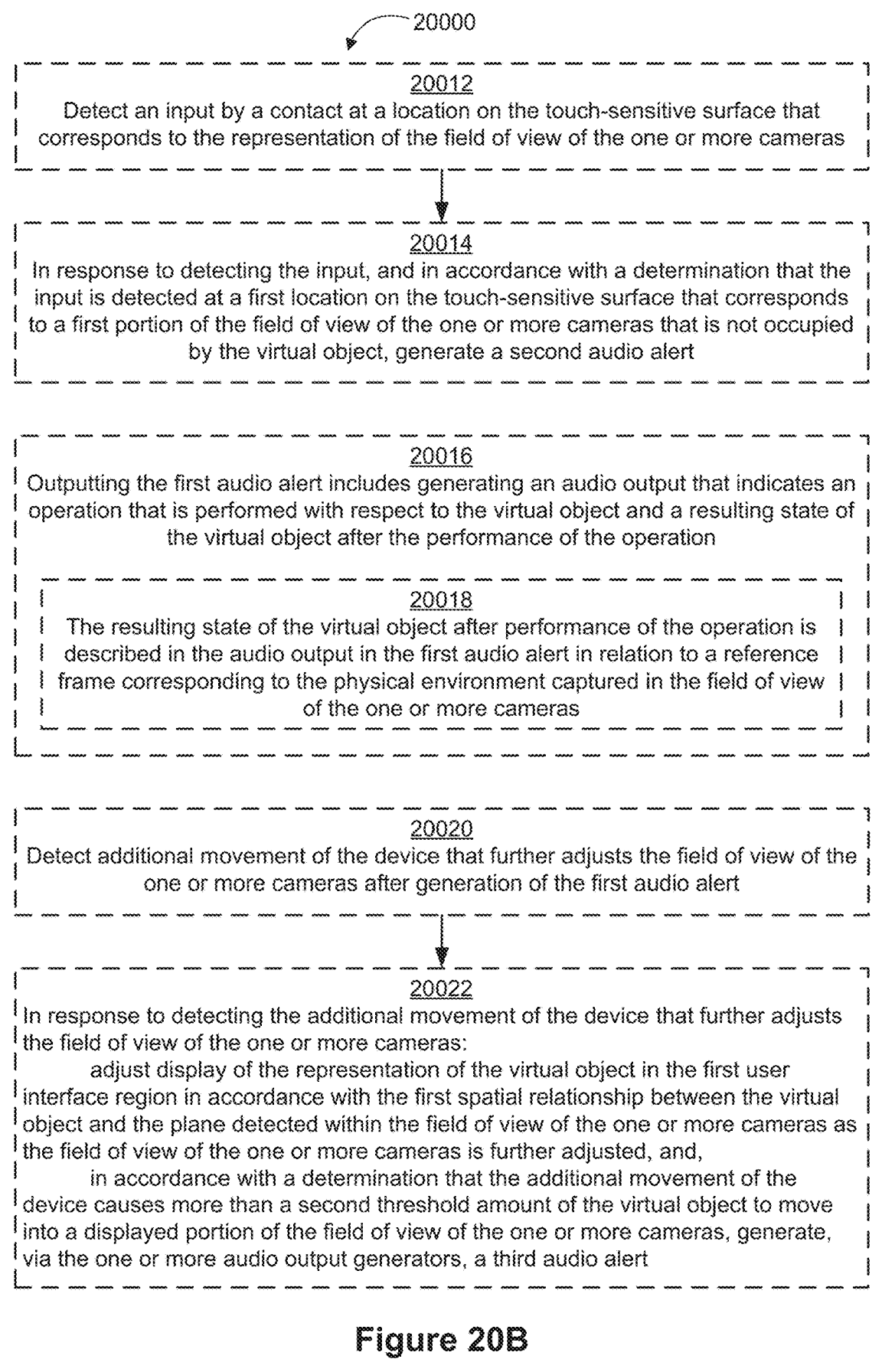

20012
Detect an input by a contact at a location on the touch-sensitive surface that corresponds to the representation of the field of view of the one or more cameras 20014
In response to detecting the input, and in accordance with a determination that the input is detected at a first location on the touch-sensitive surface that corresponds to a first portion of the field of view of the one or more cameras that is not occupied by the virtual object, generate a second audio alert 20016
Outputting the first audio alert includes generating an audio output that indicates an operation that is performed with respect to the virtual object and a resulting state of the virtual object after the performance of the operation 20018
The resulting state of the virtual object after performance of the operation is described in the audio output in the first audio alert in relation to a reference frame corresponding to the physical environment captured in the field of view of the one or more cameras 20020
Detect additional movement of the device that further adjusts the field of view of the one or more cameras after generation of the first audio alert 20022
In response to detecting the additional movement of the device that further adjusts the field of view of the one or more cameras:

adjust display of the representation of the virtual object in the first user interface region in accordance with the first spatial relationship between the virtual object and the plane detected within the field of view of the one or more cameras as the field of view of the one or more cameras is further adjusted, and, in accordance with a determination that the additional movement of the device causes more than a second threshold amount of the virtual object to move into a displayed portion of the field of view of the one or more cameras, generate, via the one or more audio output generators, a third audio alert

Figure 20C:
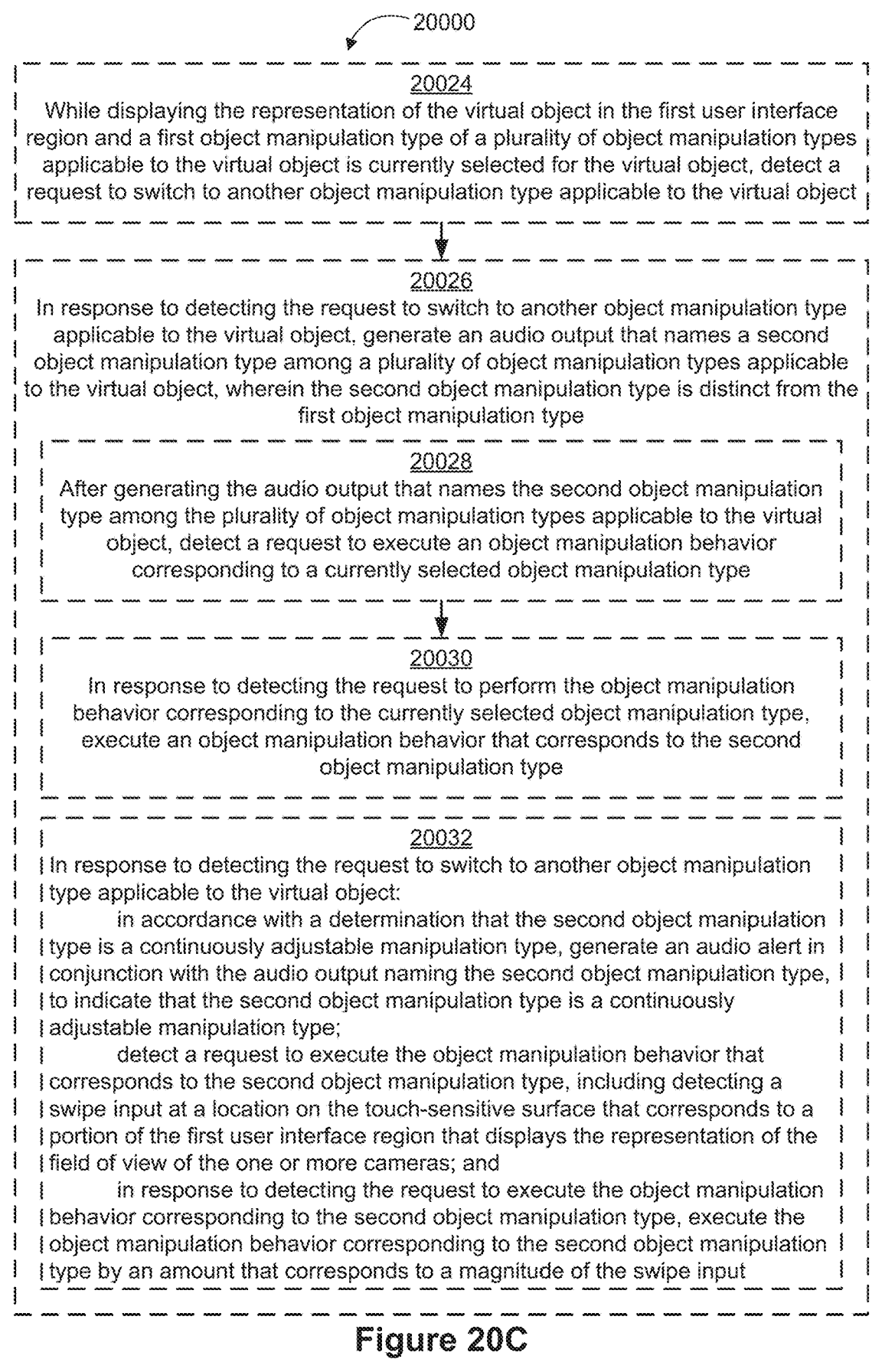

20024
While displaying the representation of the virtual object in the first user interface region and a first object manipulation type of a plurality of object manipulation types applicable to the virtual object is currently selected for the virtual object, detect a request to switch to another object manipulation type applicable to the virtual object

↓

20026
In response to detecting the request to switch to another object manipulation type applicable to the virtual object, generate an audio output that names a second object manipulation type among a plurality of object manipulation types applicable to the virtual object, wherein the second object manipulation type is distinct from the first object manipulation type 20028
After generating the audio output that names the second object manipulation type among the plurality of object manipulation types applicable to the virtual object, detect a request to execute an object manipulation behavior corresponding to a currently selected object manipulation type

↓

20030
In response to detecting the request to perform the object manipulation behavior corresponding to the currently selected object manipulation type, execute an object manipulation behavior that corresponds to the second object manipulation type 20032
In response to detecting the request to switch to another object manipulation type applicable to the virtual object:

in accordance with a determination that the second object manipulation type is a continuously adjustable manipulation type, generate an audio alert in conjunction with the audio output naming the second object manipulation type, to indicate that the second object manipulation type is a continuously adjustable manipulation type;

detect a request to execute the object manipulation behavior that corresponds to the second object manipulation type, including detecting a swipe input at a location on the touch-sensitive surface that corresponds to a portion of the first user interface region that displays the representation of the field of view of the one or more cameras; and in response to detecting the request to execute the object manipulation behavior corresponding to the second object manipulation type, execute the object manipulation behavior corresponding to the second object manipulation type by an amount that corresponds to a magnitude of the swipe input

Figure 20D:
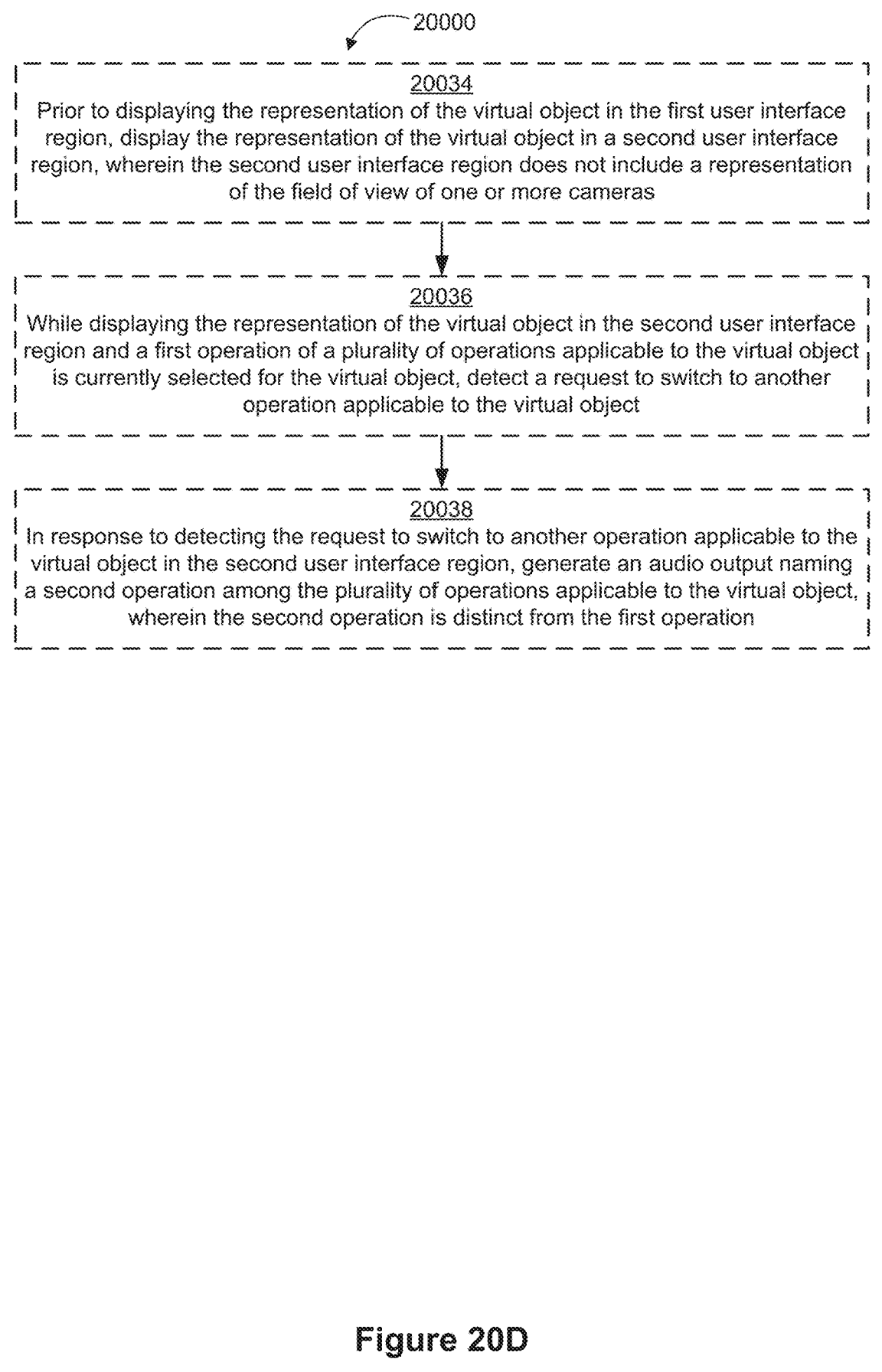

20034
Prior to displaying the representation of the virtual object in the first user interface region, display the representation of the virtual object in a second user interface region, wherein the second user interface region does not include a representation of the field of view of one or more cameras 20036
While displaying the representation of the virtual object in the second user interface region and a first operation of a plurality of operations applicable to the virtual object is currently selected for the virtual object, detect a request to switch to another operation applicable to the virtual object 20038
In response to detecting the request to switch to another operation applicable to the virtual object in the second user interface region, generate an audio output naming a second operation among the plurality of operations applicable to the virtual object, wherein the second operation is distinct from the first operation

Figure 20E:
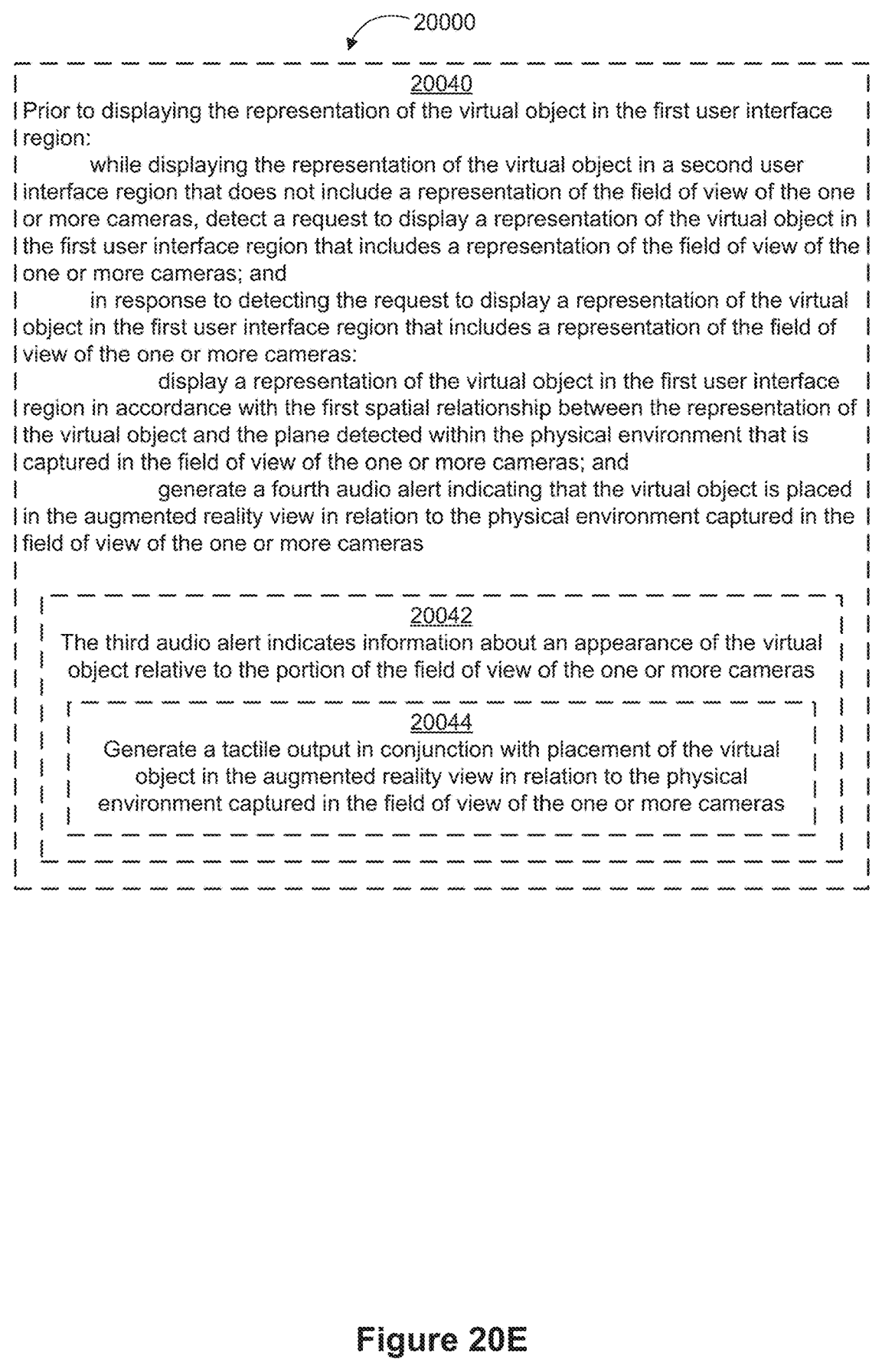

Prior to displaying the representation of the virtual object in the first user interface region:

while displaying the representation of the virtual object in a second user interface region that does not include a representation of the field of view of the one or more cameras, detect a request to display a representation of the virtual object in the first user interface region that includes a representation of the field of view of the one or more cameras; and in response to detecting the request to display a representation of the virtual object in the first user interface region that includes a representation of the field of view of the one or more cameras:

display a representation of the virtual object in the first user interface region in accordance with the first spatial relationship between the representation of the virtual object and the plane detected within the physical environment that is captured in the field of view of the one or more cameras; and generate a fourth audio alert indicating that the virtual object is placed in the augmented reality view in relation to the physical environment captured in the field of view of the one or more cameras

20042

The third audio alert indicates information about an appearance of the virtual object relative to the portion of the field of view of the one or more cameras

20044

Generate a tactile output in conjunction with placement of the virtual object in the augmented reality view in relation to the physical environment captured in the field of view of the one or more cameras

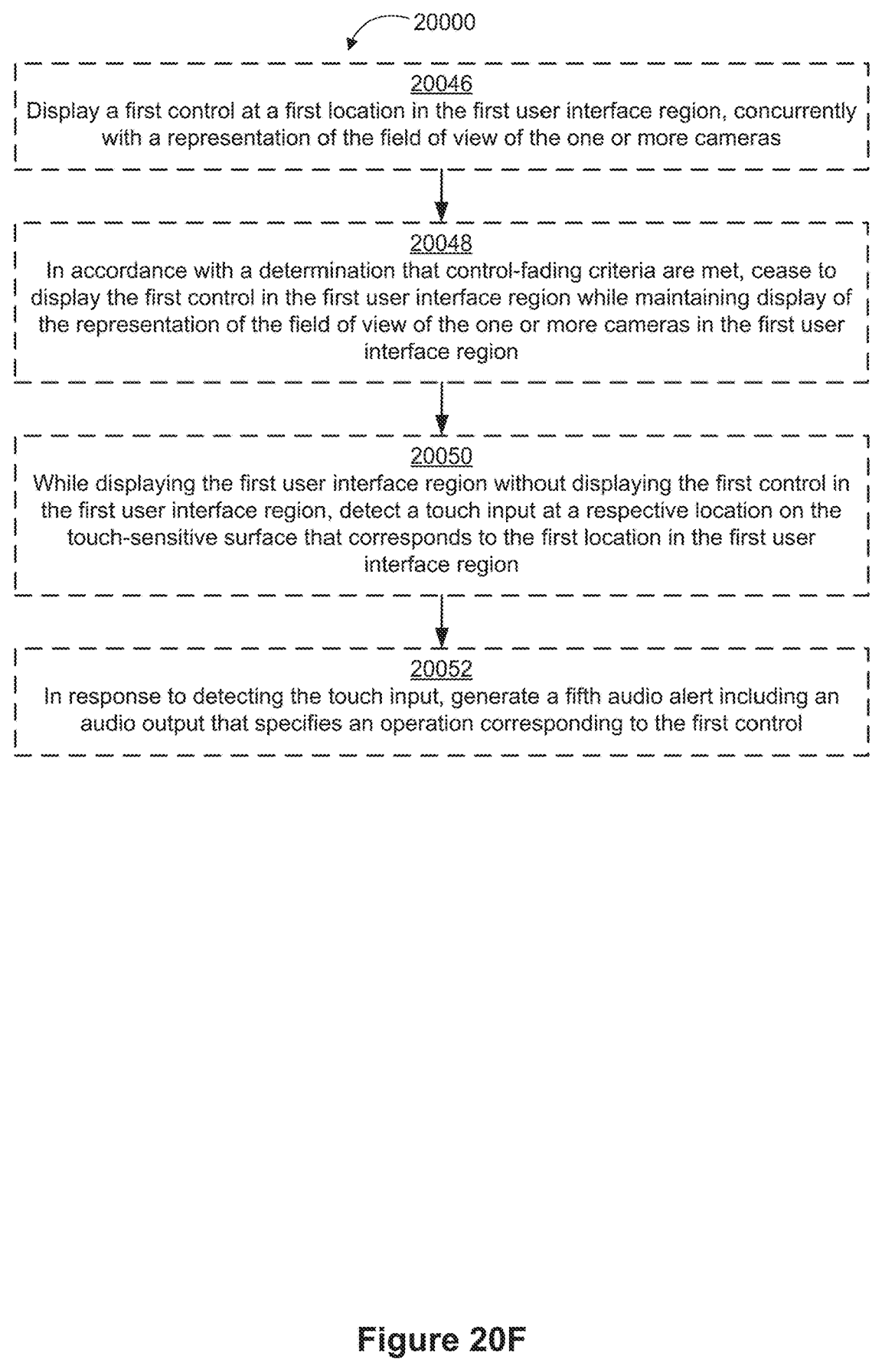

20046
Display a first control at a first location in the first user interface region, concurrently with a representation of the field of view of the one or more cameras

↓

20048
In accordance with a determination that control-fading criteria are met, cease to display the first control in the first user interface region while maintaining display of the representation of the field of view of the one or more cameras in the first user interface region

↓

20050
While displaying the first user interface region without displaying the first control in the first user interface region, detect a touch input at a respective location on the touch-sensitive surface that corresponds to the first location in the first user interface region

↓

20052
In response to detecting the touch input, generate a fifth audio alert including an audio output that specifies an operation corresponding to the first control

Figure 20F

DEVICES, METHODS, AND GRAPHICAL USER INTERFACES FOR SYSTEM-WIDE BEHAVIOR FOR 3D MODELS

RELATED APPLICATION

This application claims priority to U.S. Provisional Application Ser. No. 62/679,951, filed Jun. 3, 2018 and U.S. Provisional Application Ser. No. 62/621,529, filed Jan. 24, 2018, which are incorporated by reference herein in their entireties.

TECHNICAL FIELD

This relates generally to electronic devices that display virtual objects, including but not limited to electronic devices that display virtual objects in a variety of contexts.

BACKGROUND

The development of computer systems for augmented reality has increased significantly in recent years. Example augmented reality environments include at least some virtual elements that replace or augment the physical world. Input devices, such as touch-sensitive surfaces, for computer systems and other electronic computing devices are used to interact with virtual/augmented reality environments. Example touch-sensitive surfaces include touchpads, touch-sensitive remote controls, and touch-screen displays. Such surfaces are used to manipulate user interfaces and objects therein on a display. Example user interface objects include digital images, video, text, icons, and control elements such as buttons and other graphics.

But methods and interfaces for interacting with environments that include at least some virtual elements (e.g., applications, augmented reality environments, mixed reality environments, and virtual reality environments) are cumbersome, inefficient, and limited. For example, using a sequence of inputs to orient and position a virtual object in an augmented reality environment is tedious, creates a significant cognitive burden on a user, and detracts from the experience with the virtual/augmented reality environment. In addition, these methods take longer than necessary, thereby wasting energy. This latter consideration is particularly important in battery-operated devices.

SUMMARY

Accordingly, there is a need for computer systems with improved methods and interfaces for interacting with virtual objects. Such methods and interfaces optionally complement or replace conventional methods for interacting with virtual objects. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with interfaces for interacting with virtual objects (e.g., user interfaces for augmented reality (AR) and related non-AR interfaces) are reduced or eliminated by the disclosed computer systems. In some embodiments, the computer system includes a desktop computer. In some embodiments, the computer system is portable (e.g., a notebook computer, tablet computer, or handheld device). In some embodiments, the computer system includes a personal electronic device (e.g., a wearable electronic device, such as a watch). In some embodiments, the computer system has (and/or is in communication with) a touchpad. In some embodiments, the computer system has (and/or is in communication with) a touch-sensitive display (also known as a "touch screen" or "touch-screen display"). In some embodiments, the computer system has a graphical user interface (GUI), one or more processors, memory and one or more modules, programs or sets of instructions stored in the memory for performing multiple functions. In some embodiments, the user interacts with the GUI in part through stylus and/or finger contacts and gestures on the touch-sensitive surface. In some embodiments, the functions optionally include game playing, image editing, drawing, presenting, word processing, spreadsheet making, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at a computer system having a display, a touch-sensitive surface, and one or more cameras. The method includes displaying a representation of a virtual object in a first user interface region on the display. The method also includes, while displaying the first representation of the virtual object in the first user interface region on the display, detecting a first input by a contact at a location on the touch-sensitive surface that corresponds to the representation of the virtual object on the display. The method also includes, in response to detecting the first input by the contact, in accordance with a determination that the first input by the contact meets first criteria: displaying a second user interface region on the display, including replacing display of at least a portion of the first user interface region with the representation of a field of view of the one or more cameras, and continuously displaying the representation of the virtual object while switching from displaying the first user interface region to displaying the second user interface region.

In accordance with some embodiments, a method is performed at a computer system having a display, a touch-sensitive surface, and one or more cameras. The method includes displaying a first representation of a virtual object in a first user interface region on the display. The method also includes, while displaying the first representation of the virtual object in the first user interface region on the display, detecting a first input by a first contact at a location on the touch-sensitive surface that corresponds to the first representation of the virtual object on the display. The method also includes, in response to detecting the first input by the first contact and in accordance with a determination that the input by the first contact meets first criteria, displaying the representation of the virtual object in a second user interface region that is different from the first user interface region. The method also includes, while displaying the second representation of the virtual object in the second user interface region, detecting a second input, and, in response to detecting the second input, in accordance with a determination that the second input corresponds to a request to manipulate the virtual object in the second user interface region, changing a display property of the second representation of the virtual object within the second user interface region based on the second input; and, in accordance with a determination that the second input corresponds to a request to display the virtual object in an augmented reality environment, displaying a third representation of the virtual object with a representation of a field of view of the one or more cameras.

In accordance with some embodiments, a method is performed at a computer system having a display and a touch-sensitive surface. The method includes, in response to the request to display the first user interface, displaying the first user interface with a representation of the first item. The method also includes, in accordance with a determination that the first item corresponds to a respective virtual three-dimensional object, displaying a representation of the first item with a visual indication to indicate that the first item corresponds to a first respective virtual three-dimensional object. The method also includes, in accordance with a determination that the first item does not correspond to a respective virtual three-dimensional object, displaying the representation of the first item without the visual indication. The method also includes, after displaying the representation of the first item, receiving a request to display a second user interface that includes a second item. The method also includes, in response to the request to display the second user interface, displaying the second user interface with a representation of the second item. The method also includes, in accordance with a determination that the second item corresponds to a respective virtual three-dimensional object, displaying a representation of the second item with the visual indication to indicate that the second item corresponds to a second respective virtual three-dimensional object. The method also includes, in accordance with a determination that the second item does not correspond to a respective virtual three-dimensional object, displaying the representation of the second item without the visual indication.

In accordance with some embodiments, a method is performed at a computer system having a display generation component, one or more input devices, and one or more cameras. The method includes receiving a request to display a virtual object in a first user interface region that includes at least a portion of a field of view of the one or more cameras. The method also includes, in response to the request to display the virtual object in the first user interface region, displaying, via the display generation component, a representation of the virtual object over at least a portion of the field of view of the one or more cameras that is included the first user interface region, wherein the field of view of the one or more cameras is a view of a physical environment in which the one or more cameras are located. Displaying the representation of the virtual object includes: in accordance with a determination that object-placement criteria are not met, wherein the object-placement criteria require that a placement location for the virtual object be identified in the field of view of the one or more cameras in order for the object-placement criteria to be met, displaying the representation of the virtual object with a first set of visual properties and with a first orientation that is independent of which portion of the physical environment is displayed in the field of view of the one or more cameras; and in accordance with a determination that the object-placement criteria are met, displaying the representation of the virtual object with a second set of visual properties that are distinct from the first set of visual properties and with a second orientation that corresponds to a plane in the physical environment detected in the field of view of the one or more cameras.

In accordance with some embodiments, a method is performed at a computer system having a display generation component, one or more input devices, one or more cameras, and one or more attitude sensors for detecting changes in attitude of the device including the one or more cameras. The method includes receiving a request to display an augmented reality view of a physical environment in a first user interface region that includes a representation of a field of view of the one or more cameras. The method also includes, in response to receiving the request to display the augmented reality view of the physical environment, displaying the representation of the field of view of the one or more cameras and, in accordance with a determination that calibration criteria are not met for the augmented reality view of the physical environment, displaying a calibration user interface object that is dynamically animated in accordance with movement of the one or more cameras in the physical environment, wherein displaying the calibration user interface object includes: while displaying the calibration user interface object, detecting, via the one or more attitude sensors, a change in attitude of the one or more cameras in the physical environment; and, in response to detecting the change in attitude of the one or more cameras in the physical environment, adjusting at least one display parameter of the calibration user interface object in accordance with the detected change in attitude of the one or more cameras in the physical environment. The method also includes, while displaying the calibration user interface object that moves on the display in accordance with the detected change in attitude of the one or more cameras in the physical environment, detecting that the calibration criteria are met. The method also includes, in response to detecting that the calibration criteria are met, ceasing to display the calibration user interface object.

In accordance with some embodiments, a method is performed at a computer system having a display generation component and one or more input devices including a touch-sensitive surface. The method includes displaying, by the display generation component, a representation of a first perspective of a virtual three-dimensional object in a first user interface region. The method also includes, while displaying the representation of the first perspective of the virtual three-dimensional object in the first user interface region on the display, detecting a first input that corresponds to a request to rotate the virtual three-dimensional object relative to a display to display a portion of the virtual three-dimensional object that is not visible from the first perspective of the virtual three-dimensional object. The method also includes, in response to detecting the first input: in accordance with a determination that the first input corresponds to a request to rotate the three-dimensional object about a first axis, rotating the virtual three-dimensional object relative to the first axis by an amount that is determined based on a magnitude of the first input and is constrained by a limit on the movement restricting rotation of the virtual three-dimensional object by more than a threshold amount of rotation relative to the first axis; and, in accordance with a determination that the first input corresponds to a request to rotate the three-dimensional object about a second axis that is different from the first axis, rotating the virtual three-dimensional object relative to the second axis by an amount that is determined based on a magnitude of the first input, wherein, for an input with a magnitude above a respective threshold, the device rotates the virtual three-dimensional object relative to the second axis by more than the threshold amount of rotation.

In accordance with some embodiments, a method is performed at a computer system having a display generation component and a touch-sensitive surface. The method includes displaying, via the display generation component, a first user interface region that includes a user interface object that is associated with a plurality of object manipulation behaviors, including a first object manipulation behavior that is performed in response to inputs that meet first gesture-recognition criteria and a second object manipulation behavior that is performed in response to inputs that meet second gesture-recognition criteria. The method also includes, while displaying the first user interface region, detecting a first portion of an input directed to the user interface object, including detecting movement of one or more contacts across the touch-sensitive surface, and while the one or more contacts are detected on the touch-sensitive surface, evaluating movement of the one or more contacts with respect to both the first gesture-recognition criteria and the second gesture-recognition criteria. The method also includes, in response to detecting the first portion of the input, updating an appearance of the user interface object based on the first portion of the input, including: in accordance with a determination that the first portion of the input meets the first gesture-recognition criteria before meeting the second gesture-recognition criteria, changing the appearance of the user interface object in accordance with the first object manipulation behavior based on the first portion of the input and updating the second gesture-recognition criteria by increasing a threshold for the second gesture-recognition criteria; and in accordance with a determination that the input meets the second gesture-recognition criteria before meeting the first gesture-recognition criteria, changing the appearance of the user interface object in accordance with the second object manipulation behavior based on the first portion of the input and updating the first gesture-recognition criteria by increasing a threshold for the first gesture-recognition criteria.

In accordance with some embodiments, a method is performed at a computer system having a display generation component, one or more input devices, one or more audio output generators, and one or more cameras. The method includes displaying, via the display generation component, a representation of a virtual object in a first user interface region that includes a representation of a field of view of one or more cameras, wherein the displaying includes maintaining a first spatial relationship between the representation of the virtual object and a plane detected within a physical environment that is captured in the field of view of the one or more cameras. The method also includes detecting movement of the device that adjusts the field of view of the one or more cameras. The method also includes, in response to detecting movement of the device that adjusts the field of view of the one or more cameras: adjusting display of the representation of the virtual object in the first user interface region in accordance with the first spatial relationship between the virtual object and the plane detected within the field of view of the one or more cameras as the field of view of the one or more cameras is adjusted, and, in accordance with a determination that the movement of the device causes more than a threshold amount of the virtual object to move outside of a displayed portion of the field of view of the one or more cameras, generating, via the one or more audio output generators, a first audio alert.

In accordance with some embodiments, an electronic device includes a display generation component, optionally one or more input devices, optionally one or more touch-sensitive surfaces, optionally one or more cameras, optionally one or more sensors to detect intensities of contacts with the touch-sensitive surface, optionally one or more audio output generators, optionally one or more device orientation sensors, optionally one or more tactile output generators, optionally one or more attitude sensors for detecting changes in attitude, one or more processors, and memory storing one or more programs; the one or more programs are configured to be executed by the one or more processors and the one or more programs include instructions for performing or causing performance of the operations of any of the methods described herein. In accordance with some embodiments, a computer readable storage medium has stored therein instructions, which, when executed by an electronic device with a display generation component, optionally one or more input devices, optionally one or more touch-sensitive surfaces, optionally one or more cameras, optionally one or more sensors to detect intensities of contacts with the touch-sensitive surface, optionally one or more audio output generators, optionally one or more device orientation sensors, optionally one or more tactile output generators, and optionally one or more one or more attitude sensors, cause the device to perform or cause performance of the operations of any of the methods described herein. In accordance with some embodiments, a graphical user interface on an electronic device with a display generation component, optionally one or more input devices, optionally one or more touch-sensitive surfaces, optionally one or more cameras, optionally one or more sensors to detect intensities of contacts with the touch-sensitive surface, optionally one or more audio output generators, optionally one or more device orientation sensors, optionally one or more tactile output generators, and optionally one or more attitude sensors, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display generation component, optionally one or more input devices, optionally one or more touch-sensitive surfaces, optionally one or more cameras, optionally one or more sensors to detect intensities of contacts with the touch-sensitive surface, optionally one or more audio output generators, optionally one or more device orientation sensors, optionally one or more tactile output generators, and optionally one or more attitude sensors for detecting changes in attitude; and means for performing or causing performance of the operations of any of the methods described herein. In accordance with some embodiments, an information processing apparatus, for use in an electronic device with a display generation component, optionally one or more input devices, optionally one or more touch-sensitive surfaces, optionally one or more cameras, optionally one or more sensors to detect intensities of contacts with the touch-sensitive surface, optionally one or more audio output generators, optionally one or more device orientation sensors, optionally one or more tactile output generators, and optionally one or more attitude sensors for detecting changes in attitude includes means for performing or causing performance of the operations of any of the methods described herein.

Thus, electronic devices with display generation components, optionally one or more input devices, optionally one or more touch-sensitive surfaces, optionally one or more cameras, optionally one or more sensors to detect intensities of contacts with the touch-sensitive surface, optionally one or more audio output generators, optionally one or more device orientation sensors, optionally one or more tactile output generators, and optionally one or more attitude sensors, are provided with improved methods and interfaces for displaying virtual objects in a variety of contexts, thereby increasing the effectiveness, efficiency, and user satisfaction with such devices. Such methods and interfaces may complement or replace conventional methods for displaying virtual objects in a variety of contexts.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 7A-7E, 7F1-7F2, 7G1-7G2, and 7H-7P illustrate example user interfaces for displaying an item with a visual indication to indicate that an item corresponds to a virtual three-dimensional object, in accordance with some embodiments.

FIGS. 8A-8E are flow diagrams of a process for displaying a representation of a virtual object while switching from displaying a first user interface region to displaying a second user interface region in accordance with some embodiments, in accordance with some embodiments.

FIGS. 9A-9D are flow diagrams of a process for displaying a first representation of a virtual object in a first user interface region, a second representation of the virtual object in the second user interface region, and a third representation of the virtual object with a representation of a field of view of one or more cameras, in accordance with some embodiments.

FIGS. 10A-10D are flow diagrams of a process for displaying an item with a visual indication to indicate that an item corresponds to a virtual three-dimensional object, in accordance with some embodiments.

FIGS. 12A-12D, 12E-1, 12E-2, 12F-1, 12F-2, 12G-1, 12G-2, 12H-1, 12H-2, 12I-1, 12I-2, 12J, 12K-1, 12K-2, 12L-1, and 12L-2 illustrate example user interfaces for displaying a calibration user interface object that is dynamically animated in accordance with movement of one or more cameras of a device, in accordance with some embodiments.

FIGS. 14AA-14AD illustrate flow diagrams that illustrate operations for, in accordance with a determination that a first threshold magnitude of movement is met for a first object manipulation behavior, increasing a second threshold magnitude of movement required for a second object manipulation behavior, in accordance with some embodiments.

FIGS. 16A-16G are flow diagrams of a process for displaying a virtual object with different visual properties depending on whether object-placement criteria are met, in accordance with some embodiments.

FIGS. 17A-17D are flow diagrams of a process for displaying a calibration user interface object that is dynamically animated in accordance with movement of one or more cameras of a device, in accordance with some embodiments.

FIGS. 18A-18I are flow diagrams of a process for constraining rotation of a virtual object about an axis, in accordance with some embodiments.

FIGS. 19A-19H are flow diagrams of a process for, in accordance with a determination that a first threshold magnitude of movement is met for a first object manipulation behavior, increasing a second threshold magnitude of movement required for a second object manipulation behavior, in accordance with some embodiments.

FIGS. 20A-20F are flow diagrams of a process for generating an audio alert in accordance with a determination that movement of a device causes a virtual object to move outside of a displayed field of view of one or more device cameras, in accordance with some embodiments.

DESCRIPTION OF EMBODIMENTS

Figure 1A:
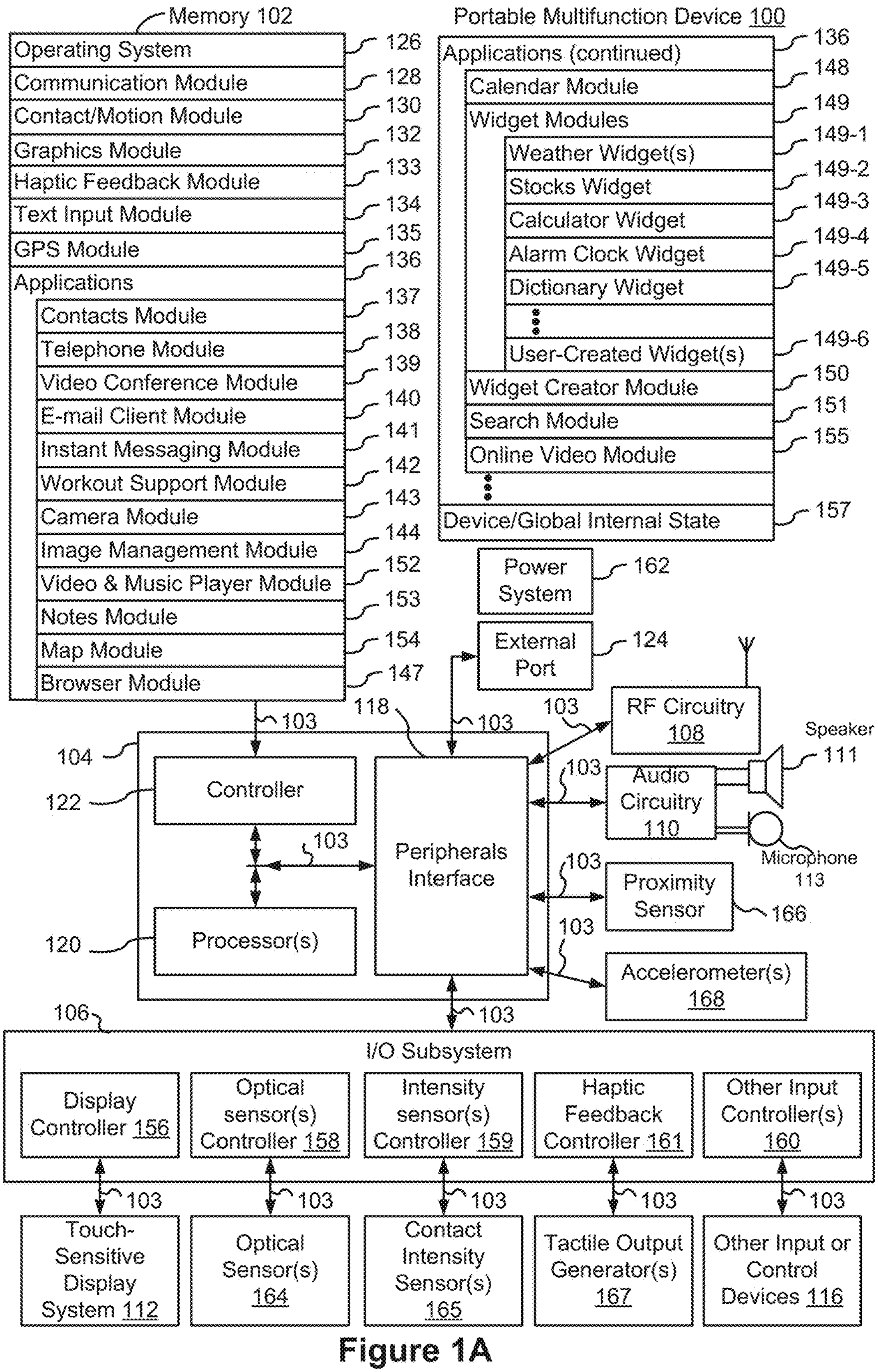
FIG. 1A is a block diagram illustrating a portable multifunction device with a touch-sensitive display, in accordance with some embodiments.

A virtual object is a graphical representation of a three-dimensional object in a virtual environment. Conventional methods of interacting with virtual objects to transition the virtual objects from being displayed in the context of an application user interface (e.g., a two-dimensional application user interface that does not display an augmented reality environment) to being displayed in the context of an augmented reality environment (e.g., an environment in which a view of the physical world is augmented with supplemental information that provides additional information to a user that is not available in the physical world) often require multiple separate inputs (e.g., a sequence of gestures and button presses, etc.) to achieve an intended outcome (e.g., adjusting the size, position, and/or orientation of the virtual object for a realistic or desired appearance in an augmented reality environment). Further, conventional methods of inputs often involve a delay between receiving a request to display an augmented reality environment and displaying the augmented reality environment due to the time required to activate one or more device cameras to capture a view of the physical world, and/or the time required to analyze and characterize the view of the physical world (e.g., detecting planes and/or surfaces in the captured view of the physical world) in relation to the virtual objects that may be placed the augmented reality environment. The embodiments herein provide an intuitive way for a user to display and/or interact with virtual objects in various contexts (e.g., by allowing a user to provide input to switch from displaying a virtual object in the context of an application user interface to displaying the virtual object in an augmented reality environment, by allowing a user to change display properties of a virtual object (e.g., in a three-dimensional staging environment) prior to displaying the virtual object in an augmented reality environment, by providing an indication that allows a user to readily identify virtual objects system-wide across multiple applications, by altering a visual property of an object while determining placement information for the object, by providing an animated calibration user interface object to indicate movement of a device needed for calibration, by constraining rotation of a displayed virtual object about an axis, by increasing a threshold magnitude of movement for a second object manipulation behavior when a threshold magnitude of movement is met for a first object manipulation behavior, and by providing an audio alert to indicate that a virtual object has moved out of a displayed field of view).

The systems, methods, and GUIs described herein improve user interface interactions with virtual/augmented reality environments in multiple ways. For example, they make it easier to: display a virtual object in an augmented reality environment and, in response to different inputs, adjust the appearance of the virtual object for display in the augmented reality environment.

Figure 2:
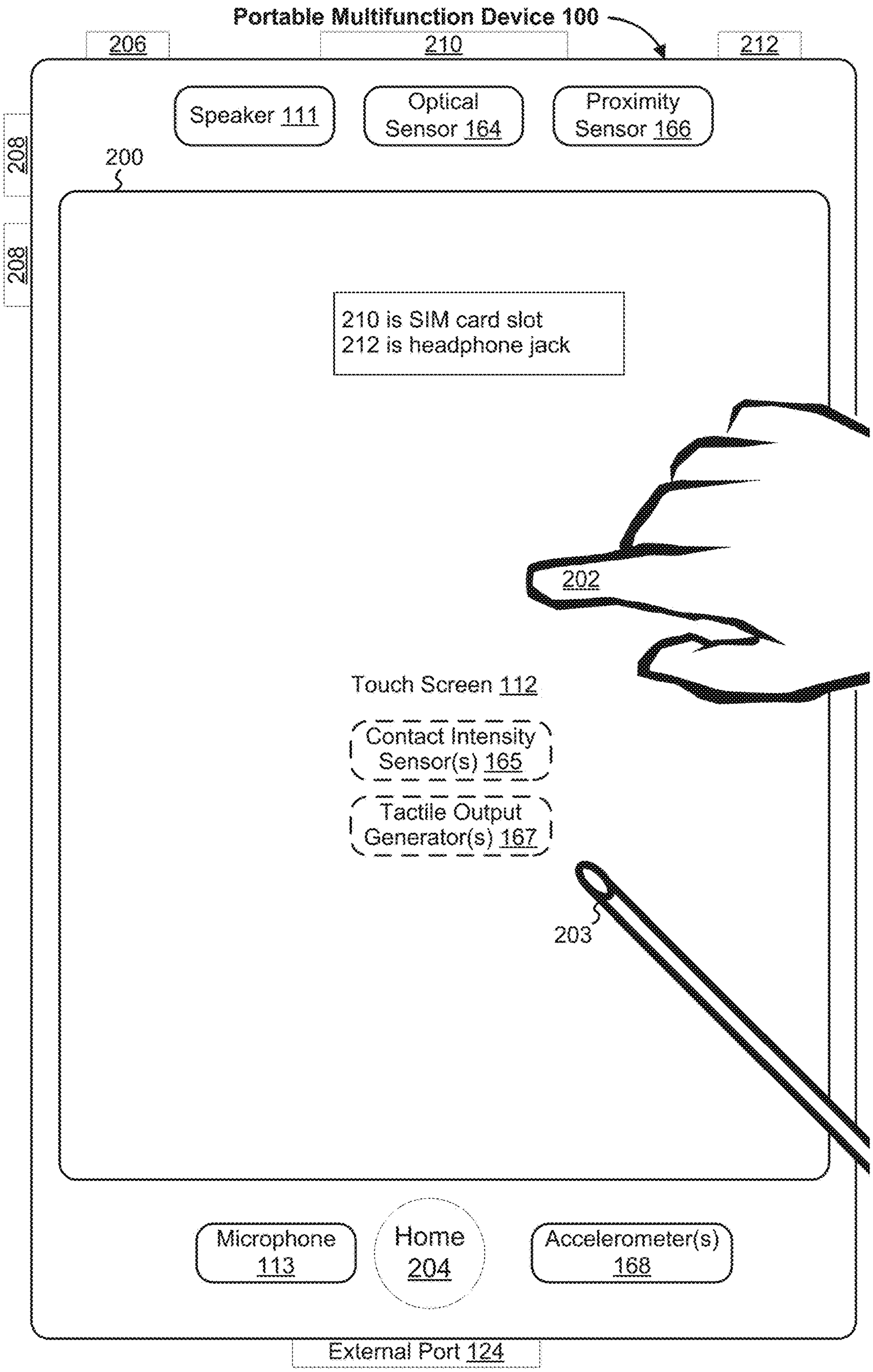
FIG. 2 illustrates a portable multifunction device having a touch screen, in accordance with some embodiments.
Figure 3:
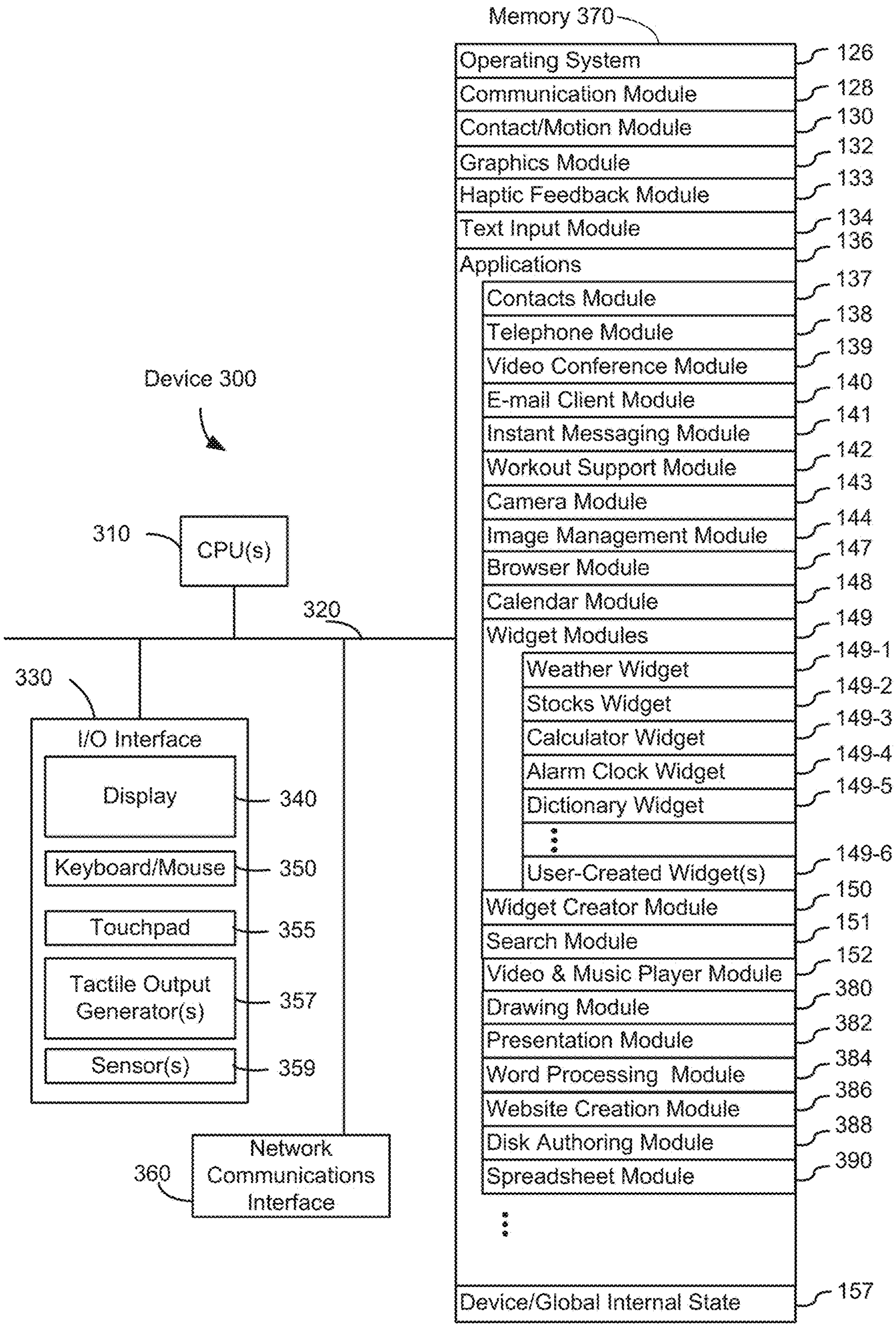
FIG. 3 is a block diagram of an example multifunction device with a display and a touch-sensitive surface, in accordance with some embodiments.
Figure 4A:
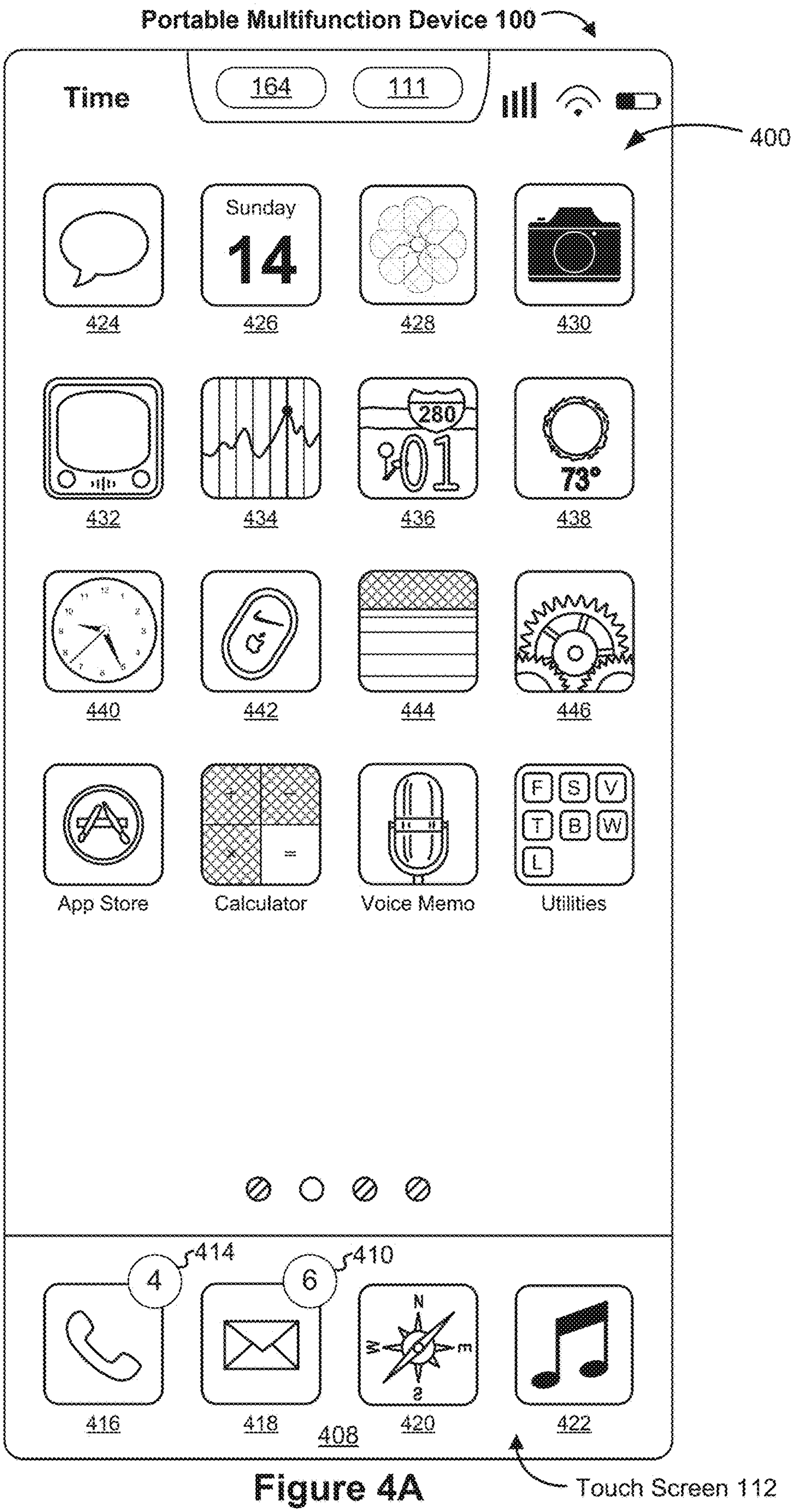
FIG. 4A illustrates an example user interface for a menu of applications on a portable multifunction device, in accordance with some embodiments.
Figure 4B:
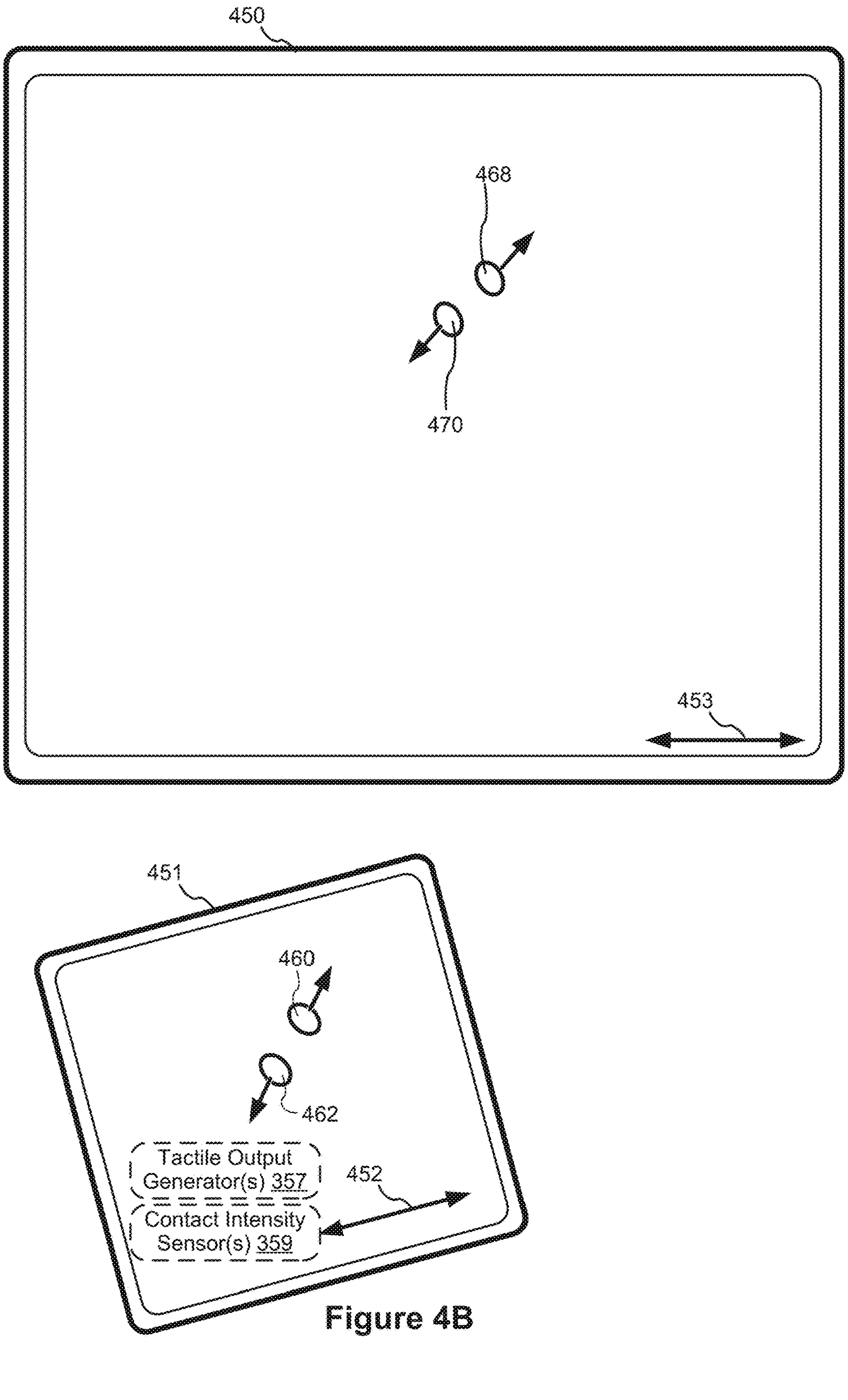
FIG. 4B illustrates an example user interface for a multifunction device with a touch-sensitive surface that is separate from the display, in accordance with some embodiments.
Figure 5A:
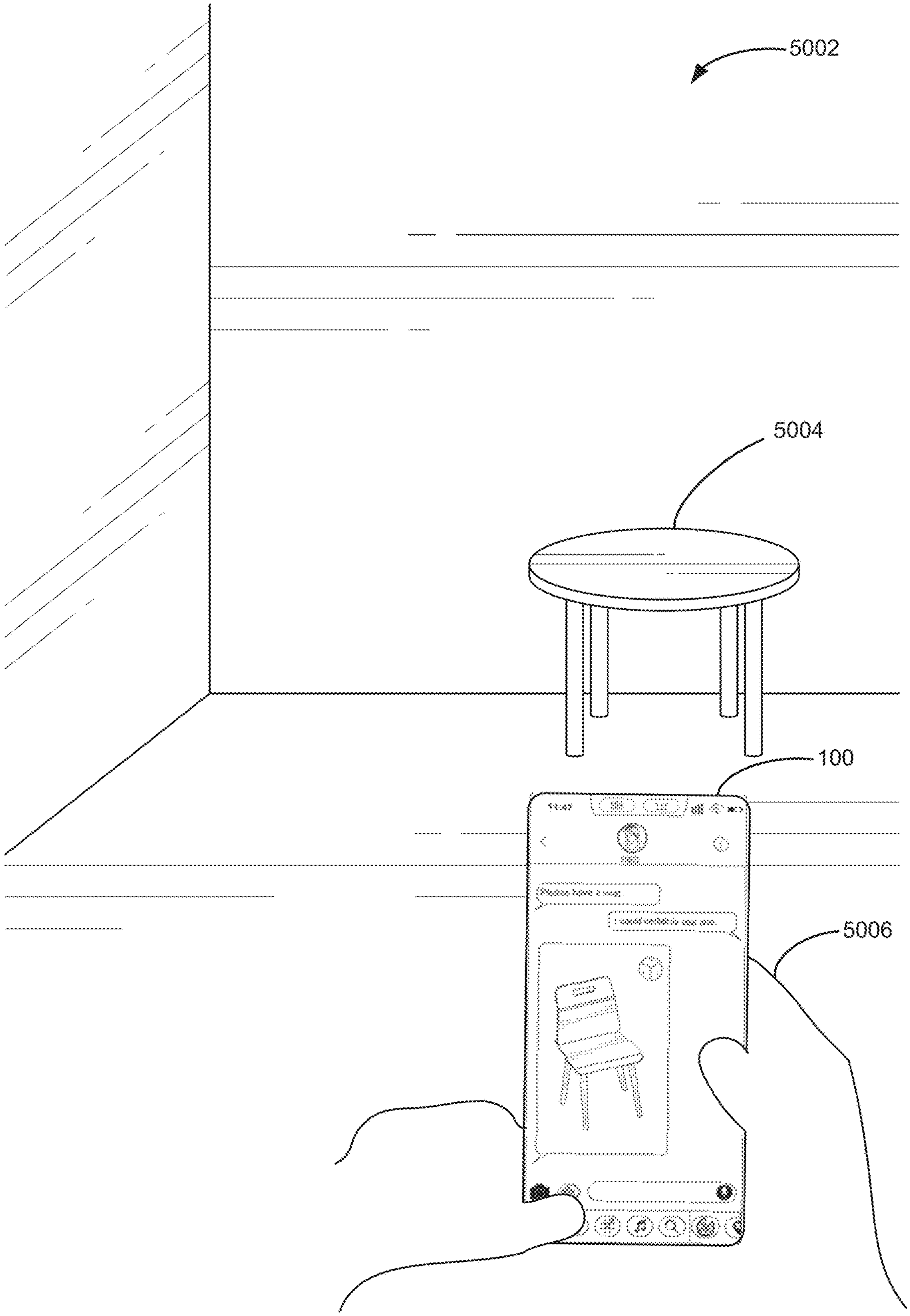
FIGS. 5A-5AT illustrate example user interfaces for displaying a representation of a virtual object while switching from displaying a first user interface region to displaying a second user interface region, in accordance with some embodiments.
Figure 14A:
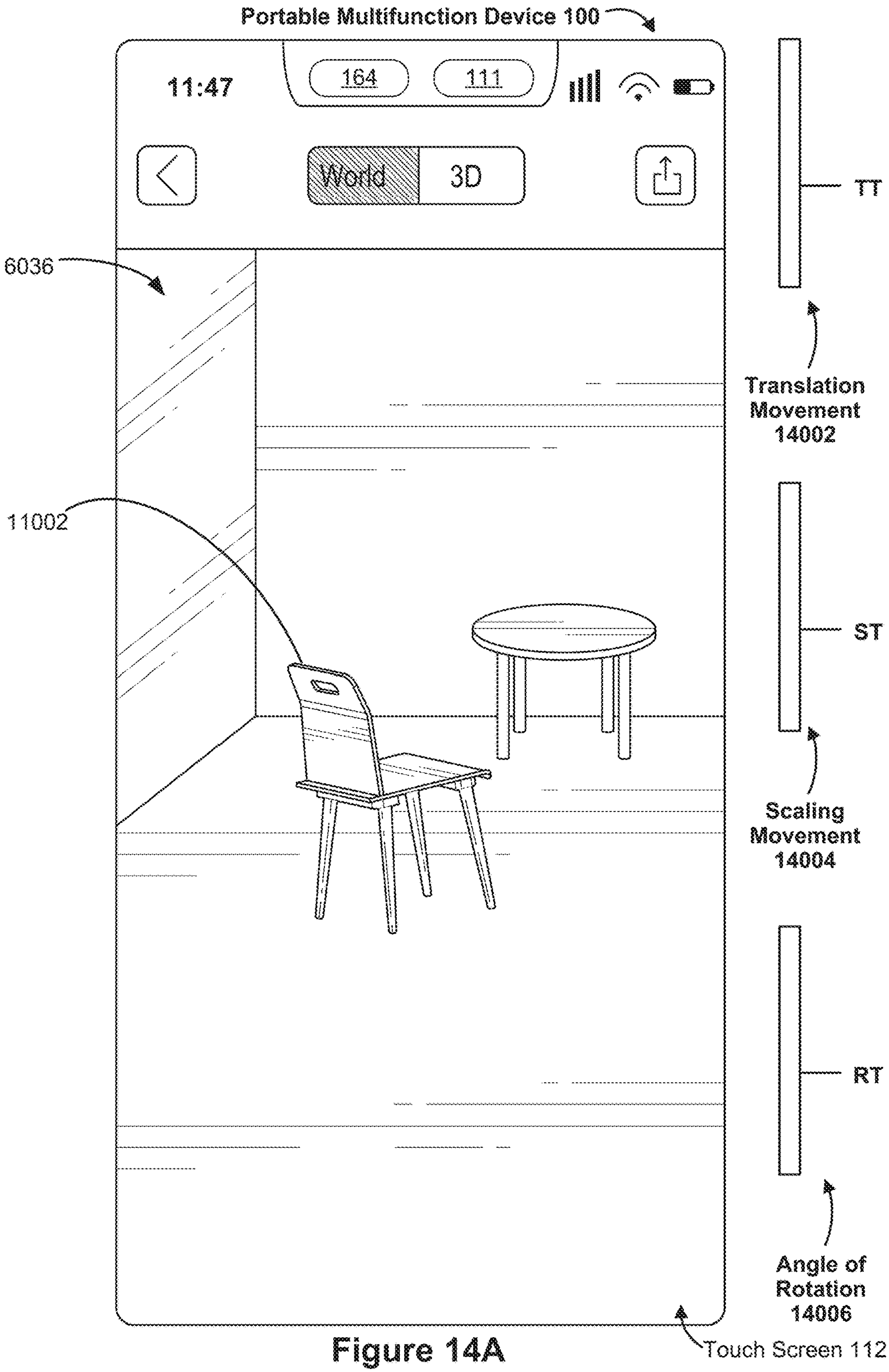
FIGS. 14A-14Z illustrate example user interfaces for, in accordance with a determination that a first threshold magnitude of movement is met for a first object manipulation behavior, increasing a second threshold magnitude of movement required for a second object manipulation behavior, in accordance with some embodiments.

Below, FIGS. 1A-1C, 2, and 3 provide a description of example devices. FIGS. 4A-4B, 5A-5AT, 6A-6AJ, 7A-7P, 11A-11V, 12A-12L, 13A-13M, 14A-14Z, and 15A-15AI illustrate example user interfaces for displaying virtual objects in a variety of contexts. FIGS. 8A-8E illustrate a process for displaying a representation of a virtual object while switching from displaying a first user interface region to displaying a second user interface region. FIGS. 9A-9D illustrate a process for displaying a first representation of a virtual object in a first user interface region, a second representation of the virtual object in the second user interface region, and a third representation of the virtual object with a representation of a field of view of one or more cameras. FIGS. 10A-10D illustrate a process for displaying an item with a visual indication to indicate that an item corresponds to a virtual three-dimensional object. FIGS. 16A-16G illustrate a process for displaying a virtual object with different visual properties depending on whether object-placement criteria are met. FIGS. 17A-17D illustrate a process for displaying a calibration user interface object that is dynamically animated in accordance with movement of one or more cameras of a device. FIGS. 18A-18I illustrate a process for constraining rotation of a virtual object about an axis. FIGS. 14AA-14AD and 19A-19H illustrate a process for, in accordance with a determination that a first threshold magnitude of movement is met for a first object manipulation behavior, increasing a second threshold magnitude of movement required for a second object manipulation behavior. FIGS. 20A-20F illustrate a process for generating an audio alert in accordance with a determination that movement of a device causes a virtual object to move outside of a displayed field of view of one or more device cameras. The user interfaces in FIGS. 5A-5AT, 6A-6AJ, 7A-7P, 11A-11V, 12A-12L, 13A-13M, 14A-14Z, and 15A-15AI are used to illustrate the processes in FIGS. 8A-8E, 9A-9D, 10A-10D, 14AA-14AD, 16A-16G, 17A-17D, 18A-18I, 19A-19H, and 20A-20F.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. In some embodiments, tactile output generator(s) 167 include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have criteria that are met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 167 at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:

- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in a MMS and/or an Enhanced Messaging Service (EMS). As used herein, “instant messaging” refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
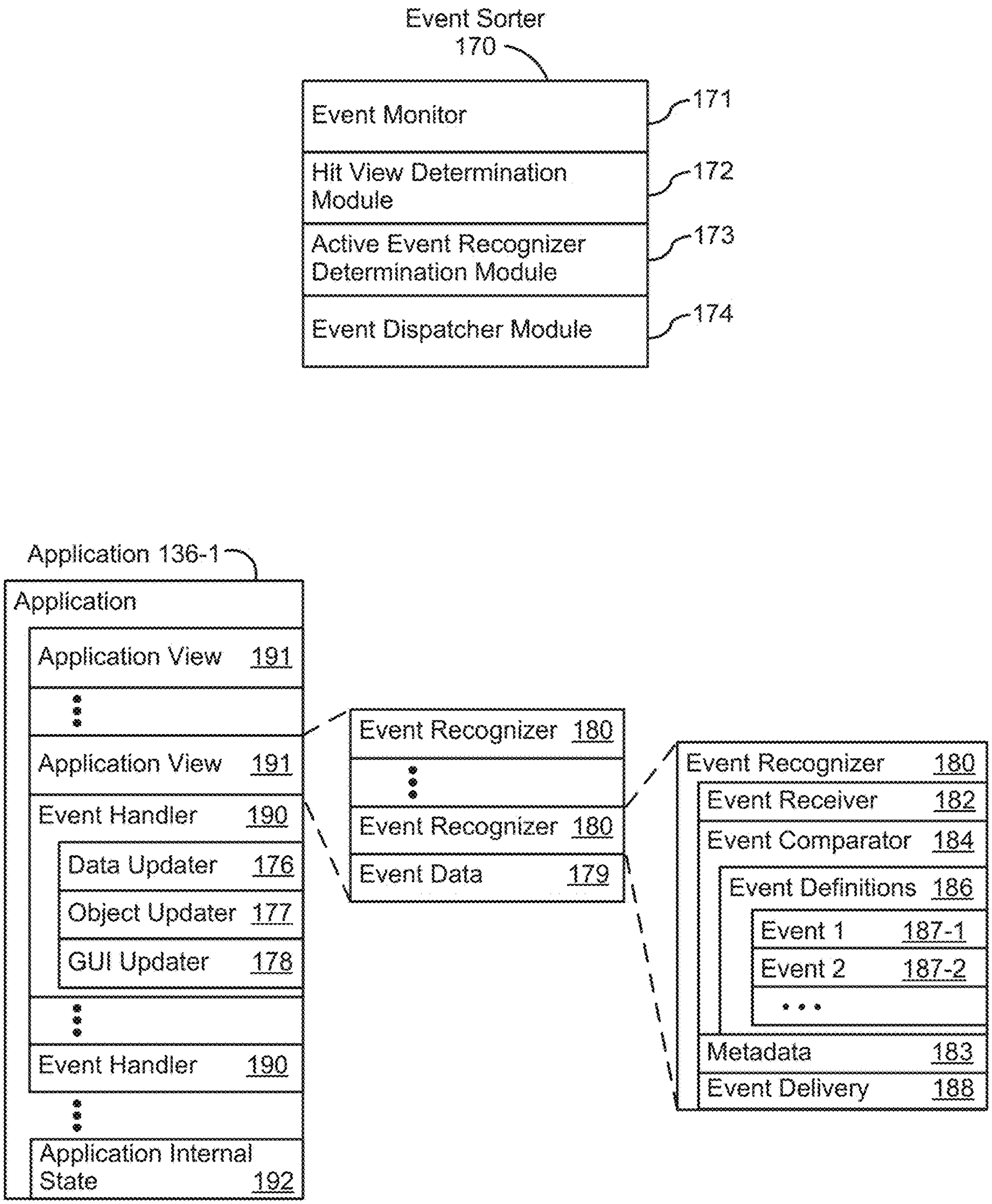
FIG. 1B is a block diagram illustrating example components for event handling, in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 1C:
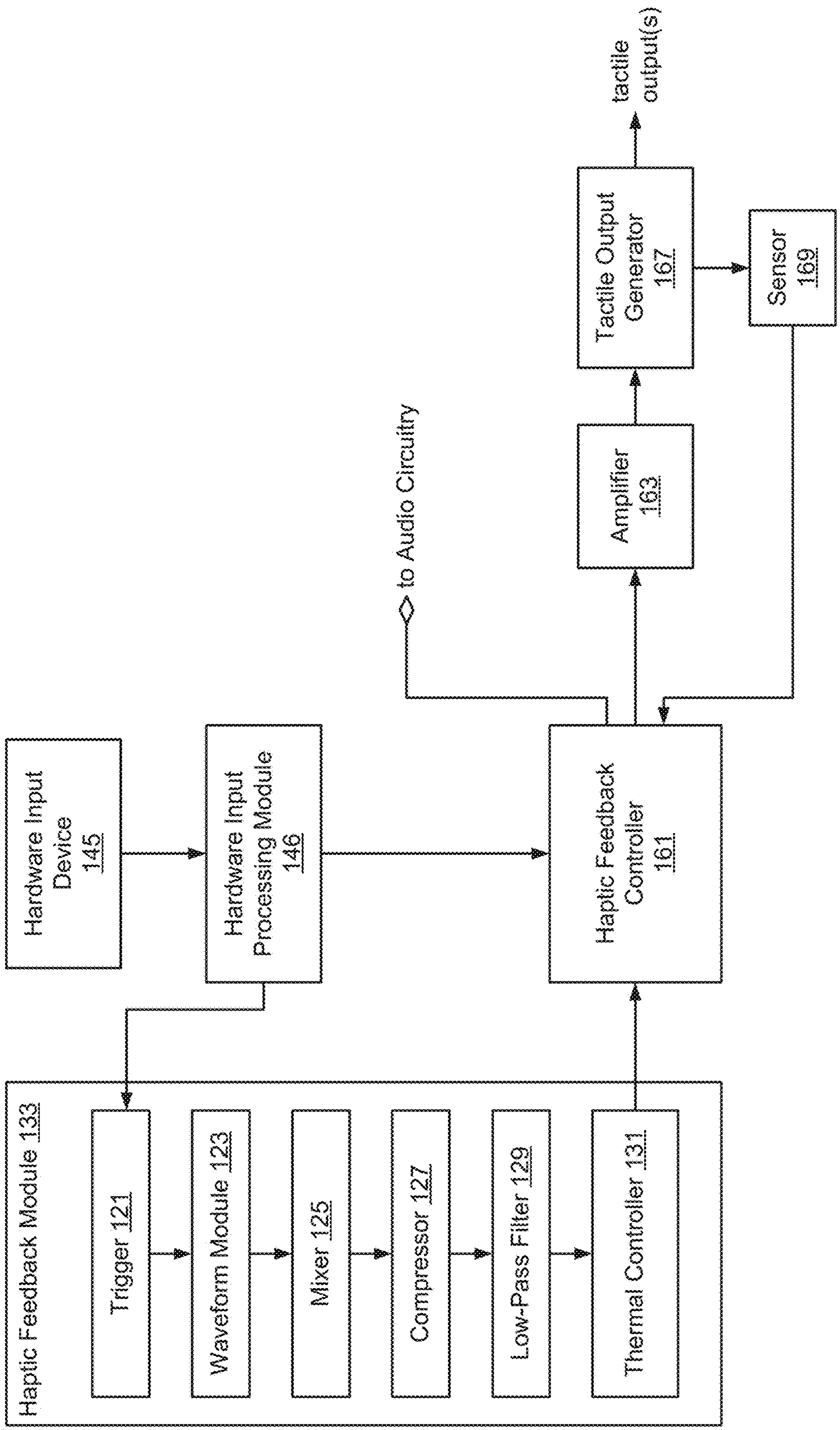
FIG. 1C is a block diagram illustrating a tactile output module, in accordance with some embodiments.

FIG. 1C is a block diagram illustrating a tactile output module in accordance with some embodiments. In some embodiments, I/O subsystem 106 (e.g., haptic feedback controller 161 (FIG. 1A) and/or other input controller(s) 160 (FIG. 1A)) includes at least some of the example components shown in FIG. 1C. In some embodiments, peripherals interface 118 includes at least some of the example components shown in FIG. 1C.

In some embodiments, the tactile output module includes haptic feedback module 133. In some embodiments, haptic feedback module 133 aggregates and combines tactile outputs for user interface feedback from software applications on the electronic device (e.g., feedback that is responsive to user inputs that correspond to displayed user interfaces and alerts and other notifications that indicate the performance of operations or occurrence of events in user interfaces of the electronic device). Haptic feedback module 133 includes one or more of: waveform module 123 (for providing waveforms used for generating tactile outputs), mixer 125 (for mixing waveforms, such as waveforms in different channels), compressor 127 (for reducing or compressing a dynamic range of the waveforms), low-pass filter 129 (for filtering out high frequency signal components in the waveforms), and thermal controller 131 (for adjusting the waveforms in accordance with thermal conditions). In some embodiments, haptic feedback module 133 is included in haptic feedback controller 161 (FIG. 1A). In some embodiments, a separate unit of haptic feedback module 133 (or a separate implementation of haptic feedback module 133) is also included in an audio controller (e.g., audio circuitry 110, FIG. 1A) and used for generating audio signals. In some embodiments, a single haptic feedback module 133 is used for generating audio signals and generating waveforms for tactile outputs.

In some embodiments, haptic feedback module 133 also includes trigger module 121 (e.g., a software application, operating system, or other software module that determines a tactile output is to be generated and initiates the process for generating the corresponding tactile output). In some embodiments, trigger module 121 generates trigger signals for initiating generation of waveforms (e.g., by waveform module 123). For example, trigger module 121 generates trigger signals based on preset timing criteria. In some embodiments, trigger module 121 receives trigger signals from outside haptic feedback module 133 (e.g., in some embodiments, haptic feedback module 133 receives trigger signals from hardware input processing module 146 located outside haptic feedback module 133) and relays the trigger signals to other components within haptic feedback module 133 (e.g., waveform module 123) or software applications that trigger operations (e.g., with trigger module 121) based on activation of a user interface element (e.g., an application icon or an affordance within an application) or a hardware input device (e.g., a home button or an intensity-sensitive input surface, such as an intensity-sensitive touch screen). In some embodiments, trigger module 121 also receives tactile feedback generation instructions (e.g., from haptic feedback module 133, FIGS. 1A and 3). In some embodiments, trigger module 121 generates trigger signals in response to haptic feedback module 133 (or trigger module 121 in haptic feedback module 133) receiving tactile feedback instructions (e.g., from haptic feedback module 133, FIGS. 1A and 3).

Waveform module 123 receives trigger signals (e.g., from trigger module 121) as an input, and in response to receiving trigger signals, provides waveforms for generation of one or more tactile outputs (e.g., waveforms selected from a predefined set of waveforms designated for use by waveform module 123, such as the waveforms described in greater detail below with reference to FIGS. 4F-4G).

Mixer 125 receives waveforms (e.g., from waveform module 123) as an input, and mixes together the waveforms. For example, when mixer 125 receives two or more waveforms (e.g., a first waveform in a first channel and a second waveform that at least partially overlaps with the first waveform in a second channel) mixer 125 outputs a combined waveform that corresponds to a sum of the two or more waveforms. In some embodiments, mixer 125 also modifies one or more waveforms of the two or more waveforms to emphasize particular waveform(s) over the rest of the two or more waveforms (e.g., by increasing a scale of the particular waveform(s) and/or decreasing a scale of the rest of the waveforms). In some circumstances, mixer 125 selects one or more waveforms to remove from the combined waveform (e.g., the waveform from the oldest source is dropped when there are waveforms from more than three sources that have been requested to be output concurrently by tactile output generator 167).

Compressor 127 receives waveforms (e.g., a combined waveform from mixer 125) as an input, and modifies the waveforms. In some embodiments, compressor 127 reduces the waveforms (e.g., in accordance with physical specifications of tactile output generators 167 (FIG. 1A) or 357 (FIG. 3)) so that tactile outputs corresponding to the waveforms are reduced. In some embodiments, compressor 127 limits the waveforms, such as by enforcing a predefined maximum amplitude for the waveforms. For example, compressor 127 reduces amplitudes of portions of waveforms that exceed a predefined amplitude threshold while maintaining amplitudes of portions of waveforms that do not exceed the predefined amplitude threshold. In some embodiments, compressor 127 reduces a dynamic range of the waveforms. In some embodiments, compressor 127 dynamically reduces the dynamic range of the waveforms so that the combined waveforms remain within performance specifications of the tactile output generator 167 (e.g., force and/or moveable mass displacement limits).

Low-pass filter 129 receives waveforms (e.g., compressed waveforms from compressor 127) as an input, and filters (e.g., smooths) the waveforms (e.g., removes or reduces high frequency signal components in the waveforms). For example, in some instances, compressor 127 includes, in compressed waveforms, extraneous signals (e.g., high frequency signal components) that interfere with the generation of tactile outputs and/or exceed performance specifications of tactile output generator 167 when the tactile outputs are generated in accordance with the compressed waveforms. Low-pass filter 129 reduces or removes such extraneous signals in the waveforms.

Thermal controller 131 receives waveforms (e.g., filtered waveforms from low-pass filter 129) as an input, and adjusts the waveforms in accordance with thermal conditions of device 100 (e.g., based on internal temperatures detected within device 100, such as the temperature of haptic feedback controller 161, and/or external temperatures detected by device 100). For example, in some cases, the output of haptic feedback controller 161 varies depending on the temperature (e.g. haptic feedback controller 161, in response to receiving same waveforms, generates a first tactile output when haptic feedback controller 161 is at a first temperature and generates a second tactile output when haptic feedback controller 161 is at a second temperature that is distinct from the first temperature). For example, the magnitude (or the amplitude) of the tactile outputs may vary depending on the temperature. To reduce the effect of the temperature variations, the waveforms are modified (e.g., an amplitude of the waveforms is increased or decreased based on the temperature).

In some embodiments, haptic feedback module 133 (e.g., trigger module 121) is coupled to hardware input processing module 146. In some embodiments, other input controller(s) 160 in FIG. 1A includes hardware input processing module 146. In some embodiments, hardware input processing module 146 receives inputs from hardware input device 145 (e.g., other input or control devices 116 in FIG. 1A, such as a home button or an intensity-sensitive input surface, such as an intensity-sensitive touch screen). In some embodiments, hardware input device 145 is any input device described herein, such as touch-sensitive display system 112 (FIG. 1A), keyboard/mouse 350 (FIG. 3), touchpad 355 (FIG. 3), one of other input or control devices 116 (FIG. 1A), or an intensity-sensitive home button. In some embodiments, hardware input device 145 consists of an intensity-sensitive home button, and not touch-sensitive display system 112 (FIG. 1A), keyboard/mouse 350 (FIG. 3), or touchpad 355 (FIG. 3). In some embodiments, in response to inputs from hardware input device 145 (e.g., an intensity-sensitive home button or a touch screen), hardware input processing module 146 provides one or more trigger signals to haptic feedback module 133 to indicate that a user input satisfying predefined input criteria, such as an input corresponding to a "click" of a home button (e.g., a "down click" or an "up click"), has been detected. In some embodiments, haptic feedback module 133 provides waveforms that correspond to the "click" of a home button in response to the input corresponding to the "click" of a home button, simulating a haptic feedback of pressing a physical home button.

In some embodiments, the tactile output module includes haptic feedback controller 161 (e.g., haptic feedback controller 161 in FIG. 1A), which controls the generation of tactile outputs. In some embodiments, haptic feedback controller 161 is coupled to a plurality of tactile output generators, and selects one or more tactile output generators of the plurality of tactile output generators and sends waveforms to the selected one or more tactile output generators for generating tactile outputs. In some embodiments, haptic feedback controller 161 coordinates tactile output requests that correspond to activation of hardware input device 145 and tactile output requests that correspond to software events (e.g., tactile output requests from haptic feedback module 133) and modifies one or more waveforms of the two or more waveforms to emphasize particular waveform(s) over the rest of the two or more waveforms (e.g., by increasing a scale of the particular waveform(s) and/or decreasing a scale of the rest of the waveforms, such as to prioritize tactile outputs that correspond to activations of hardware input device 145 over tactile outputs that correspond to software events).

In some embodiments, as shown in FIG. 1C, an output of haptic feedback controller 161 is coupled to audio circuitry of device 100 (e.g., audio circuitry 110, FIG. 1A), and provides audio signals to audio circuitry of device 100. In some embodiments, haptic feedback controller 161 provides both waveforms used for generating tactile outputs and audio signals used for providing audio outputs in conjunction with generation of the tactile outputs. In some embodiments, haptic feedback controller 161 modifies audio signals and/or waveforms (used for generating tactile outputs) so that the audio outputs and the tactile outputs are synchronized (e.g., by delaying the audio signals and/or waveforms). In some embodiments, haptic feedback controller 161 includes a digital-to-analog converter used for converting digital waveforms into analog signals, which are received by amplifier 163 and/or tactile output generator 167.

In some embodiments, the tactile output module includes amplifier 163. In some embodiments, amplifier 163 receives waveforms (e.g., from haptic feedback controller 161) and amplifies the waveforms prior to sending the amplified waveforms to tactile output generator 167 (e.g., any of tactile output generators 167 (FIG. 1A) or 357 (FIG. 3)). For example, amplifier 163 amplifies the received waveforms to signal levels that are in accordance with physical specifications of tactile output generator 167 (e.g., to a voltage and/or a current required by tactile output generator 167 for generating tactile outputs so that the signals sent to tactile output generator 167 produce tactile outputs that correspond to the waveforms received from haptic feedback controller 161) and sends the amplified waveforms to tactile output generator 167. In response, tactile output generator 167 generates tactile outputs (e.g., by shifting a moveable mass back and forth in one or more dimensions relative to a neutral position of the moveable mass).

In some embodiments, the tactile output module includes sensor 169, which is coupled to tactile output generator 167. Sensor 169 detects states or state changes (e.g., mechanical position, physical displacement, and/or movement) of tactile output generator 167 or one or more components of tactile output generator 167 (e.g., one or more moving parts, such as a membrane, used to generate tactile outputs). In some embodiments, sensor 169 is a magnetic field sensor (e.g., a Hall effect sensor) or other displacement and/or movement sensor. In some embodiments, sensor 169 provides information (e.g., a position, a displacement, and/or a movement of one or more parts in tactile output generator 167) to haptic feedback controller 161 and, in accordance with the information provided by sensor 169 about the state of tactile output generator 167, haptic feedback controller 161 adjusts the waveforms output from haptic feedback controller 161 (e.g., waveforms sent to tactile output generator 167, optionally via amplifier 163).

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204 (sometimes called home button 204), push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 167 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

FIG. 4A illustrates an example user interface 400 for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) for wireless communication(s), such as cellular and Wi-Fi signals;
- Time;
- a Bluetooth indicator;
- a Battery status indicator;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, labeled "Music;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and Icon 446 for a settings application or module, which provides access to settings for device 100 and its various applications 136.

It should be noted that the icon labels illustrated in FIG. 4A are merely examples. For example, other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds is determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, a value produced by low-pass filtering the intensity of the contact over a predefined period or starting at a predefined time, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first intensity threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures described herein optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold ITS (e.g., that is at least initially higher than $IT_L$), and/or one or more other intensity thresholds (e.g., an intensity threshold $IT_H$ that is lower than $IT_L$)). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms (milliseconds) in duration (e.g., 40, 100, or 120 ms, depending on the magnitude of the second intensity threshold, with the delay time increasing as the second intensity threshold increases). This delay time helps to avoid accidental recognition of deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

Figure 4C:
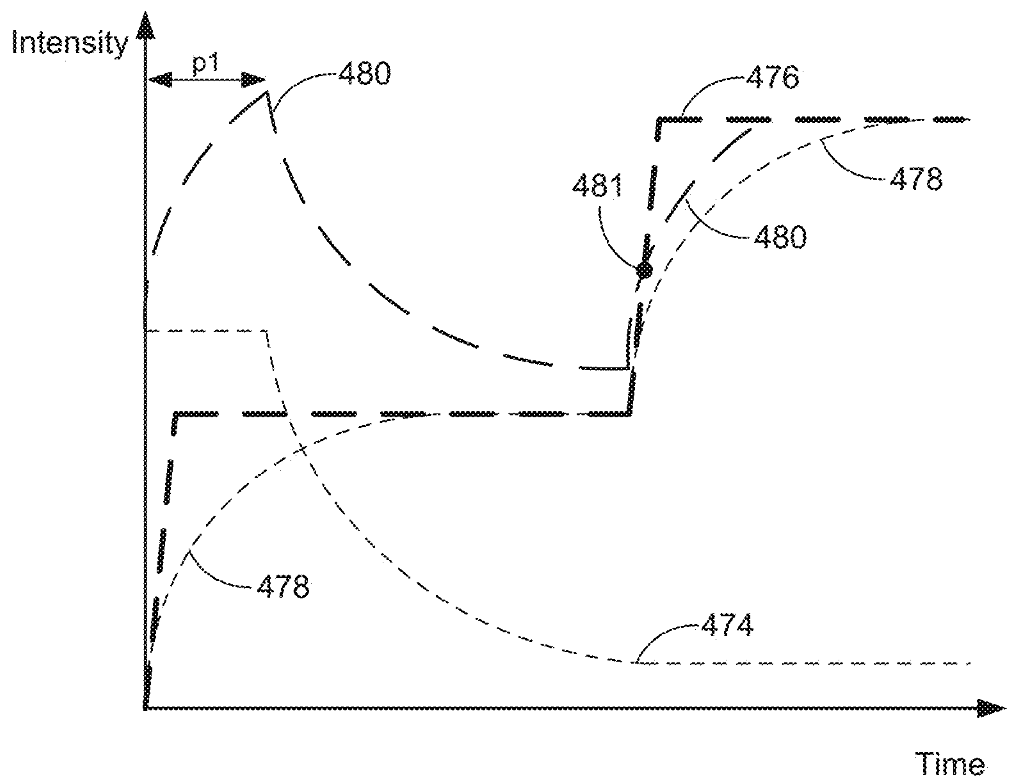
FIGS. 4C-4E illustrate examples of dynamic intensity thresholds, in accordance with some embodiments.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

Figure 4D:
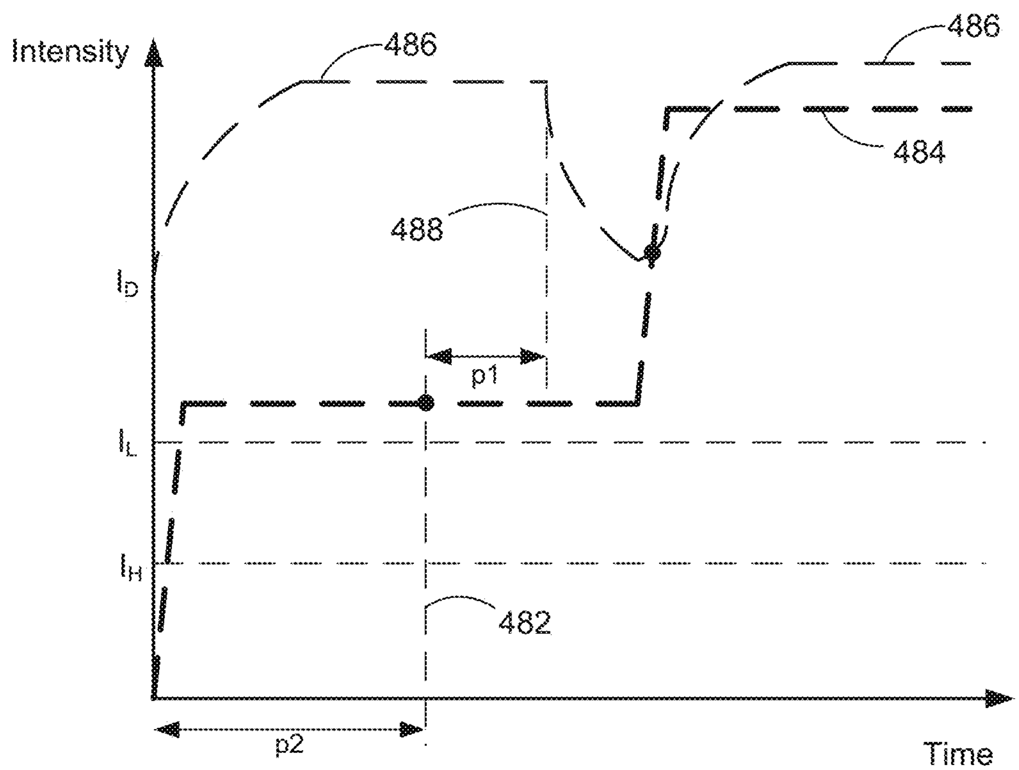

FIG. 4D illustrates another dynamic intensity threshold 486 (e.g., intensity threshold $I_D$). FIG. 4D also illustrates two other intensity thresholds: a first intensity threshold $I_H$ and a second intensity threshold $I_L$. In FIG. 4D, although touch input 484 satisfies the first intensity threshold $I_H$ and the second intensity threshold $I_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $I_L$ was triggered). This type of dynamic intensity threshold reduces accidental triggering of a response associated with the dynamic intensity threshold $I_D$ immediately after, or concurrently with, triggering a response associated with a lower intensity threshold, such as the first intensity threshold $I_H$ or the second intensity threshold $I_L$.

Figure 4E:
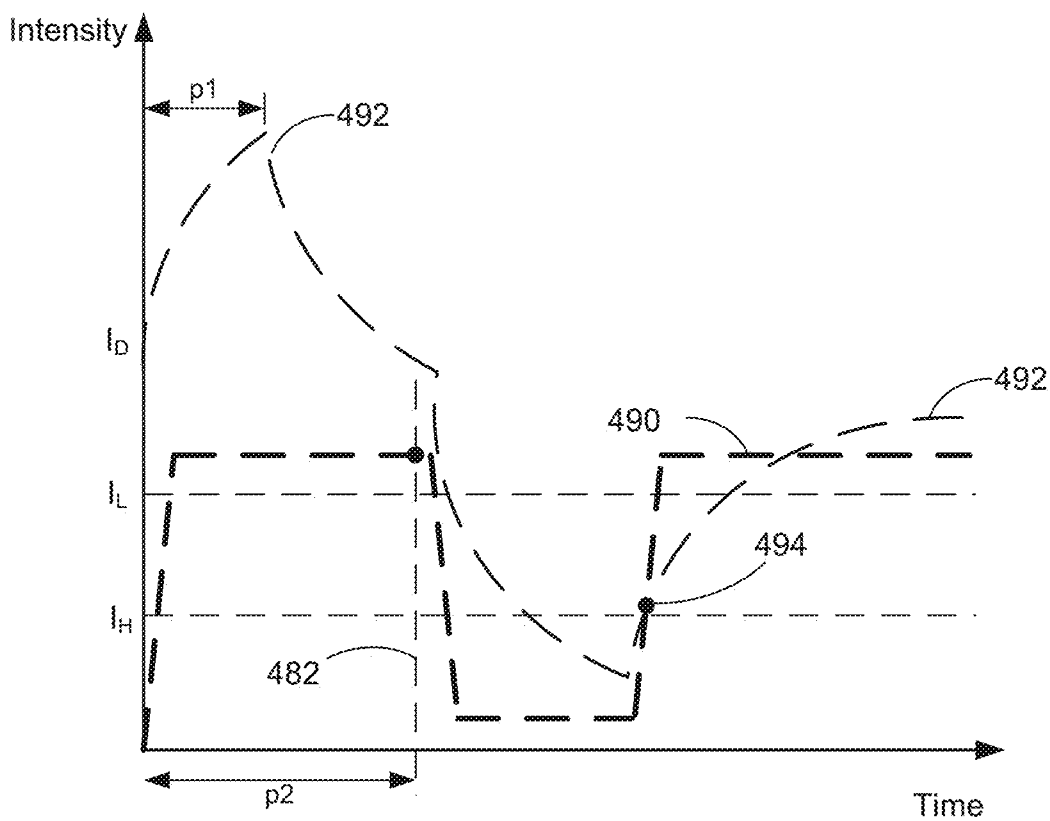

FIG. 4E illustrate yet another dynamic intensity threshold 492 (e.g., intensity threshold $I_D$). In FIG. 4E, a response associated with the intensity threshold $I_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $I_L$, followed by an increase in the intensity of touch input 490, without releasing touch input 490, can trigger a response associated with the intensity threshold $I_D$ (e.g., at time 494) even when the intensity of touch input 490 is below another intensity threshold, for example, the intensity threshold $I_L$.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a tactile output pattern specifies characteristics of a tactile output, such as the amplitude of the tactile output, the shape of a movement waveform of the tactile output, the frequency of the tactile output, and/or the duration of the tactile output.

When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device. Thus, the waveform, frequency and amplitude can be adjusted to indicate to the user that different operations have been performed. As such, tactile outputs with tactile output patterns that are designed, selected, and/or engineered to simulate characteristics (e.g., size, material, weight, stiffness, smoothness, etc.); behaviors (e.g., oscillation, displacement, acceleration, rotation, expansion, etc.); and/or interactions (e.g., collision, adhesion, repulsion, attraction, friction, etc.) of objects in a given environment (e.g., a user interface that includes graphical features and objects, a simulated physical environment with virtual boundaries and virtual objects, a real physical environment with physical boundaries and physical objects, and/or a combination of any of the above) will, in some circumstances, provide helpful feedback to users that reduces input errors and increases the efficiency of the user's operation of the device. Additionally, tactile outputs are, optionally, generated to correspond to feedback that is unrelated to a simulated physical characteristic, such as an input threshold or a selection of an object. Such tactile outputs will, in some circumstances, provide helpful feedback to users that reduces input errors and increases the efficiency of the user's operation of the device.

In some embodiments, a tactile output with a suitable tactile output pattern serves as a cue for the occurrence of an event of interest in a user interface or behind the scenes in a device. Examples of the events of interest include activation of an affordance (e.g., a real or virtual button, or toggle switch) provided on the device or in a user interface, success or failure of a requested operation, reaching or crossing a boundary in a user interface, entry into a new state, switching of input focus between objects, activation of a new mode, reaching or crossing an input threshold, detection or recognition of a type of input or gesture, etc. In some embodiments, tactile outputs are provided to serve as a warning or an alert for an impending event or outcome that would occur unless a redirection or interruption input is timely detected. Tactile outputs are also used in other contexts to enrich the user experience, improve the accessibility of the device to users with visual or motor difficulties or other accessibility needs, and/or improve efficiency and functionality of the user interface and/or the device. Tactile outputs are optionally accompanied with audio outputs and/or visible user interface changes, which further enhance a user's experience when the user interacts with a user interface and/or the device, and facilitate better conveyance of information regarding the state of the user interface and/or the device, and which reduce input errors and increase the efficiency of the user's operation of the device.

Figure 4F:
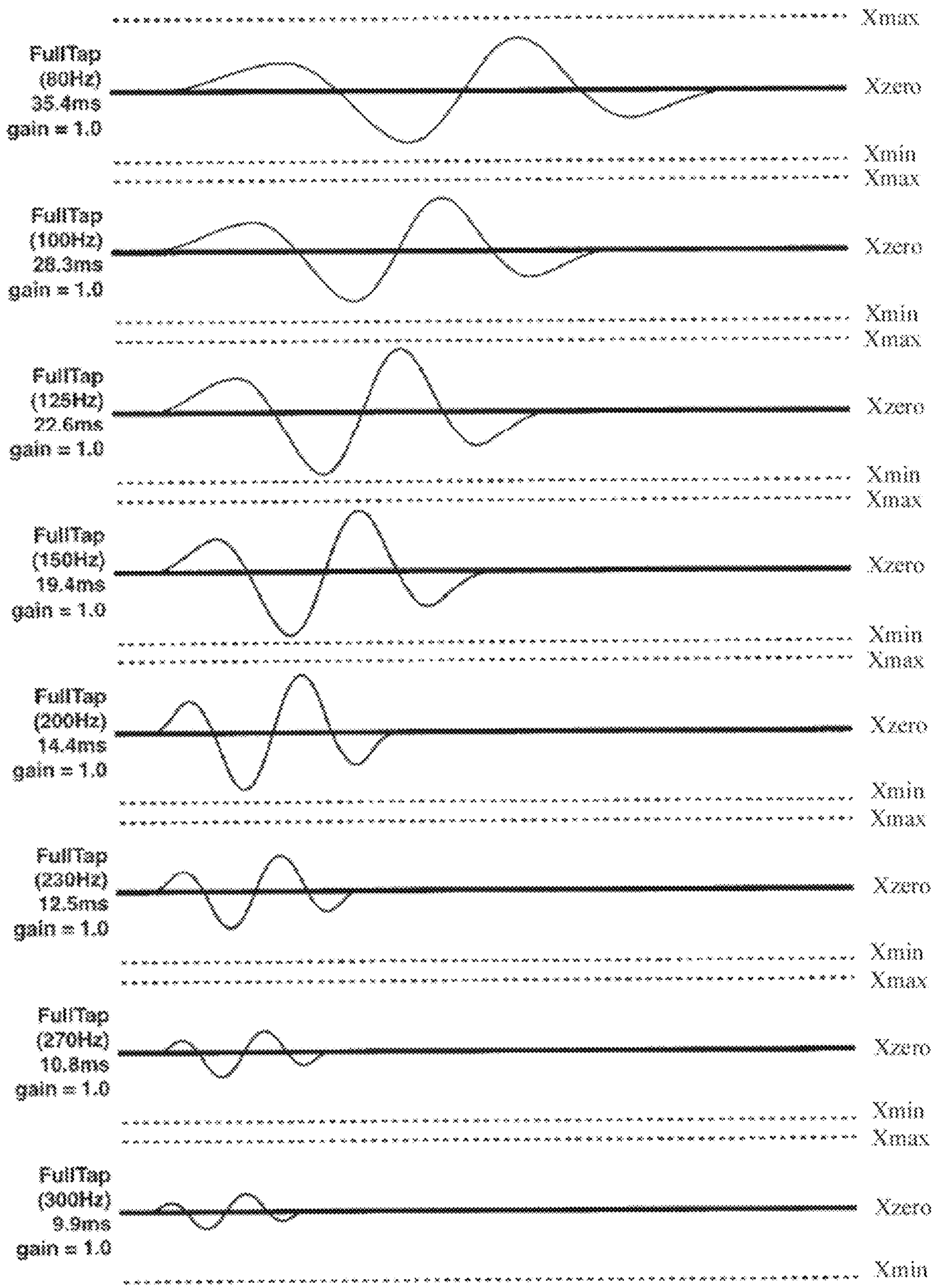
FIGS. 4F-4K illustrate a set of sample tactile output patterns, in accordance with some embodiments.
Figure 4G:
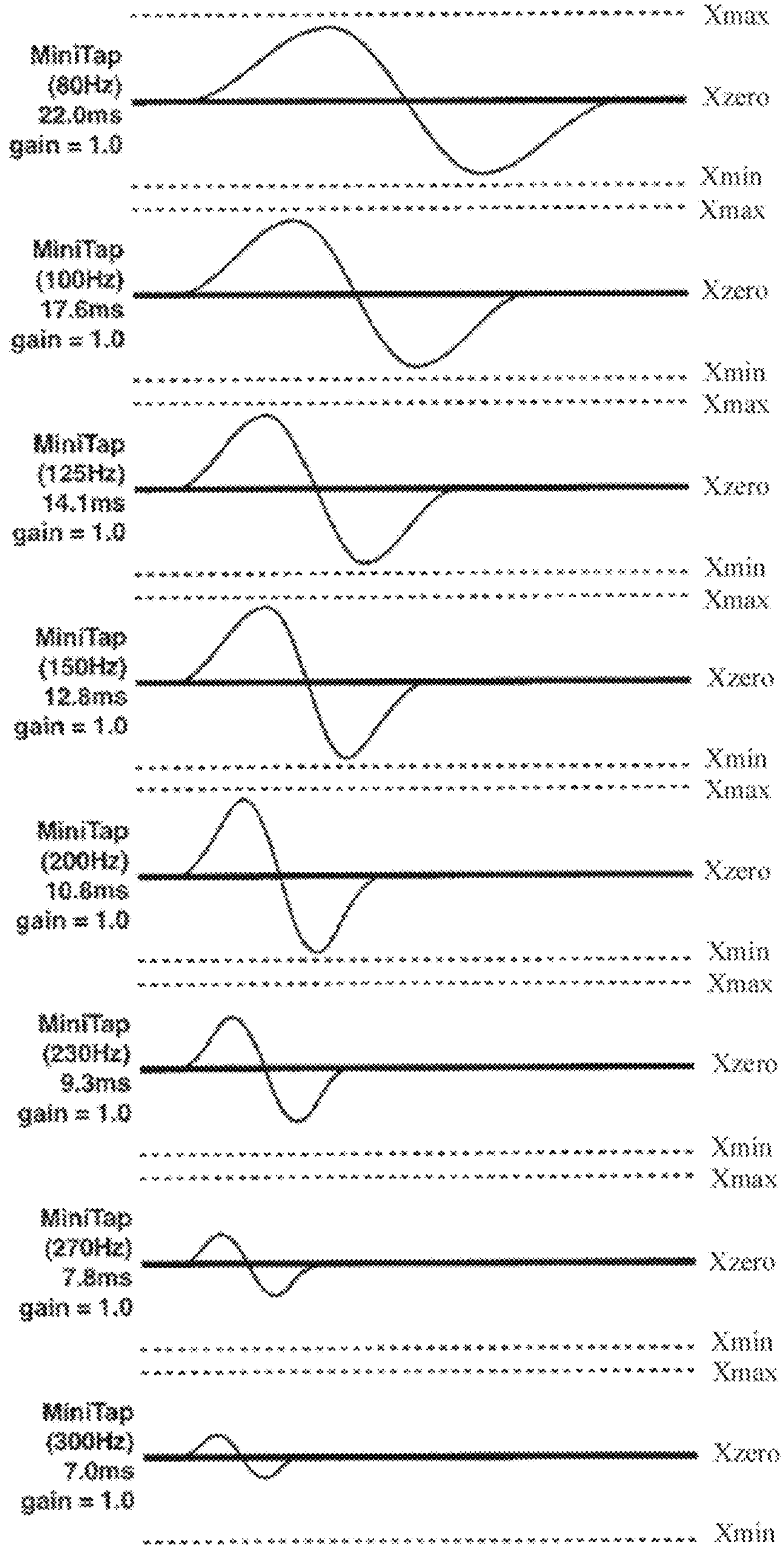
Figure 4H:
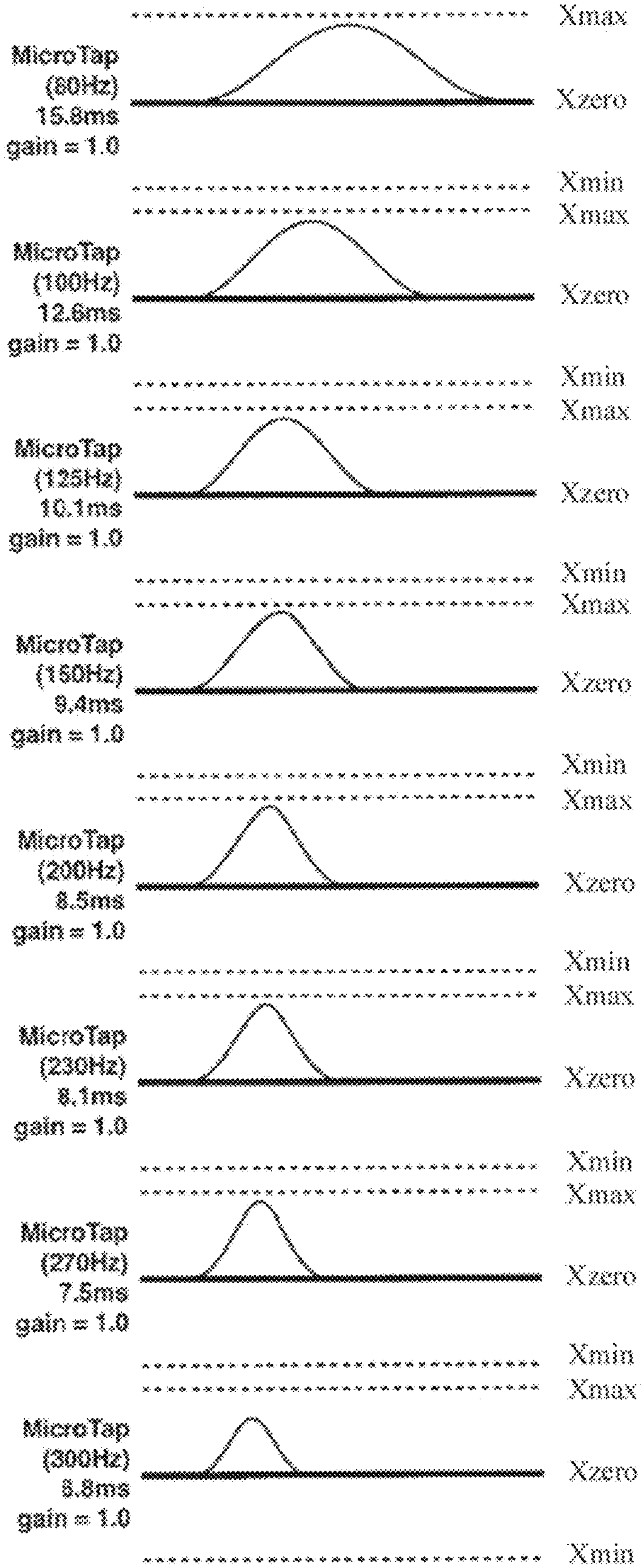
Figure 4I:
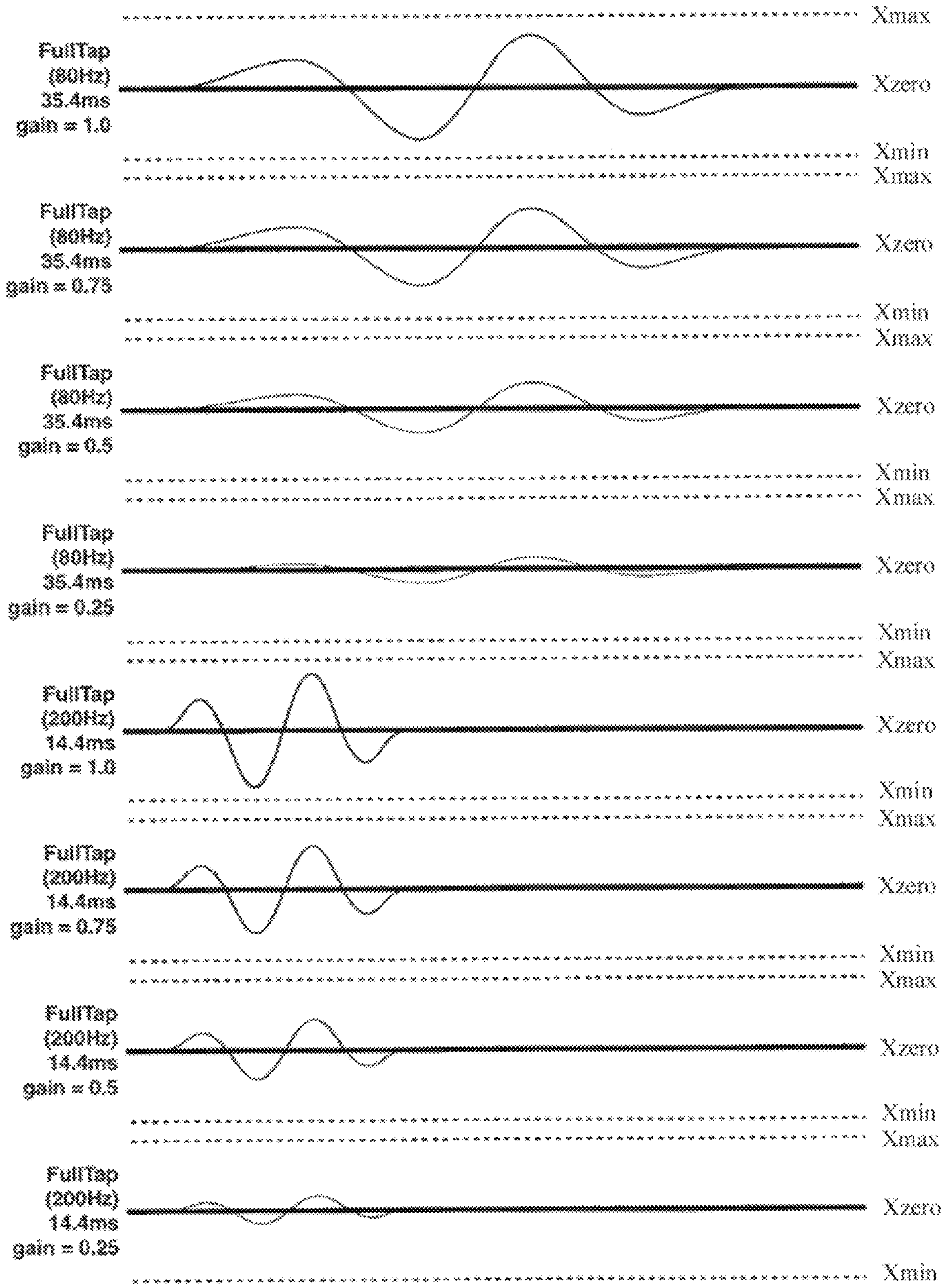
Figure 4J:
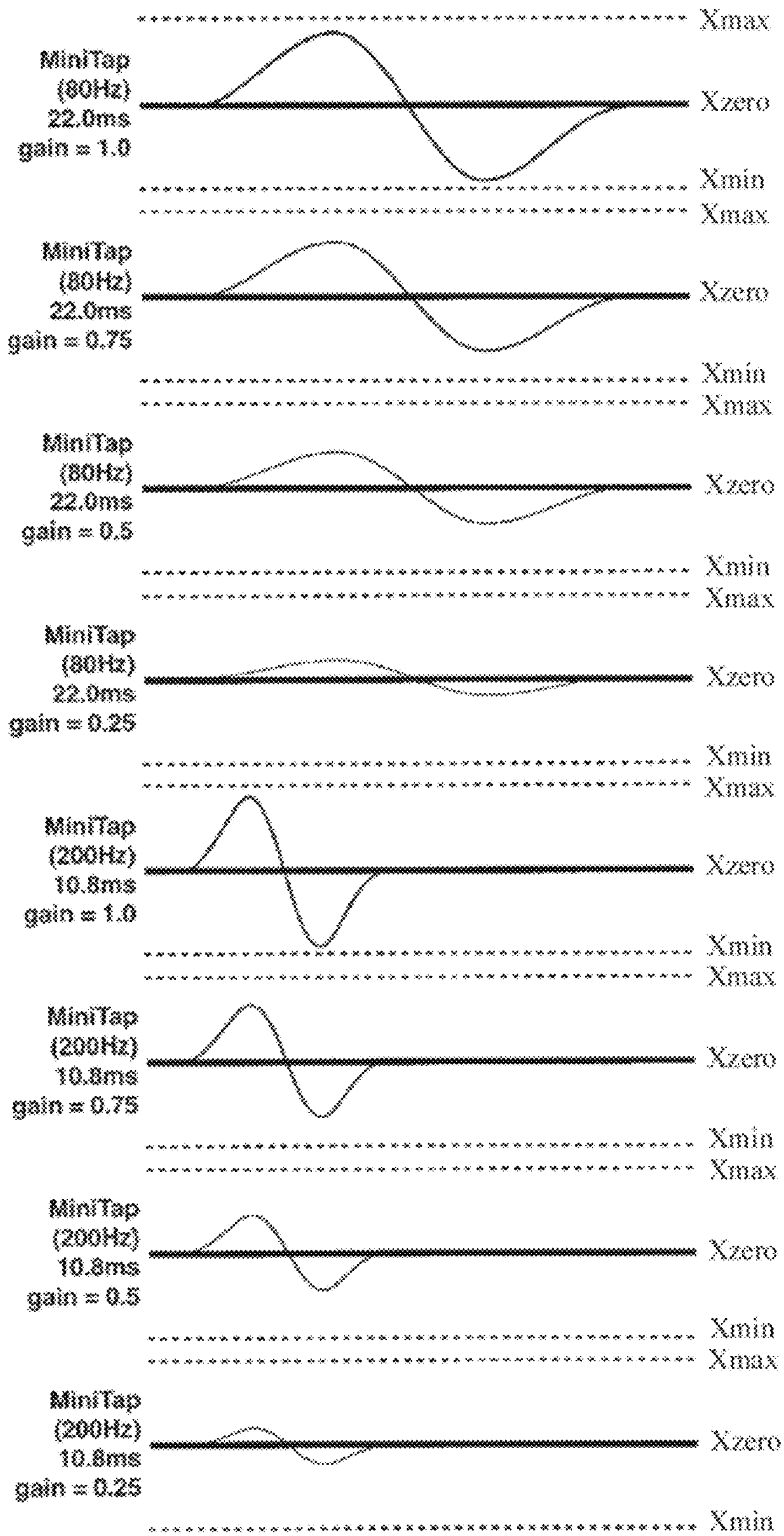
Figure 4K:
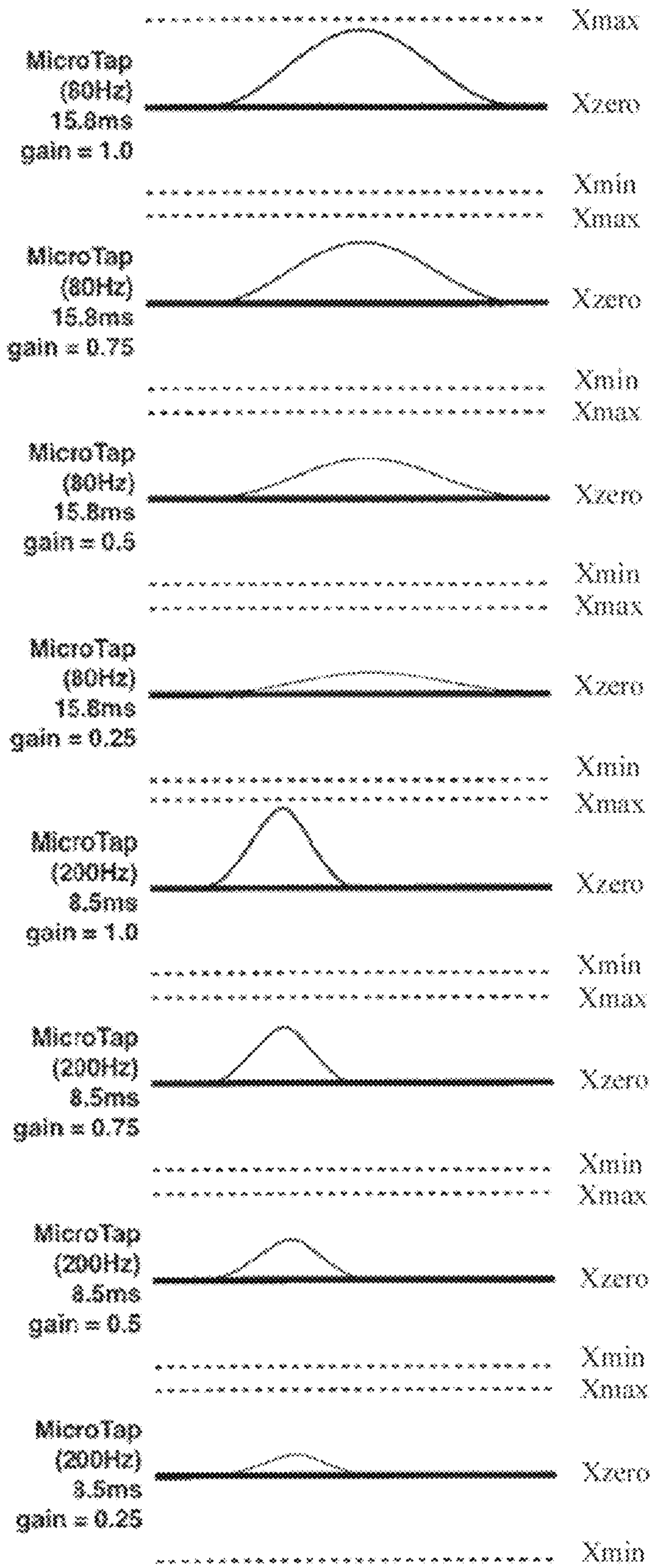

FIGS. 4F-4H provide a set of sample tactile output patterns that may be used, either individually or in combination, either as is or through one or more transformations (e.g., modulation, amplification, truncation, etc.), to create suitable haptic feedback in various scenarios and for various purposes, such as those mentioned above and those described with respect to the user interfaces and methods discussed herein. This example of a palette of tactile outputs shows how a set of three waveforms and eight frequencies can be used to produce an array of tactile output patterns. In addition to the tactile output patterns shown in these figures, each of these tactile output patterns is optionally adjusted in amplitude by changing a gain value for the tactile output pattern, as shown, for example for FullTap 80 Hz, FullTap 200 Hz, MiniTap 80 Hz, MiniTap 200 Hz, MicroTap 80 Hz, and MicroTap 200 Hz in FIGS. 4I-4K, which are each shown with variants having a gain of 1.0, 0.75, 0.5, and 0.25. As shown in FIGS. 4I-4K, changing the gain of a tactile output pattern changes the amplitude of the pattern without changing the frequency of the pattern or changing the shape of the waveform. In some embodiments, changing the frequency of a tactile output pattern also results in a lower amplitude as some tactile output generators are limited by how much force can be applied to the moveable mass and thus higher frequency movements of the mass are constrained to lower amplitudes to ensure that the acceleration needed to create the waveform does not require force outside of an operational force range of the tactile output generator (e.g., the peak amplitudes of the FullTap at 230 Hz, 270 Hz, and 300 Hz are lower than the amplitudes of the FullTap at 80 Hz, 100 Hz, 125 Hz, and 200 Hz).

FIGS. 4F-4K show tactile output patterns that have a particular waveform. The waveform of a tactile output pattern represents the pattern of physical displacements relative to a neutral position (e.g., xzero) versus time that a moveable mass goes through to generate a tactile output with that tactile output pattern. For example, a first set of tactile output patterns shown in FIG. 4F (e.g., tactile output patterns of a "FullTap") each have a waveform that includes an oscillation with two complete cycles (e.g., an oscillation that starts and ends in a neutral position and crosses the neutral position three times). A second set of tactile output patterns shown in FIG. 4G (e.g., tactile output patterns of a "MiniTap") each have a waveform that includes an oscillation that includes one complete cycle (e.g., an oscillation that starts and ends in a neutral position and crosses the neutral position one time). A third set of tactile output patterns shown in FIG. 4H (e.g., tactile output patterns of a "MicroTap") each have a waveform that includes an oscillation that include one half of a complete cycle (e.g., an oscillation that starts and ends in a neutral position and does not cross the neutral position). The waveform of a tactile output pattern also includes a start buffer and an end buffer that represent the gradual speeding up and slowing down of the moveable mass at the start and at the end of the tactile output. The example waveforms shown in FIGS. 4F-4K include xmin and xmax values which represent the maximum and minimum extent of movement of the moveable mass. For larger electronic devices with larger moveable masses, there may be larger or smaller minimum and maximum extents of movement of the mass. The examples shown in FIGS. 4F-4K describe movement of a mass in 1 dimension, however similar principles would also apply to movement of a moveable mass in two or three dimensions.

As shown in FIGS. 4F-4K, each tactile output pattern also has a corresponding characteristic frequency that affects the "pitch" of a haptic sensation that is felt by a user from a tactile output with that characteristic frequency. For a continuous tactile output, the characteristic frequency represents the number of cycles that are completed within a given period of time (e.g., cycles per second) by the moveable mass of the tactile output generator. For a discrete tactile output, a discrete output signal (e.g., with 0.5, 1, or 2 cycles) is generated, and the characteristic frequency value specifies how fast the moveable mass needs to move to generate a tactile output with that characteristic frequency. As shown in FIGS. 4F-4H, for each type of tactile output (e.g., as defined by a respective waveform, such as FullTap, MiniTap, or MicroTap), a higher frequency value corresponds to faster movement(s) by the moveable mass, and hence, in general, a shorter time to complete the tactile output (e.g., including the time to complete the required number of cycle(s) for the discrete tactile output, plus a start and an end buffer time). For example, a FullTap with a characteristic frequency of 80 Hz takes longer to complete than FullTap with a characteristic frequency of 100 Hz (e.g., 35.4 ms vs. 28.3 ms in FIG. 4F). In addition, for a given frequency, a tactile output with more cycles in its waveform at a respective frequency takes longer to complete than a tactile output with fewer cycles its waveform at the same respective frequency. For example, a FullTap at 150 Hz takes longer to complete than a MiniTap at 150 Hz (e.g., 19.4 ms vs. 12.8 ms), and a MiniTap at 150 Hz takes longer to complete than a MicroTap at 150 Hz (e.g., 12.8 ms vs. 9.4 ms). However, for tactile output patterns with different frequencies this rule may not apply (e.g., tactile outputs with more cycles but a higher frequency may take a shorter amount of time to complete than tactile outputs with fewer cycles but a lower frequency, and vice versa). For example, at 300 Hz, a FullTap takes as long as a MiniTap (e.g., 9.9 ms).

As shown in FIGS. 4F-4K, a tactile output pattern also has a characteristic amplitude that affects the amount of energy that is contained in a tactile signal, or a "strength" of a haptic sensation that may be felt by a user through a tactile output with that characteristic amplitude. In some embodiments, the characteristic amplitude of a tactile output pattern refers to an absolute or normalized value that represents the maximum displacement of the moveable mass from a neutral position when generating the tactile output. In some embodiments, the characteristic amplitude of a tactile output pattern is adjustable, e.g., by a fixed or dynamically determined gain factor (e.g., a value between 0 and 1), in accordance with various conditions (e.g., customized based on user interface contexts and behaviors) and/or preconfigured metrics (e.g., input-based metrics, and/or user-interface-based metrics). In some embodiments, an input-based metric (e.g., an intensity-change metric or an input-speed metric) measures a characteristic of an input (e.g., a rate of change of a characteristic intensity of a contact in a press input or a rate of movement of the contact across a touch-sensitive surface) during the input that triggers generation of a tactile output. In some embodiments, a user-interface-based metric (e.g., a speed-across-boundary metric) measures a characteristic of a user interface element (e.g., a speed of movement of the element across a hidden or visible boundary in a user interface) during the user interface change that triggers generation of the tactile output. In some embodiments, the characteristic amplitude of a tactile output pattern may be modulated by an "envelope" and the peaks of adjacent cycles may have different amplitudes, where one of the waveforms shown above is further modified by multiplication by an envelope parameter that changes over time (e.g., from 0 to 1) to gradually adjust amplitude of portions of the tactile output over time as the tactile output is being generated.

Although only specific frequencies, amplitudes, and waveforms are represented in the sample tactile output patterns in FIGS. 4F-4K for illustrative purposes, tactile output patterns with other frequencies, amplitudes, and waveforms may be used for similar purposes. For example, waveforms that have between 0.5 to 4 cycles can be used. Other frequencies in the range of 60 Hz-400 Hz may be used as well.

User Interfaces and Associated Processes

Attention is now directed towards embodiments of user interfaces ("UI") and associated processes that may be implemented on an electronic device, such as portable multifunction device 100 or device 300, with a display, a touch-sensitive surface, (optionally) one or more tactile output generators for generating tactile outputs, and (optionally) one or more sensors to detect intensities of contacts with the touch-sensitive surface.

FIGS. 5A-5AT illustrate example user interfaces for displaying a representation of a virtual object while switching from displaying a first user interface region to displaying a second user interface region, in accordance with some embodiments. The user interfaces in these figures are used to illustrate the processes described below, including the processes in FIGS. 8A-8E, 9A-9D, 10A-10D, 16A-16G, 17A-17D, 18A-18I, 19A-19H, and 20A-20F. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIG. 5A illustrates a real-world context in which user interfaces described with regard to 5B-5AT are used.

FIG. 5A illustrates physical space 5002 in which a table 5004 is located. Device 100 is held by a user in the user's hand 5006.

Figure 5B:
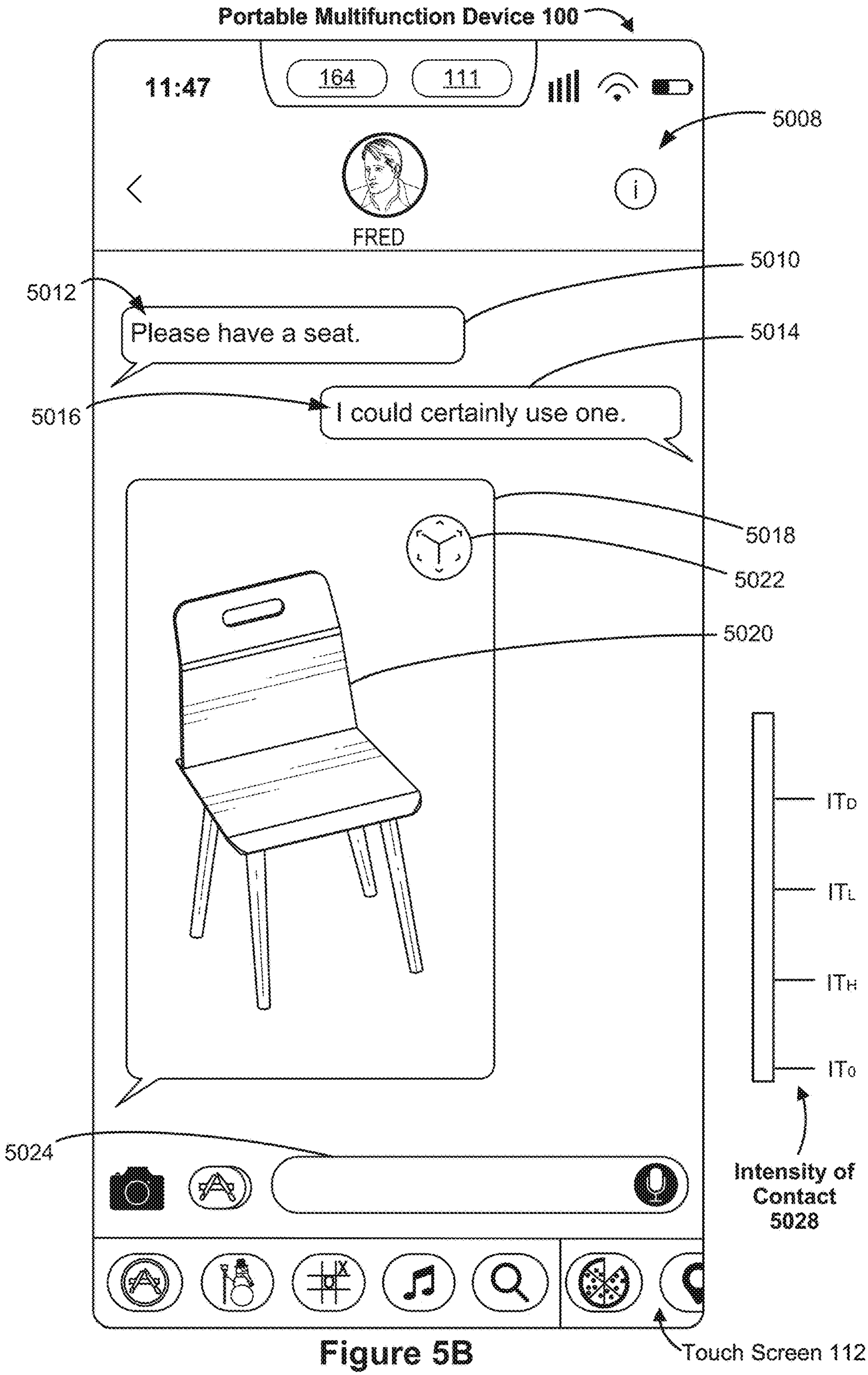

FIG. 5B illustrates a messaging user interface 5008, displayed on display 112. The messaging user interface 5008 includes a message bubble 5010 that includes a received text message 5012, a message bubble 5014 that includes a sent text message 5016, a message bubble 5018 that includes a virtual object (e.g., virtual chair 5020) received in a message, and a virtual object indicator 5022 to indicate that the virtual chair 5020 is an object that is viewable in an augmented reality view (e.g., within a representation of field of view of one or more cameras of device 100). Messaging user interface 5008 also includes a message input region 5024 that is configured to display message input.

Figure 5C:
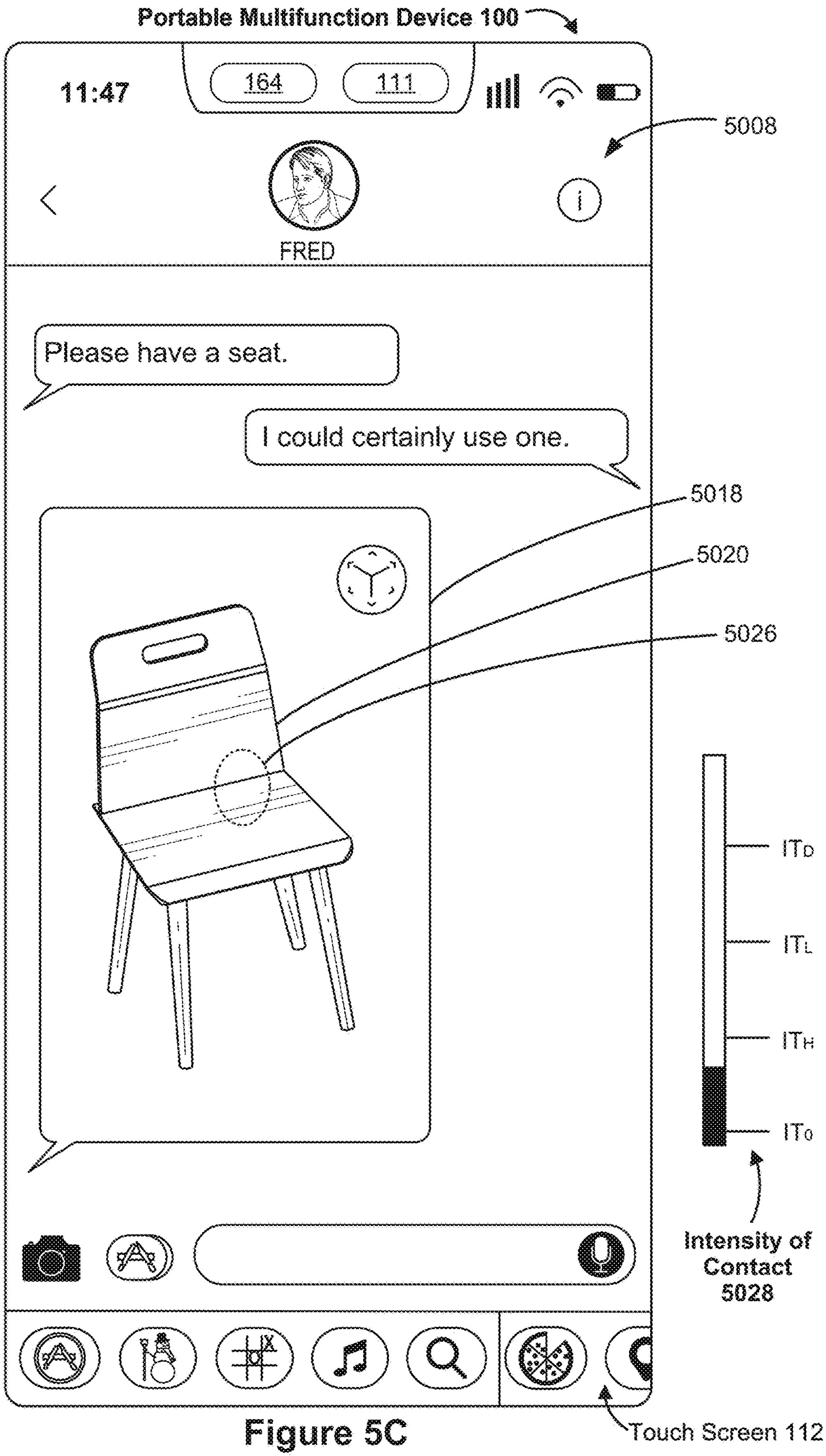
Figure 5D:
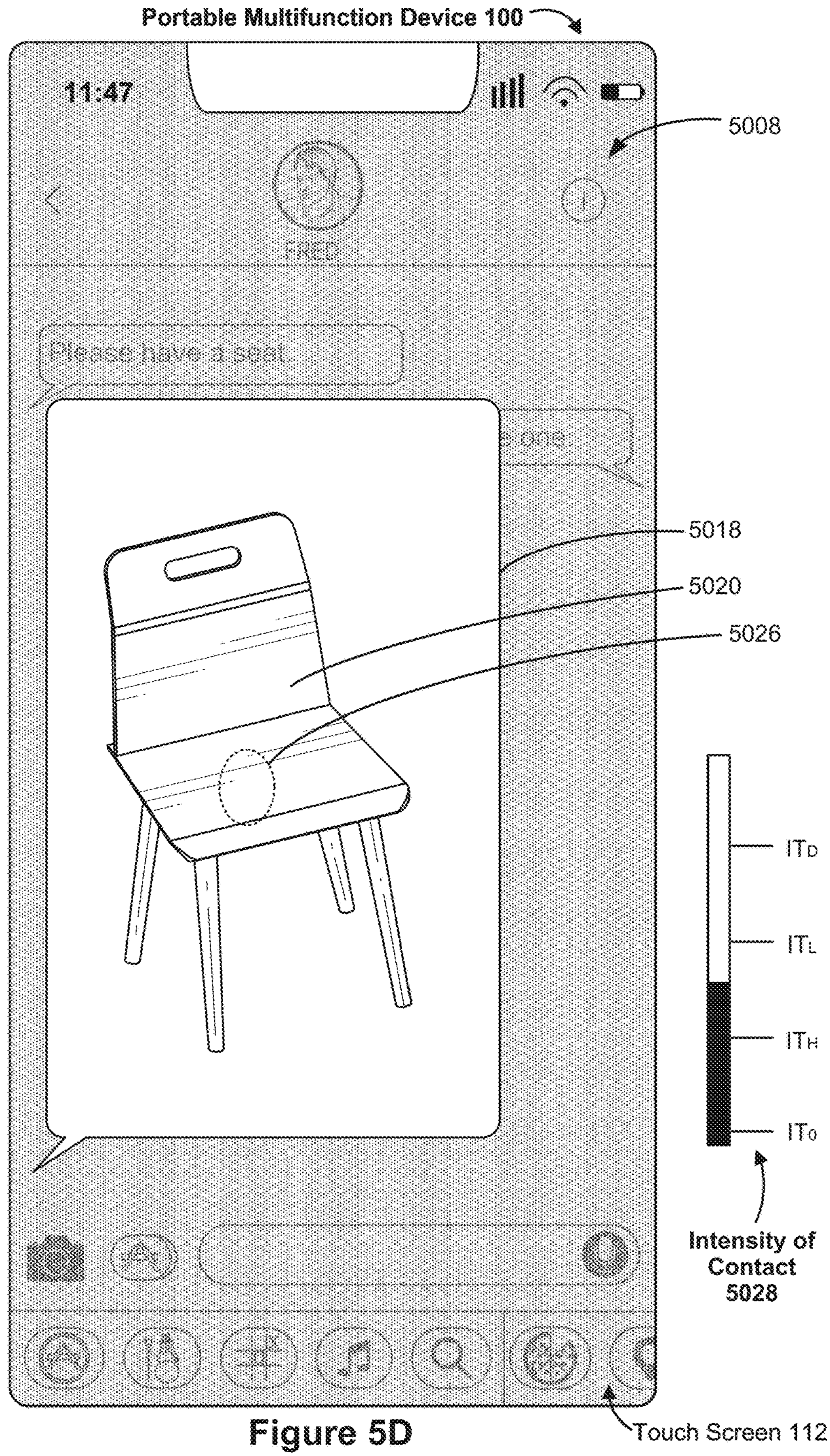
Figure 5E:
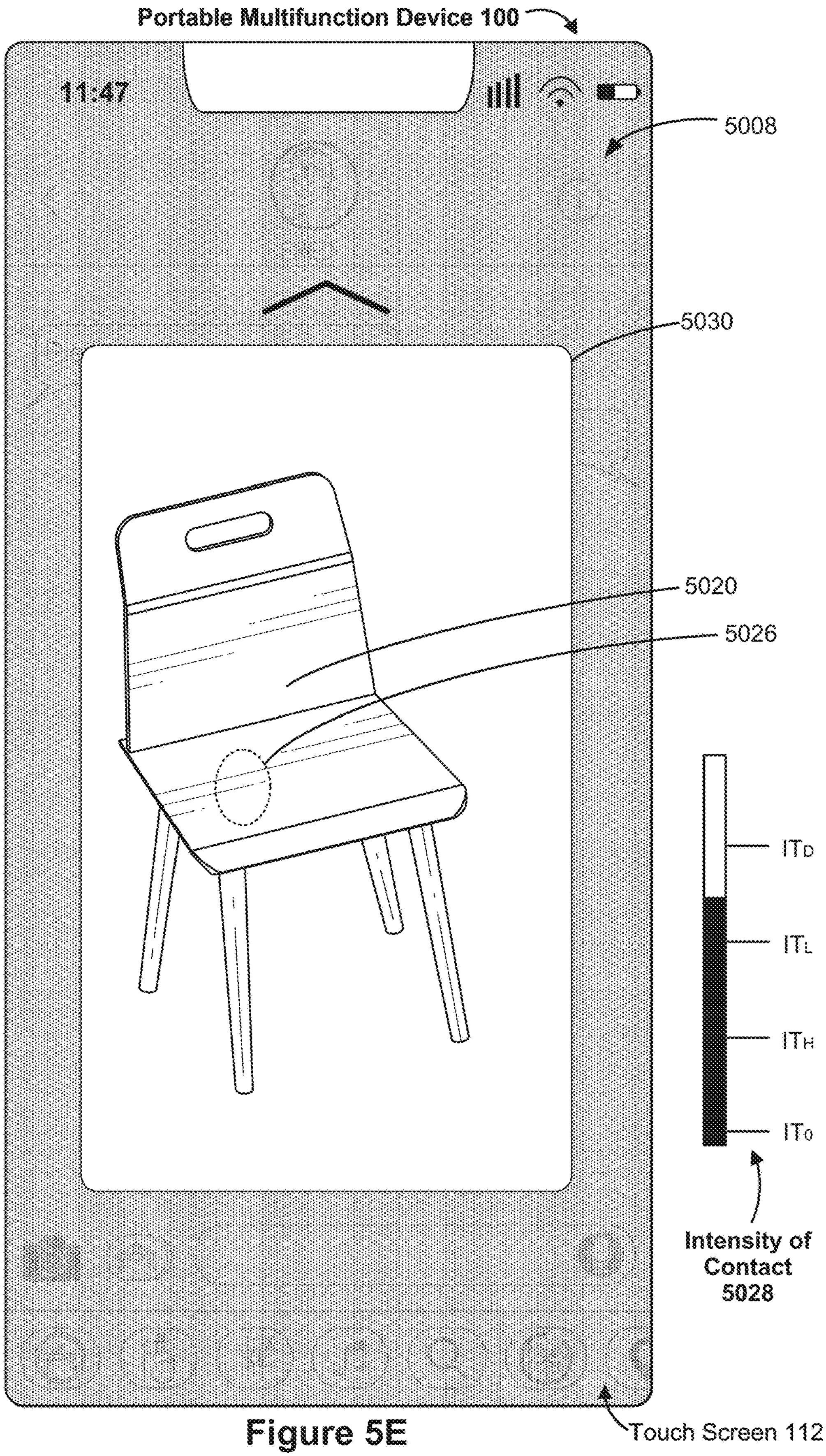
Figure 5F:
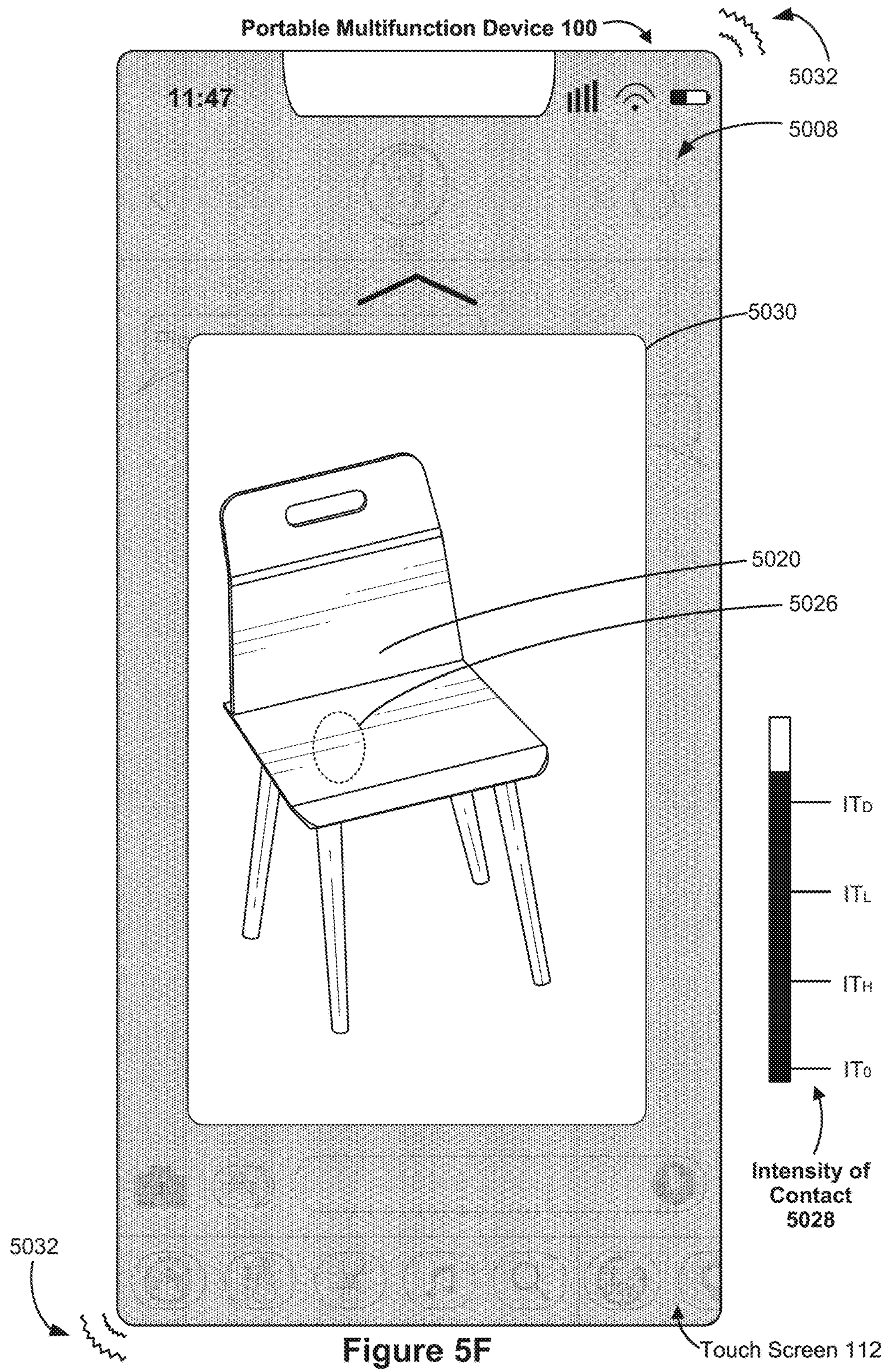
Figure 5G:
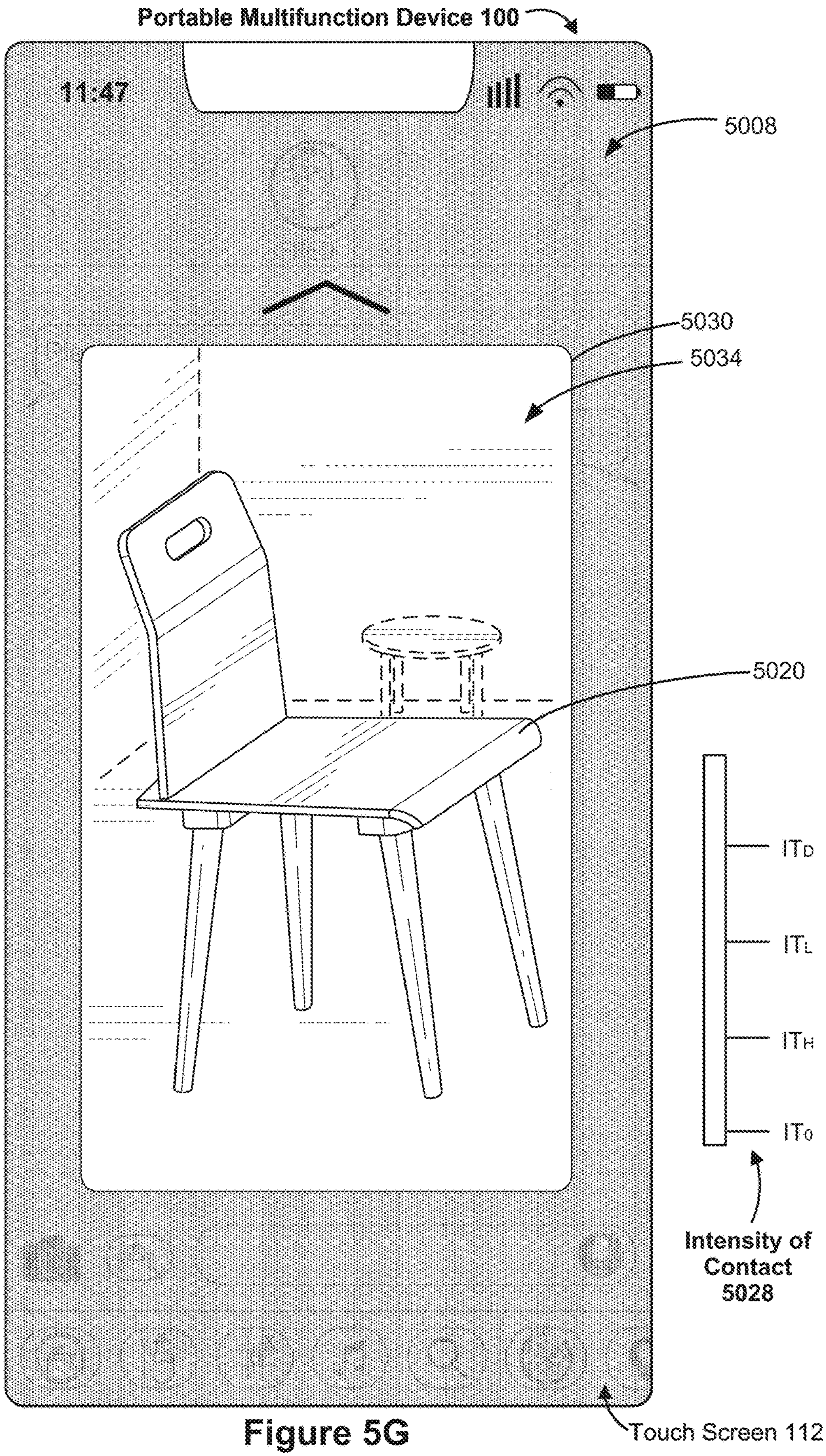

FIGS. 5C-5G illustrate an input that that causes a portion of the messaging user interface 5008 to be replaced by a field of view of one or more cameras of device 100. In FIG. 5C, a contact 5026 with touch screen 112 of device 100 is detected. A characteristic intensity of the contact is above a contact detection intensity threshold $IT_0$ and below a hint press intensity threshold $IT_H$, as illustrated by intensity level meter 5028. In FIG. 5D, an increase in the characteristic intensity of the contact 5026 above the hint press intensity threshold $IT_H$, as illustrated by intensity level meter 5028, has caused the area of message bubble 5018 to increase, the size of the virtual chair 5020 to increase, and messaging user interface 5008 to begin to be blurred behind message bubble 5018 (e.g., to provide visual feedback to the user of the effect of increasing the characteristic intensity of the contact). In FIG. 5E, an increase in the characteristic intensity of the contact 5026 above the light press intensity threshold $IT_L$, as illustrated by intensity level meter 5028, has caused message bubble 5018 to be replaced by a platter 5030, the size of the virtual chair 5020 to increase further, and increased blurring of messaging user interface 5008 behind platter 5030. In FIG. 5F, an increase in the characteristic intensity of the contact 5026 above the deep press intensity threshold $IT_D$, as illustrated by intensity level meter 5028, causes tactile output generators 167 of the device 100 to output a tactile output (as illustrated at 5032) to indicate that criteria have been met for replacing a portion of the messaging user interface 5008 with a field of view of one or more cameras of device 100.

In some embodiments, before the characteristic intensity of the contact 5026 reaches the deep press intensity threshold $IT_D$, as illustrated in FIG. 5F, the progression illustrated in FIGS. 5C-5E is reversible. For example, reducing the characteristic intensity of the contact 5026 after the increases illustrated in FIGS. 5D and/or 5E will cause the interface state that corresponds to the decreased intensity level of the contact 5026 to be displayed (e.g., the interface as shown in FIG. 5E is shown in accordance with a determination that the reduced characteristic intensity of the contact is above the light press intensity threshold $IT_L$, the interface as shown in FIG. 5D is shown in accordance with a determination that the reduced characteristic intensity of the contact is above the hint press intensity threshold $IT_H$, and the interface as shown in FIG. 5C is shown in accordance with a determination that the reduced characteristic intensity of the contact is below the hint press intensity threshold $IT_H$). In some embodiments, reducing the characteristic intensity of the contact 5026 after the increases illustrated in FIGS. 5D and/or 5E will cause the interface as shown in FIG. 5C to be redisplayed.

Figure 5H:
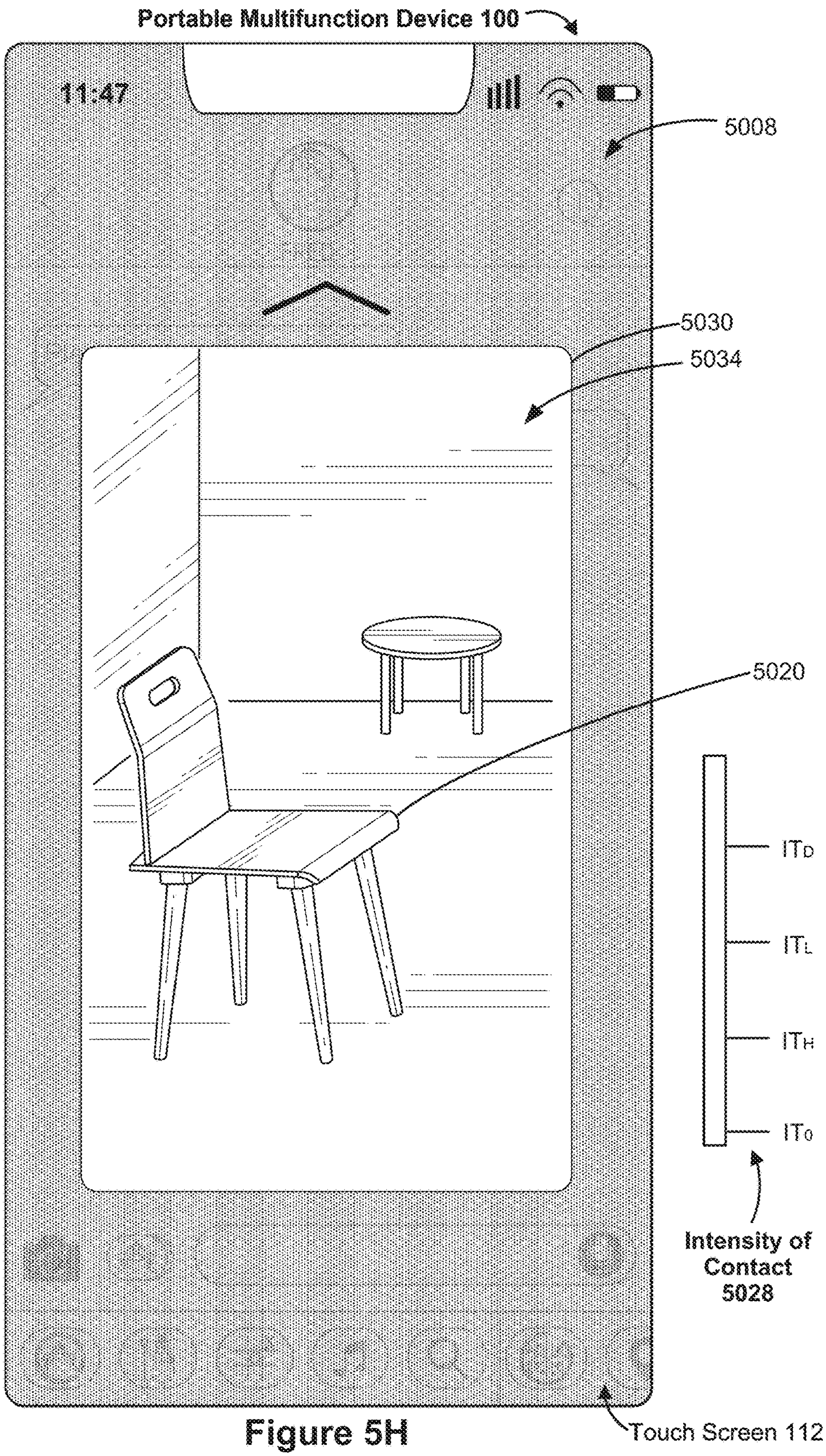
Figure 5I:
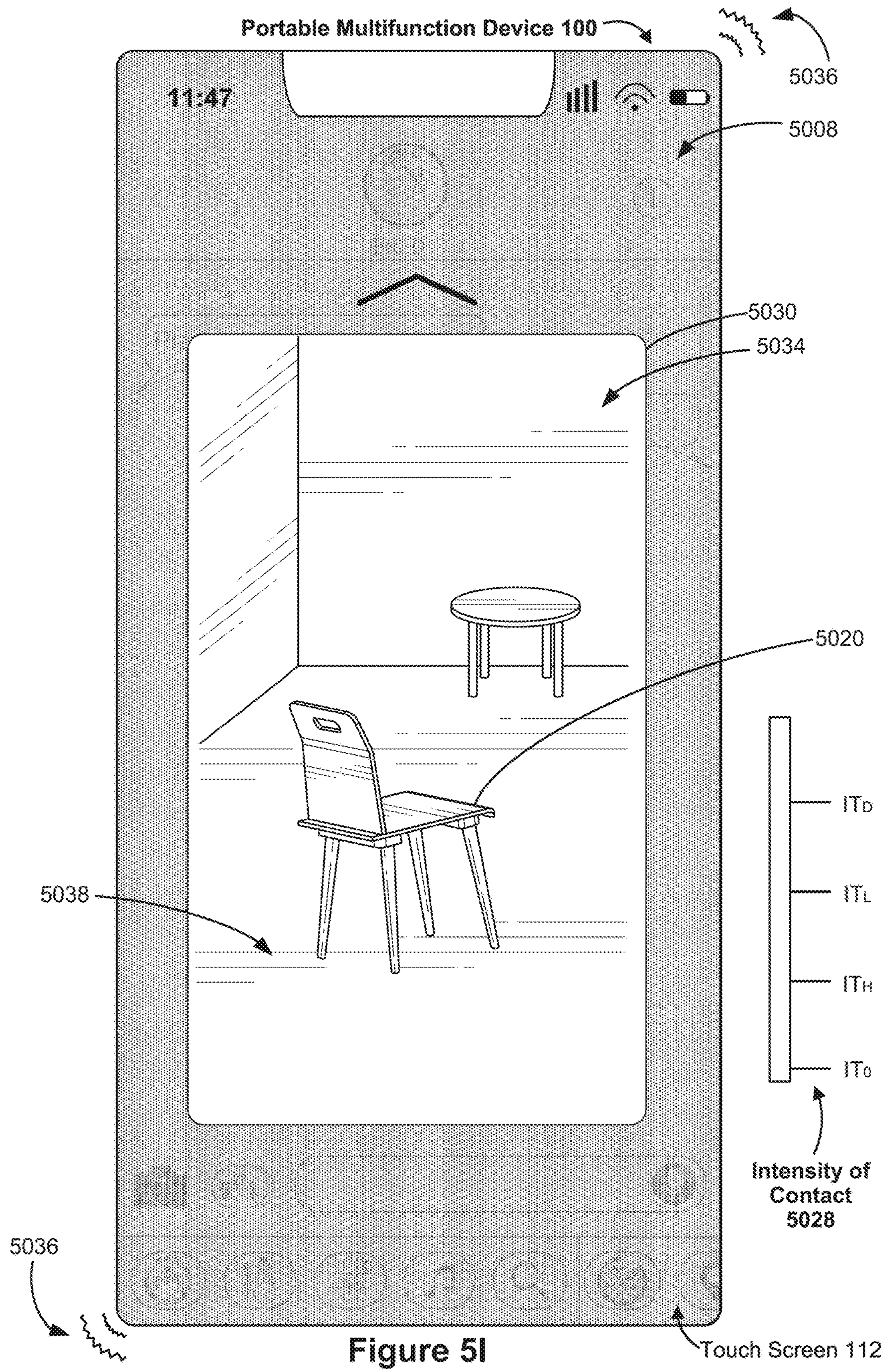
Figure 5J:
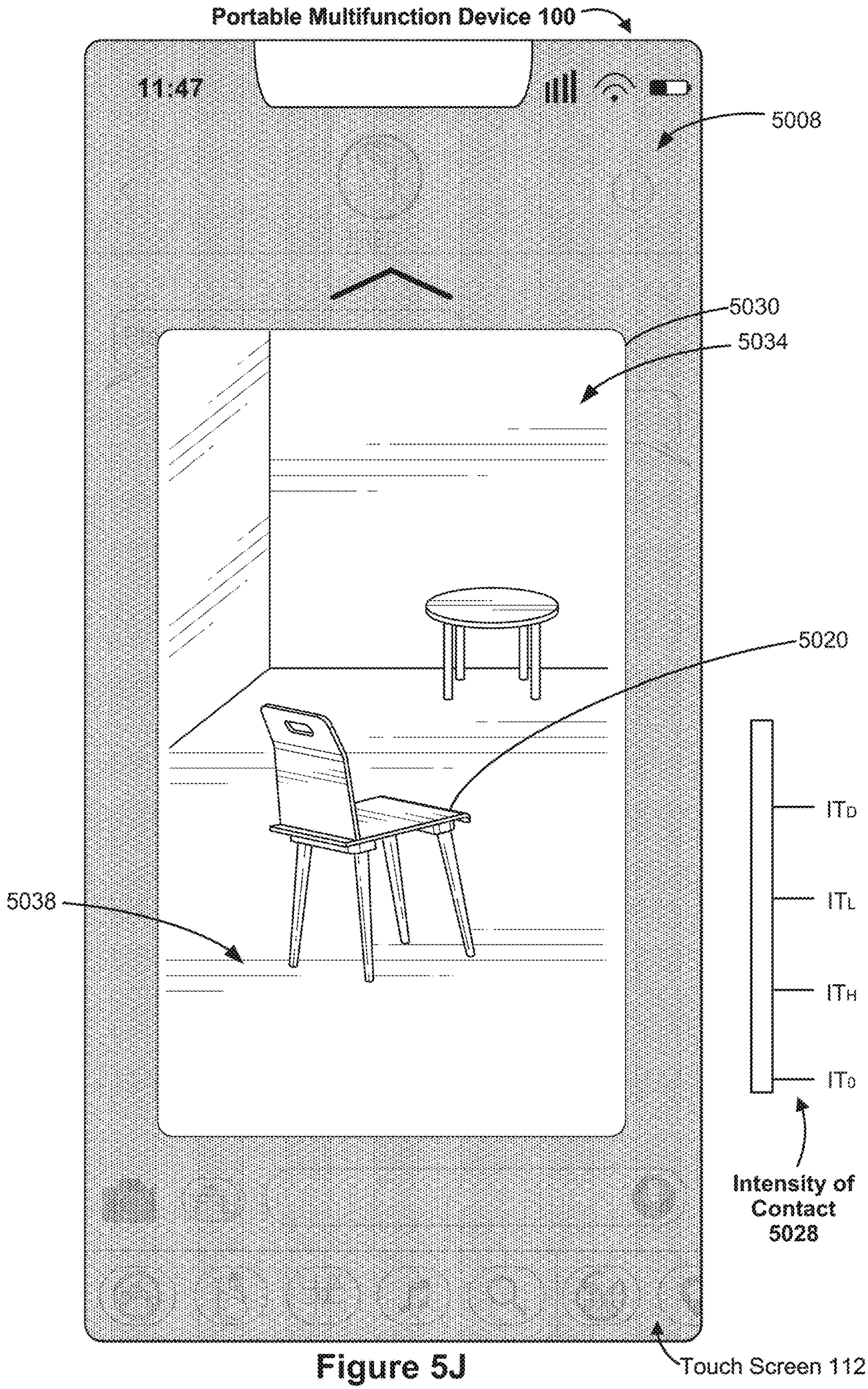

FIGS. 5F-5J illustrate an animated transition during which a portion of the messaging user interface is replaced with the field of view of one or more cameras (hereinafter "the camera(s)") of device 100. From FIG. 5F to FIG. 5G, contact 5026 has lifted off of touch screen 112 and the virtual chair 5020 has rotated toward its final position in FIG. 5I In FIG. 5G, the field of view 5034 of the camera(s) has begun to fade into view in platter 5030 (as indicated by the dotted lines). In FIG. 5H, the field of view 5034 of the camera(s) (e.g., showing a view of physical space 5002 as captured by the camera(s)) has completed fading into view in platter 5030. From FIG. 5H to FIG. 5I, the virtual chair 5020 has continued its rotation toward its final position in FIG. 5I In FIG. 5I, the tactile output generators 167 have output a tactile output (as illustrated at 5036) to indicate that at least one plane (e.g., a floor surface 5038) has been detected in the field of view 5034 of the camera(s). The virtual chair 5020 is placed on the detected plane (e.g., in accordance with a determination by device 100 that the virtual object is configured to be placed in an upright orientation on a detected horizontal surface, such as floor surface 5038). The size of the virtual chair 5020 is continuously adjusted on display 112 as the portion of the messaging user interface is transformed into a representation of the field of view 5034 of the camera(s) on display 112. For example, the scale of the virtual chair 5020 relative to the physical space 5002 as shown in the field of view 5034 of the camera(s) is determined based on a predefined "real world" size of the virtual chair 5020 and/or a detected size of objects (such as table 5004) in the field of view 5034 of the camera(s). In FIG. 5J, the virtual chair 5020 is displayed at its final position with a predefined orientation relative to the detected floor surface in the field of view 5034 of the camera(s). In some embodiments, the initial landing position of the virtual chair 5020 is a predefined position relative to the detected plane in the field of view of the camera(s), such as in the center of an unoccupied region of the detected plane. In some embodiments, the initial landing position of the virtual chair 5020 is determined in accordance with a lift-off position of the contact 5026 (e.g., the lift-off position of the contact 5026 may be different from the initial touch-down location of the contact 5026 due to movement of contact 5026 across the touch-screen 112 after the criteria for transitioning to the augmented reality environment have been met in FIG. 5F).

Figure 5K:
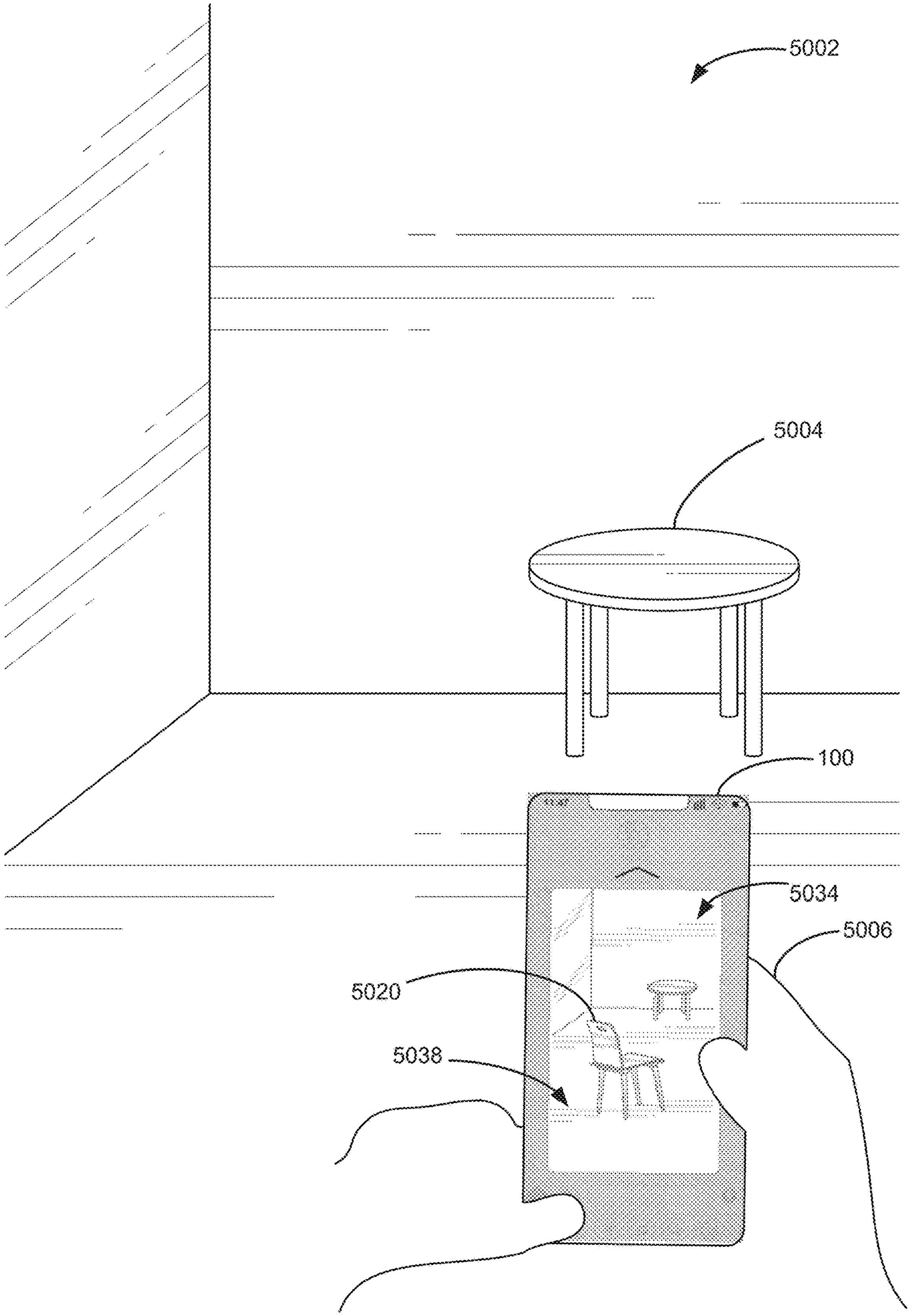
Figure 5L:
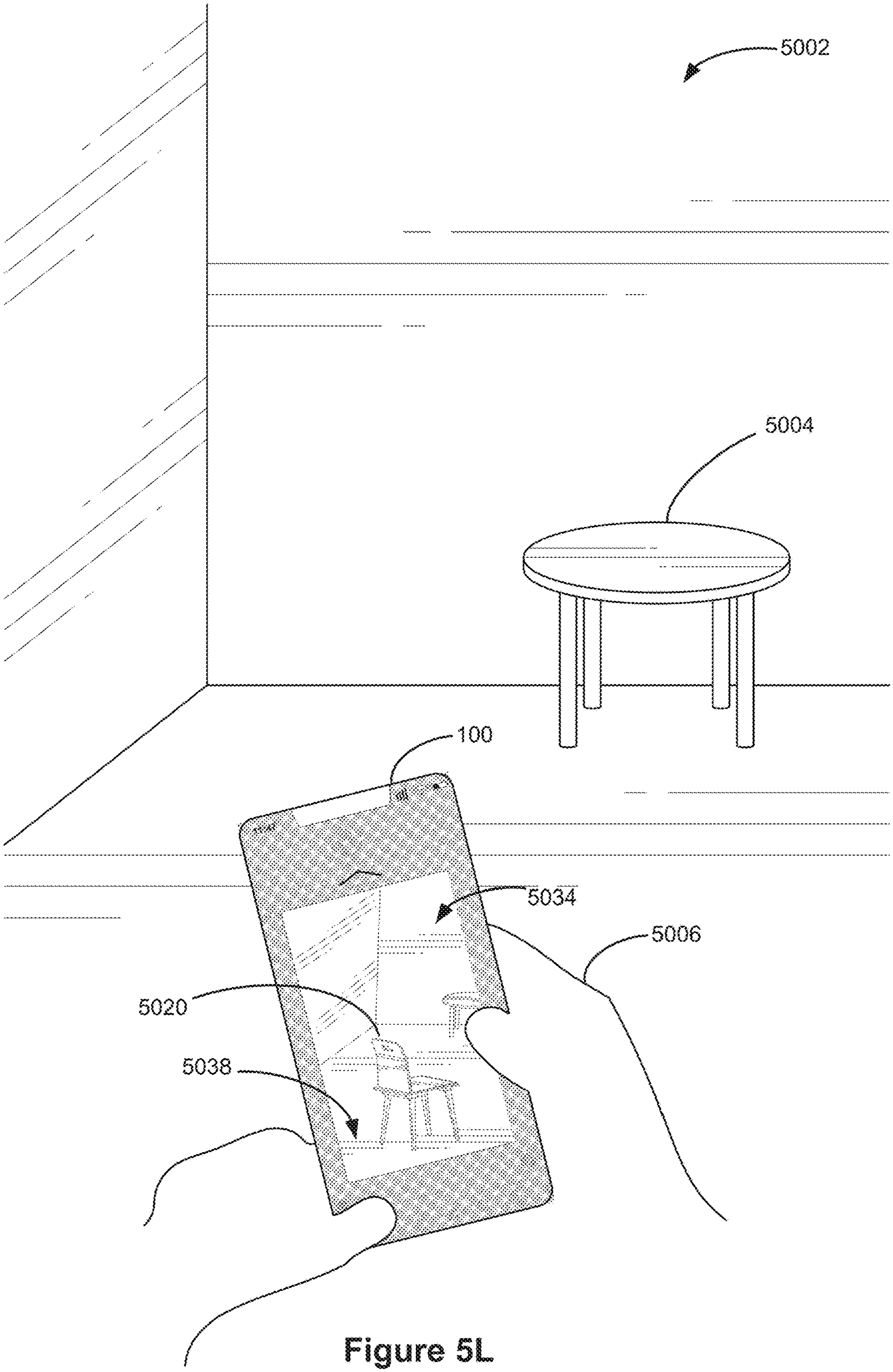
Figure 5M:
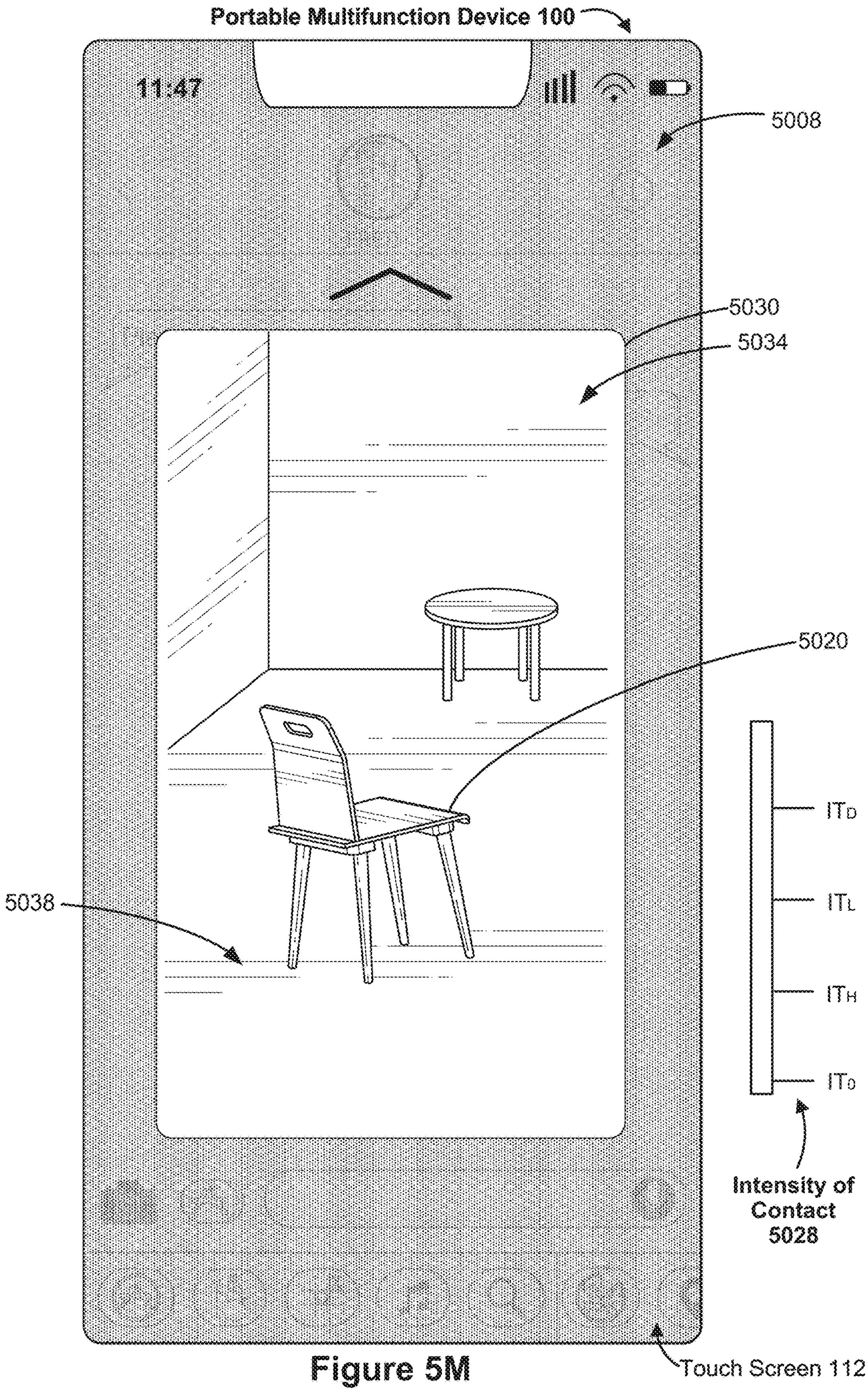

FIGS. 5K-5L illustrate movement (e.g., by user's hands 5006) of device 100 that adjusts the field of view 5034 of the camera(s). As the device 100 is moved relative to physical space 5002, the displayed field of view 5034 of the camera(s) changes and virtual chair 5020 remains affixed to the same position and orientation relative to floor surface 5038 in the displayed field of view 5034 of the camera(s).

Figure 5N:
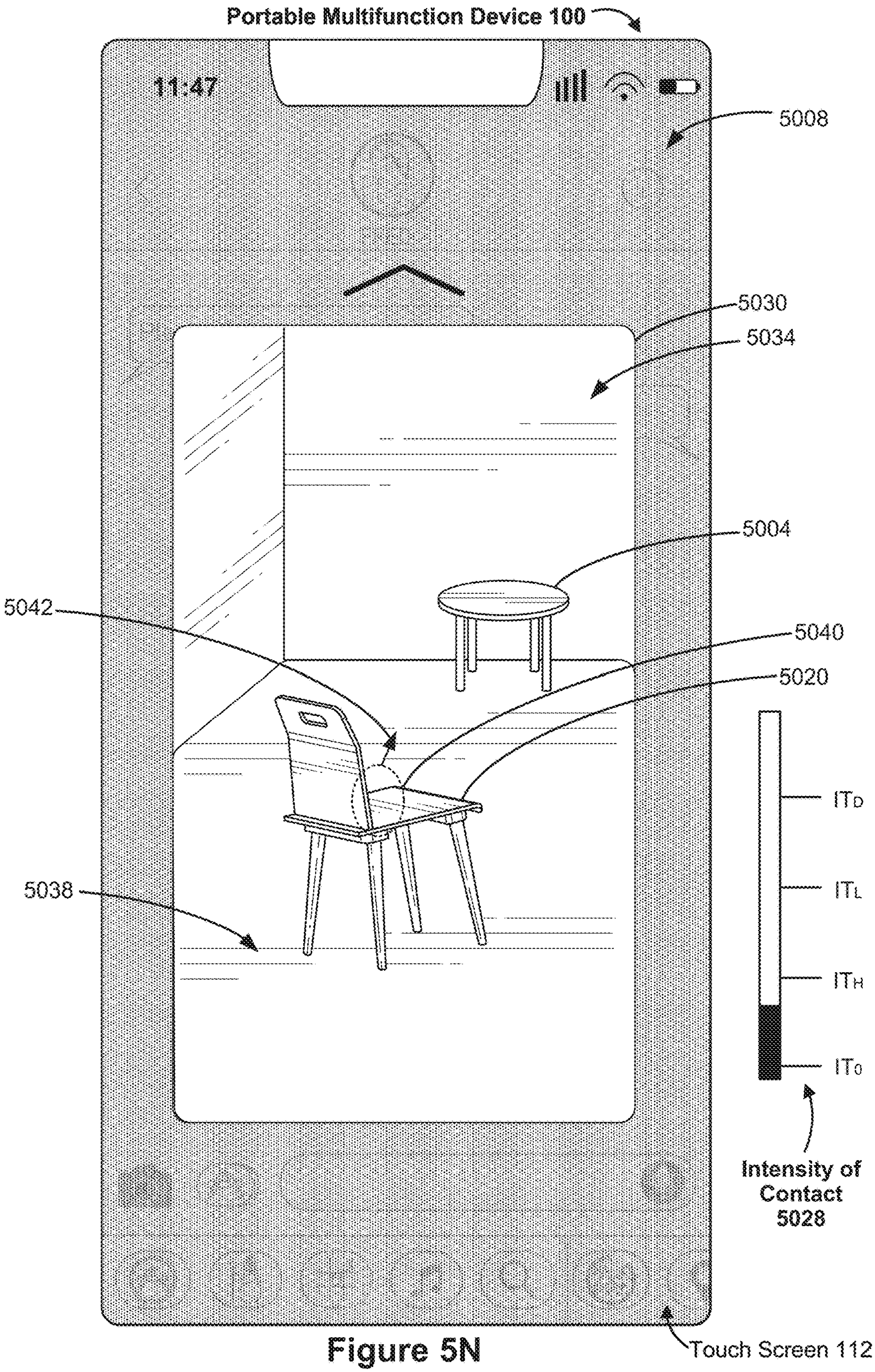
Figure 5O:
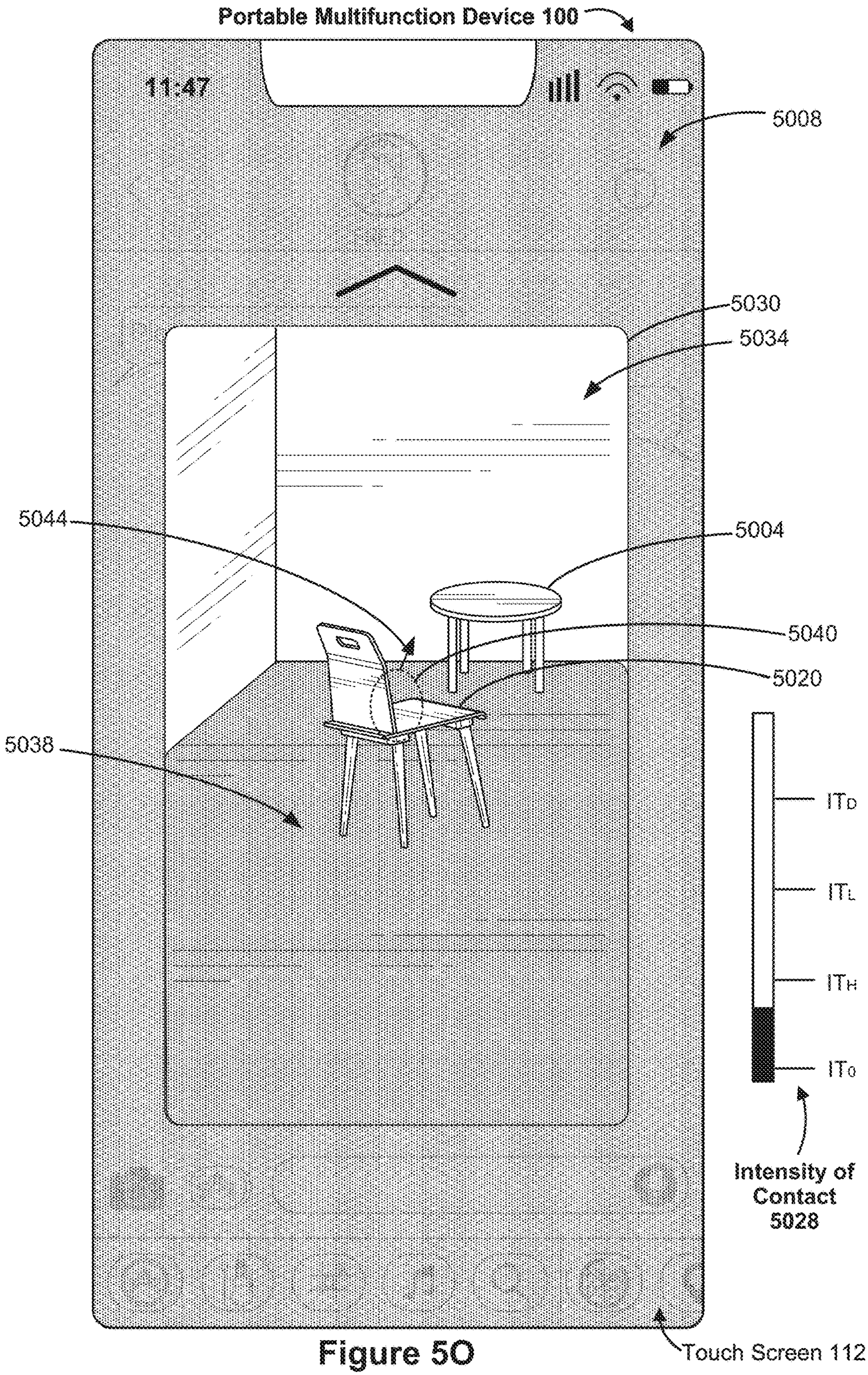
Figure 5P:
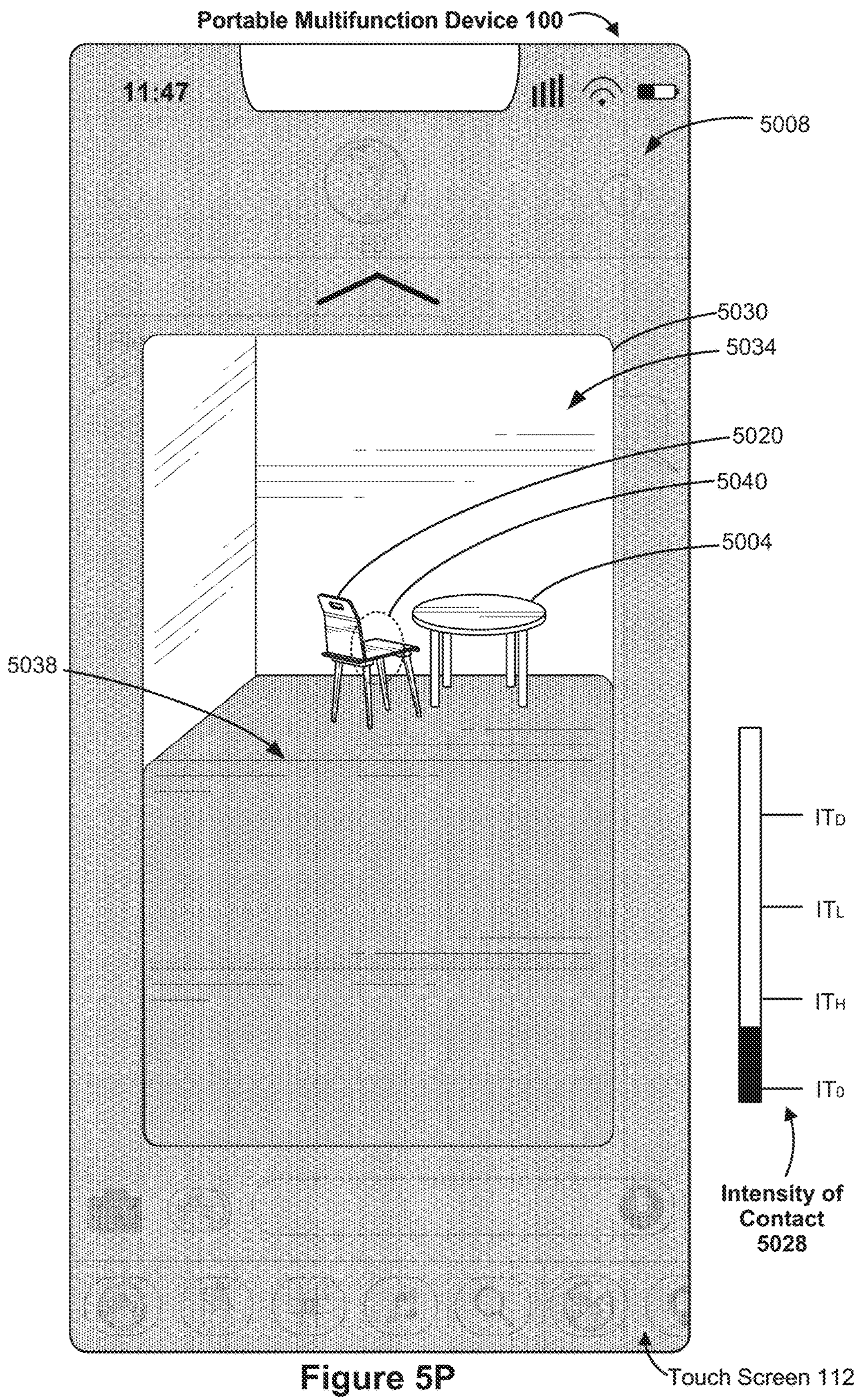
Figure 5Q:
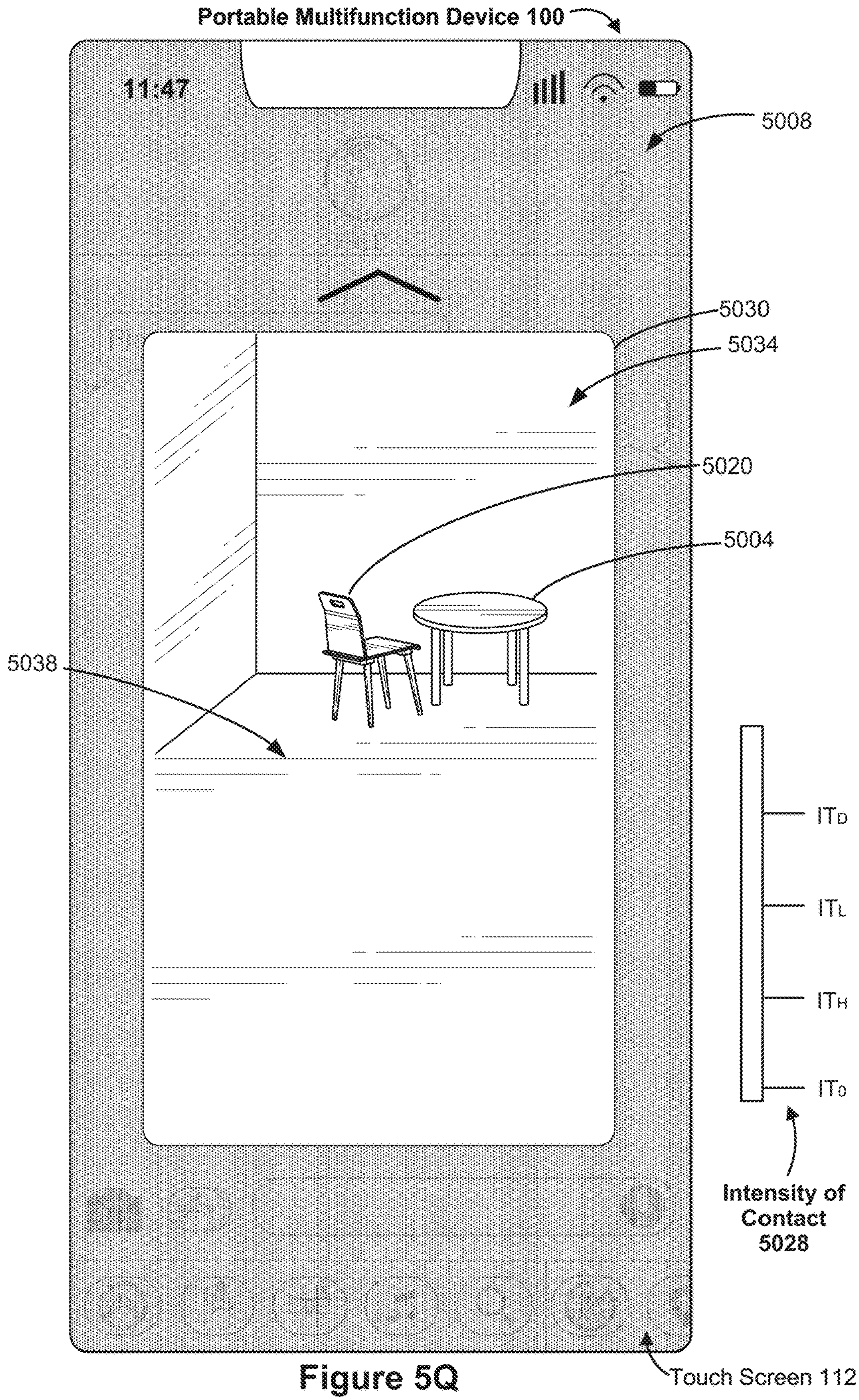

FIGS. 5M-5Q illustrate an input that causes movement of virtual chair 5020 across floor surface 5038 in the displayed field of view 5034 of the camera(s). In FIG. 5N, a contact 5040 with touch screen 112 of device 100 is detected at a location that corresponds to virtual chair 5020. In FIGS. 5N-5O, as the contact 5040 moves along a path indicated by arrow 5042, virtual chair 5020 is dragged by the contact 5040. As the virtual chair 5020 is moved by contact 5040, the size of the virtual chair 5020 changes to maintain the scale of the virtual chair 5020 relative to physical space 5002 as shown in the field of view 5034 of the camera(s). For example, in FIGS. 5N-5P, as virtual chair 5020 moves from the foreground of the field of view 5034 of the camera(s) to a position that is further from device 100 and closer to table 5004 in the field of view 5034 of the camera(s), the size of the virtual chair 5020 decreases (e.g., such that the scale of the chair relative to table 5004 in the field of view 5034 of the camera(s) is maintained). Additionally, as the virtual chair 5020 is moved by contact 5040, planes identified in the field of view 5034 of the camera(s) are highlighted. For example, floor plane 5038 is highlighted in FIG. 5O. In FIGS. 5O-5P, as the contact 5040 moves along a path indicated by arrow 5044, virtual chair 5020 continues to be dragged by the contact 5040. In FIG. 5Q, the contact 5040 has lifted off of touch screen 112. In some embodiments, as shown in FIGS. 5N-5Q, the movement path of the virtual chair 5020 is constrained by the floor surface 5038 in the field of view 5034 of the cameras, as if the virtual chair 5020 is dragged across the floor surface 5038 by the contact 5040. In some embodiments, contact 5040 as described with regard to FIGS. 5N-5P is a continuation of contact 5026 as described with regard to FIGS. 5C-5F (e.g., the there is no lift-off of contact 5026 and same contact that causes the portion of messaging user interface 5008 to be replaced by the field of view 5034 of the camera(s) also drags the virtual chair 5020 in the field of view 5034 of the camera(s)).

Figure 5R:
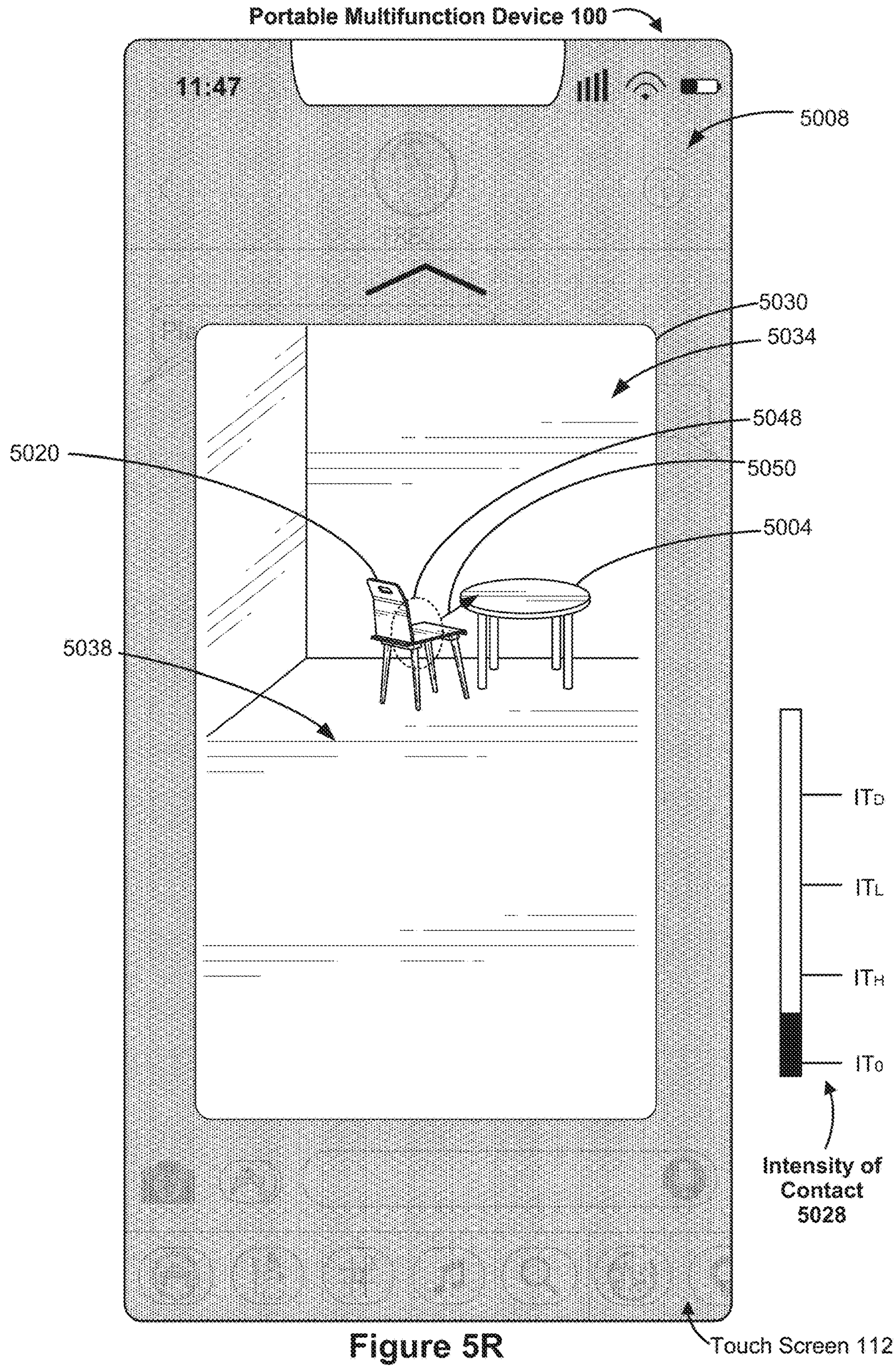
Figure 5S:
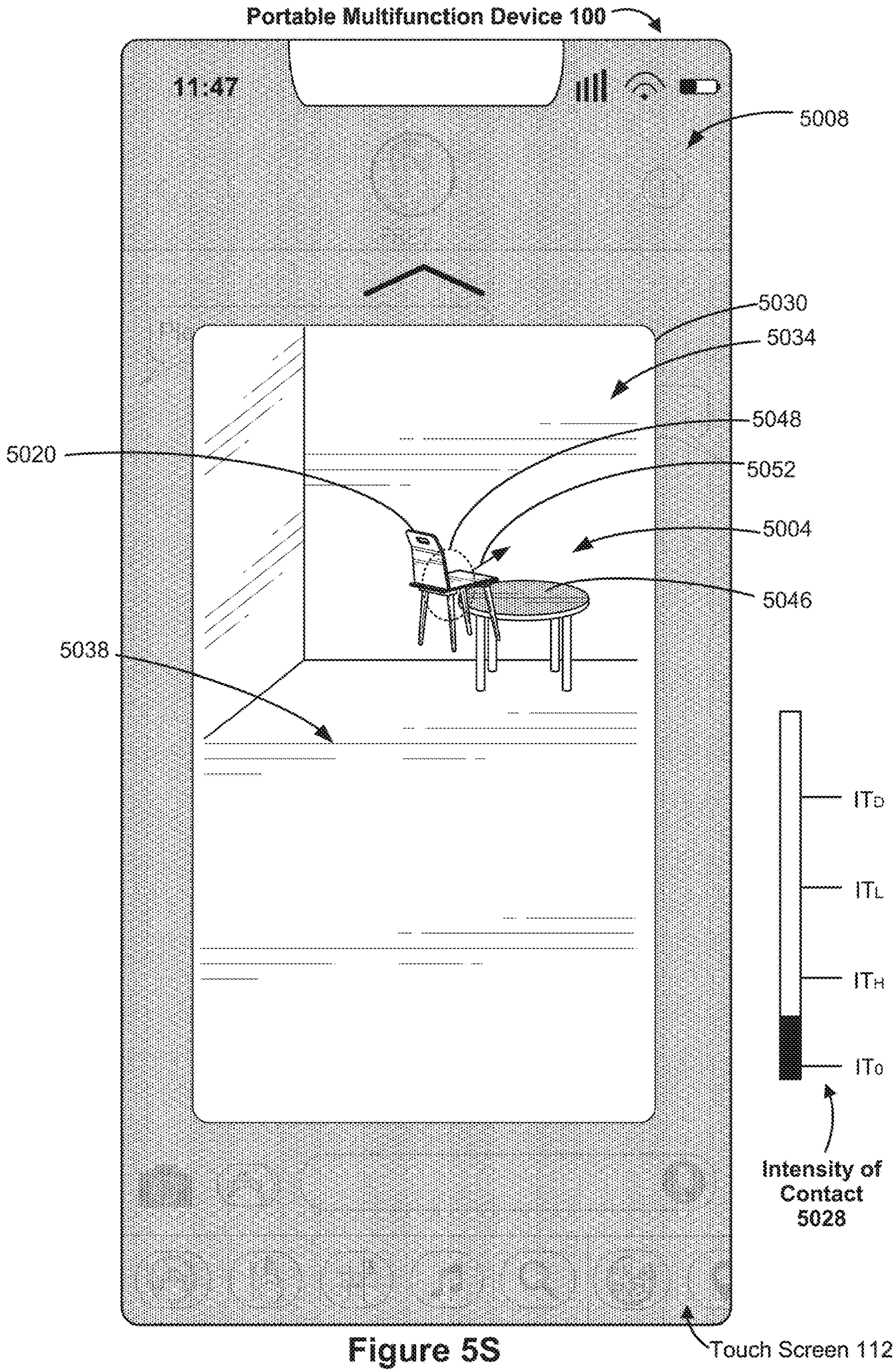
Figure 5T:
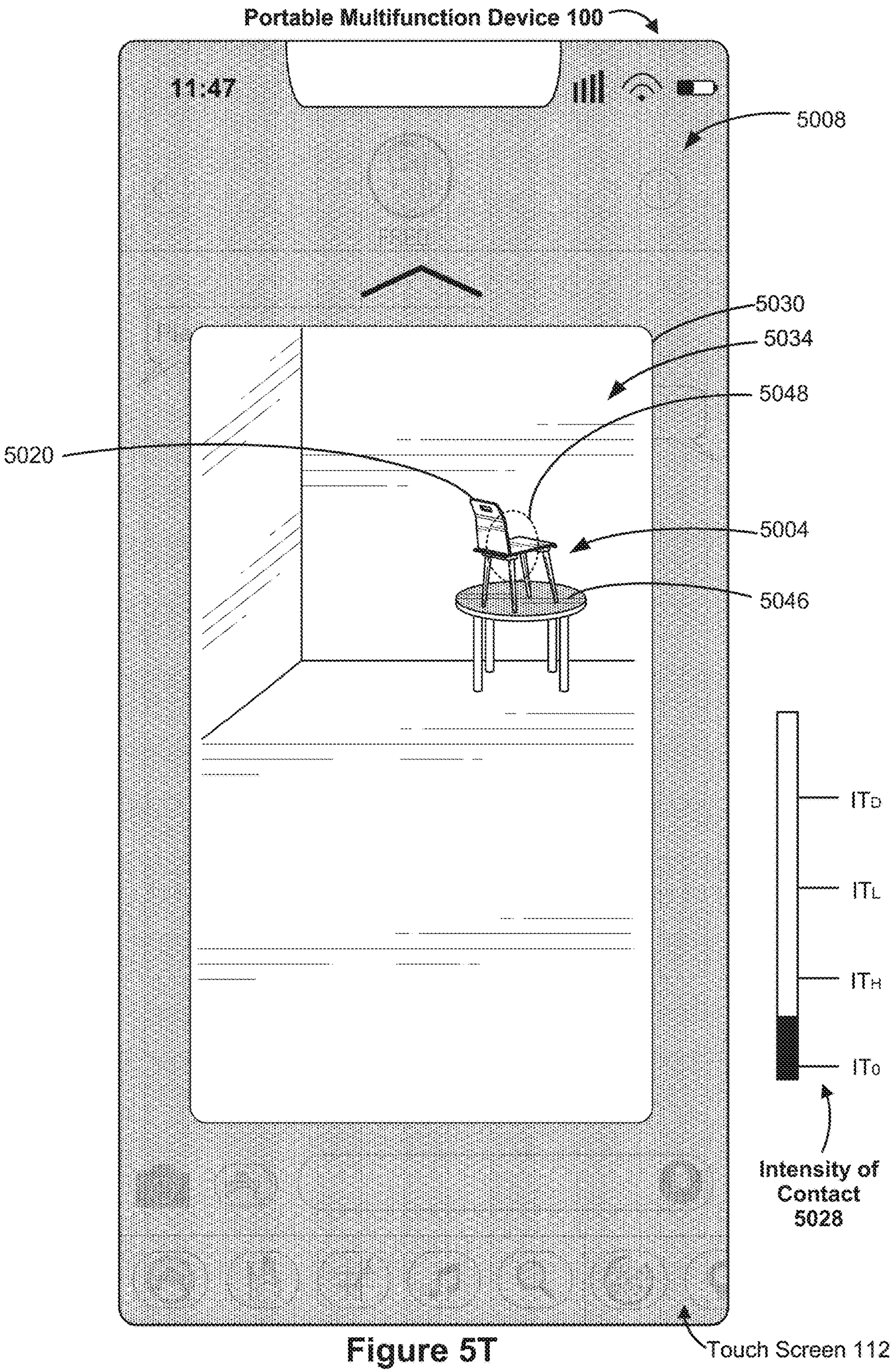
Figure 5U:
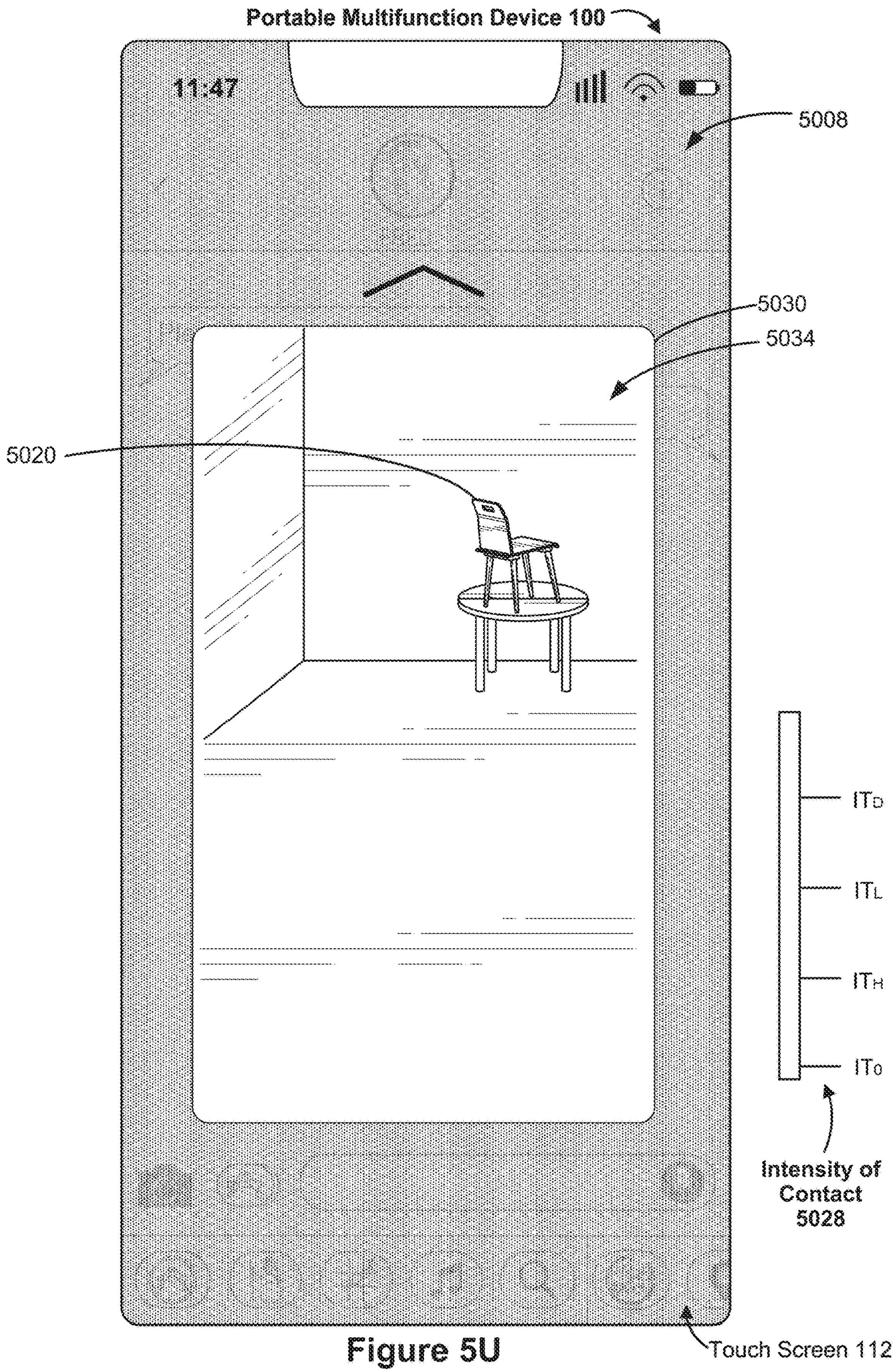

FIGS. 5Q-5U illustrate an input that causes movement of virtual chair 5020 from floor surface 5038 to a different plane (e.g., table surface 5046) detected in the field of view 5034 of the camera(s). In FIG. 5R, a contact 5050 with touch screen 112 of device 100 is detected at a location that corresponds to virtual chair 5020. In FIGS. 5R-5S, as the contact 5048 moves along a path indicated by arrow 5050, virtual chair 5020 is dragged by the contact 5048. As the virtual chair 5020 is moved by contact 5048, the size of the virtual chair 5020 changes to maintain the scale of the virtual chair 5020 relative to the physical space 5002 as shown in the field of view 5034 of the camera(s). Additionally, as the virtual chair 5020 is moved by contact 5040, table surface plane 5046 is highlighted (e.g., as shown in FIG. 5S). In FIGS. 5S-5T, as the contact 5048 moves along a path indicated by arrow 5052, virtual chair 5020 continues to be dragged by the contact 5040. In FIG. 5U, the contact 5048 has lifted off of touch screen 112, and virtual chair 5020 is placed on the table surface plane 5046 in an upright orientation facing the same direction as before.

Figure 5V:
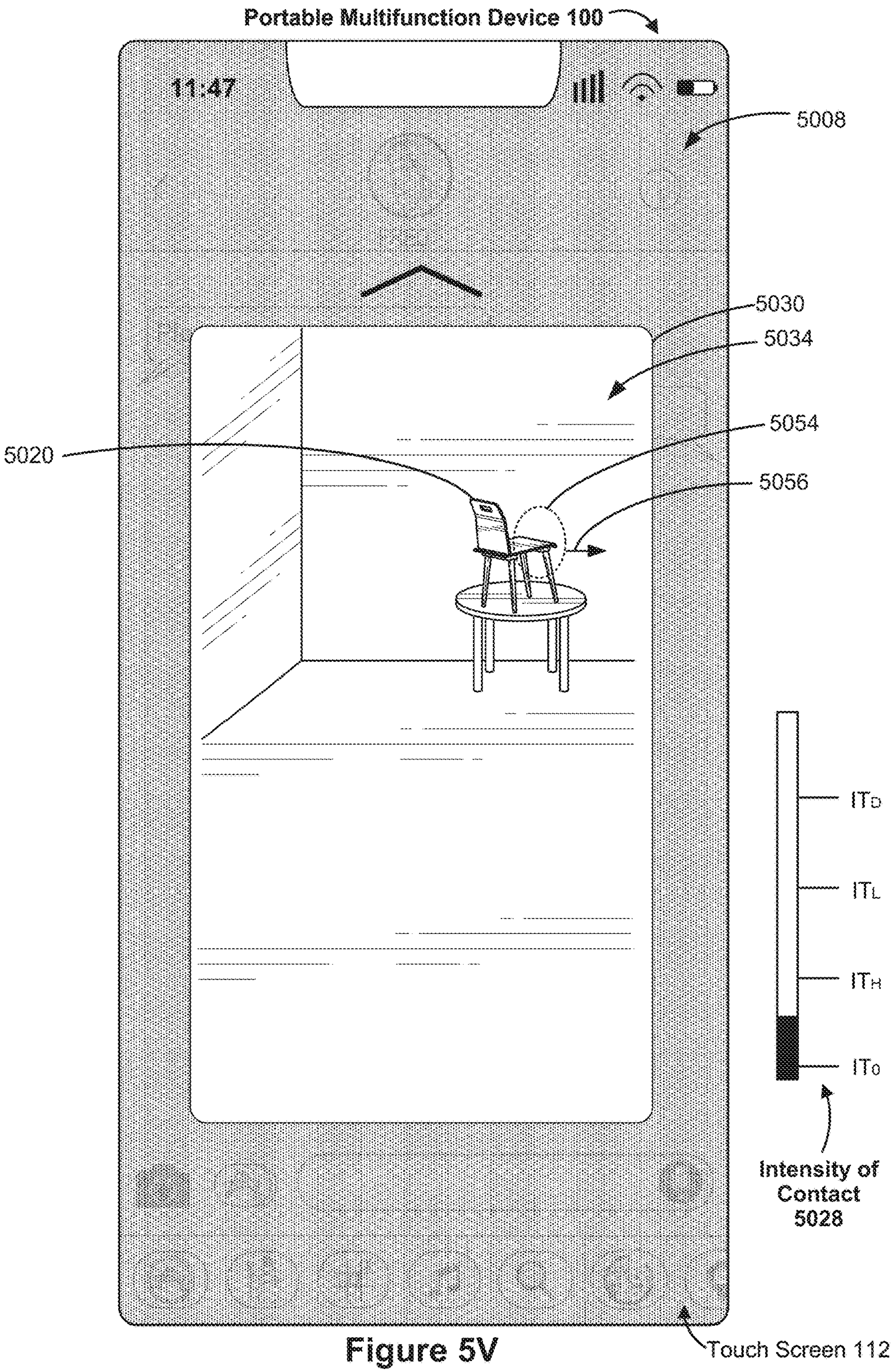
Figure 5W:
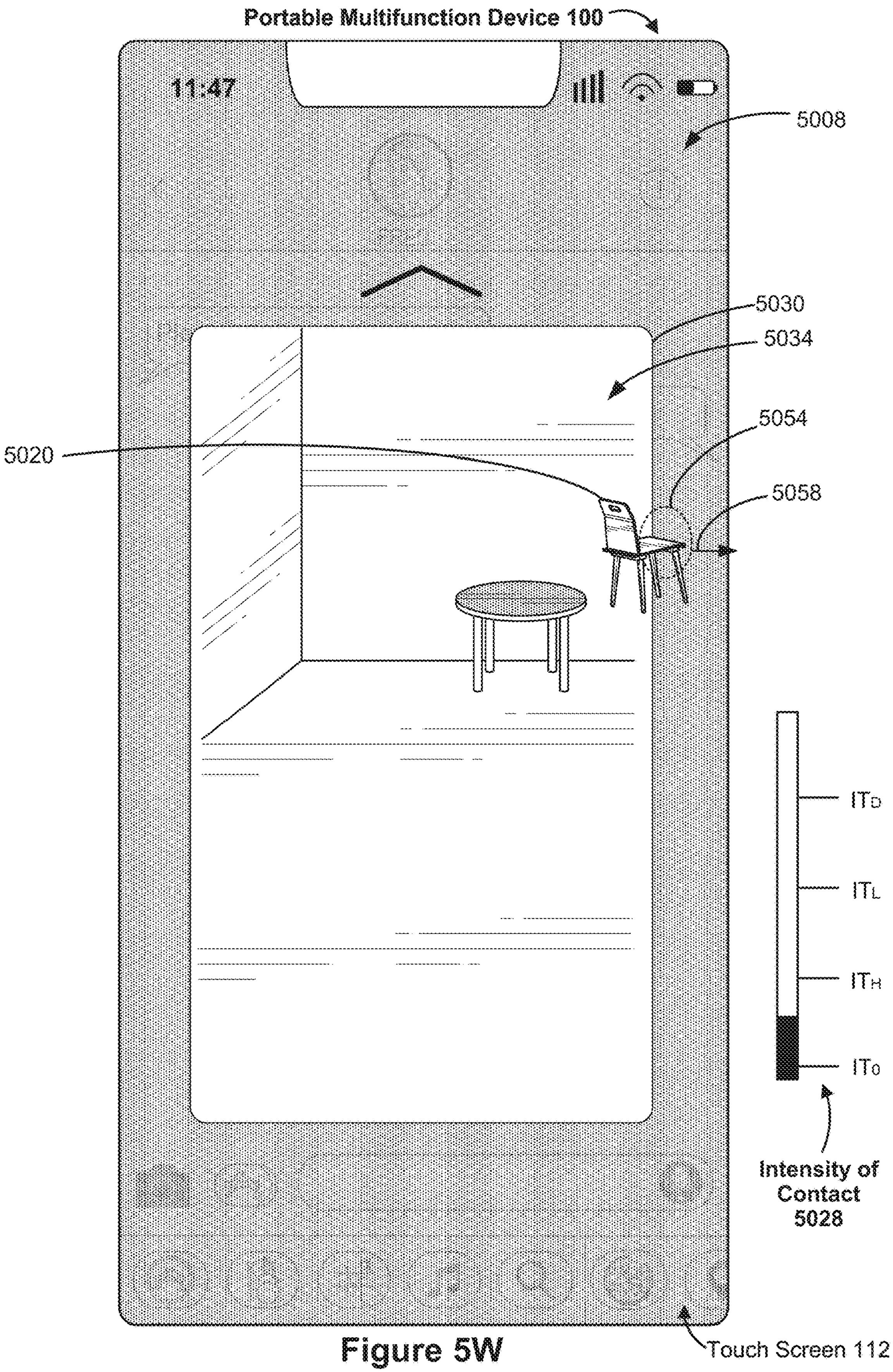
Figure 5X:
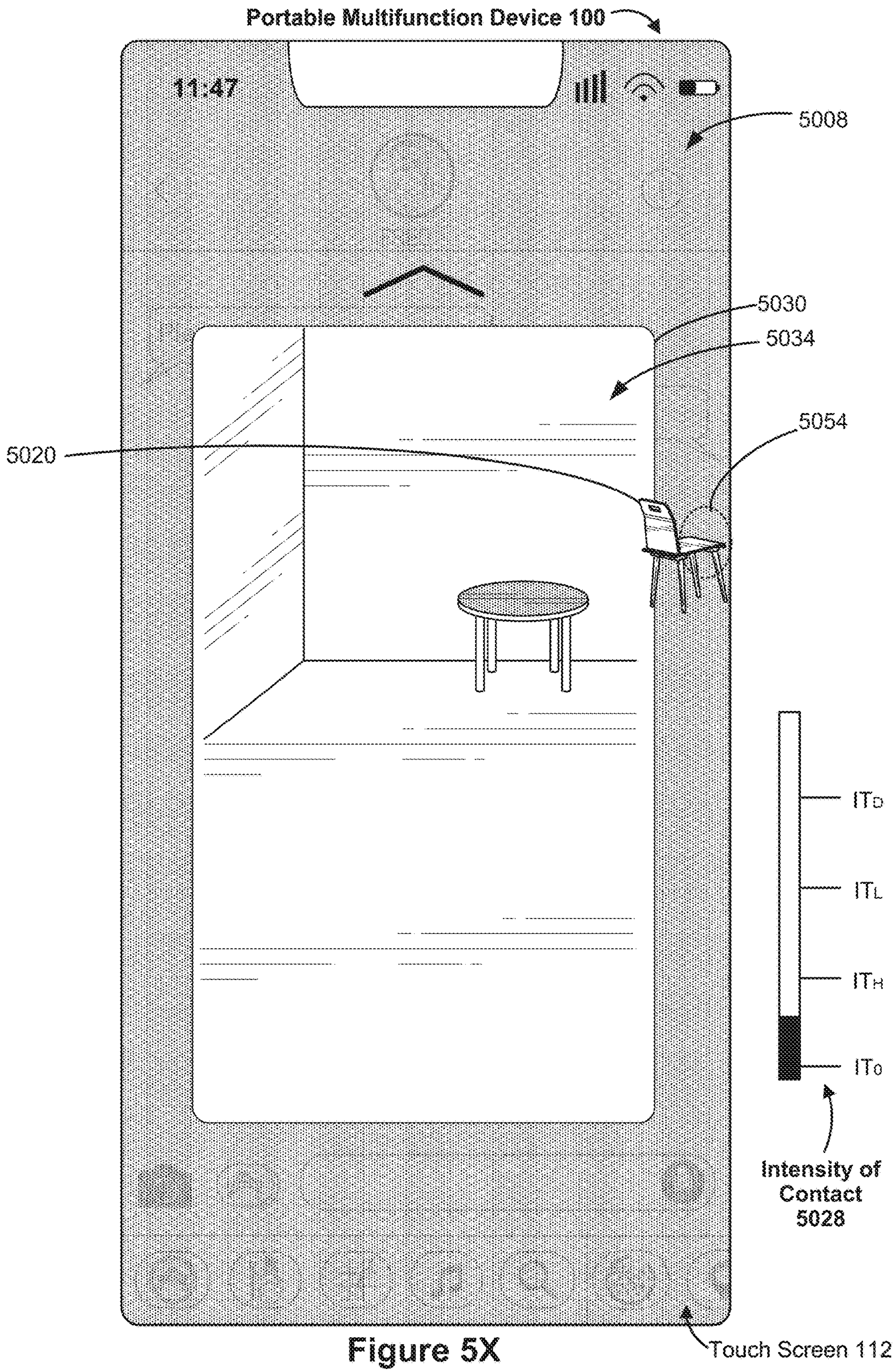

FIGS. 5U-5AD illustrate an input that drags the virtual chair 5020 to the edge of touch screen display 112, which causes the field of view 5034 of the camera(s) to cease to be displayed. In FIG. 5V, a contact 5054 with touch screen 112 of device 100 is detected at a location that corresponds to virtual chair 5020. In FIGS. 5V-5W, as the contact 5054 moves along a path indicated by arrow 5056, virtual chair 5020 is dragged by the contact 5054. In FIGS. 5W-5X, as the contact 5054 moves along a path indicated by arrow 5058, virtual chair 5020 continues to be dragged by the contact 5054 to a position shown in FIG. 5X.

Figure 5Y:
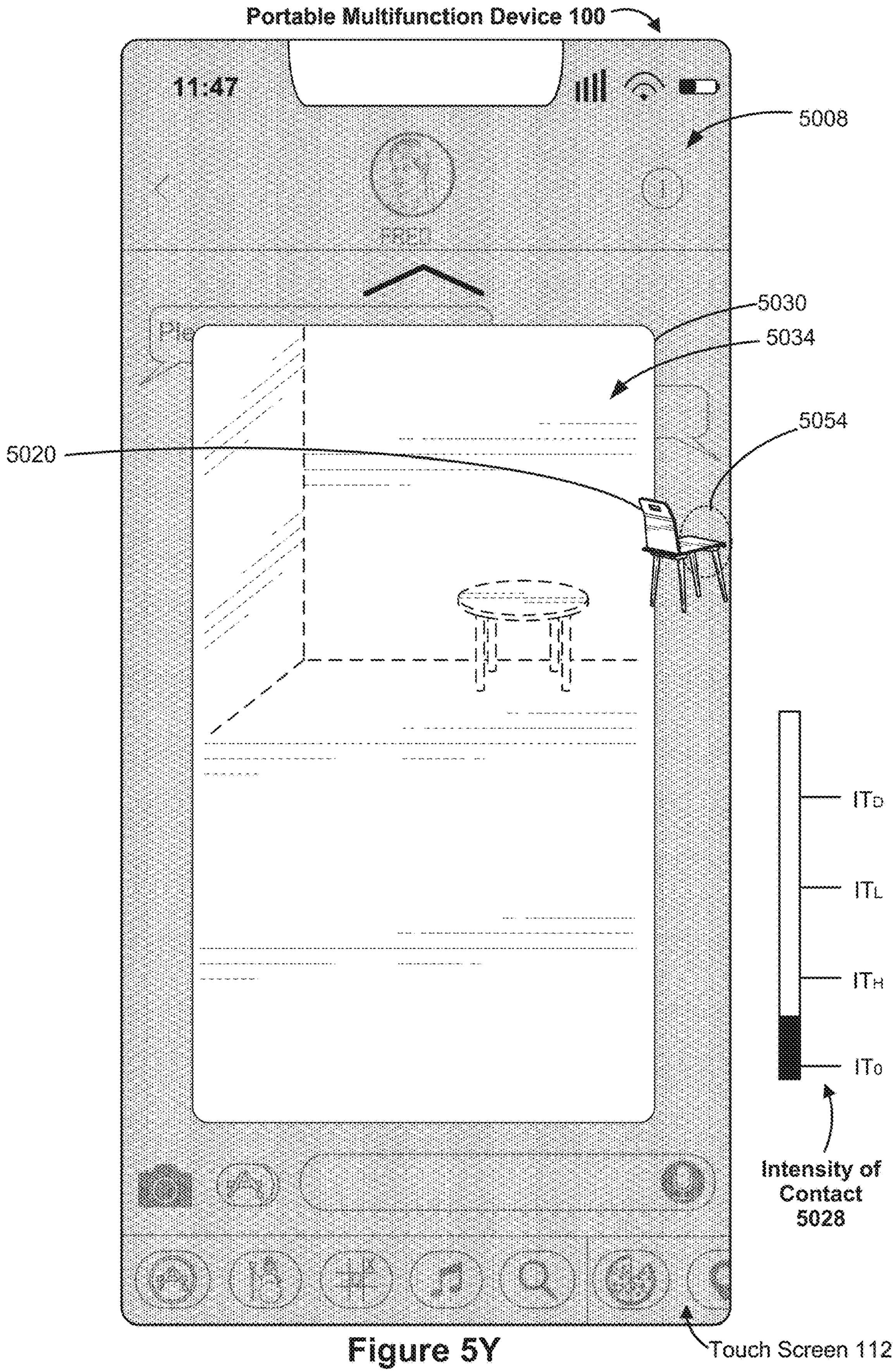
Figure 5Z:
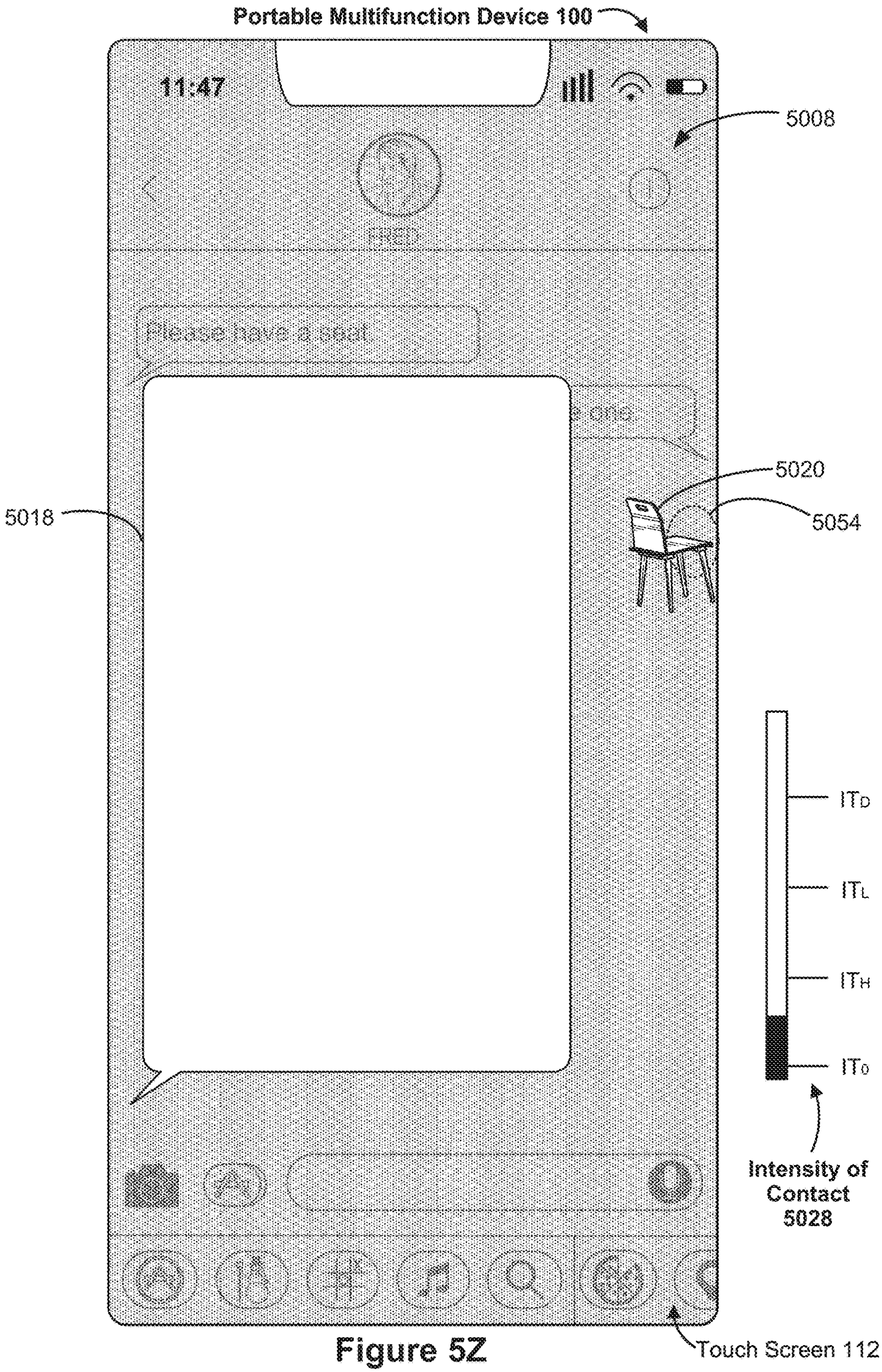
Figure 5A:
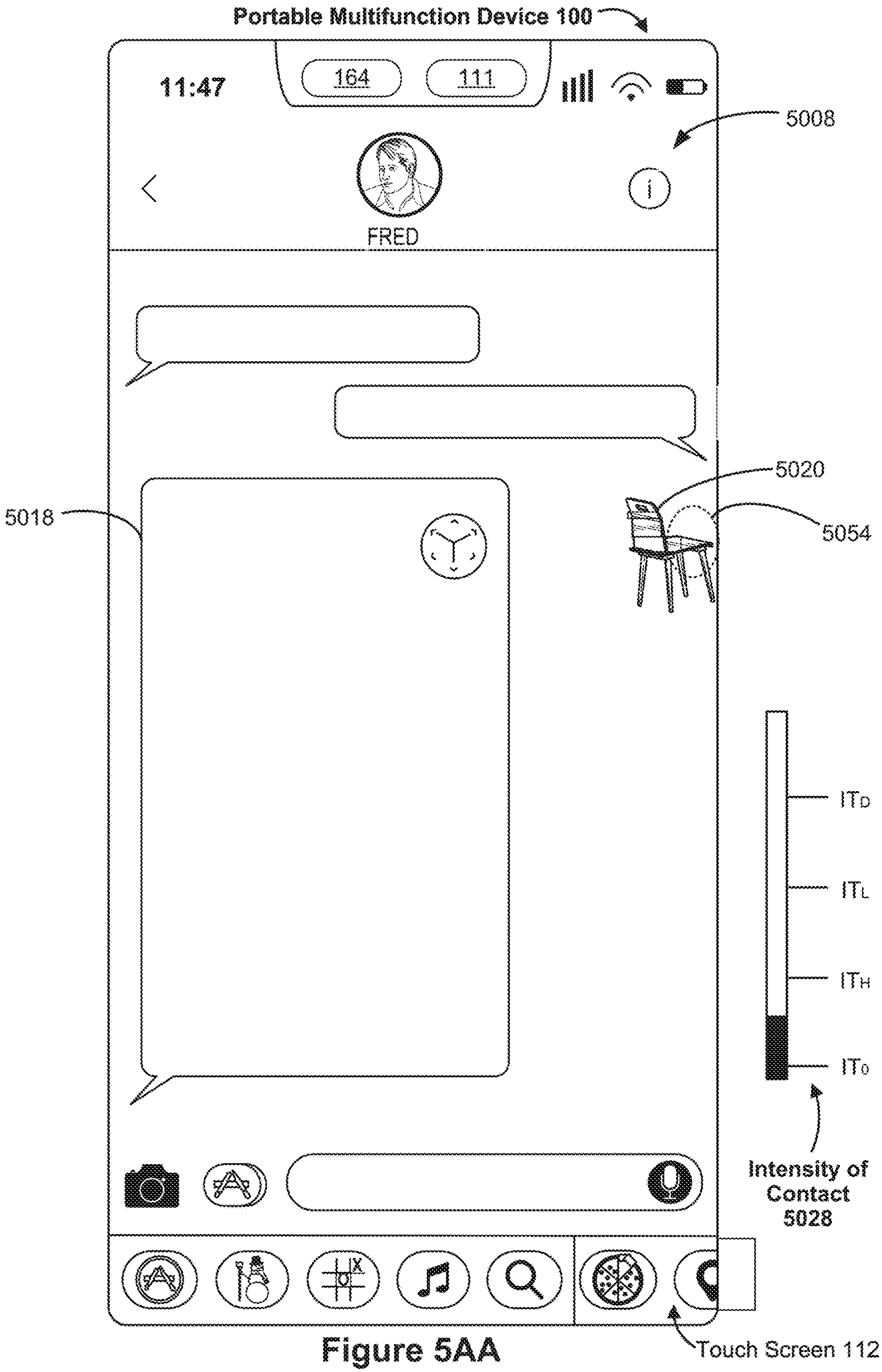
Figure 5A:
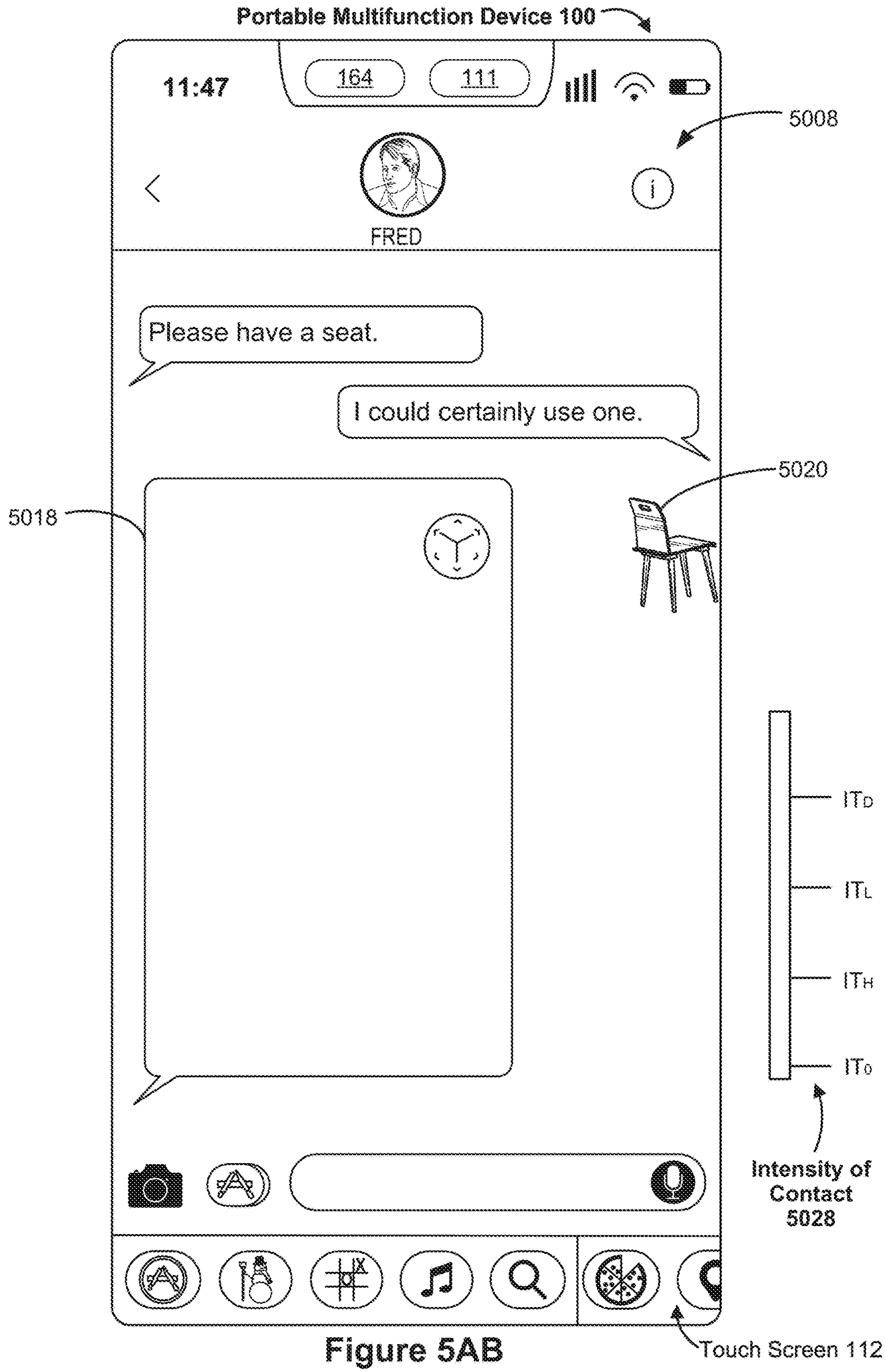
Figure 5A:
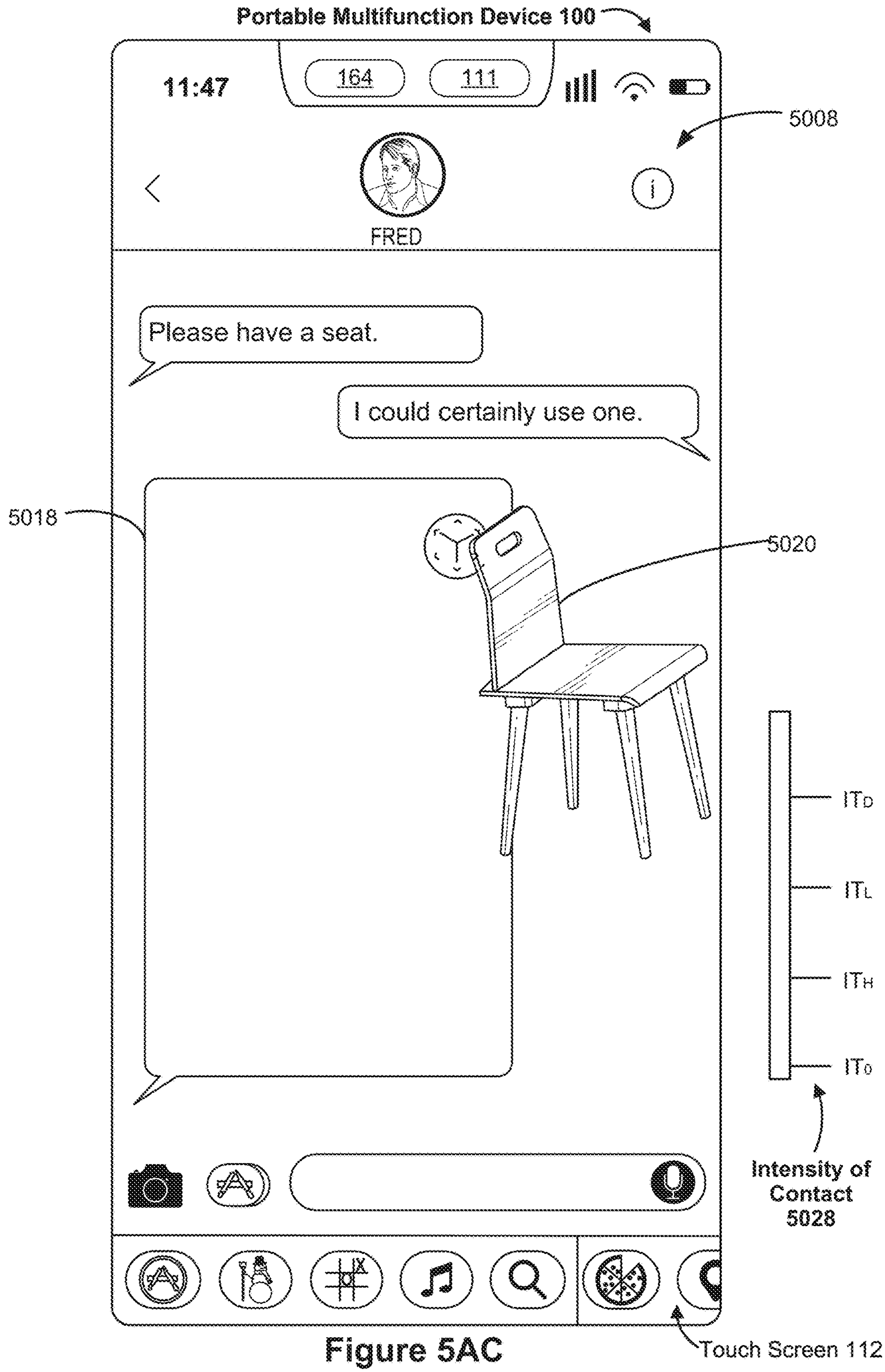
Figure 5A:
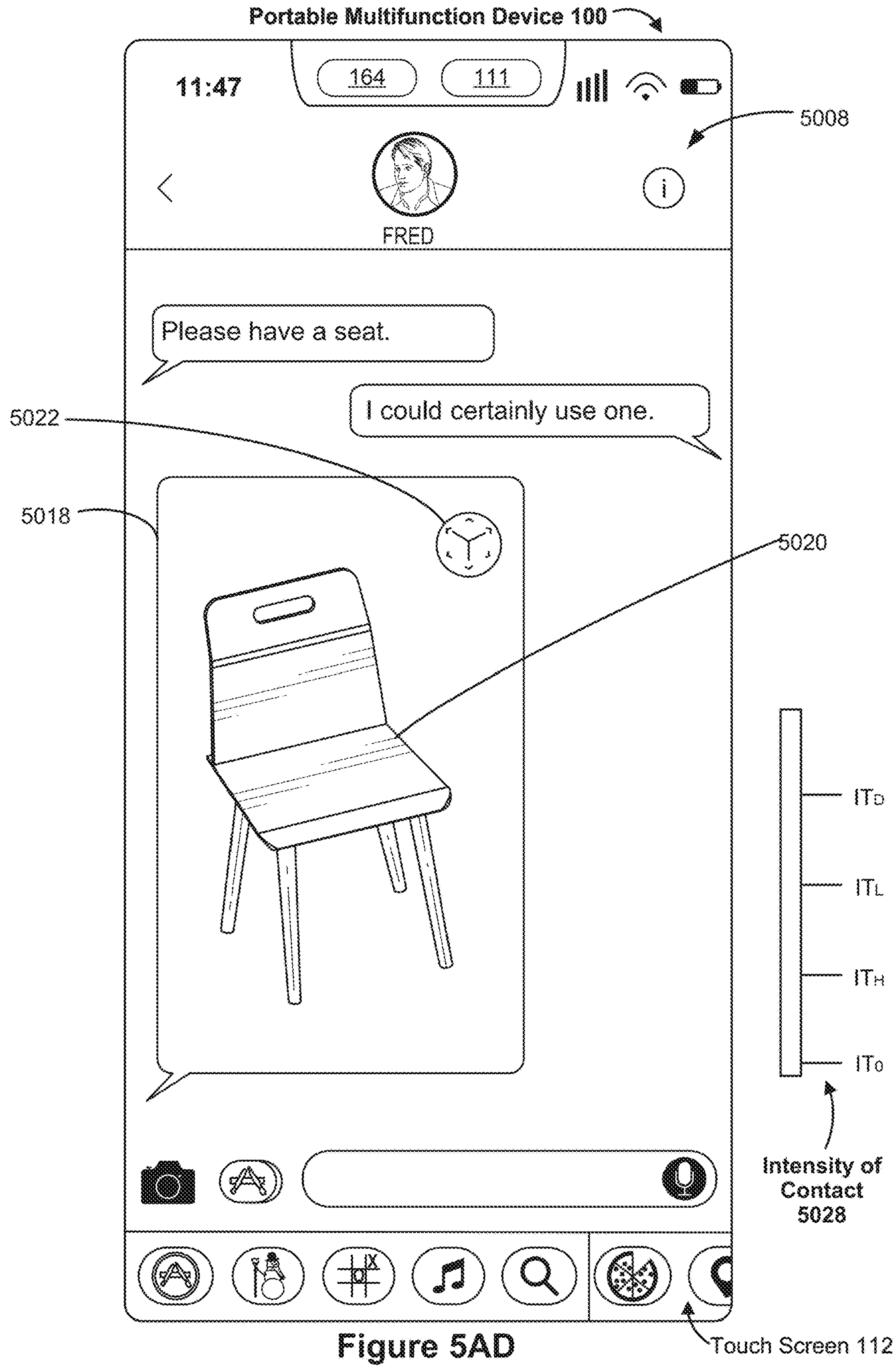
Figure 5A:
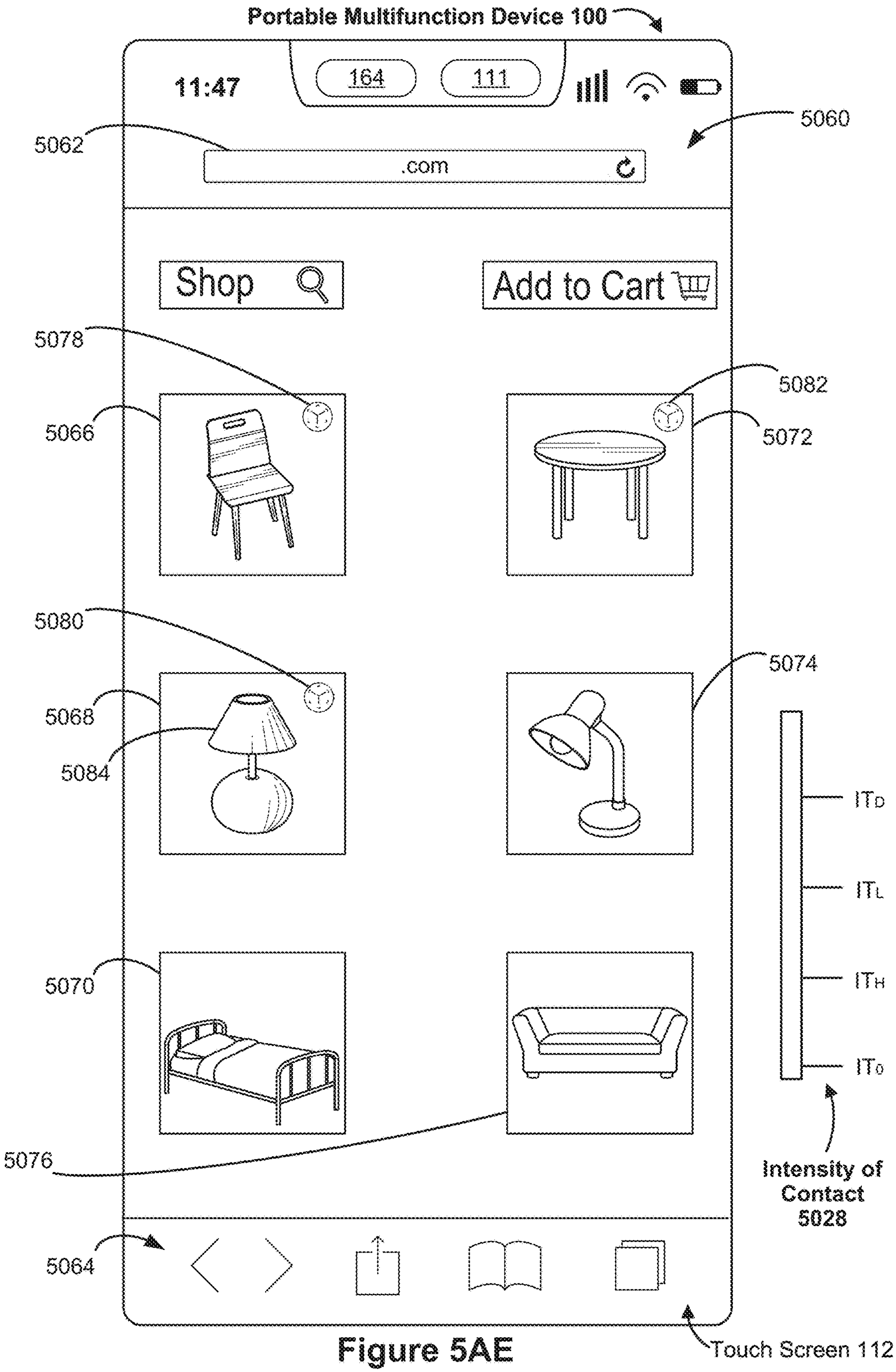
Figure 5A:
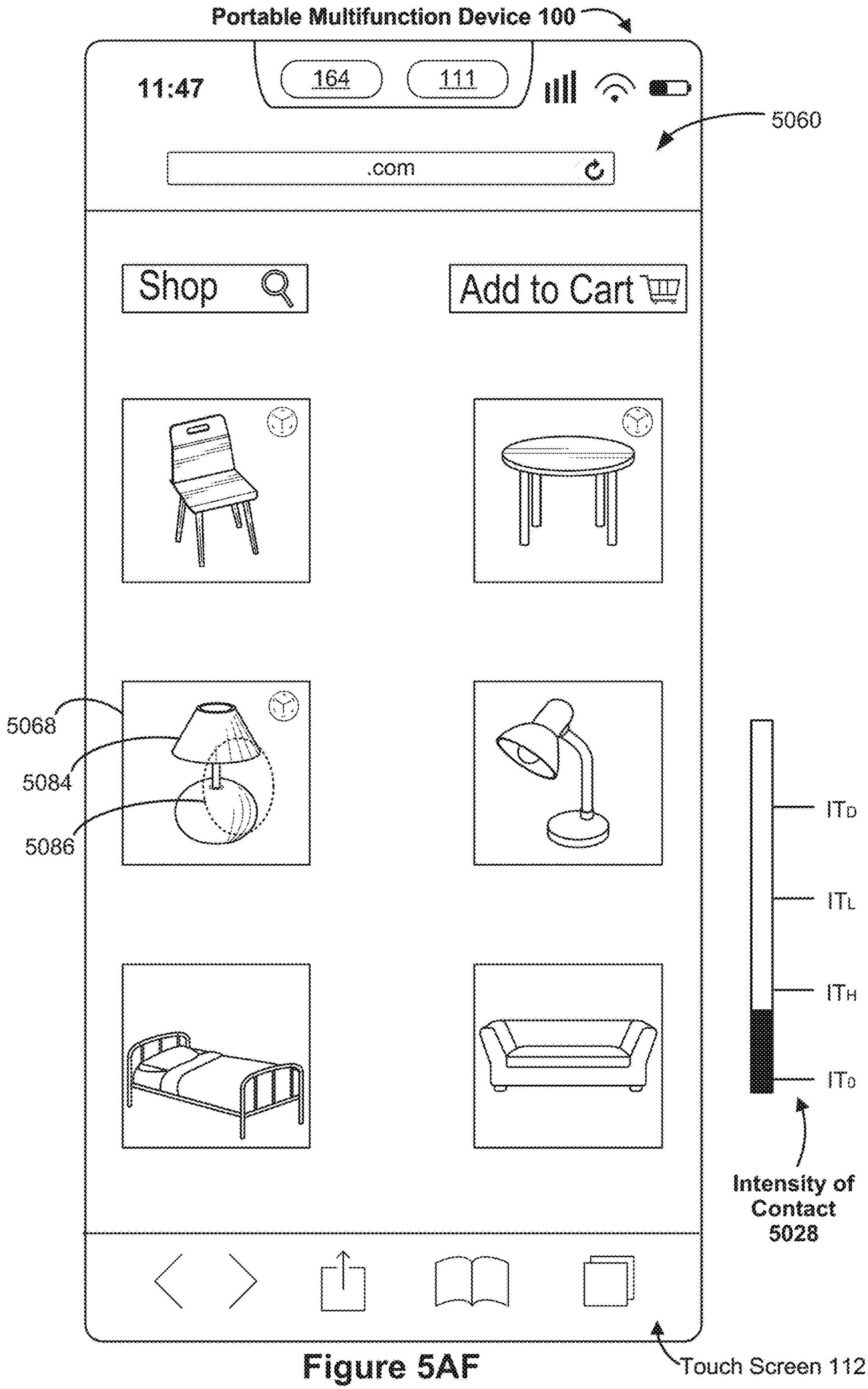
Figure 5A:
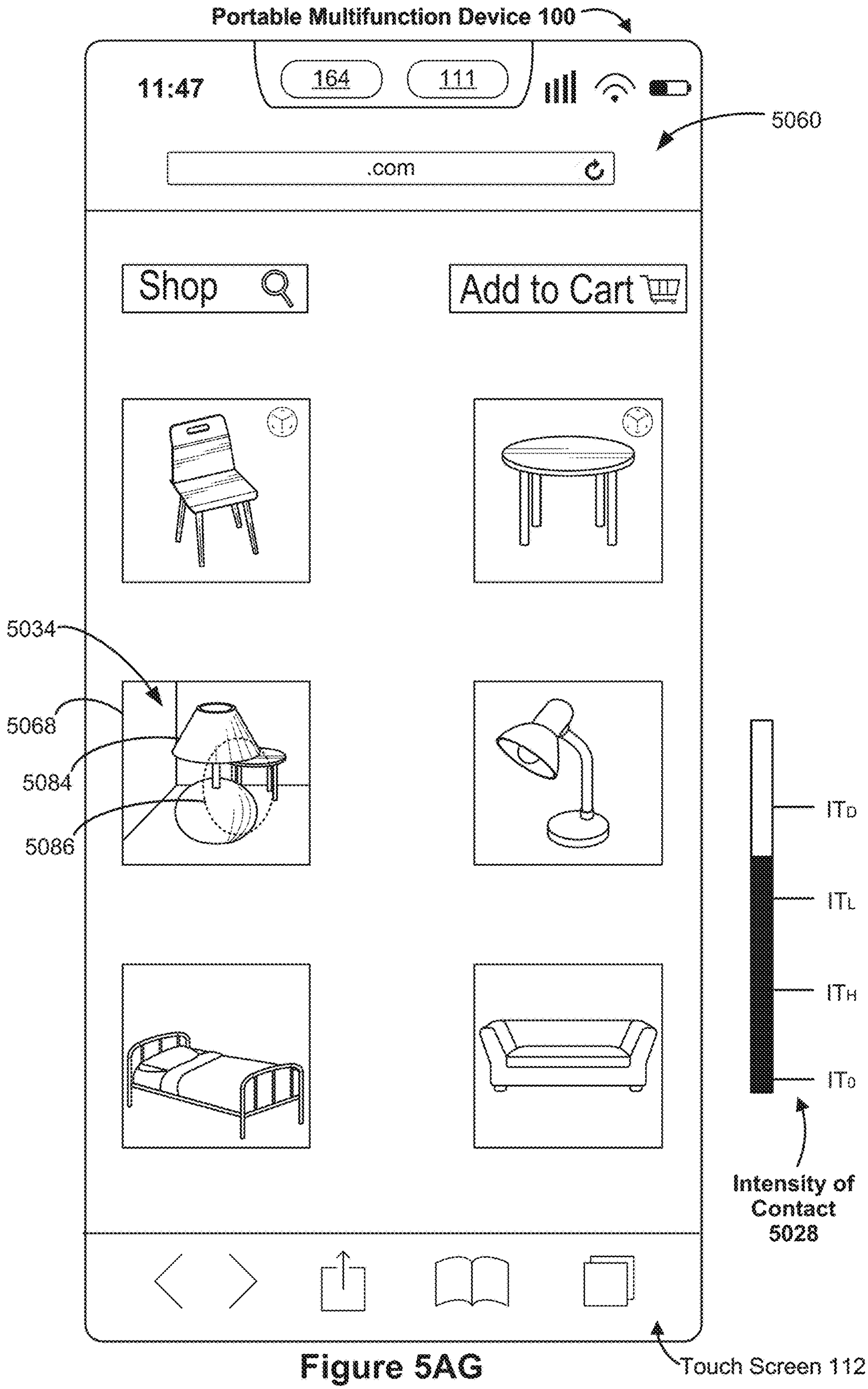
Figure 5A:
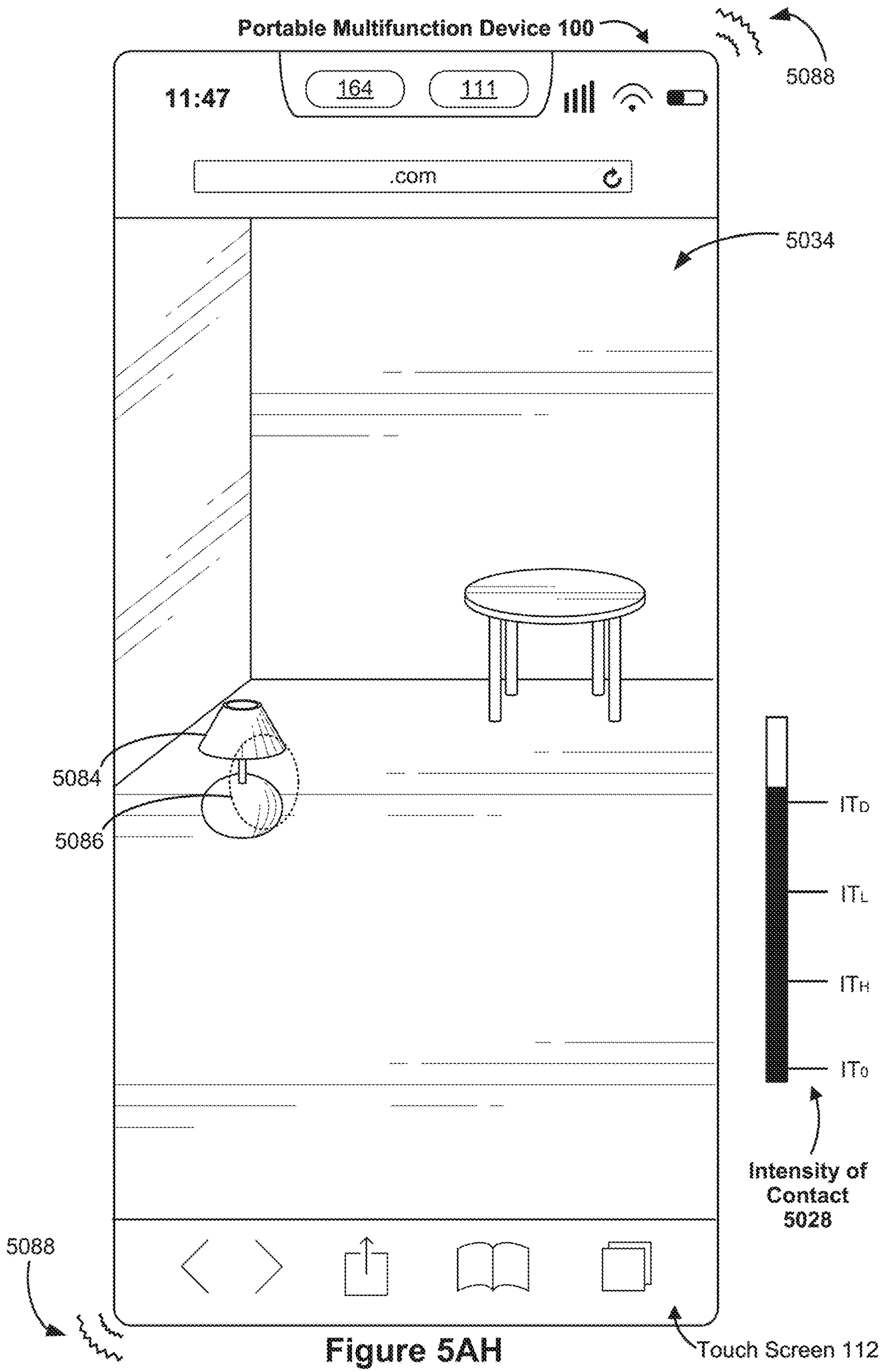
Figure 5A:
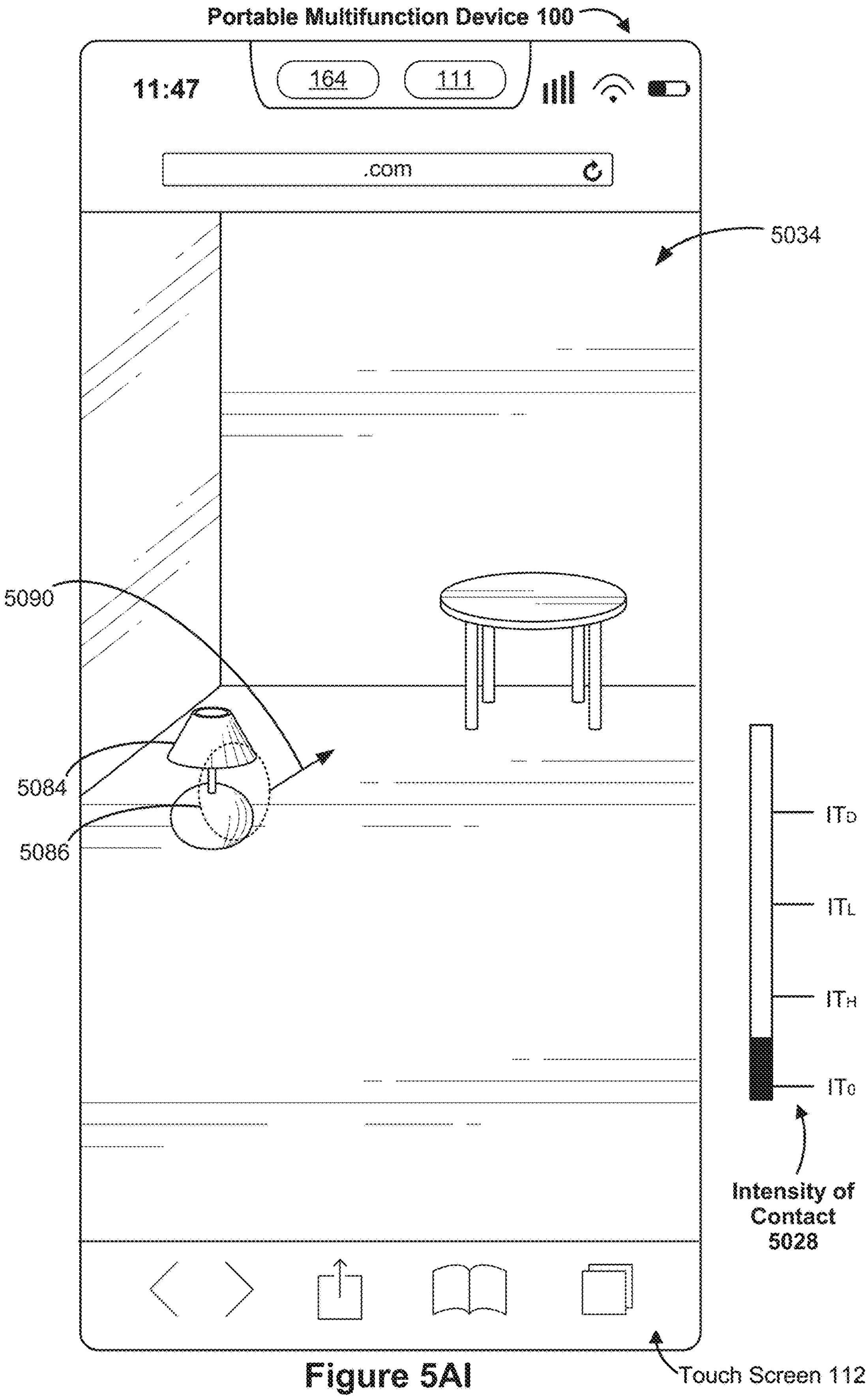
Figure 5A:
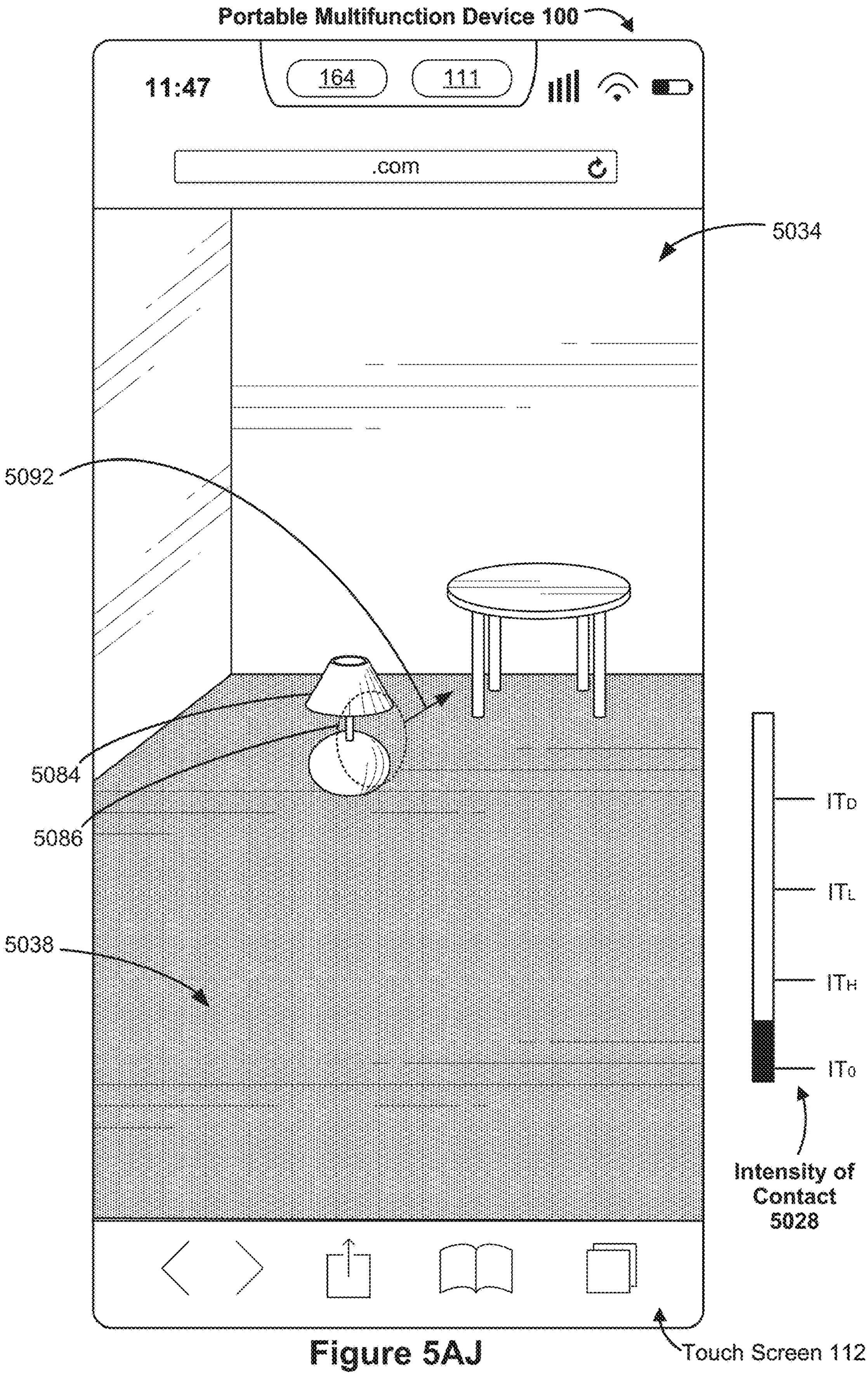
Figure 5A:
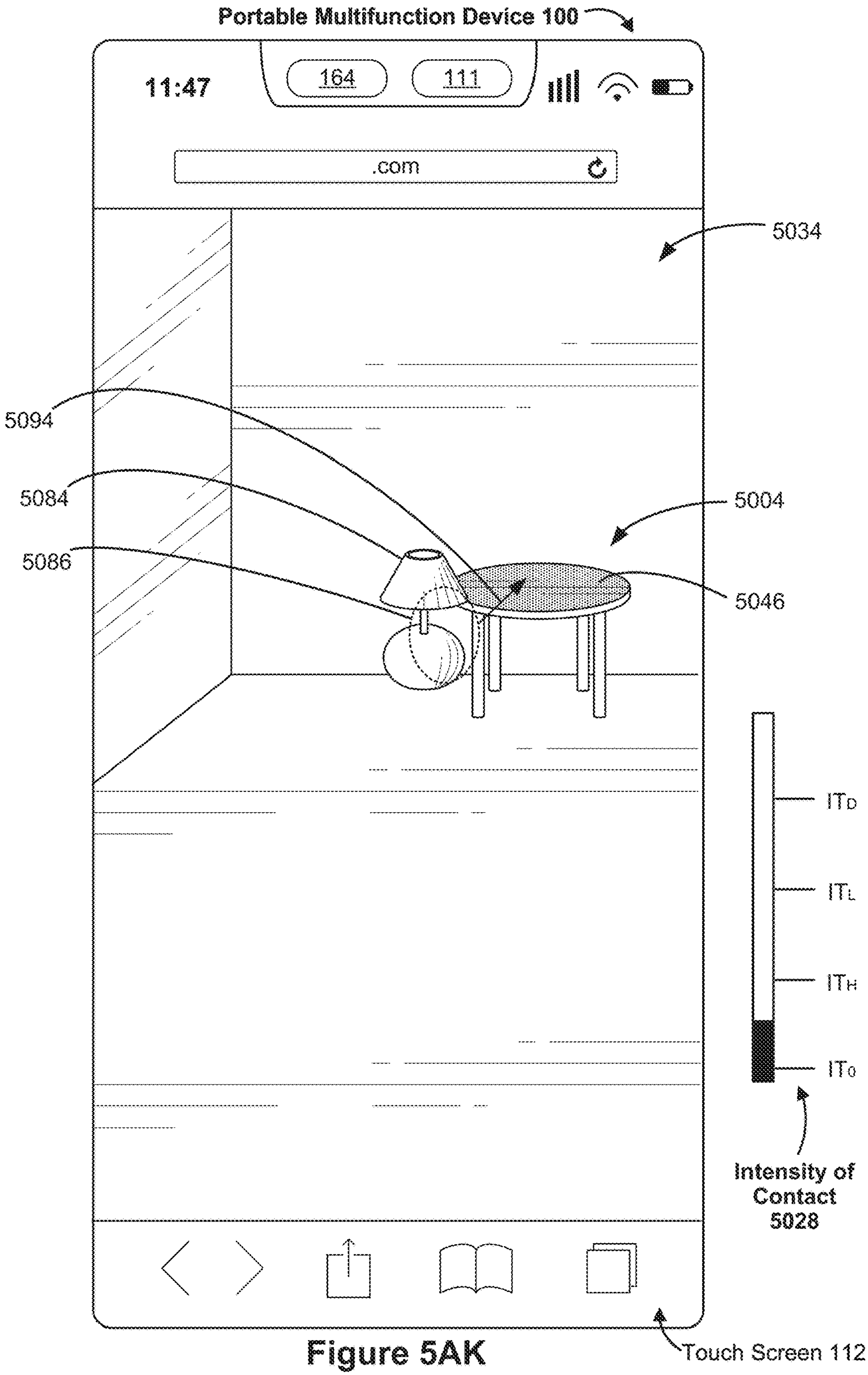
Figure 5A:
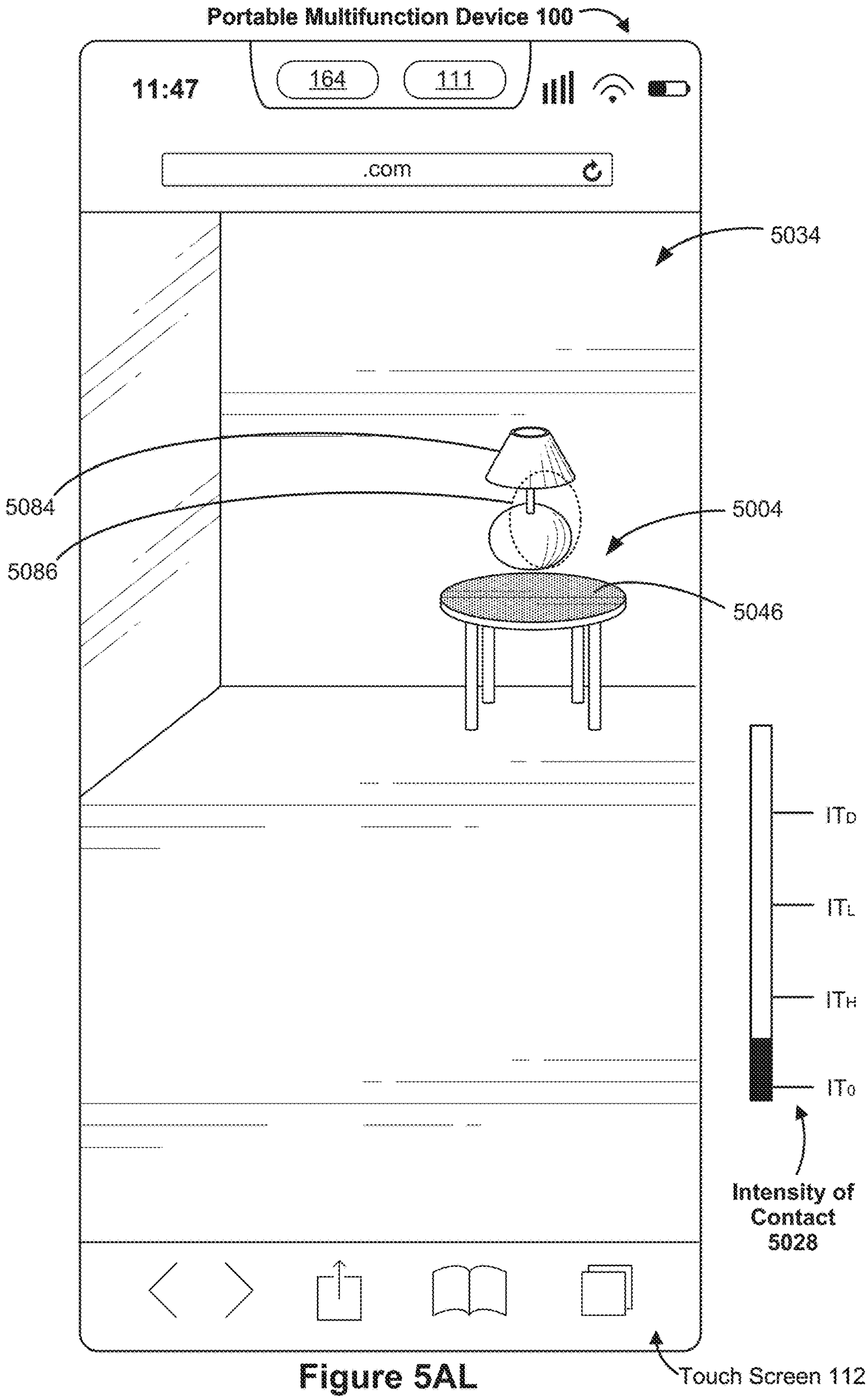
Figure 5A:
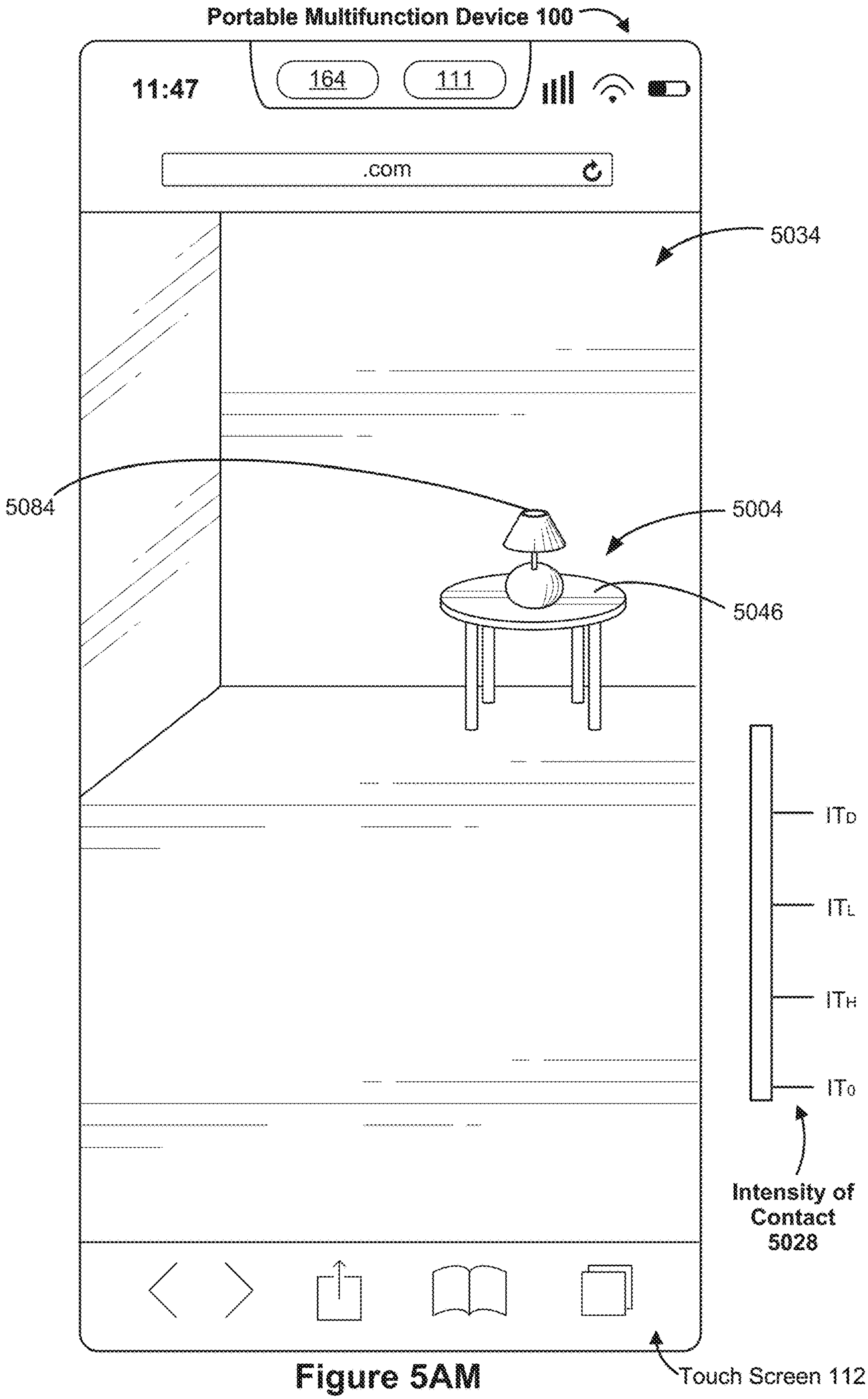
Figure 5A:
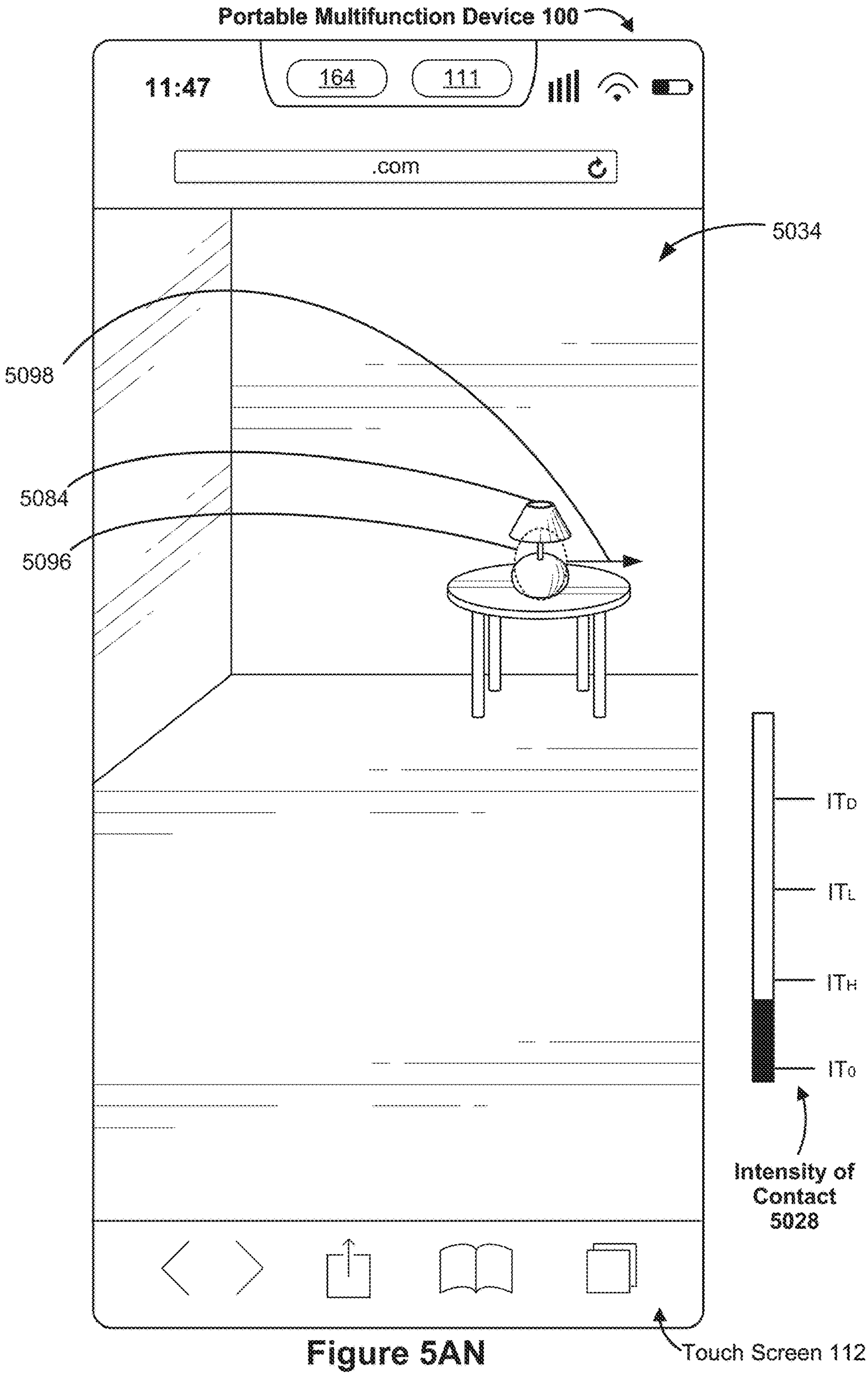
Figure 5A:
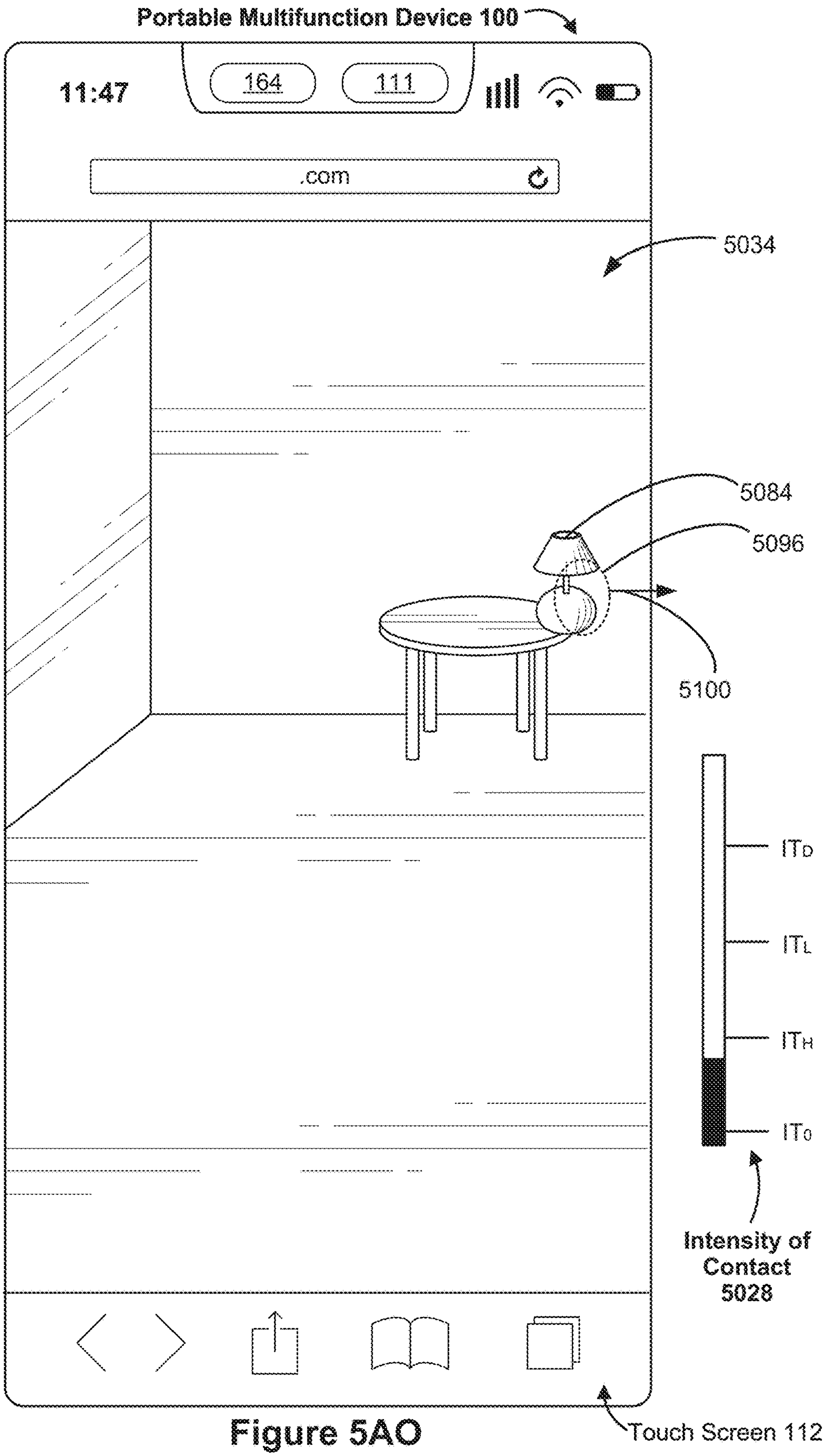
Figure 5A:
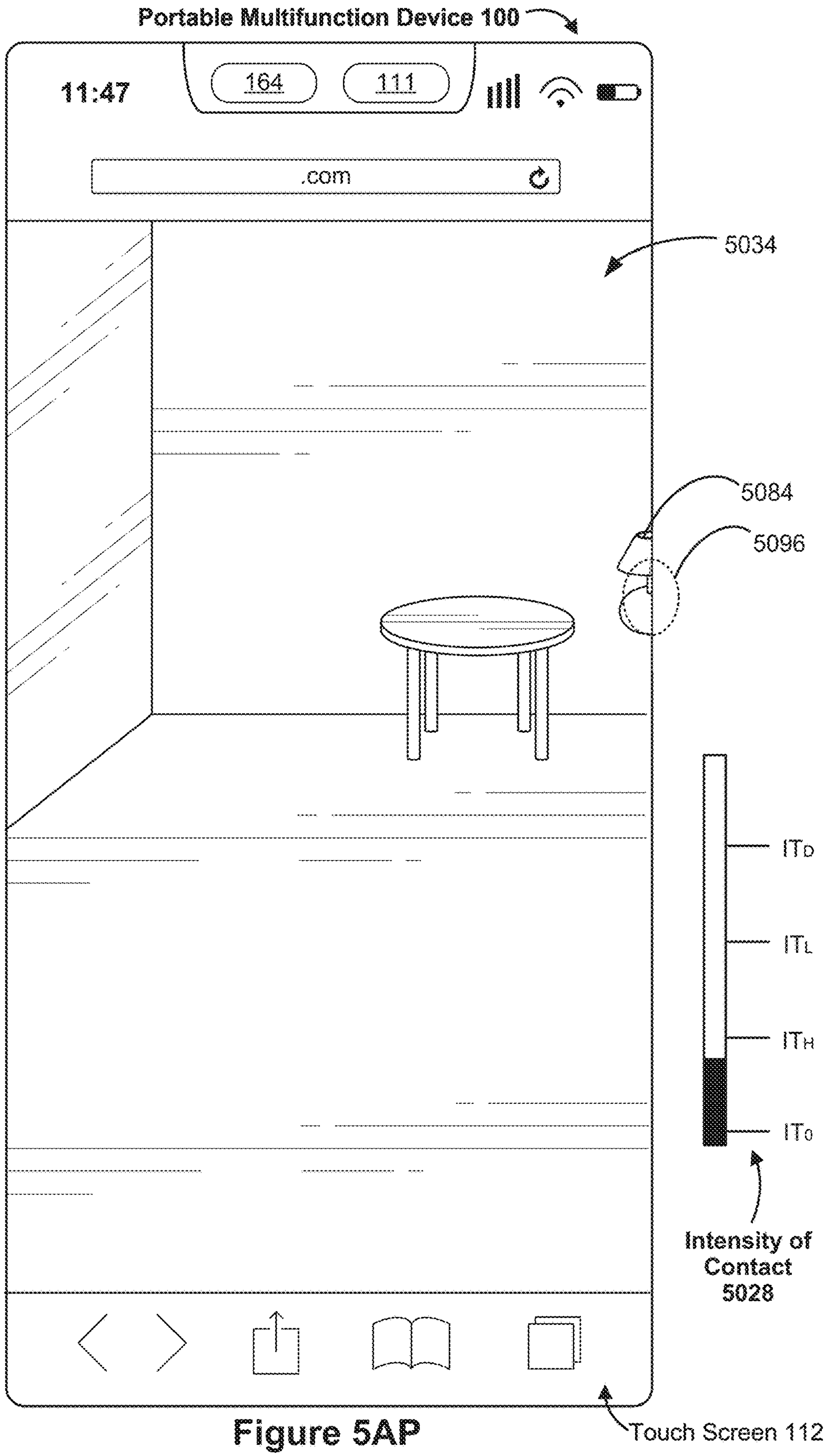
Figure 5A:
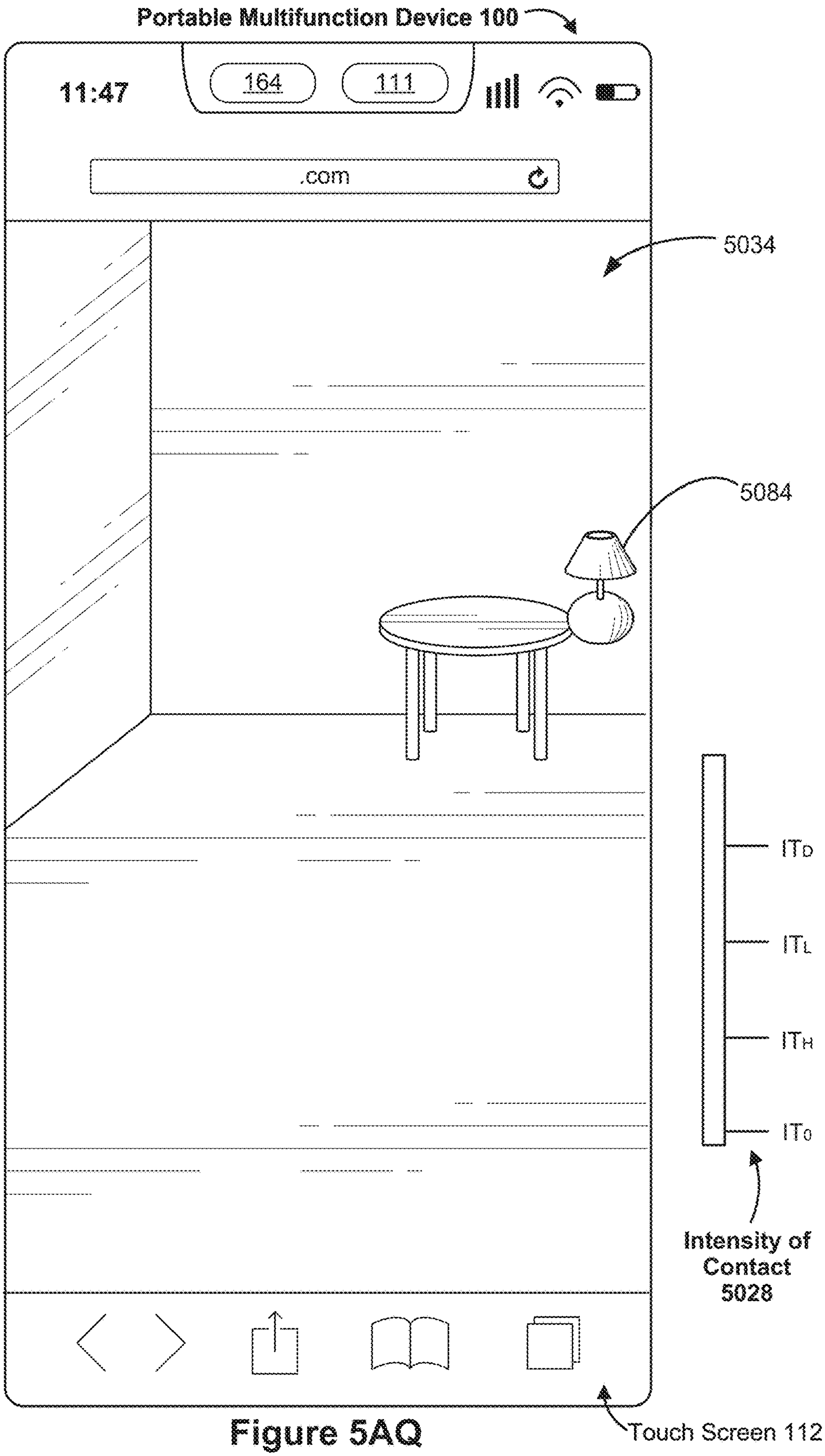
Figure 5A:
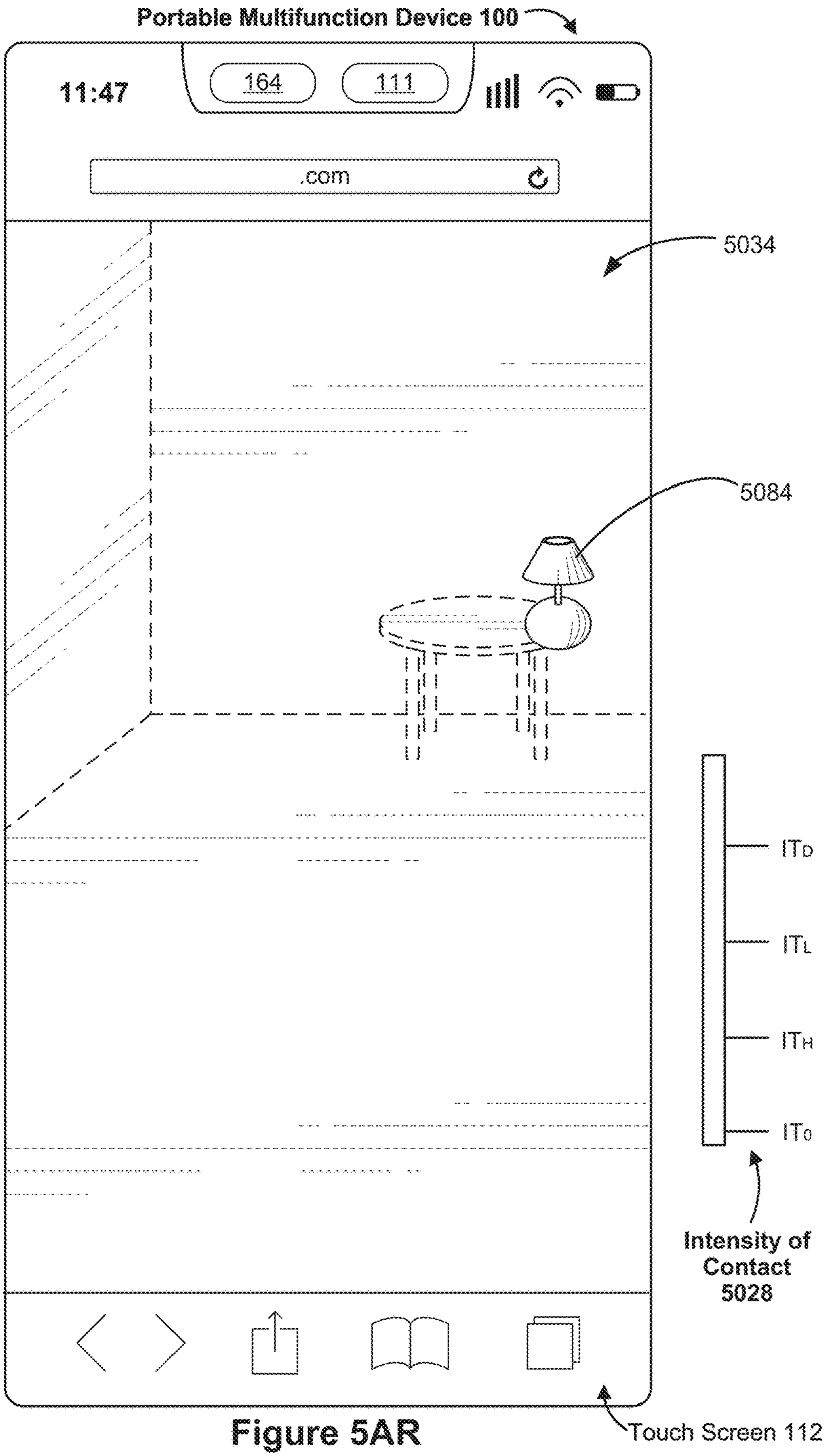
Figure 5A:
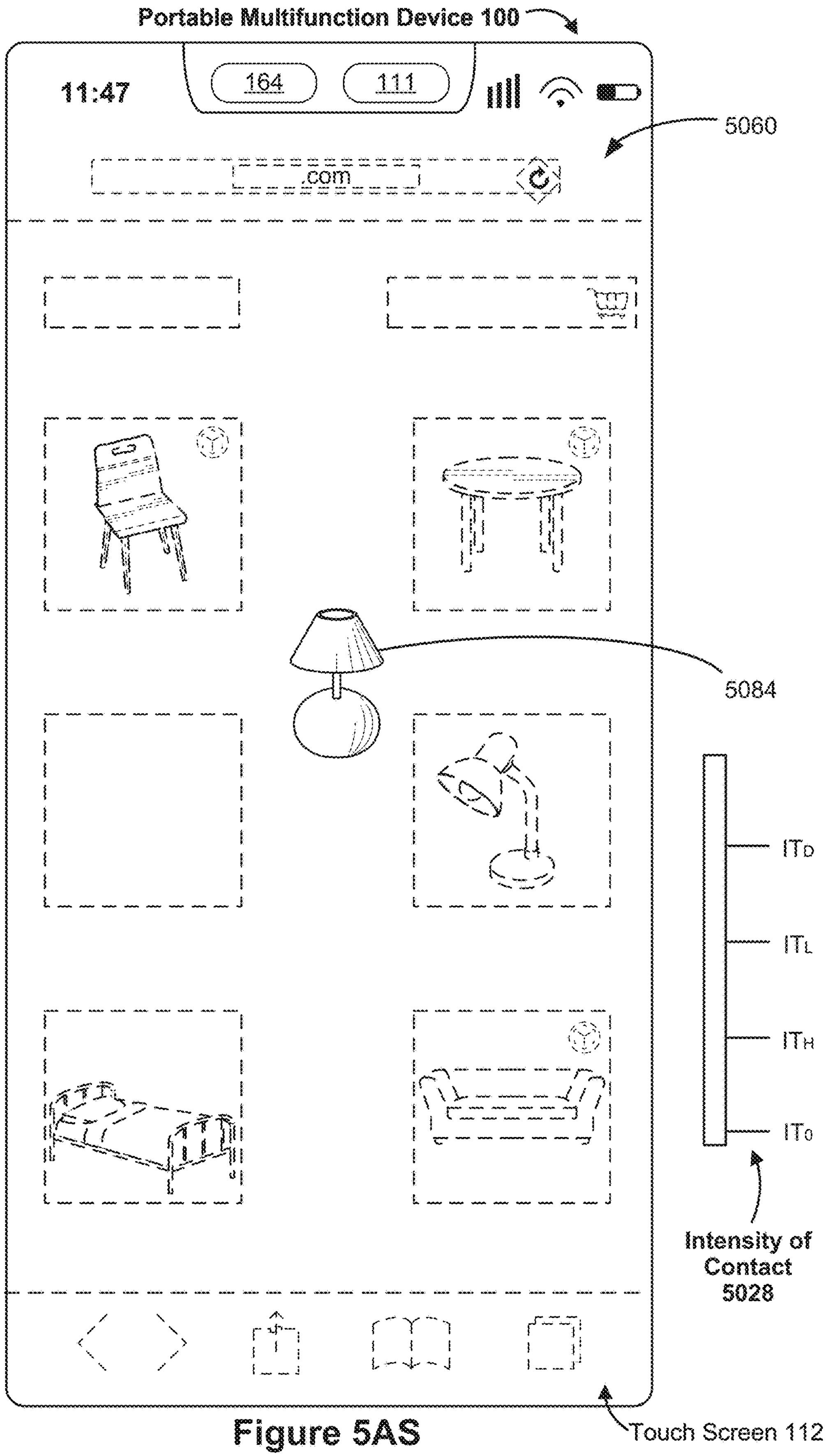
Figure 5A:
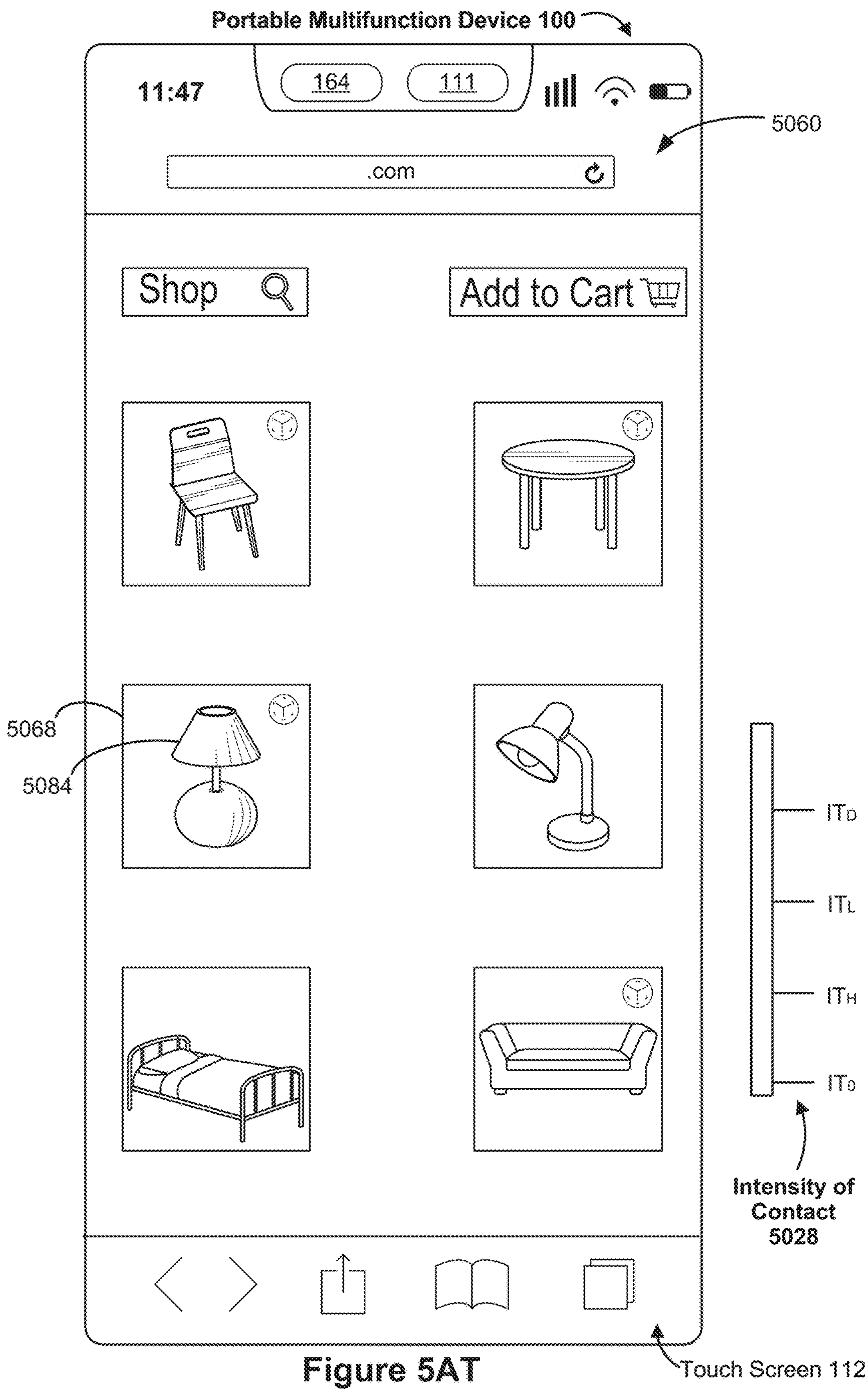

The input by contact 5054 illustrated in FIG. 5U-5X causes a transition, as shown in FIGS. 5Y-5AD, from displaying the field of view 5034 of the camera(s) in platter 5030 to ceasing to display the field of view 5034 of the camera(s) and returning to fully displaying the messaging user interface 5008. In FIG. 5Y, the field of view 5034 of the camera(s) begins to fade out in platter 5030. In FIGS. 5Y-5Z, platter 5030 transitions to message bubble 5018. In FIG. 5Z, the field of view 5034 of the camera(s) is no longer displayed. In FIG. 5AA, messaging user interface 5008 ceases to be blurred and the size of message bubble 5018 returns to the original size of message bubble 5018 (e.g., as shown in FIG. 5B).

FIGS. 5AA-5AD illustrate an animated transition of virtual chair 5020 that occurs as virtual chair 5020 moves from the position that corresponds to contact 5054 in FIG. 5AA to the original position of virtual chair 5020 in messaging user interface 5008 (e.g., as shown in FIG. 5B). In FIG. 5AB, contact 5054 has lifted off of touch screen 112. In FIGS. 5AB-5AC, virtual chair 5020 gradually increases in size and rotates toward its final position in FIG. 5AD.

In FIGS. 5B-5AD, the virtual chair 5020 has substantially the same three-dimensional appearance within the messaging user interface 5008 and within the displayed field of view 5034 of the camera(s), and the virtual chair 5020 maintains that same three-dimensional appearance during the transition from displaying the messaging user interface 5008 to displaying the field of view 5034 of the camera(s) and during the reverse transition. In some embodiments, the representation of virtual chair 5020 has a different appearance in the application user interface (e.g., the messaging user interface) than in the augmented reality environment (e.g., in the displayed field of view of the camera(s)). For example, the virtual chair 5020 optionally has a two-dimensional or more stylized look in the application user interface, while having a three-dimensional and more realistic and textured look in the augmented reality environment; and the intermediate appearances of the virtual chair 5020 during the transition between displaying the application user interface and the displaying the augmented reality environment are a series of interpolated appearances between the two-dimensional look and the three-dimensional look of the virtual chair 5020.

FIG. 5AE illustrates an Internet browser user interface 5060. The Internet browser user interface 5060 includes a URL/search input region 5062 that is configured to display a URL/search input for a web browser and browser controls 5064 (e.g., navigation controls including a back button and a forward button, a share control for displaying a sharing interface, a bookmark control for displaying a bookmarks interface, and a tabs control for displaying a tabs interface). Internet browser user interface 5060 also includes web objects 5066, 5068, 5070, 5072, 5074, and 5076. In some embodiments, a respective web object includes a link, such that in response to a tap input on the respective web object, a linked Internet location that corresponds to the web object is displayed in the Internet browser user interface 5060 (e.g., replacing display of the respective web object). Web objects 5066, 5068, and 5072 include two-dimensional representations of three-dimensional virtual objects as indicated by virtual object indicators 5078, 5080, and 5082, respectively. Web objects 5070, 5074, and 5076 include two-dimensional images (but the two-dimensional images of web objects 5070, 5074, and 5076 do not correspond to three-dimensional virtual objects, as indicated by the absence of the virtual object indicators). The virtual object that corresponds to web object 5068 is a lamp object 5084.

FIGS. 5AF-5AH illustrate an input that that causes a portion of the Internet browser user interface 5060 to be replaced by the field of view 5034 of the camera(s). In FIG. 5AF, a contact 5086 with touch screen 112 of device 100 is detected. A characteristic intensity of the contact is above a contact detection intensity threshold $IT_0$ and below a hint press intensity threshold $IT_H$, as illustrated by intensity level meter 5028. In FIG. 5AG, an increase in the characteristic intensity of the contact 5026 above the light press intensity threshold $IT_L$, as illustrated by intensity level meter 5028, has caused the field of view 5034 of the camera(s) to be displayed in web object 5068 (e.g., overlayed by virtual lamp 5084). In FIG. 5AH, an increase in the characteristic intensity of the contact 5086 above the deep press intensity threshold ITS, as illustrated by intensity level meter 5028, causes the field of view 5034 of the camera(s) to replace a larger portion of Internet browser user interface 5060 (e.g., leaving only URL/search input region 5062 and browser controls 5064), and tactile output generators 167 of the device 100 output a tactile output (as illustrated at 5088) to indicate that criteria have been met for replacing a portion of the Internet browser user interface 5060 with the field of view 5034 of the camera(s). In some embodiments, in response to the input described with regard to FIGS. 5AF-5AH, the field of view 5034 of the camera(s) fully replaces Internet browser user interface 506 on touch screen display 112.

FIGS. 5AI-5AM illustrate an input that causes movement of virtual lamp 5084. In FIGS. 5AI-5AJ, as the contact 5086 moves along a path indicated by arrow 5090, virtual lamp 5084 is dragged by the contact 5086. As the virtual lamp 5084 is moved by contact 5086, the size of the virtual lamp 5084 is unchanged and the path of the virtual lamp 5084 is optionally unconstrained by the structure of the physical space captured in the field of view of the camera(s). As the virtual lamp 5084 is moved by contact 5086, planes identified in the field of view 5034 of the camera(s) are highlighted. For example, floor plane 5038 is highlighted in FIG. 5AJ, as the virtual lamp 5084 moves over the floor plane 5038. In FIGS. 5AJ-5AK, as the contact 5086 moves along a path indicated by arrow 5092, virtual lamp 5084 continues to be dragged by the contact 5086. In FIGS. 5AK-5AL, as the contact 5086 moves along a path indicated by arrow 5094, virtual lamp 5084 continues to be dragged by the contact 5086, floor plane 5038 ceases to be highlighted, and table surface 5046 is highlighted as the virtual lamp 5084 moves over the table 5004. In FIG. 5AM, the contact 5086 has lifted off of touch screen 112. When the contact 5086 has lifted off, the size of the virtual lamp 5086 is adjusted to have a correct scale relative to table 5004 in the field of view 5034 of the camera(s) and the virtual lamp 5086 is placed in an upright orientation on the table surface 5046 in the field of view 5034 of the cameras.

FIGS. 5AM-5AQ illustrate an input that drags the virtual lamp 5084 to the edge of touch screen display 112, which causes the field of view 5034 of the camera(s) to cease to be displayed and the Internet browser user interface 5060 to be restored. In FIG. 5AN, a contact 5096 with touch screen 112 of device 100 is detected at a location that corresponds to virtual lamp 5084. In FIGS. 5AN-5AO, as the contact 5096 moves along a path indicated by arrow 5098, the virtual lamp 5084 is dragged by the contact 5096. In FIGS. 5AO-5AP, as the contact 5054 moves along a path indicated by arrow 5100, the virtual lamp 5084 continues to be dragged by the contact 5096 to a position shown in FIG. 5AP. In FIG. 5AQ, the contact 5096 has lifted off of touch screen 112.

The input by contact 5096 illustrated in FIG. 5AM-5AP causes a transition, as shown in FIGS. 5AQ-5AT, from displaying the field of view 5034 of the camera(s) to ceasing to display the field of view 5034 of the camera(s) and returning to fully displaying the Internet browser user interface 5060. In FIG. 5AR, the field of view 5034 of the camera(s) begins to fade out (as indicated by the dotted lines). In FIGS. 5AR-5AT, virtual lamp 5084 increases in size and moves toward its original position in the Internet browser user interface 5060. In FIG. 5AS, the field of view 5034 of the camera(s) is no longer displayed and the Internet browser user interface 5060 begins to fade in (as indicated by the dotted lines). In FIG. 5AT, the Internet browser user interface 5060 is fully displayed and virtual lamp 5084 has returned to its original size and location within Internet browser user interface 5060.

Figure 6A:
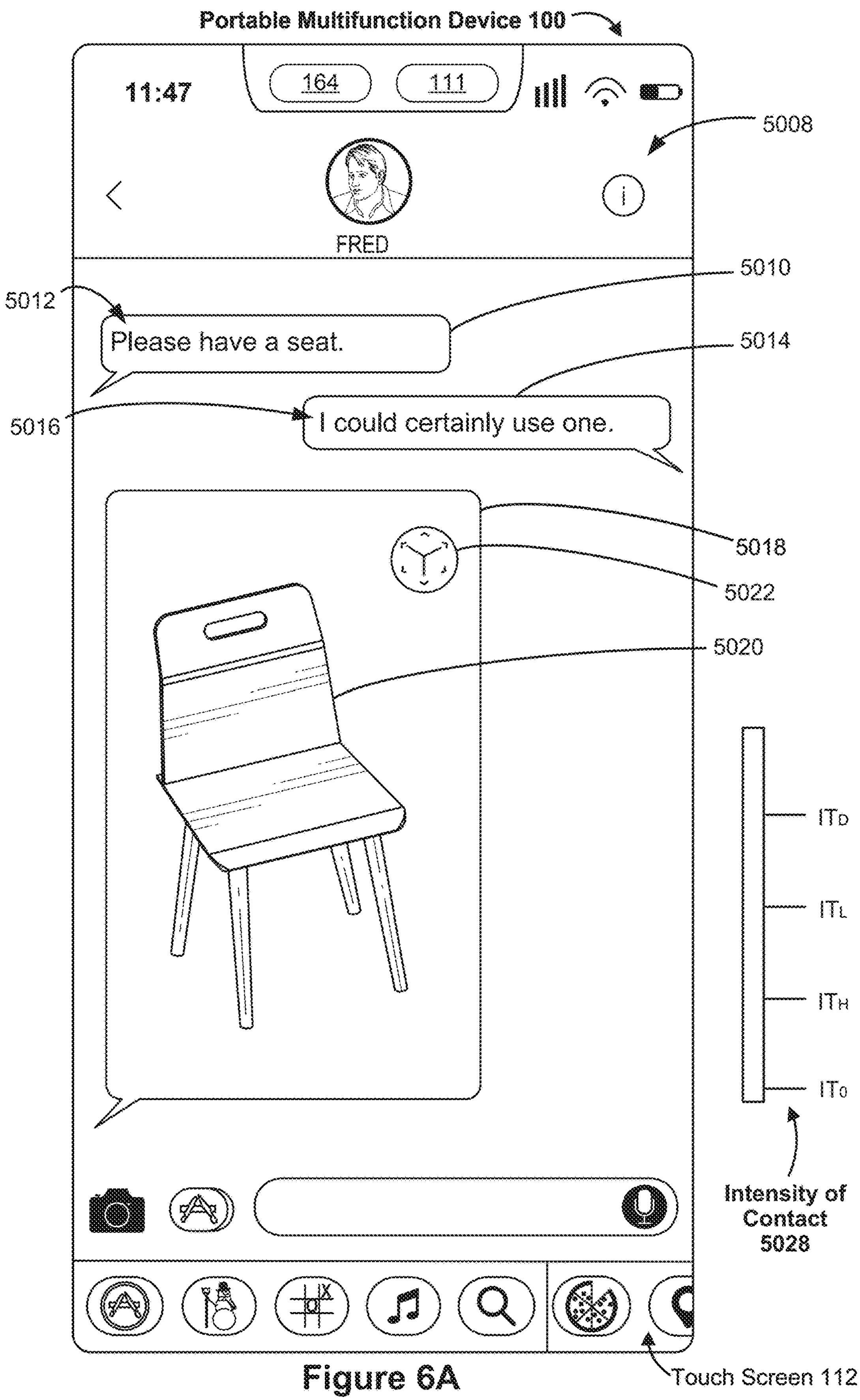
FIGS. 6A-6AJ illustrate example user interfaces for displaying a first representation of a virtual object in a first user interface region, a second representation of the virtual object in the second user interface region, and a third representation of the virtual object with a representation of a field of view of one or more cameras in accordance with some embodiments, in accordance with some embodiments.

FIGS. 6A-6AJ illustrate example user interfaces for displaying a first representation of a virtual object in a first user interface region, a second representation of the virtual object in the second user interface region, and a third representation of the virtual object with a representation of a field of view of one or more cameras, in accordance with some embodiments. The user interfaces in these figures are used to illustrate the processes described below, including the processes in FIGS. 8A-8E, 9A-9D, 10A-10D, 16A-16G, 17A-17D, 18A-18I, 19A-19H, and 20A-20F. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIG. 6A illustrates a messaging user interface 5008 that includes a message bubble 5010 that includes a received text message 5012, a message bubble 5014 that includes a sent text message 5016, and a message bubble 5018 that includes a virtual object (e.g., virtual chair 5020) received in a message and a virtual object indicator 5022 to indicate that the virtual chair 5020 is an object that is viewable in an augmented reality view (e.g., within in a displayed field of view of one or more cameras of device 100). Messaging user interface 5008 is described in further detail with regard to FIG. 5B.

Figure 6B:
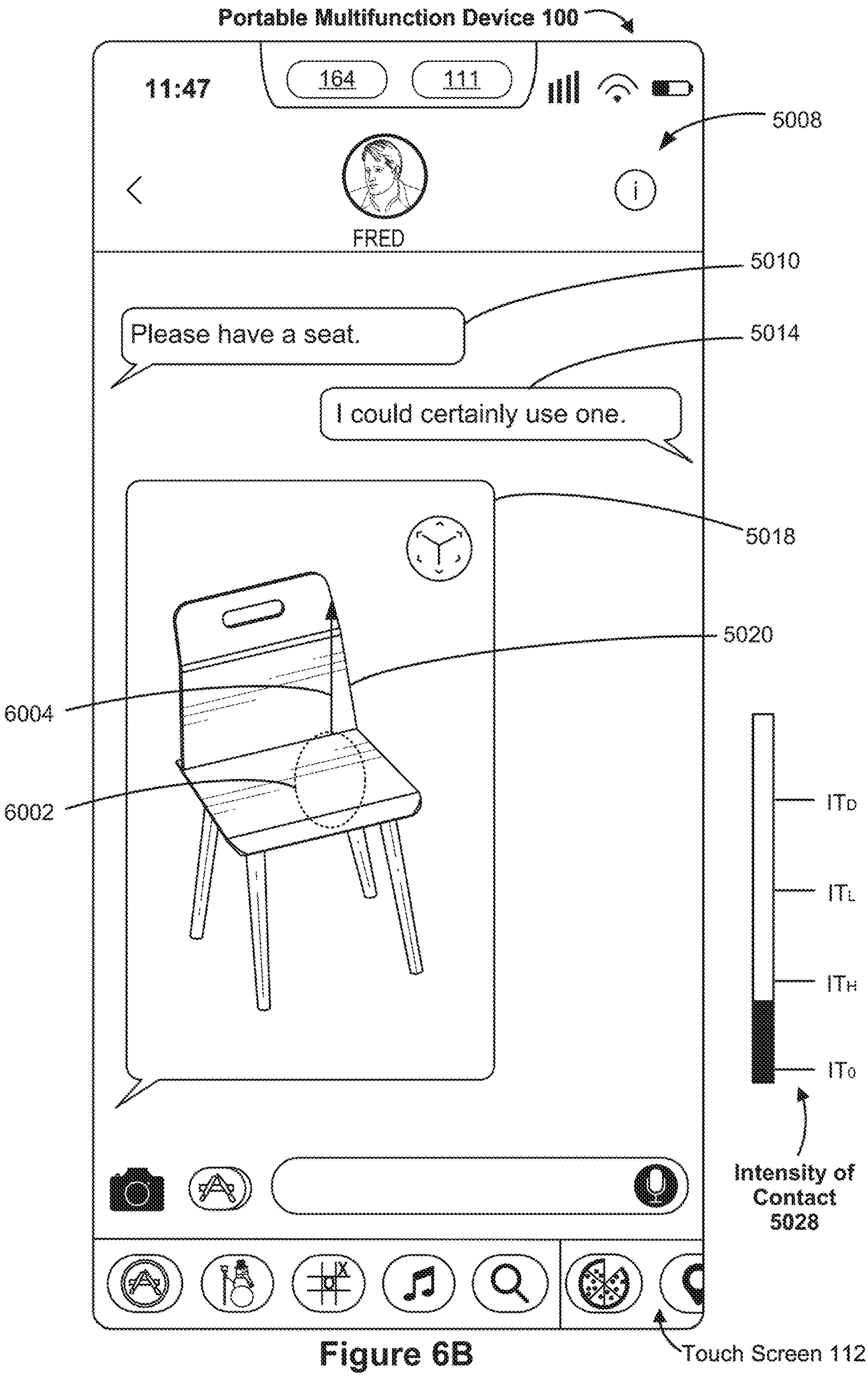
Figure 6C:
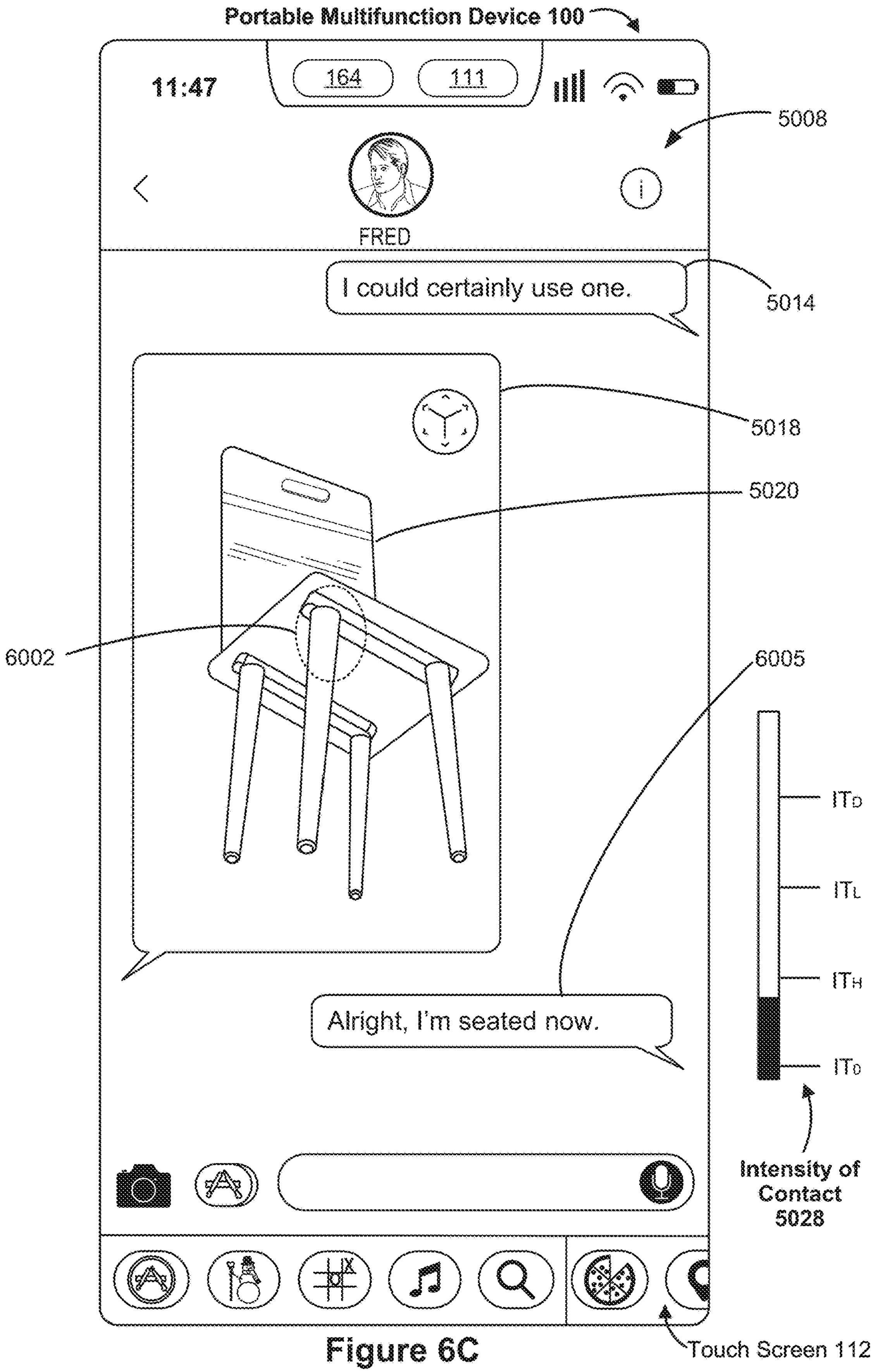
Figure 6D:
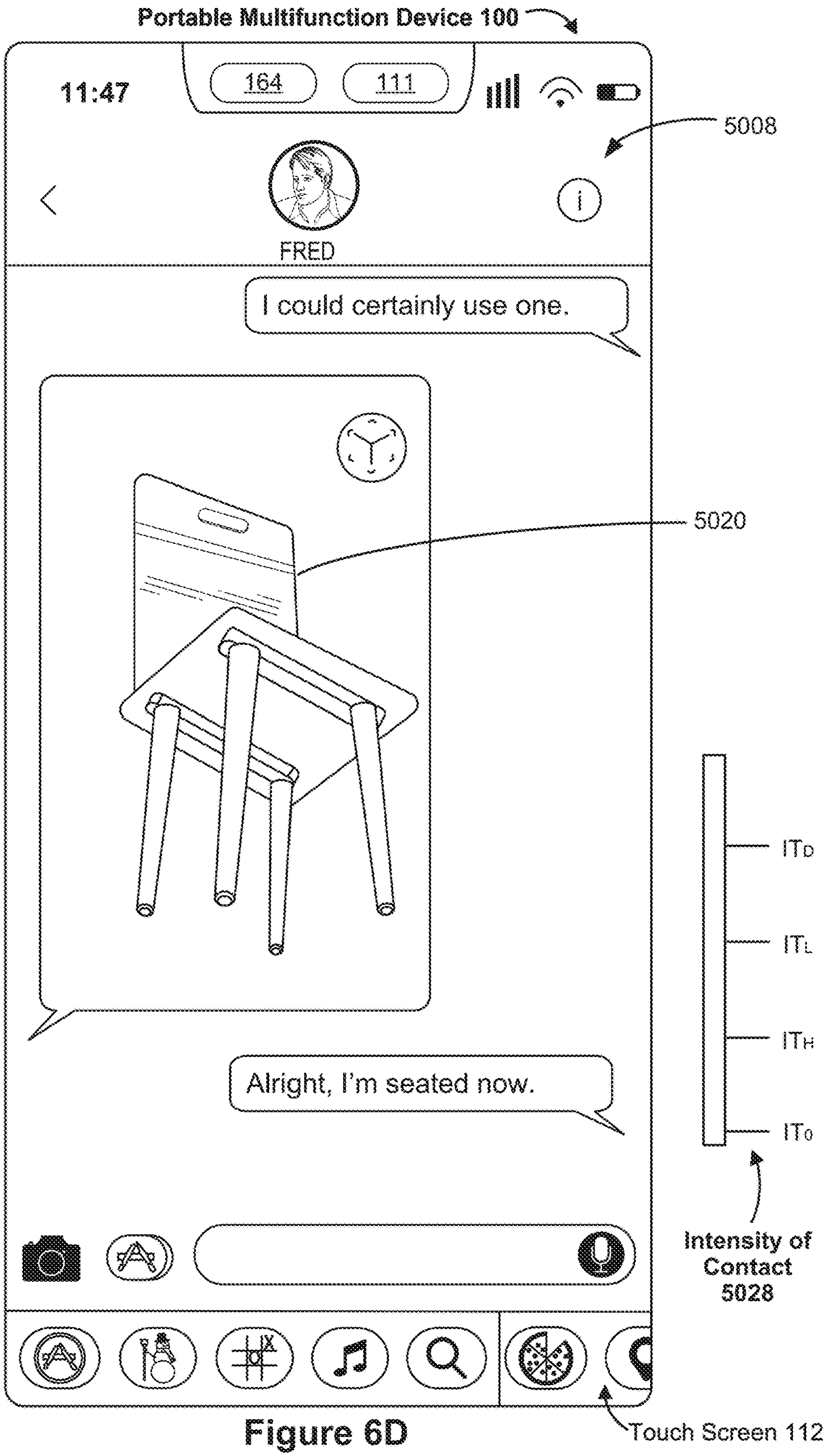

FIGS. 6B-6C illustrate an input that causes rotation of the virtual chair 5020. In FIG. 6B, a contact 6002 with touch screen 112 of device 100 is detected. The contact 6002 moves across touch screen 112 along a path indicated by arrow 6004. In FIG. 6C, in response to the movement of the contact, messaging user interface 5008 is scrolled upward (causing message bubble 5010 to scroll off of the display, causing message bubbles 5014 and 5018 to scroll upward, and revealing an additional message bubble 6005) and virtual chair 5020 is rotated (e.g., tilted upward). The magnitude and direction of the rotation of virtual chair 5020 correspond to the movement of contact 6002 along the path indicated by arrow 6004. In FIG. 6D, the contact 6002 has lifted off of touch screen 112. In some embodiments, this rotational behavior of the virtual chair 5020 within the message bubble 5018 is used as an indication that the virtual chair 5020 is a virtual object that is viewable in an augmented reality environment including the field of view of the camera(s) of the device 100.

Figure 6E:
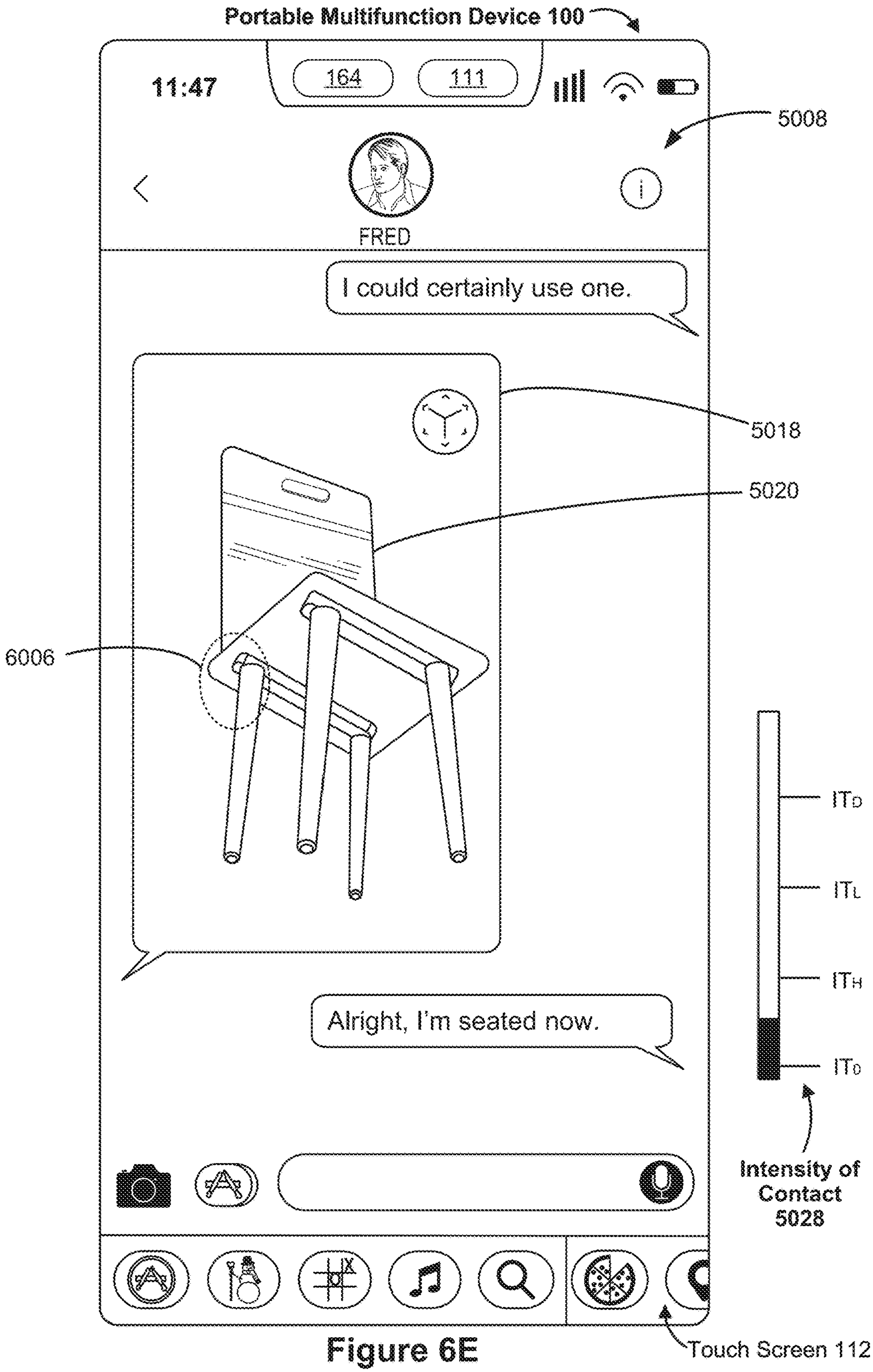
Figure 6F:
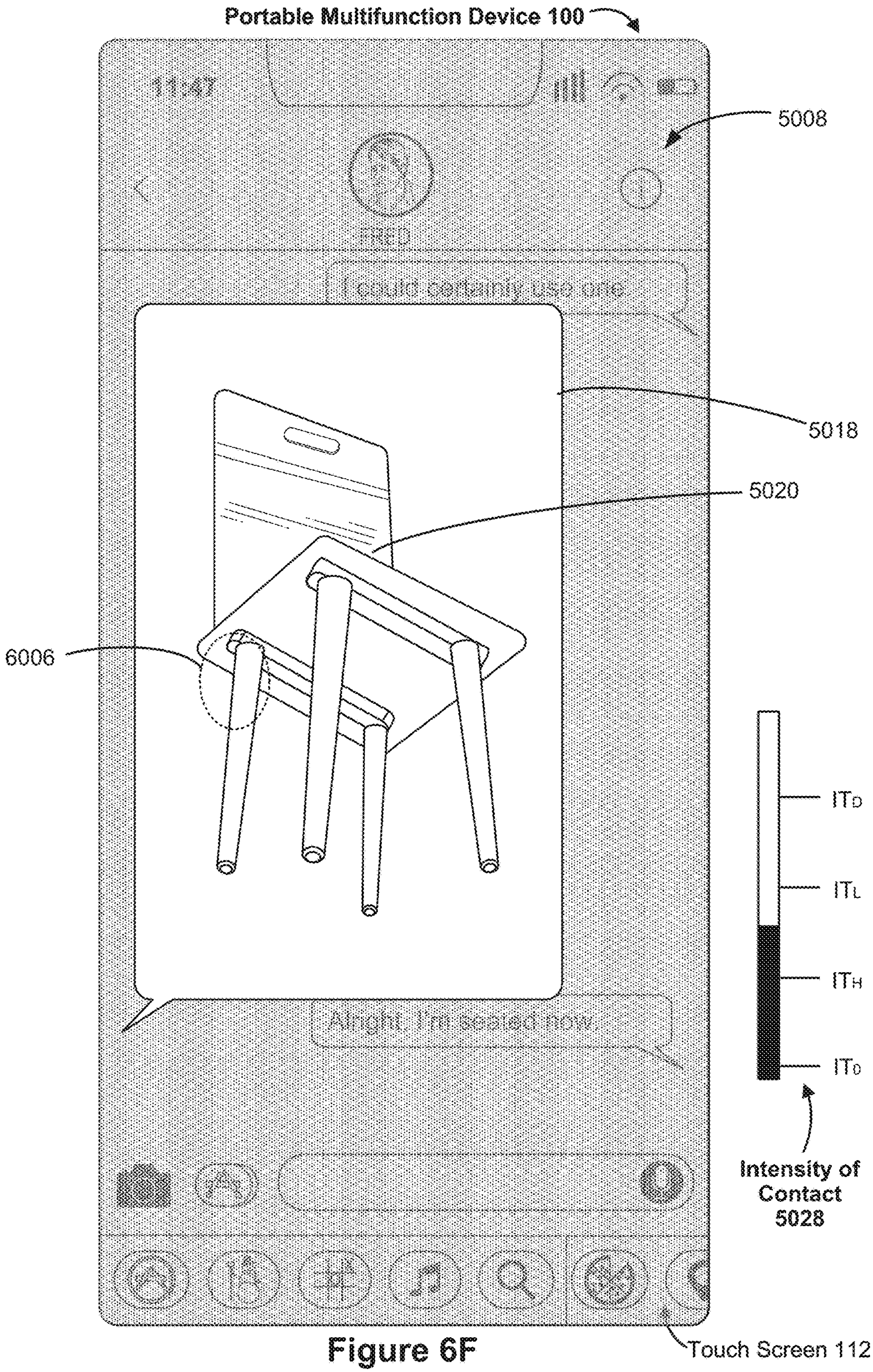
Figure 6G:
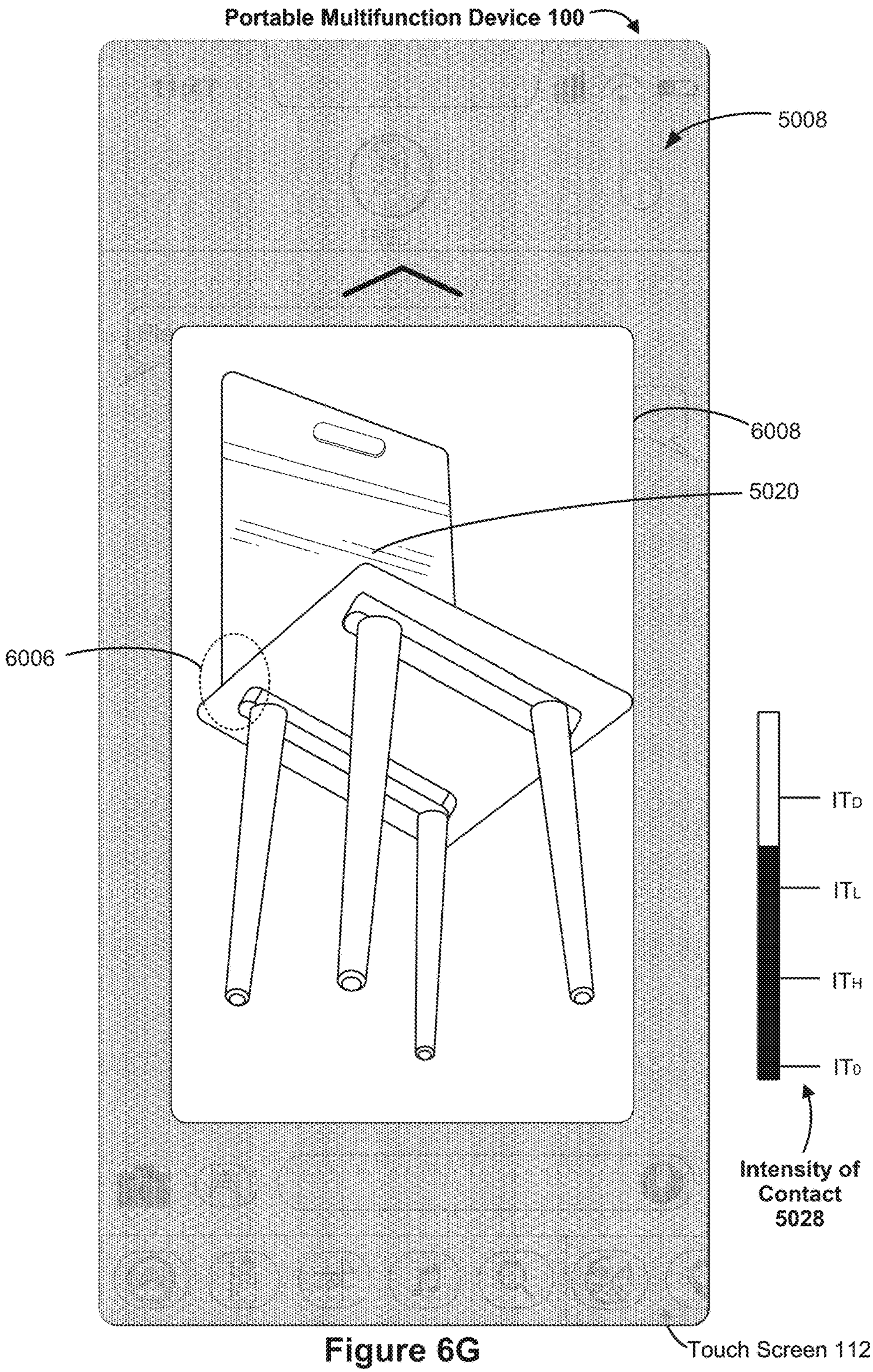
Figure 6H:
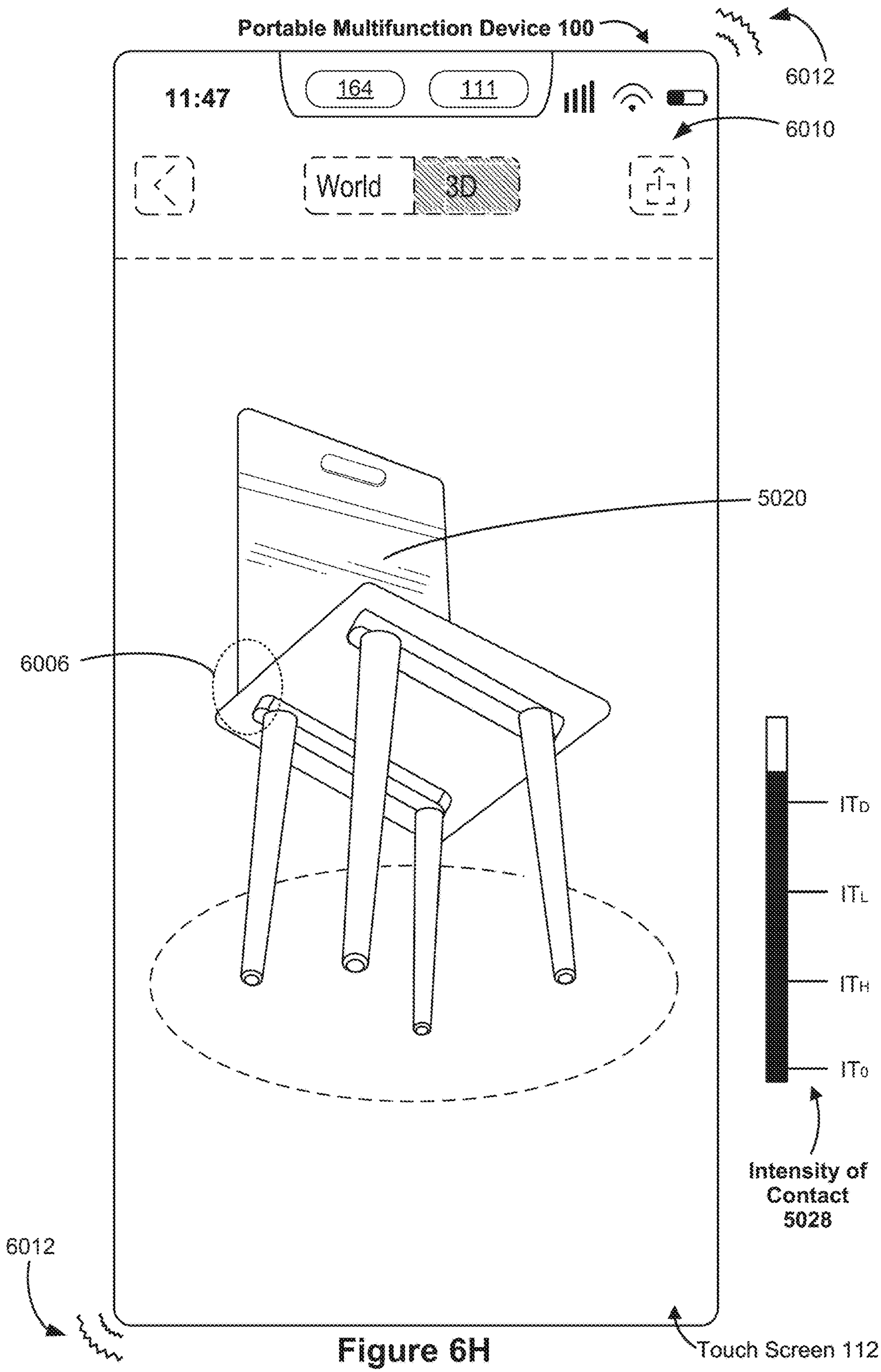

FIGS. 6E-6L illustrate an input that that causes the messaging user interface 5008 to be replaced by a staging user interface 6010 and that subsequently changes the orientation of virtual chair 5020. In FIG. 6E, a contact 6006 with touch screen 112 of device 100 is detected. A characteristic intensity of the contact is above a contact detection intensity threshold $IT_0$ and below a hint press intensity threshold $IT_H$, as illustrated by intensity level meter 5028. In FIG. 6F, an increase in the characteristic intensity of the contact 6006 above the hint press intensity threshold $IT_H$, as illustrated by intensity level meter 5028, has caused the area of message bubble 5018 to increase, the size of the virtual chair 5020 to increase, and messaging user interface 5008 to begin to be blurred behind message bubble 5018 (e.g., to provide visual feedback to the user of the effect of increasing the characteristic intensity of the contact). In FIG. 6G, an increase in the characteristic intensity of the contact 6006 above the light press intensity threshold $IT_L$, as illustrated by intensity level meter 5028, has caused message bubble 5018 to be replaced by a platter 6008, the size of the virtual chair 5020 to increase further, and increased blurring of messaging user interface 5008 behind platter 6008. In FIG. 6H, an increase in the characteristic intensity of the contact 6006 above the deep press intensity threshold ITS, as illustrated by intensity level meter 5028, causes messaging user interface 5008 to cease to be displayed and initiates fade-in (indicated by dotted lines) of staging user interface 6010. Additionally, the increase in the characteristic intensity of the contact 6006 above the deep press intensity threshold $IT_D$, as illustrated in FIG. 6H, causes tactile output generators 167 of the device 100 to output a tactile output (as illustrated at 6012) to indicate that criteria have been met for replacing the messaging user interface 5008 with the staging user interface 6010.

In some embodiments, before the characteristic intensity of the contact 6006 reaches the deep press intensity threshold $IT_D$, as illustrated in FIG. 6H, the progression illustrated in FIGS. 6E-6G is reversible. For example, reducing the characteristic intensity of the contact 6006 after the increases illustrated in FIGS. 6F and/or 6G will cause the interface state that corresponds to the decreased intensity level of the contact 6006 to be displayed (e.g., the interface as shown in FIG. 6G is shown in accordance with a determination that the reduced characteristic intensity of the contact is above the light press intensity threshold $IT_L$, the interface as shown in FIG. 6F is shown in accordance with a determination that the reduced characteristic intensity of the contact is above the hint press intensity threshold $IT_H$, and the interface as shown in FIG. 6E is shown in accordance with a determination that the reduced characteristic intensity of the contact is below the hint press intensity threshold $IT_H$). In some embodiments, reducing the characteristic intensity of the contact 6006 after the increases illustrated in FIGS. 6F and/or 6G will cause the interface as shown in FIG. 6E to be redisplayed.

Figure 6I:
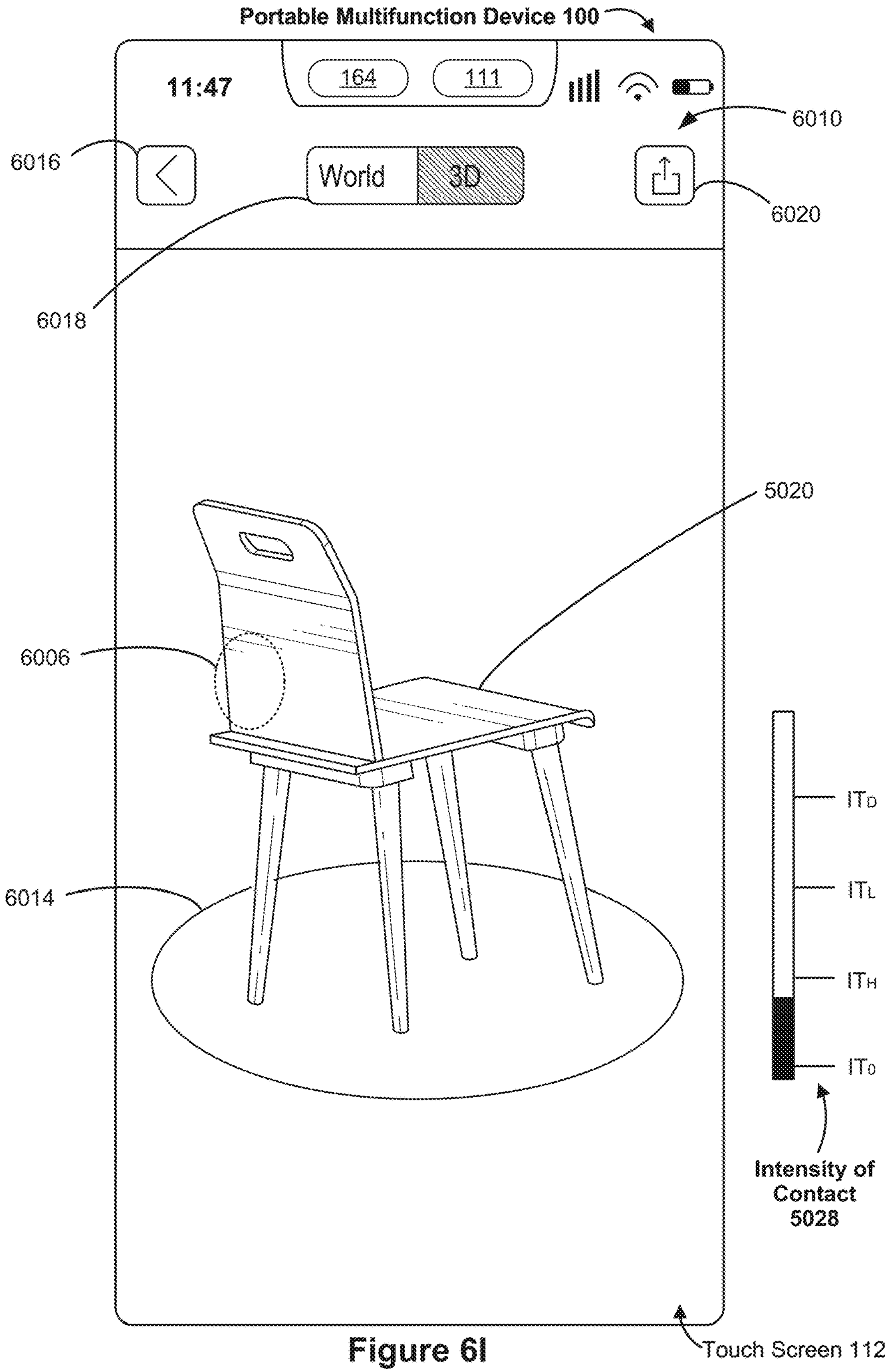

In FIG. 6I, staging user interface 6010 is displayed. Staging user interface 6010 includes stage 6014 on which virtual chair 5020 is displayed. From FIG. 6H-6I, virtual chair 5020 is animated to indicate the transition from a position of virtual chair 5020 in FIG. 6H to a position of virtual chair 5020 in FIG. 6I. For example, virtual chair 5020 is rotated to a predefined position, orientation and/or distance relative to stage 6014 (e.g., such that virtual chair appears to be supported by stage 6014). Staging user interface 6010 also includes back control 6016, that, when activated (e.g., by a tap input at a location that corresponds to back control 6016), causes the previously displayed user interface (e.g., messaging user interface 5008) to be redisplayed. Staging user interface 6010 also includes toggle control 6018 that indicates that a current display mode (e.g., the current display mode is a staging user interface mode, as indicated by the highlighted "3D" indicator) and that, when activated, causes transition to a selected display mode. For example, while the staging user interface 6010 is displayed, a tap input by a contact at a location that corresponds to toggle control 6018 (e.g., a location that corresponds to a portion of toggle control 6018 that includes the text "World") causes the staging user interface 6010 to be replaced by a field of view of the camera(s). Staging user interface 6010 also includes share control 6020 (e.g., for displaying a sharing interface).

Figure 6J:
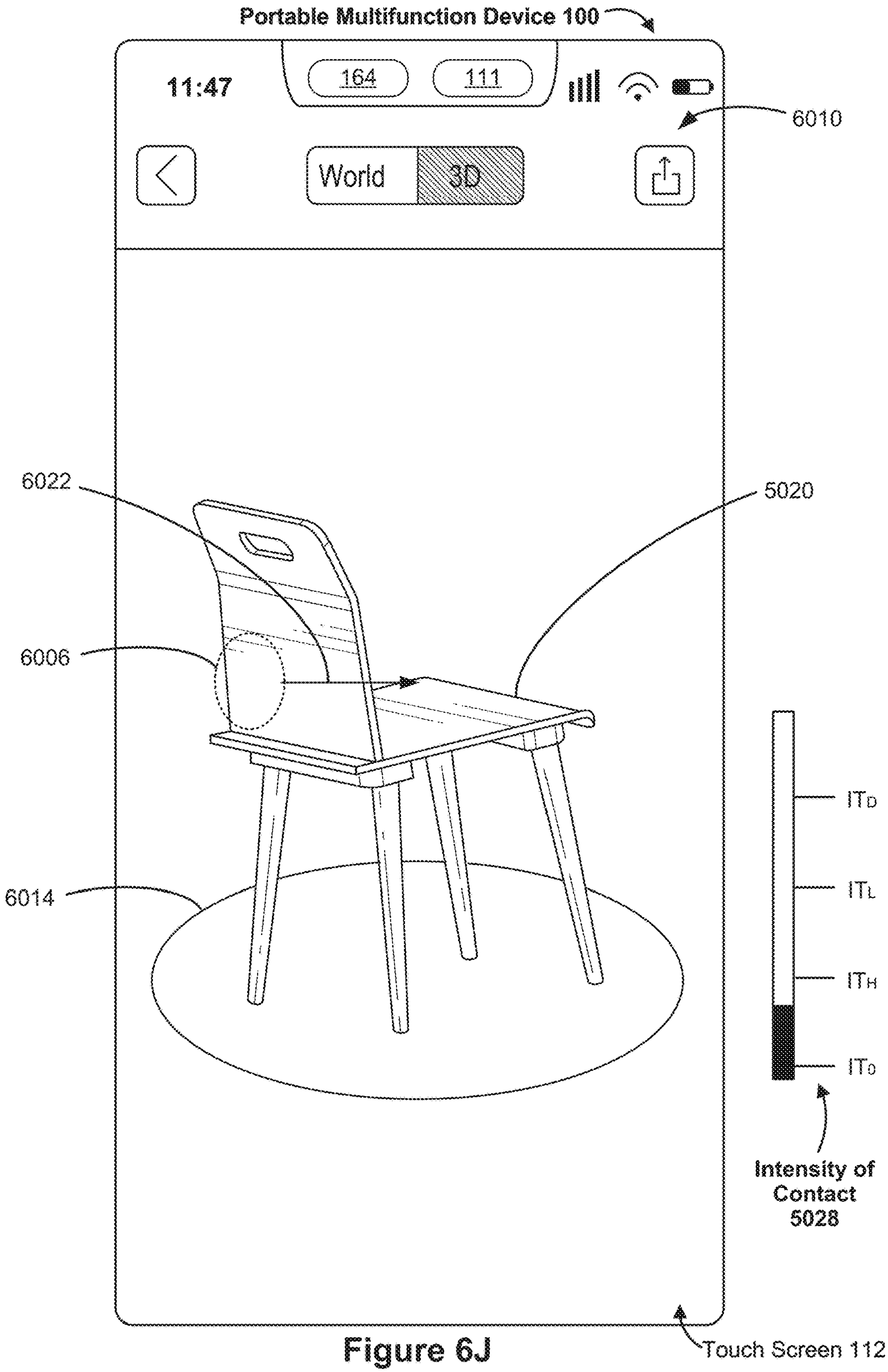
Figure 6K:
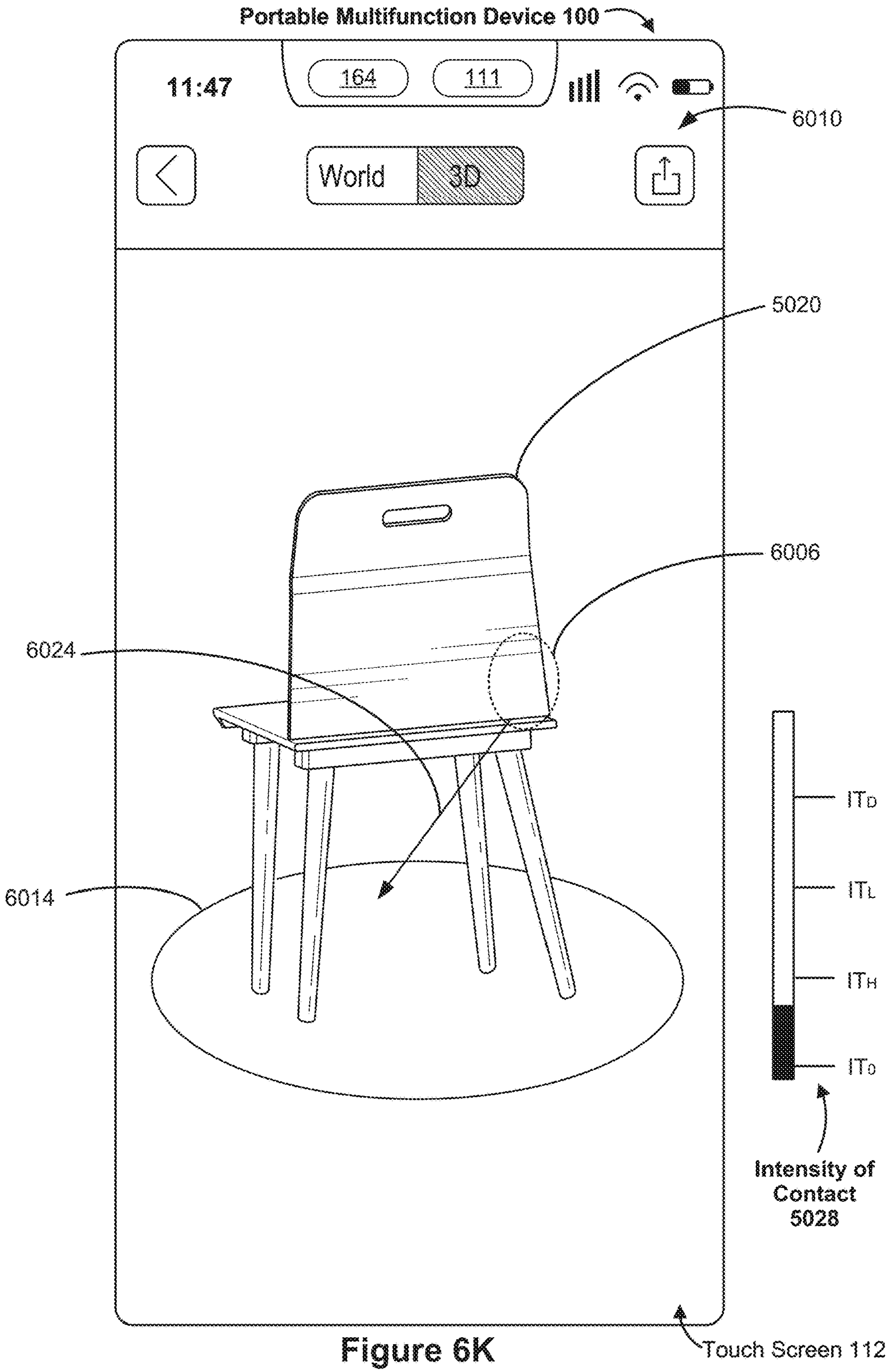
Figure 6L:
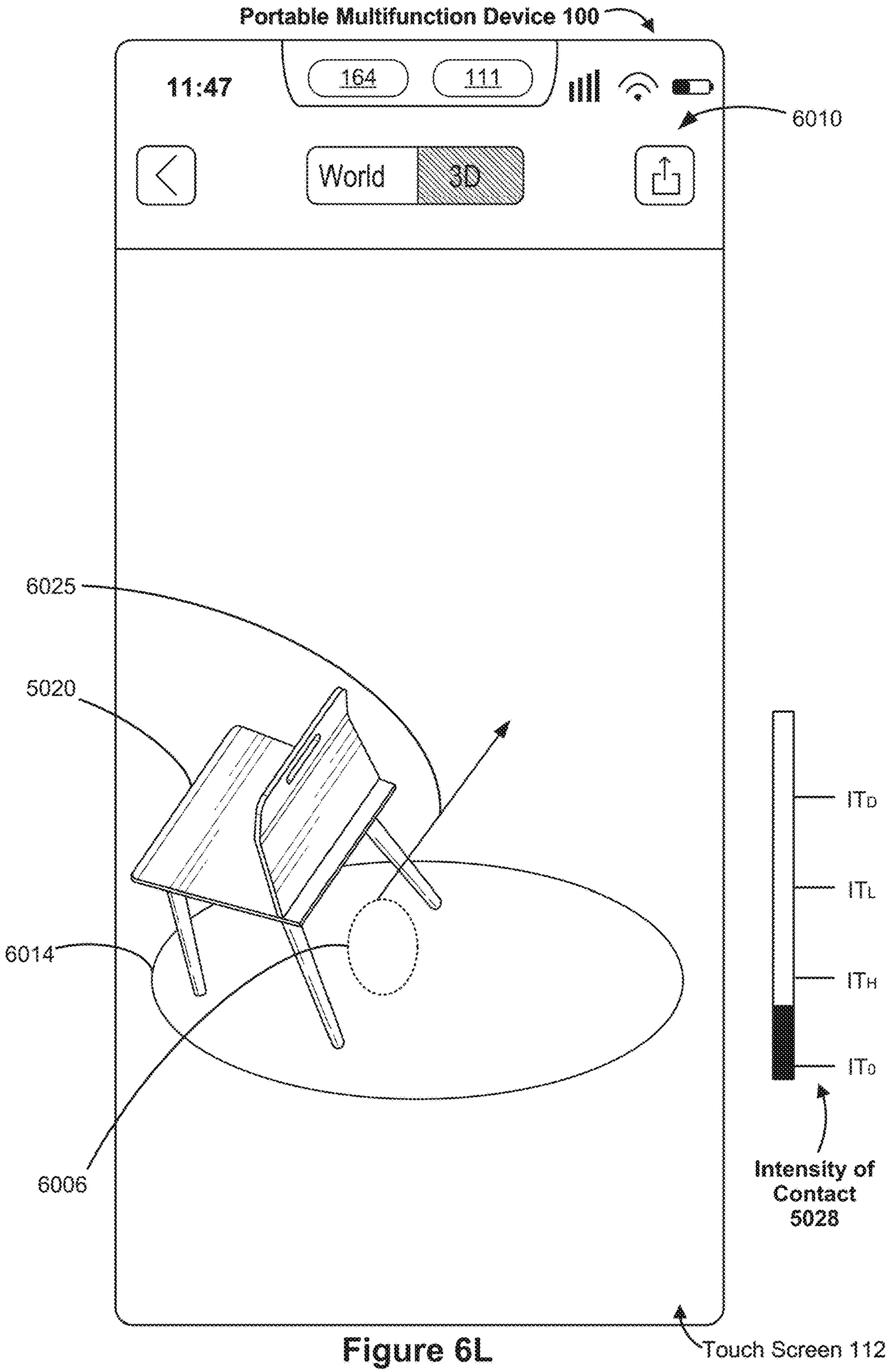
Figure 6M:
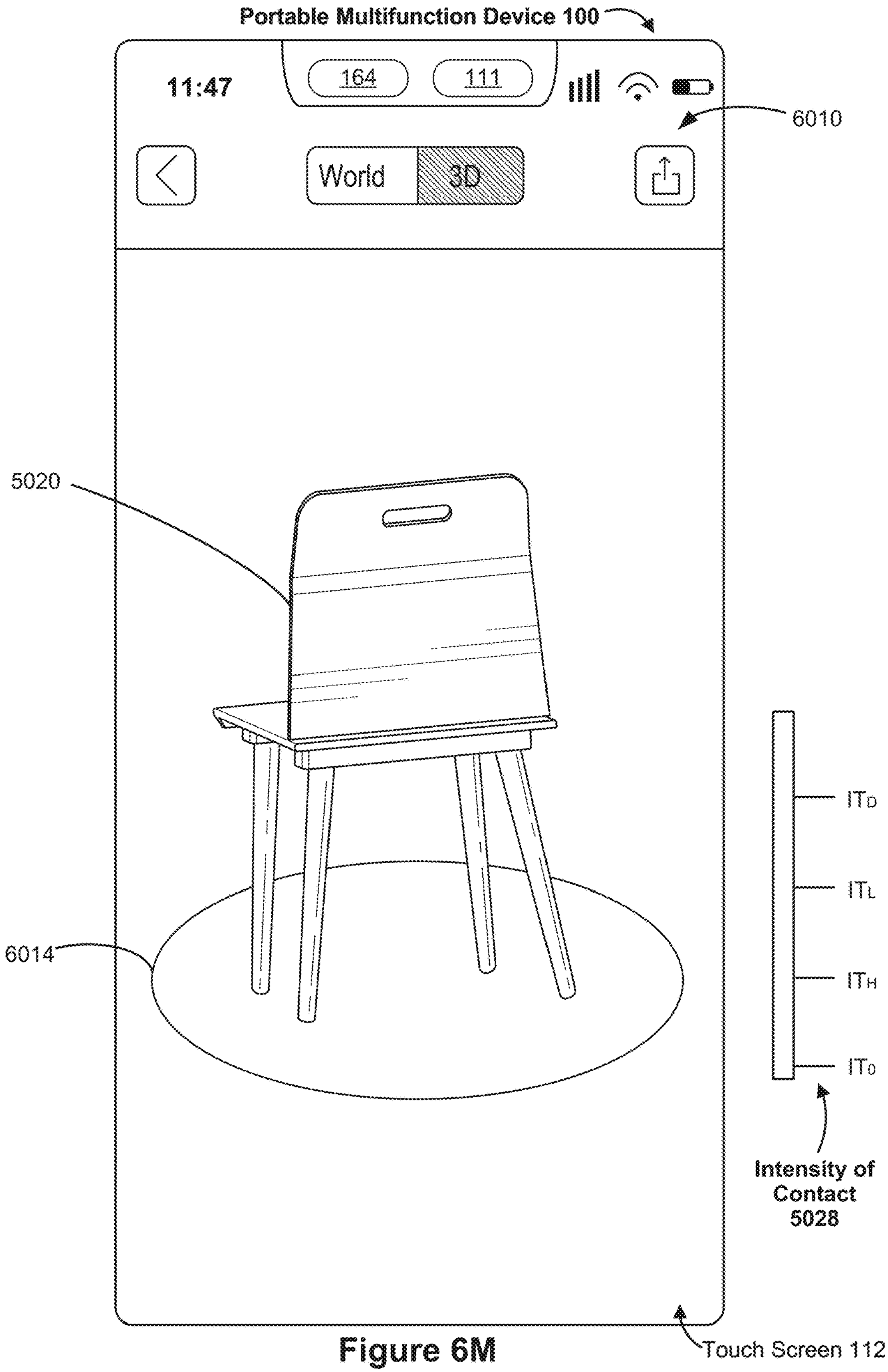

FIGS. 6J-6L illustrate rotation of virtual chair 5020 relative to stage 6014 caused by movement of contact 6006. In FIGS. 6J-6K, as the contact 6006 moves along a path indicated by arrow 6022, virtual chair 5020 is rotated (e.g., about a first axis that is perpendicular to the movement of the contact 6066). In FIGS. 6K-6L, as the contact 6006 moves along a path indicated by arrow 6024, and subsequently along a path indicated by arrow 6025, virtual chair 5020 is rotated (e.g., about a second axis that is perpendicular to the movement of the contact 6066). In FIG. 6M, the contact 6006 has lifted off of touch screen 112. In some embodiments, as shown in FIGS. 6J-6L, the rotation of virtual chair 5020 is constrained by the surface of the stage 6014. For example, at least one leg of the virtual chair 5020 remains in contact with the surface of the stage 6014 during the rotation(s) of the virtual chair. In some embodiments, the surface of the stage 6014 serves as a frame of reference for the free rotation and vertical translation of the virtual chair 5020 without placing particular constraints on the movement of the virtual chair 5020.

Figure 6N:
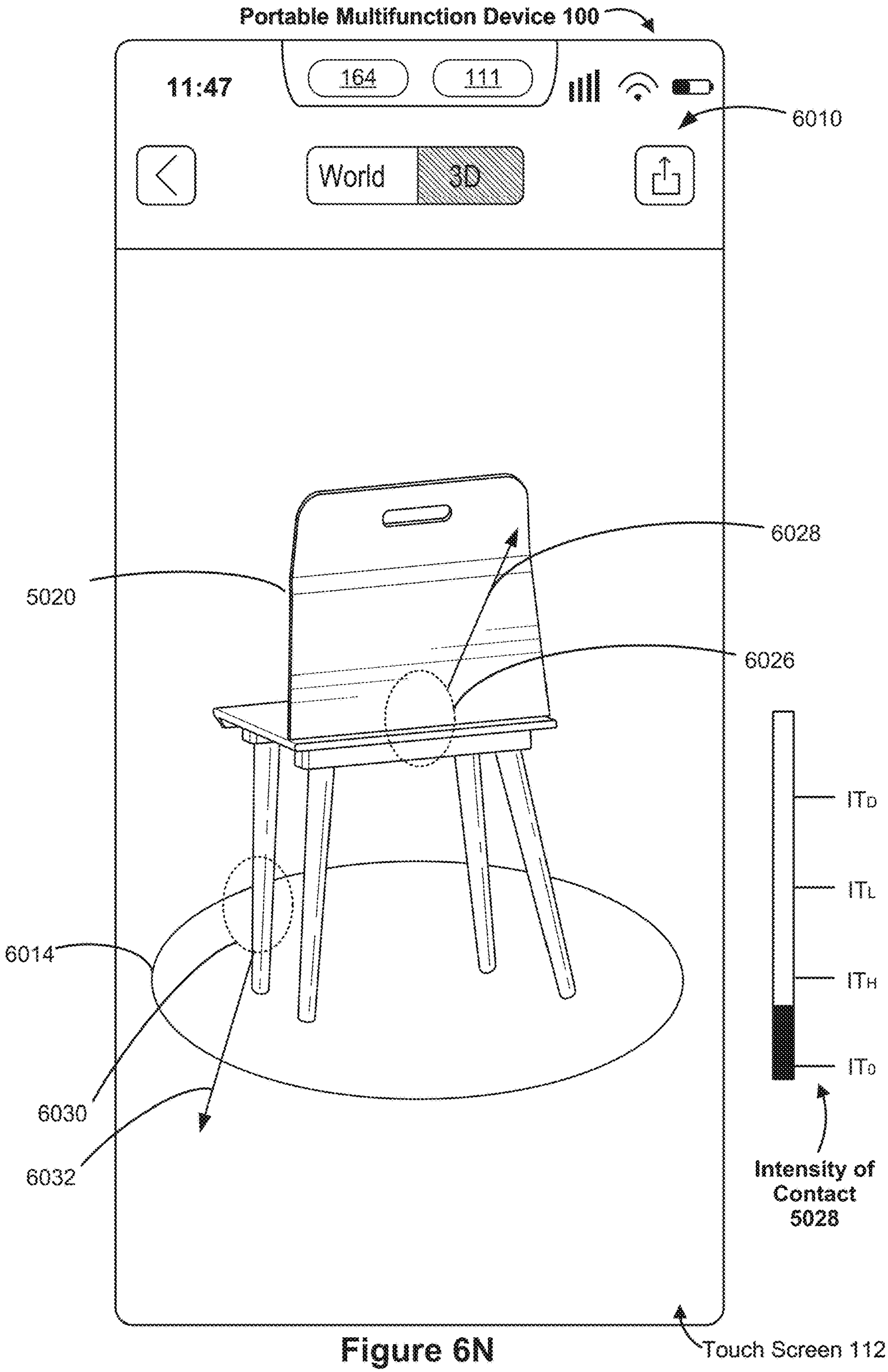
Figure 6O:
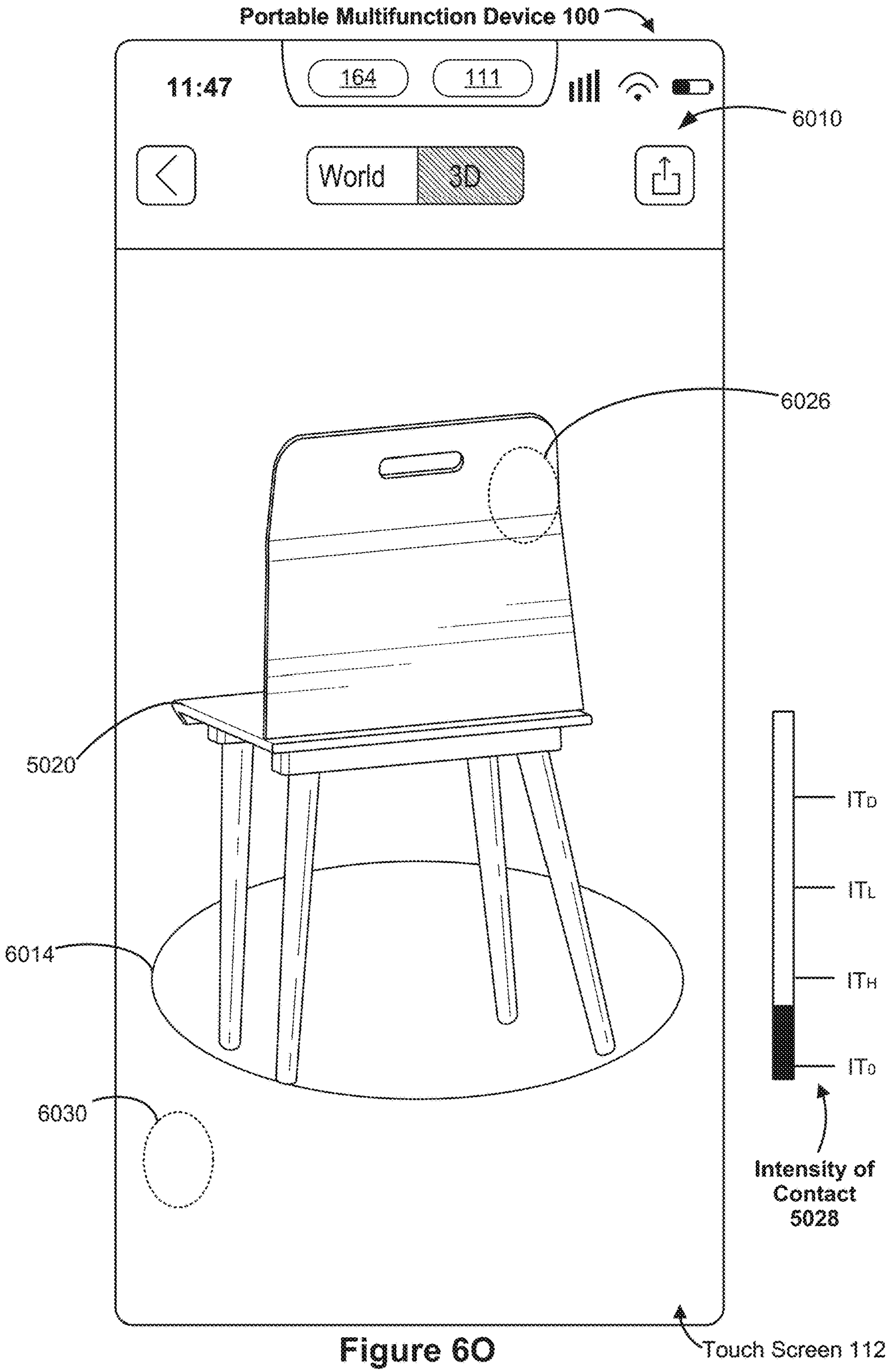
Figure 6P:
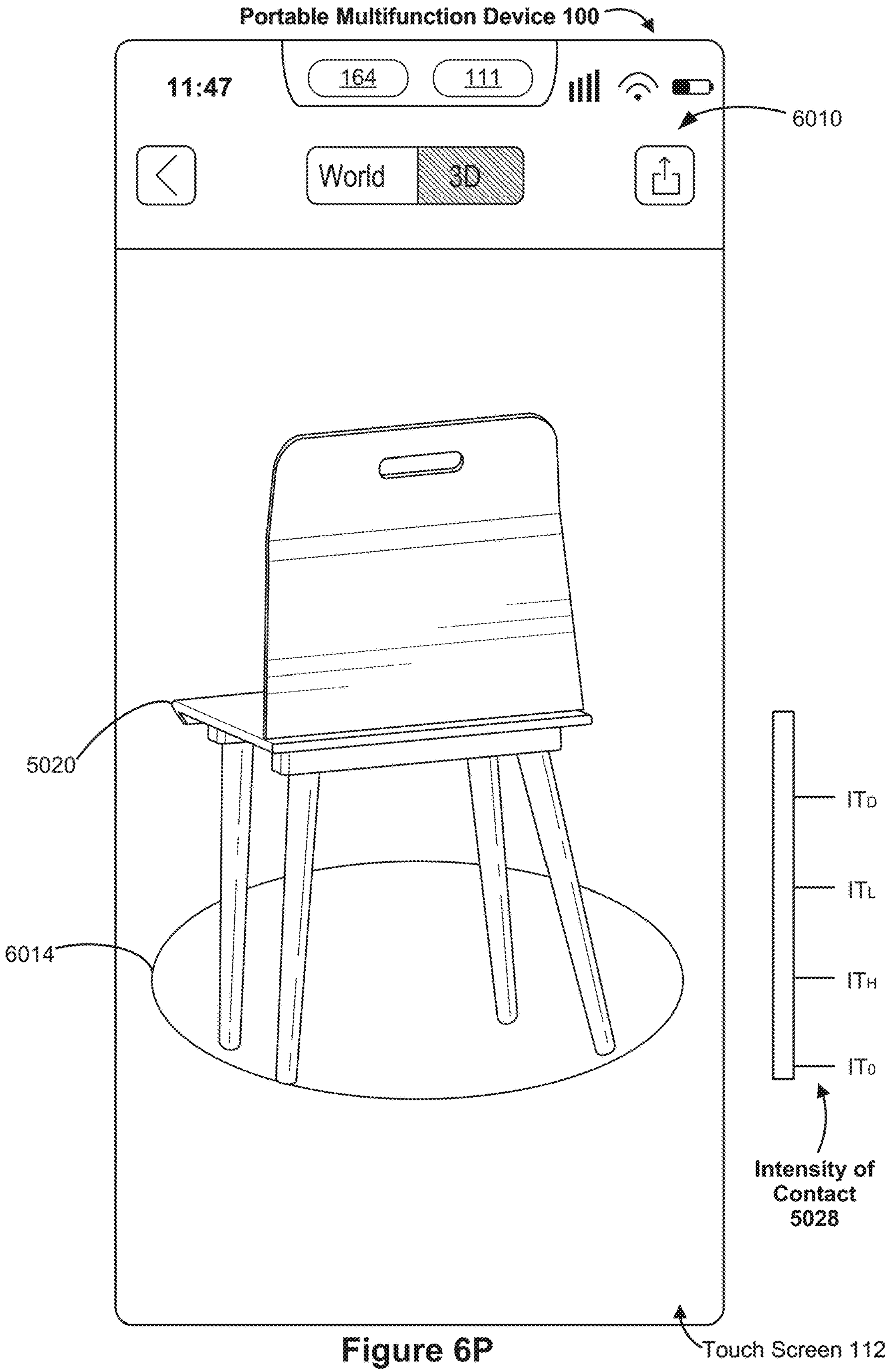

FIGS. 6N-6O illustrate an input that adjusts the displayed size of virtual chair 5020. In FIG. 6N, a first contact 6026 and a second contact 6030 with touch screen 112 are detected. First contact 6026 moves along a path indicated by arrow 6028 and, simultaneously with the movement of first contact 6026, second contact 6030 moves along a path indicated by arrow 6032. In FIGS. 6N-6O, as the first contact 6026 and the second contact 6030 move along the paths indicated by arrows 6028 and 6032, respectively (e.g., in a depinch gesture), a displayed size of virtual chair 5020 increases. In FIG. 6P, first contact 6030 and second contact 6026 have lifted off of touch screen 112 and virtual chair 5020 maintains the increased size after the lift-off of contacts 6026 and 6030.

Figure 6Q:
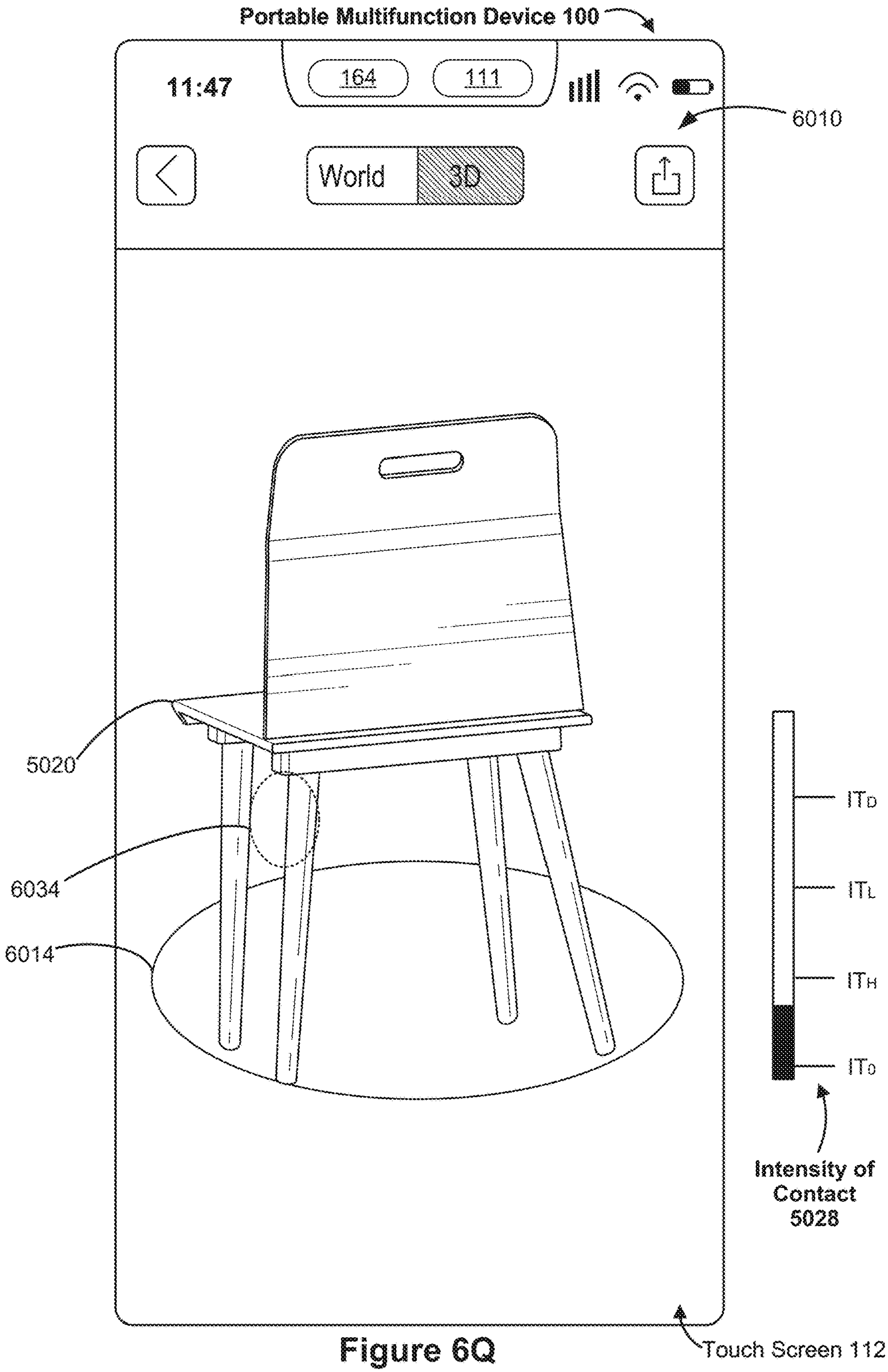
Figure 6R:
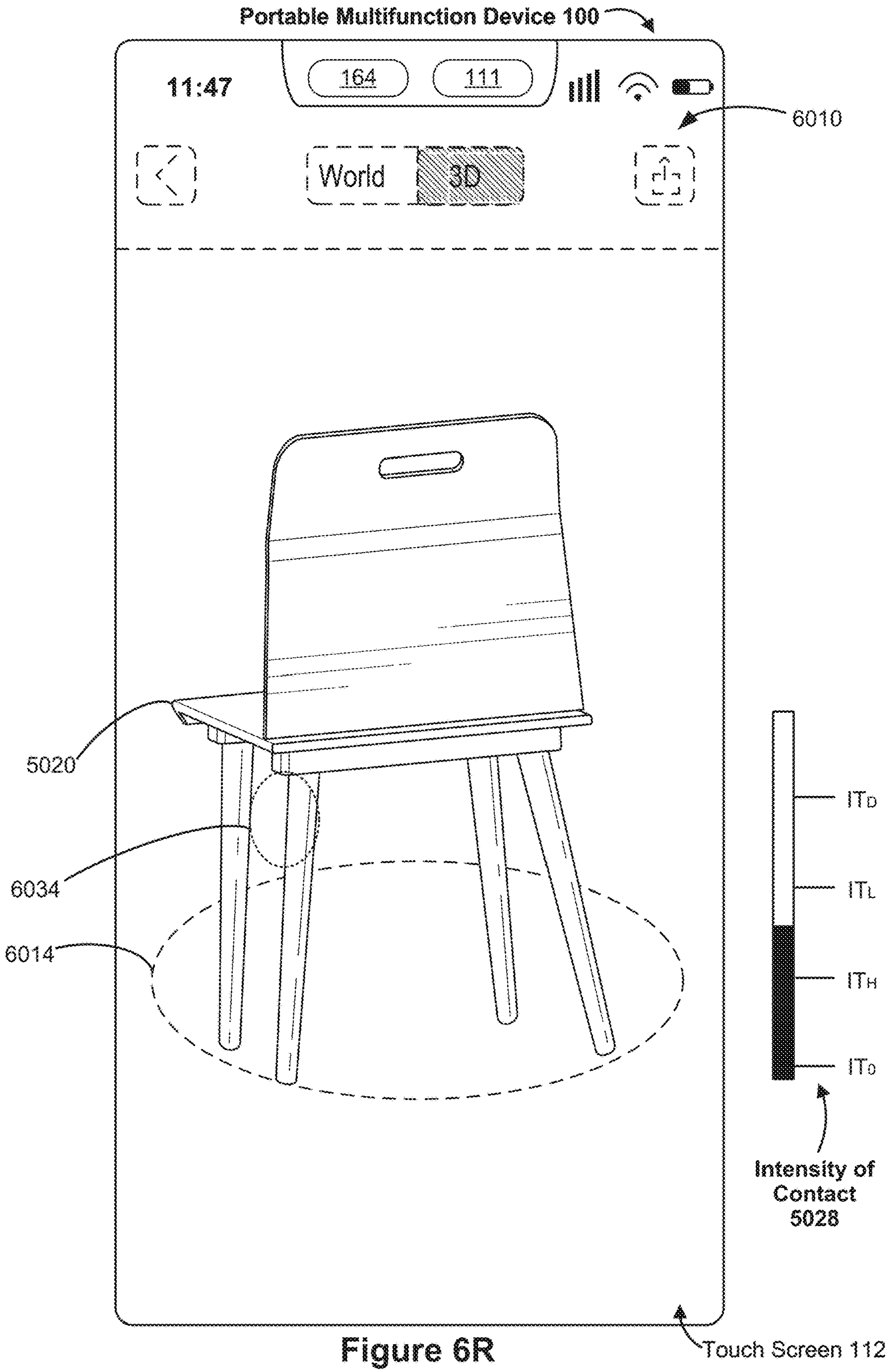
Figure 6S:
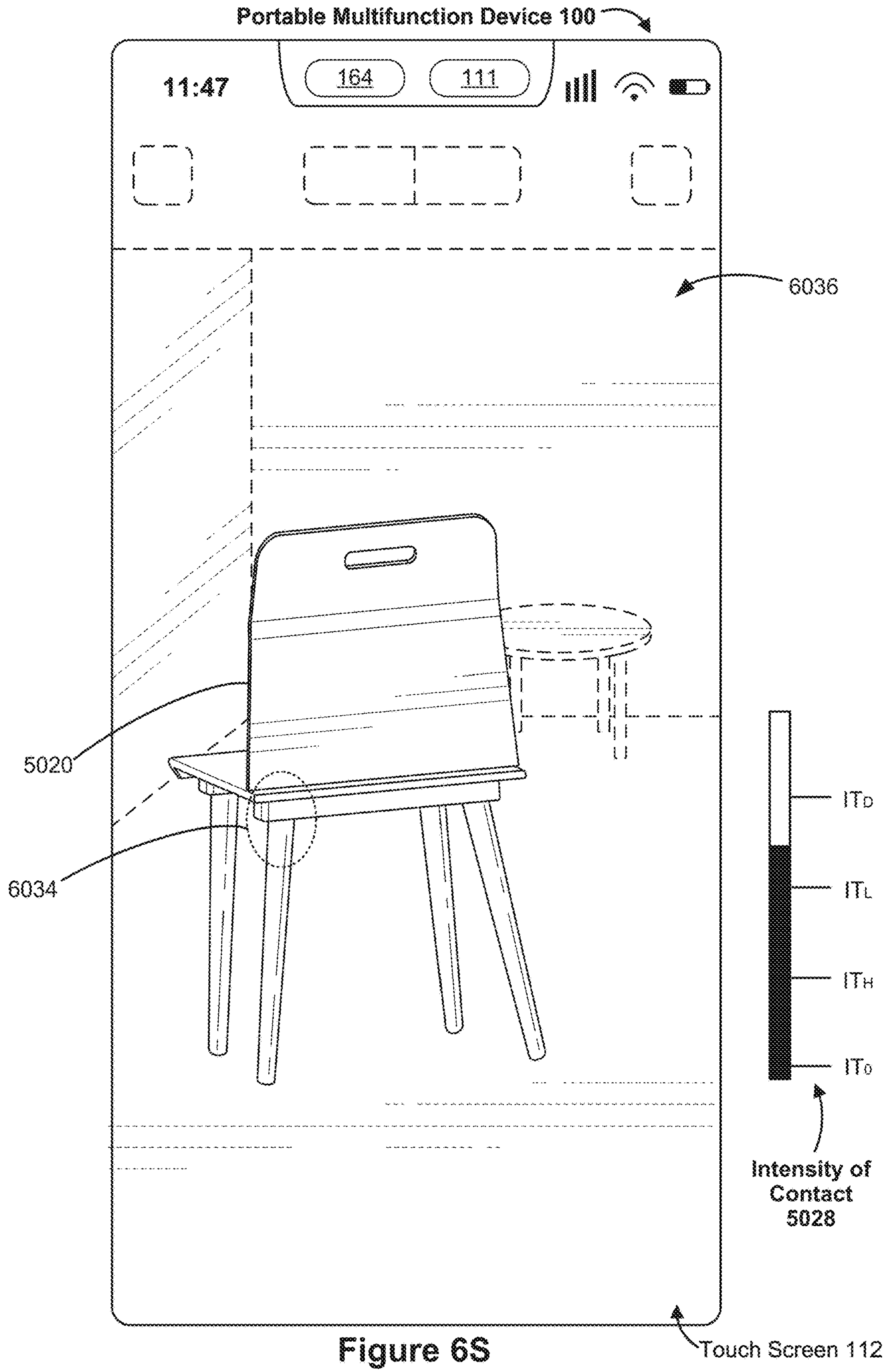
Figure 6T:
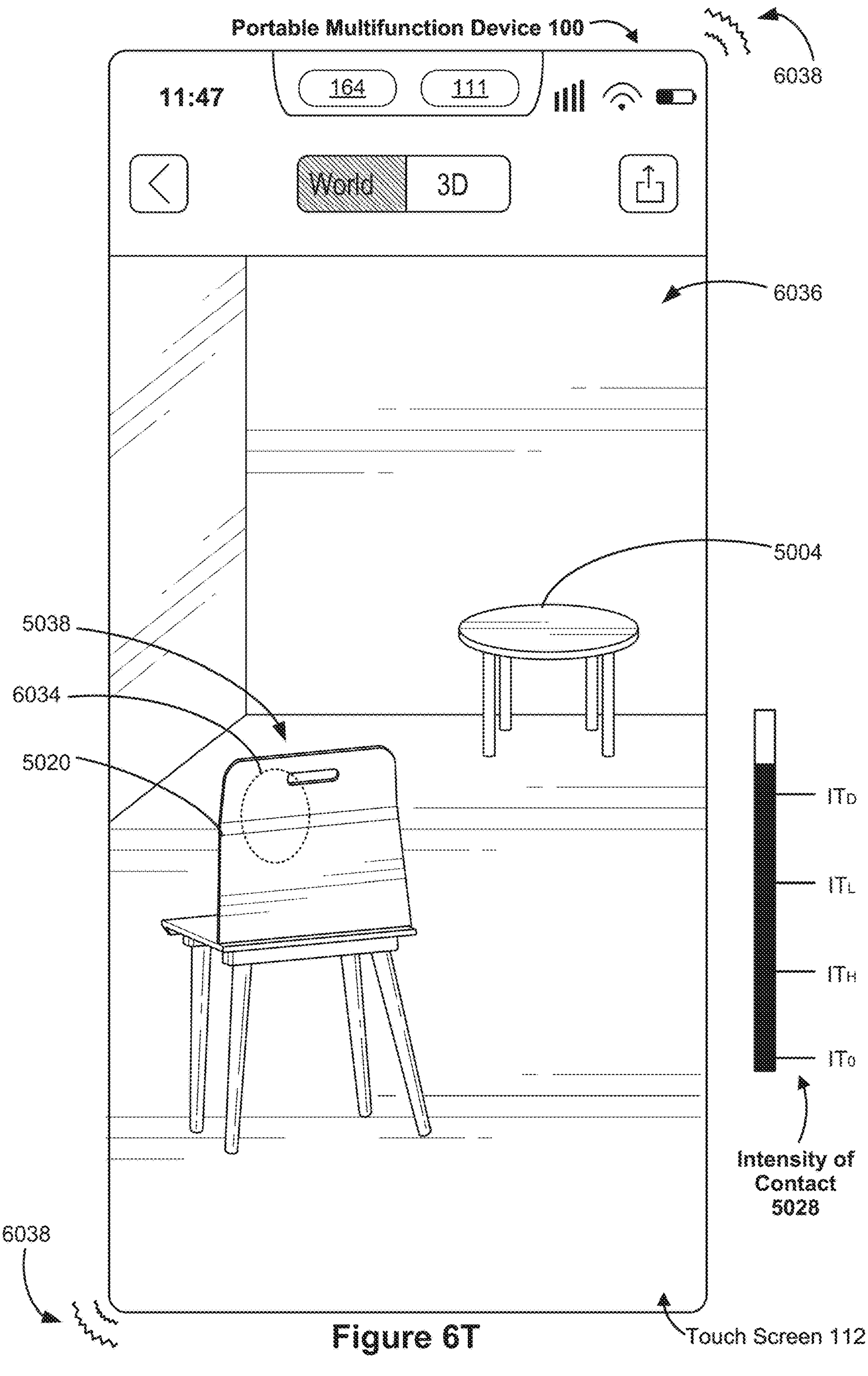
Figure 6U:
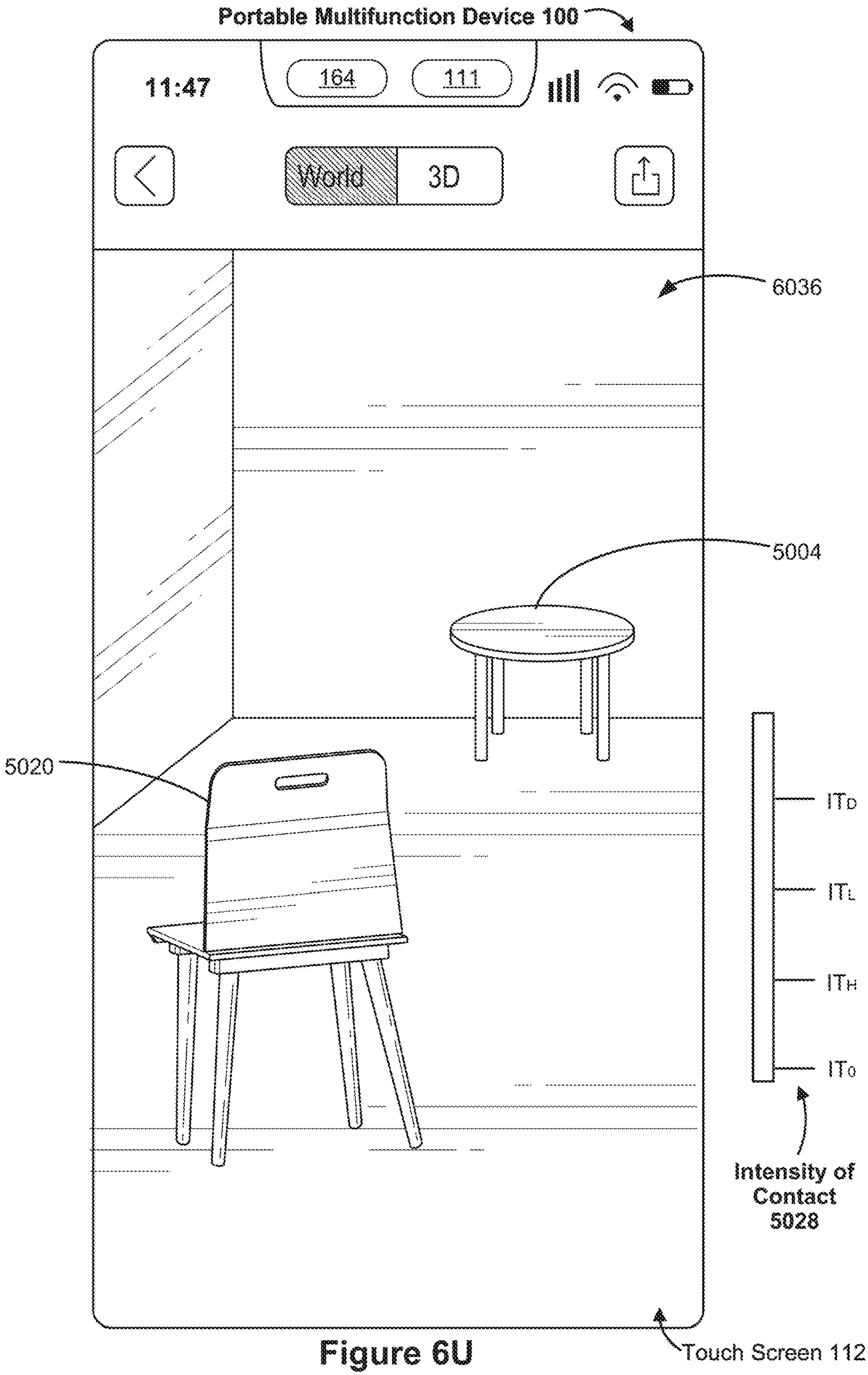

FIGS. 6Q-6U illustrate an input that that causes the staging user interface 6010 to be replaced by a field of view 6036 of one or more cameras of device 100. In FIG. 6Q, a contact 6034 with touch screen 112 of device 100 is detected. A characteristic intensity of the contact is above a contact detection intensity threshold $IT_0$ and below a hint press intensity threshold $IT_H$, as illustrated by intensity level meter 5028. In FIG. 6R, an increase in the characteristic intensity of the contact 5026 above the hint press intensity threshold $IT_H$, as illustrated by intensity level meter 5028, has caused staging user interface 6010 to begin to be blurred behind virtual chair 5020 (as indicated by the dotted lines). In FIG. 6S, an increase in the characteristic intensity of the contact 6034 above the light press intensity threshold $IT_L$, as illustrated by intensity level meter 5028, has caused staging user interface 6010 to cease to be displayed and initiates fade-in (indicated by dotted lines) of the field of view 6036 of the camera(s). In FIG. 6T, an increase in the characteristic intensity of the contact 6034 above the deep press intensity threshold $IT_D$, as illustrated by intensity level meter 5028, causes the field of view 6036 of the camera(s) to be displayed. Additionally, the increase in the characteristic intensity of the contact 6034 above the deep press intensity threshold $IT_D$, as illustrated in FIG. 6T, causes tactile output generators 167 of the device 100 to output a tactile output (as illustrated at 6038) to indicate that criteria have been met for replacing display of the staging user interface 6010 with display of field of view 6036 of the camera(s). In FIG. 6U, the contact 6034 has lifted off of touch screen 112. In some embodiments, before the characteristic intensity of the contact 6034 reaches the deep press intensity threshold $IT_D$, as illustrated in FIG. 6T, the progression illustrated in FIGS. 6Q-6T is reversible. For example, reducing the characteristic intensity of the contact 6034 after the increases illustrated in FIGS. 6R and/or 6S will cause the interface state that corresponds to the decreased intensity level of the contact 6034 to be displayed.

From FIGS. 6Q-6U, virtual chair 5020 is placed on a detected plane (e.g., in accordance with a determination by device 100 that the virtual chair 5020 is configured to be placed in an upright orientation on a detected horizontal surface, such as floor surface 5038) and the size of virtual chair 5020 is adjusted (e.g., the scale of the virtual chair 5020 relative to the physical space 5002 as shown in the field of view 6036 of the camera(s) is determined based on a defined "real world" size of the virtual chair 5020 and/or a detected size of objects (such as table 5004) in the field of view 6036 of the camera(s)). The orientation of virtual chair 5020 caused by rotation of virtual chair 5020 while the staging interface 6010 was displayed (e.g., as described with regard to FIGS. 6J-6K) is maintained as the virtual chair 5020 transitions from staging user interface 6010 to the field of view 6036 of the camera(s). For example, the orientation of virtual chair 5020 relative to floor surface 5038 is the same as the final orientation of virtual chair 5020 relative to the surface of the stage 5014. In some embodiments, the adjustment to the size of virtual object 5020 in the staging user interface is taken into account when the size of virtual chair 5020 is adjusted in the field of view 6036 relative to the size of physical space 5002.

Figure 6V:
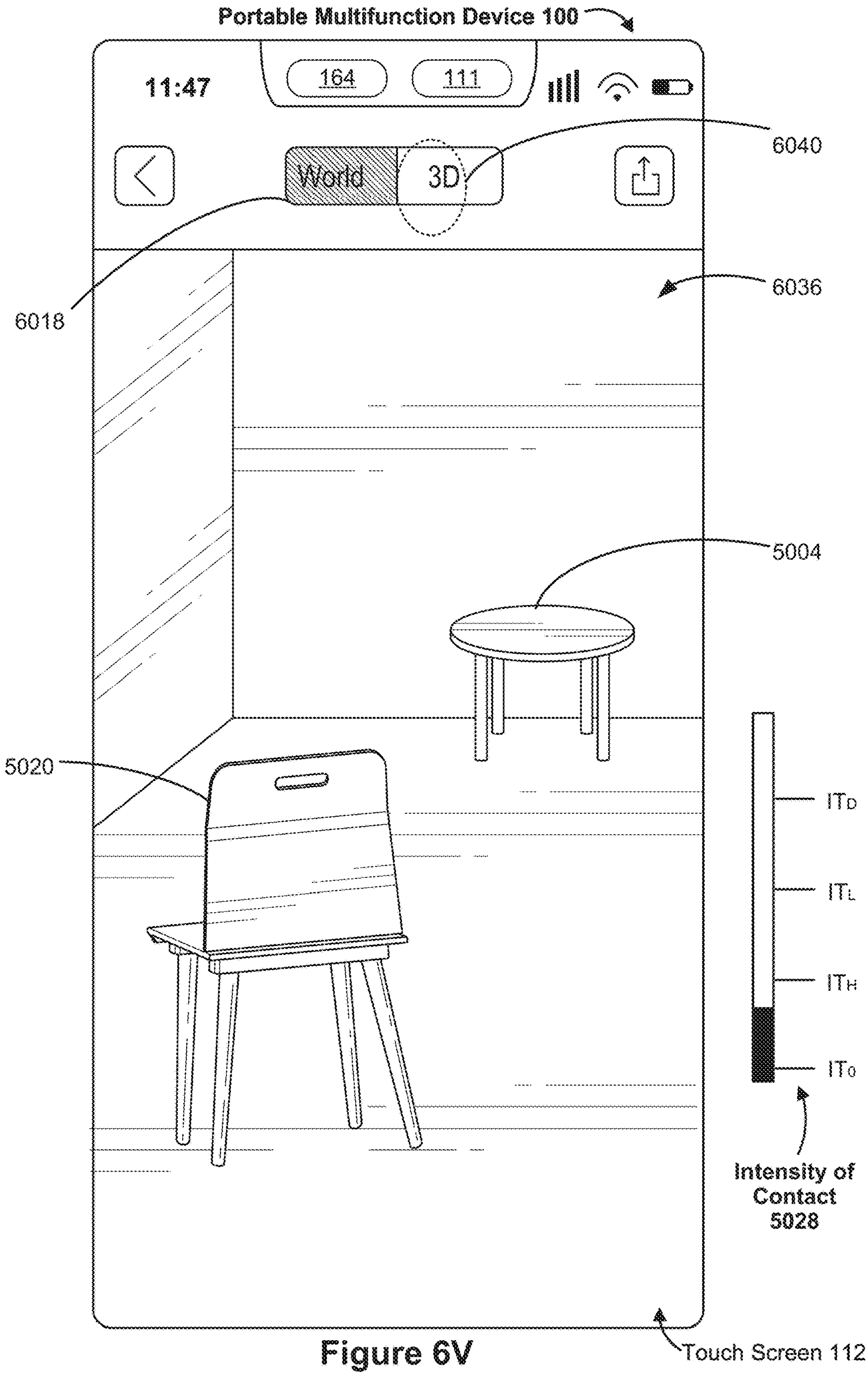
Figure 6W:
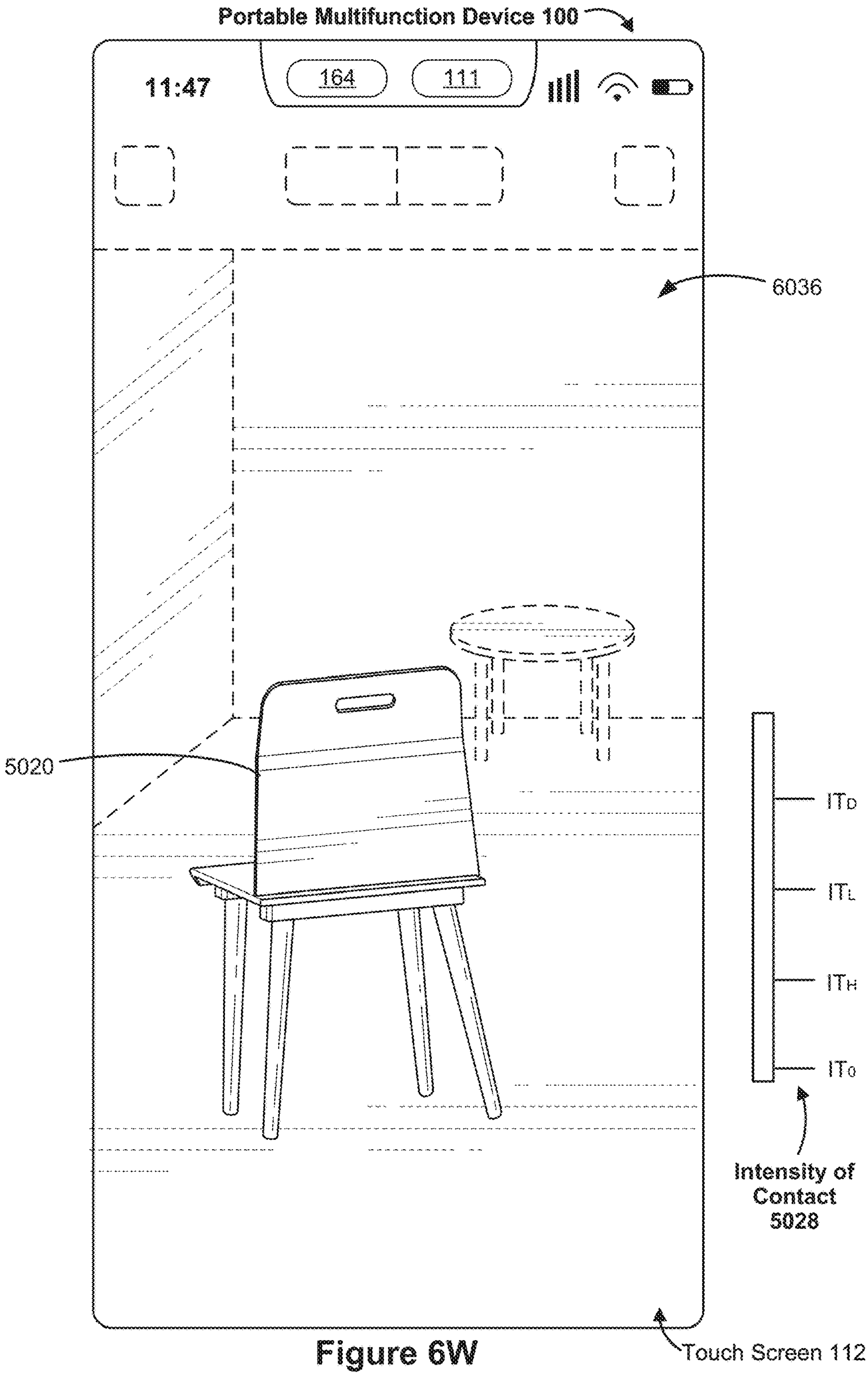
Figure 6X:
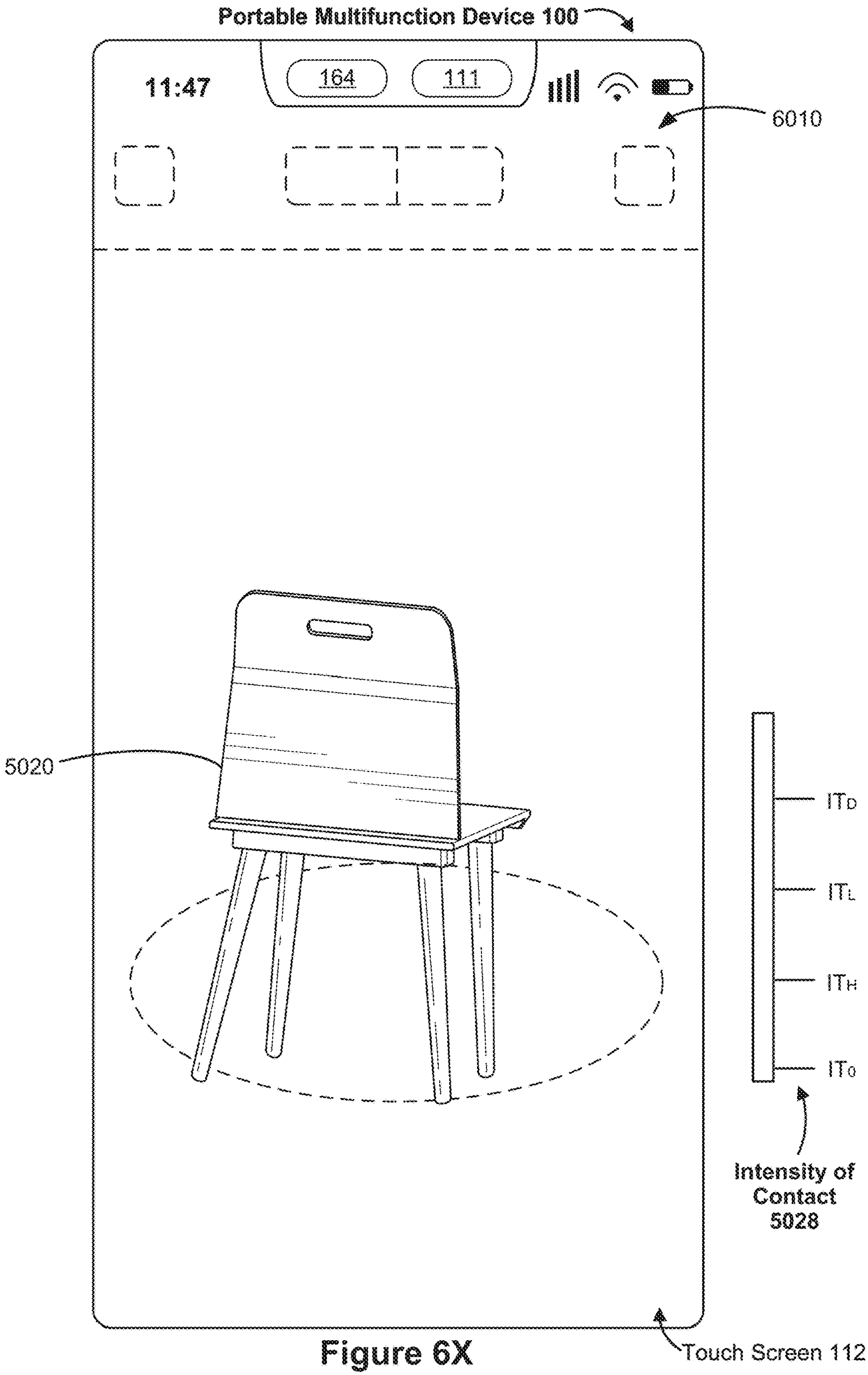
Figure 6Y:
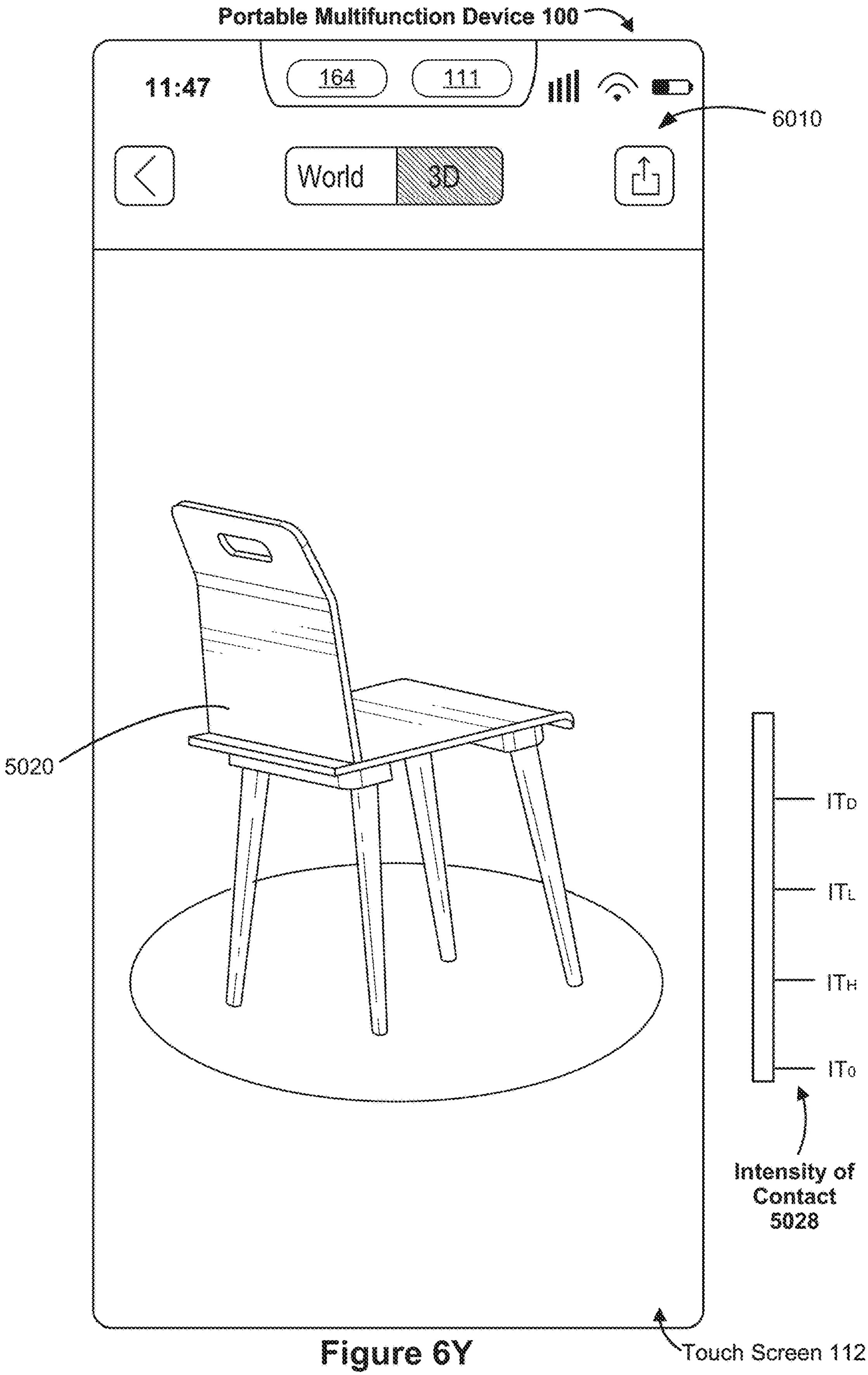

FIGS. 6V-6Y illustrate an input that that causes the field of view 6036 of the camera(s) to be replaced by the staging user interface 6010. In FIG. 6V, an input (e.g., a tap input) by contact 6040 is detected at a location that corresponds to toggle control 6018 (e.g., a location that corresponds to a portion of toggle control 6018 that includes the text "3D"). In FIGS. 6W-6Y, in response to the input by contact 6040, the field of view 6036 of the camera(s) fades out (as indicated by the dotted lines in FIG. 6W), the staging user interface 6010 fades in (as indicated by the dotted lines in FIG. 6X), and staging user interface 6010 is fully displayed (as shown in FIG. 6Y). From FIGS. 6V-6Y, the size of virtual chair 5020 is adjusted and the position of virtual chair 5020 changes (e.g., to return virtual chair 5020 to a predefined position and size for the staging user interface).

Figure 6Z:
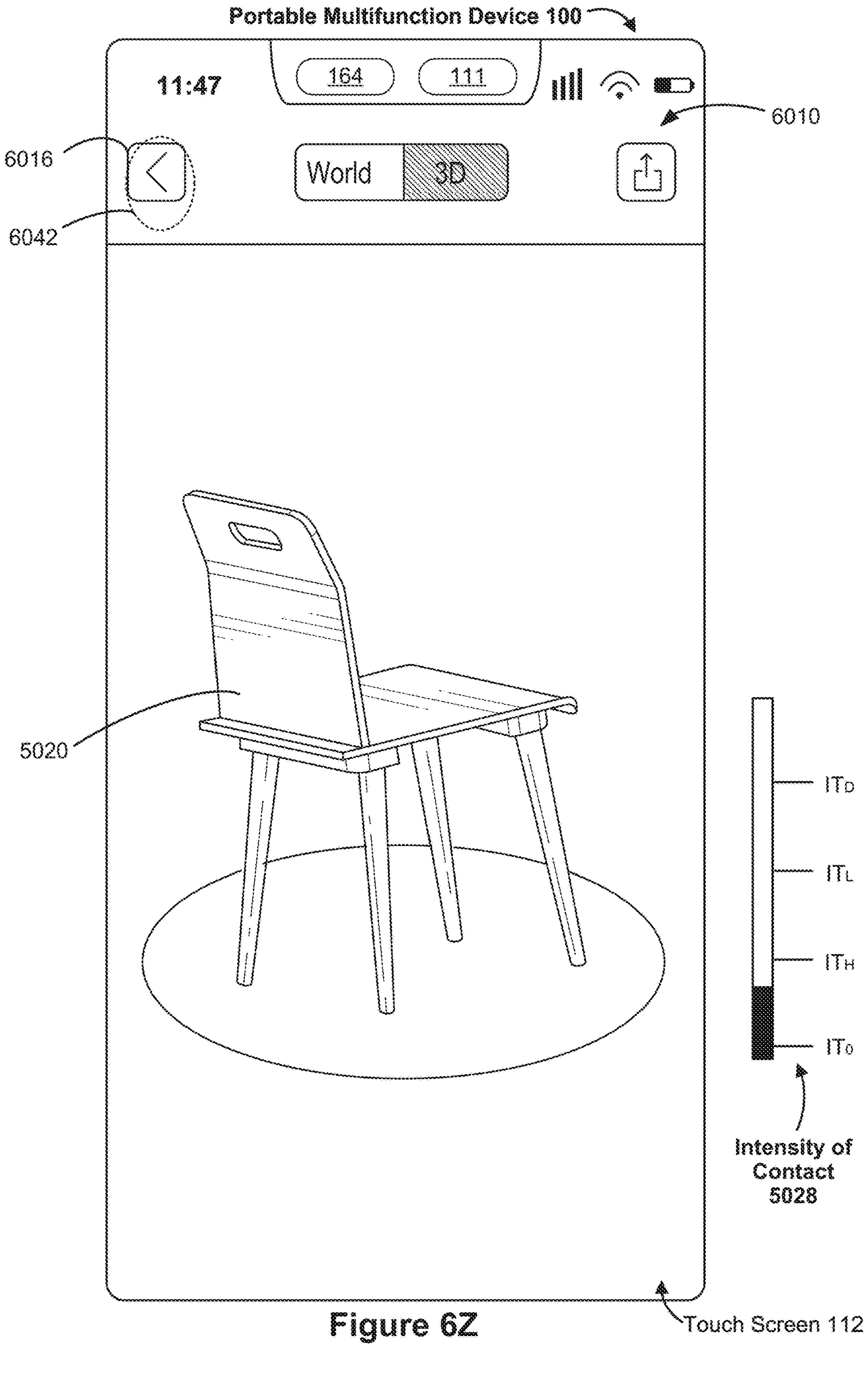
Figure 6A:
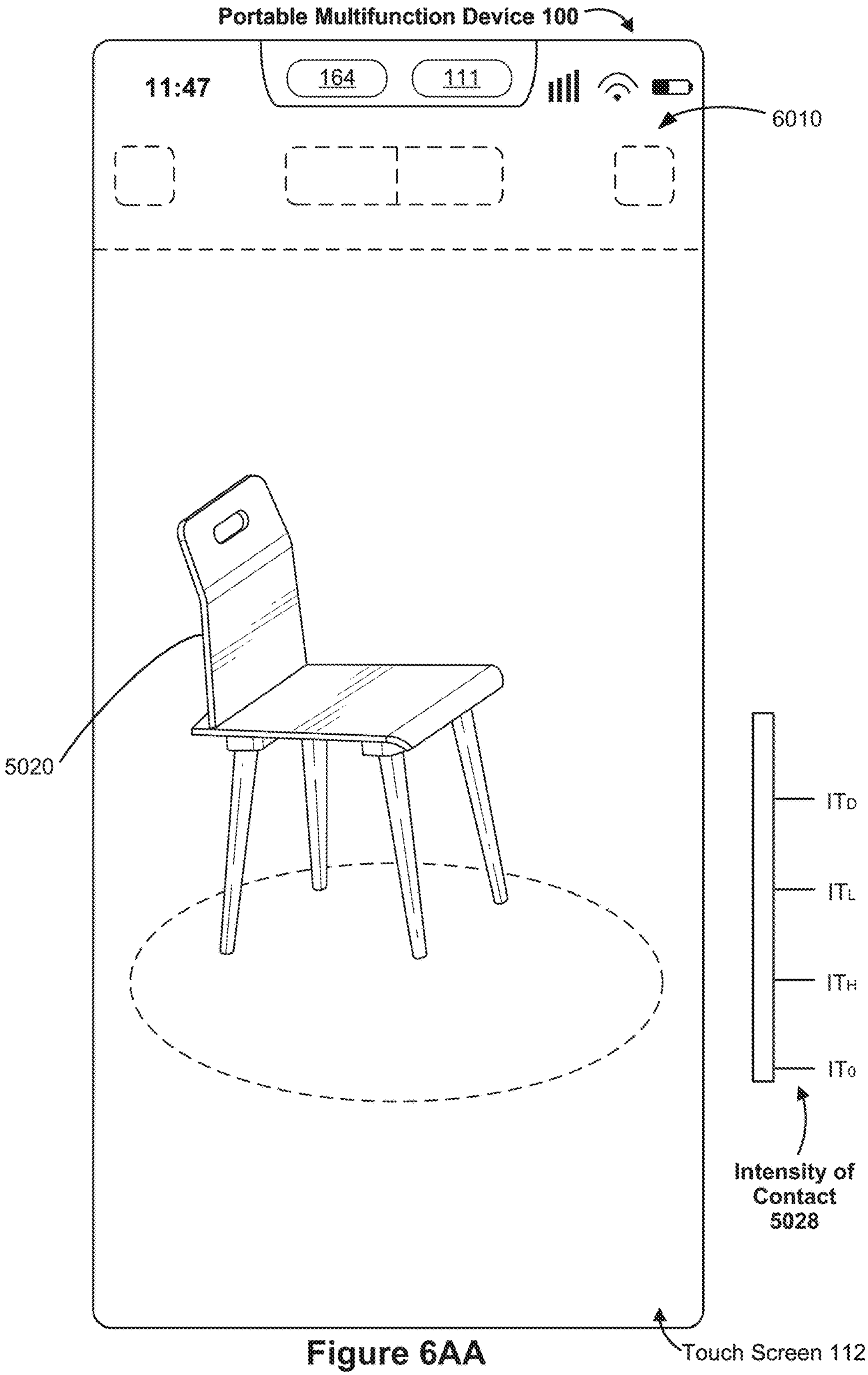
Figure 6A:
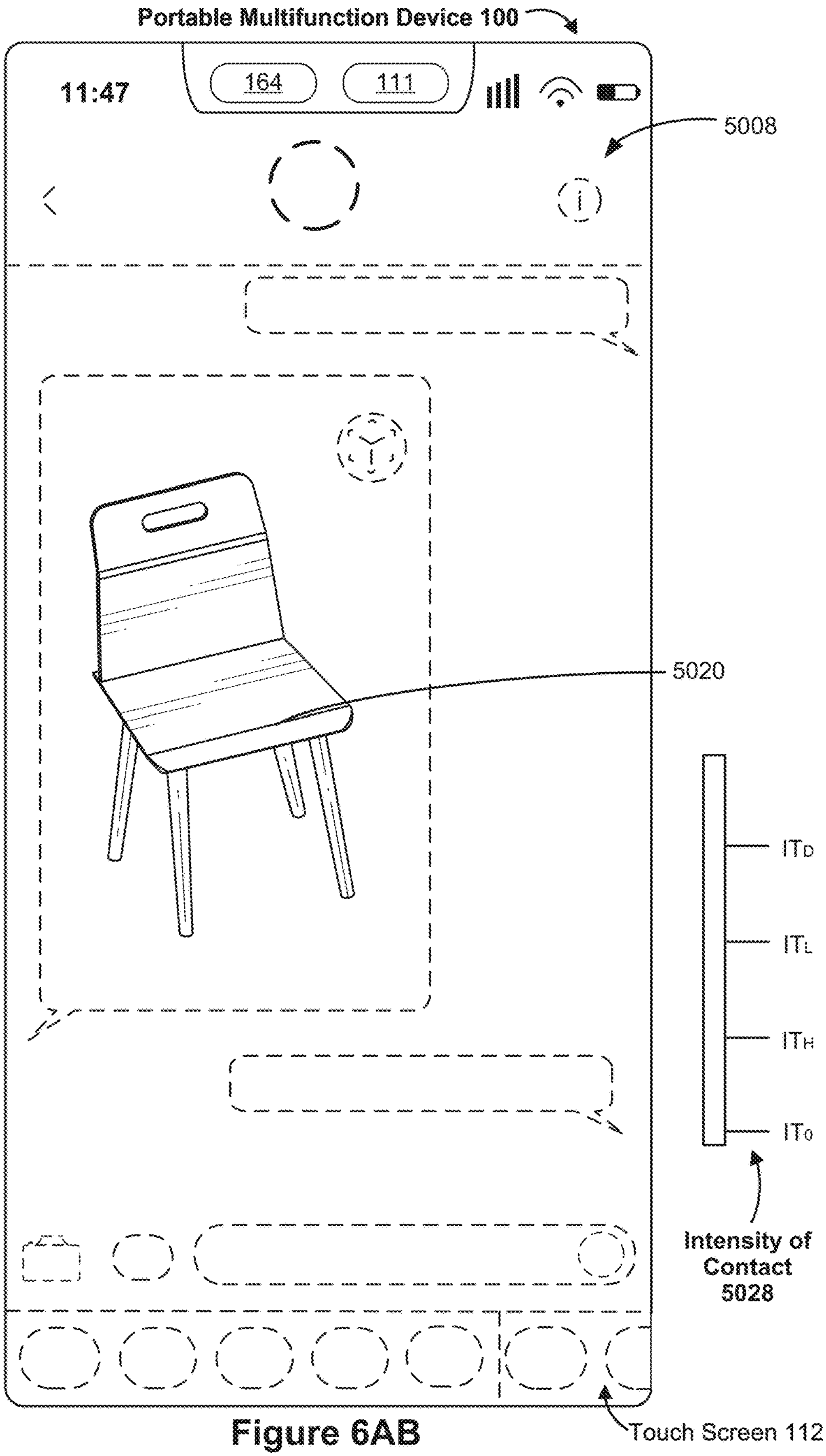
Figure 6A:
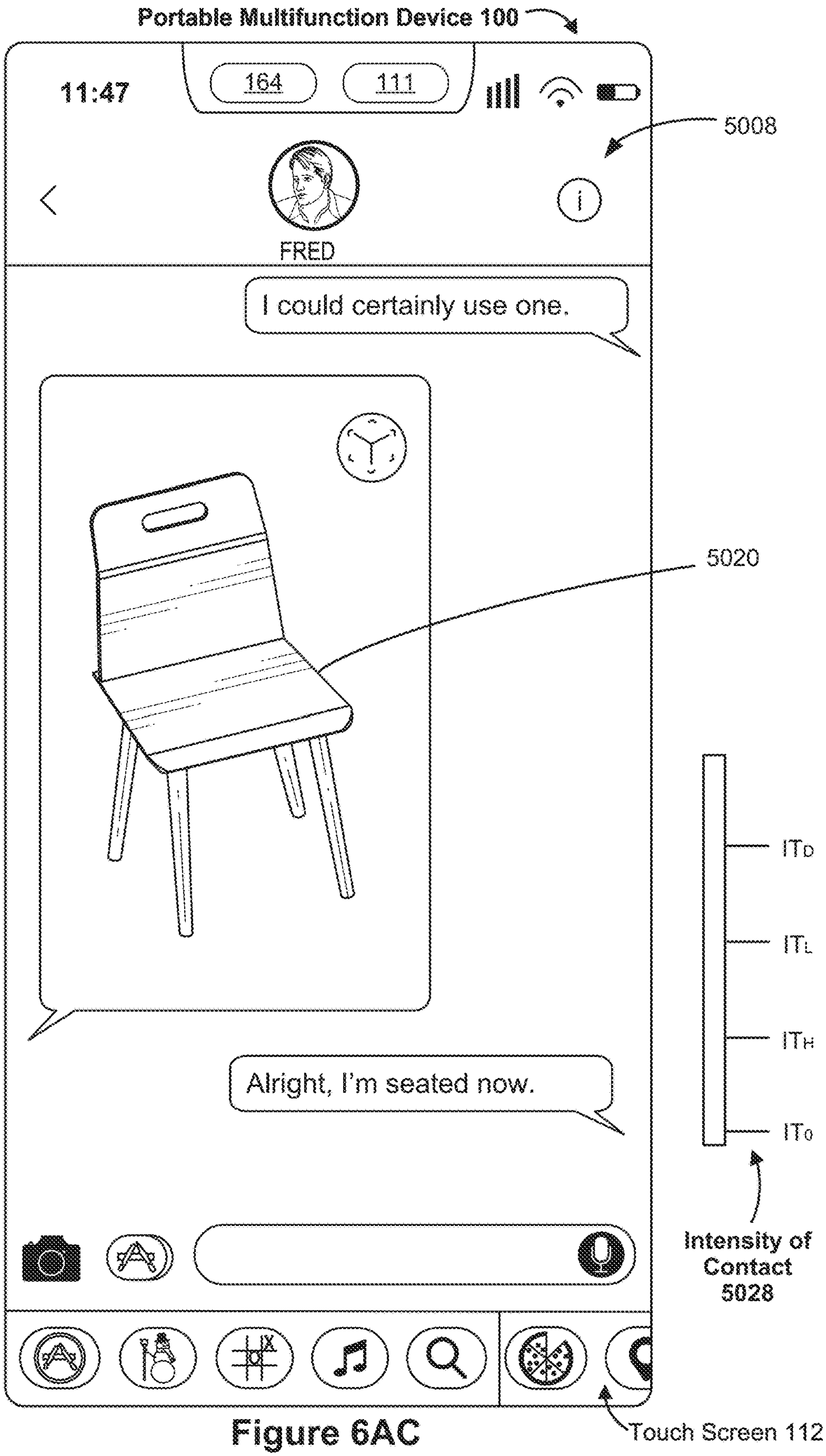
Figure 6A:
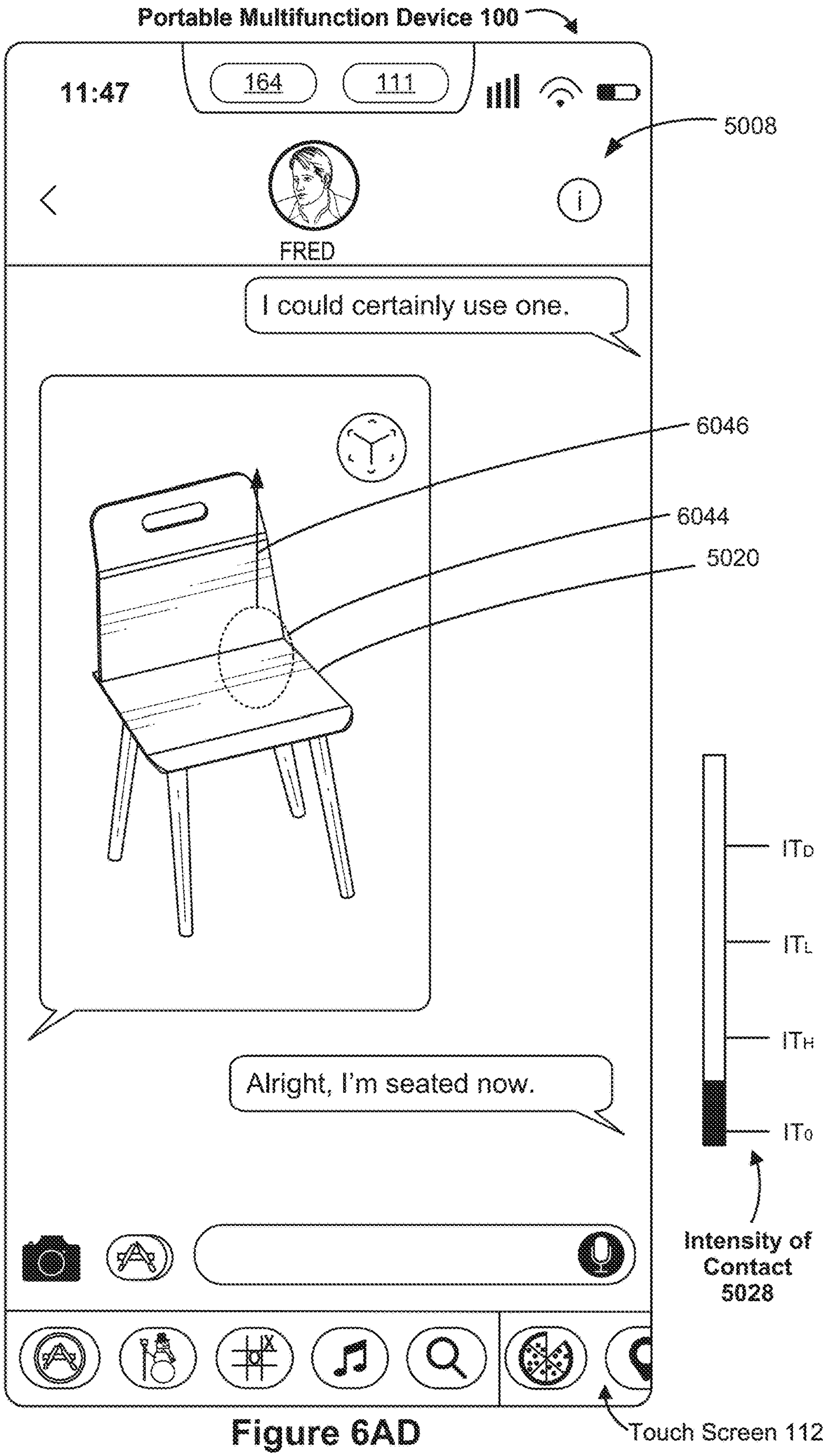
Figure 6A:
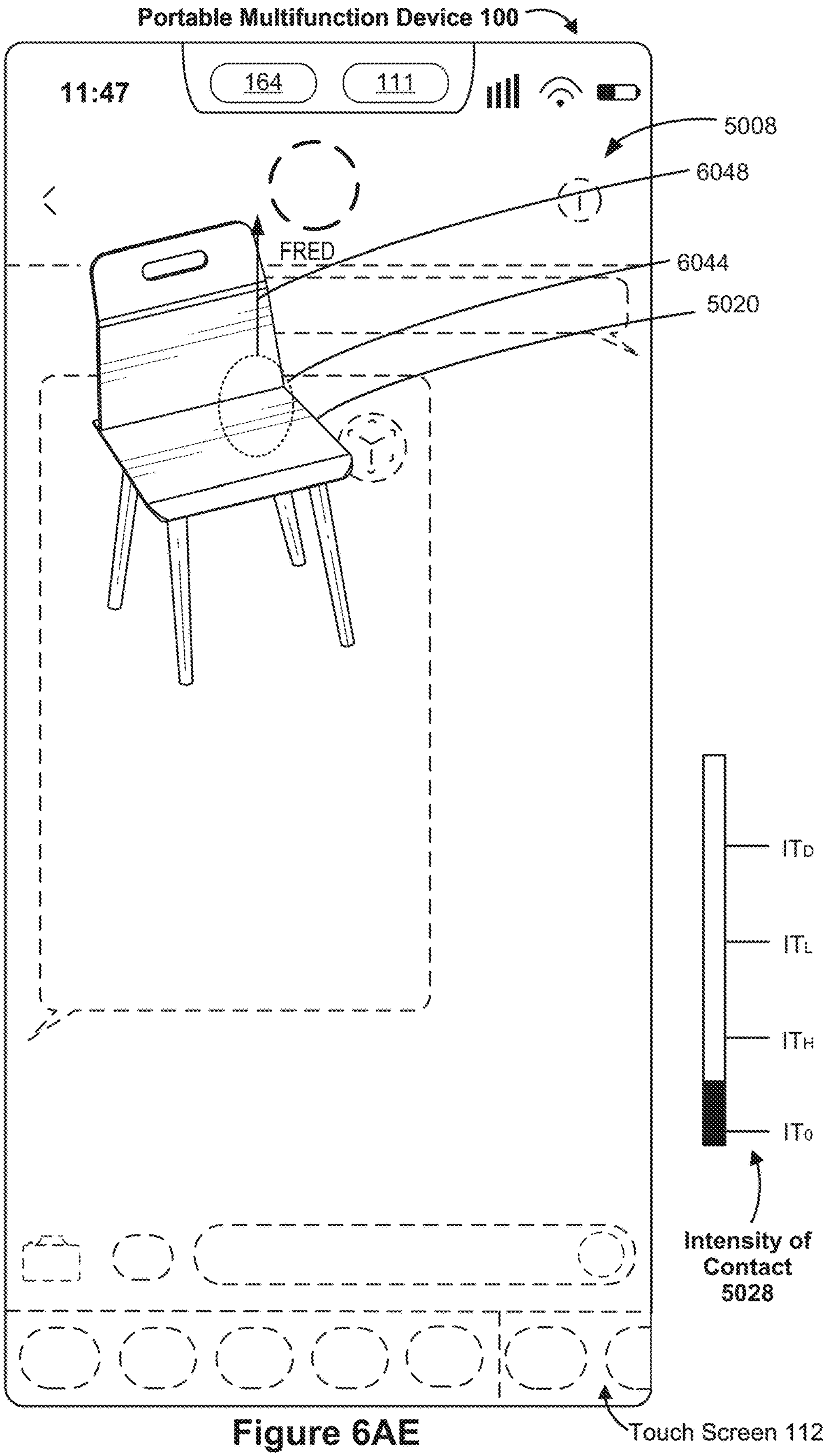
Figure 6A:
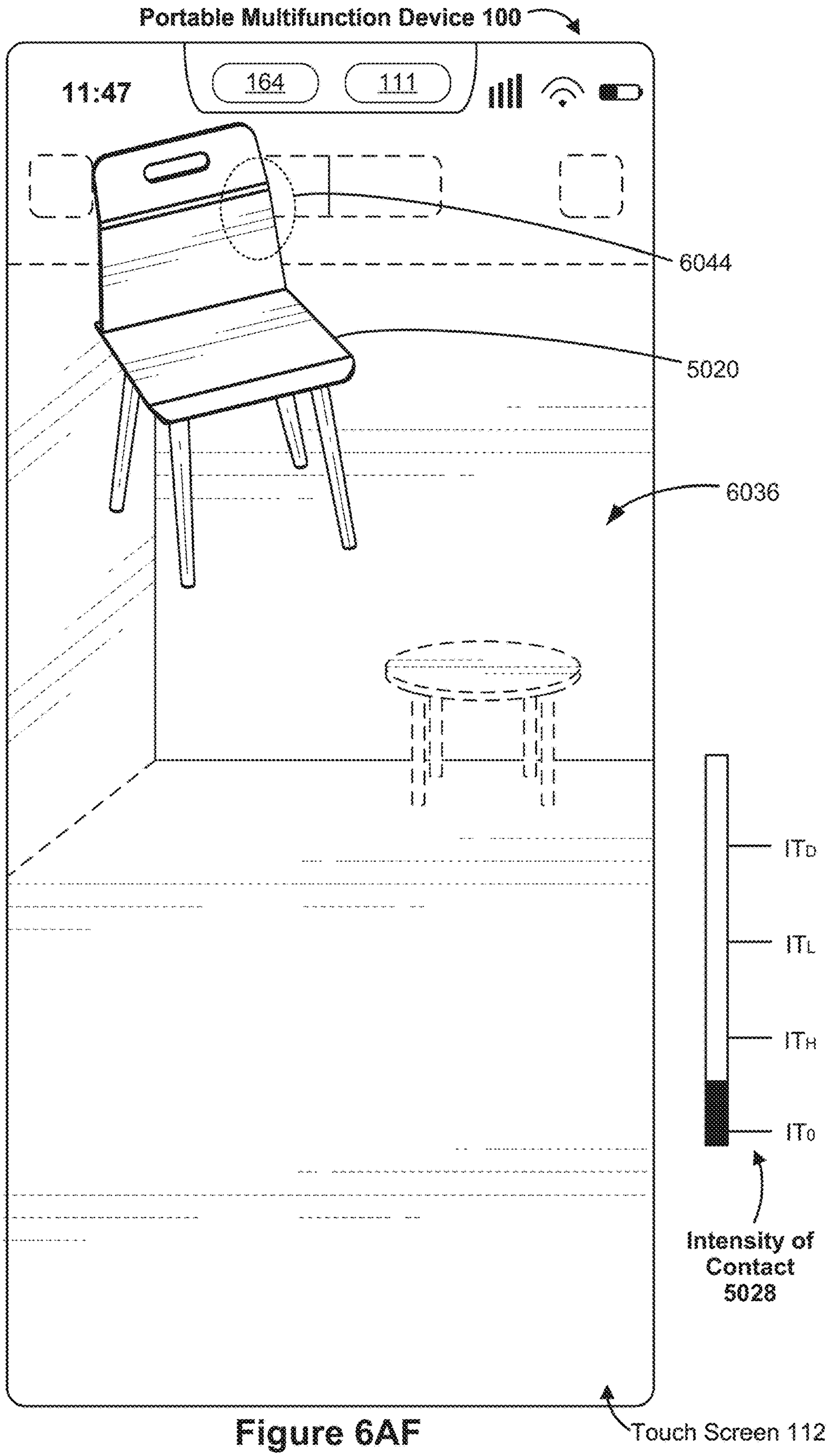
Figure 6A:
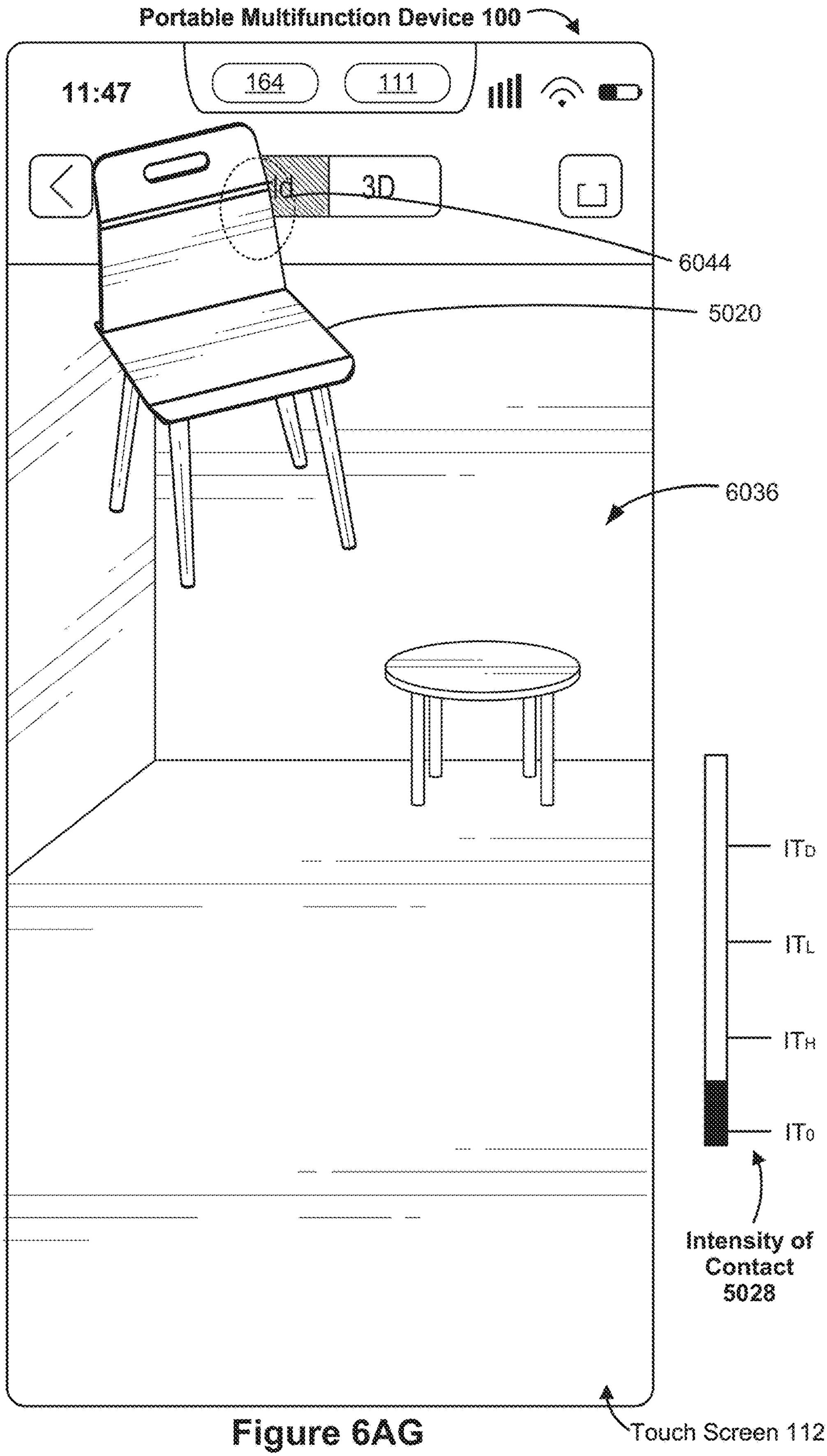
Figure 6A:
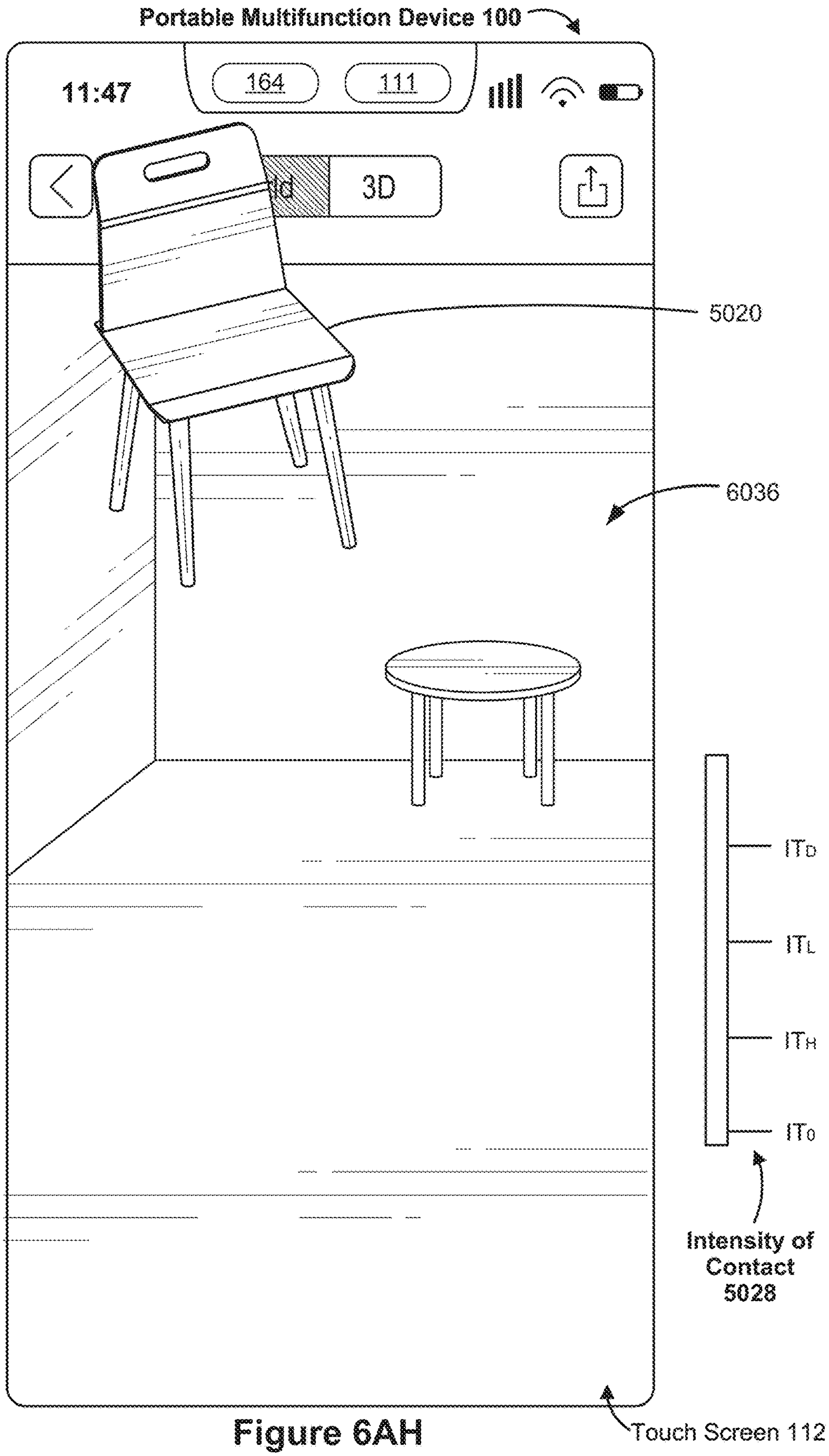
Figure 6A:
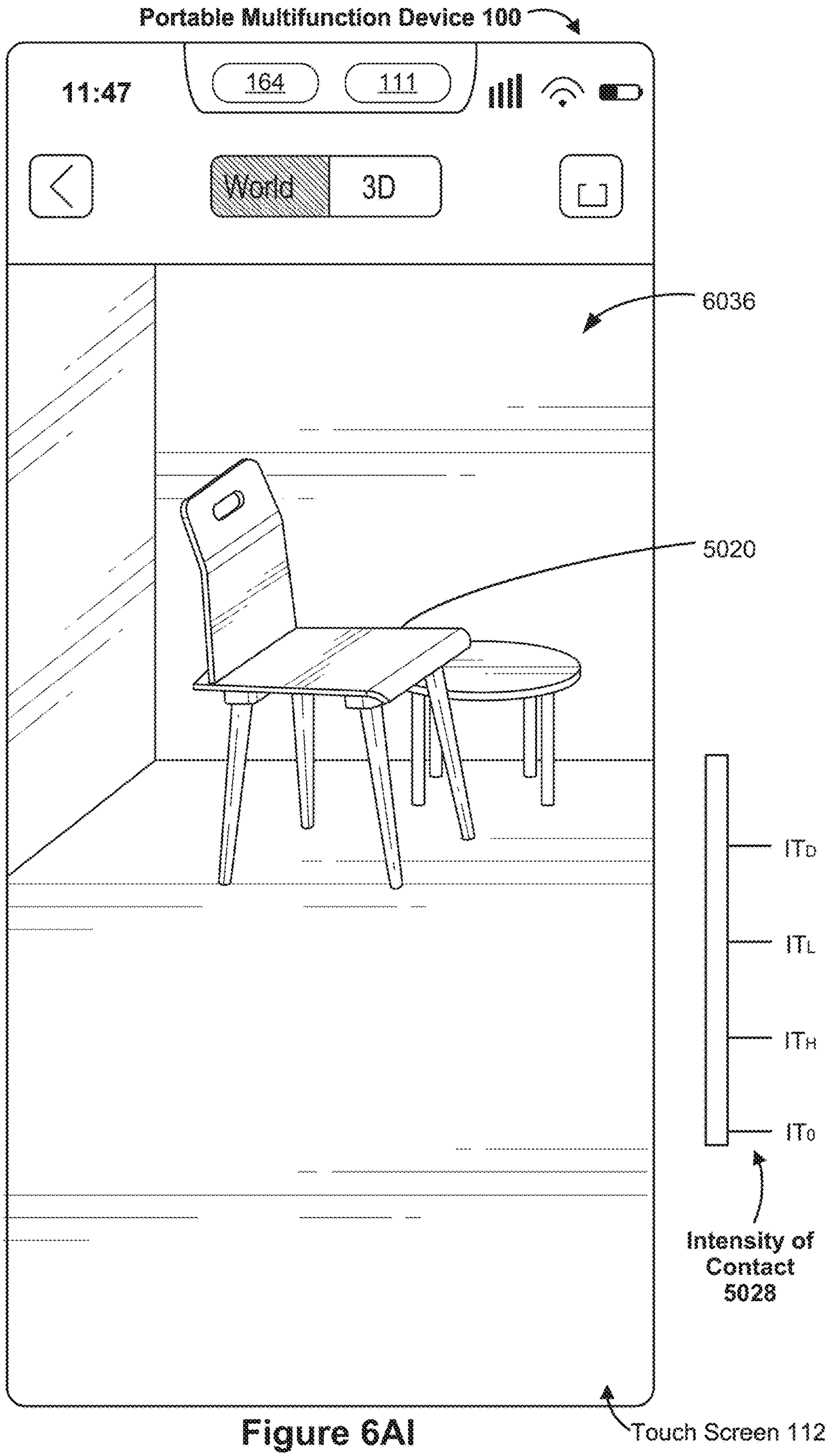
Figure 6A:
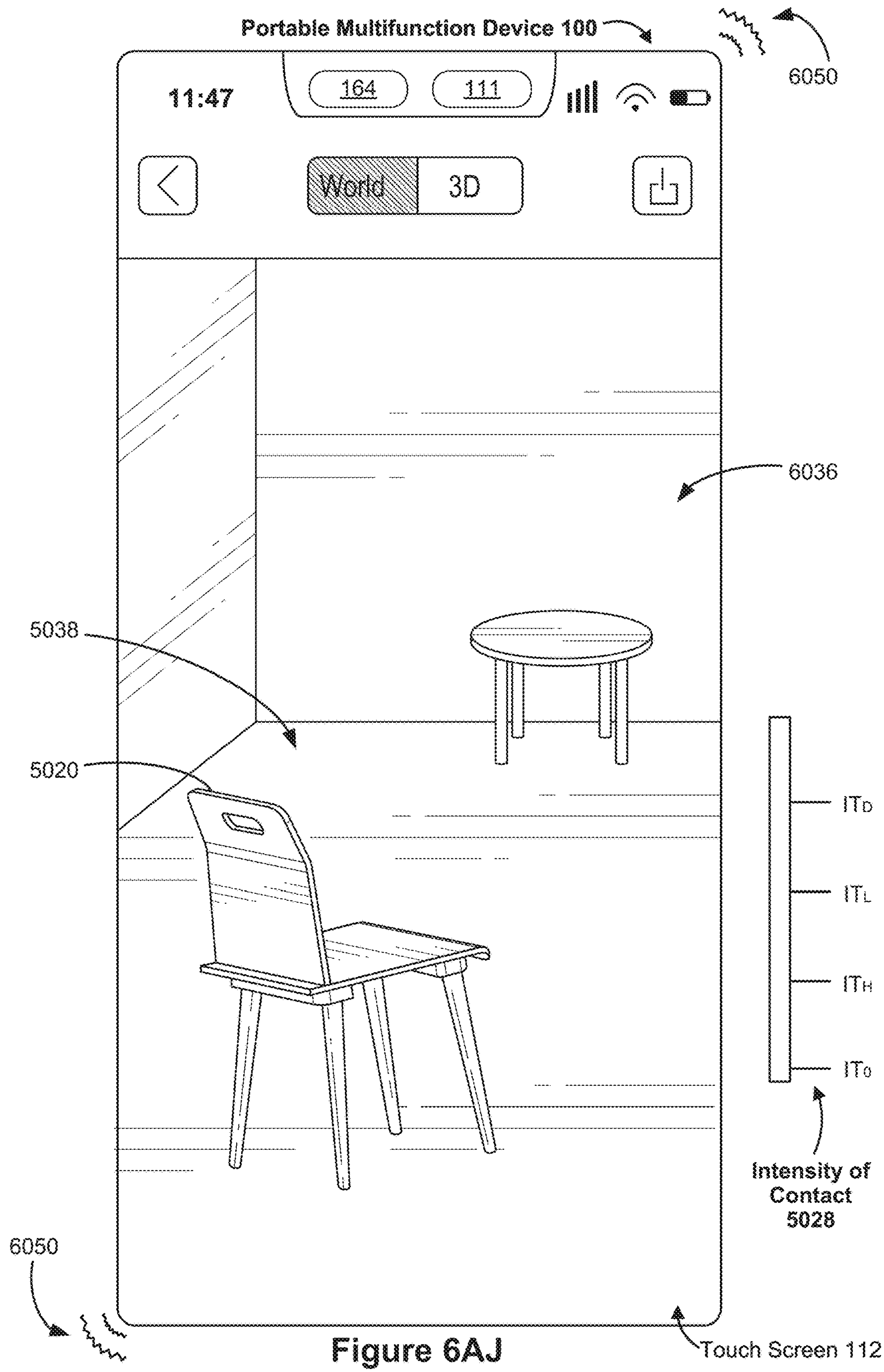

FIGS. 6Z-6AC illustrate an input that that causes the staging user interface 6010 to be replaced by the messaging user interface 5008. In FIG. 6Z, an input (e.g., a tap input) by contact 6042 is detected at a location that corresponds to back control 6016. In FIGS. 6AA-6AC, in response to the input by contact 6042, the staging user interface 6010 fades out (as indicated by the dotted lines in FIG. 6AA), the messaging user interface 5008 fades in (as indicated by the dotted lines in FIG. 6AB), and messaging user interface 5008 is fully displayed (as shown in FIG. 6AC). From FIGS. 6Z-6AB, the size, orientation, and position of virtual chair 5020 are continuously adjusted on the display (e.g., to return virtual chair 5020 to a predefined position, size, and orientation for the messaging user interface 5008).

FIGS. 6AD-6AJ illustrate an input that that causes the messaging user interface 5008 to be replaced by the field of view 6036 of the camera(s) (e.g., bypassing display of the staging user interface 6010). In FIG. 6AD, a contact 6044 is detected at a location that corresponds to virtual chair 5020. The input by contact 6044 includes a long touch gesture (during which the contact 6044 is maintained at the location on the touch-sensitive surface that corresponds to the representation of the virtual object 5020 with less than a threshold amount of movement for at least a predefined threshold amount of time) followed by an upward swipe gesture (that drags the virtual chair 5020 upward). As shown in FIGS. 6AD-6AE, the virtual chair 5020 is dragged upward as the contact 6044 moves along a path indicated by arrow 6046. In FIG. 6AE, messaging user interface 5008 fades out behind virtual chair 5020. As shown in FIGS. 6AE-6AF, the virtual chair 5020 continues to be dragged upward as the contact 6044 moves along a path indicated by arrow 6048. In FIG. 6AF, the field of view 5036 of the camera(s) fades in behind virtual chair 5020. In FIG. 6AG, in response to the input by contact 6044 that includes the long touch gesture followed by the upward swipe gesture, the field of view 5036 of the camera(s) is fully displayed. In FIG. 6AH, the contact 6044 lifts off of touch screen 112. In FIGS. 6AH-6AJ, in response to the lift off of the contact 6044, the virtual chair 5020 is released (e.g., because the virtual chair 5020 is no longer restrained or dragged by the contact) and drops to a plane (e.g., the floor surface 5038, in accordance with a determination that a horizontal (floor) surface corresponds to the virtual chair 5020). Additionally, as illustrated in FIG. 6AJ, tactile output generators 167 of the device 100 output a tactile output (as illustrated at 6050) to indicate that the virtual chair 5020 has landed on the floor surface 5038.

Figure 7A:
Figure 7B:
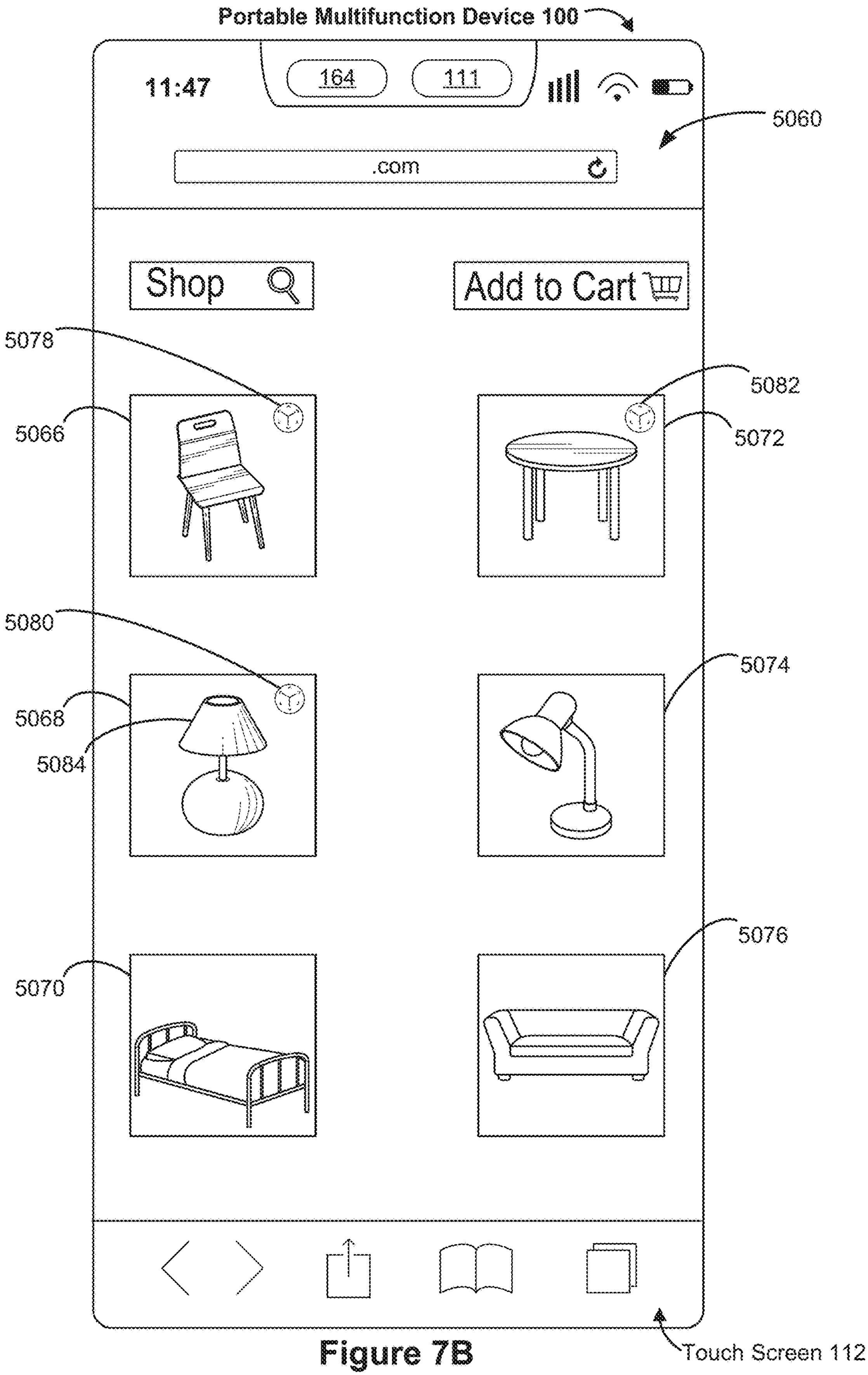
Figure 7C:
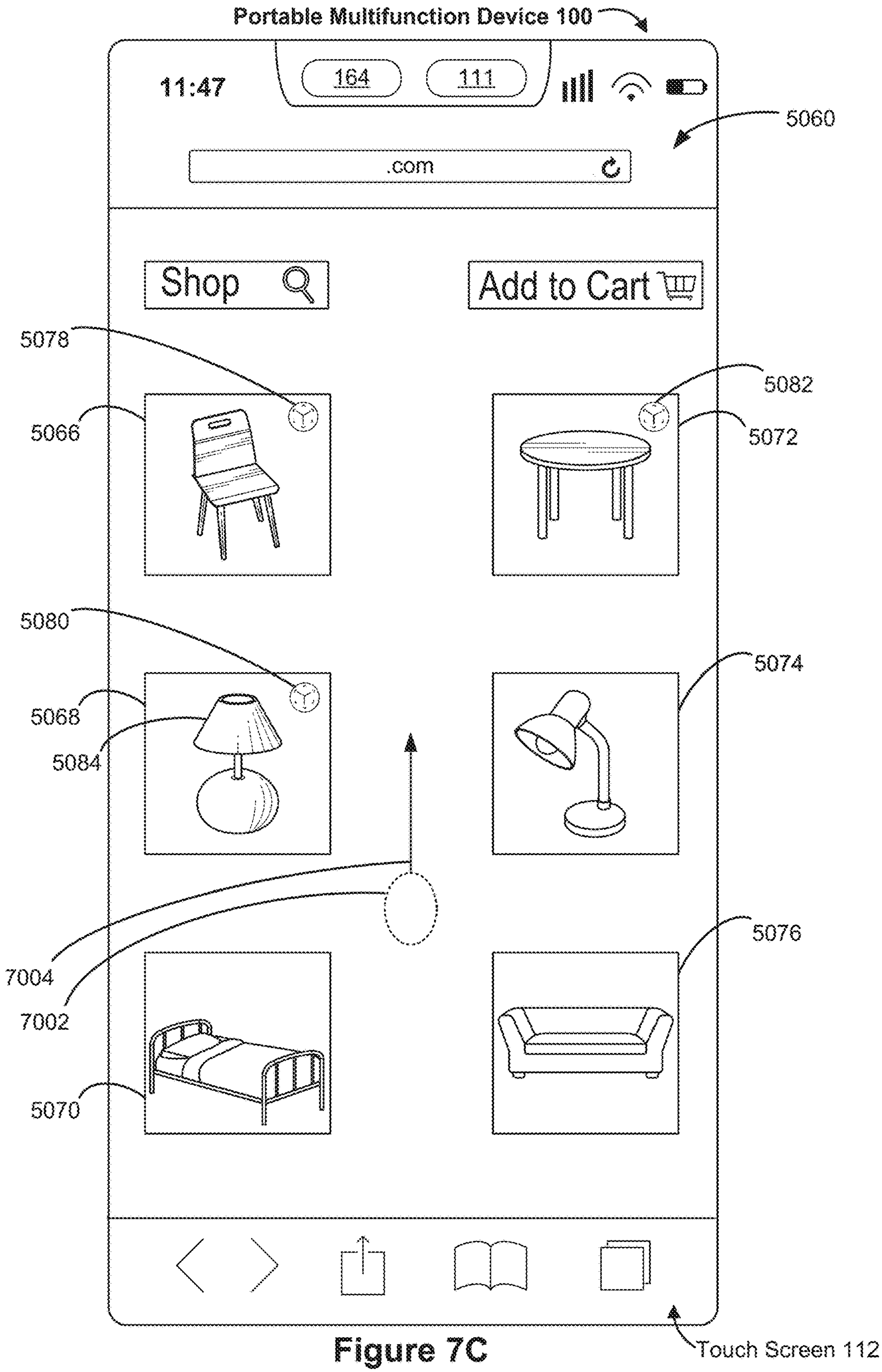
Figure 7D:
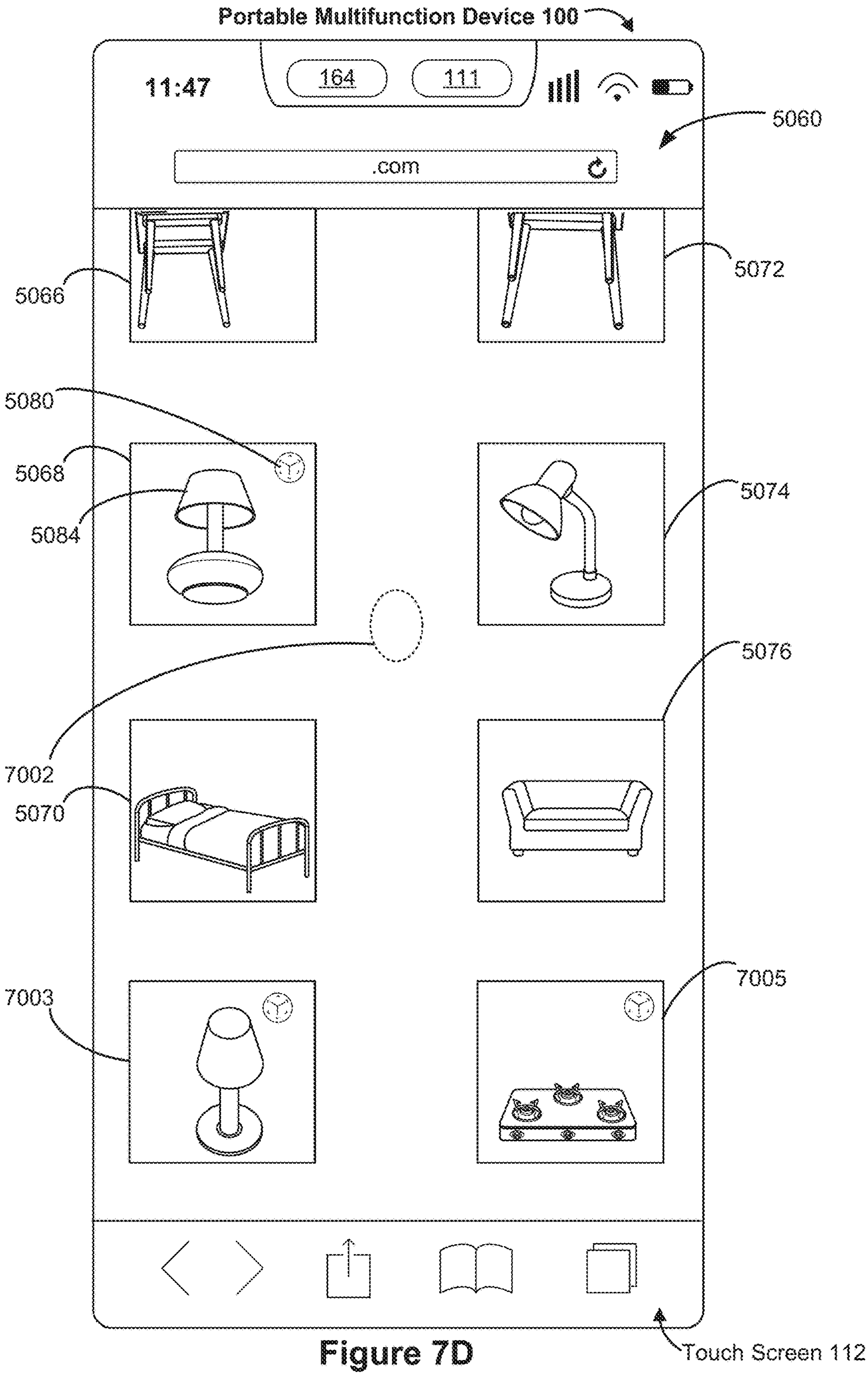
Figure 7E:
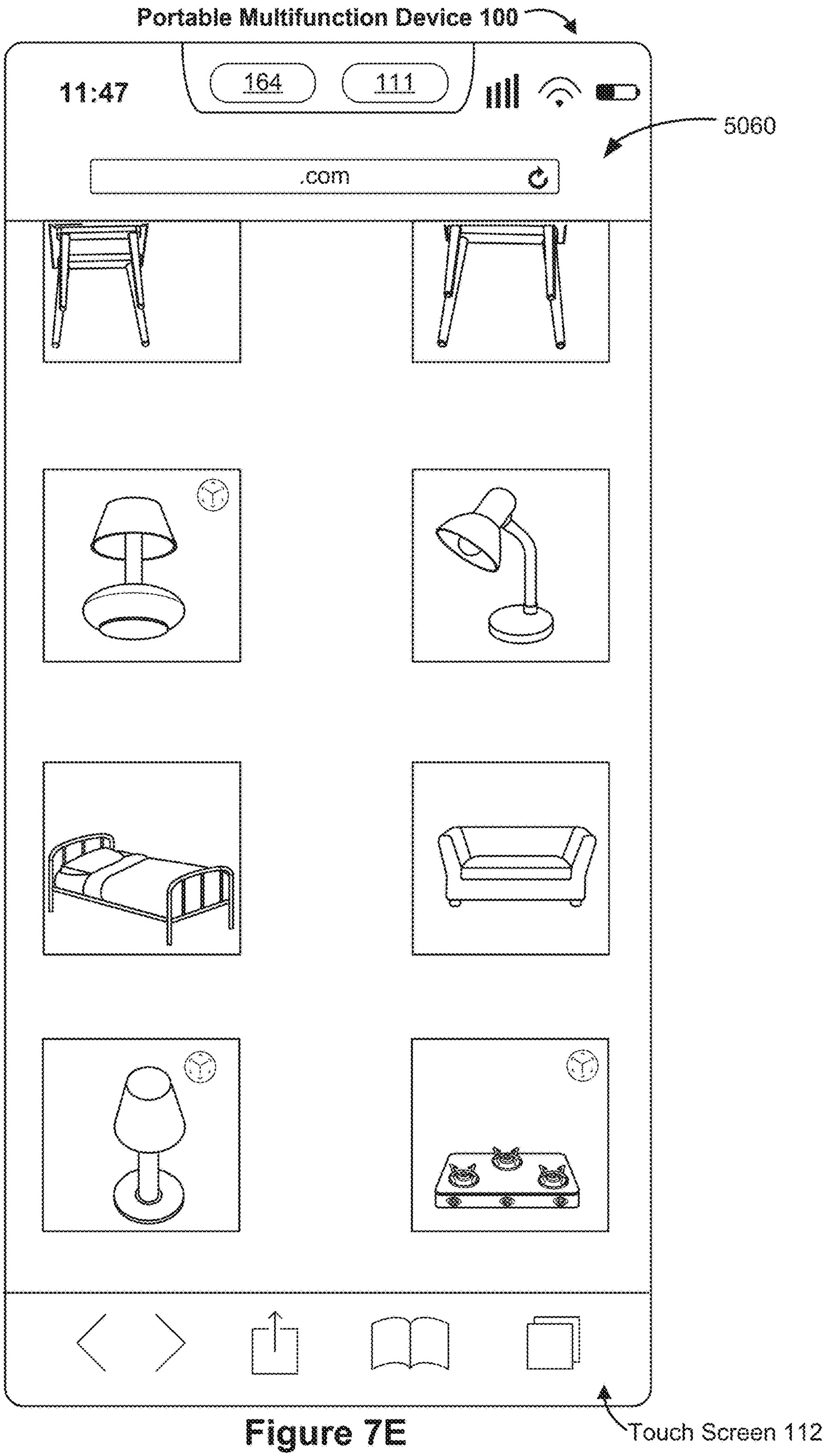
Figure 7H:
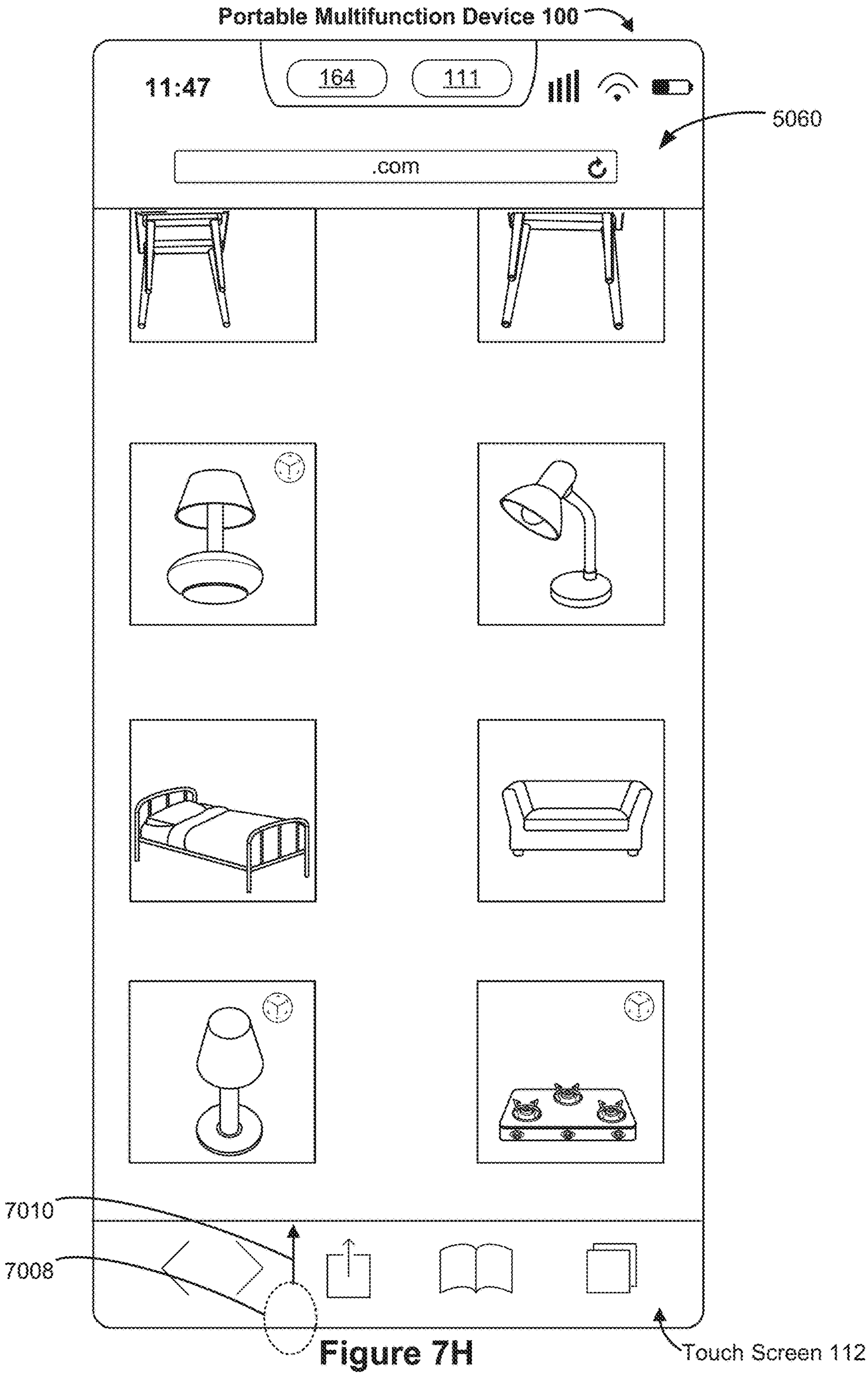
Figure 7I:
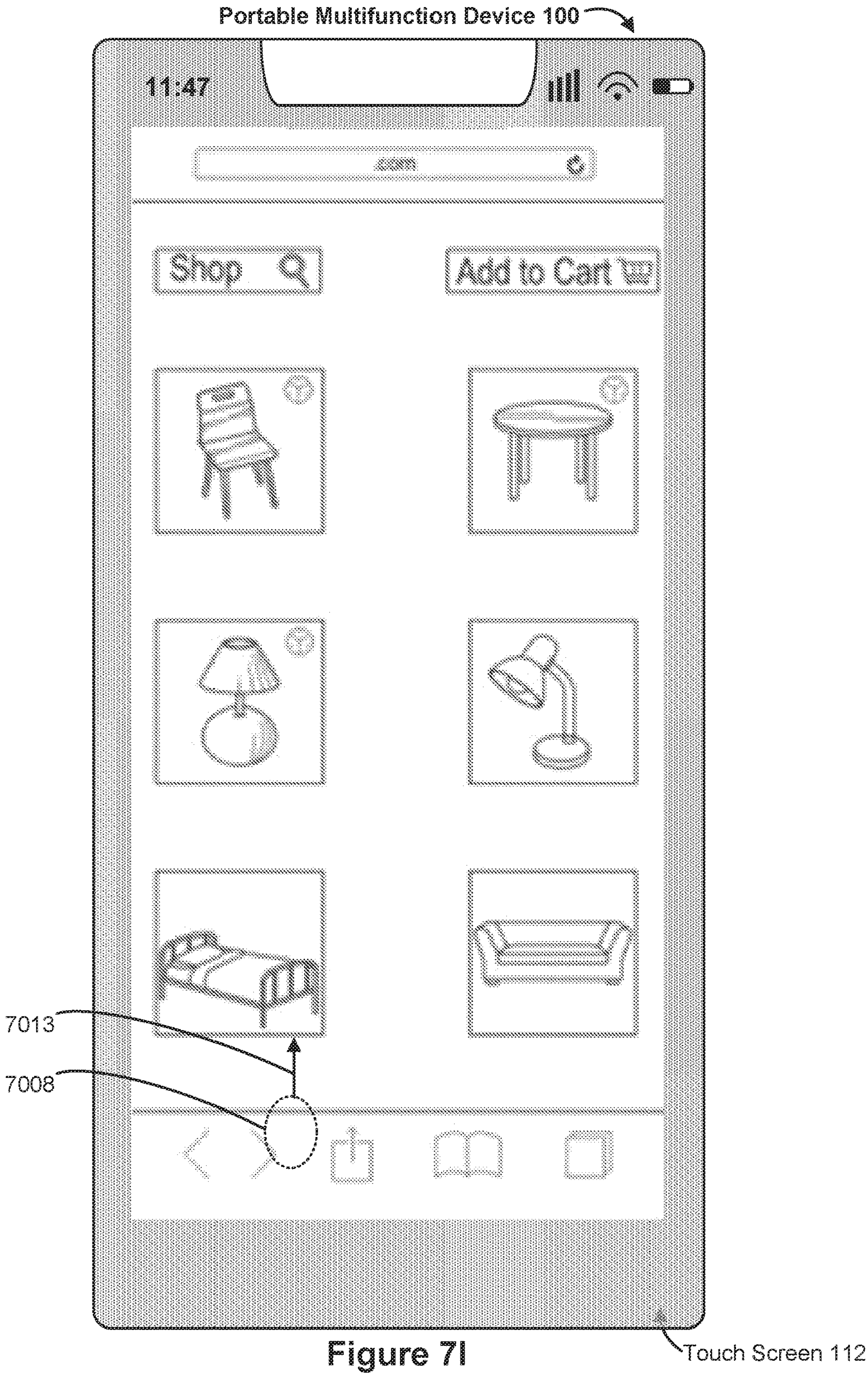
Figure 7J:
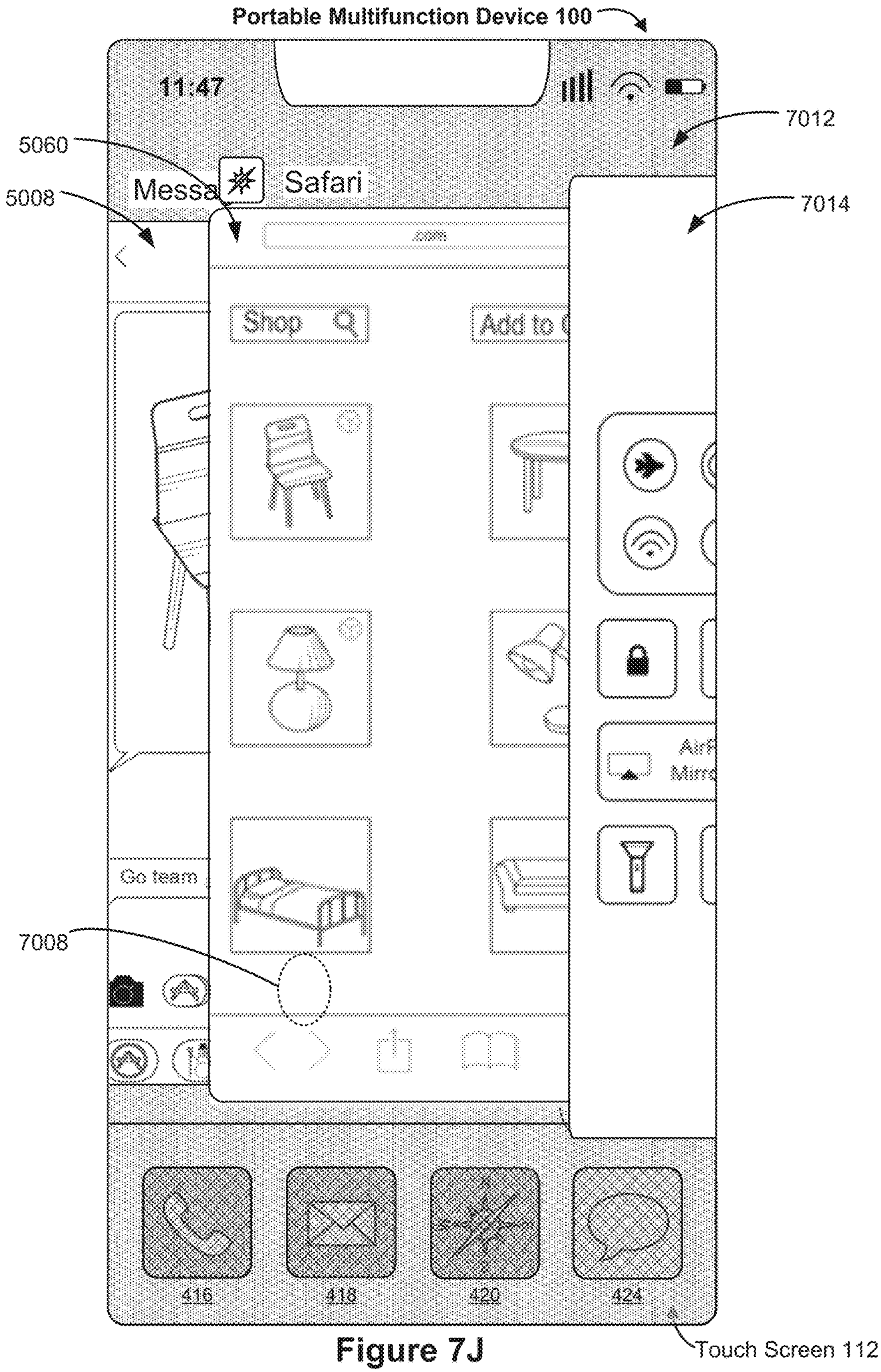
Figure 7K:
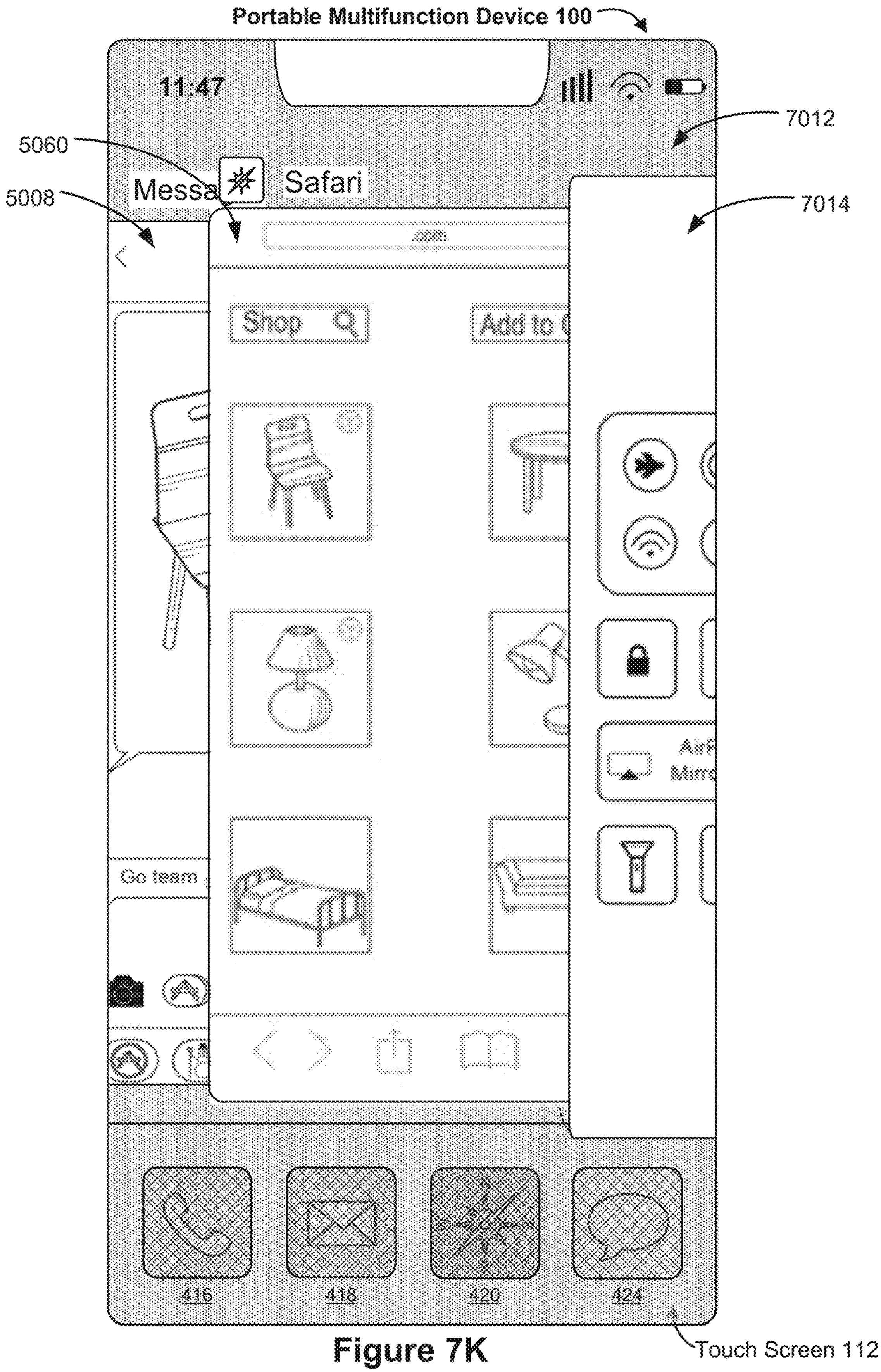
Figure 7L:
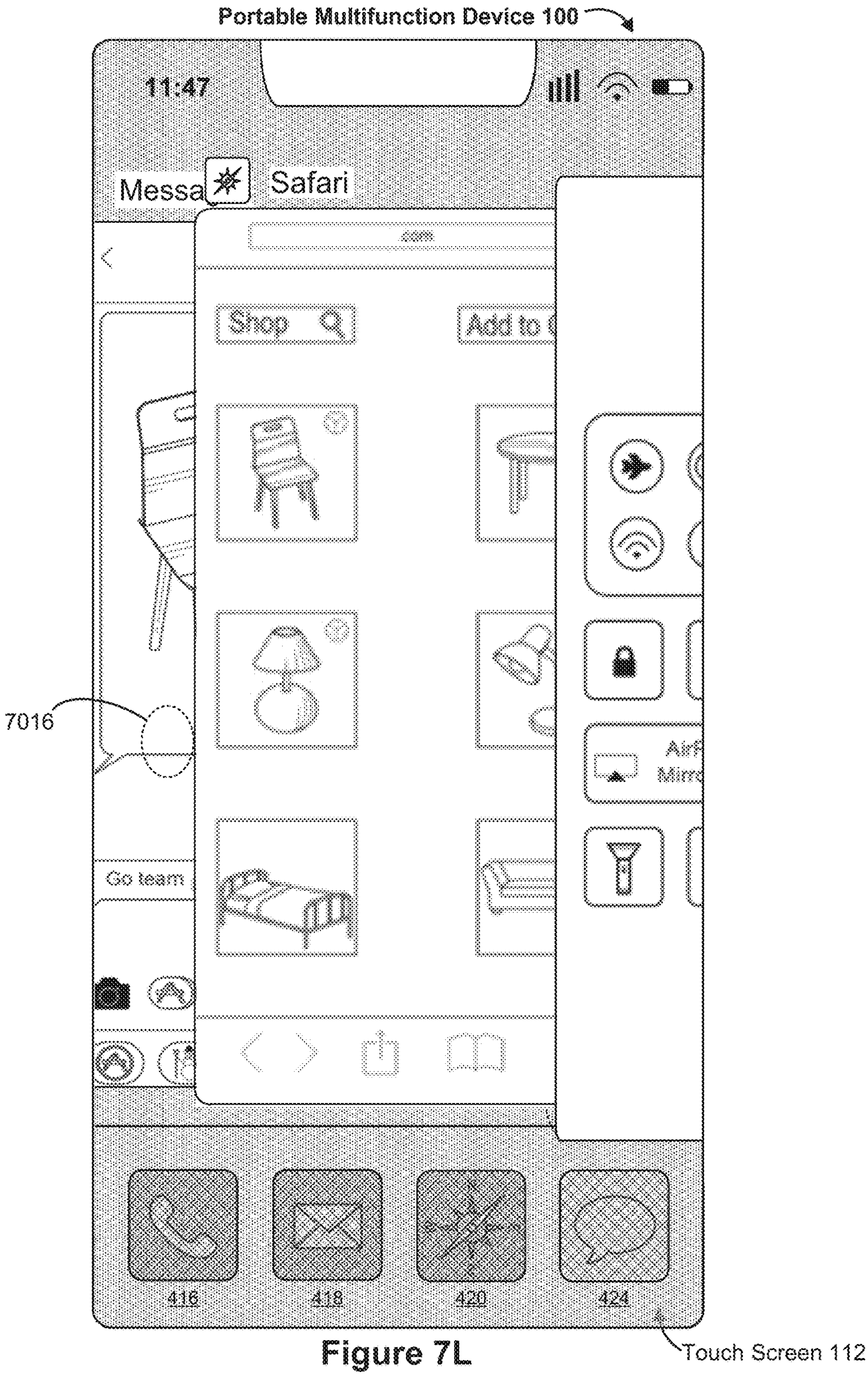
Figure 7M:
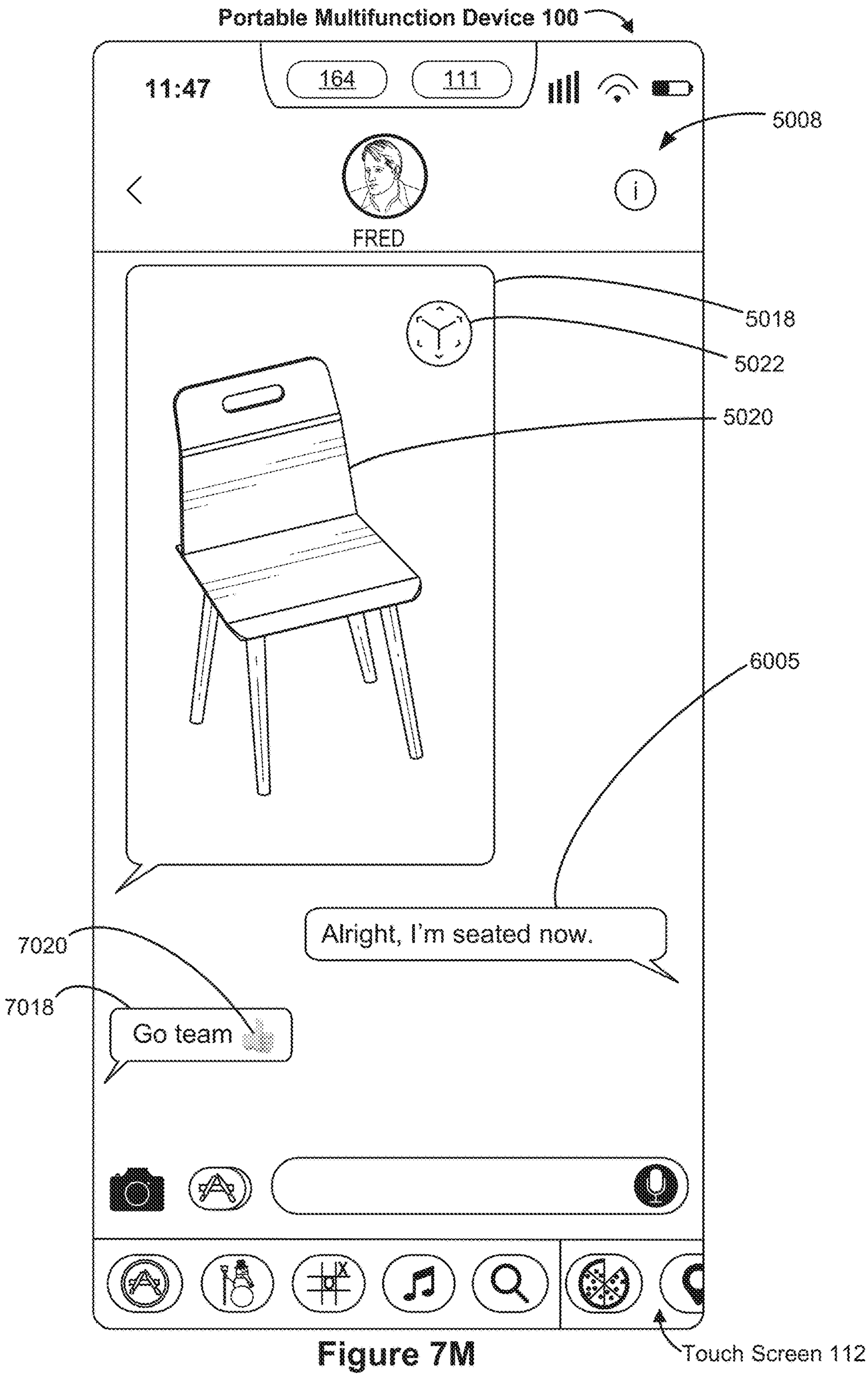
Figure 7N:
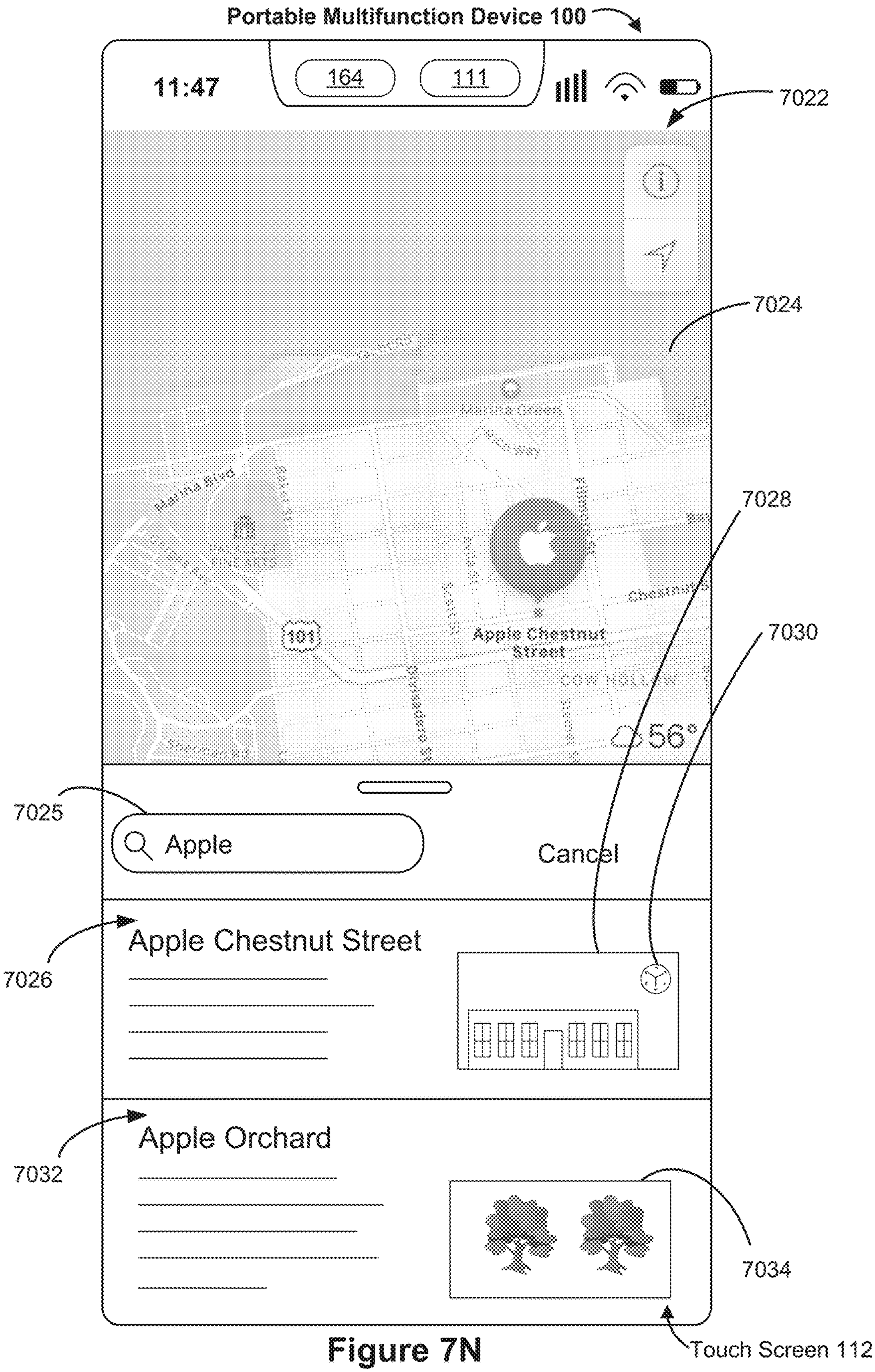
Figure 7O:
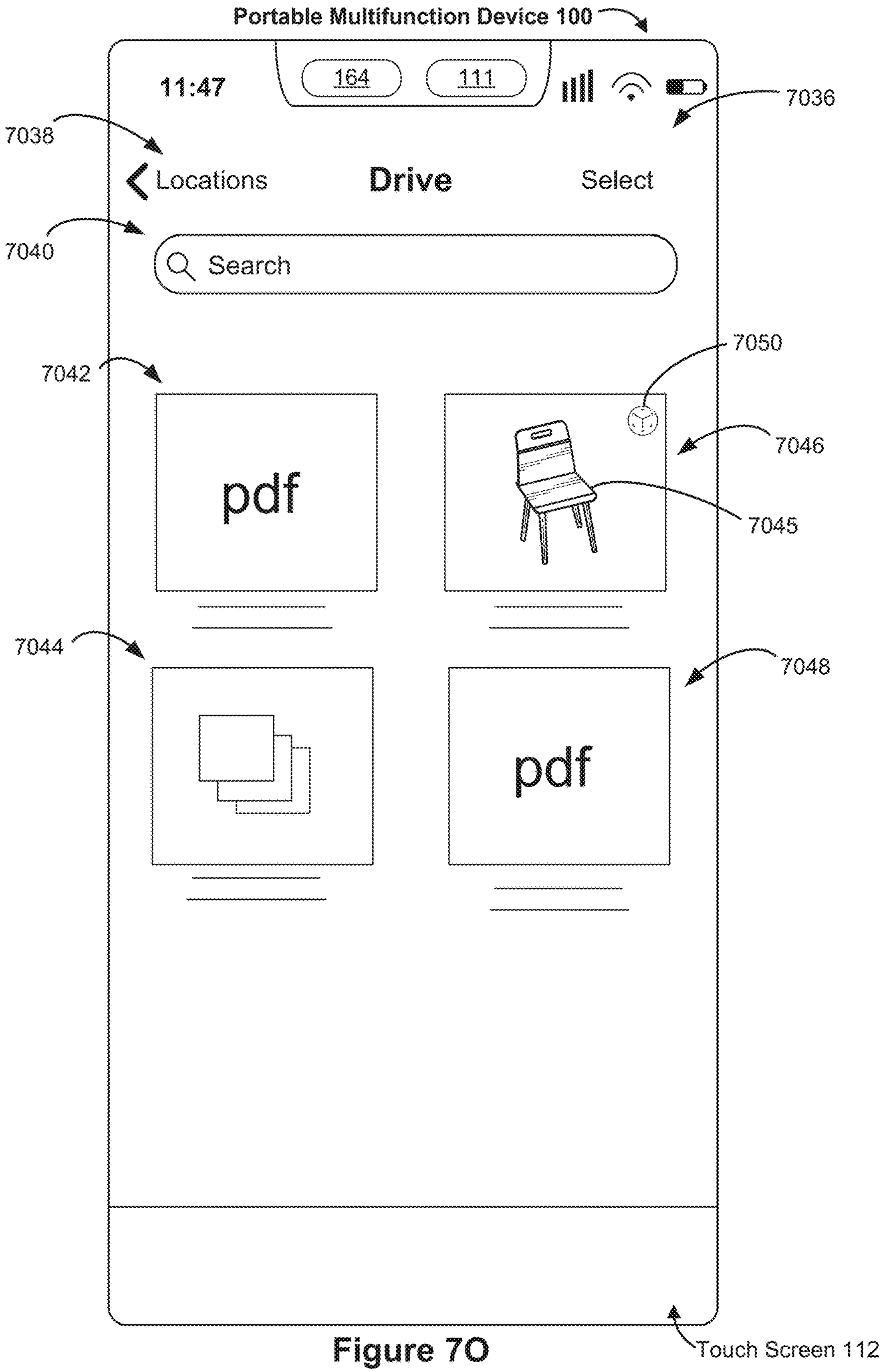
Figure 7P:
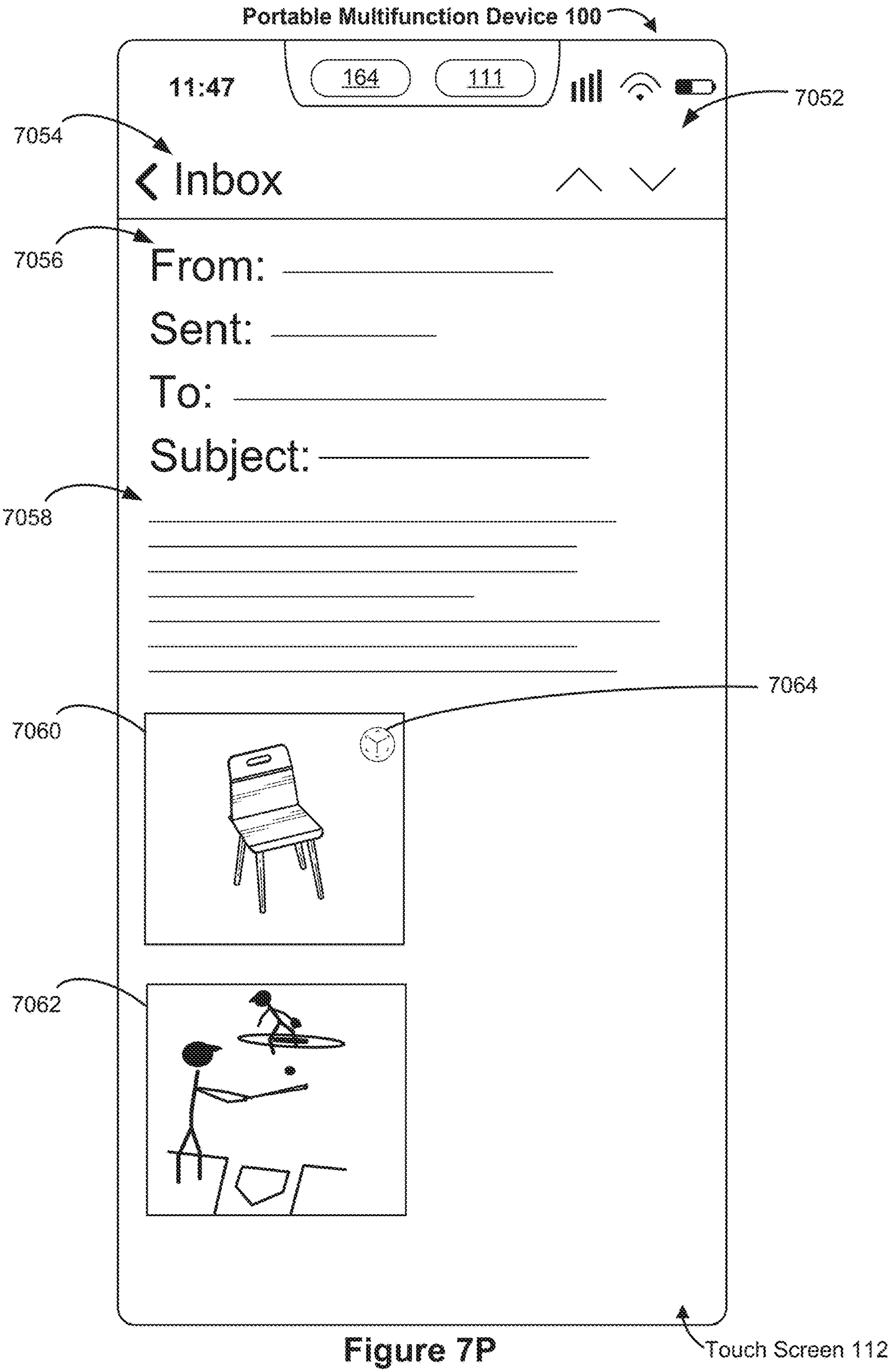

FIGS. 7A-7P illustrate example user interfaces for displaying an item with a visual indication to indicate that the item corresponds to a virtual three-dimensional object, in accordance with some embodiments. The user interfaces in these figures are used to illustrate the processes described below, including the processes in FIGS. 8A-8E, 9A-9D, 10A-10D, 16A-16G, 17A-17D, 18A-18I, 19A-19H, and 20A-20F. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIG. 7A illustrates an input detected while a user interface 400 for a menu of applications is displayed. The input corresponds to a request to display a first user interface (e.g., Internet browser user interface 5060). In FIG. 7A, an input (e.g., a tap input) by contact 7000 is detected at a location that corresponds to icon 420 for browser module 147. In response to the input, Internet browser user interface 5060 is displayed, as shown in FIG. 7B.

FIG. 7B illustrates Internet browser user interface 5060 (e.g., as described in detail with regard to FIG. 5AE). The Internet browser user interface 5060 includes web objects 5066, 5068, 5070, 5072, 5074, and 5076. Web objects 5066, 5068, and 5072 include two-dimensional representations of three-dimensional virtual objects as indicated by virtual object indicators 5078, 5080, and 5082, respectively. Web objects 5070, 5074, and 5076 include two-dimensional images (but the two-dimensional images of web objects 5070, 5074, and 5076 do not correspond to three-dimensional virtual objects, as indicated by the absence of the virtual object indicators).

FIGS. 7C-7D illustrate an input that causes translation (e.g., scrolling) of Internet browser user interface 5060. In FIG. 7B, a contact 7002 with touch screen 112 is detected. In FIGS. 7C-7D, as the contact 7002 moves along a path indicated by arrow 7004, web objects 5066, 5068, 5070, 5072, 5074, and 5076, scroll upward, revealing additional web objects 7003 and 7005. Additionally, as the contact 7002 moves along the path indicated by arrow 7004, virtual objects in the web objects 5066, 5068, and 5072 that include virtual object indicators 5078, 5080, and 5082, respectively, rotate (e.g., tilt upward) in accordance with the (upward vertical) direction of the input. For example, virtual lamp 5084 tilts upward from a first orientation in FIG. 7C to a second orientation in FIG. 7D. The two-dimensional images of web objects 5070, 5074, and 5076 do not rotate as the contact scrolls the Internet browser user interface 5060. In FIG. 7E, the contact 7002 has lifted off of touch screen 112. In some embodiments, the rotation behavior of the objects depicted in web objects 5066, 5068, and 5072 is used as a visual indication that these web objects have corresponding three-dimensional virtual objects that are viewable in an augmented reality environment, while the absence of such rotational behavior of the objects depicted in web objects 5070, 5074, and 5076 is used as a visual indication that these web objects do not have corresponding three-dimensional virtual objects that are viewable in an augmented reality environment.

FIGS. 7F-7G illustrate a parallax effect in which the virtual objects rotate on the display in response to a change in the orientation of the device 100 relative to the physical world.

Figure 12A:
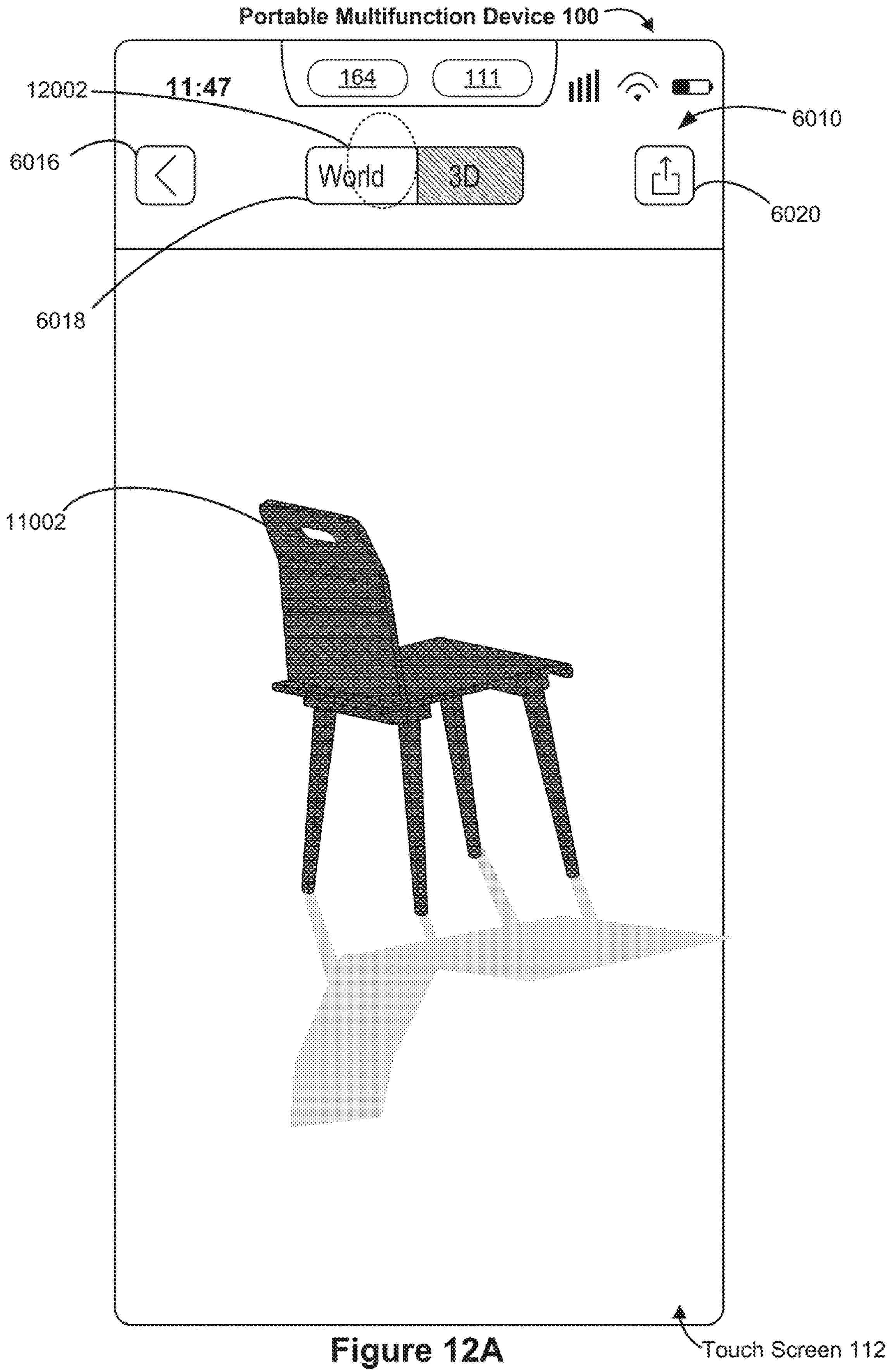
Figure 12B:
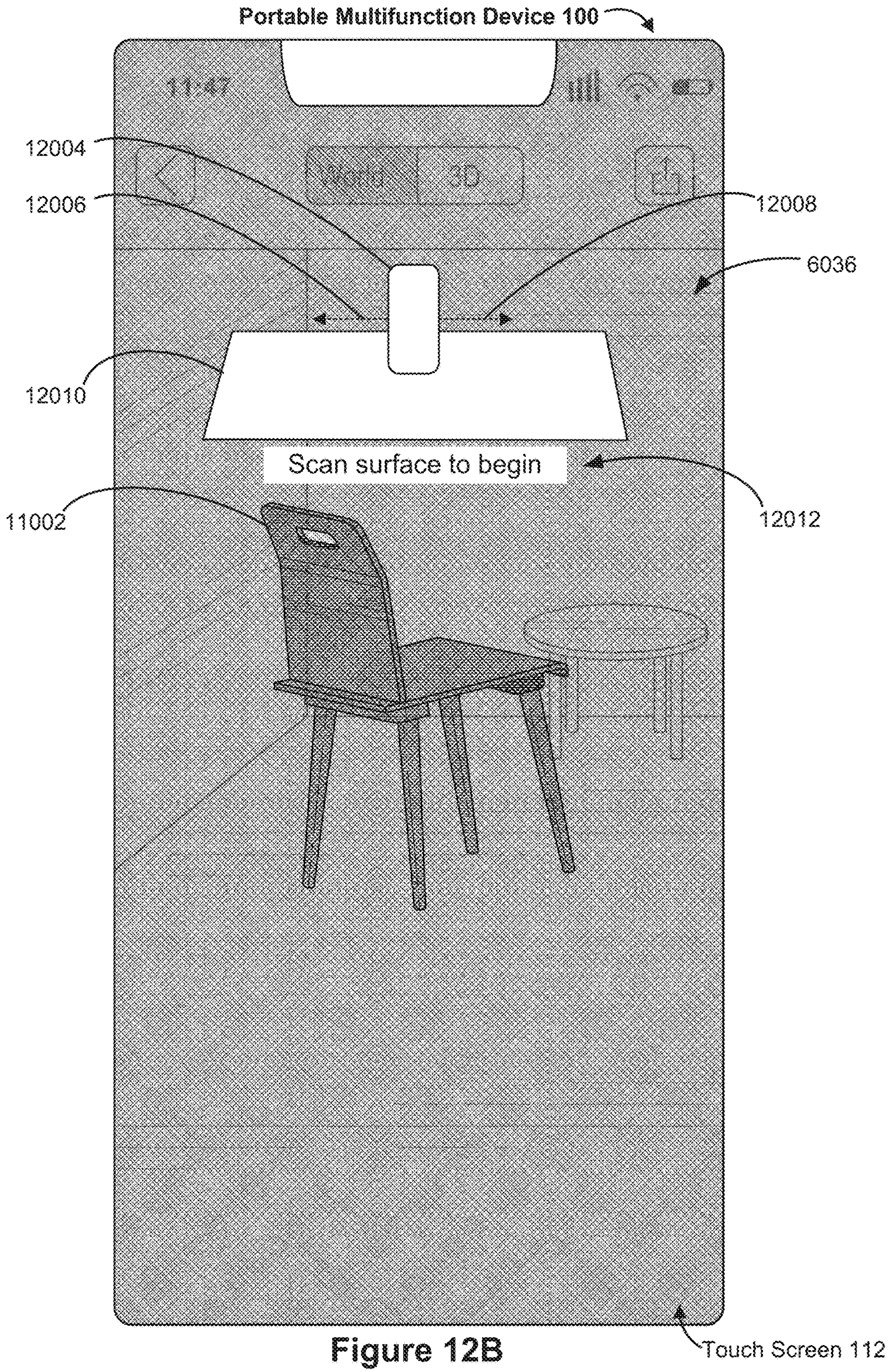
Figure 12C:
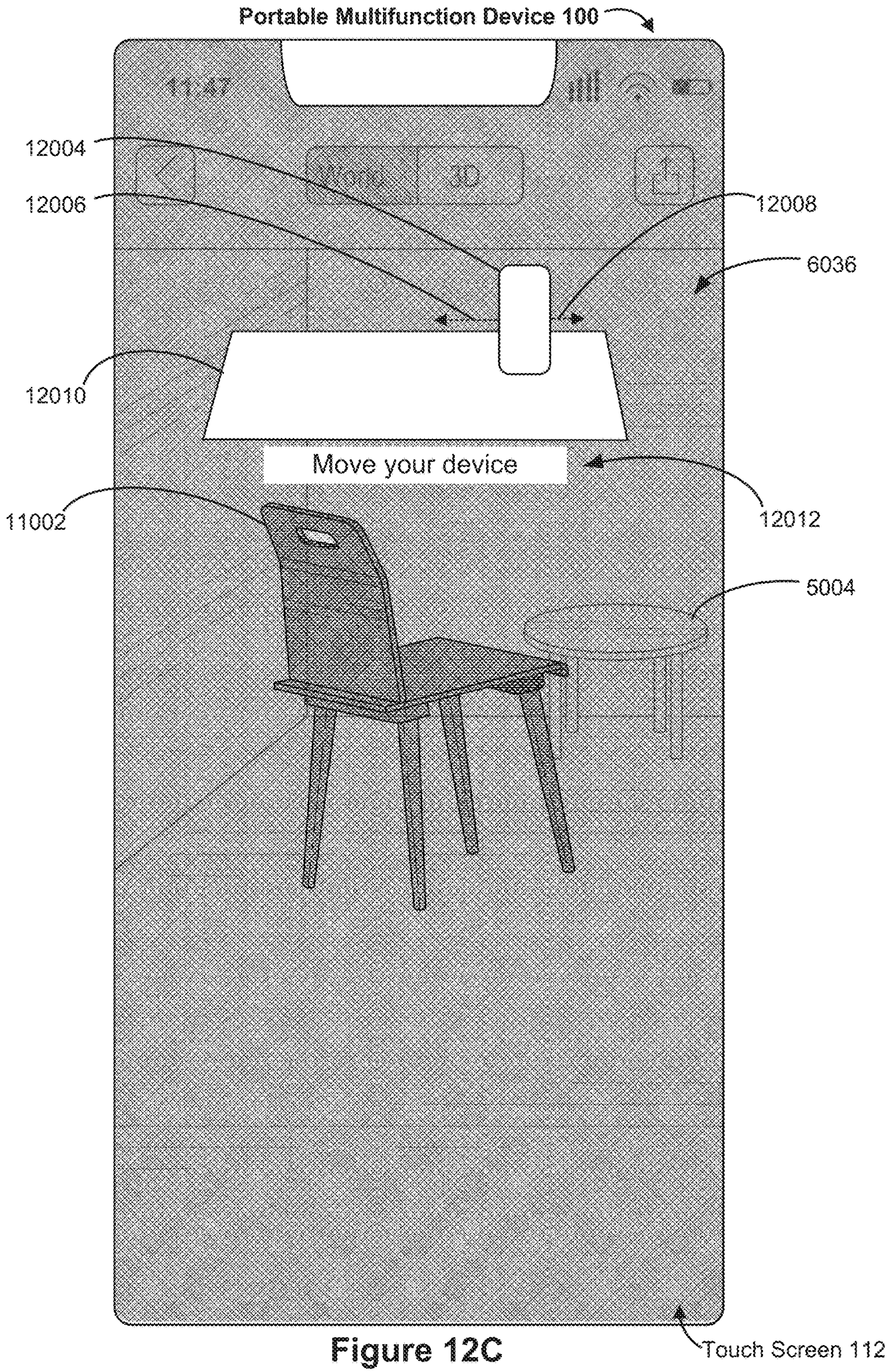
Figure 12D:
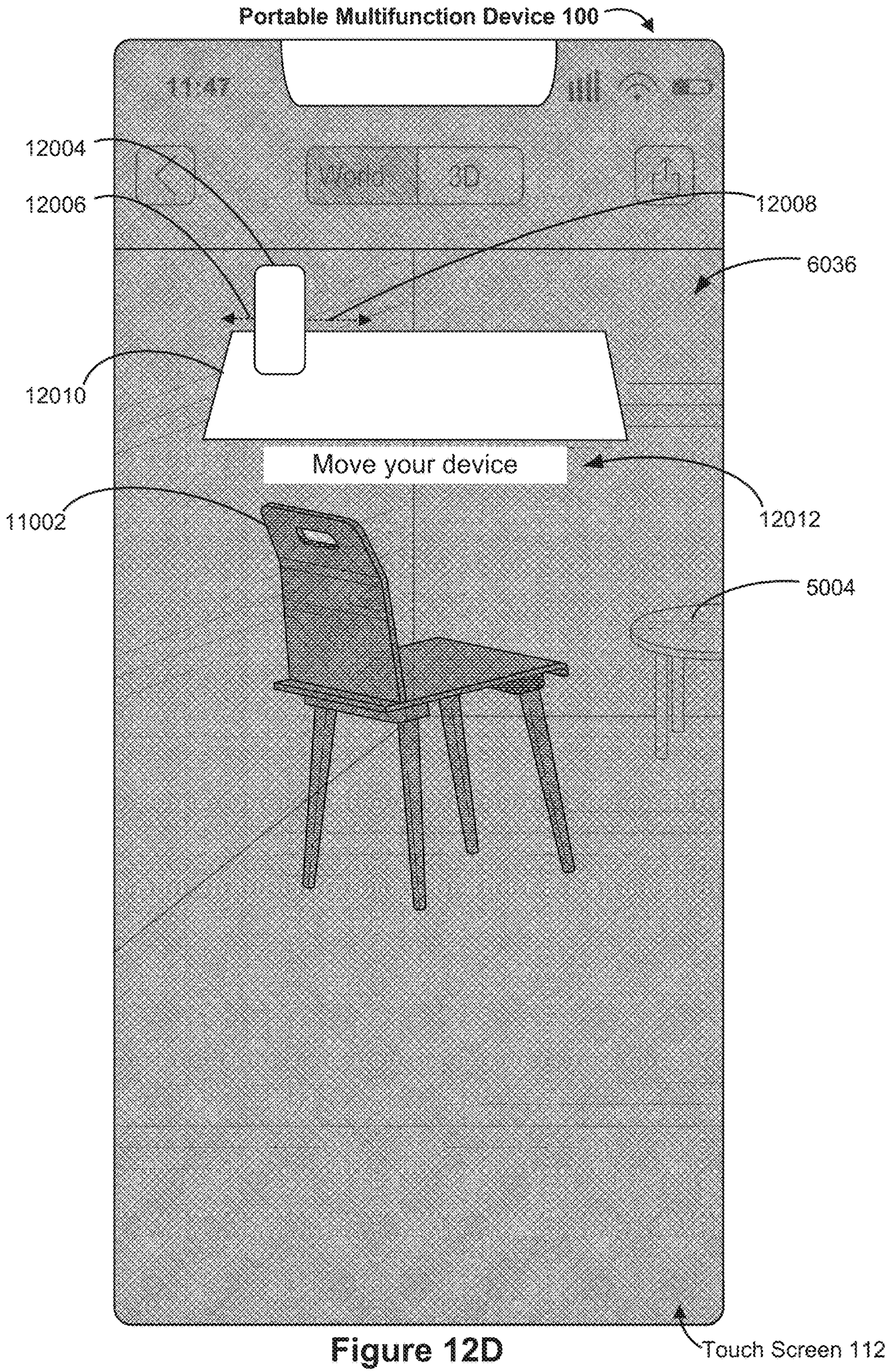
Figures 1, 12E:
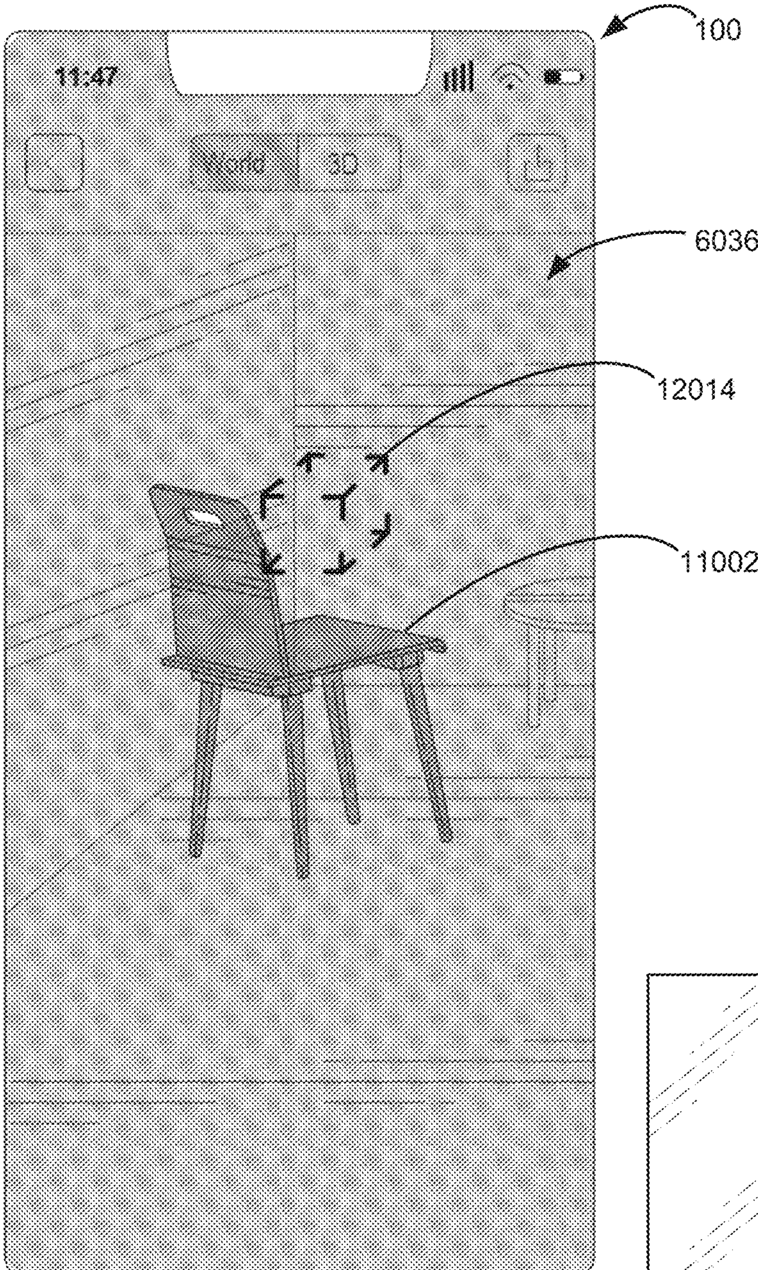
Figures 2, 12E:
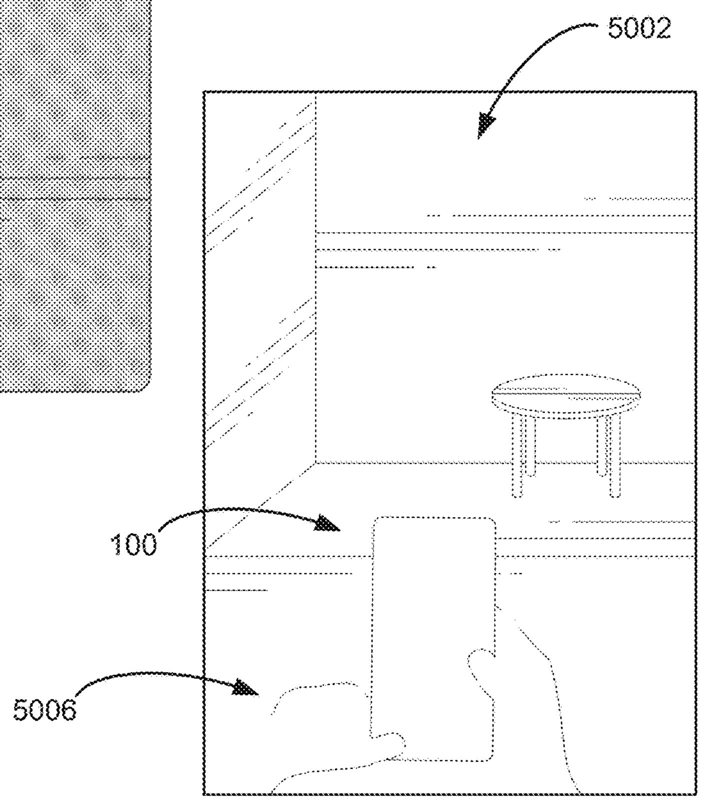

FIG. 7F1 illustrates a device 100 held by user 7006 in user's hand 5006 such that the device 100 has a substantially vertical orientation. FIG. 7F2 illustrates Internet browser user interface 5060 as displayed by device 100 when the device 100 is in the orientation illustrated in FIG. 7F1.

FIG. 7G1 illustrates a device 100 held by user 7006 in user's hand 5006 such that the device 100 has a substantially horizontal orientation. FIG. 7G2 illustrates Internet browser user interface 5060 as displayed by device 100 when the device 100 is in the orientation illustrated in FIG. 7G1. From 7F2 to 7G2, the orientation of virtual objects in the web objects 5066, 5068, and 5072 that include virtual object indicators 5078, 5080, and 5082, respectively, rotate (e.g., tilt upward) in accordance with the change in orientation of the device. For example, virtual lamp 5084 tilts upward from a first orientation in FIG. 7F2 to a second orientation in FIG. 7G2, in accordance with a concurrent change in device orientation in the physical space. The two-dimensional images of web objects 5070, 5074, and 5076 do not rotate as the orientation of the device changes. In some embodiments, the rotation behavior of the objects depicted in web objects 5066, 5068, and 5072 is used as a visual indication that these web objects have corresponding three-dimensional virtual objects that are viewable in an augmented reality environment, while the absence of such rotational behavior of the objects depicted in web objects 5070, 5074, and 5076 is used as a visual indication that these web objects do not have corresponding three-dimensional virtual objects that are viewable in an augmented reality environment.

FIGS. 7H-7L illustrate input that corresponds to a request to display a second user interface (e.g., messaging user interface 5008). In FIG. 7H, a contact 7008 is detected at a location that corresponds to the lower edge of display 112. In FIGS. 7H-7I, the contact 7008 moves upward along a path indicated by arrow 7010. In FIG. 7I-7J, the contact 7008 continues to move upward along a path indicated by arrow 7013. In FIGS. 7H-7J, as contact 7008 moves upward from the lower edge of display 112, the size of Internet browser user interface 5060 decreases, as shown in FIG. 7I, and in FIG. 7J, a multitasking user interface 7012 is displayed (e.g., in response to the upward edge swipe gesture by contact 7008). The multitasking user interface 7012 is configured to allow selection of an interface from among various applications with retained states (e.g., the retained state is the last state of a respective application when the respective application was the foreground application executed on the device), and various control interfaces (e.g., control center user interface 7014, Internet browser user interface 5060, and messaging user interface 5008, as illustrated in FIG. 7J). In FIG. 7K, contact 7008 lifts off of touch screen 112. In FIG. 7L an input (e.g., a tap input) by contact 7016 is detected at a location that corresponds to messaging user interface 5008. In response to the input by contact 7016, messaging user interface 5008 is displayed, as illustrated in FIG. 7M.

FIG. 7M illustrates a messaging user interface 5008 (e.g., as described in further detail with regard to FIG. 5B) that includes a message bubble 5018 that includes a virtual object (e.g., virtual chair 5020) received in a message and a virtual object indicator 5022 to indicate that the virtual chair 5020 is a virtual three-dimensional object (e.g., an object that is viewable in an augmented reality view and/or an object that is viewable from different angles). Messaging user interface 5008 also includes message bubble 6005 that includes a sent text message and message bubble 7018 that includes a received text message that includes an emoji 7020. Emoji 7020 is a two-dimensional image that does not correspond to a virtual three-dimensional object. For this reason, emoji 7020 is displayed without a virtual object indicator.

FIG. 7N illustrates a map user interface 7022 that includes a map 7024, point of interest information region 7026 for a first point of interest, and point of interest information region 7032 for a second point of interest. For example, the first point of interest and the second point of interest are search results within or proximate to an area shown by map 7024 that correspond to a search entry "Apple" in search input region 7025. In first point of interest information region 7026, a first point of interest object 7028 is displayed with a virtual object indicator 7030 to indicate that the first point of interest object 7028 is a virtual three-dimensional object. In second point of interest information region 7032, a second point of interest object 7034 is displayed without a virtual object indicator because second point of interest object 7034 does not correspond to a virtual three-dimensional object viewable in an augmented reality view.

FIG. 7O illustrates a file management user interface 7036 that includes file management controls 7038, a file management search input region 7040, file information region 7042 for a first file (e.g., a portable document format (PDF) file), file information region 7044 for a second file (e.g., a photograph file), file information region 7046 for a third file (e.g., a virtual chair object), and file information region 7048 for a fourth file (e.g., a PDF file). The third file information region 7046 includes a virtual object indicator 7050 displayed adjacent to a file preview object 7045 of file information region 7046 to indicate that the third file corresponds to a virtual three-dimensional object. First file information region 7042, second file information region 7044, and fourth file information region 7048 are displayed without virtual object indicators because the files that corresponds to these file information regions do not have corresponding virtual three-dimensional objects that are viewable in an augmented reality environment.

FIG. 7P illustrates an e-mail user interface 7052 that includes e-mail navigation controls 7054, e-mail information region 7056, and e-mail content region 7058 that includes a representation of a first attachment 7060 and a representation of a second attachment 7062. The representation of the first attachment 7060 includes a virtual object indicator 7064 to indicate that the first attachment is a virtual three-dimensional object viewable in an augmented reality environment. Second attachment 7062 is displayed without a virtual object indicator because the second attachment is not a virtual three-dimensional object viewable in an augmented reality environment.

FIGS. 8A-8E are flow diagrams illustrating method 800 of displaying a representation of a virtual object while switching from displaying a first user interface region to displaying a second user interface region, in accordance with some embodiments. Method 800 is performed at an electronic device (e.g., device 300, FIG. 3, or portable multifunction device 100, FIG. 1A) with a display, a touch-sensitive surface, and one or cameras (e.g., one or more rear-facing cameras on a side of the device opposite from the display and the touch-sensitive surface). In some embodiments, the display is a touch-screen display and the touch-sensitive surface is on or integrated with the display. In some embodiments, the display is separate from the touch-sensitive surface. Some operations in method 800 are, optionally, combined and/or the order of some operations is, optionally, changed.

Method 800 relates to detecting an input by a contact at a touch-sensitive surface of a device that displays a representation of a virtual object in a first user interface region. In response to the input, the device uses criteria to determine whether to continuously display the representation of the virtual object while replacing display of at least a portion of the first user interface region with a field of view of one or more cameras of the device. Using criteria to determine whether to continuously display the representation of the virtual object while replacing display of at least a portion of the first user interface region with the field of view of the one or more cameras enables the performance of multiple different types of operations in response to an input. Enabling the performance of multiple different types of operations in response to an input (e.g., by replacing display of at least a portion of the user interface with a field of view of one or more cameras or maintaining display of the first user interface region without replacing display of at least a portion of the first user interface region with the representation of the field of view of the one or more cameras) increases the efficiency with which the user is able to perform these operations, thereby enhancing the operability of the device, which, additionally, reduces power usage and improves battery life of the device by enabling the user to use the device more quickly and efficiently.

The device displays (802) a representation of a virtual object (e.g., a graphical representation of a three-dimensional object, such as virtual chair 5020, virtual lamp 5084, shoes, furniture, hand tools, decorations, people, an emoji, a game character, virtual furniture, etc.) in a first user interface region (e.g., a two-dimensional graphic user interface or a portion thereof (e.g., a browsable list of furniture images, an image containing one or more selectable objects, etc.)) on the display 112. For example, the first user interface region is messaging user interface 5008 as shown in FIG. 5B or Internet browser user interface 5060 as shown in FIG. 5AE. In some embodiments, the first user interface region includes a background other than an image of a physical environment surrounding the device (e.g., the background of the first user interface region is a preselected background color/pattern, or a background image that is distinct from an output image concurrently captured by the one or more cameras and distinct from live content in a field of view of the one or more cameras).

While displaying the first representation of the virtual object in the first user interface region on the display, the device detects (804) a first input by a contact at a location on the touch-sensitive surface 112 that corresponds to the representation of the virtual object on the display (e.g., the contact is detected on the first representation of the virtual object on the touch-screen display, or the contact is detected on an affordance that is concurrently displayed in the first user interface region with the first representation of the virtual object and that is configured to trigger display of an AR view of the virtual object when invoked by the contact). For example, the first input is an input by contact 5020 as described with regard to FIGS. 5C-5F or an input by contact 5086 as described with regard to FIGS. 5AF-5AL.

In response to detecting the first input by the contact (806), in accordance with a determination that the first input by the contact meets first (e.g., AR-trigger) criteria (e.g., the AR-trigger criteria are criteria configured to identify a swipe input, a touch-hold input, a press input, a tap input, a hard press with an intensity above a predefined intensity threshold, or another type of predefined input gesture, that is associated with triggering the activation of the camera(s), display of an augmented reality (AR) view of the physical environment surrounding the device, placement of a three-dimensional representation of the virtual object inside the augmented reality view of the physical environment, and/or a combination of two or more of the above actions): the device displays a second user interface region on the display, including replacing display of at least a portion of the first user interface region with the representation of a field of view of the one or more cameras, and the device continuously displays the representation of the virtual object while switching from displaying the first user interface region to displaying the second user interface region. For example, the second user interface region on the display is the field of view 5034 of the camera(s) in platter 5030 as described with regard to FIG. 5H, or the field of view 5034 of the camera(s) as described with regard to FIG. 5AH. In FIGS. 5C-5I, in accordance with a determination that an input by contact 5026 has a characteristic intensity that increases above a deep press intensity threshold ITS, virtual chair object 5020 is continuously displayed while switching from displaying the first user interface region (messaging user interface 5008) to displaying the second user interface region that replaces display of a portion of messaging user interface 5008 with the field of view 5034 of the camera(s) in platter 5030. In FIGS. 5AF-5AH, in accordance with a determination that an input by contact 5086 has a characteristic intensity that increases above a deep press intensity threshold ITS, virtual lamp object 5084 is continuously displayed while switching from displaying the first user interface region (Internet browser user interface 5060) to displaying the second user interface region that replaces display of a portion of Internet browser user interface 5060 with the field of view 5034 of the camera(s).

In some embodiments, continuously displaying the representation of the virtual object includes maintaining display of the representation of the virtual object or displaying an animated transition of the first representation of the virtual object changing into a second representation of the virtual object (e.g., a view of the virtual object in a different size, from a different viewing angle, in a different rendering style, or at a different location on the display). In some embodiments, the field of view 5034 of the one or more cameras display a live image of the physical environment 5002 surrounding the device which is updated in real-time when the device's position and orientation change relative to the physical environment (e.g., as illustrated at FIGS. 5K-5L). In some embodiments, the second user interface region completely replaces the first user interface region on the display.

In some embodiments, the second user interface region overlays a portion of the first user interface region (e.g., a portion of the first user interface region is shown along an edge or around the borders of the display). In some embodiments, the second user interface region pops up next to the first user interface region. In some embodiments, the background within the first user interface region is replaced with content of the field of view 5034 of the camera(s). In some embodiments, the device displays an animated transition that shows the virtual object moving and rotating (e.g., as illustrated at FIGS. 5E-5I) from a first orientation as shown in the first user interface region to a second orientation (e.g., an orientation that is predefined relative to a current orientation of a portion of the physical environment that is captured in the field of view of the one or more cameras). For example, the animation includes a transition from displaying a two-dimensional representation of the virtual object while displaying the first user interface region to displaying a three-dimensional representation of the virtual object while displaying the second user interface region. In some embodiments, a three-dimensional representation of the virtual object has an anchor plane that is predefined based on the shape and orientation of the virtual object as shown in the two-dimensional graphical user interface (e.g., the first user interface region). When transitioning to the augmented reality view (e.g., the second user interface region), the three-dimensional representation of the virtual object is moved, resized, and reoriented from the original location of the virtual object on the display to a new location on the display (e.g., to the center of the augmented reality view, or another predefined location in the augmented reality view), and during the movement or at the end of the movement, the three-dimensional representation of the virtual object is reoriented such that the three-dimensional representation of the virtual object is at a predefined position and/or orientation relative to a predefined plane identified in the field of view of the one or more cameras (e.g., a physical surface, such as a vertical wall or horizontal floor surface that can serve as a support plane for the three-dimensional representation of the virtual object).

In some embodiments, the first criteria include (808) criteria that are satisfied when (e.g., in accordance with a determination that) the contact is maintained at the location on the touch-sensitive surface that corresponds to the representation of the virtual object with less than a threshold amount of movement for at least a predefined amount of time (e.g., a long press time threshold). In some embodiments, in accordance with a determination that the contact satisfies criteria for recognizing another type of gesture (e.g., a tap), the device performs another predefined function other than triggering the AR user interface while maintaining display of the virtual object. Determining whether to continuously display the representation of the virtual object while replacing display of at least a portion of the first user interface region with the field of view of the camera(s), depending on whether the contact is maintained at a location on the touch-sensitive surface that corresponds to the representation of the virtual object with less than a threshold amount of movement for at least a predefined amount of time, enables the performance of multiple different types of operations in response to an input. Enabling the performance of multiple different types of operations in response to an input increases the efficiency with which the user is able to perform these operations, thereby enhancing the operability of the device, which, additionally, reduces power usage and improves battery life of the device by enabling the user to use the device more quickly and efficiently.

In some embodiments, the first criteria include (810) criteria that are satisfied when (e.g., in accordance with a determination that) a characteristic intensity of the contact increases above a first intensity threshold (e.g., a light press intensity threshold $IT_L$ or a deep press intensity threshold $IT_D$). For example, as described with regard to FIGS. 5C-5F, criteria are satisfied when a characteristic intensity of the contact 5026 increases above deep press intensity threshold ITS, as indicated by intensity level meter 5028. In some embodiments, in accordance with a determination that the contact satisfies criteria for recognizing another type of gesture (e.g., a tap), the device performs another predefined function other than triggering the AR user interface while maintaining display of the virtual object. In some embodiments, the first criteria require that the first input is not a tap input (e.g., the input has a duration between touch-down of the contact and lift-off of the contact that is greater than a tap time threshold). Determining whether to continuously display the representation of the virtual object while replacing display of at least a portion of the first user interface region with the field of view of the camera(s), depending on whether a characteristic intensity of the contact increases above a first intensity threshold, enables the performance of multiple different types of operations in response to an input. Enabling the performance of multiple different types of operations in response to an input increases the efficiency with which the user is able to perform these operations, thereby enhancing the operability of the device, which, additionally, reduces power usage and improves battery life of the device by enabling the user to use the device more quickly and efficiently.

In some embodiments, the first criteria include (812) criteria that are satisfied when (e.g., in accordance with a determination that) a movement of the contact meets predefined movement criteria (e.g., the contact moves across the touch-sensitive surface beyond a predefined threshold position (e.g., a position that corresponds to a boundary of the first user interface region, a position that is a threshold distance away from the original position of the contact, etc.), the contact moves with a speed greater than a predefined threshold speed, the movement of the contact ends with a press input, etc. In some embodiments, the representation of the virtual object is dragged by the contact during an initial portion of the movement of the contact, and the virtual object stops moving with the contact when the movement of the contact is about to meet the predefined defined movement criteria to indicate that the first criteria are about to be met; and if the movement of the contact continues and the predefined movement criteria are met by the continued movement of the contact, the transition to display the second user interface region and display the virtual object within the augmented reality view is started. In some embodiments, when the virtual object is dragged during the initial portion of the first input, the object size and viewing perspective does not change, and once the augmented reality view is displayed, and the virtual object is dropped into position in the augmented reality view, the virtual object is displayed with a size and viewing perspective that is dependent on the physical location represented by the drop-off location of the virtual object in the augmented reality view. Determining whether to continuously display the representation of the virtual object while replacing display of at least a portion of the first user interface region with the field of view of the camera(s), depending on whether movement of a contact meets predefined movement criteria, enables the performance of multiple different types of operations in response to an input. Enabling the performance of multiple different types of operations in response to an input increases the efficiency with which the user is able to perform these operations, thereby enhancing the operability of the device, which, additionally, reduces power usage and improves battery life of the device by enabling the user to use the device more quickly and efficiently.

In some embodiments, in response to detecting the first input by the contact, in accordance with a determination that the first input by the contact has met the first criteria, the device outputs (814), with one or more tactile output generators 167, a tactile output to indicate satisfaction of the first criteria by the first input (e.g., a tactile output 5032 as described with regard to FIG. 5F or a tactile output 5088 as described with regard to FIG. 5AH). In some embodiments, the haptic is generated before the field of view of the one or more cameras appears on the display. For example, the haptic indicates the satisfaction of the first criteria which trigger the activation of the one or more camera(s) and subsequent plane detection in the field of view of the one or more camera(s). Since it takes time for the cameras to be activated and the field of view to become available for display, the haptic serves as a non-visual signal to the user that the device has detected the necessary input, and will present the augmented reality user interface as soon as the device is ready.

Outputting a tactile output to indicate satisfaction of criteria (e.g., for replacing display of at least a portion of a user interface with a field of view of the camera(s)) provides the user with feedback to indicate that the provided input satisfies the criteria. Providing improved tactile feedback enhances the operability of the device (e.g., by helping the user to provide proper inputs and reducing user mistakes when operating/interacting with the device), which, additionally, reduces power usage and improves battery life of the device by enabling the user to use the device more quickly and efficiently.

In some embodiments, in response to detecting at least an initial portion of the first input (e.g., including detecting the contact, or detecting an input by the contact that meets respective predefined criteria without meeting the first criteria, or detecting an input that meets the first criteria), the device analyzes (816) the field of view of the one or more cameras to detect one or more planes (e.g., floor surface 5038, table surface 5046, wall, etc.) in the field of view of the one or more cameras. In some embodiments, the one or more cameras are activated in response to detecting the at least the initial portion of the first input, and the plane detection is initiated at the same time when the camera(s) are activated. In some embodiments, display of the field of view of the one or more cameras is delayed after activation of the one or more cameras (e.g., from the time the one or more cameras are activated until the time that at least one plane is detected in the field of view of the camera(s)). In some embodiments, display of the field of view of the one or more cameras is initiated at the time that the one or more cameras are activated, and the plane detection is completed after the field of view is already visible on the display (e.g., in the second user interface region). In some embodiments, after detecting a respective plane in the field of view of the one or more cameras, the device determines a size and/or position of the representation of the virtual object based on a relative position of the respective plane to the field of view of the one or more cameras. In some embodiments, as the electronic device is moved, the size and/or position of the representation of the virtual object is updated as the position of the field of view of the one or more cameras changes relative to the respective plane (e.g., as described with regard to FIGS. 5K-5L). Determining a size and/or position of the representation of the virtual object based on the position of the respective plane detected in the field of view of the camera(s) (e.g., without requiring further user input to size and/or position the virtual object relative to the field of view of the camera(s)) enhances the operability of the device, which, additionally, reduces power usage and improves battery life of the device by enabling the user to use the device more quickly and efficiently.

In some embodiments, analyzing the field of view of the one or more cameras to detect the one or more planes in the field of view of the one or more cameras is initiated (818) in response to detection of the contact at the location on the touch-sensitive surface that corresponds to the representation of the virtual object on the display (e.g., in response to detection of the contact 5026 at the location on touch screen 112 that corresponds to virtual chair 5020). For example, the activation of the cameras and the detection of the planes in the field of view of the camera(s) are started before the first criteria are met by the first input (e.g., before the characteristic intensity of the contact 5026 increases above the deep press intensity threshold ITS, as described with regard to FIG. 5F) and before the second user interface region is displayed. By starting the plane detection upon detection of any interaction with the virtual object, the plane detection can be completed before the AR trigger criteria are met, and therefore, there would be no visible delay to the user in seeing the virtual object transition into the augmented reality view when the AR trigger criteria are met by the first input. Initiating analysis to detect one or more planes in the field of view of the camera(s) in response to detection of the contact at the location of the representation of the virtual object (e.g., without requiring further user input to initiate analysis of the field of the camera(s)) enhances the efficacy of the device, which, additionally, reduces power usage and improves battery life of the device by enabling the user to use the device more quickly and efficiently.

In some embodiments, analyzing the field of view of the one or more cameras to detect the one or more planes in the field of view of the one or more cameras is initiated (820) in response to detecting that the first criteria are met by the first input by the contact (e.g., in response to detecting that the characteristic intensity of the contact 5026 increases above the deep press intensity threshold ITS, as described with regard to FIG. 5F). For example, the activation of the cameras and the detection of the planes in the field of view of the camera(s) are started when the first criteria are met by the first input, and the field of view of the camera is displayed before the plane detection is completed. By starting the camera activation and plane detection upon satisfaction of the AR trigger criteria, the cameras and plane detection are not unnecessarily activated and kept going, which, conserves battery power and extends battery life and camera life.

In some embodiments, analyzing the field of view of the one or more cameras to detect the one or more planes in the field of view of the one or more cameras is initiated (822) in response to detecting that an initial portion of the first input meets plane-detection trigger criteria without meeting the first criteria. For example, the activation of the cameras and the detection of the planes in the field of view of the camera(s) are started when some criteria (e.g., criteria that are less stringent that the AR-trigger criteria) are met by an initial portion of the first input, and the field of view of the camera is optionally displayed before the plane detection is completed. By starting the camera activation and plane detection after satisfaction of certain criteria rather than upon detection of the contact, the cameras and plane detection are not unnecessarily activated and kept going, which, conserves battery power and extends battery life and camera life. By starting the camera activation and plane detection before satisfaction of the AR trigger criteria, delay (due to camera activation and plane detection) is reduced for displaying the virtual object transition into the augmented reality view when the AR trigger criteria are met by the first input.

In some embodiments, the device displays (824) the representation of the virtual object in the second user interface region in a respective manner such that the virtual object (e.g., virtual chair 5020) is oriented at a predefined angle relative to a respective plane (e.g., such that there is no distance (or minimal distance) separating the undersides of the four legs of the virtual chair 5020 from floor surface 5038) that is detected in the field of view 5034 of the one or more cameras. For example, the orientation and/or position of the virtual object relative to a respective plane is predefined based on the shape and orientation of virtual object as shown in the two-dimensional graphical user interface (e.g., the respective plane corresponds to a horizontal physical surface that can serve as a support surface for three-dimensional representation of the virtual object in the augmented reality view (e.g., a horizontal table surface to support a vase), or the respective plane is a vertical physical surface that can serve as a support surface for the three-dimensional representation of the virtual object in the augmented reality view (e.g., a vertical wall to hang a virtual picture frame)). In some embodiments, the orientation and/or position of the virtual object is defined by a respective surface or boundary (e.g., the bottom surface, bottom boundary points, side surface, and/or side boundary points) of the virtual object. In some embodiments, an anchor plane that corresponds to the respective plane is a property in a set of properties of the virtual object, and is specified in accordance with the nature of a physical object that the virtual object is supposed to represent. In some embodiments, the virtual object is placed at a predefined orientation and/or position relative to multiple planes detected in the field of view of the one or more cameras (e.g., multiple respective sides of the virtual object are associated with respective planes detected in the field of view of the camera(s)). In some embodiments, if the orientation and/or position predefined for the virtual object is defined relative to a horizontal bottom plane of the virtual object, the bottom plane of the virtual object is displayed on a floor plane detected in the field of view of the camera(s) (e.g., the horizontal bottom plane of the virtual object is parallel to the floor plane with zero distance from the floor plane). In some embodiments, if the orientation and/or position predefined for the virtual object is defined relative to a vertical back plane of the virtual object, the back surface of the virtual object is placed against a wall plane detected in the field of view of the one or more cameras (e.g., the vertical back plane of the virtual object is parallel to the wall plane with zero distance from the wall plane). In some embodiments, the virtual object is placed at a fixed distance relative a respective plane and/or at an angle other than zero or right angles relative to the respective plane. Displaying a representation of a virtual object relative to a plane detected in a field of view of the camera(s) (e.g., without requiring further user input to display the virtual object relative to a plane in the field of view of the camera(s)) enhances the operability of the device, which, additionally, reduces power usage and improves battery life of the device by enabling the user to use the device more quickly and efficiently.

In some embodiments, in response to detecting the respective plane in the field of view of the one or more cameras, the device outputs (826), with the one or more tactile output generators 167, a tactile output to indicate the detection of the respective plane in the field of view of the one or more cameras. In some embodiments, a respective tactile output is generated for each plane (e.g., floor surface 5038 and/or table surface 5046) that is detected in the field of view of the camera(s). In some embodiments, the tactile output is generated when plane detection is completed. In some embodiments, the tactile output is accompanied by visual indication (e.g., a momentary highlighting of the field of view plane that has been detected) of the field of view plane in the field of view shown in the second user interface portion. Outputting a tactile output to indicate detection of a plane in a field of view of the camera(s) provides the user with feedback to indicate that the plane has been detected. Providing improved tactile feedback enhances the operability of the device (e.g., by helping the user to provide proper inputs and reducing unnecessary additional inputs for placing the virtual object), which, additionally, reduces power usage and improves battery life of the device by enabling the user to use the device more quickly and efficiently.

In some embodiments, while switching from displaying the first user interface region to displaying the second user interface region, the device displays (828) an animation as the representation of the virtual object transitions (e.g., moves, rotates, resizes, and/or is re-rendered in a different style, etc.) into the second user interface region to a predefined position relative to the respective plane (e.g., as illustrated at FIGS. 5F-5I) and, in conjunction with displaying the representation of the virtual object at the predefined angle relative to the respective plane (e.g., at a predefined orientation and/or position relative to the respective plane, and its size, rotation angle, and appearance reaching a final state to be shown in the augmented reality view), the device outputs, with the one or more tactile output generators 167, a tactile output to indicate display of the virtual object at the predefined angle relative to the respective plane in the second user interface region. For example, as illustrated in FIG. 5I, the device outputs tactile output 5036 in conjunction with displaying virtual chair 5020 at a predefined angle relative to floor surface 5038. In some embodiments, the tactile output that is generated is configured to have characteristics (e.g., frequency, number of cycles, modulation, amplitude, accompanying audio waves, etc.) reflecting the weight (e.g., heavy vs. light), material (e.g., metal, cotton, wood, marble, liquid, rubber, glass), size (e.g., large vs. small), shape (e.g., thin vs. thick, long vs. short, round vs. spiky, etc.), elasticity (e.g., bouncy vs. stiff), nature (e.g., playful vs. solemn, gentle vs. forceful, etc.), and other properties of the virtual object or the physical object represented by the virtual object. For example, the tactile output uses one or more of the tactile output patterns illustrated at FIGS. 4F-4K. In some embodiments, a preset profile including one or more changes to one or more characteristics over time corresponds to a virtual object (e.g., an emoji). For example, a "bouncing" tactile output profile is provided for a "smiley" emoji virtual object. Outputting the tactile output to indicate placement of the representation of the virtual object relative to the respective plane provides the user with feedback to indicate that the representation of the virtual object has been automatically placed relative to the respective plane. Providing improved tactile feedback enhances the operability of the device (e.g., by helping the user to provide proper inputs and reducing unnecessary additional inputs for placing the virtual object), which, additionally, reduces power usage and improves battery life of the device by enabling the user to use the device more quickly and efficiently.

In some embodiments (830), the tactile output has a tactile output profile that corresponds to a characteristic (e.g., a simulated physical property such as size, density, mass, and/or material) of the virtual object. In some embodiments, the tactile output profile has characteristics (e.g., frequency, number of cycles, modulation, amplitude, accompanying audio waves, etc.) that vary based on one or more characteristics (e.g., weight, material, size, shape, and/or elasticity) of the virtual object. For example, the tactile output uses one or more of the tactile output patterns illustrated at FIGS. 4F-4K. In some embodiments, the amplitude and/or duration of the tactile output is increased as the size, weight, and/or mass of the virtual object increases. In some embodiments, a tactile output pattern is selected based on a virtual material of which the virtual object is composed. Outputting a tactile output with a profile that corresponds to a characteristic of the virtual object provides the user with feedback to indicate information about the characteristic of the virtual object. Providing improved tactile feedback enhances the operability of the device (e.g., by helping the user to provide proper inputs, reducing unnecessary additional inputs for placing the virtual object, and providing sensory information that allows a user to perceive the characteristic of the virtual object without cluttering the user interface with displayed information about the characteristic), which, additionally, reduces power usage and improves battery life of the device by enabling the user to use the device more quickly and efficiently.

In some embodiments, while displaying the representation of the virtual object in the second user interface region, the device detects (832) movement of the device (e.g., lateral movement and/or rotation of the device) that adjusts the field of view 5034 of the one or more cameras (e.g., as illustrated in FIGS. 5K-5L), and, in response to detecting movement of the device, the device adjusts the representation of the virtual object (e.g., virtual chair 5020) in the second user interface region in accordance with a fixed spatial relationship (e.g., orientation and/or position) between the virtual object and the respective plane (e.g., floor surface 5038) in the field of view of the one or more cameras (e.g., the virtual object is displayed with an orientation and a position on the display such that a fixed angle between the representation of the virtual object and the plane is maintained (e.g., the virtual object appears to stay at a fixed location on the plane or roll along the field of view plane)) as the field of view of the one or more cameras is adjusted. For example, in FIGS. 5K-5L, the virtual chair 5020 in the second user interface region that includes the field of view 5034 of the camera(s) maintains a fixed orientation and position relative to the floor surface 5038 as the device 100 is moved. In some embodiments, the virtual object appears stationary and unchanged relative to the surrounding physical environment 5002, that is, the representation of the virtual object changes in size, position, and/or orientation on the display as device position and/or orientation is changed, as the field of view of the one or more cameras changes when the device moves relative to the surrounding physical environment. Adjusting the representation of a virtual object in accordance with the fixed relationship between the virtual object and a respective plane (e.g., without requiring further user input to maintain a position of the virtual object relative to the respective plane) enhances the operability of the device, which, additionally, reduces power usage and improves battery life of the device by enabling the user to use the device more quickly and efficiently.

In some embodiments, (e.g., at a time that corresponds to replacing display of at least a portion of the first user interface region with the representation of the field of view of the one or more cameras,) the device displays (834) an animation (e.g., movement, rotation about one or more axes, and/or scaling) as the representation of the virtual object (e.g., virtual chair 5020) is continuously displayed while switching from displaying the first user interface region to displaying the second user interface region (e.g., as illustrated in 5F-5I). For example, the animation includes a transition from displaying a two-dimensional representation of the virtual object while displaying the first user interface region to displaying a three-dimensional representation of the virtual object while displaying the second user interface region. In some embodiments, a three-dimensional representation of the virtual object has an orientation that is predefined relative to a current orientation of a portion of the physical environment captured in the field of view of the one or more cameras. In some embodiments, when transitioning to the augmented reality view, a representation of the virtual object is moved, resized, and reoriented from an initial location on the display to a new location on the display (e.g., the center of the augmented reality view, or another predefined location in the augmented reality view), and during the movement or at the end of the movement, is reoriented such that the virtual object is at a fixed angle relative to a plane (e.g., a physical surface, such as a vertical wall or horizontal floor surface that can support a representation of the virtual object) detected in the field of view of the camera(s). In some embodiments, the lighting of the virtual object and/or a shadow cast by the virtual object are adjusted as the animated transition occurs (e.g., to match ambient lighting detected in the field of view of the one or more cameras). Displaying an animation as the representation of the virtual object while switching from displaying the first user interface region to the second user interface region provides the user with feedback to indicate that the first input meets the first criteria. Providing improved feedback enhances the operability of the device (e.g., by helping the user to provide proper inputs and reducing user mistakes when operating/interacting with the device), which, additionally, reduces power usage and improves battery life of the device by enabling the user to use the device more quickly and efficiently.

In some embodiments, while displaying the second user interface region on the display, the device detects (836) a second input by a second contact (e.g., contact 5040), wherein the second input includes (optionally, a press or touch input by the second contact to select the representation of the virtual object and) movement of the second contact along a first path across the display (e.g., as illustrated in FIGS. 5N-5P) and, in response to detecting the second input by the second contact, the device moves the representation of the virtual object (e.g., virtual chair 5020) in the second user interface region along a second path that corresponds to (e.g., is the same as, or is constrained by) the first path. In some embodiments, the second contact is distinct from the first contact and is detected after lift-off of the first contact (e.g., as illustrated by contact 5040 in FIGS. 5N-5P, which is detected after the lift-off of contact 5026 in FIGS. 5C-5F). In some embodiments, the second contact is the same as the first contact that is continuously maintained on the touch-sensitive surface (e.g., as illustrated by the input by contact 5086, which meets AR-trigger criteria and then moves across touch screen 112 to move virtual lamp 5084). In some embodiments, a swipe input on the virtual object rotates the virtual object, while the movement of the virtual object is optionally constrained by the plane in the field of view of the camera(s) (e.g., the swipe input rotates a representation of a chair on a floor plane in the field of view of the camera(s)). Moving the representation of the virtual object in response to detecting an input provides the user with feedback to indicate that the displayed position of the virtual object is movable in response to user input. Providing improved feedback enhances the operability of the device (e.g., by helping the user to provide proper inputs and reducing user mistakes when operating/interacting with the device), which, additionally, reduces power usage and improves battery life of the device by enabling the user to use the device more quickly and efficiently.

In some embodiments, the device adjusts (838) a size of the representation of the virtual object (e.g., based on a virtual distance from the representation of the virtual object to the user, to maintain an accurate perspective of the virtual object in the field of view) as the representation of the virtual object moves along the second path based on the movement of the contact and a respective plane that corresponds to the virtual object. For example, in FIGS. 5N-5P, the size of virtual chair 5020 decreases as the virtual chair moves deeper into the field of view 5034 of the camera(s), away from device 100 and toward table 5004. Adjusting the size of the representation of the virtual object as the representation of the virtual object moves along the second path based on the movement of the contact and the plane that corresponds to the virtual object (e.g., without requiring further user input to adjust a size of the representation of the virtual object to maintain the representation of the virtual object at a realistic size relative to the environment in the field of view of the camera(s)) enhances the operability of the device, which, additionally, reduces power usage and improves battery life of the device by enabling the user to use the device more quickly and efficiently.

In some embodiments, the device maintains (840) a first size of the representation of the virtual object (e.g., virtual lamp 5084) as the representation of the virtual object moves along the second path (e.g., as illustrated in FIGS. 5AI-5AL), the device detects termination of the second input by the second contact (e.g., including detecting lift-off of the second contact, as illustrated in FIGS. 5AL-5AM), and, in response to detecting the termination of the second input by the second contact, the device places the representation of the virtual object at a drop-off location (e.g., on table surface 5046) in the second user interface region and displays the representation of the virtual object at the drop-off location in the second user interface region with a second size that is distinct from the first size (e.g., the size of virtual lamp 5084 in FIG. 5AM, after termination of the input by contact 5086, is distinct from the size of virtual lamp 5084 in FIG. 5AL, prior to termination of the input by contact 5086). For example, the object does not change its size and viewing perspective while being dragged by the contact, and when the object is dropped at its final location in the augmented reality view, the object is displayed with size and viewing perspective determined based on a physical location in the physical environment that corresponds to the drop-off location of the virtual object shown in the field of view of the camera(s), such that in accordance a determination that the drop-off location is a first location in the field of view of the camera(s), the object has a second size and in accordance a determination that the drop-off location is a second location in the field of view of the camera(s), the object has a third size that is different from the second size, wherein the second and third sizes are selected based on the distance of the drop-off location from the one or more cameras. Displaying the representation of the virtual object with a changed size in response to detecting termination of the second input that moves the virtual object (e.g., without requiring further user input to adjust a size of the virtual object to maintain the virtual object at a realistic size relative to the environment in the field of view of the camera(s)) enhances the operability of the device, which, additionally, reduces power usage and improves battery life of the device by enabling the user to use the device more quickly and efficiently.

In some embodiments, in accordance with a determination that the movement of the second contact along the first path across the display meets second criteria (e.g., at the end of the first path, the contact is within a threshold distance of or outside of an edge (e.g., bottom edge, top edge, and or side edge) of the display or an edge of the second user interface region)), the device (842): ceases to display the second user interface region including the representation of the field of view of the one or more cameras, and redisplays the (full) first user interface region with the representation of the virtual object (e.g., if a portion of the first user interface region is previously displayed concurrently with the second user interface region, the device displays the full first user interface region after the second user interface region is no longer displayed). For example, in response to movement of contact 5054 that drags virtual chair 5054 to the edge of touch screen 112, as illustrated in FIGS. 5V-5X, the field of view 5034 of the camera(s) ceases to be displayed and the full messaging user interface 5008 is redisplayed, as illustrated in FIGS. 5Y-5AD. In some embodiments, as the contact approaches an edge of the display or the edge of the second user interface region, the second user interface region fades out (e.g., as illustrated at FIGS. 5X-5Y) and/or the (undisplayed or blocked portion of) the first user interface region fades in (e.g., as illustrated at FIG. 5Z-5AA). In some embodiments, the gesture for transitioning from the non-AR view (e.g., the first user interface region) to the AR view (e.g., the second user interface region) and the gesture for transitioning from the AR view to the non-AR view are the same. For example, a drag gesture on the virtual object beyond a threshold position in the currently displayed user interface (e.g., within a threshold distance of a boundary of the currently displayed user interface region, or beyond a boundary of the currently displayed user interface region) causes the transition from the currently displayed user interface region to the counterpart user interface region (e.g., from displaying the first user interface region to displaying the second user interface region, or alternatively, from displaying the second user interface region to displaying the first user interface region). In some embodiments, the visual indication (e.g., fading out the currently displayed user interface region and fading in the counterpart user interface) is shown before the first/second criteria are met, and is reversible if the input continues and the first/second criteria are not met before termination of the input (e.g., lift-off of the contact) is detected. Redisplaying a first user interface in response to detecting an input that meets input criteria provides additional control options without cluttering the second user interface with additional displayed controls (e.g., controls for displaying the first user interface from the second user interface). Providing additional control options without cluttering the second user interface with additional displayed controls enhances the operability of the device, which, additionally, reduces power usage and improves battery life of the device by enabling the user to use the device more quickly and efficiently.

In some embodiments, at a time that corresponds to redisplaying the first user interface region, the device displays (844) an animated transition (e.g., movement, rotation about one or more axes, and/or scaling) from displaying the representation of the virtual object in the second user interface region to displaying the representation of the virtual object in the first user interface region (e.g., as illustrated by the animation of virtual chair 5020 in FIGS. 5AB-5AD). Displaying an animated transition from displaying the representation of the virtual object in the second user interface to displaying the representation of the virtual object in the first user interface (e.g., without requiring further user input to reposition the virtual object in the first user interface) enhances the operability of the device, which, additionally, reduces power usage and improves battery life of the device by enabling the user to use the device more quickly and efficiently.

In some embodiments, as the second contact moves along the first path, the device changes (846) a visual appearance of one or more respective planes (e.g., highlighting, marking, outlining, and/or otherwise visually altering the appearance of the one or more planes) identified in the field of view of the one or more cameras that corresponds to a current location of the contact. For example, as the contact 5042 drags virtual chair 5020 along a path as illustrated by arrows 5042 and 5044 in FIGS. 5O-5P, floor surface 5038 is highlighted (e.g., in comparison with FIG. 5M, prior to movement of contact 5042). In some embodiments, in accordance with a determination that the contact is at a location that corresponds to a first plane detected in the field of view of the camera(s), the first plane is highlighted. In accordance with a determination that the contact has moved to a location the corresponds to a second plane detected in the field of view of the camera(s) (e.g., as illustrated in FIGS. 5S-5U), the first plane (e.g., floor surface 5038) ceases to be highlighted and the second plane (e.g., table surface 5046) is highlighted. In some embodiments, multiple planes are highlighted at the same time. In some embodiments, a first plane of multiple visually altered planes is visually altered in a manner that is distinct from the manner in which the other planes are visually altered to indicate that the contact is at a location that corresponds to the first plane. Changing the visual appearance of the one or more respective planes identified in the field of view of the camera(s) provides the user with feedback to indicate that a plane (e.g., relative to which the virtual object may be positioned) has been identified. Providing improved visual feedback enhances the operability of the device (e.g., by helping the user to provide proper inputs and reducing user mistakes when operating/interacting with the device), which, additionally, reduces power usage and improves battery life of the device by enabling the user to use the device more quickly and efficiently.

In some embodiments, in response to detecting the first input by the contact, in accordance with a determination that the first input by the contact meets third (e.g., staging user interface display) criteria (e.g., the staging user interface display criteria are criteria configured to identify a swipe input, a touch-hold input, a press input, a tap input, or a hard press with an intensity above a predefined intensity threshold), the device displays (848) a third user interface region on the display, including replacing display of at least a portion of the first user interface region (e.g., including a 3D model of the virtual object that replaces a 2D image of the virtual object). In some embodiments, while displaying a staging user interface (e.g., staging user interface 6010 as described with regard to FIG. 6I), the device updates the appearance of the representation of the virtual object based on inputs detected that correspond to the staging user interface (e.g., as described in greater detail below with reference method 900). In some embodiments, when another input is detected while the virtual object is displayed in the staging user interface and the input meets the criteria for transitioning to displaying the second user interface region, the device replaces display of the staging user interface with the second user interface region while continuously displaying the virtual object. More details are described with respect to method 900. Displaying the third user interface in accordance with the determination that the first input meets the third criteria provides additional control options without cluttering the first user interface with additional displayed controls (e.g., controls for displaying the third user interface from the first user interface). Providing additional control options without cluttering the second user interface with additional displayed controls enhances the operability of the device, which, additionally, reduces power usage and improves battery life of the device by enabling the user to use the device more quickly and efficiently.

In some embodiments, in accordance with a determination that the first input (e.g., a swipe input that corresponds to scrolling the first user interface region or a tap input that corresponds to a request to display a web page or email corresponding to content in the first user interface region) by the contact does not meet the first (e.g., AR-trigger) criteria, the device maintains (850) display of the first user interface region without replacing display of at least a portion of the first user interface region with the representation of the field of view of the one or more cameras (e.g., as described with regard to FIGS. 6B-6C). Using the first criteria to determine whether to maintain display of the first user interface region or to continuously display the representation of the virtual object while replacing display of at least a portion of the first user interface region with the field of view of one or more cameras enables the performance of multiple different types of operations in response to an input. Enabling the performance of multiple different types of operations in response to an input (e.g., by replacing display of at least a portion of the user interface with a field of view of one or more cameras or maintaining display of the first user interface region without replacing display of at least a portion of the first user interface region with the representation of the field of view of the one or more cameras) increases the efficiency with which the user is able to perform these operations, thereby enhancing the operability of the device, which, additionally, reduces power usage and improves battery life of the device by enabling the user to use the device more quickly and efficiently.

It should be understood that the particular order in which the operations in FIGS. 8A-8E have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900 and 1000) are also applicable in an analogous manner to method 800 described above with respect to FIGS. 8A-8E. For example, the contacts, inputs, virtual objects, user interface regions, intensity thresholds, tactile outputs, fields of view, movements, and/or animations described above with reference to method 800 optionally have one or more of the characteristics of the contacts, inputs, virtual objects, user interface regions, intensity thresholds, tactile outputs, fields of view, movements, and/or animations described herein with reference to other methods described herein (e.g., methods 900, 1000, 16000, 17000, 18000, 19000, and 20000). For brevity, these details are not repeated here.

FIGS. 9A-9D are flow diagrams illustrating method 900 of displaying a first representation of a virtual object in a first user interface region, a second representation of the virtual object in the second user interface region, and a third representation of the virtual object with a representation of a field of view of one or more cameras, in accordance with some embodiments. Method 900 is performed at an electronic device (e.g., device 300, FIG. 3, or portable multifunction device 100, FIG. 1A) with a display, a touch-sensitive surface, and one or more cameras (e.g., one or more rear-facing cameras on a side of the device opposite from the display and the touch-sensitive surface). In some embodiments, the display is a touch-screen display and the touch-sensitive surface is on or integrated with the display. In some embodiments, the display is separate from the touch-sensitive surface. Some operations in method 900 are, optionally, combined and/or the order of some operations is, optionally, changed.

As described below, method 900 relates to detecting input by a contact at a touch-sensitive surface of a device that displays a representation of a virtual object in a first user interface (e.g., a two-dimensional graphic user interface). In response to a first input, the device uses criteria to determine whether to display a second representation of the virtual object in a second user interface (e.g., a staging user interface in which a three-dimensional representation of the virtual object can be moved, resized, and/or reoriented). While displaying the second representation of the virtual object in the second user interface, in response to a second input, the device either changes a display property of the second representation of the virtual object based on the second input or displays a third representation of the virtual object in a third user interface that includes a field of view of one or more cameras of the device. Enabling the performance of multiple different types of operations in response to an input (e.g., by changing a display property of a virtual object or displaying the virtual object in a third user interface) increases the efficiency with which the user is able to perform these operations, thereby enhancing the operability of the device, which, additionally, reduces power usage and improves battery life of the device by enabling the user to use the device more quickly and efficiently.

The device displays (902) a first representation of a virtual object (e.g., a graphical representation of a three-dimensional object, such as virtual chair 5020, virtual lamp 5084, shoes, furniture, hand tools, decorations, people, an emoji, a game character, virtual furniture, etc.) in a first user interface region (e.g., a two-dimensional graphic user interface or a portion thereof (e.g., a browsable list of furniture images, an image containing one or more selectable objects, etc.)) on the display 112. For example, the first user interface region is messaging user interface 5008 as shown in FIG. 6A. In some embodiments, the first user interface region includes a background other than an image of a physical environment surrounding the device (e.g., the background of the first user interface region is a preselected background color/pattern, or a background image that is distinct from an output image concurrently captured by the one or more cameras and distinct from live content in a field of view of the one or more cameras).

While displaying the first representation of the virtual object in the first user interface region on the display, the device detects (904) a first input by a first contact at a location on the touch-sensitive surface that corresponds to the first representation of the virtual object on the display (e.g., the first contact is detected on the first representation of the virtual object on a touch-screen display, or the first contact is detected on an affordance (e.g., toggle control 6018) that is concurrently displayed in the first user interface region with the first representation of the virtual object and that is configured to trigger display of an AR view (e.g., field of view 6036 of the camera(s)) and/or a staging user interface 6010 that includes a representation of the virtual object (e.g., virtual chair 5020) when invoked by the first contact). For example, the first input is an input by contact 6006 as described with regard to FIGS. 6E-6I.

In response to detecting the first input by the first contact and in accordance with a determination that the first input by the first contact meets first (e.g., staging-trigger) criteria, (e.g., the staging-trigger criteria are criteria configured to identify a swipe input, a touch-hold input, a press input, a tap input, touch down of a contact, initial movement of a contact, or another type of predefined input gesture that is associated with triggering the activation of the camera(s) and/or detection of field of view planes in a field of view of the camera(s)), the device displays (906) a second representation of the virtual object in a second user interface region that is different from the first user interface region (e.g., the second user interface region is a staging user interface 6010 that does not include the field of view of the camera(s) and that includes a simulated three-dimensional space in which a three-dimensional representation of the virtual object may be manipulated (e.g., rotated and moved) in response to user input). For example, in FIGS. 6E-6H, in accordance with a determination that an input by contact 6006 has a characteristic intensity that increases above a deep press intensity threshold ITS, virtual chair object 5020 is displayed in a staging user interface 6010 (e.g., as shown in FIG. 6I) that is distinct from the messaging user interface 5008 (e.g., as shown in FIG. 6E).

In some embodiments, in response to detecting the first input and in accordance with a determination that the first input meets the staging trigger criteria, the device displays a first animated transition that shows a three-dimensional representation of the virtual object being moved and reoriented from a first orientation as shown in the first user interface region (e.g., a first orientation of virtual chair 5020 as shown in messaging user interface 5008 in FIG. 6E) to a second orientation that is determined based on a virtual plane on the display that is oriented independent of a current orientation of device relative to the physical environment surrounding the device (e.g., a second orientation of virtual chair 5020 determined based on stage plane 6014, as shown in FIG. 6I). For example, the three-dimensional representation of the virtual object has a predefined orientation and/or distance from a plane (e.g., based on the shape and orientation of the virtual object as shown in the two-dimensional graphical user interface) and when transitioning to the staging view (e.g., staging user interface 6010), the three-dimensional representation is moved, resized, and reoriented from the original location of the virtual object on the display to a new location on the display (e.g., the center of the virtual stage 6014), and, during the movement or at the end of the movement, the three-dimensional representation is reoriented such that the virtual object is at a fixed angle relative to a predefined staging virtual plane 6014 which is defined independent of the physical environment surrounding the device.

While displaying the second representation of the virtual object in the second user interface region, the device detects (908) a second input (e.g., an input by contact 6034 as illustrated at FIGS. 6Q-6T). In some embodiments, detecting the second input includes detecting one or more second contacts at a location on the touch-screen corresponding to the second representation of the virtual object, detecting a second contact on an affordance that is configured to trigger display of an augmented reality view of the physical environment surrounding the device when invoked by the second contact, detecting movement of the second contact(s), and/or detecting lift-off of the second contact(s)). In some embodiments, the second input is a continuation of the first input by the same contact (e.g., the second input is an input by contact 6034 as illustrated at FIGS. 6Q-6T following the first input by contact 6006 as illustrated at FIGS. 6E-6I (e.g., with no liftoff of the contact)), or a separate input with a completely different contact (e.g., the second input is an input by contact 6034 as illustrated at FIGS. 6Q-6T following the first input by contact 6006 as illustrated at FIGS. 6E-6I (e.g., with a liftoff of the contact)), or a continuation of the input with an additional contact (e.g., the second input is the input by contact 6006 as illustrated at FIGS. 6J-6L following the first input by contact 6006 as illustrated at FIGS. 6E-6I). For example, the second input may be a continuation of a swipe input, a second tap input, a second press input, a press input that followed the first input, a second touch-hold input, a sustained touch that continues from the first input, etc.

In response to detecting the second input (910): in accordance with a determination that the second input corresponds to a request to manipulate the virtual object in the second user interface region (e.g., without transitioning to the augmented reality view), the device changes a display property of the second representation of the virtual object within the second user interface region based on the second input, and in accordance with a determination that the second input corresponds to a request to display the virtual object in an augmented reality environment, the device displays a third representation of the virtual object with a representation of a field of view of the one or more cameras (e.g., the device displays a third user interface that includes a field of view 6036 of the one or more cameras and places a three-dimensional representation of the virtual object (e.g., virtual chair 5020) on a virtual plane (e.g., floor surface 5038) detected within the field of view of the camera(s) that corresponds to a physical plane (e.g., the floor) in the physical environment 5002 surrounding the device).

In some embodiments, the second input that corresponds to a request to manipulate the virtual object in the second user interface region is a pinch or swipe by the second contact(s) at a location on the touch-sensitive surface that corresponds to the second representation of the virtual object in the second user interface region. For example, the second input is an input by contact 6006 as illustrated at FIGS. 6J-6L or an input by contacts 6026 and 6030 as illustrated at FIGS. 6N-6O.

In some embodiments, the second input that corresponds to a request to display the virtual object in an augmented reality environment is a tap input, a press input, or a touch-hold or press input followed by a drag input, at or from a location on the touch-sensitive surface that corresponds to the representation of the virtual object in the second user interface region. For example, the second input is a deep press input by contact 6034 as illustrated at FIGS. 6Q-6T.

In some embodiments, changing a display property of the second representation of the virtual object within the second user interface region based on the second input includes rotating about one or more axes (e.g., via vertical and/or horizontal swipe), resizing (e.g., pinch to resize), tilting about one or more axes (e.g., by tilting the device), changing a perspective (e.g., by moving the device horizontally, which in some embodiments is used for the analysis of the field of view of the one or more cameras to detect one or more field of view planes), and/or changing a color of the representation of the virtual object. For example, changing a display property of the second representation of the virtual object includes rotating the virtual chair 5020 in response to a horizontal swipe gesture by contact 6006 as illustrated in FIGS. 6J-6K, rotating the virtual chair 5020 in response to a diagonal swipe gesture by contact 6006 as illustrated in FIGS. 6K-6L, or increasing the size of virtual chair 5020 in response to a depinch gesture by contacts 6026 and 6030 as illustrated in FIGS. 6N-6O. In some embodiments, the amount by which the display property of the second representation of the virtual object is changed is correlated with an amount by which a property of the second input changes (e.g., distance or speed of movement by contact(s), intensity of contact, duration of contact etc.)

In some embodiments, in accordance with a determination that the second input corresponds to a request to display the virtual object in an augmented reality environment (e.g., in the field of view 6036 of the one or more cameras, as described with regard to FIG. 6T), the device displays a second animated transition that shows the three-dimensional representation of the virtual object being reoriented from the respective orientation relative to the virtual plane on the display (e.g., the orientation of virtual chair 5020 shown in FIG. 6R) to a third orientation that is determined based on the current orientation of the portion of the physical environment captured in the field of view of the one or more cameras (e.g., the orientation of virtual chair 5020 shown in FIG. 6T). For example, the three-dimensional representation of the virtual object is reoriented such that the three-dimensional representation of the virtual object is at a fixed angle relative to a predefined plane (e.g., floor surface 5038) identified in the live image of the physical environment 5002 (e.g., a physical surface, such as a vertical wall or horizontal floor surface that can support the three-dimensional representation of the virtual object) captured in the field of view of the camera(s). In some embodiments, the orientation of the virtual object in the augmented reality view is constrained by the orientation of the virtual object in the staging user interface in at least one aspect. For example, the rotational angle of the virtual object around at least one axis of a three-dimensional coordinate system is maintained when transitioning the virtual object from the staging user interface to the augmented reality view (e.g., as described with regard to FIGS. 6Q-6U, a rotation of virtual chair 5020 as described with regard to FIGS. 6J-6K is maintained). In some embodiments, a source of light cast on the representation of the virtual object in the second user interface region is a virtual light source. In some embodiments, the third representation of the virtual object in the third user interface region is illuminated by a real world light source (e.g., as detected in and/or determined from the field of view of the one or more cameras).

In some embodiments, the first criteria include (912) criteria that are satisfied when (e.g., in accordance with a determination that) the first input includes a tap input by the first contact at a location on the touch-sensitive surface that corresponds to a virtual object indicator 5022 (e.g., an indicator, such as an icon, displayed overlaying and/or adjacent to the representation of the virtual object on the display). For example, the virtual object indicator 5022 provides an indication that the virtual object to which it corresponds is viewable in a staging view (e.g., staging user interface 6010) and an augmented reality view (e.g., field of view 6036 of the camera(s)) (e.g., as described in greater detail below with reference to method 1000). Determining whether to display the second representation of the virtual object in the second user interface region, depending on whether the first input includes a tap input, enables the performance of multiple different types of operations in response to the first input. Enabling the performance of multiple different types of operations in response to an input increases the efficiency with which the user is able to perform these operations, thereby enhancing the operability of the device, which, additionally, reduces power usage and improves battery life of the device by enabling the user to use the device more quickly and efficiently.

In some embodiments, the first criteria include (914) criteria that are satisfied when (e.g., in accordance with a determination that) the first contact is maintained at the location on the touch-sensitive surface that corresponds to the first representation of the virtual object with less than a threshold amount of movement for at least a predefined threshold amount of time (e.g., a long press time threshold). For example, the first criteria are met by a touch-hold input. In some embodiments, the first criteria include a criterion that requires a movement of the first contact after the first contact has been maintained at the location on the touch-sensitive surface that corresponds to the representation of the virtual object with less than the threshold amount of movement for at least the predefined threshold amount of time, in order for the criterion to be met. For example, the first criteria are met by a touch-hold input followed by a drag input. Determining whether to display the second representation of the virtual object in the second user interface region, depending on whether the contact is maintained at a location on a touch-sensitive surface that corresponds to the representation of the virtual object with less than a threshold amount of movement for at least a predefined amount of time, enables the performance of multiple different types of operations in response to the first input. Enabling the performance of multiple different types of operations in response to an input increases the efficiency with which the user is able to perform these operations, thereby enhancing the operability of the device, which, additionally, reduces power usage and improves battery life of the device by enabling the user to use the device more quickly and efficiently.

In some embodiments, the first criteria include (916) criteria that are satisfied when (e.g., in accordance with a determination that) a characteristic intensity of the first contact increases above a first intensity threshold (e.g., a deep press intensity threshold $IT_D$). For example, as described with regard to FIGS. 6Q-6T, criteria are satisfied when a characteristic intensity of the contact 6034 increases above deep press intensity threshold ITS, as indicated by intensity level meter 5028. In some embodiments, in accordance with a determination that the contact satisfies criteria for recognizing another type of gesture (e.g., a tap), the device performs another predefined function other than triggering the second (e.g., staging) user interface while maintaining display of the virtual object. In some embodiments, the first criteria require that the first input is not a tap input (e.g., a hard tap input with an intensity reaching above the threshold intensity before lift-off of the contact is detected within a tap time threshold of initial touch-down of the contact). In some embodiments, the first criteria include a criterion that requires a movement of the first contact after the intensity of the first contact has exceeded the first intensity threshold, in order for the criterion to be met. For example, the first criteria are met by a press input followed by a drag input. Determining whether to display the virtual object in a second user interface region, depending on whether a characteristic intensity of a contact increases above a first intensity threshold, enables the performance of multiple different types of operations in response to the first input. Enabling the performance of multiple different types of operations in response to an input increases the efficiency with which the user is able to perform these operations, thereby enhancing the operability of the device, which, additionally, reduces power usage and improves battery life of the device by enabling the user to use the device more quickly and efficiently.

In some embodiments, in response to detecting the first input by the first contact and in accordance with a determination that the first input by the first contact meets second criteria (e.g., interface-scroll criteria), wherein the second criteria require that the first input includes movement of the first contact in a direction across the touch-sensitive surface for more than a threshold distance (e.g., the second criteria are met by a swipe gesture, such as a vertical swipe or horizontal gesture), the device scrolls (918) the first user interface region (and the representation of the virtual object) in a direction that corresponds to the direction of movement of the first contact (e.g., the first criteria are not met and displaying the representation of the virtual object in the second user interface region is forgone). For example, as described with regard to FIGS. 6B-6C, an upward vertical swipe gesture by contact 6002 causes the messaging user interface 5008 and the virtual chair 5020 to scroll upward. In some embodiments, the first criteria also require that the first input includes movement of the first contact for more than a threshold distance in order for the first criteria to be met, and the device determines whether the first input meets the first criteria (e.g., staging-trigger criteria) or the second criteria (e.g., interface-scrolling criteria) based on whether an initial portion of the first input meets object-selection criteria (e.g., a touch-hold or press on the representation of the virtual object). In some embodiments, the second criteria are met by a swipe input that is initiated at a touch-location outside of the location of the virtual object and the AR icon of the virtual object). Determining whether to scroll the first user interface region in response to the first input, depending on whether the first input meets the second criteria, enables the performance of multiple different types of operations in response to the first input. Enabling the performance of multiple different types of operations in response to an input increases the efficiency with which the user is able to perform these operations, thereby enhancing the operability of the device, which, additionally, reduces power usage and improves battery life of the device by enabling the user to use the device more quickly and efficiently.

In some embodiments, in response to detecting the first input by the first contact and in accordance with a determination that the first input by the first contact meets third (e.g., AR-trigger) criteria, the device displays (920) the third representation of the virtual object with the representation of the field of view of the one or more cameras. For example, as described with regard to FIGS. 6AD-6AG, a long touch input by contact 6044 followed by an upward drag input by contact 6044 that drags virtual chair 5020 causes the virtual chair 5020 to be displayed with the field of view 6036 of the camera(s).

In some embodiments, the third criteria include, e.g., criteria that are satisfied in accordance with a determination that: the one or more cameras are in an active state, the device orientation falls within a defined range (e.g., from a defined origin orientation, a defined angle of rotation about one or more axes), the input by the contact includes a selection input (e.g., a long touch) followed by a drag input (movement of the contact that moves the virtual object on the display (e.g., to within a predetermined distance from the edge of the display), the characteristic intensity of the contact increases above an AR-trigger intensity threshold (e.g., a light-press threshold $IT_L$ or a deep-press threshold $IT_D$), a duration of the contact increases above an AR-trigger duration threshold (e.g., a long press threshold), and/or a distance traversed by the contact increases above an AR-trigger distance threshold (e.g., a long swipe threshold). In some embodiments, a control (e.g., toggle control 6018) for displaying the representation of the virtual object in the second user interface region (e.g., staging user interface 6010) is displayed in the user interface (e.g., the third user interface region that replaces at least a portion of the second user interface region) that includes the representation of the virtual object and the field of view 6036 of the one or more cameras.

In some embodiments, when transitioning directly from the first user interface region (e.g., the non-AR, non-staging, touch-screen UI view) to the third user interface region (e.g., the augmented reality view), the device displays an animated transition that shows the three-dimensional representation of the virtual object being reoriented from the respective orientation represented in the touch-screen UI (e.g., the non-AR, non-staging view) on the display to an orientation that is predefined relative to the current orientation of the portion of the physical environment captured in the field of view of the one or more cameras. For example, as shown in FIGS. 6AD-6AJ, when transitioning directly from a first user interface region (e.g., messaging user interface 5008, as shown in FIG. 6AD) to the third user interface region (e.g., the augmented reality user interface that includes the field of view 6036 of the camera(s), as shown in FIG. 6AJ), virtual chair 5020 changes from a first orientation as shown in FIGS. 6AD-6AH to a predefined orientation relative to floor surface 5038 in physical environment 5002 as captured in the field of view 6036 of the camera(s) (e.g., as shown in FIG. 6AJ). For example, the three-dimensional representation of the virtual object is reoriented such that the three-dimensional representation of the virtual object is at a fixed angle relative to a predefined plane identified in the live images of the physical environment 5002 (e.g., a physical surface, such as a vertical wall or horizontal floor surface (e.g., floor surface 5038) that can support the three-dimensional representation of the virtual object). Determining whether to display the third representation of the virtual object with the field of view of the camera(s) in response to the first input, depending on whether the first input meets third criteria, enables the performance of multiple different types of operations in response to the first input. Enabling the performance of multiple different types of operations in response to an input increases the efficiency with which the user is able to perform these operations, thereby enhancing the operability of the device, which, additionally, reduces power usage and improves battery life of the device by enabling the user to use the device more quickly and efficiently.

In some embodiments, in response to detecting the first input by the first contact, the device determines (922), by the one or more device orientation sensors, a current device orientation of the device (e.g., an orientation relative to the physical environment surrounding the device) and the third criteria (e.g., AR trigger criteria) require that the current device orientation be within a first range of orientations in order for the third criteria to be met (e.g., the second criteria met when the angle between the device and the ground is below a threshold angle, indicating that the device is sufficiently parallel to the ground (to bypass the interstitial state)). In some embodiments, the first criteria (e.g., staging trigger criteria) require that the current device orientation be within a second range of orientations in order for the first criteria to be met (e.g., the first criteria are met when the angle between the device and the ground is within a threshold value to 90 degrees, indicating that the device sufficiently upright relative to the ground to go to the interstitial state first. Determining whether to display the third representation of the virtual object with a field of view of the camera(s) in response to the first input, depending on whether the device orientation is within a range of orientations, enables the performance of multiple different types of operations in response to the first input. Enabling the performance of multiple different types of operations in response to an input increases the efficiency with which the user is able to perform these operations, thereby enhancing the operability of the device, which, additionally, reduces power usage and improves battery life of the device by enabling the user to use the device more quickly and efficiently.

In some embodiments, at least one display property (e.g., size, shape, respective angles around the yaw, pitch, and roll axes, etc.) of the second representation of the virtual object is applied (924) to the third representation of the virtual object. For example, as described with regard to FIGS. 6Q-6U, a rotation of the second representation of virtual chair 5020 applied in the staging user interface 6010, as described with regard to FIGS. 6J-6K, is maintained when the third representation of the virtual chair 5020 is displayed in the augmented reality view that includes the field of view 6036 of the camera(s) (e.g., as shown in FIG. 6U). In some embodiments, the orientation of the virtual object in the augmented reality view is constrained by the orientation of the virtual object in the staging user interface in at least one aspect. For example, the rotational angle of the virtual object around at least one axis (e.g., yaw, pitch, or roll axis) of a predefined three-dimensional coordinate system is maintained when transitioning the virtual object from the staging view to the augmented reality view. In some embodiments, the at least one display property of the second representation of the virtual object is only applied to the third representation of the virtual object if the second representation of the virtual object has been manipulated in some way (e.g., changed in size, shape, texture, orientation, etc.) by user input. In other words, the changes made in the staging view is maintained when the object is shown in the augmented reality view or used to constrain the appearance of the object in the augmented reality view in one or more ways. Applying at least one display property of the second representation of the virtual object to the third representation of the virtual object (e.g., without requiring further user input to apply the same display property to the second representation of the virtual object and the third representation of the virtual object) enhances the operability of the device (e.g., by allowing the user to apply a rotation to the second virtual object while a large version of the virtual object is displayed in the second user interface and applying the rotation to the third representation of the virtual object displayed with the representation of the field of view of the one or more cameras), which, additionally, reduces power usage and improves battery life of the device by enabling the user to use the device more quickly and efficiently.

In some embodiments, in response to detecting at least an initial portion of the first input by the first contact (926) (e.g., including detecting the first contact, or detecting an input by the first contact that meets respective predefined criteria without meeting the first criteria, or detecting an input that meets the first criteria): the device activates the one or more cameras (e.g., activating the camera(s) without immediately displaying the field of view of the camera(s) on the display) and the device analyzes the field of view of the one or more cameras to detect one or more planes in the field of view of the one or more cameras. In some embodiments, displaying the field of view 6036 of the one or more cameras is delayed after activating the one or more cameras (e.g., until the second input that corresponds to the request to display the virtual object in an augmented reality environment is detected, until at least one field of view plane is detected, or until a field of view plane that corresponds to an anchor plane defined for the virtual object is detected). In some embodiments, the field of view 6036 of the one or more cameras is displayed at a time that corresponds to (e.g., at the same time as) activation of the one or more cameras. In some embodiments, the field of view 6036 of the one or more cameras is displayed before a plane is detected in the field of view of the one or more cameras (e.g., the field of view of the one or more cameras is displayed in response to detecting the first input by the contact and in accordance with the determination). Activating the camera(s) and analyzing the field of view of the camera(s) to detect one or more field of view planes in response to detecting an initial portion of the first input (e.g., prior to displaying the third representation of the virtual object with the representation of the field of view of the one or more cameras) enhances the efficiency of the device (e.g., by reducing the amount of time required to determine a position and/or orientation of the third representation of the virtual object relative to a respective plane in the field of view of the camera(s)) which, additionally, reduces power usage and improves battery life of the device by enabling the user to use the device more quickly and efficiently.

In some embodiments, in response to detecting a respective plane (e.g., floor surface 5038) in the field of view of the one or more cameras, the device outputs (928), with one or more tactile output generators 167, a tactile output to indicate the detection of a respective plane in the field of view of the one or more cameras. In some embodiments, the field of view 6036 can be shown before the field of view plane is identified. In some embodiments, additional user interface controls and/or icons are overlaid on the real-world image in the field of view after at least one field of view plane is detected or after all of the field of view planes are identified. Outputting a tactile output to indicate detection of a plane in a field of view of the camera(s) provides the user with feedback to indicate that the plane has been detected. Providing improved tactile feedback enhances the operability of the device (e.g., by helping the user to provide proper inputs and reducing unnecessary additional inputs for placing the virtual object), which, additionally, reduces power usage and improves battery life of the device by enabling the user to use the device more quickly and efficiently.

In some embodiments, a size of the third representation of the virtual object on the display is determined (930) based on a simulated real-world size of the virtual object and a distance between the one or more cameras and a location in the field of view 6036 of the one or more cameras with which the third representation of the virtual object (e.g., virtual chair 5020) has a fixed spatial relationship (e.g., a plane, such as floor surface 5038, to which the virtual object is attached). In some embodiments, the size of the third representation of the virtual object is constrained such that the scale of the size of the third representation of the virtual object relative to the field of view of the one or more cameras is maintained. In some embodiments, one or more physical dimension parameters (e.g., length, width, depth, and/or radius) are defined for a virtual object. In some embodiments, in the second user interface (e.g., the staging user interface), the virtual object is unconstrained by its defined physical dimension parameters (e.g., the size of the virtual object is changeable in response to user input). In some embodiments, the third representation of the virtual object is constrained by its defined dimension parameters. When user input is detected to change the location of the virtual object in the augmented reality view relative to the physical environment represented in the field of view, or when user input is detected to change the zoom level of the field of view, or when user input is detected to move relative to the physical environment surrounding the device, the appearance of the virtual object (e.g., size, viewing perspective) will change in a manner that is constrained by a fixed spatial relationship between the virtual object and the physical environment (e.g., as represented by the fixed spatial relationship between the anchor plane of the virtual object and the in the augmented reality environment) and a fixed scale based on predefined dimensional parameters of the virtual object and the actual dimensions of the physical environment. Determining a size of the third representation of the virtual object based on a simulated real-world size of the virtual object and a distance between the one or more cameras and a location in the field of view of the camera(s) (e.g., without requiring further user input to resize the third representation of the virtual object to simulate a real-world size of the virtual object) enhances the operability of the device, which, additionally, reduces power usage and improves battery life of the device by enabling the user to use the device more quickly and efficiently.

In some embodiments, the second input that corresponds to the request to display the virtual object in an augmented reality environment includes (932) an input that (selects and) drags the second representation of the virtual object (e.g., by a distance that increases above a distance threshold, beyond a defined boundary and/or to a location that is within a threshold distance of an edge (e.g., bottom edge, top edge, and or side edge) of the display or the second user interface region). Displaying the third representation of the virtual object with the representation of the field of view of the camera(s) in response to detecting the second input that corresponds to the request to display the virtual object in an augmented reality environment provides additional control options without cluttering the second user interface with additional displayed controls (e.g., controls for displaying the augmented reality environment from the second user interface). Providing additional control options without cluttering the second user interface with additional displayed controls enhances the operability of the device, which, additionally, reduces power usage and improves battery life of the device by enabling the user to use the device more quickly and efficiently.

In some embodiments, while displaying the second representation of the virtual object in the second user interface region (e.g., staging user interface 6010 as shown in FIG. 6Z), the device detects (934) a fourth input that meets respective criteria for redisplaying the first user interface region (e.g., a tap, hard press, or touch-hold and drag input a location on the touch-sensitive surface that corresponds to the second representation of the virtual object or another location on the touch-sensitive surface (e.g., a bottom or edge of the second user interface region), and/or an input at a location on the touch-sensitive surface that corresponds to a control for returning to the first user interface region), and, in response to detecting the fourth input, the device ceases to display the second representation of the virtual object in the second user interface region and the device redisplays the first representation of the virtual object in the first user interface region. For example, as shown in FIGS. 6Z-6AC, in response to an input by contact 6042 at a location that corresponds to back control 6016 displayed in staging user interface 6010, the device ceases to display the second representation of virtual chair 5020 in the second user interface region (e.g., staging user interface 6010) and the device redisplays the first representation of the virtual chair 5020 in the first user interface region (e.g., messaging user interface 5008). In some embodiments, the first representation of the virtual object is displayed in the first user interface region with the same appearance, location, and/or orientation as those shown before the transition to the staging view and/or the augmented reality view. For example, in FIG. 6AC, virtual chair 5020 is displayed in messaging user interface 5008 with the same orientation as virtual chair 5020 displayed in the messaging user interface 5008 in FIG. 6A. In some embodiments, the device continuously displays the virtual object on the screen when transitioning back to displaying the virtual object in the first user interface region. For example, in FIGS. 6Y-6C, virtual chair 5020 is continuously displayed during the transition from displaying staging user interface 6010 to displaying messaging user interface 5008. Determining whether to redisplay the first representation of the virtual object in the first user interface depending on whether a fourth input detected while displaying the second representation of the virtual object in the second user interface meets criteria for redisplaying the first user interface enables the performance of multiple different types of operations in response to the fourth input. Enabling the performance of multiple different types of operations in response to an input increases the efficiency with which the user is able to perform these operations, thereby enhancing the operability of the device, which, additionally, reduces power usage and improves battery life of the device by enabling the user to use the device more quickly and efficiently.

In some embodiments, while displaying the third representation of the virtual object with the representation of the field of view 5036 of the one or more cameras (e.g., as shown in FIG. 6U), the device detects (936) a fifth input that meets respective criteria for redisplaying the second user interface region (e.g., a tap, hard press, or touch and drag input a location on the touch-sensitive surface that corresponds to the third representation of the virtual object or another location on the touch-sensitive surface, and/or an input at a location on the touch-sensitive surface that corresponds to a control for returning to displaying the second user interface region), and, in response to detecting the fifth input, the device ceases to display the third representation of the virtual object and the representation of the field of view of the one or more cameras and redisplays the second representation of the virtual object in the second user interface region. For example, as shown in FIGS. 6V-6Y, in response to an input by contact 6040 at a location that corresponds to toggle control 6018 displayed in the third user interface that includes the field of view 6036 of the camera(s), the device ceases to display the field of view 6036 of the camera(s) and redisplays the staging user interface 6010. In some embodiments, the second representation of the virtual object is displayed in the second user interface region with the same orientation as that shown in the augmented reality view. In some embodiments, the device continuously displays the virtual object on the screen when transitioning back to displaying the virtual object in the second user interface region. For example, in FIGS. 6V-6Y, virtual chair 5020 is continuously displayed during the transition from displaying field of view 6036 of the camera(s) to displaying staging user interface 6010. Determining whether to redisplay the second representation of the virtual object in the second user interface, depending on whether a fifth input detected while displaying the third representation of the virtual object with the field of view of the camera(s) meets criteria for redisplaying the second user interface, enables the performance of multiple different types of operations in response to the fifth input. Enabling the performance of multiple different types of operations in response to an input increases the efficiency with which the user is able to perform these operations, thereby enhancing the operability of the device, which, additionally, reduces power usage and improves battery life of the device by enabling the user to use the device more quickly and efficiently.

In some embodiments, while displaying the third representation of the virtual object with the representation 6036 of the field of view of the one or more cameras, the device detects (938) a sixth input that meets respective criteria for redisplaying the first user interface region (e.g., messaging user interface 5008), and, in response to detecting the sixth input, the device ceases to display the third representation of the virtual object (e.g., virtual chair 5020) and the representation of the field of view 6036 of the one or more cameras (e.g., as shown in FIG. 6U) and the device redisplays the first representation of the virtual object in the first user interface region (e.g., as shown in FIG. 6AC). In some embodiments, the sixth input is, e.g., a tap, hard press, or touch and drag input a location on the touch-sensitive surface that corresponds to the representation of the third representation of the virtual object or another location on the touch-sensitive surface, and/or an input at a location on the touch-sensitive surface that corresponds to a control for returning to displaying the first user interface region. In some embodiments, the first representation of the virtual object is displayed in the first user interface region with the same appearance and location as those shown before the transition to the staging view and/or the augmented reality view. In some embodiments, the device continuously displays the virtual object on the screen when transitioning back to displaying the virtual object in the first user interface region. Determining whether to redisplay the first representation of the virtual object in the first user interface, depending on whether a sixth input detected while displaying the third representation of the virtual object with the field of view of the camera(s) meets criteria for redisplaying the first user interface, enables the performance of multiple different types of operations in response to the sixth input. Enabling the performance of multiple different types of operations in response to an input increases the efficiency with which the user is able to perform these operations, thereby enhancing the operability of the device, which, additionally, reduces power usage and improves battery life of the device by enabling the user to use the device more quickly and efficiently.

In some embodiments, in response to detecting the first input by the first contact and in accordance with a determination that the input by the first contact meets the first criteria, the device continuously displays (940) the virtual object when transitioning from displaying the first user interface region (e.g., messaging user interface 5008) to displaying the second user interface region (e.g., staging user interface 6010), including displaying an animation (e.g., movement, rotation about one or more axes, and/or scaling) of the first representation of the virtual object in the first user interface region transforming into the second representation of the virtual object in the second user interface region. For example, in FIGS. 6E-6I, virtual chair 5020 is continuously displayed and animated (e.g., the orientation of virtual chair 5020 changes) during the transition from displaying messaging user interface 5008 to displaying staging user interface 6010. In some embodiments, the virtual object has a defined orientation, position, and/or distance relative to a plane in the field of view of the camera(s) (e.g., that is defined based on the shape and orientation of the first representation of the virtual object as shown in the first user interface region) and, when transitioning to the second user interface region, the first representation of the virtual object moves, resizes, and/or reorients to the second representation of the virtual object at new location on the display (e.g., the center of a virtual staging plane in the second user interface region), and during the movement or at the end of the movement, the virtual object is reoriented such that the virtual object is at a predetermined angle relative the predefined virtual staging plane which is defined independent of the physical environment surrounding the device. Displaying an animation as the first representation of the virtual object in the first user interface transforms into the second representation of the virtual object in the second user interface provides the user with feedback to indicate that the first input meets the first criteria. Providing improved feedback enhances the operability of the device (e.g., by helping the user to provide proper inputs and reducing user mistakes when operating/interacting with the device), which, additionally, reduces power usage and improves battery life of the device by enabling the user to use the device more quickly and efficiently.

In some embodiments, in response to detecting the second input by the second contact and in accordance with a determination that the second input by the second contact corresponds to the request to display the virtual object in the augmented reality environment, the device continuously displays (942) the virtual object when transitioning from displaying the second user interface region (e.g., staging user interface 6010) to displaying a third user interface region including the field of view 6036 of the one or more cameras, including displaying an animation (e.g., movement, rotation about one or more axes, and/or scaling) of the second representation of the virtual object in the second user interface region transforming into the third representation of the virtual object in the third user interface region including the field of view of the one or more cameras. For example, in FIGS. 6Q-6U, virtual chair 5020 is continuously displayed and animated (e.g., the position and size of virtual chair 5020 changes) during the transition from displaying staging user interface 6010 to displaying the field of view 6036 of the camera(s). In some embodiments, the virtual object is reoriented such that the virtual object is at a predefined orientation, position, and/or distance relative to a field of view plane detected in the field of view of the one or more cameras (e.g., a physical surface, such as a vertical wall or horizontal floor surface that can support the three-dimensional representation of the user interface object). Displaying an animation as the second representation of the virtual object in the second user interface transforms into the third representation of the virtual object in the third user interface provides the user with feedback to indicate that the second input corresponds to the request to display the virtual object in the augmented reality environment. Providing improved visual feedback to the user enhances the operability of the device (e.g., by helping the user to provide proper inputs and reducing user mistakes when operating/interacting with the device), which, additionally, reduces power usage and improves battery life of the device by enabling the user to use the device more quickly and efficiently.

It should be understood that the particular order in which the operations in FIGS. 9A-9D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800, 900, 16000, 17000, 18000, 19000, and 20000) are also applicable in an analogous manner to method 900 described above with respect to FIGS. 9A-9D. For example, contacts, inputs, virtual objects, user interface regions, intensity thresholds, fields of view, tactile outputs, movements, and/or animations described above with reference to method 900 optionally have one or more of the characteristics of the contacts, inputs, virtual objects, user interface regions, intensity thresholds, fields of view, tactile outputs, movements, and/or animations described herein with reference to other methods described herein (e.g., methods 800, 900, 16000, 17000, 18000, 19000, and 20000). For brevity, these details are not repeated here.

FIGS. 10A-10D are flow diagrams illustrating method 1000 of displaying an item with a visual indication to indicate that the item corresponds to a virtual three-dimensional object, in accordance with some embodiments. Method 1000 is performed at an electronic device (e.g., device 300, FIG. 3, or portable multifunction device 100, FIG. 1A) having a display and a touch-sensitive surface (e.g., a touch-screen display that serves both as the display and the touch-sensitive surface). In some embodiments, the display is a touch-screen display and the touch-sensitive surface is on or integrated with the display. In some embodiments, the display is separate from the touch-sensitive surface. Some operations in method 1000 are, optionally, combined and/or the order of some operations is, optionally, changed.

As described below, method 1000 relates to displaying items in first and second user interfaces. Each item is displayed either with a visual indication to indicate that the item corresponds to a virtual three-dimensional object or without the visual indication, depending on whether an item corresponds to a respective virtual three-dimensional object. Providing an indication to the user of whether an item is a virtual three-dimensional object increases the efficiency with which the user is able to perform operations on the first item (e.g., by helping the user to provide appropriate inputs depending on whether the item is or is not a virtual three-dimensional object), thereby enhancing the operability of the device, which, additionally, reduces power usage and improves battery life of the device by enabling the user to use the device more quickly and efficiently.

The device receives (1002) a request to display a first user interface that includes a first item (e.g., an icon, a thumbnail image, an image, an emoji, an attachment, a sticker, an app icon, an avatar, etc.). For example, in some embodiments, the request is an input (e.g., as described with regard to FIG. 7A) for opening a user interface (e.g. Internet browser user interface 5060, as illustrated at FIG. 7B) for displaying a representation of the first item in a predefined environment associated with the first item. The predefined environment is, optionally, a user interface of an application (e.g., an email application, a messaging application, a browser application, a word processing application, a e-reader application, etc.) or a system user interface (e.g., a lock screen, a notification interface, a suggestion interface, a control panel user interface, a home screen user interface, etc.).

In response to the request to display the first user interface, the device displays (1004) the first user interface (e.g. Internet browser user interface 5060, as illustrated at FIG. 7B) with a representation of the first item. In accordance with a determination that the first item corresponds to a respective virtual three-dimensional object, the device displays the representation of the first item with a visual indication to indicate that the first item corresponds to a first respective virtual three-dimensional object (e.g., an image, such as an icon and/or background panel, displayed at a location that corresponds to the representation of the first item; an outline; and/or text). In accordance with a determination that the first item does not correspond to a respective virtual three-dimensional object, the device displays the representation of the first item without the visual indication. For example, in Internet browser user interface 5060, as illustrated at FIG. 7B, web object 5068 (including a representation of virtual three-dimensional lamp object 5084) is displayed with a visual indication (virtual object indicator 5080) to indicate that virtual lamp 8084 is a virtual three-dimensional object and web object 5074 is displayed without a visual object indicator because web object 5074 does not include an item that corresponds to a virtual three-dimensional object.

After displaying the representation of the first item, the device receives (1006) a request (e.g., an input as described with regard to FIGS. 7H-7L) to display a second user interface (e.g., messaging user interface 5008, as illustrated at FIG. 7M) that includes a second item (e.g., an icon, a thumbnail image, an image, an emoji, an attachment, a sticker, an app icon, an avatar, etc.). The second item is distinct from the first item and the second user interface is distinct from the first user interface. For example, in some embodiments, the request is another input for opening a user interface for displaying a representation of the second item in a predefined environment associated with the second item. The predefined environment is, optionally, a user interface of an application other than the application used for showing the first item (e.g., an email application, a messaging application, a browser application, a word processing application, a e-reader application, etc.) or in a system user interface other than the system user interface used for showing the first item (e.g., a lock screen, a notification interface, a suggestion interface, a control panel user interface, a home screen user interface, etc.

In response to the request to display the second user interface, the device displays (1008) the second user interface (e.g., messaging user interface 5008, as illustrated at FIG. 7M) with a representation of the second item. In accordance with a determination that the second item corresponds to a respective virtual three-dimensional object, the device displays the representation of the second item with the visual indication (e.g., the same visual indication that indicates that the first item corresponds to a virtual three-dimensional object) to indicate that the second item corresponds to a second respective virtual three-dimensional object. In accordance with a determination that the second item does not correspond to a respective virtual three-dimensional object, the device displays the representation of the second item without the visual indication. For example, in messaging user interface 5008, as illustrated at FIG. 7M, virtual three-dimensional chair object 5020 is displayed with a visual indication (virtual object indicator 5022) to indicate that virtual chair 5020 is a virtual three-dimensional object, and emoji 7020 is displayed without a visual object indicator because emoji 7020 does not include an item that corresponds to a virtual three-dimensional object.

In some embodiments, displaying the representation of the first item (e.g., virtual lamp 5084) with the visual indication (e.g., virtual object indicator 5080) to indicate that the first item corresponds to a first respective virtual three-dimensional object includes (1010): in response to detecting a movement of the device that results in a change from a first device orientation to a second device orientation (e.g., as detected by orientation sensors (e.g., one or more accelerometers 168 of the device 100), displaying movement of the first item (e.g., tilting of the first item and/or movement of the first item relative to the first user interface) that corresponds to the change from the first device orientation to the second device orientation. For example, the first device orientation is an orientation of device 100 as illustrated in FIG. 7F1 and the second device orientation is an orientation of device 100 as illustrated in FIG. 7G1. In response to the movement illustrated in FIG. 7F1 to FIG. 7G1, a first item (e.g., virtual lamp 5084) tilts (e.g., as illustrated at FIG. 7F2 to FIG. 7G2). In some embodiments, if the second object corresponds to a virtual three-dimensional object, the second object also responds to detecting movement of the device in the manner described above (e.g., to indicate that the second object also corresponds to a virtual three-dimensional object).

Displaying movement of the first item that corresponds to the change from the first device orientation to the second device orientation provides visual feedback to the user indicating behavior of the virtual three-dimensional object. Providing improved visual feedback to the user enhances the operability of the device (e.g., by allowing the user to view the virtual three-dimensional object from orientations without needing to provide further input), which, additionally, reduces power usage and improves battery life of the device by enabling the user to use the device more quickly and efficiently.

In some embodiments, displaying the representation of the first item with the visual indication to indicate that the first item corresponds to a first respective virtual three-dimensional object includes (1012): in response to detecting a first input by a first contact (e.g., a swipe input on the first user interface in a first direction, or a touch-hold input on a scroll button on an end of a scroll bar) that scrolls the first user interface while the representation of the first item is displayed in the first user interface: the device translates the representation of the first item on the display in accordance with scrolling of the first user interface (e.g., moving an anchor position of the first item by a distance based on the amount of scrolling made to the first user interface and in a direction opposite of the scrolling (e.g., when the first user interface is dragged upward by a contact moving across the touch-sensitive surface, the representation of the first item moves upward on the display with the first user interface)) and the device rotates the representation of the first item relative to a plane defined by the first user interface (or the display) in accordance with a direction in which the first user interface is scrolled. For example, as illustrated in FIGS. 7C-7D, in response to detecting an input by contact 7002 that scrolls Internet browser user interface 5060 while a representation of virtual lamp 5084 is displayed in Internet browser user interface 5060, virtual lamp 5084 is translated in accordance with the scrolling of Internet browser user interface 5060 and virtual lamp 5084 is rotates relative to display 112 in accordance with a direction of the path of movement of contact 7002. In some embodiments, in accordance with a determination that the first user interface is dragged upward, the representation of the first item moves upward with the first user interface, and the viewing perspective of the first item as shown on the first user interface changes as if the user is looking at the first item from a different viewing angle (e.g., a lower angle). In some embodiments, in accordance with a determination that the second user interface is dragged upward, the representation of the second item moves upward with the second user interface, and the viewing perspective of the second item as shown on the second user interface changes as if the user is looking at the second item from a different viewing angle (e.g., a lower angle).

Displaying movement of an item, where the movement corresponds to a change from a first device orientation to a second device orientation, provides visual feedback to the user indicating the change in device orientation. Providing improved visual feedback to the user enhances the operability of the device (e.g., by allowing the user to view the virtual three-dimensional object from orientations without needing to provide further input), which, additionally, reduces power usage and improves battery life of the device by enabling the user to use the device more quickly and efficiently.

In some embodiments, while displaying the representation of the first item (e.g., lamp object 5084) with the visual indication (e.g., visual object indicator 5080) in the first user interface (e.g., Internet browser user interface 5060, as illustrated at FIG. 7B), the device displays (1014) a representation of a third item, wherein the representation of the third item is displayed without the visual indication in order to indicate that the third item does not correspond to a virtual three-dimensional object (e.g., the third item does not correspond to any three-dimensional object that can be rendered in an augmented reality environment). For example, in Internet browser user interface 5060, as illustrated at FIG. 7B, web objects 5074, 5070, and 5076 are displayed without visual object indicators because web objects 5074, 5070, and 5076 do not correspond to virtual three-dimensional objects.

Displaying, in the first user interface, a first item with a visual indication to indicate that the first item is a virtual three-dimensional object and a third item that is displayed without the visual indication increases the efficiency with which the user is able to perform operations using the first user interface (e.g., by helping the user to provide appropriate inputs depending on whether an item with which the user is interacting is or is not a virtual three-dimensional object), thereby enhancing the operability of the device, which, additionally, reduces power usage and improves battery life of the device by enabling the user to use the device more quickly and efficiently.

In some embodiments, while displaying the representation of the second item (e.g., virtual chair 5020) with the visual indication (e.g., virtual object indicator 5022) in the second user interface (e.g., messaging user interface 5008, as illustrated in FIG. 7M), the device displays (1016) a representation of a fourth item (e.g., emoji 7020), wherein the representation of the fourth item is displayed without the visual indication in order to indicate that the fourth item does not correspond to a respective virtual three-dimensional object.

Displaying, in the second user interface, a second item with a visual indication to indicate that the second item is a virtual three-dimensional object and a fourth item that is displayed without the visual indication increases the efficiency with which the user is able to perform operations using the second user interface (e.g., by helping the user to provide appropriate inputs depending on whether an item with which the user is interacting is or is not a virtual three-dimensional object), thereby enhancing the operability of the device, which, additionally, reduces power usage and improves battery life of the device by enabling the user to use the device more quickly and efficiently.

In some embodiments (1018), the first user interface (e.g., Internet browser user interface 5060, as illustrated at FIG. 7B) corresponds to a first application (e.g., an Internet browser application), the second user interface (e.g., messaging user interface 5008, as illustrated in FIG. 7M) corresponds to a second application (e.g., a messaging application) that is distinct from the first application, and the representation of the first item (e.g., lamp object 5084) displayed with the visual indication e.g., virtual object indicator 5080) and the representation of the second item (e.g., virtual chair 5020) displayed with the visual indication (e.g., virtual object indicator 5022) share a predefined set of visual characteristics and/or behavioral characteristics (e.g., uses the same indicator icon, have the same texture or rendering style, and/or behavior when invoked by a predefined type of inputs). For example, the icons for virtual object indicator 5080 and virtual object indicator 5022 include the same symbol.

Displaying the first item with the visual indication in the first user interface of a first application and displaying the second item with the visual indication in the second user interface of a second application such that the visual indications of the first item and the second item share a predefined set of visual characteristics and/or behavioral characteristics increases the efficiency with which the user is able to perform operations using the second user interface (e.g., by helping the user to provide appropriate inputs depending on whether an item with which the user is interacting is or is not a virtual three-dimensional object), thereby enhancing the operability of the device, which, additionally, reduces power usage and improves battery life of the device by enabling the user to use the device more quickly and efficiently.

In some embodiments, the first user interface is (1020) an Internet browser application user interface (e.g., Internet browser user interface 5060, as illustrated at FIG. 7B) and the first item is an element of a web page (e.g., the first item is represented in the webpage as an embedded image, a hyperlink, an applet, an emoji, an embedded media object, etc.). For example, the first item is virtual lamp object 5084 of web object 5068.

Displaying a web page element with a visual indication indicating that the web page element is a virtual three-dimensional object increases the efficiency with which the user is able to perform operations using an Internet browser application (e.g., by helping the user to provide appropriate inputs depending on whether a web page element with which the user is interacting is or is not a virtual three-dimensional object), thereby enhancing the operability of the device, which, additionally, reduces power usage and improves battery life of the device by enabling the user to use the device more quickly and efficiently.

In some embodiments, the first user interface is (1022) an e-mail application user interface (e.g., e-mail user interface 7052, as illustrated in FIG. 7P) and the first item is an attachment (e.g., attachment 7060) to an e-mail.

Displaying an e-mail attachment with a visual indication indicating that the e-mail attachment is a virtual three-dimensional object increases the efficiency with which the user is able to perform operations using an e-mail application user interface (e.g., by helping the user to provide appropriate inputs depending on whether an e-mail attachment with which the user is interacting is or is not a virtual three-dimensional object), thereby enhancing the operability of the device, which, additionally, reduces power usage and improves battery life of the device by enabling the user to use the device more quickly and efficiently.

In some embodiments, the first user interface is (1024) a messaging application user interface (e.g., messaging user interface 5008, as illustrated in FIG. 7M) and the first item is an attachment or an element (e.g., virtual chair 5020) in a message (e.g., the first item is an image, a hyperlink, a mini program, an emoji, a media object, etc.).

Displaying a message attachment or element with a visual indication indicating that the message attachment or element is a virtual three-dimensional object increases the efficiency with which the user is able to perform operations using a messaging user interface (e.g., by helping the user to provide appropriate inputs depending on whether a message attachment or element with which the user is interacting is or is not a virtual three-dimensional object), thereby enhancing the operability of the device, which, additionally, reduces power usage and improves battery life of the device by enabling the user to use the device more quickly and efficiently.

In some embodiments, the first user interface is (1026) a file management application user interface (e.g., file management user interface 7036, as illustrated in FIG. 7O) and the first item is a file preview object (e.g., file preview object 7045 in file information region 7046).

Displaying a file preview object with a visual indication indicating that the file preview object is a virtual three-dimensional object increases the efficiency with which the user is able to perform operations using a file management application user interface (e.g., by helping the user to provide appropriate inputs depending on whether a file preview object with which the user is interacting is or is not a virtual three-dimensional object), thereby enhancing the operability of the device, which, additionally, reduces power usage and improves battery life of the device by enabling the user to use the device more quickly and efficiently In some embodiments, the first user interface is (1028) a map application user interface (e.g., map application user interface 7024) and the first item is a representation of a point of interest (e.g., point of interest object 7028) in a map (e.g., a three dimensional representation of a feature that corresponds to a location on the map (e.g., including three-dimensional representations of terrain and/or structures that correspond to the location on the map) or a control, that when actuated, causes display of a three dimensional representation of a map).

Displaying a representation of a point of interest in a map with a visual indication indicating that the representation of the point of interest is a virtual three-dimensional object increases the efficiency with which the user is able to perform operations using a map application user interface (e.g., by helping the user to provide appropriate inputs depending on whether a representation of the point of interest with which the user is interacting is or is not a virtual three-dimensional object), thereby enhancing the operability of the device, which, additionally, reduces power usage and improves battery life of the device by enabling the user to use the device more quickly and efficiently.

In some embodiments, the visual indication that the first item corresponds to a respective virtual three-dimensional object includes (1030) an animation of the first item that occurs without requiring an input directed to the representation of the respective three-dimensional object (e.g., a continuous movement or changing visual effect applied to the first item (e.g., sparkling, shimmering, etc.) over time).

Displaying an animation of the first item that occurs without input directed to the representation of the respective three-dimensional object enhances the operability of the device (e.g., by reducing the number of inputs needed for a user to view three-dimensional aspects of the first item), which, additionally, reduces power usage and improves battery life of the device by enabling the user to use the device more quickly and efficiently.

In some embodiments, while displaying the representation of the second item (e.g., virtual chair 5020) with the visual indication (e.g., virtual object indicator 5022) to indicate that the second item corresponds to a respective virtual three-dimensional object, the device detects (1032) a second input by a second contact at a location on the touch-sensitive surface that corresponds to the representation of the second item (e.g., an input as described with regard to FIGS. 5C-5F), and, in response to detecting the second input by the second contact and in accordance with a determination that the second input by the second contact meets first (e.g., AR-trigger) criteria, the device displays a third user interface region on the display, including replacing display of at least a portion of the second user interface (e.g., messaging user interface 5008) with a representation of a field of view 5036 of the one or more cameras (e.g., described with regard to FIGS. 5F-5I) and continuously displaying the second virtual three-dimensional object while switching from displaying the second user interface to displaying the third user interface region. (e.g., as described in greater detail herein with reference to method 800). In some embodiments, the device displays an animation as the representation of the virtual object is continuously displayed while switching from displaying the portion of the second user interface with the representation of the field of view of the one or more cameras (e.g., as described in greater detail herein with reference to operation 834).

Using the first criteria to determine whether to display the third user interface region enables the performance of multiple different types of operations in response to the second input. Enabling the performance of multiple different types of operations in response to an input increases the efficiency with which the user is able to perform these operations, thereby enhancing the operability of the device, which, additionally, reduces power usage and improves battery life of the device by enabling the user to use the device more quickly and efficiently.

In some embodiments, (e.g., as described in greater detail herein with reference to method 900) while displaying the second item (e.g., virtual chair 5020) with the visual indication (e.g., virtual object indicator 5022) to indicate that the second item corresponds to the respective virtual three-dimensional object, the device detects (1034) a third input by a third contact at a location on the touch-sensitive surface that corresponds to the representation of the second item (e.g., an input as described with regard to FIGS. 6E-6I), and, in response to detecting the third input by the third contact and in accordance with a determination that the third input by the third contact meets first (e.g., staging-trigger) criteria, the device displays the second virtual three-dimensional object in a fourth user interface that is different from the second user interface (e.g., a staging user interface 6010 as described in greater detail with reference to method 900). In some embodiments, while displaying the second virtual three-dimensional object in the fourth user interface (e.g., staging user interface 6010, as illustrated at FIG. 6I), the device detects a fourth input and, in response to detecting the fourth input: in accordance with a determination that the fourth input corresponds to a request to manipulate the second virtual three-dimensional object in the fourth user interface, the device changes a display property of the second virtual three-dimensional object within the fourth user interface based on the fourth input (e.g., as described with regard to FIGS. 6J-6M and/or as described with regard to FIGS. 6N-6P), and, in accordance with a determination that the fourth input corresponds to a request to display the second virtual object in an augmented reality environment (e.g., a tap input, a press input, or a touch-hold or press input followed by a drag input, at or from a location on the touch-sensitive surface that corresponds to the representation of the virtual object in the second user interface region), the device displays the second virtual three-dimensional object with a representation of a field of view of the one or more cameras (e.g., as described with regard to FIGS. 6Q-6U).

While displaying the second three-dimensional object in a fourth user interface (e.g., a staging user interface 6010), in response to the fourth input, the device either changes a display property of the second three-dimensional object based on the fourth input or displays the second three-dimensional object with a representation of a field of view of one or more cameras of the device. Enabling the performance of multiple different types of operations in response to an input (e.g., by changing a display property of the second three-dimensional object or displaying the second three-dimensional object with a representation of a field of view of one or more cameras of the device) increases the efficiency with which the user is able to perform these operations, thereby enhancing the operability of the device, which, additionally, reduces power usage and improves battery life of the device by enabling the user to use the device more quickly and efficiently.

It should be understood that the particular order in which the operations in FIGS. 10A-10D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800, 900, 16000, 17000, 18000, 19000, and 20000) are also applicable in an analogous manner to method 1000 described above with respect to FIGS. 10A-10D. For example, the contacts, inputs, virtual objects, user interfaces, user interface regions, fields of view, movements, and/or animations described above with reference to method 1000 optionally have one or more of the characteristics of the contacts, inputs, virtual objects, user interfaces, user interface regions, fields of view, movements, and/or animations described herein with reference to other methods described herein (e.g., methods 800, 900, 16000, 17000, 18000, 19000, and 20000). For brevity, these details are not repeated here.

Figure 11A:
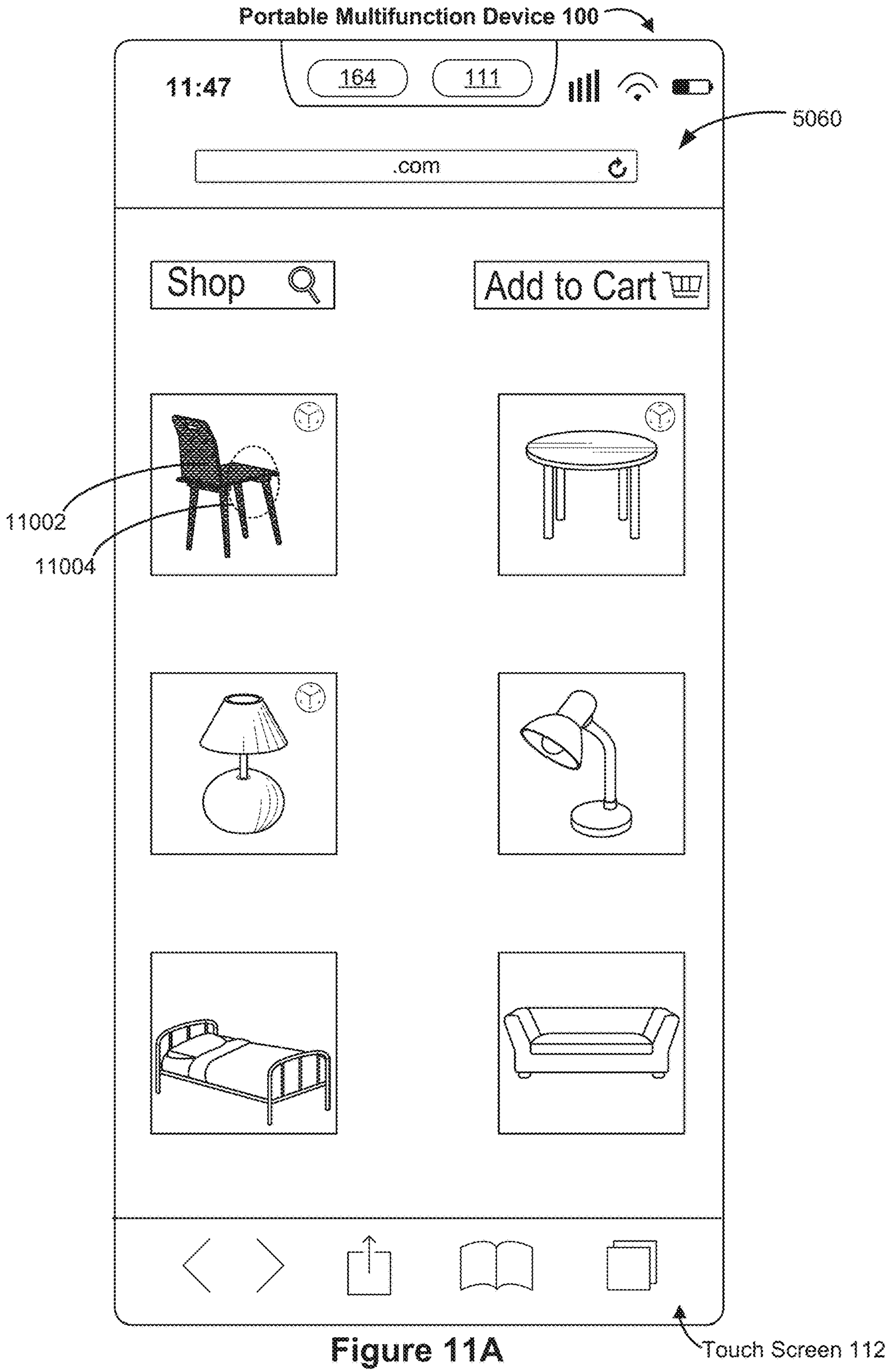
FIGS. 11A-11*v* illustrate example user interfaces for displaying a virtual object with different visual properties depending on whether object-placement criteria are met, in accordance with some embodiments.
Figure 11B:
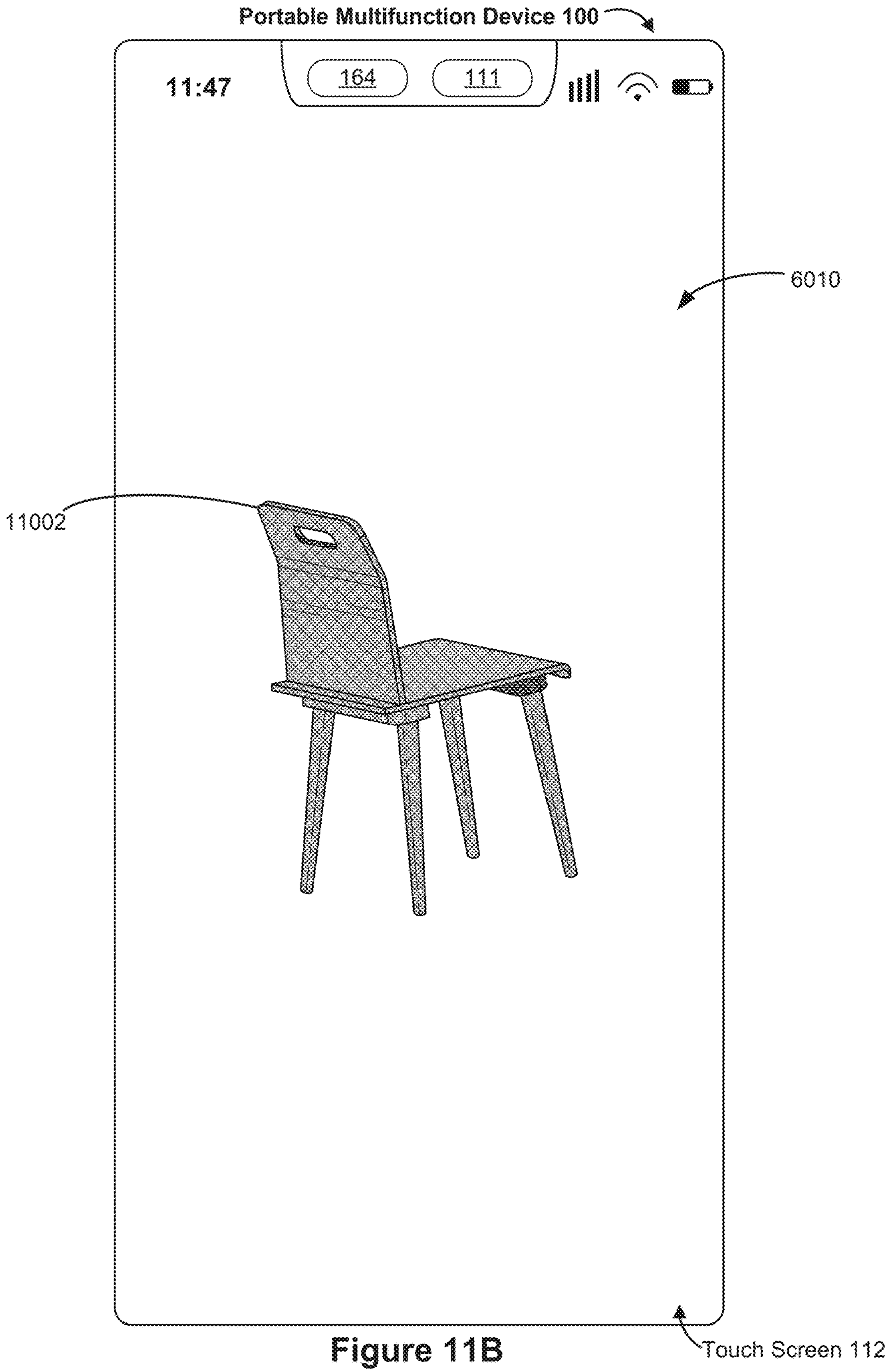
Figure 11C:
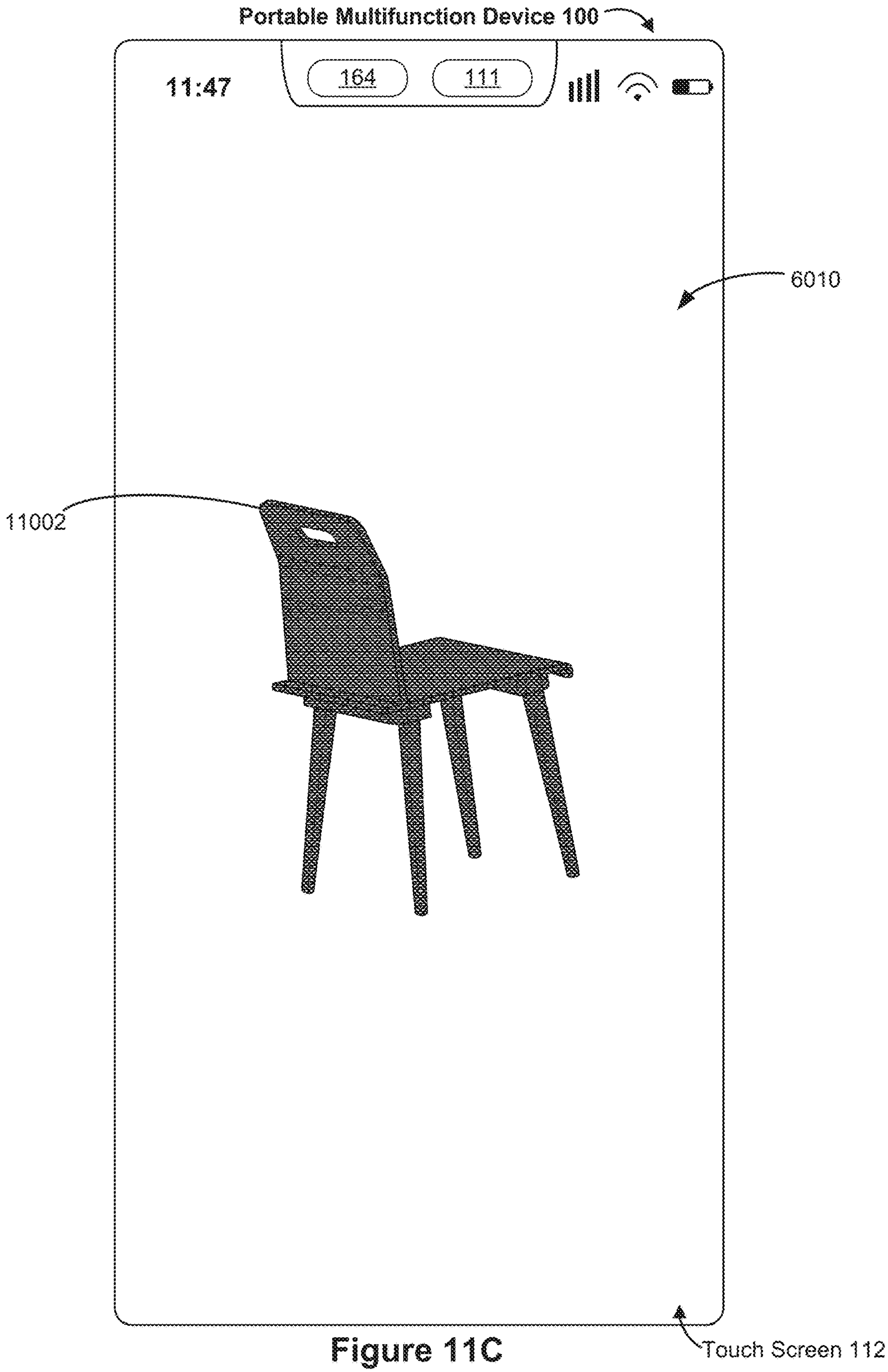
Figure 11D:
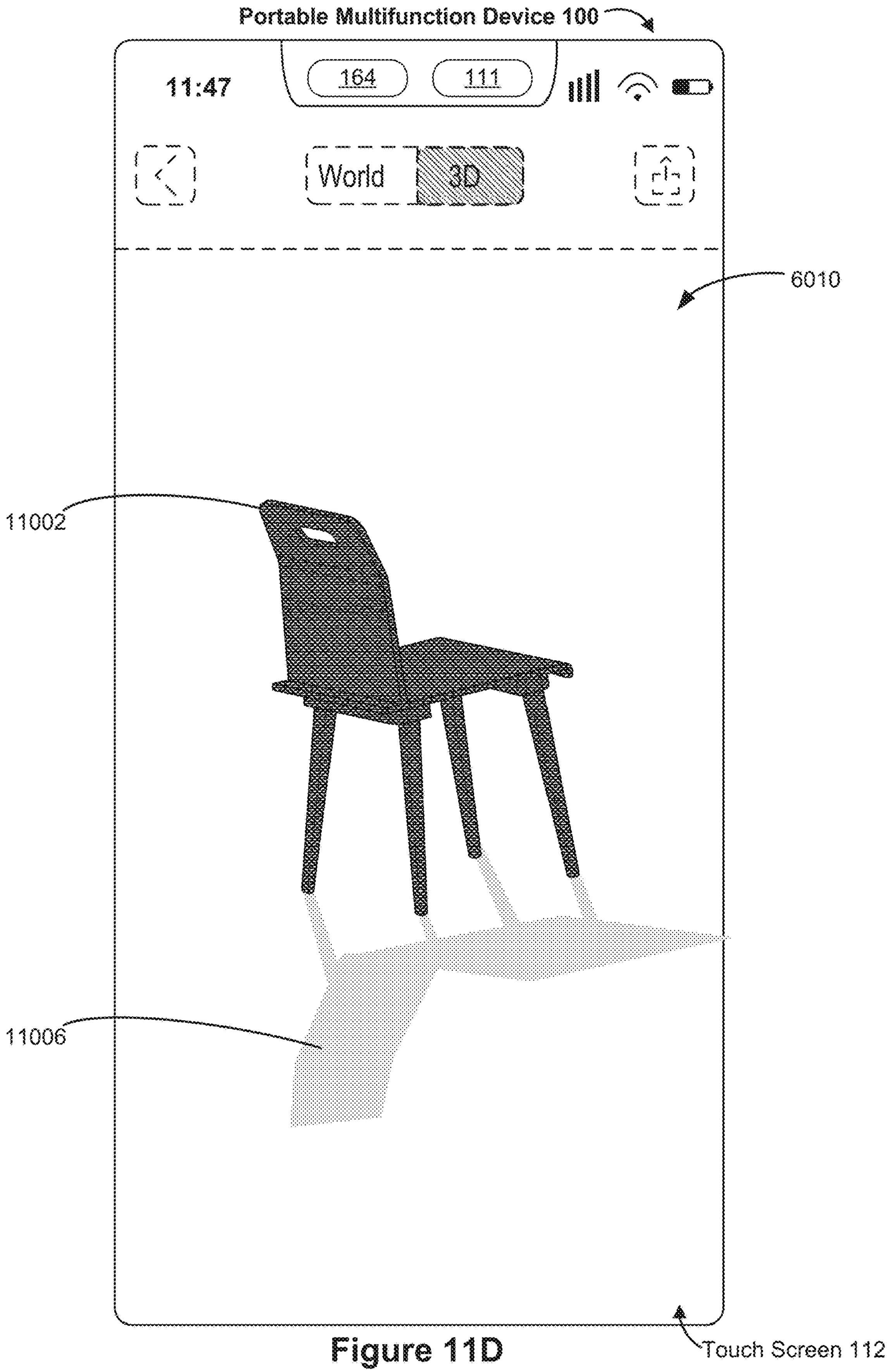
Figure 11E:
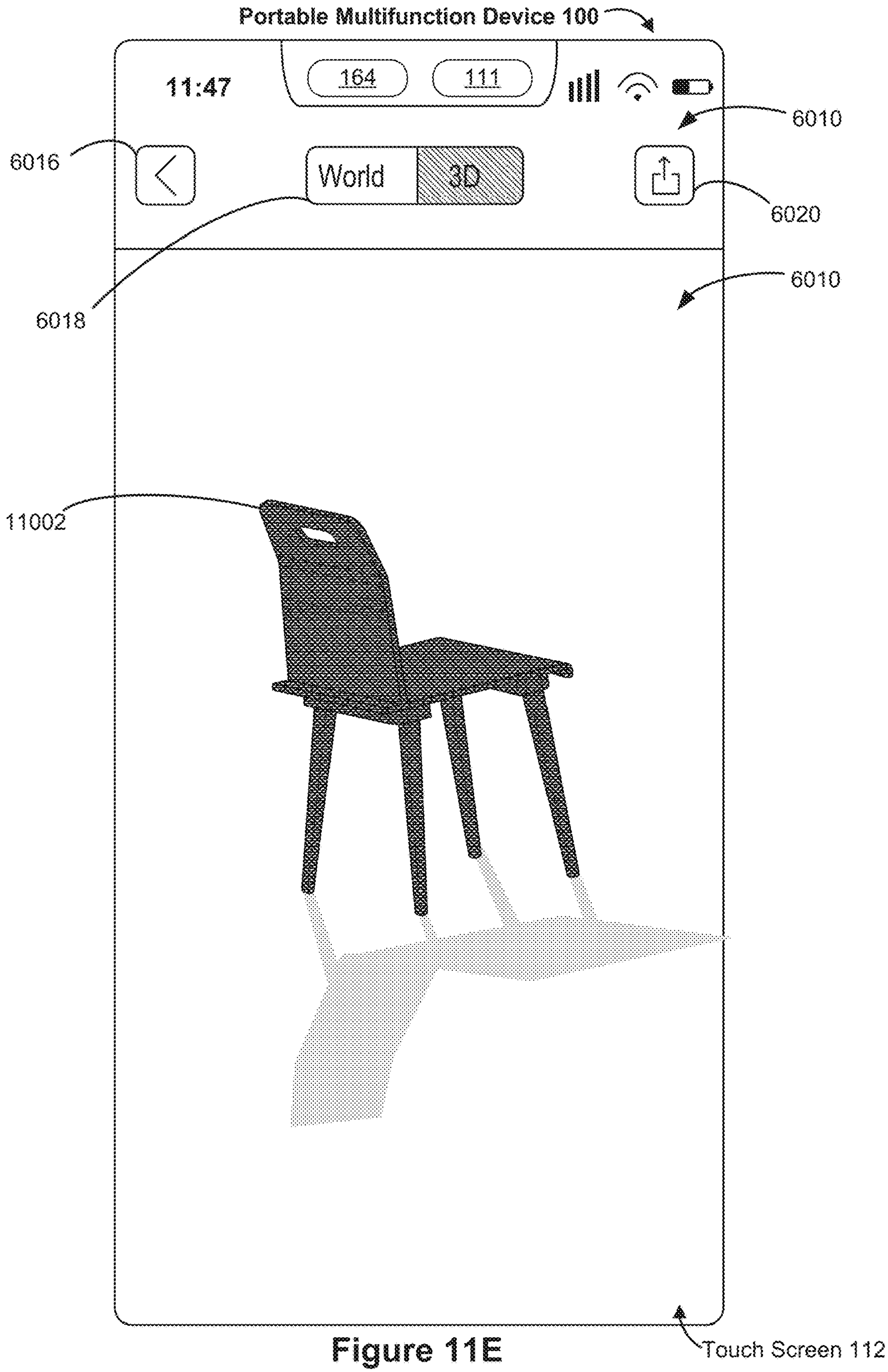
Figure 11F:
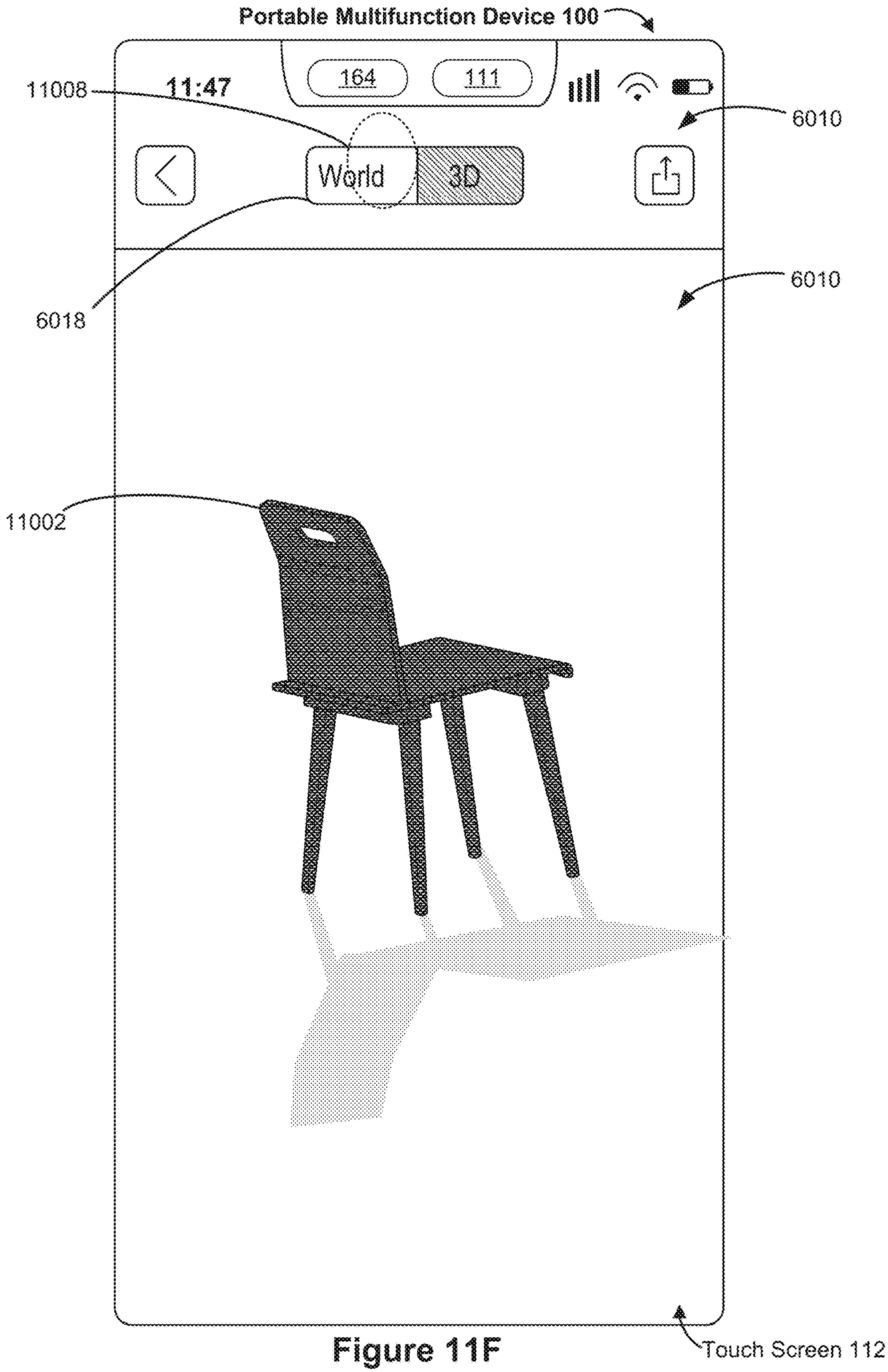
Figure 11G:
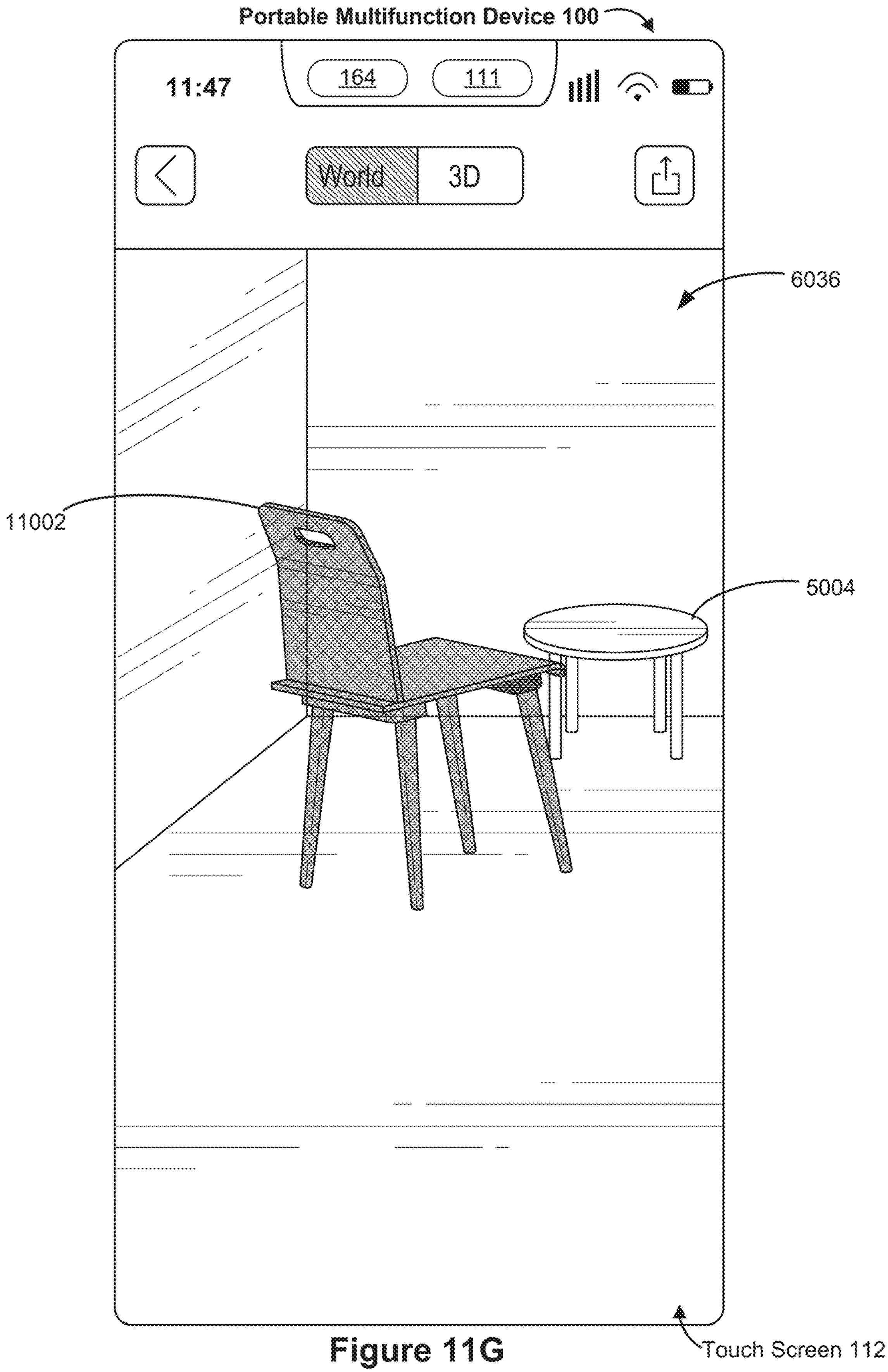
Figure 11H:
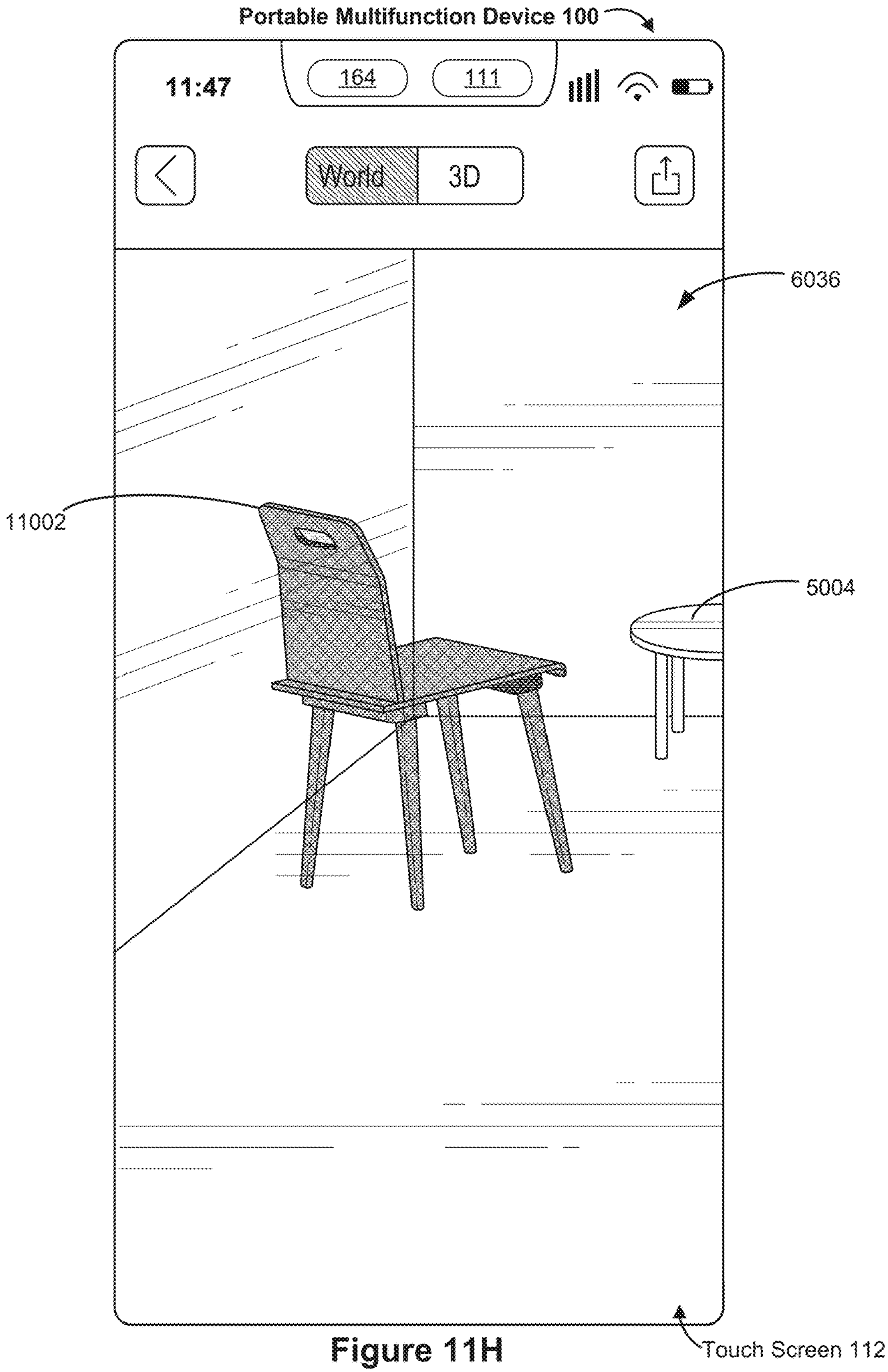
Figure 11I:
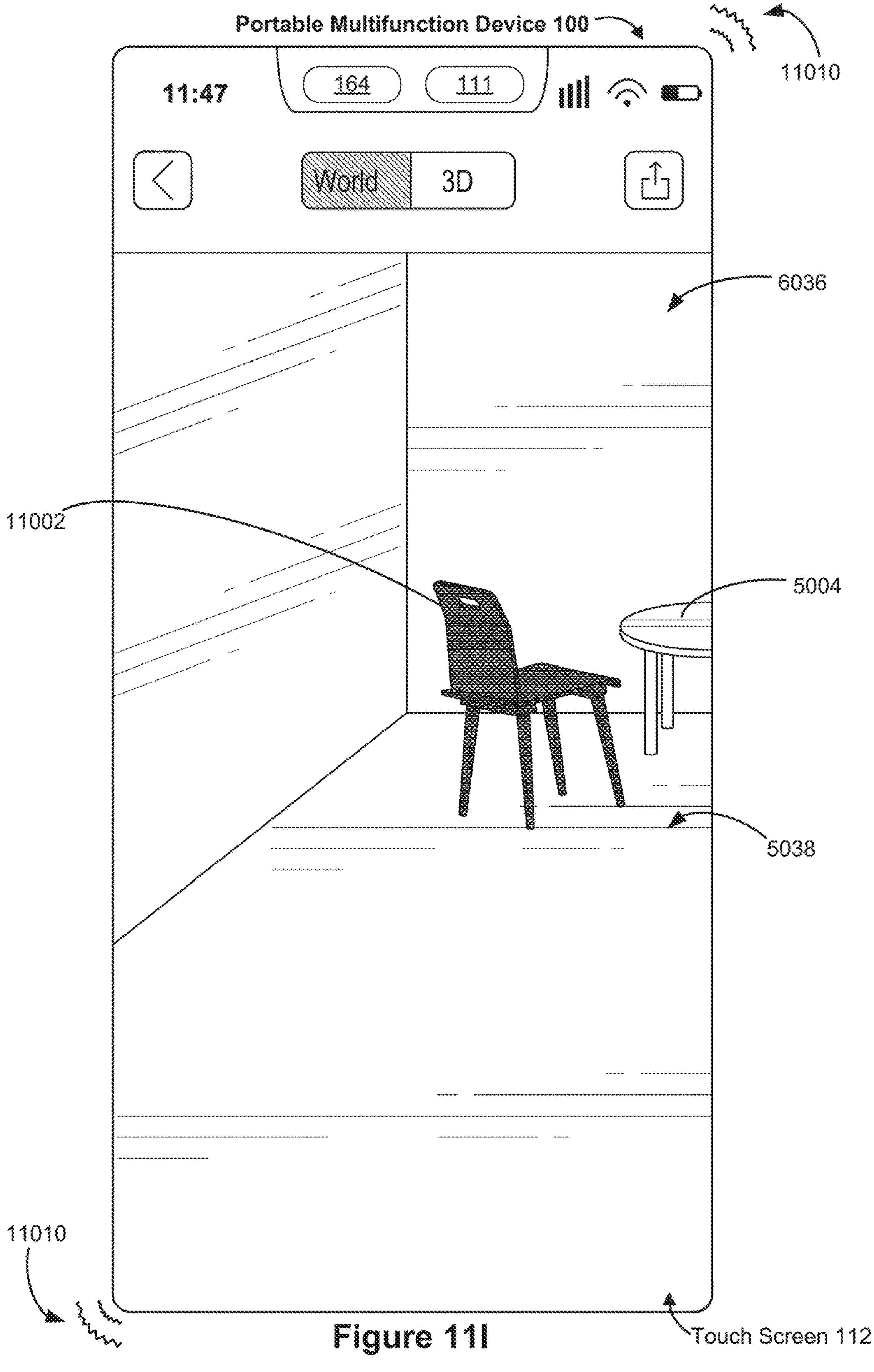
Figure 11J:
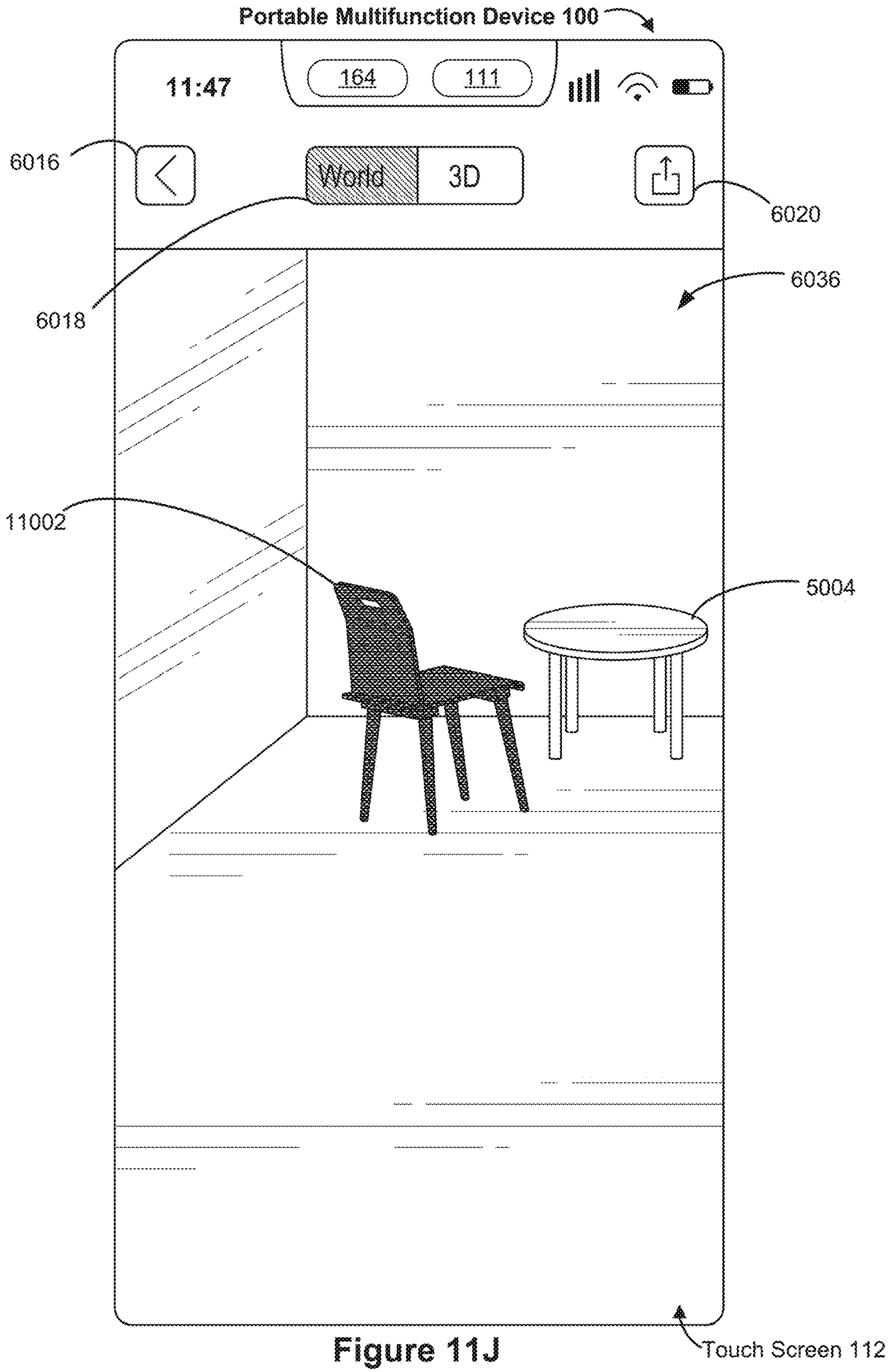
Figure 11K:
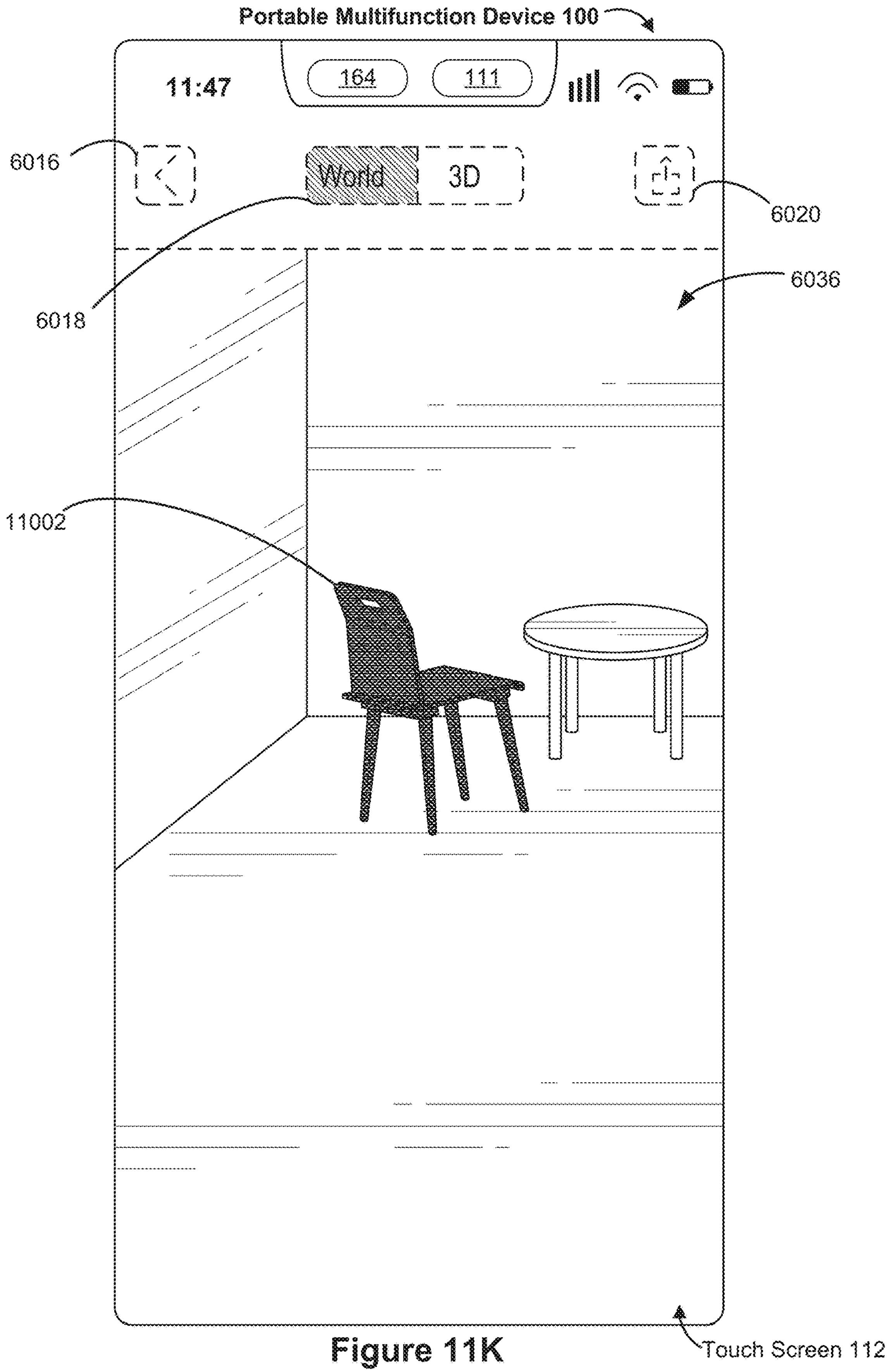
Figure 11L:
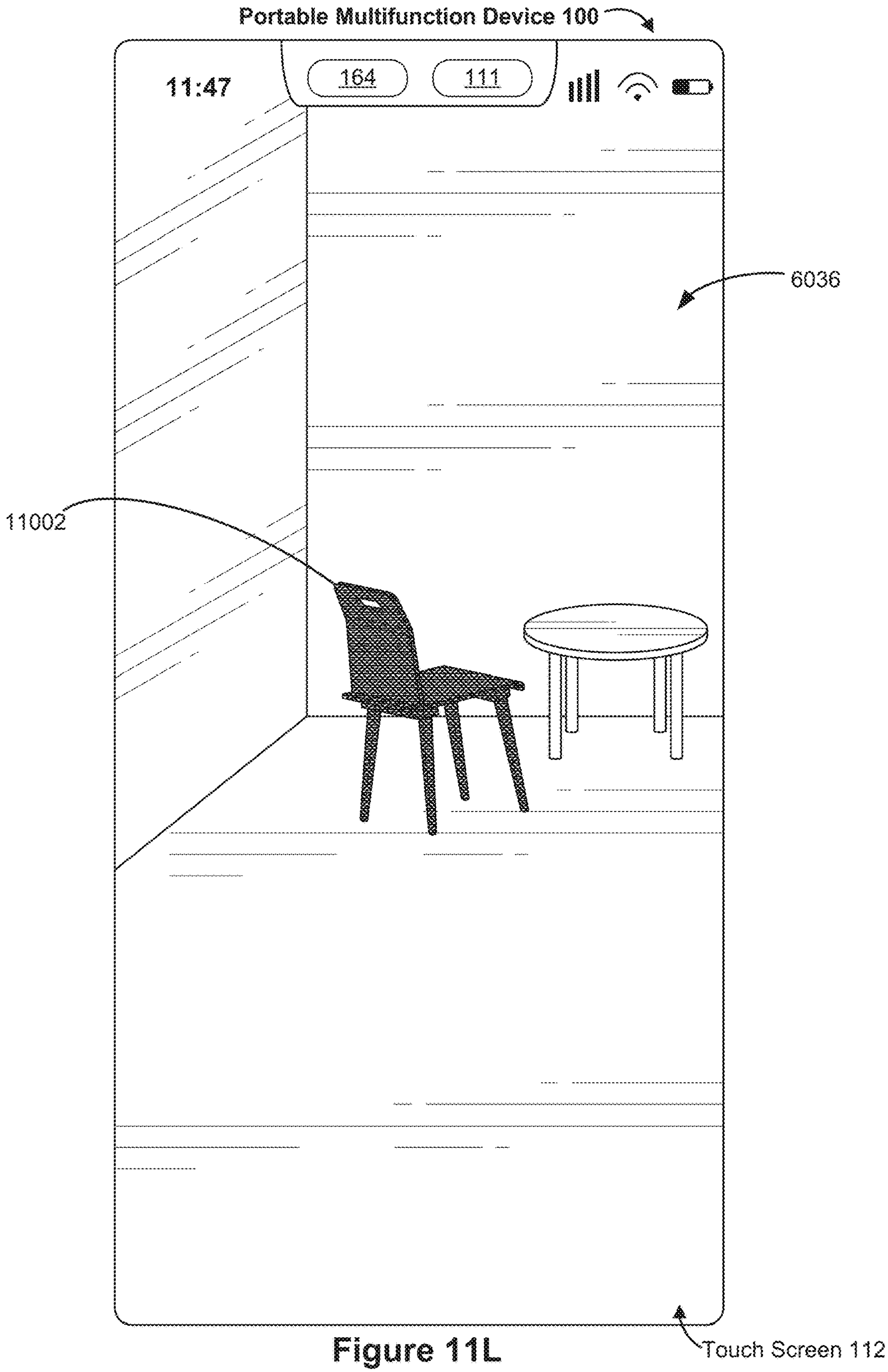
Figure 11M:
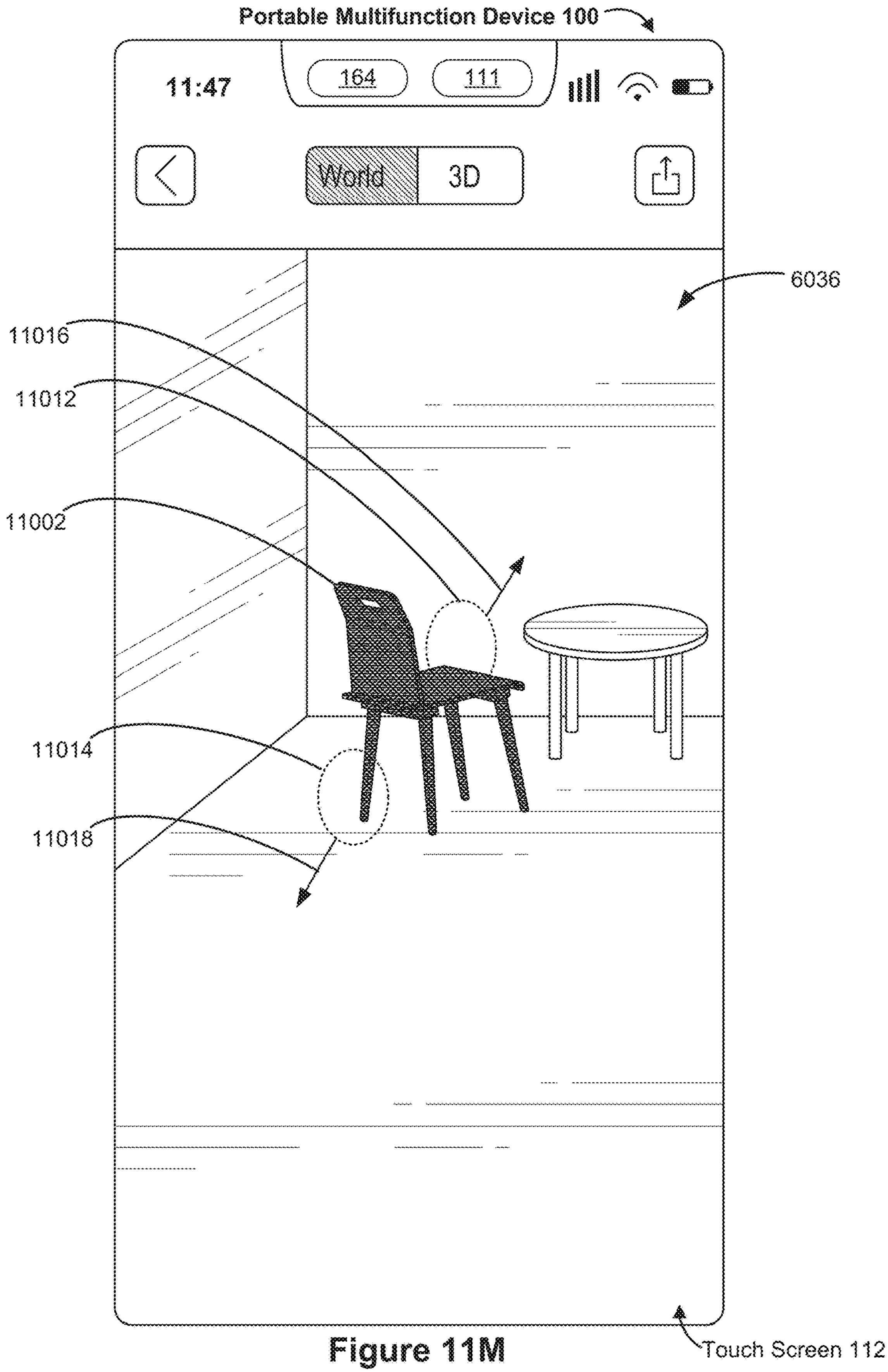
Figure 11N:
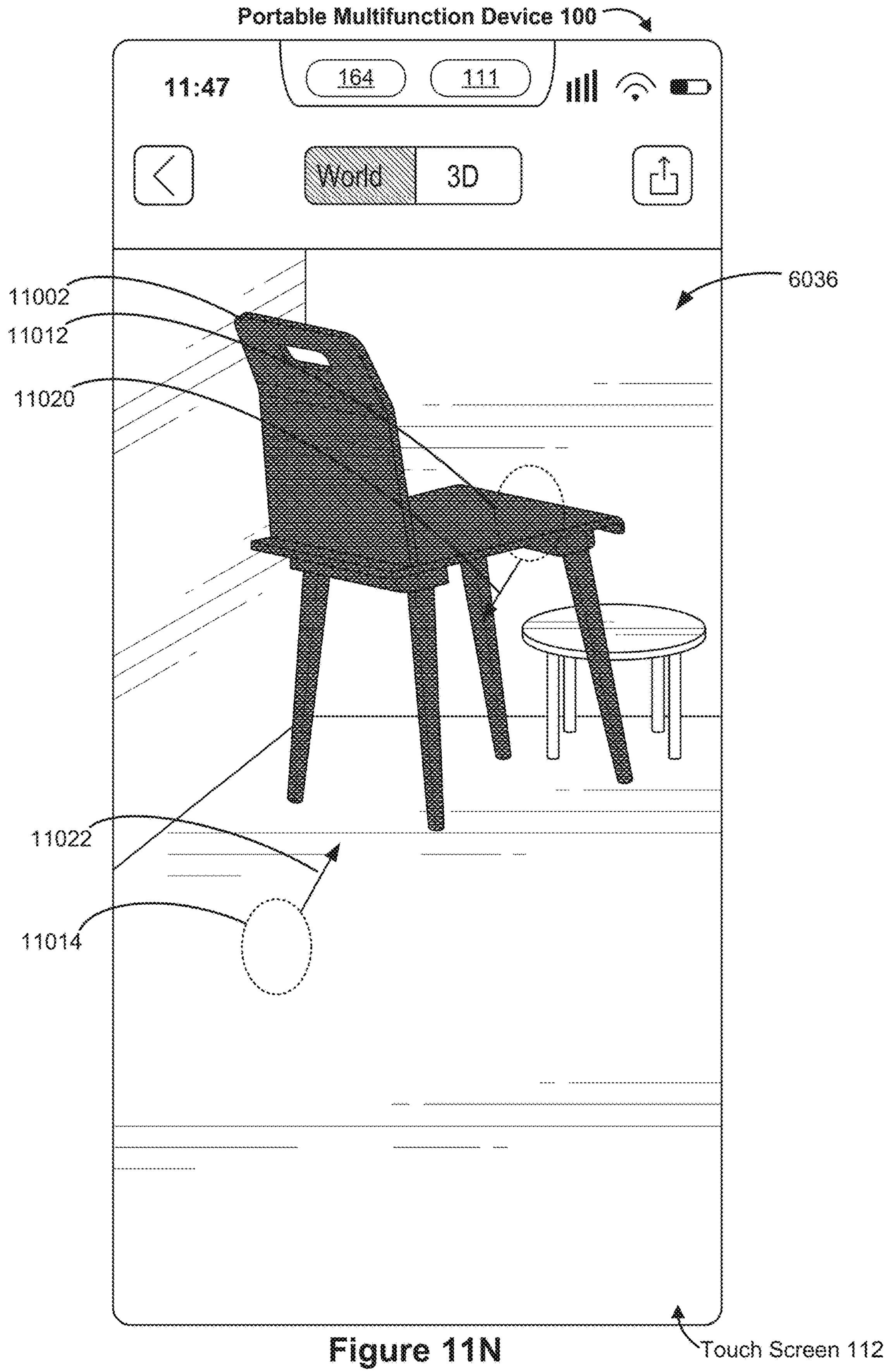
Figure 11O:
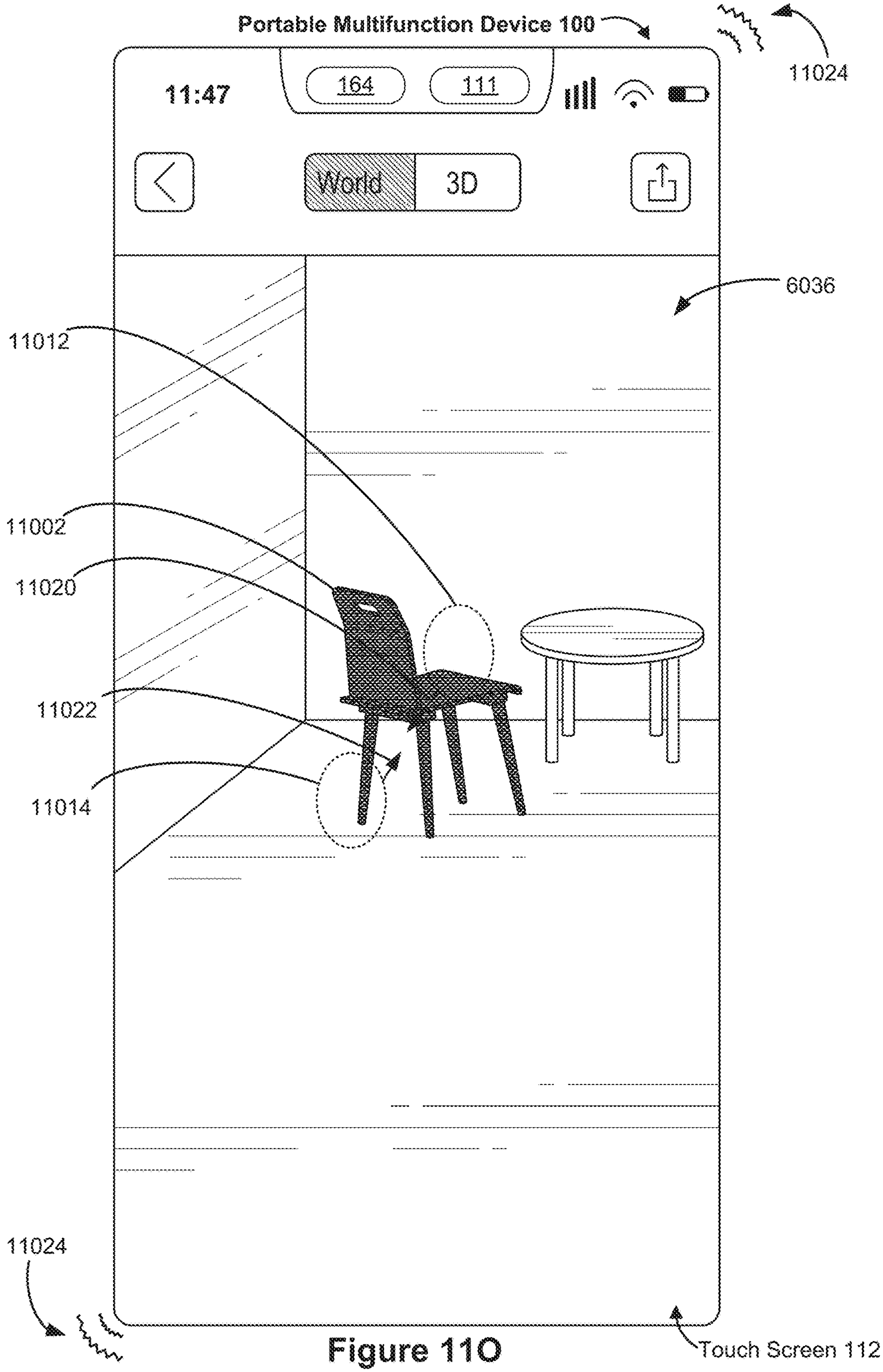
Figure 11P:
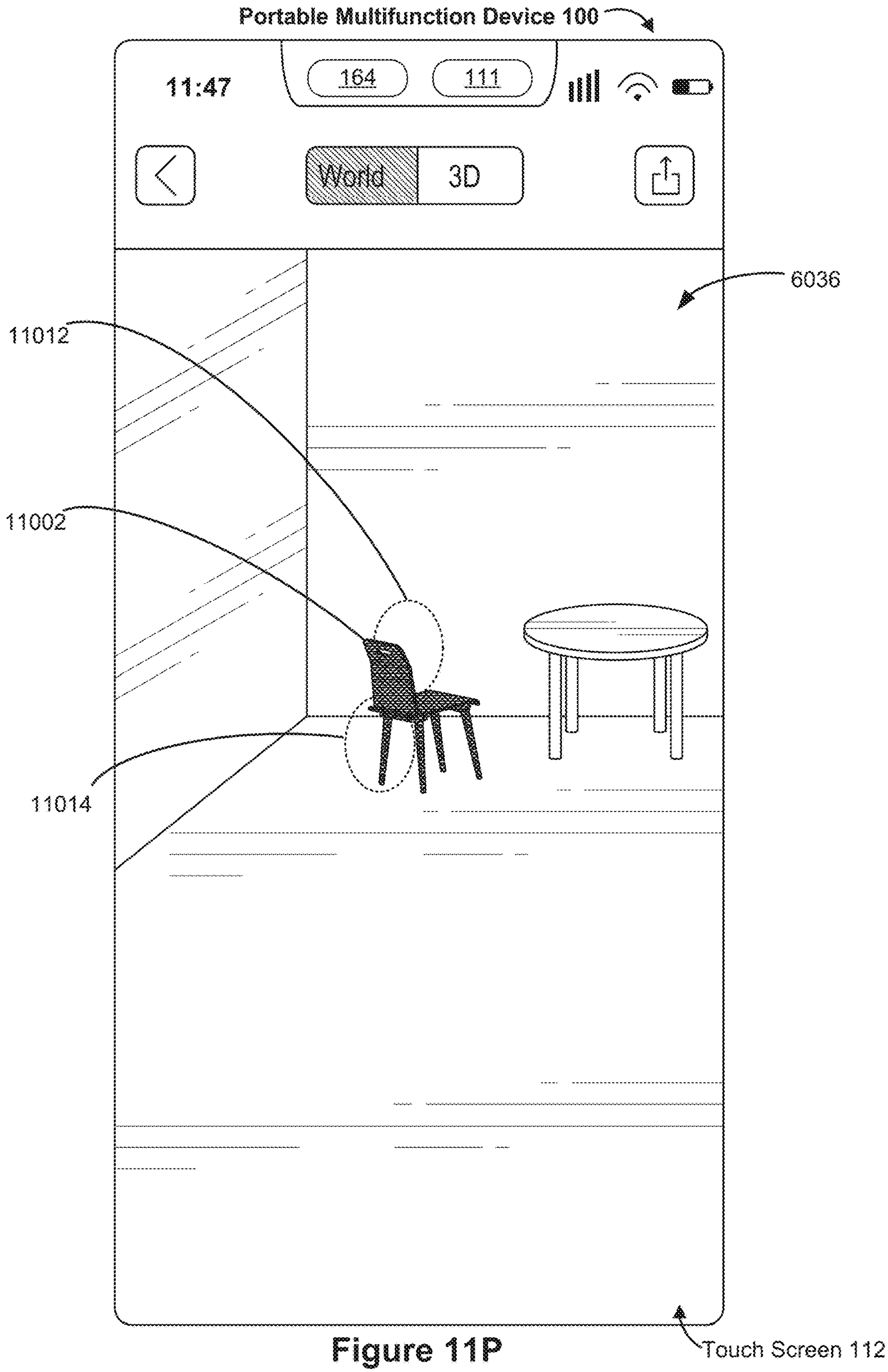
Figure 11Q:
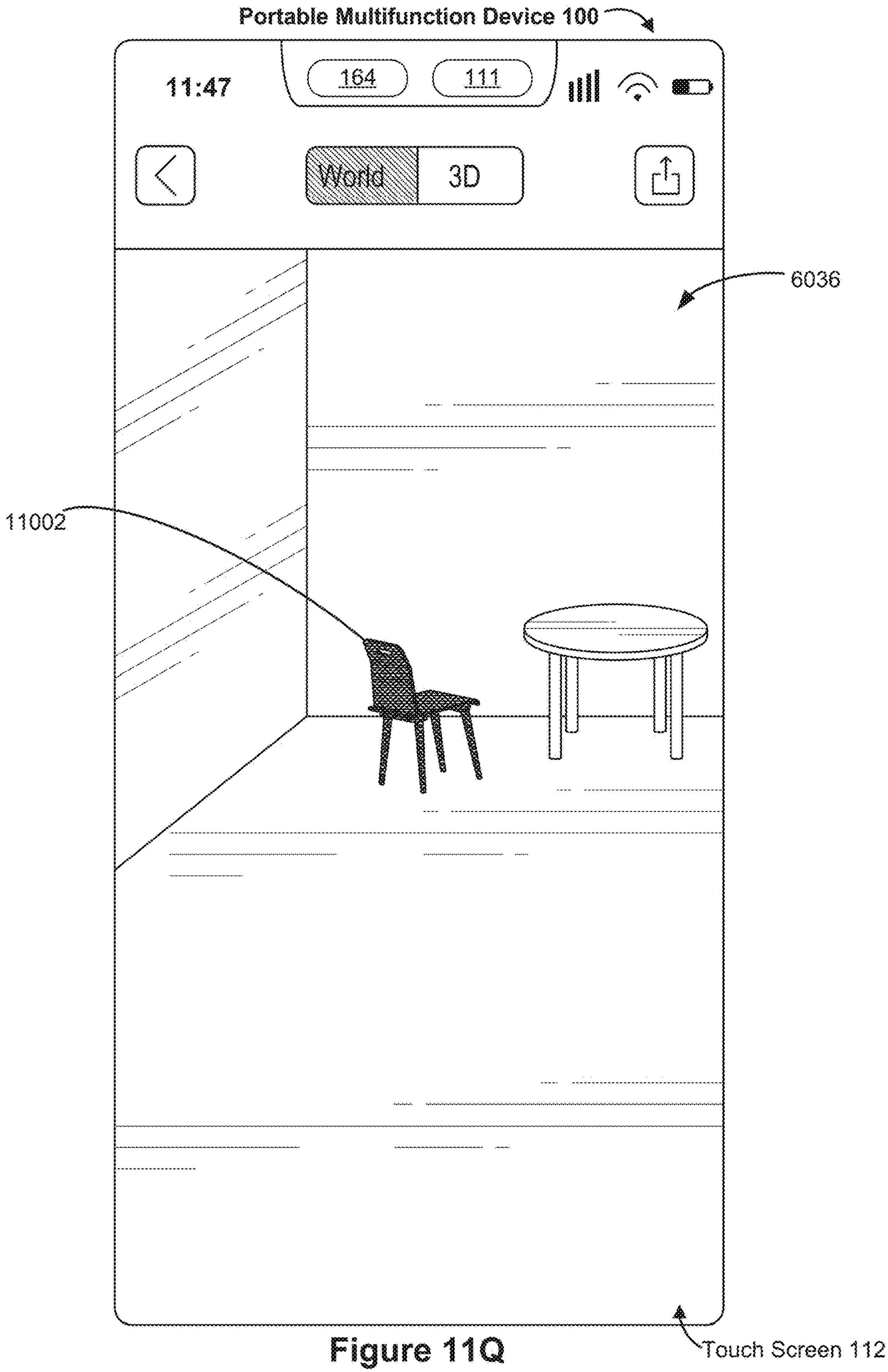
Figure 11R:
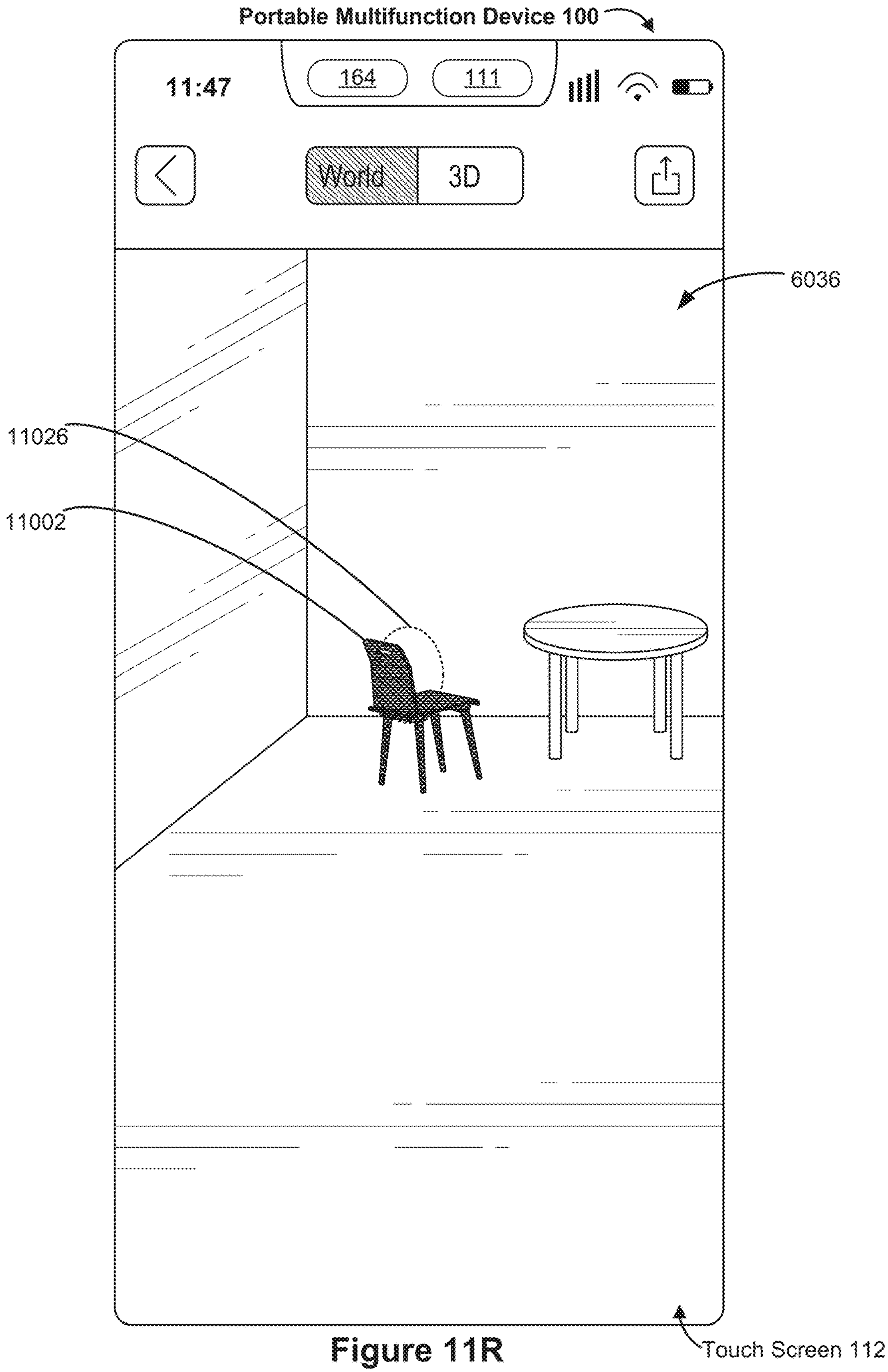
Figure 11S:
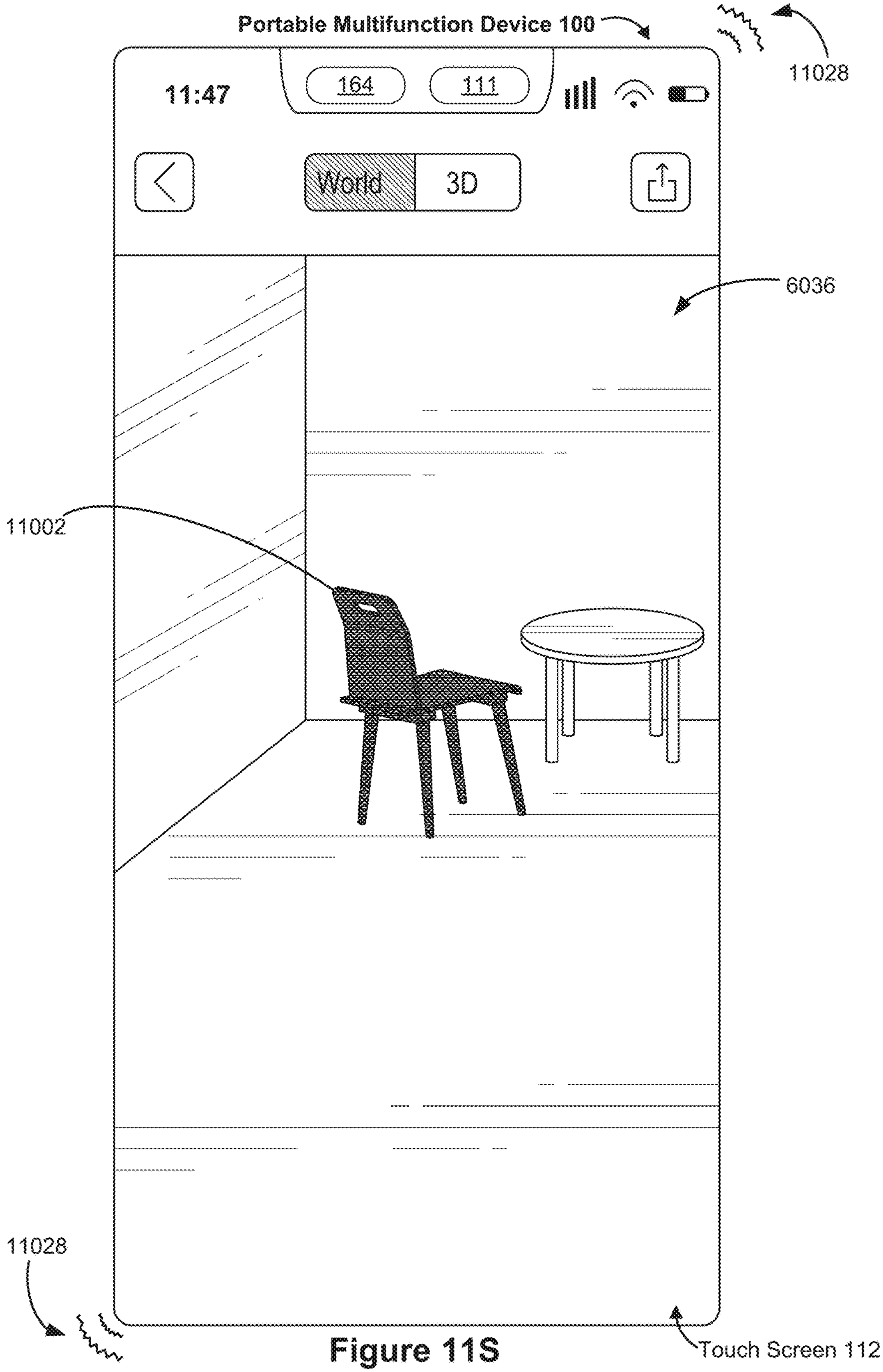
Figure 11T:
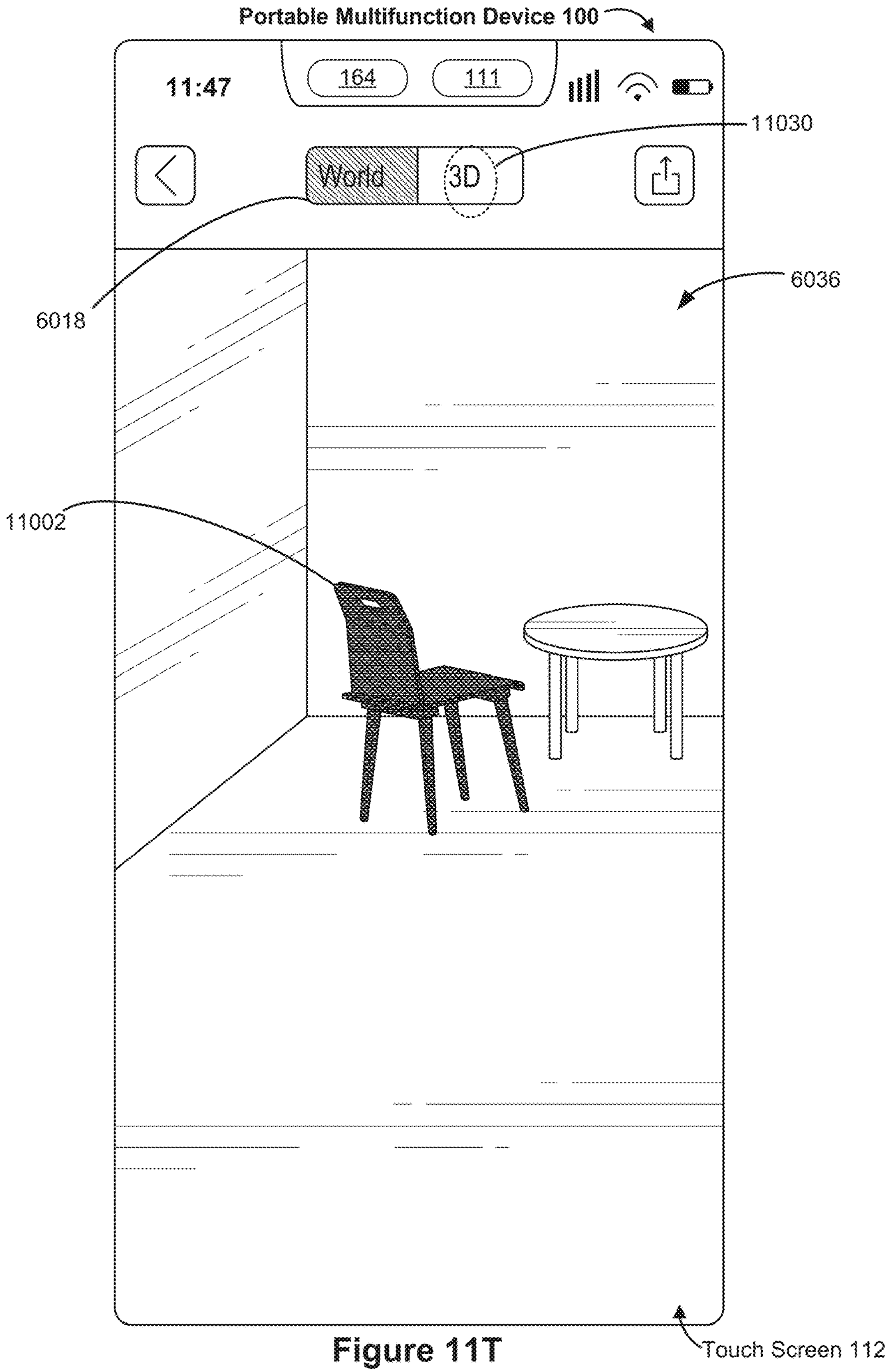
Figure 11U:
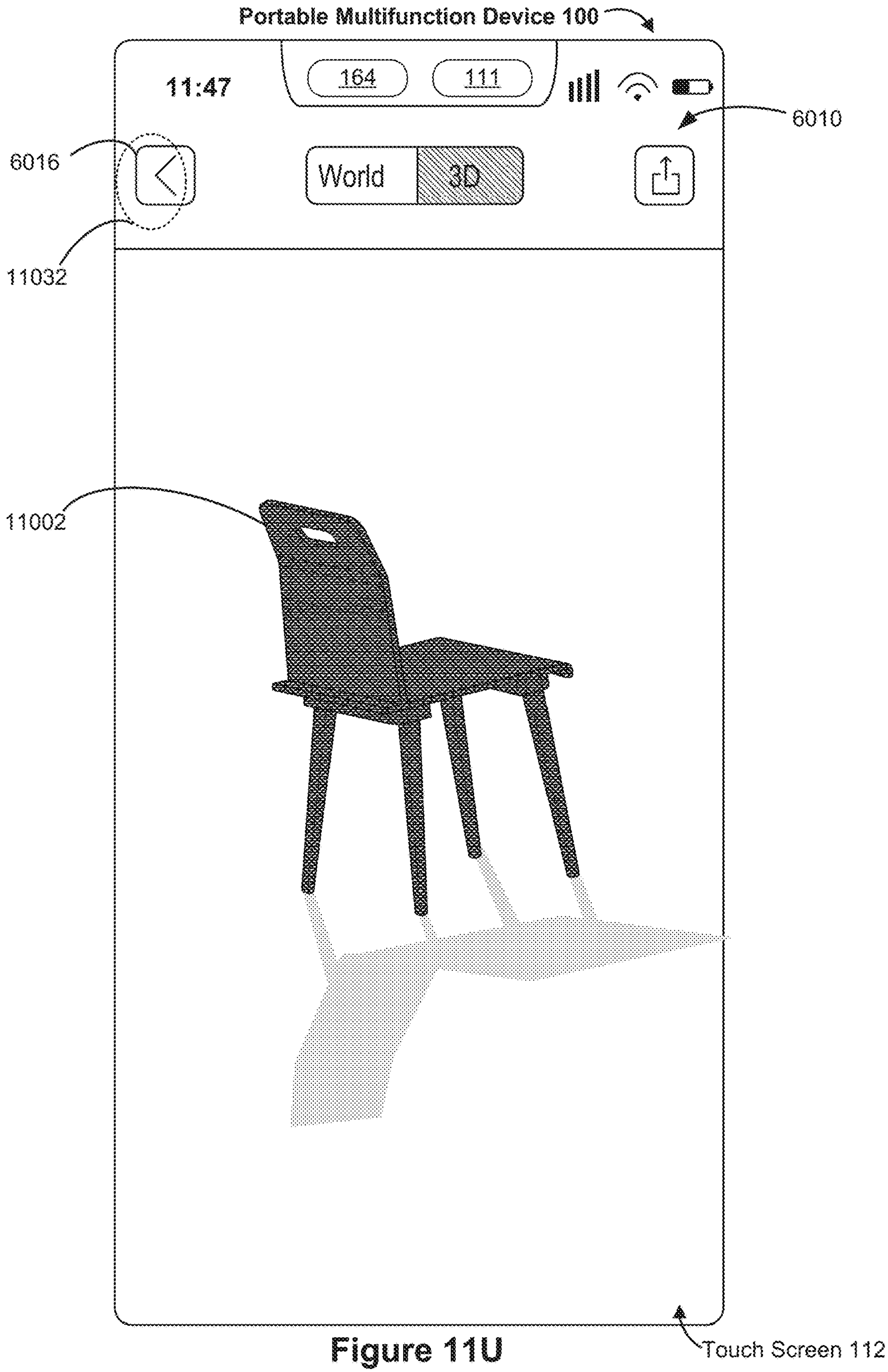
Figure 11V:
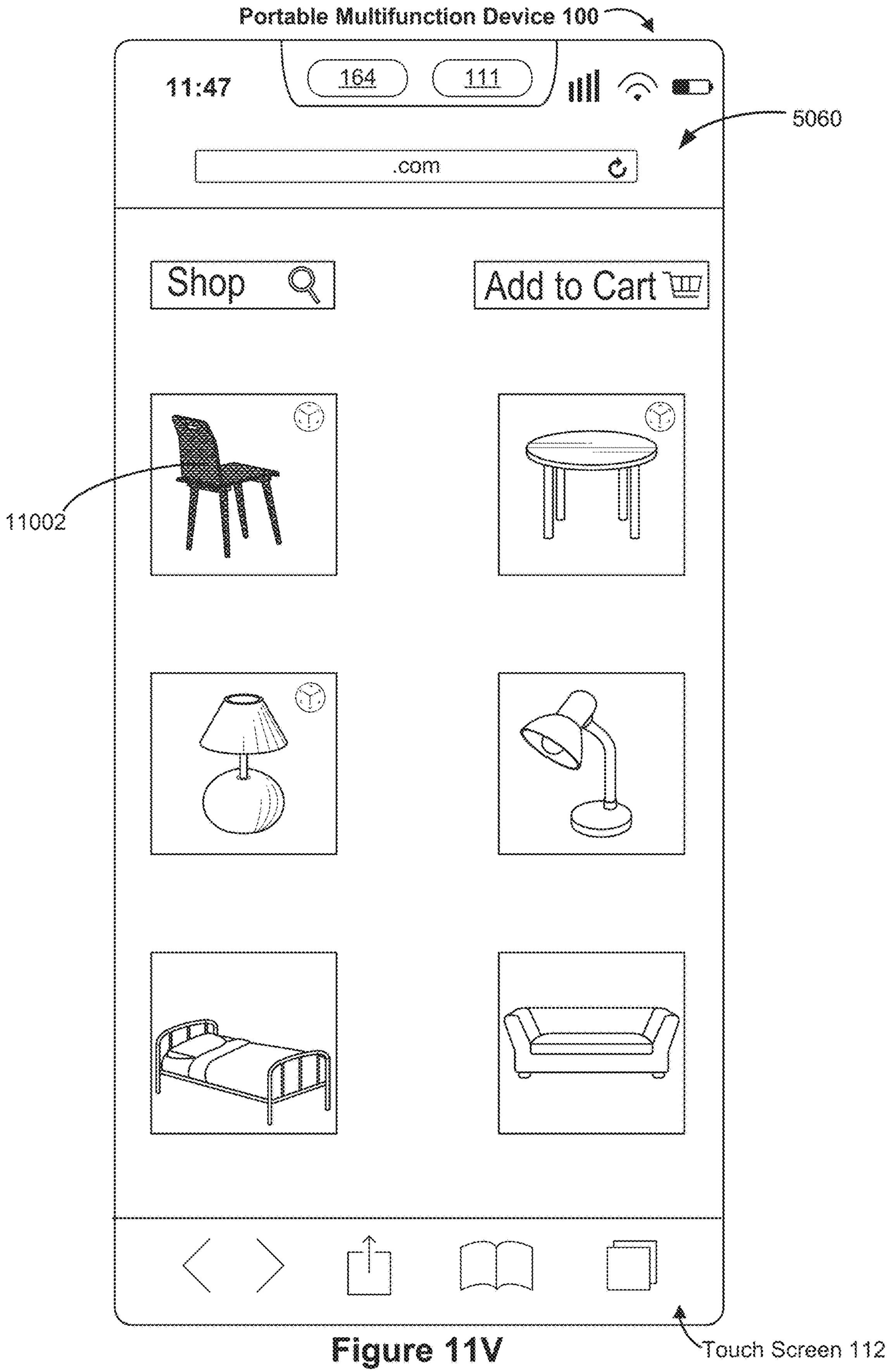

FIGS. 11A-11V illustrate example user interfaces for displaying a virtual object with different visual properties depending on whether object-placement criteria are met. The user interfaces in these figures are used to illustrate the processes described below, including the processes in FIGS. 8A-8E, 9A-9D, 10A-10D, 16A-16G, 17A-17D, 18A-18I, 19A-19H, and 20A-20F. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIGS. 11A-11E illustrate input to display a virtual object in a staging view. For example, the input is detected while a two-dimensional (e.g., thumbnail) representation of a three-dimensional object is displayed in a user interface (e.g., an e-mail user interface 7052, a file management user interface 7036, a map user interface 7022, a messaging user interface 5008, an Internet browser user interface 5060, or a third-party application user interface).

In FIG. 11A, an Internet browser user interface 5060 includes a two-dimensional representation of three-dimensional virtual object 11002 (a chair). An input (e.g., a tap input) by contact 11004 is detected at a location that corresponds to the virtual object 11002. In response to the tap input, display of the Internet browser user interface 5060 is replaced by display of a staging user interface 6010.

FIGS. 11B-11E illustrate a transition that occurs as Internet browser user interface 5060 is replaced by display of a staging user interface 6010. In some embodiments, virtual object 10002 gradually fades into view and/or controls of staging user interface 6010 (e.g., back control 6016, toggle control 6018, and/or share control 6020) gradually fade into view during the transition. For example, controls of staging user interface 6010 fade into view after virtual object 11002 fades into view (e.g., to delay display of the controls during a period of time required for a three-dimensional representation of virtual object 11002 to be rendered on the display). In some embodiments, the "fading in" of virtual object 11002 includes displaying a low-resolution, two-dimensional, and/or holographic version of virtual object 11002 followed by displaying the final three-dimensional representation of virtual object 11002. FIGS. 11B-11D illustrate gradual fading-in of virtual object 11002. In FIG. 11D, a shadow 11006 of virtual object 11002 is displayed. FIGS. 11D-11E illustrate gradual fading-in of controls 6016, 6018, and 6020.

FIGS. 11F-11G illustrate an input that that causes the three-dimensional representation of virtual object 11002 to be displayed in a user interface that includes field of view 6036 of one or more cameras of device 100. In FIG. 11F, an input by a contact 11008 is detected at a location that corresponds to toggle control 6018. In response to the input, display of staging user interface 6010 is replaced by display of the user interface that includes field of view 6036 of the camera(s), as shown in FIG. 11G.

As illustrated in FIGS. 11G-11H, when field of view 6036 of the camera(s) is initially displayed, a translucent representation of a virtual object may be displayed (e.g., when a plane that corresponds to the virtual object has not been detected in field of view 6036 of the camera(s)).

FIGS. 11G-11H illustrate a translucent representation of virtual object 11002 displayed in the user interface that includes field of view 6036 of the camera(s). The translucent representation of virtual object 11002 is displayed at a fixed position relative to display 112. For example, from FIG. 11G to FIG. 11H, as device 100 is moved relative to physical environment 5002 (as indicated by, e.g., the changed position of table 5004 in field of view 6036 of the camera(s)), virtual object 11002 remains at a fixed position relative to display 112.

In some embodiments, in accordance with a determination that a plane that corresponds to a virtual object has been detected in field of view 6036 of the camera(s), the virtual object is placed on the detected plane.

In FIG. 11I, a plane that corresponds to virtual object 11002 has been detected in field of view 6036 of the camera(s) and virtual object 11002 is placed on the detected plane. The device has generated a tactile output, as illustrated at 11010 (e.g., to indicate that at least one plane (e.g., a floor surface 5038)) has been detected in the field of view 6036 of the camera(s). When the virtual object 11002 is placed at a position relative to a plane detected in field of view 6036 of the camera(s), virtual object 11002 remains at a fixed position relative to physical environment 5002 captured by the one or more cameras. From FIG. 11I to FIG. 11J, as device 100 is moved relative to physical environment 5002 (as indicated by, e.g., the changed position of table 5004 in displayed field of view 6036 of the camera(s)), virtual object 11002 remains at a fixed position relative to the physical environment 5002.

In some embodiments, while field of view 6036 of the camera(s) is displayed, controls (e.g., back control 6016, toggle control 6018, and/or share control 6020) cease to be displayed (e.g., in accordance with a determination that a period of time has passed during which no input has been received). In FIGS. 11J-11L, controls 6016, 6018 and 6020 gradually fade out (e.g., as shown in FIG. 11K), increasing the portion of display 112 in which field of view 6036 of the camera(s) is displayed (e.g., as shown in FIG. 11L).

FIGS. 11M-11S illustrate input for manipulating virtual object 11002 when it is displayed in the user interface that includes field of view 6036 of the camera(s).

In FIGS. 11M-11N, an input (e.g., a de-pinch gesture) by contacts 11012 and 11014 for changing the simulated physical size of virtual object 11002 is detected. In response to detection of an input, controls 6016, 6018 and 6020 are re-displayed. As contact 11012 moves along a path indicated by arrow 11016 and contact 11014 moves along a path indicated by arrow 11018, the size of virtual object 11002 increases.

In FIGS. 11N-11P, an input (e.g., a pinch gesture) by contacts 11012-1104 for changing the simulated physical size of virtual object 11002 is detected. As contact 11012 moves along a path indicated by arrow 11020 and contact 11014 moves along a path indicated by arrow 11022, the size of virtual object 11002 decreases (as shown in FIGS. 11N-11O and 11O-11P). As illustrated in FIG. 11O, when the size of virtual object 11002 is adjusted to its original size relative to physical environment 5002 (e.g., the size of virtual object 11002 when initially placed on the detected plane in the physical environment 5002, as shown in FIG. 11I), a tactile output (as illustrated at 11024) occurs (e.g., to provide feedback indicating that the virtual object 11002 has returned to its original size). In FIG. 11Q, contacts 11012 and 11014 have lifted of touch-screen display 112.

In FIG. 11R, an input (e.g., a double tap input) for returning virtual object 11002 to its original size relative to physical environment 5002 is detected. The input is detected at a location that corresponds to virtual object 11002, as indicated by contact 11026. In response to the input, the virtual object 11002 is adjusted from the reduced size, illustrated in FIG. 11R, to the original size of virtual object 11002, as indicated in FIG. 11S. As illustrated in FIG. 11S, when the size of virtual object 11002 is adjusted to its original size relative to physical environment 5002, a tactile output (as illustrated at 11028) occurs (e.g., to provide feedback indicating that the virtual object 11002 has returned to its original size).

In FIG. 11T, an input by a contact 11030 is detected at a location that corresponds to toggle control 6018. In response to the input, display of the user interface that includes field of view 6036 of the camera(s) is replaced by staging user interface 6010, as shown in FIG. 11U.

In FIG. 11U, an input by a contact 11032 is detected at a location that corresponds to back control 6016. In response to the input, display of staging user interface 6010 is replaced by Internet browser user interface 5060, as shown in FIG. 11V.

FIGS. 12A-12L illustrate example user interfaces for displaying a calibration user interface object that is dynamically animated in accordance with movement of one or more cameras of a device. The user interfaces in these figures are used to illustrate the processes described below, including the processes in FIGS. 8A-8E, 9A-9D, 10A-10D, 16A-16G, 17A-17D, 18A-18I, 19A-19H, and 20A-20F. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

In accordance with some embodiments, when a request is received to display a virtual object in a user interface that includes a field of view of one or more cameras, but additional data is needed for calibration of the device, a calibration user interface object is displayed.

FIG. 12A illustrates input that requests to display a virtual object 11002 in a user interface that includes a field of view 6036 of one or more cameras. An input by a contact 12002 is detected at a location that corresponds to toggle control 6018. In response to the input, display of staging user interface 6010 is replaced by display of the user interface that includes field of view 6036 of the camera(s), as shown in FIG. 12B. A translucent representation of virtual object 11002 is displayed in the user interface that includes field of view 6036 of the camera(s). While calibration is needed (e.g., because a plane that corresponds to virtual object 11002 has not been detected in the field of view 6036 of the camera(s)), the field of view 6036 of the camera(s) is blurred (e.g., to emphasize behavior of prompts and/or a calibration object, as described below).

FIGS. 12B-12D illustrate an animated image and text that prompt the user to move the device (e.g., displayed in accordance with a determination that calibration is needed). The animated image includes a representation 12004 of the device 100, arrows 12006 and 12008 that indicate that side-to-side movement of device 100 is needed, a representation 12010 of a plane (e.g., to indicate that device 100 must move relative to a plane in order to detect a plane that corresponds to virtual object 11002). Text prompt 12012 provides information regarding movement of device 100 needed for calibration. In FIGS. 12B-12C and 12C-12D, representation 12004 of device 100 and arrows 12006 are adjusted relative to representation 12010 of the plane to provide an indication of movement of device 100 needed for calibration. From FIG. 12C to FIG. 12D, device 100 is moved relative to physical environment 5002 (as indicated by, e.g., the changed position of table 5004 in field of view 6036 of the camera(s)). As a result of detection of the movement of device 100, a calibration user interface object 12014 (an outline of a cube) is displayed, as indicated in FIG. 12E-1.

Figures 1, 12F:
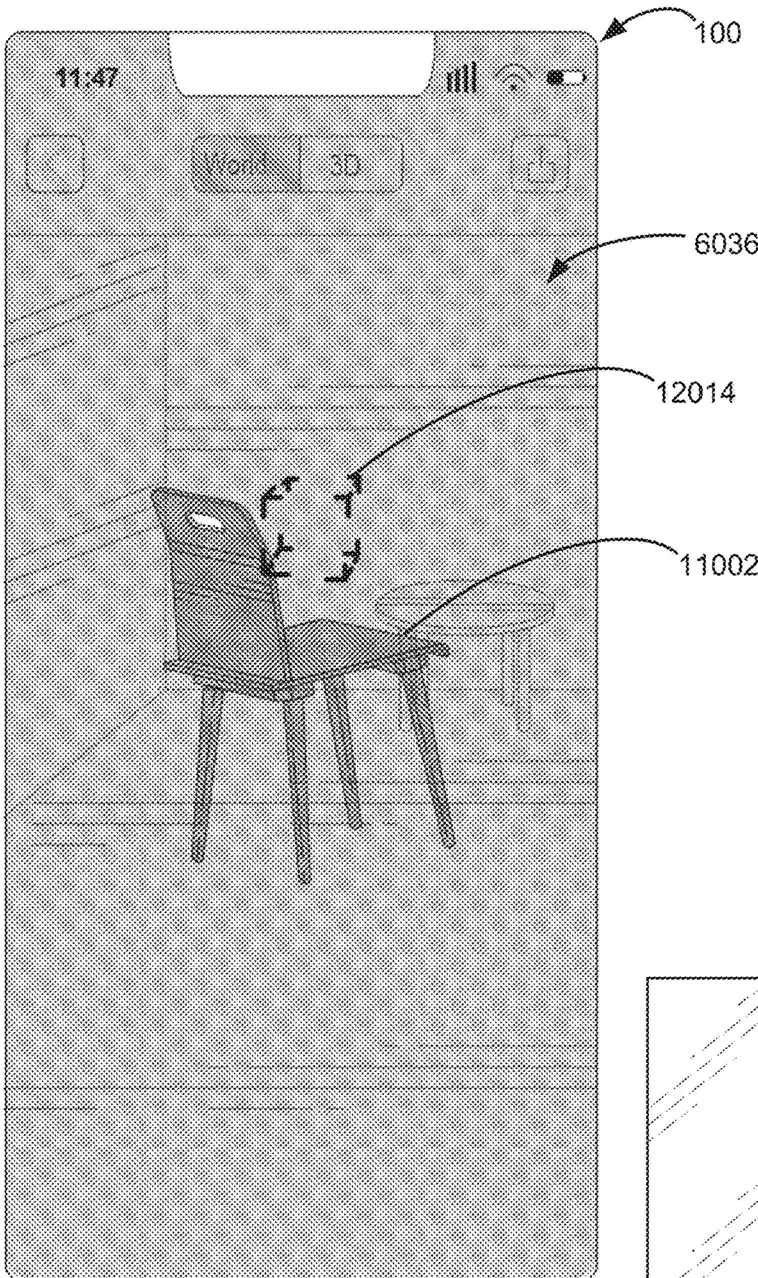
Figures 2, 12F:
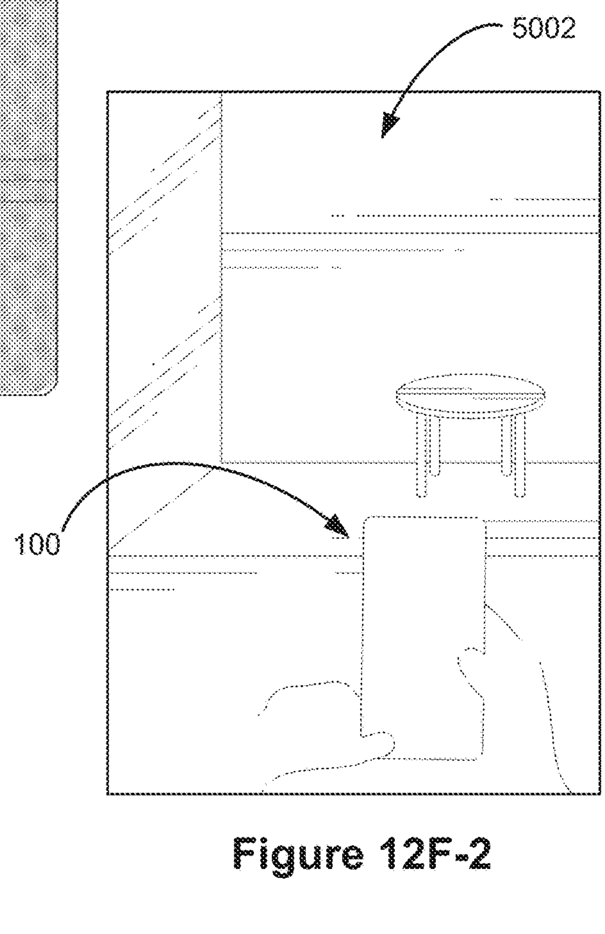
Figures 1, 12G:
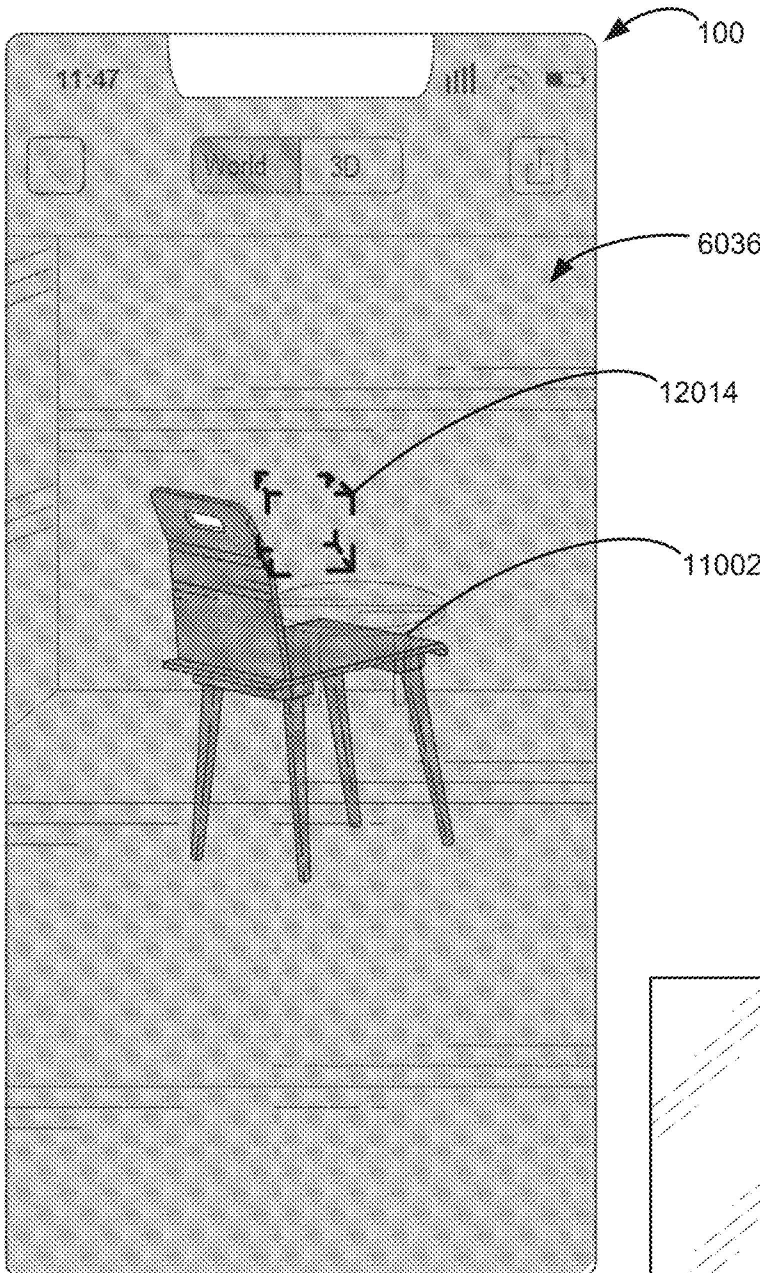
Figures 2, 12G:
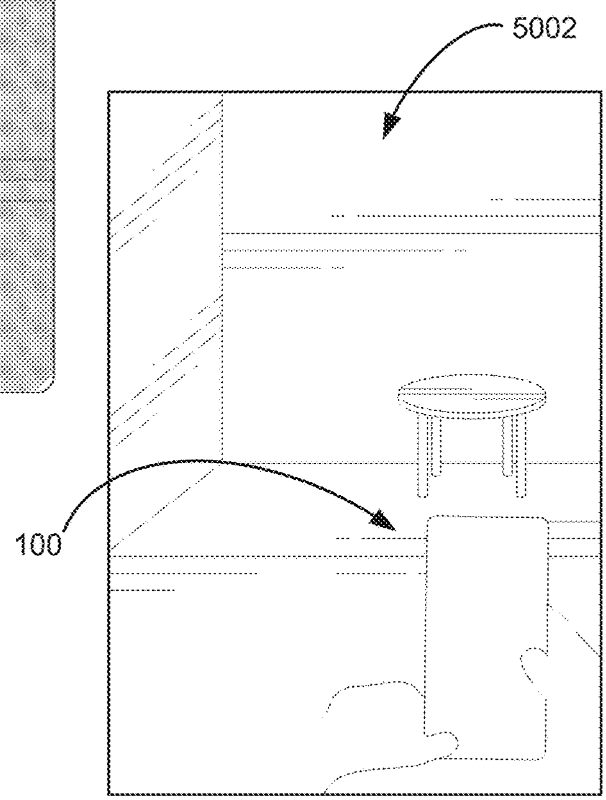
Figures 1, 12H:
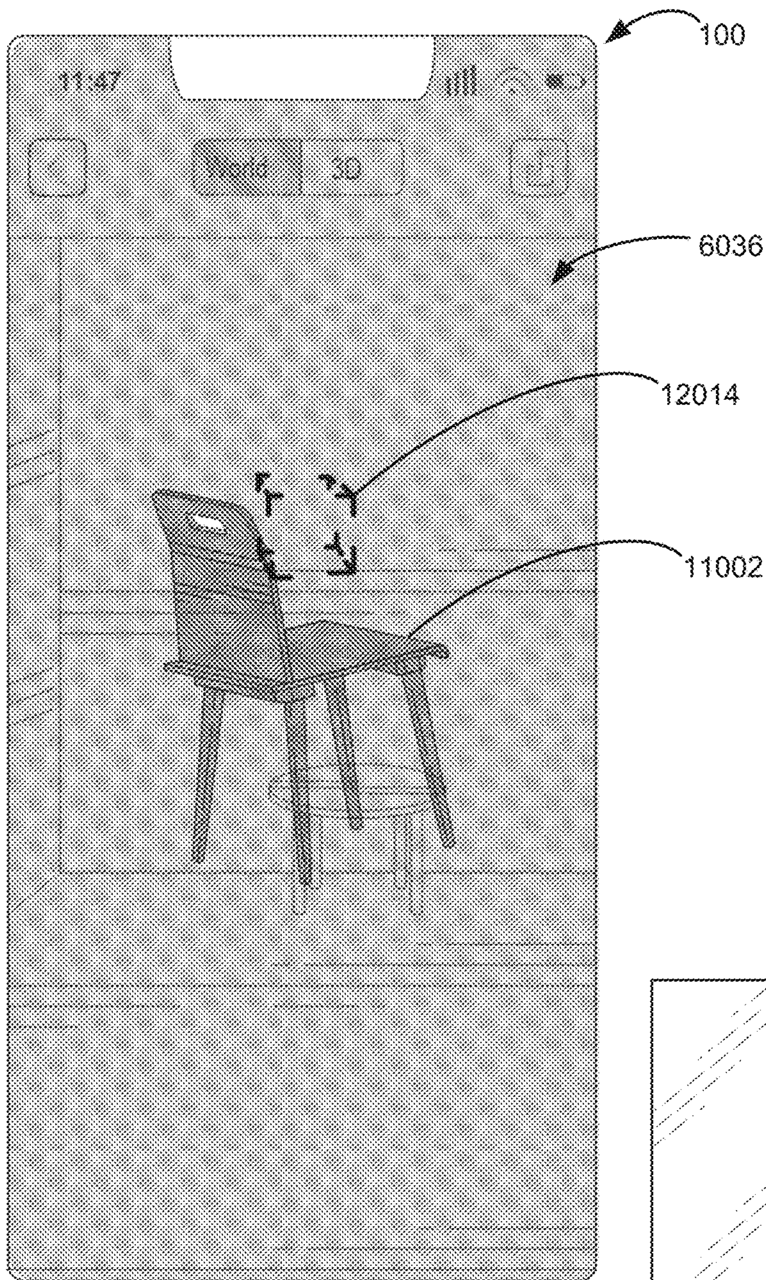
Figures 2, 12H:
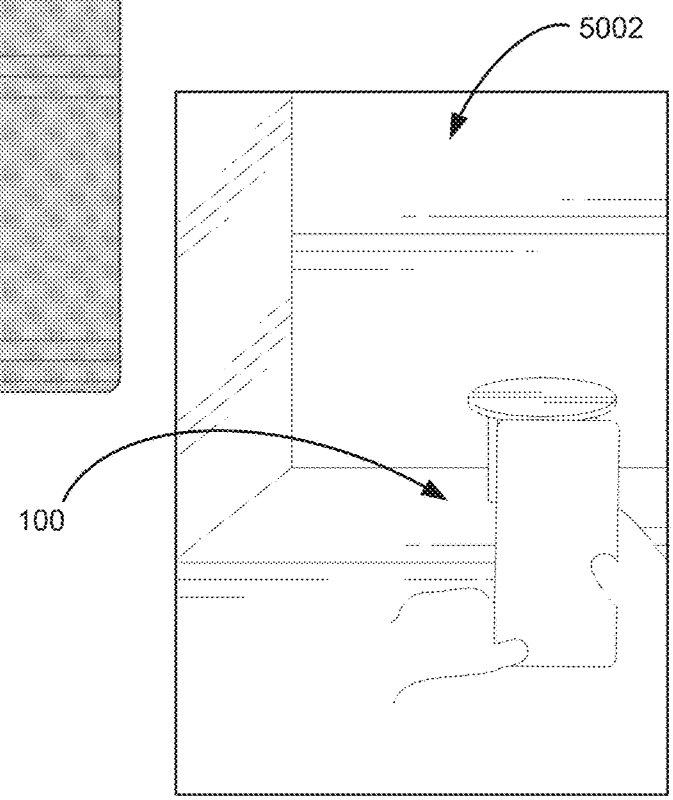
Figures 1, 12I:
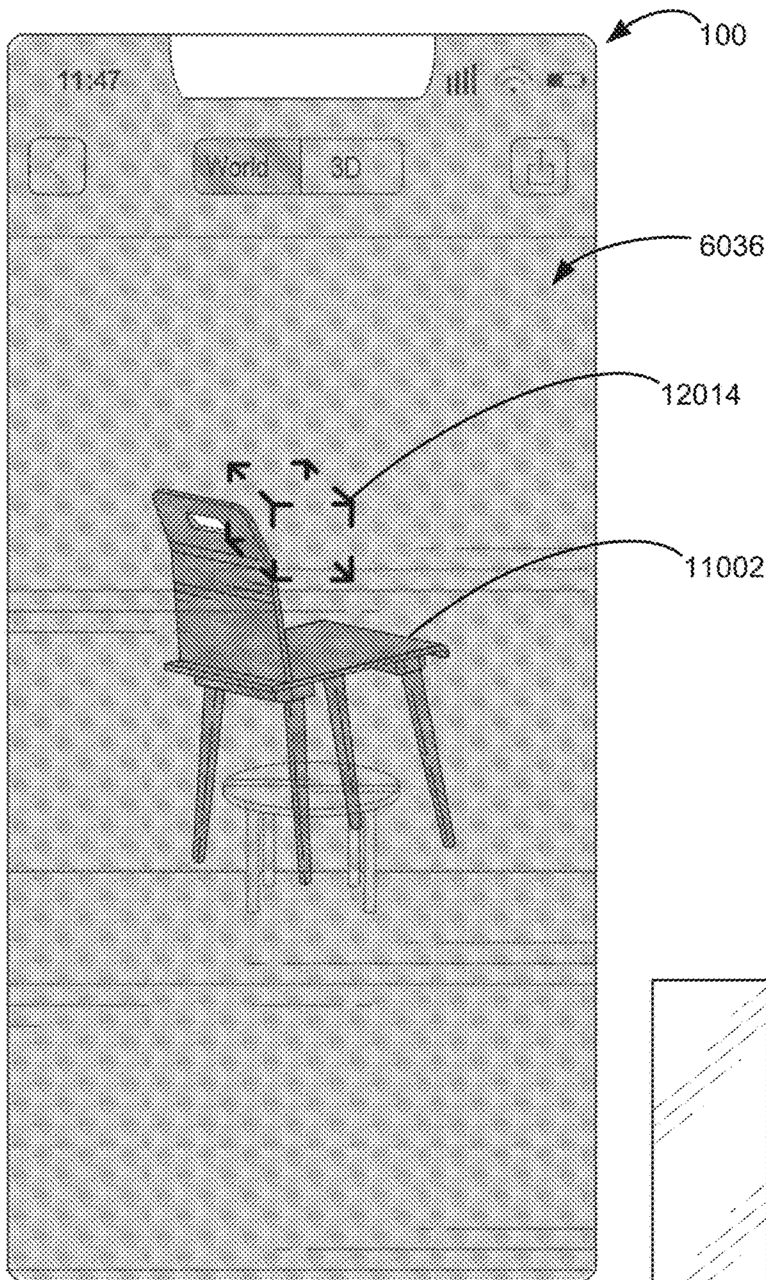
Figures 2, 12I:
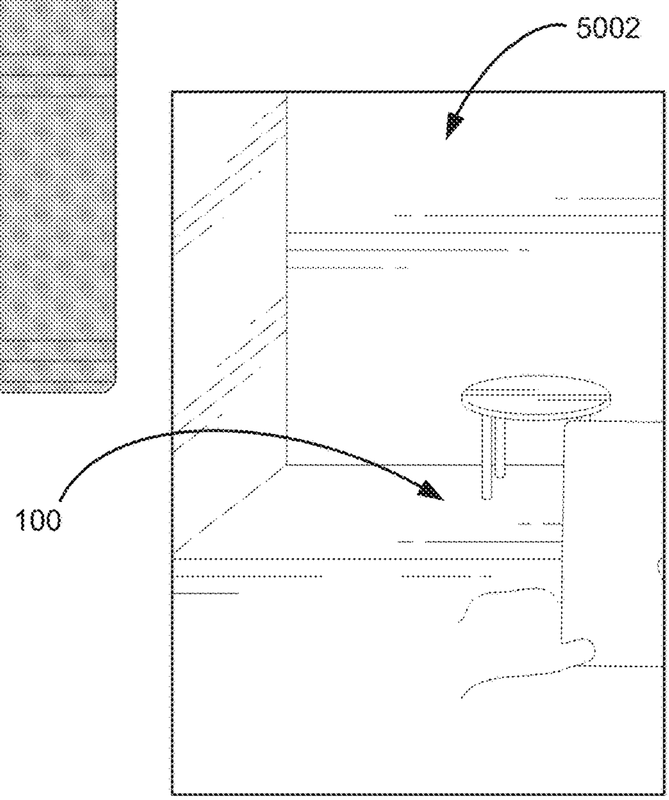

FIGS. 12E-1 to 12I-1 illustrate behavior of calibration user interface object 12014 that corresponds to movement of device 100 relative to physical environment 5002, as illustrated in FIGS. 12E-2 to 12I-2, respectively. Calibration user interface object 12014 in animated (e.g., the outline of the cube rotates) in response to movement (e.g., lateral movement) of device 100 (e.g., to provide feedback to the user regarding movement that is helpful for calibration). In FIG. 12E-1, calibration user interface object 12014 is shown with a first angle of rotation in the user interface that includes field of view 6036 of the camera(s) of device 100. In FIG. 12E-2, device 100 is shown, held by the user's hands 5006, at a first position relative to physical environment 5002. From FIG. 12E-2 to FIG. 12F-2, the device 100 has moved laterally (to the right) relative to physical environment 5002. As a result of the movement, the field of view 6036 of the camera(s) as displayed by device 100 is updated and calibration user interface object 12014 has rotated (relative to its position in FIG. 12E-1), as shown in FIG. 12F-1. From FIG. 12F-2 to FIG. 12G-2, the device 100 has continued its rightward movement relative to physical environment 5002. As a result of the movement, the field of view 6036 of the camera(s) as displayed by device 100 is again updated and calibration user interface object 12014 is further rotated, as shown in FIG. 12G-1. From FIG. 12G-2 to FIG. 12H-2, the device 100 has moved upward relative to physical environment 5002. As a result of the movement, the field of view 6036 of the camera(s) as displayed by device 100 is updated. As illustrated in FIG. 12G-1 to FIG. 12H-1, calibration user interface object 12014 does not rotate in response to the upward movement of the device illustrated FIG. 12G-2 to FIG. 12H-2 (e.g., to provide an indication to the user that vertical movement of the device is not contributing to the calibration). From FIG. 12H-2 to FIG. 12I-2, the device 100 has moved further rightward relative to physical environment 5002. As a result of the movement, the field of view 6036 of the camera(s) as displayed by device 100 is again updated and calibration user interface object 12014 is rotated, as shown in FIG. 12I-1.

Figure 12J:
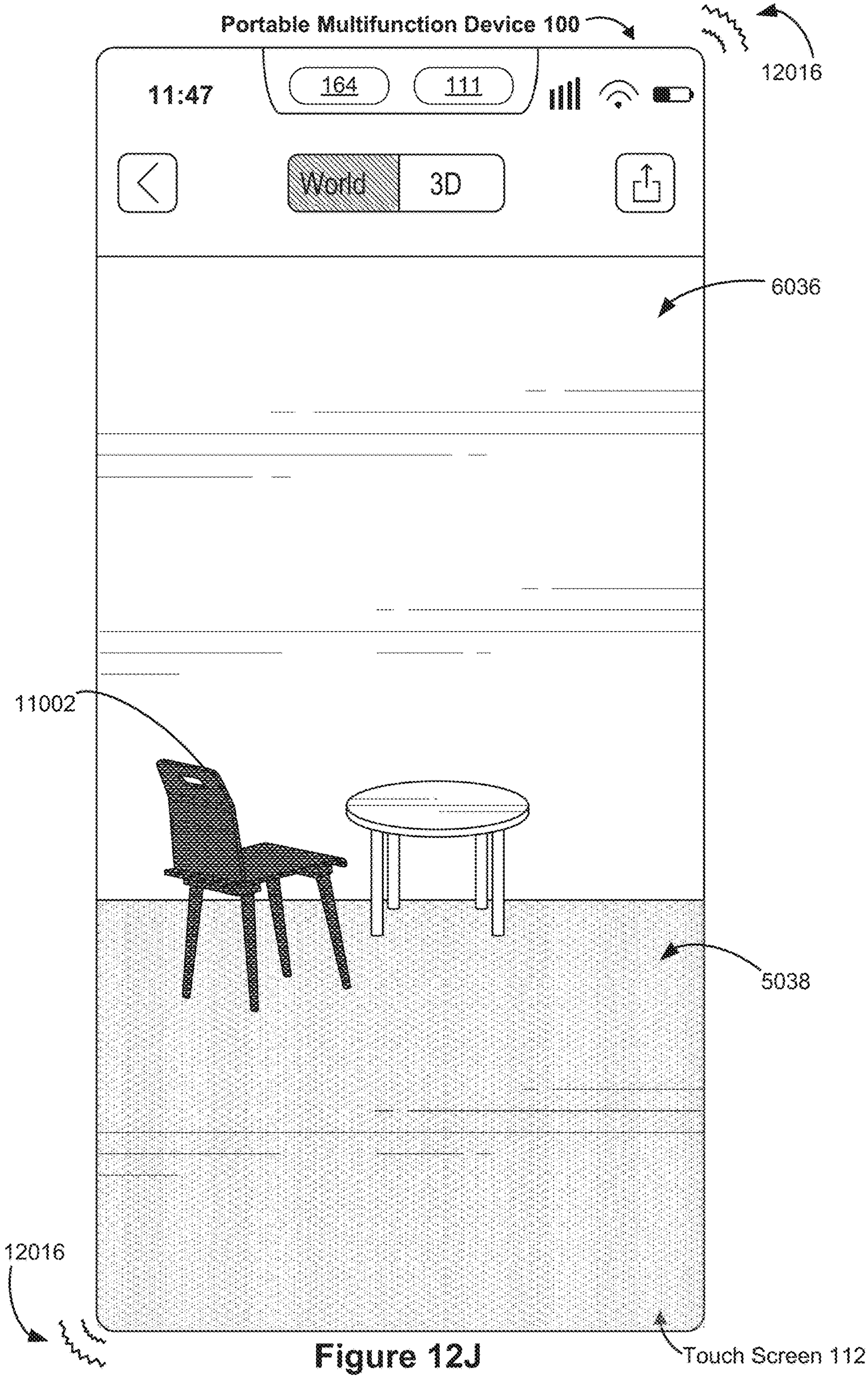

In FIG. 12J, the movement of device 100 (e.g., as illustrated in FIGS. 12E-12I) has satisfied the required calibration (e.g., and a plane that corresponds to virtual object 11002 has been detected in the field of view 6036 of the camera(s)). Virtual object 11002 is placed on the detected plane and the field of view 6036 of the camera(s) ceases to be blurred. Tactile output generators output a tactile output (as illustrated at 12016) to indicate that the plane (e.g., a floor surface 5038) has been detected in the field of view 6036 of the camera(s). The floor surface 5038 is highlighted to provide an indication of the plane that has been detected.

Figures 1, 12K:
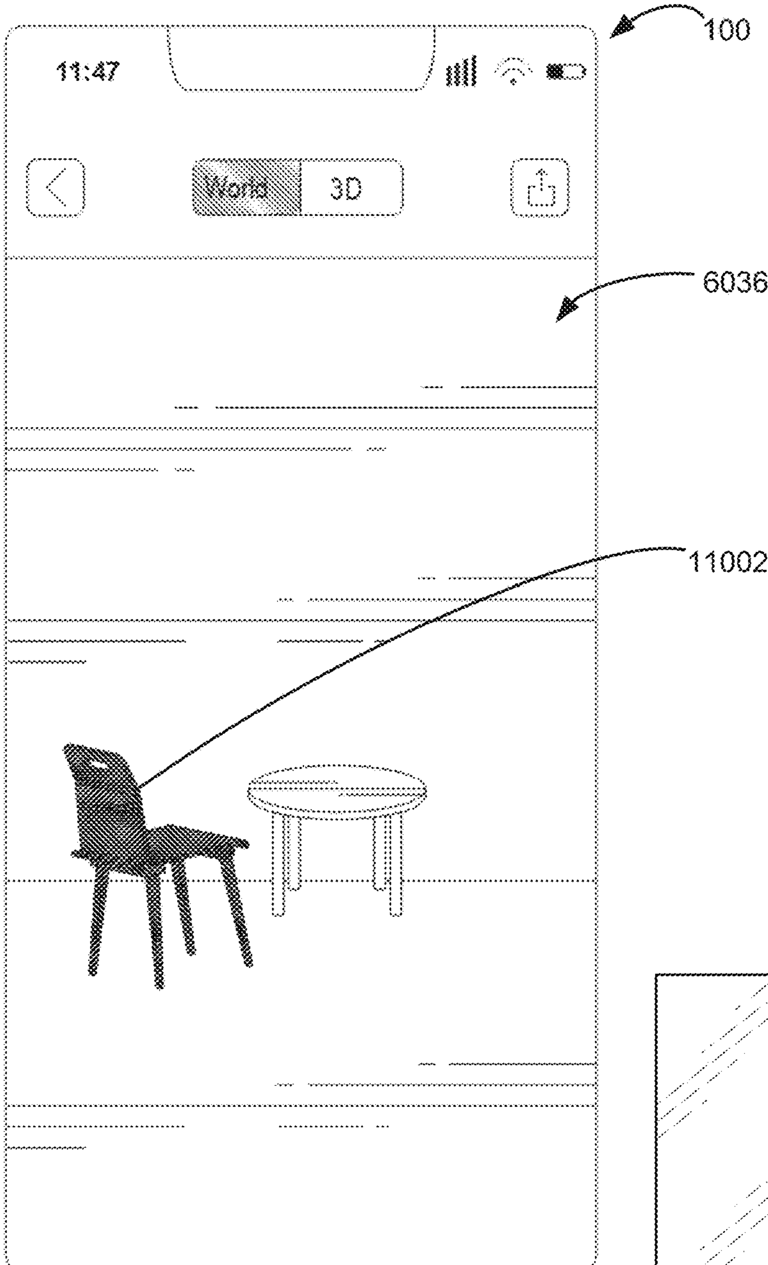
Figures 2, 12K:
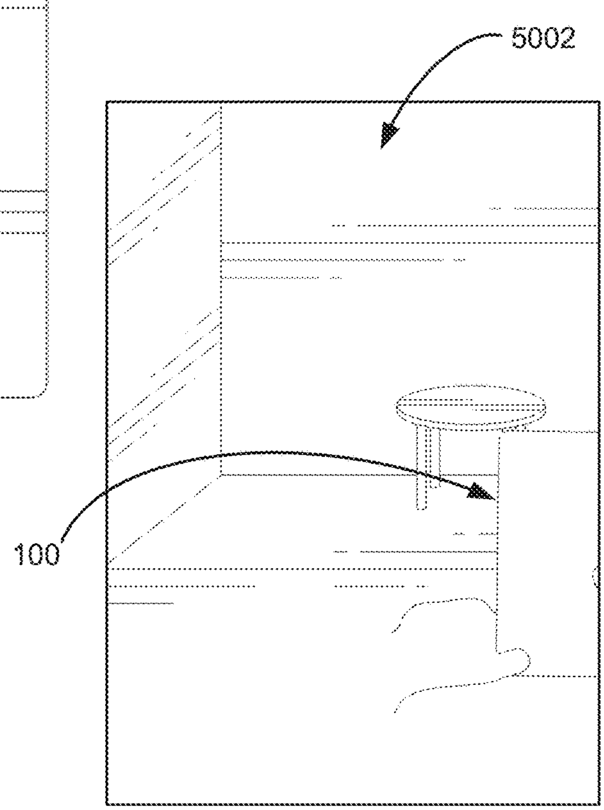
Figures 1, 12L:
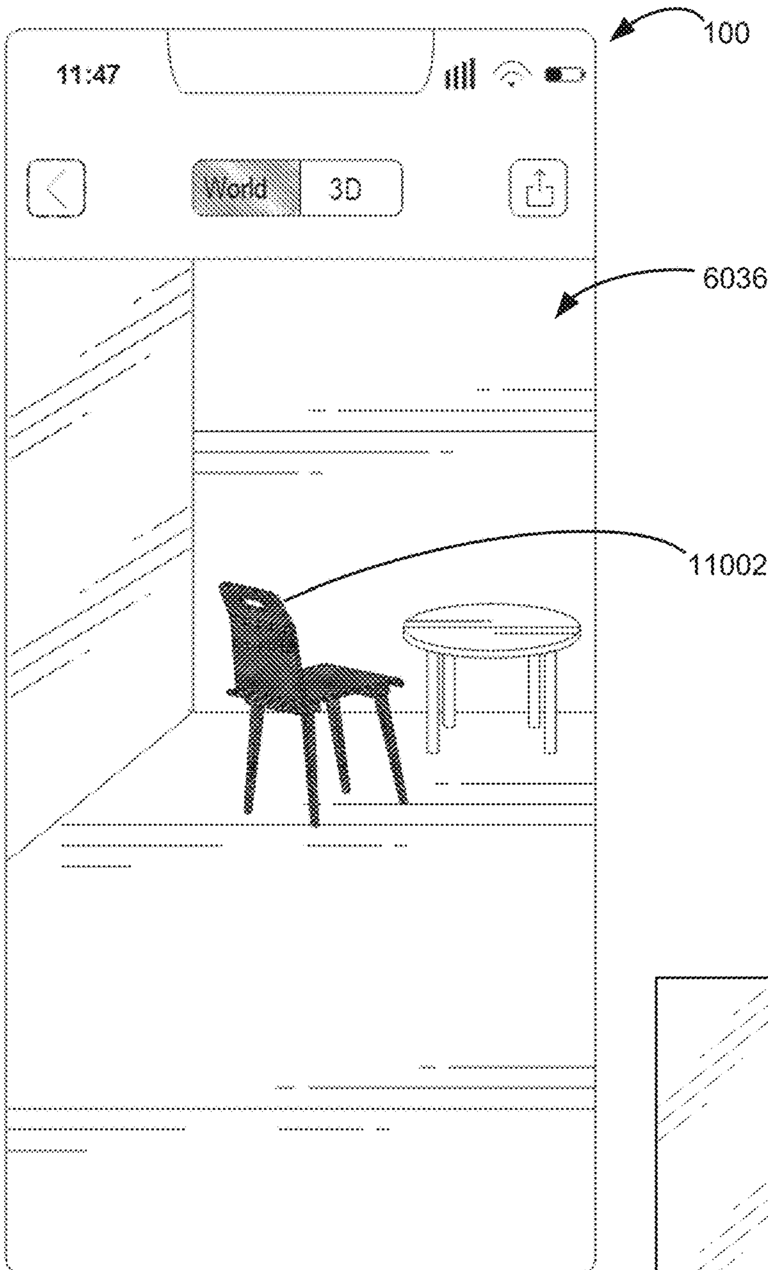
Figures 2, 12L:
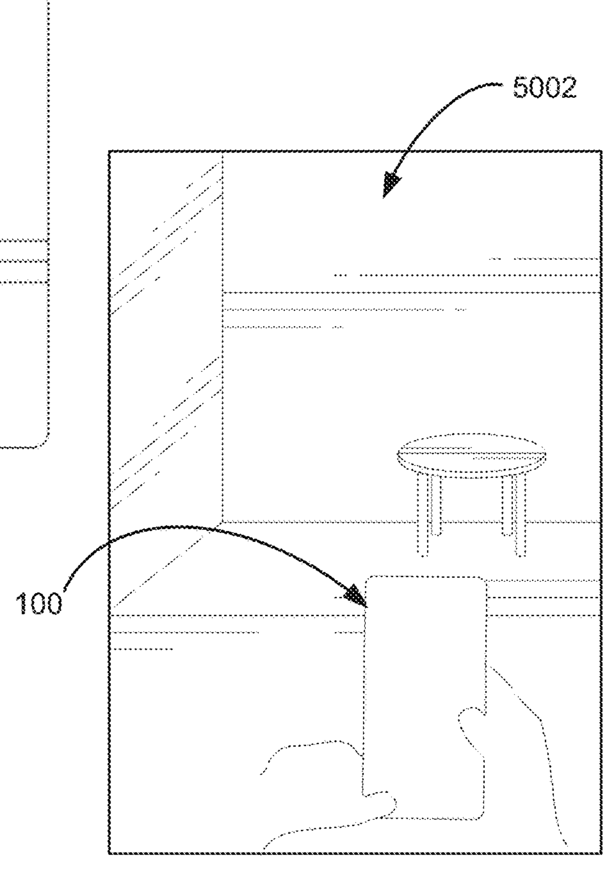

When the virtual object 11002 has been placed at a position relative to a plane detected in field of view 6036 of the camera(s), virtual object 11002 remains at a fixed position relative to physical environment 5002 captured by the one or more cameras. As device 100 is moved relative to physical environment 5002 (as shown in FIG. 12K-2 to FIG. 12L-2), virtual object 11002 remains at a fixed position relative to the physical environment 5002 (as shown in FIG. 12K-1 to 12L-1).

FIGS. 13A-13M illustrate example user interfaces for constraining rotation of a virtual object about an axis. The user interfaces in these figures are used to illustrate the processes described below, including the processes in FIGS. 8A-8E, 9A-9D, 10A-10D, 16A-16G, 17A-17D, 18A-18I, 19A-19H, and 20A-20F. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

Figure 13A:
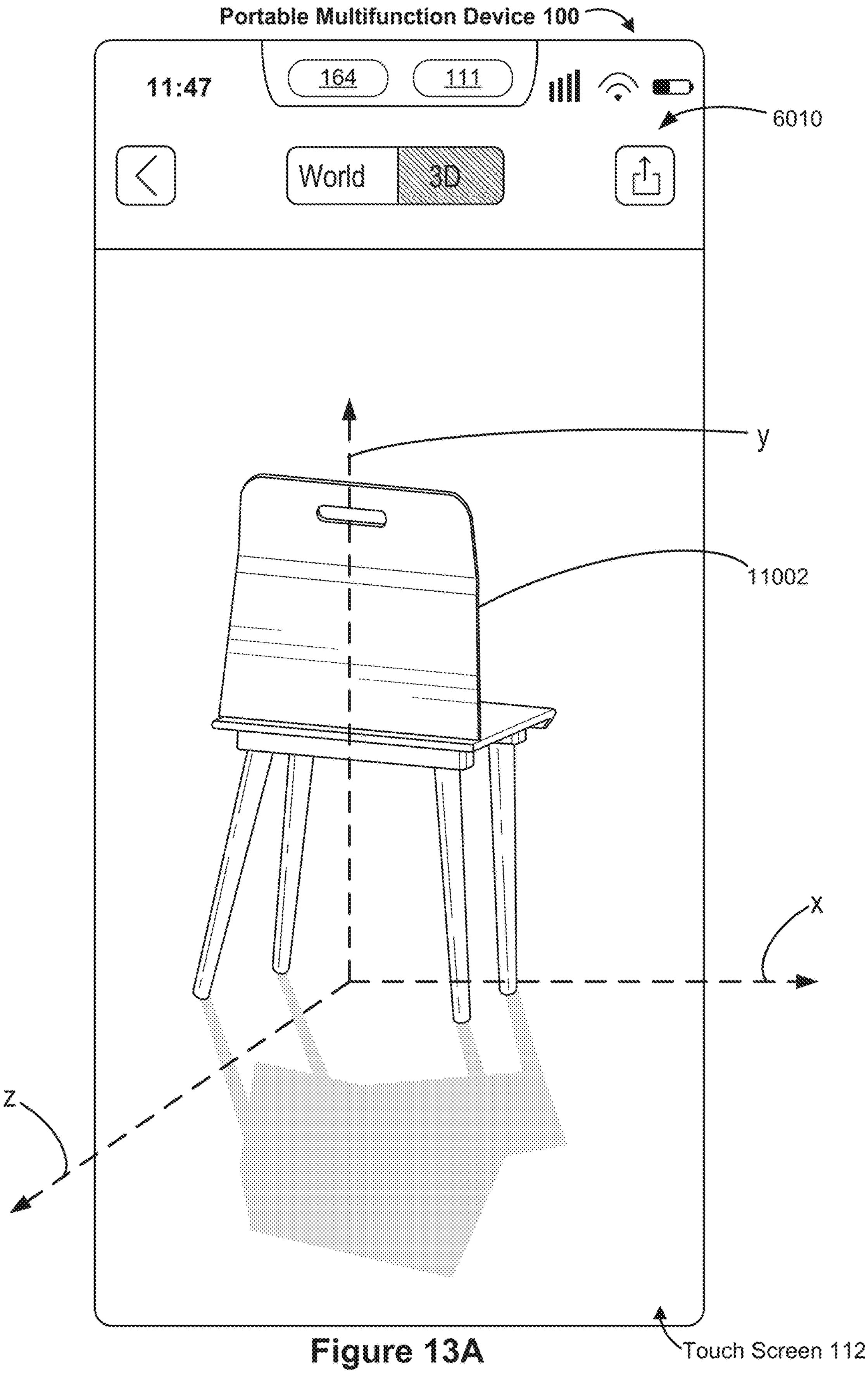
FIGS. 13A-13M illustrate example user interfaces for constraining rotation of a virtual object about an axis, in accordance with some embodiments.

In FIG. 13A, virtual object 11002 is shown in staging user interface 6010. An x-axis, y-axis, and z-axis are shown relative to the virtual object 11002.

Figure 13B:
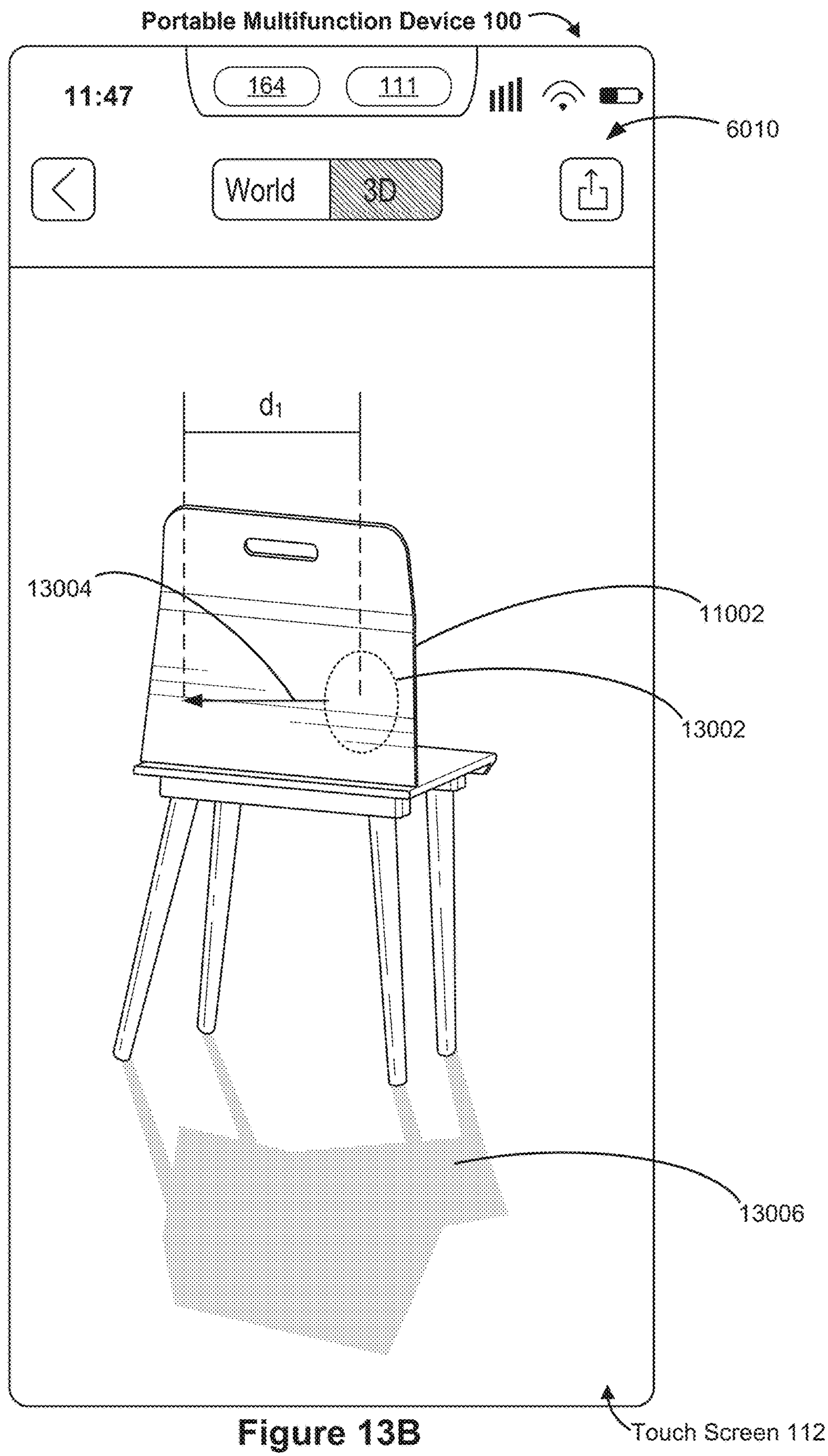
Figure 13C:
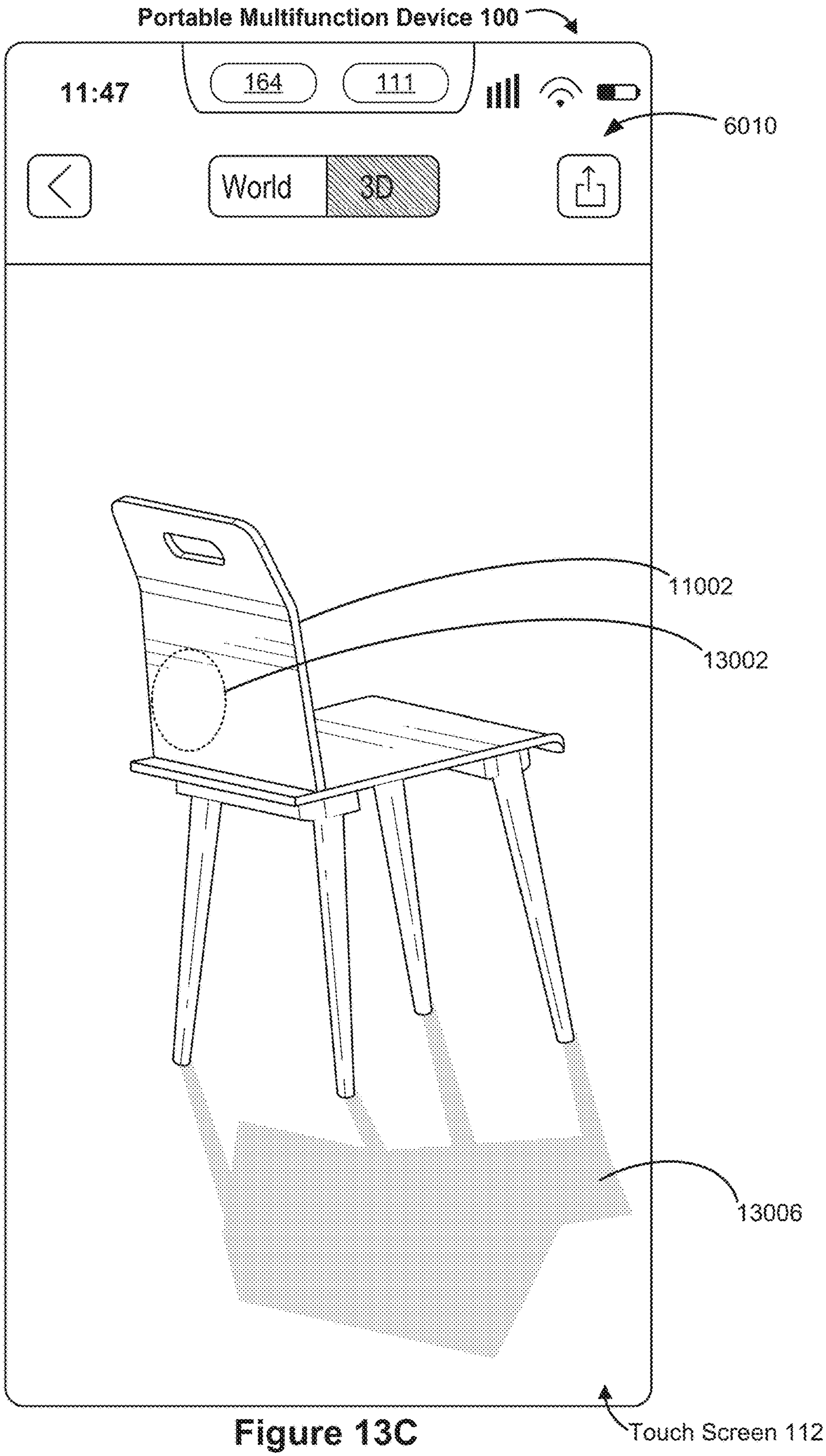

FIGS. 13B-13C illustrate input to rotate virtual object 11002 about the y-axis indicated in FIG. 13A. In FIG. 13B, an input by contact 13002 is detected at a location that corresponds to virtual object 11002. The input moves by a distance $d_1$ along a path indicated by arrow 13004. As the input moves along the path, the virtual object 11002 rotates about the y-axis (e.g., by 35 degrees) to a position indicated in FIG. 13B. In the staging user interface 6010, shadow 13006 that corresponds to virtual object 11002 is displayed. From FIG. 13B to FIG. 13C, shadow 13006 changes in accordance with the changed position of virtual object 11002.

Figure 13D:
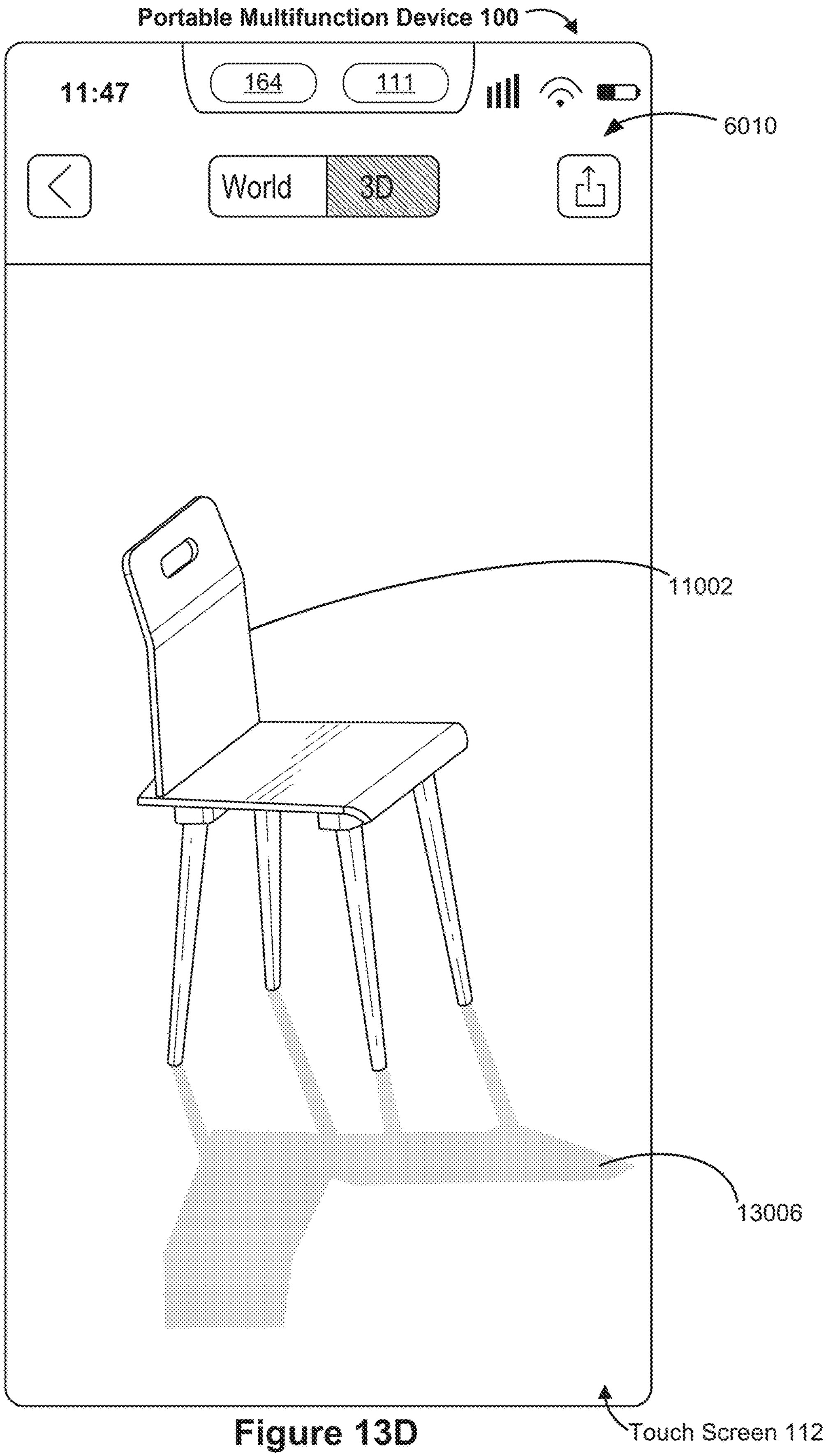

After contact 13002 lifts off of touch screen 112, virtual object 11002 continues rotating, as shown in FIGS. 13C-13D (e.g., in accordance with the "momentum" imparted by the movement of contact 13002, to provide the impression the virtual object 11002 behaves like a physical object).

Figure 13E:
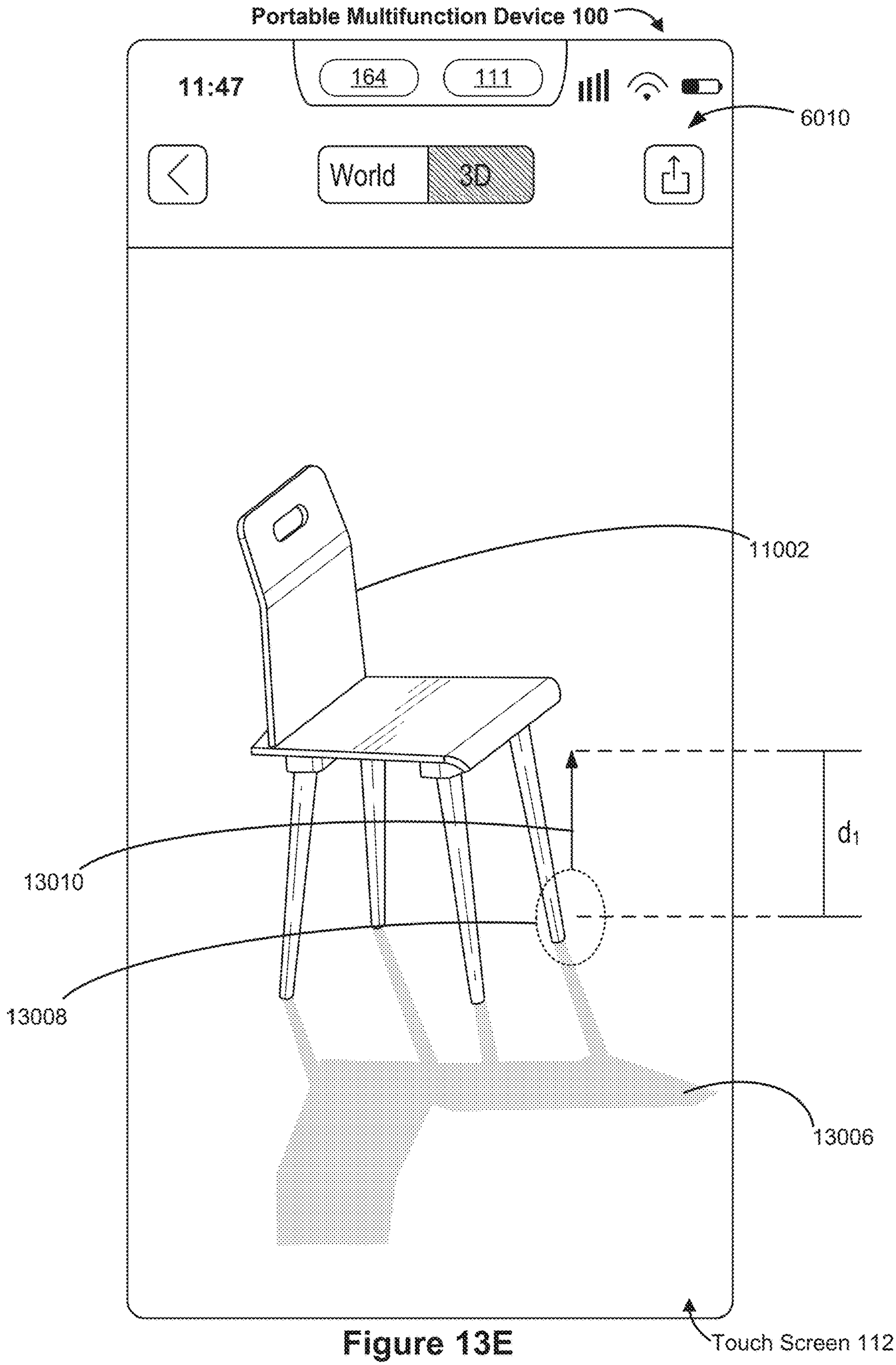
Figure 13F:
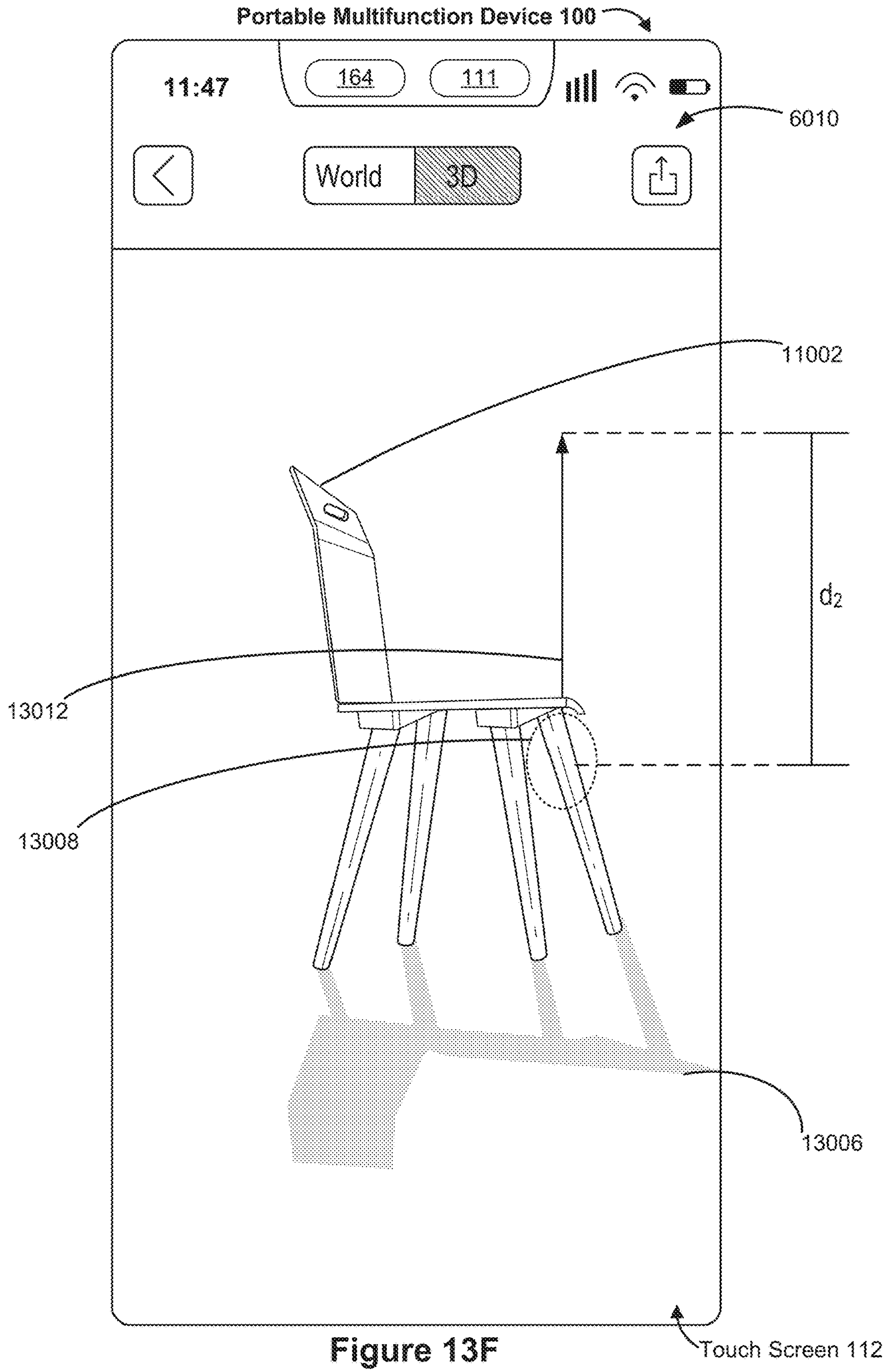

FIGS. 13E-13F illustrate input to rotate the virtual object 11002 about the x-axis indicated in FIG. 13A. In FIG. 13E, an input by contact 13008 is detected at a location that corresponds to virtual object 11002. The input moves by a distance $d_1$ along a path indicated by arrow 13010. As the input moves along the path, the virtual object 11002 rotates about the x-axis (e.g., by five degrees) to a position indicated in FIG. 13F. Although contact 13008 moves by the same distance $d_1$ along the x-axis in FIGS. 13E-13F that contact 13002 moved from 13B-13C, the angle of rotation of virtual object 11002 about the x-axis in FIGS. 13E-13F is less than the angle of rotation of virtual object 11002 about the y-axis in FIGS. 13B-13C.

Figure 13G:
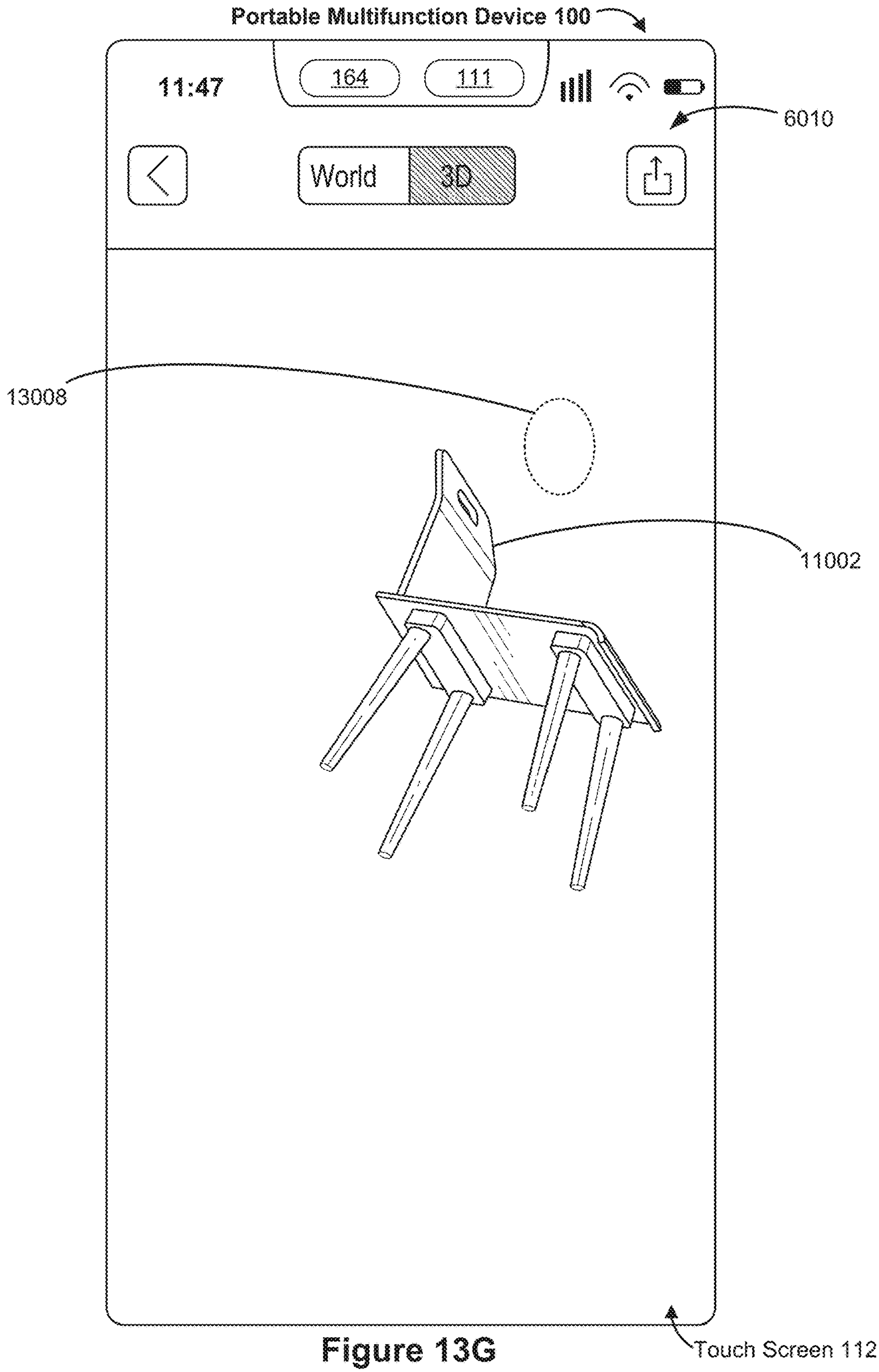

FIGS. 13F-13G illustrate further input to rotate the virtual object 11002 about the x-axis indicated in FIG. 13A. In FIG. 13F, contact 13008 continues its movement, moving by a distance $d_2$ (greater than distance $d_1$) along a path indicated by arrow 13012. As the input moves along the path, the virtual object 11002 rotates about the x-axis (by 25 degrees) to a position indicated in FIG. 13G. As illustrated in FIGS. 13E-13G, movement of contact 13008 by a distance $d_1+d_2$ causes virtual object 11002 to rotate 30 degrees about the x-axis, whereas in FIGS. 13B-13C, movement of contact 13004 by a distance $d_1$ causes virtual object 11002 to rotate 35 degrees about the y-axis.

Figure 13H:
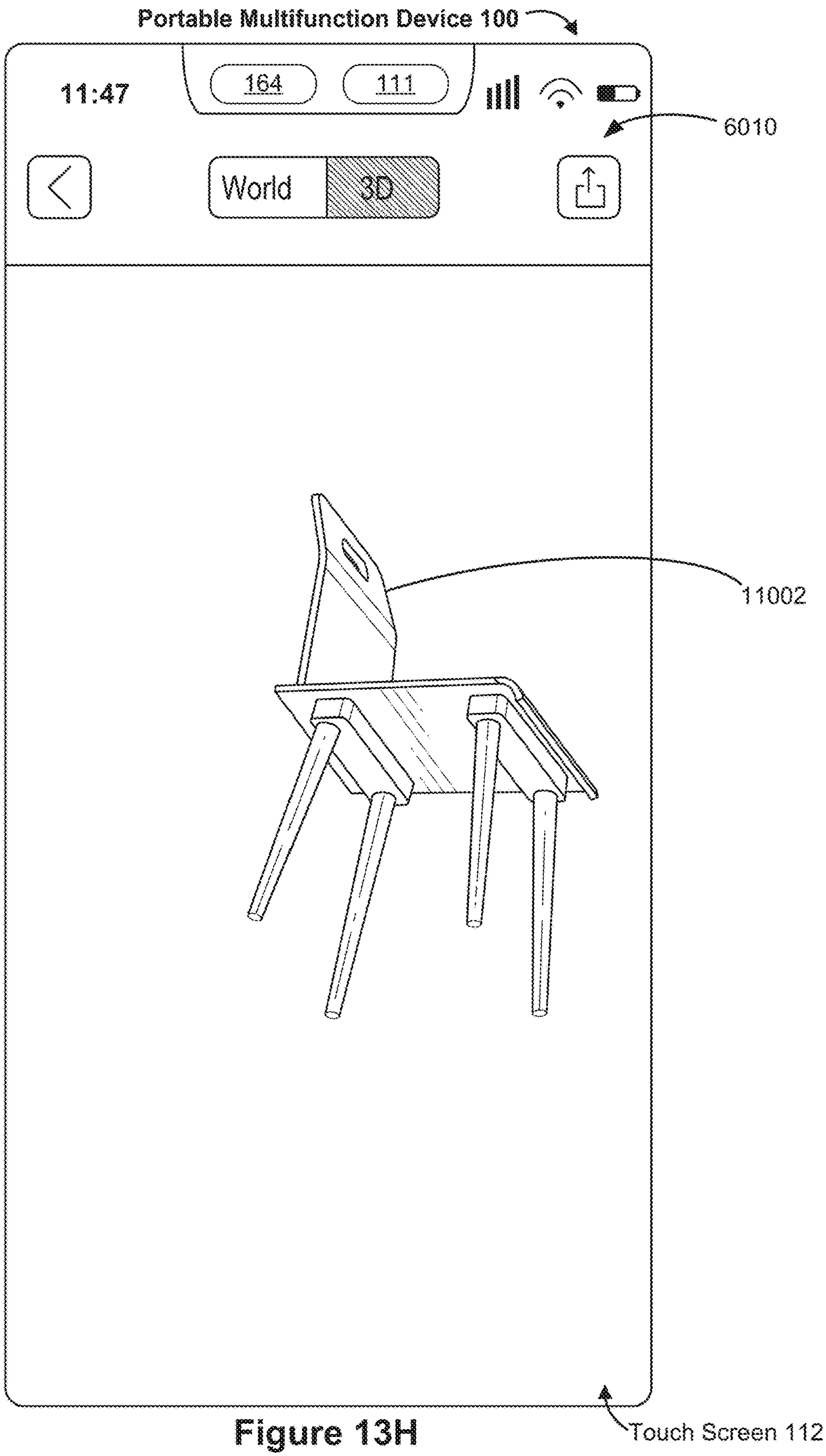

After contact 13008 lifts off of touch screen 112, virtual object 11002 rotates in a direction opposite to the direction of rotation caused by the movement of contact 13008, as shown in FIGS. 13G-13H (e.g., to indicate that movement of contact 13008 caused an amount of rotation of virtual object 11002 that reached beyond a rotation limit).

Figure 13I:
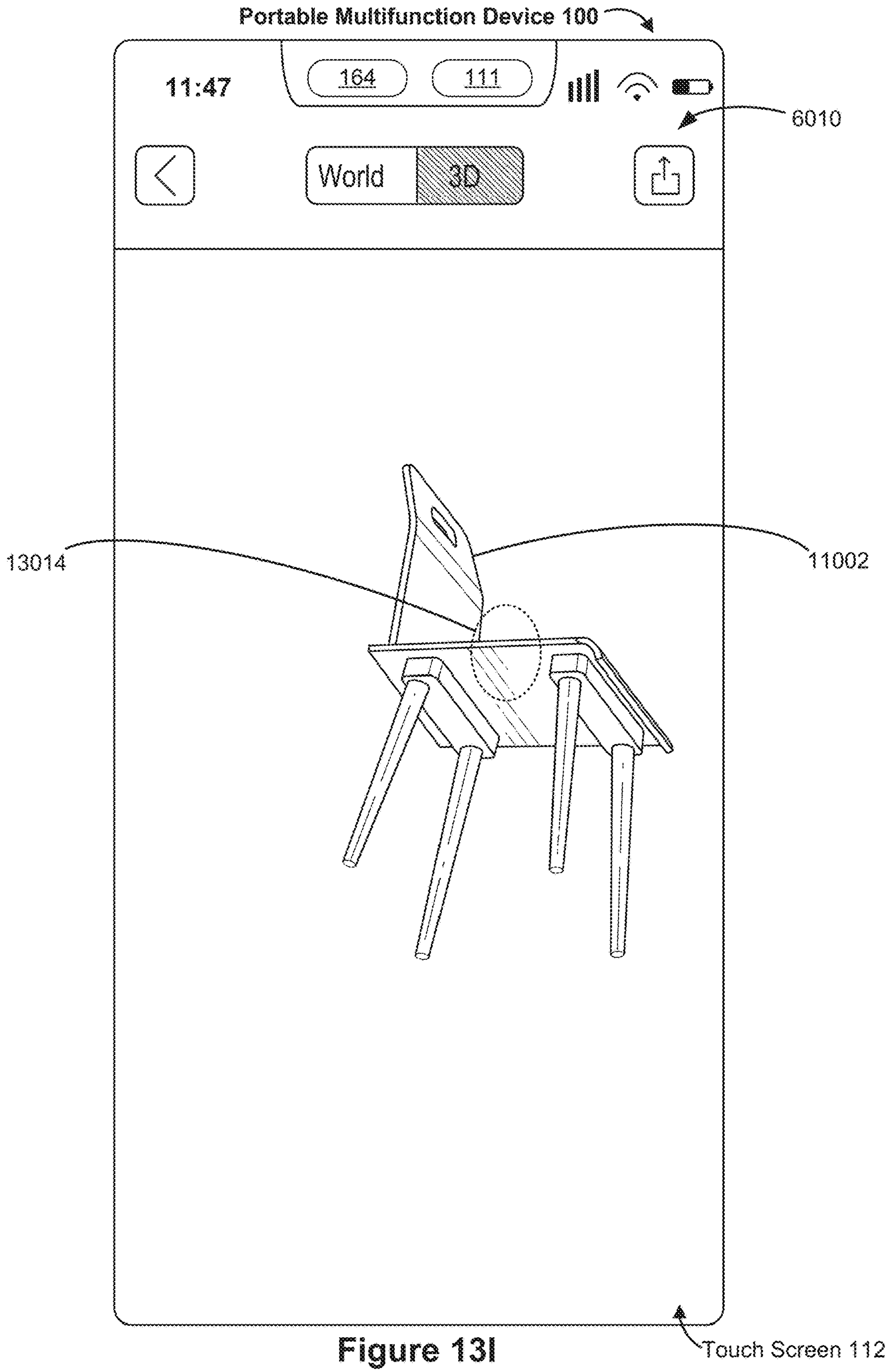

In FIGS. 13G-13I, shadow 13006 is not shown (e.g., because virtual object 11002 does not cast a shadow when the object is viewed from below).

Figure 13J:
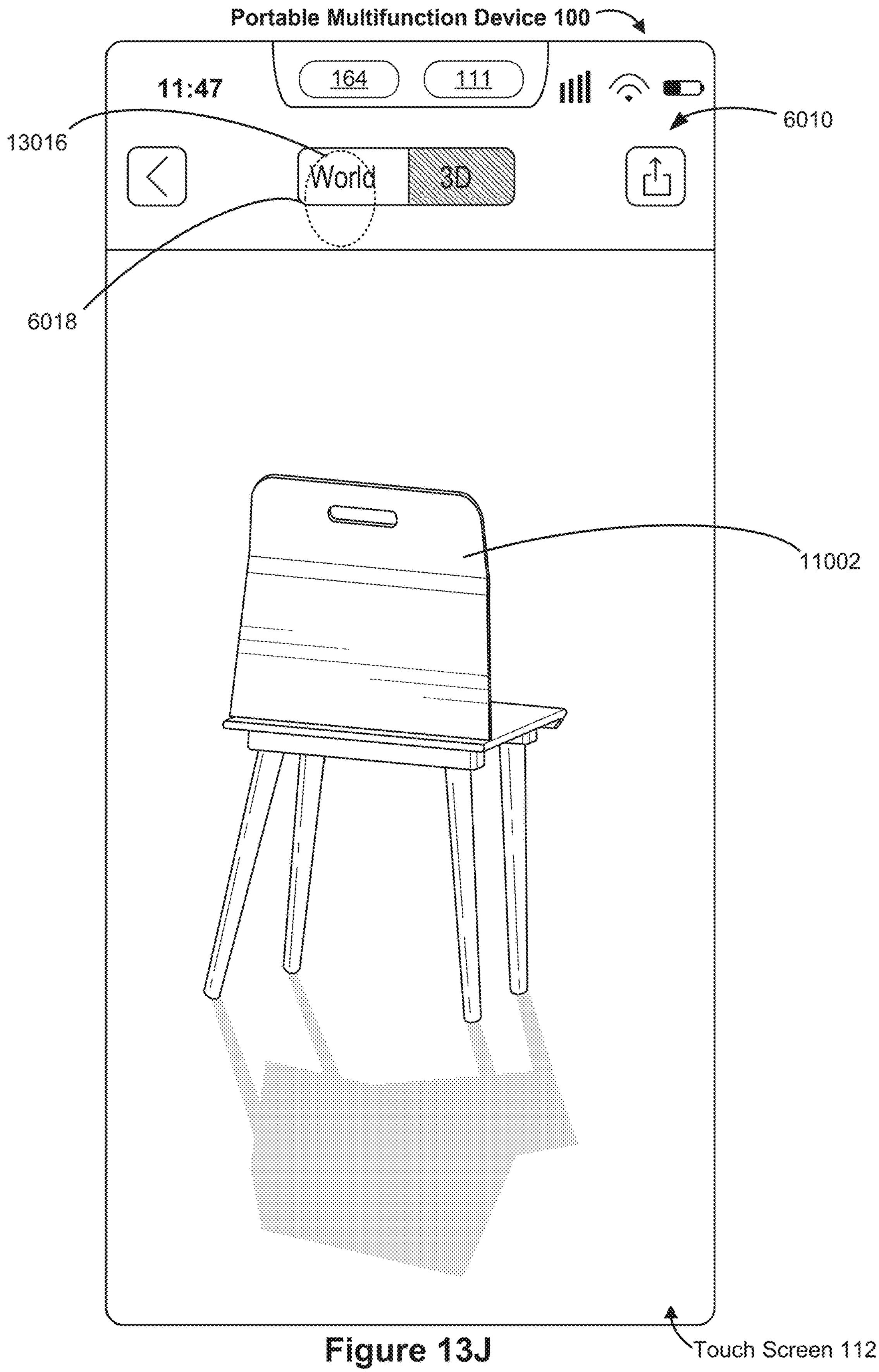

In FIG. 13I, an input (e.g., a double tap input) is detected for returning virtual object 11002 to a perspective with which it was originally displayed (e.g., as indicated in FIG. 13A). The input occurs at a location that corresponds to virtual object 11002, as indicated by contact 13014. In response to the input, virtual object 11002 is rotated about the y-axis (to reverse the rotation that occurred from FIGS. 13E-13H) and about the x-axis (to reverse the rotation that occurred from FIG. 13B-13D). In FIG. 13J, the input by contact 13016 has caused virtual object 11002 to return to the originally displayed perspective.

In some embodiments, input for adjusting the size of virtual object 11002 is received while staging user interface 6010 is displayed. For example, an input to adjust the size of virtual object 11002 is a de-pinch gesture (e.g., as described with regard to FIGS. 6N-6O) to increase the size of virtual object 11002 or a pinch gesture to decrease the size of virtual object 11002

In FIG. 13J, an input is received to replace display of staging user interface 6010 by display of a user interface that includes field of view 6036 of the camera(s). An input by contact 13016 is detected at a location that corresponds to toggle control 6018. In response to the input, display of staging user interface 6010 is replaced by a user interface that includes field of view 6036 of the camera(s), as shown in FIG. 13K.

Figure 13K:
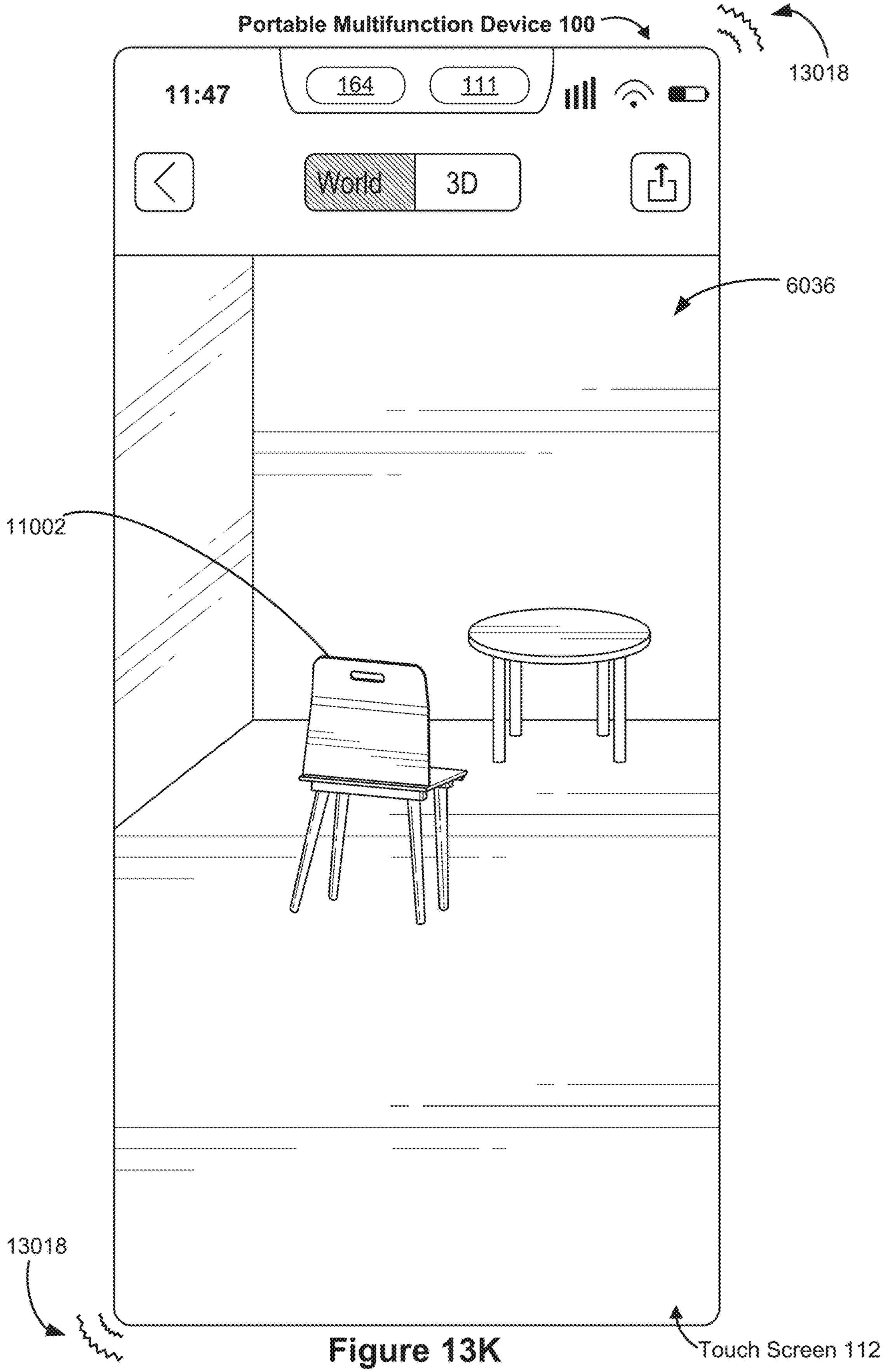

In FIG. 13K, virtual object 11002 is displayed in a user interface that includes field of view 6036 of the camera(s). A tactile output occurs (as illustrated at 13018) to indicate that a plane that corresponds to virtual object 11002 has been detected in field of view 6036 of the camera(s). The angle of rotation of virtual object 11002 in the user interface that includes field of view 6036 of the camera(s) corresponds to the angle of rotation of virtual object 11002 in staging user interface 6010.

Figure 13L:
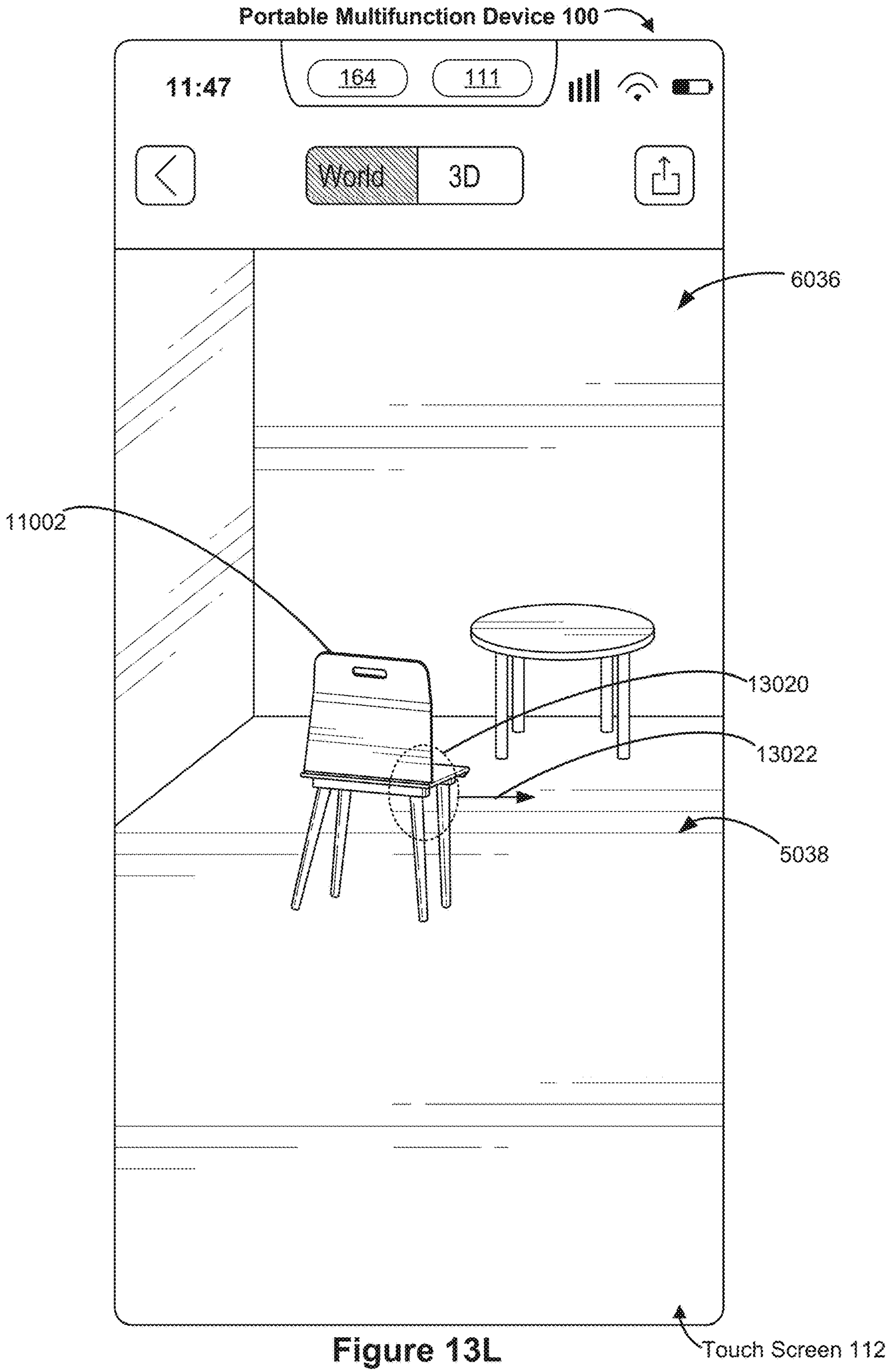
Figure 13M:
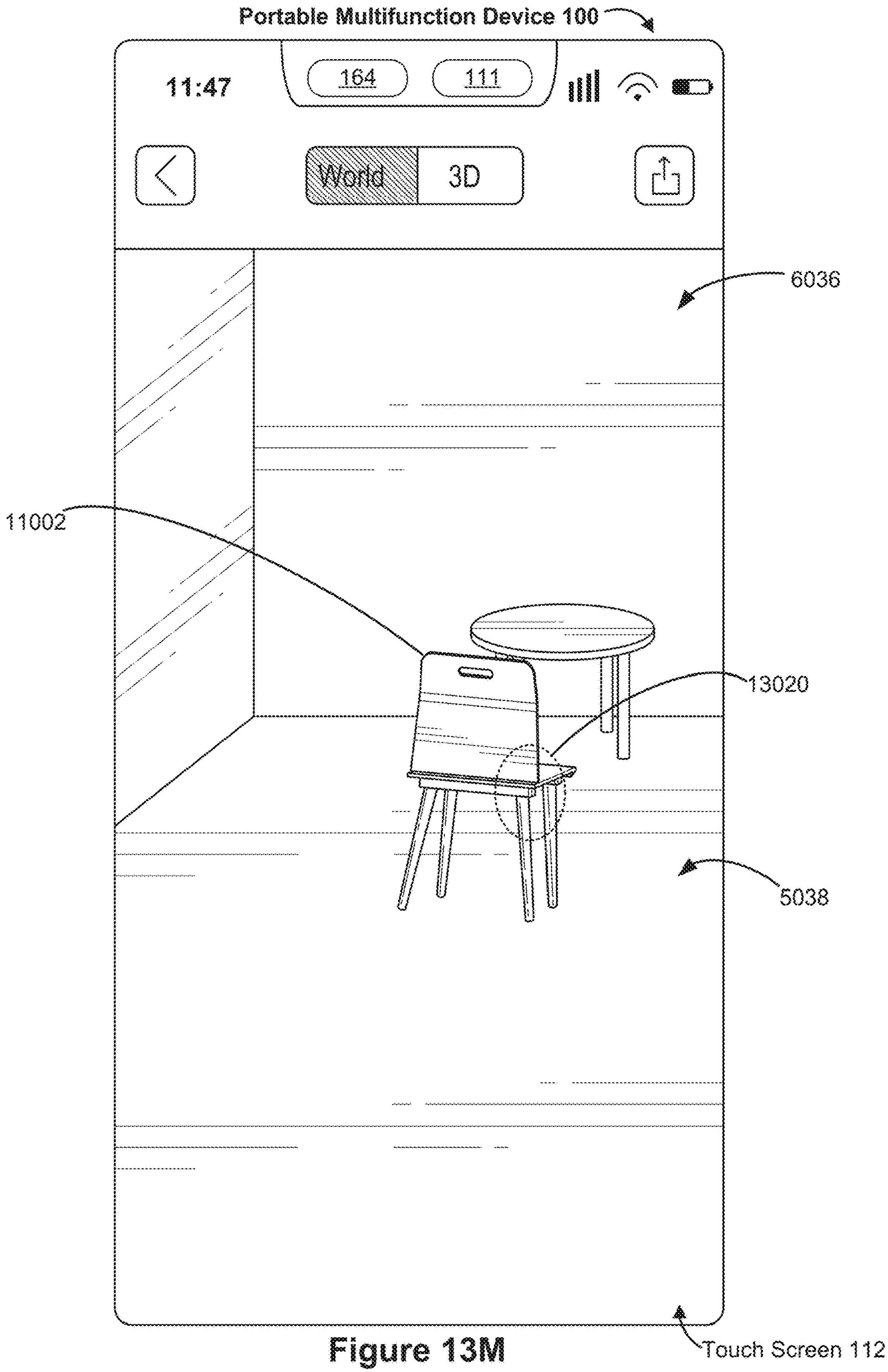

When the user interface that includes field of view 6036 of the camera(s) is displayed, an input that includes lateral movement causes lateral movement of virtual object 11002 in the user interface that includes field of view 6036 of the camera(s), as illustrated at FIGS. 13L-13M. In FIG. 13L, a contact 13020 is detected at a location that corresponds to virtual object 11002 and the contact moves along a path indicated by arrow 13022. As the contact moves, virtual object 11002 moves along a path that corresponds to movement of contact 13020 from a first position (as shown in FIG. 13L) to a second position (as shown in FIG. 13M).

In some embodiments, input provided when the user interface that includes field of view 6036 of the camera(s) is displayed can cause movement of virtual object 11002 from a first plane (e.g., floor plane 5038) to a second plane (e.g., table surface plane 5046), as described with regard to FIGS. 5AJ-5AM.

Figure 14B:
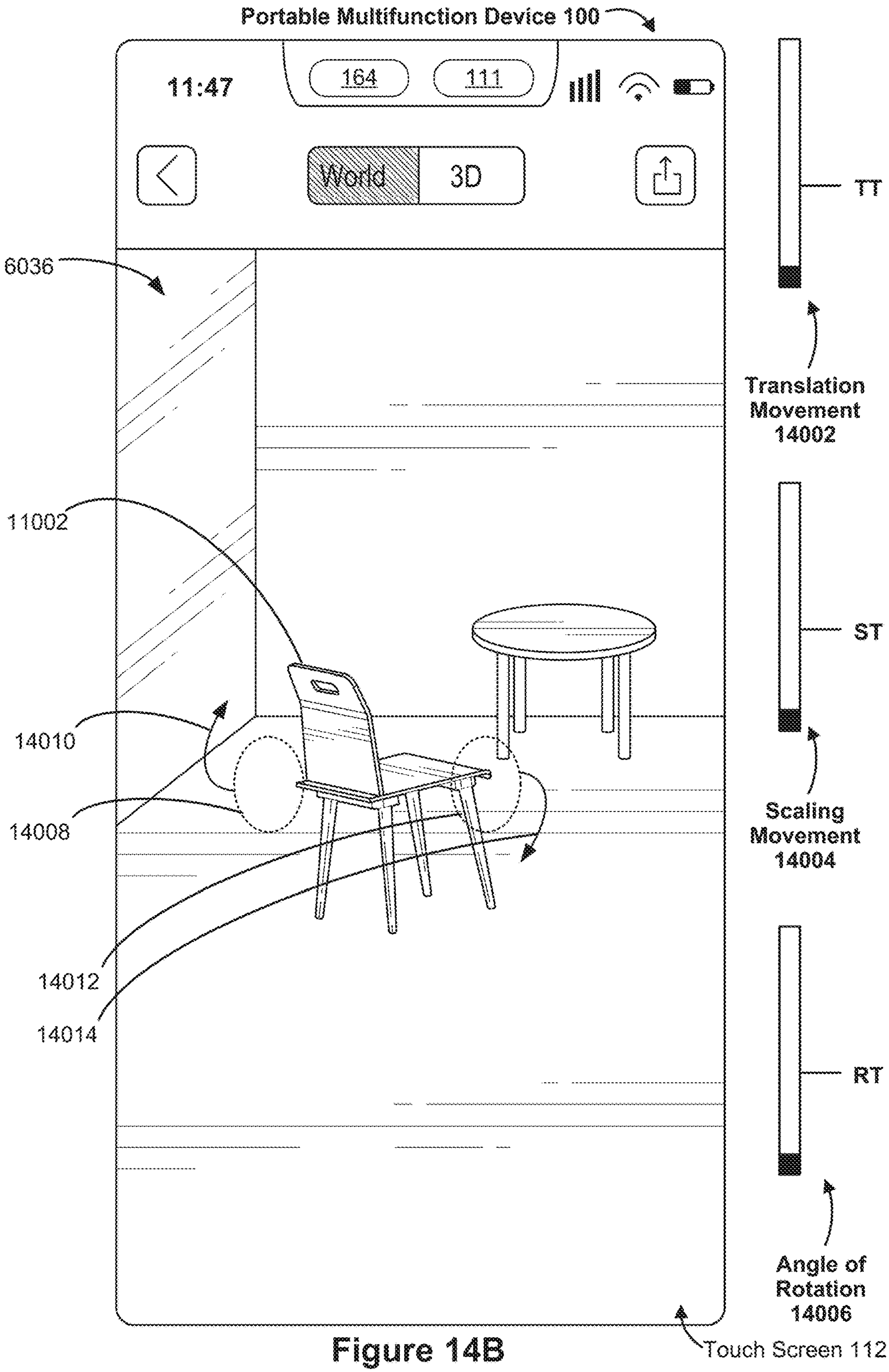
Figure 14C:
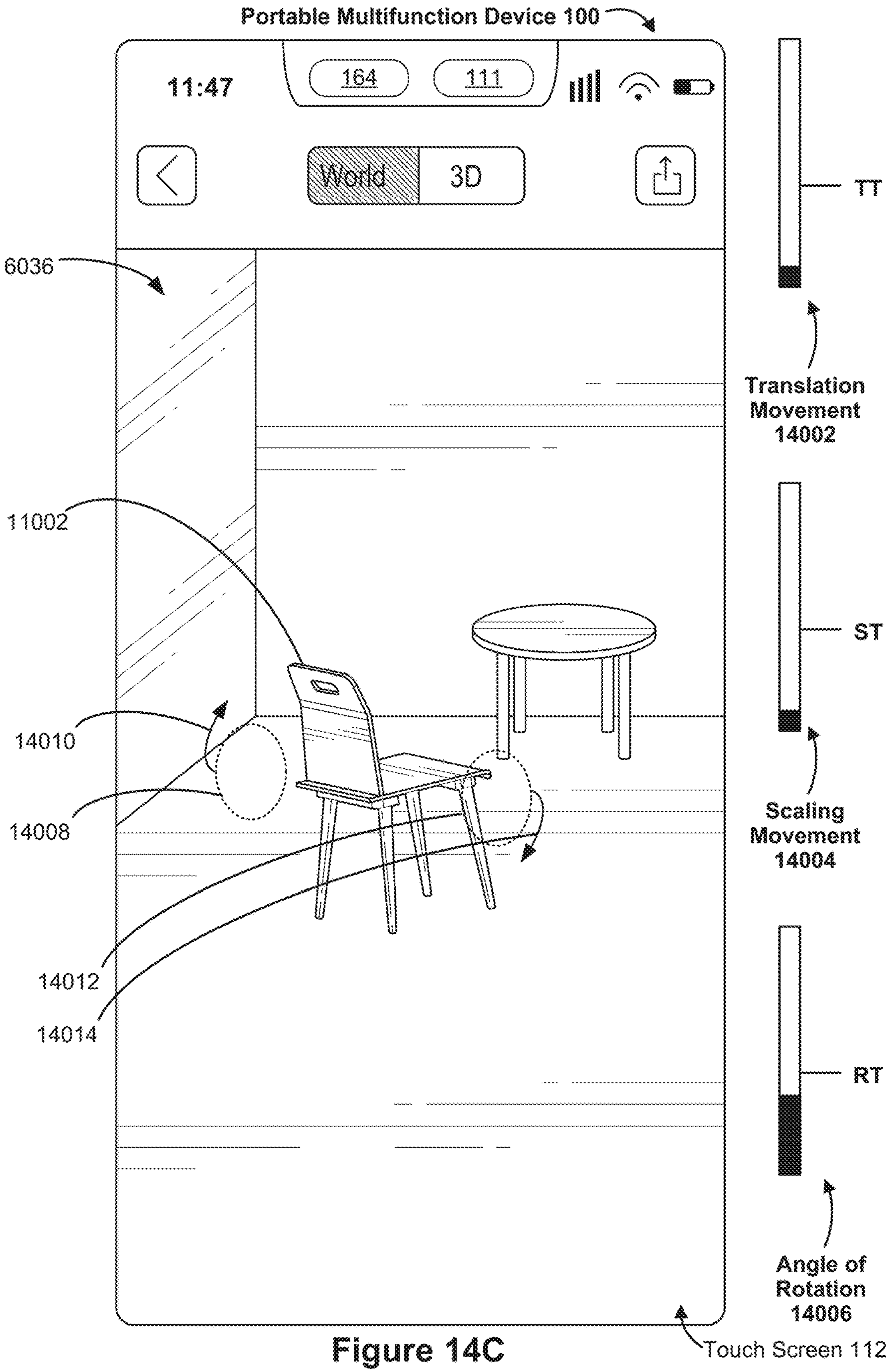
Figure 14D:
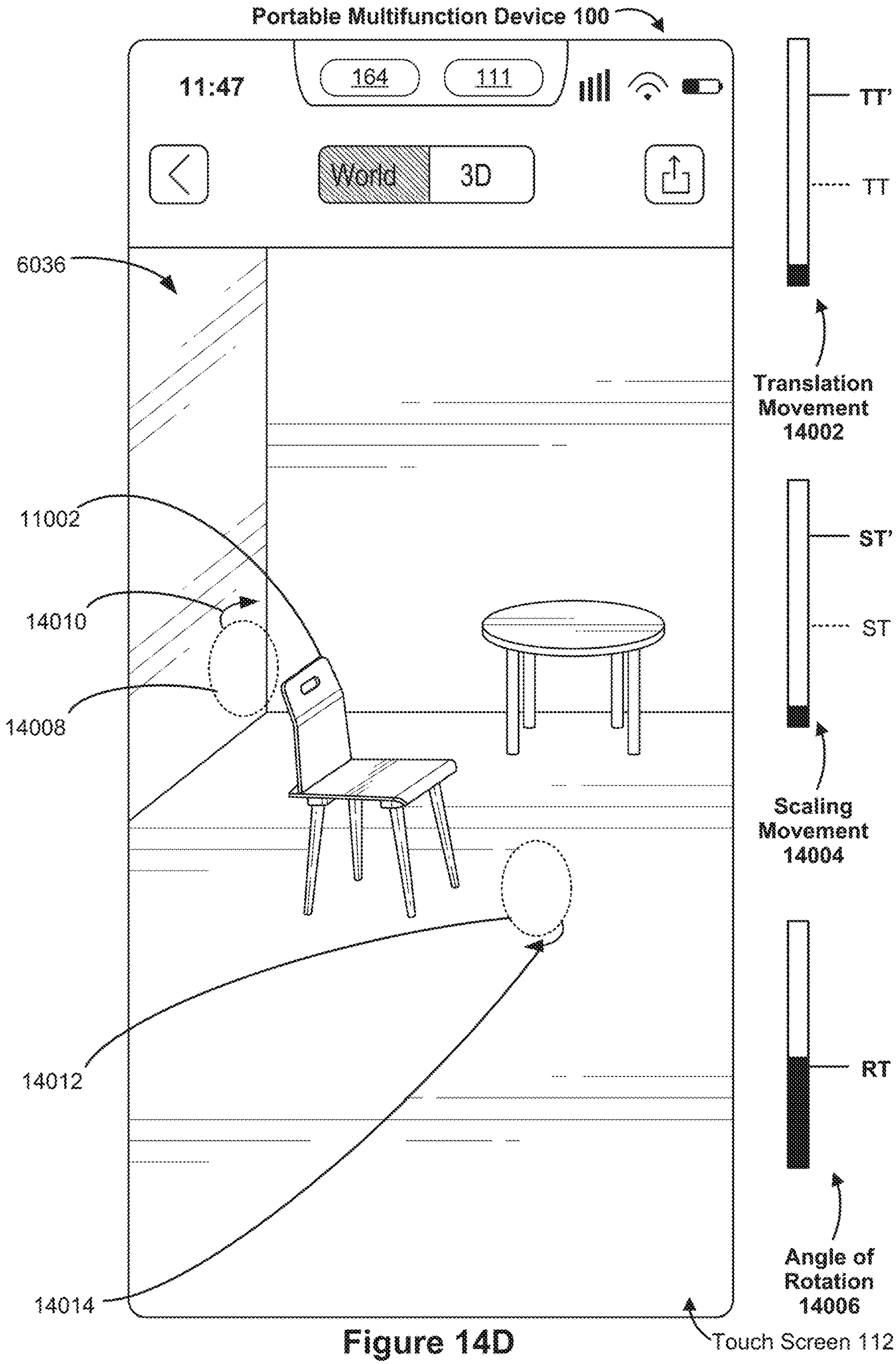
Figure 14E:
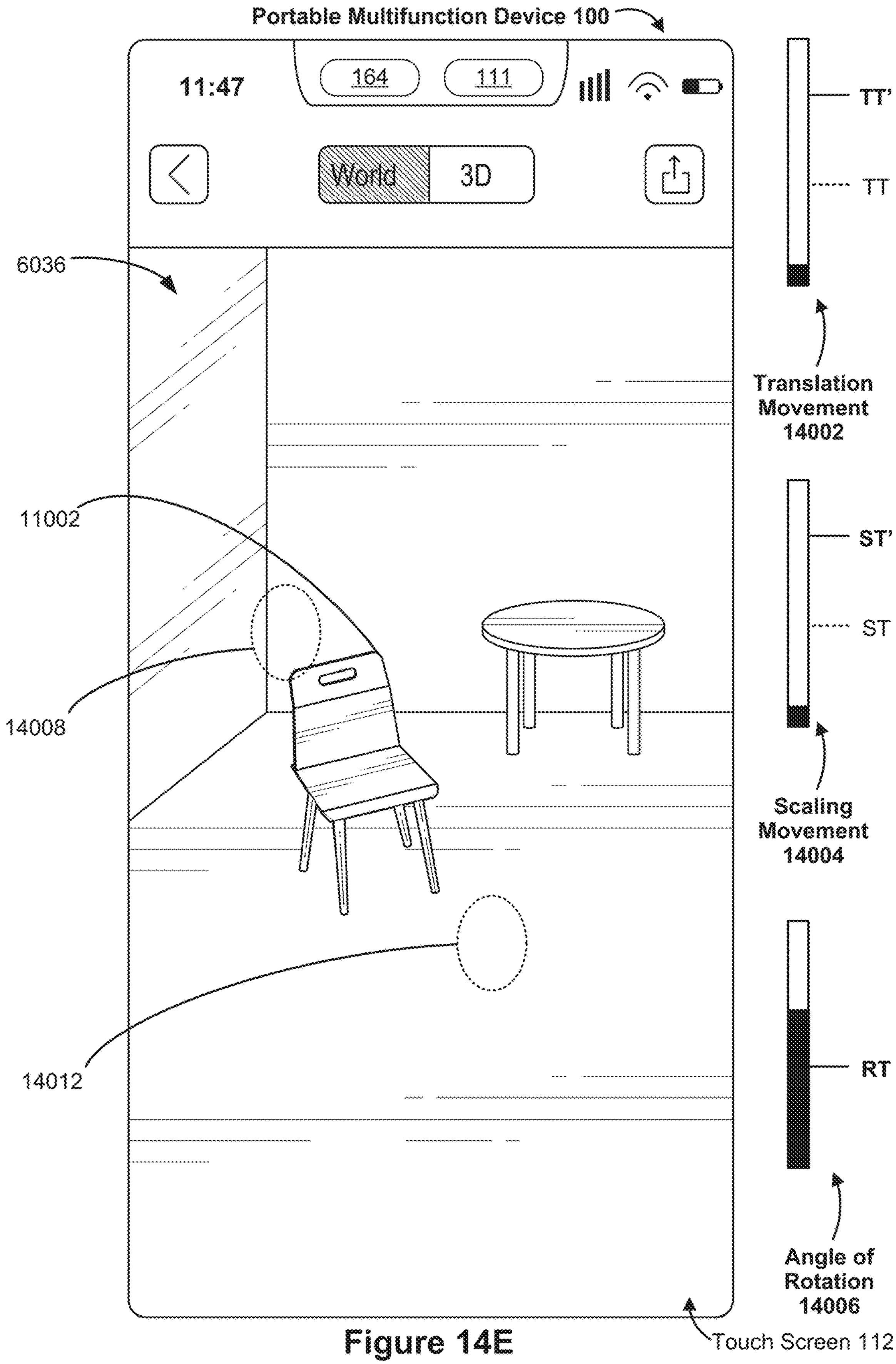
Figure 14F:
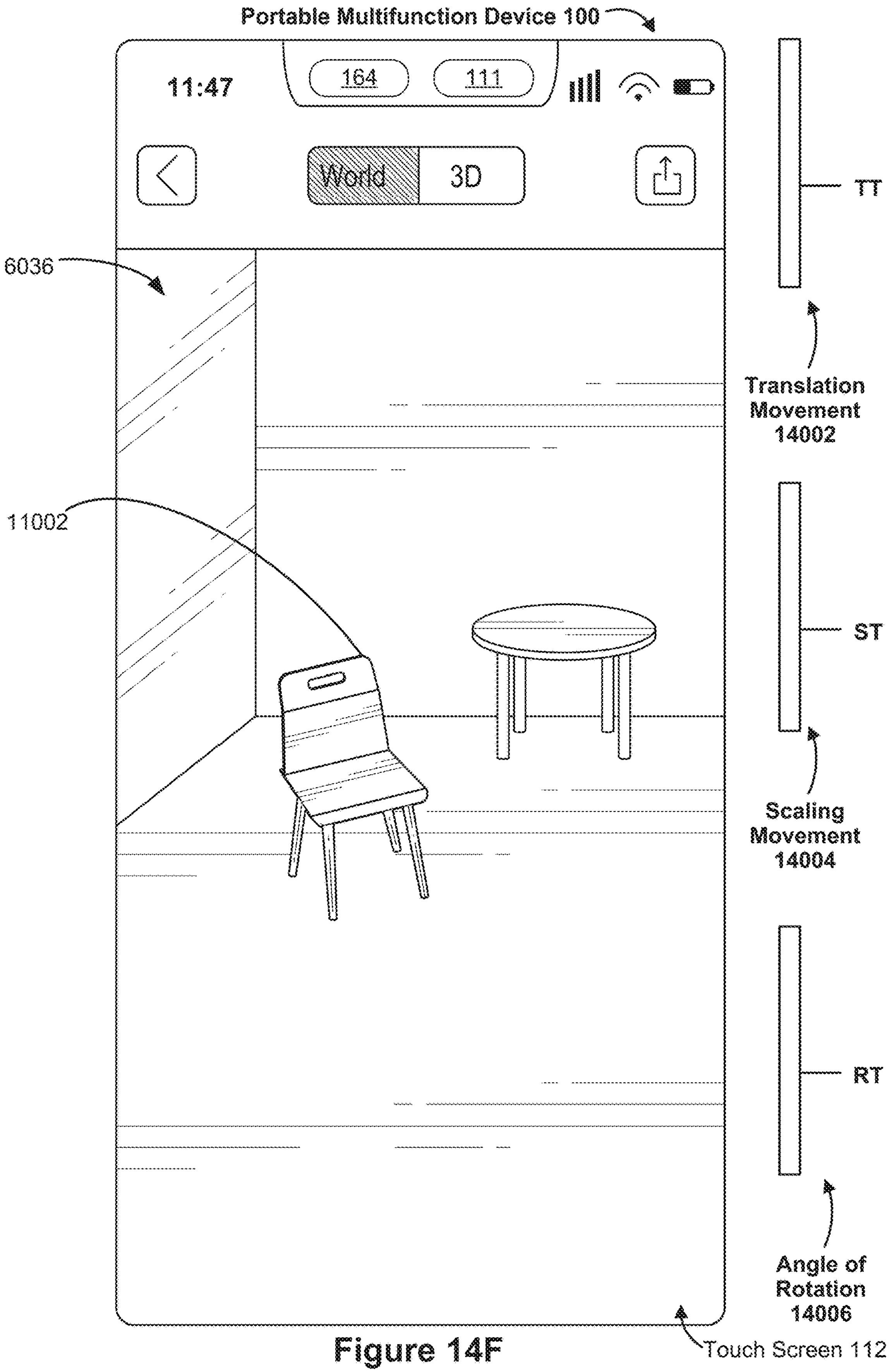
Figure 14G:
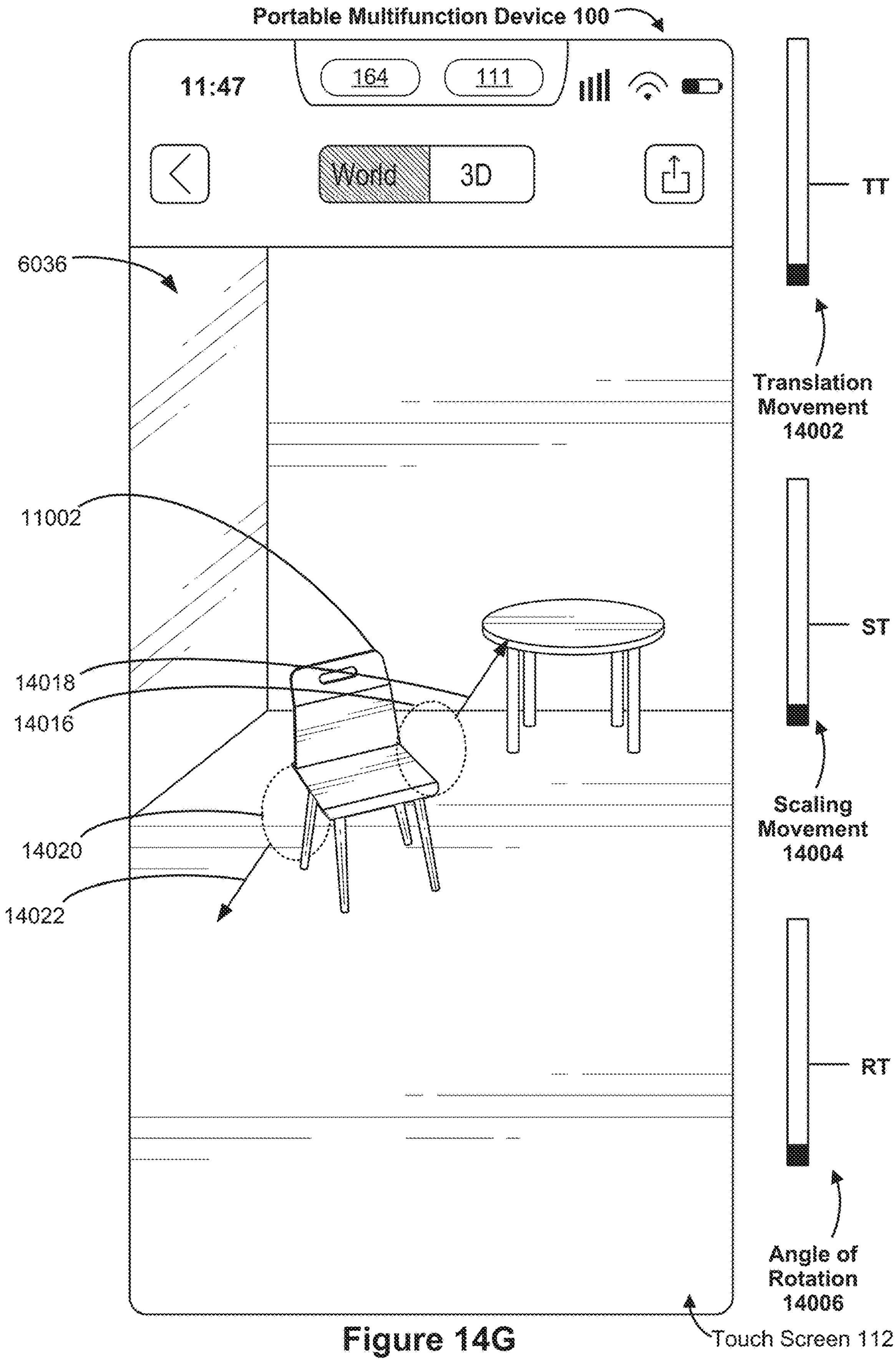
Figure 14H:
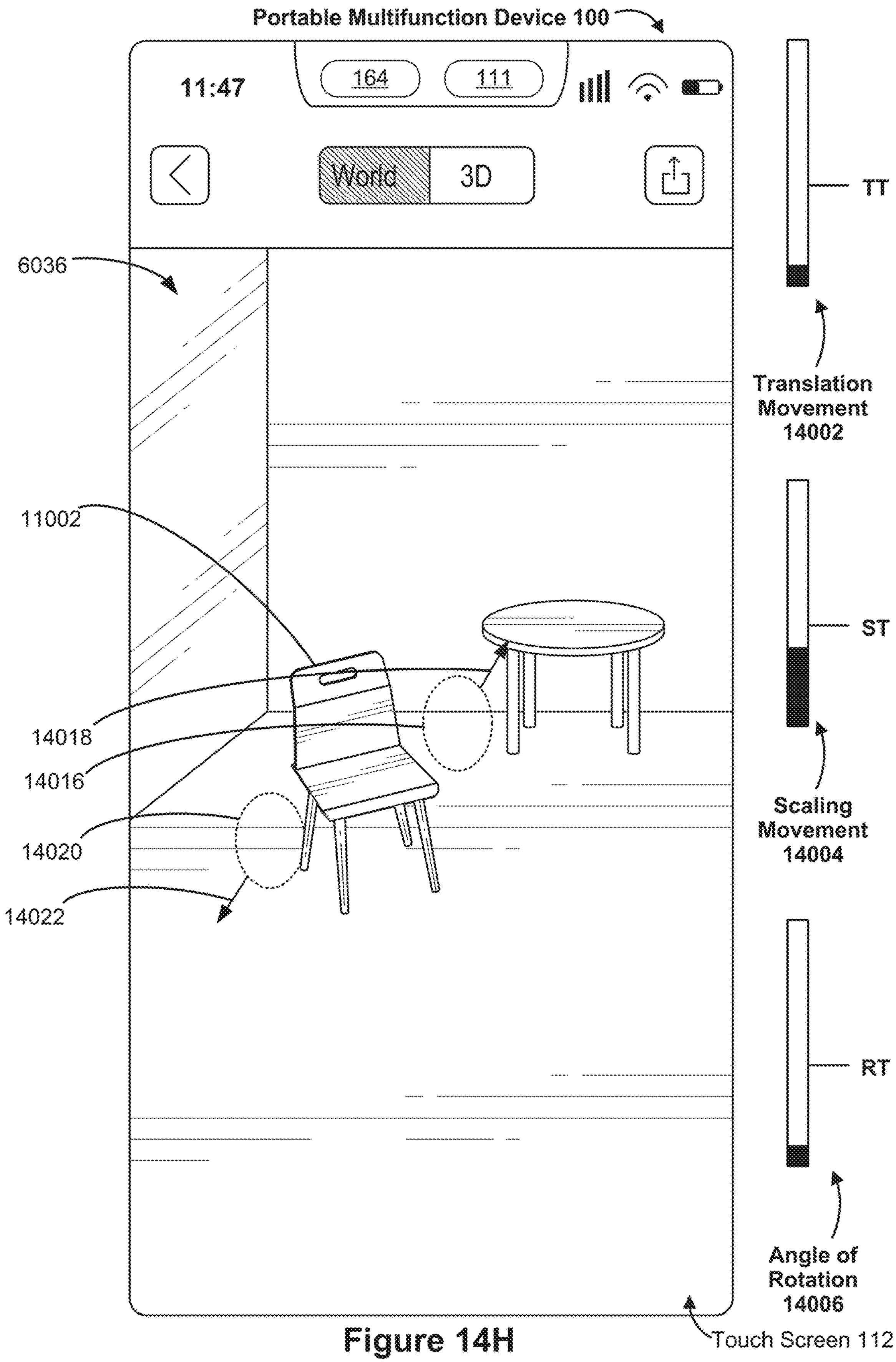
Figure 14I:
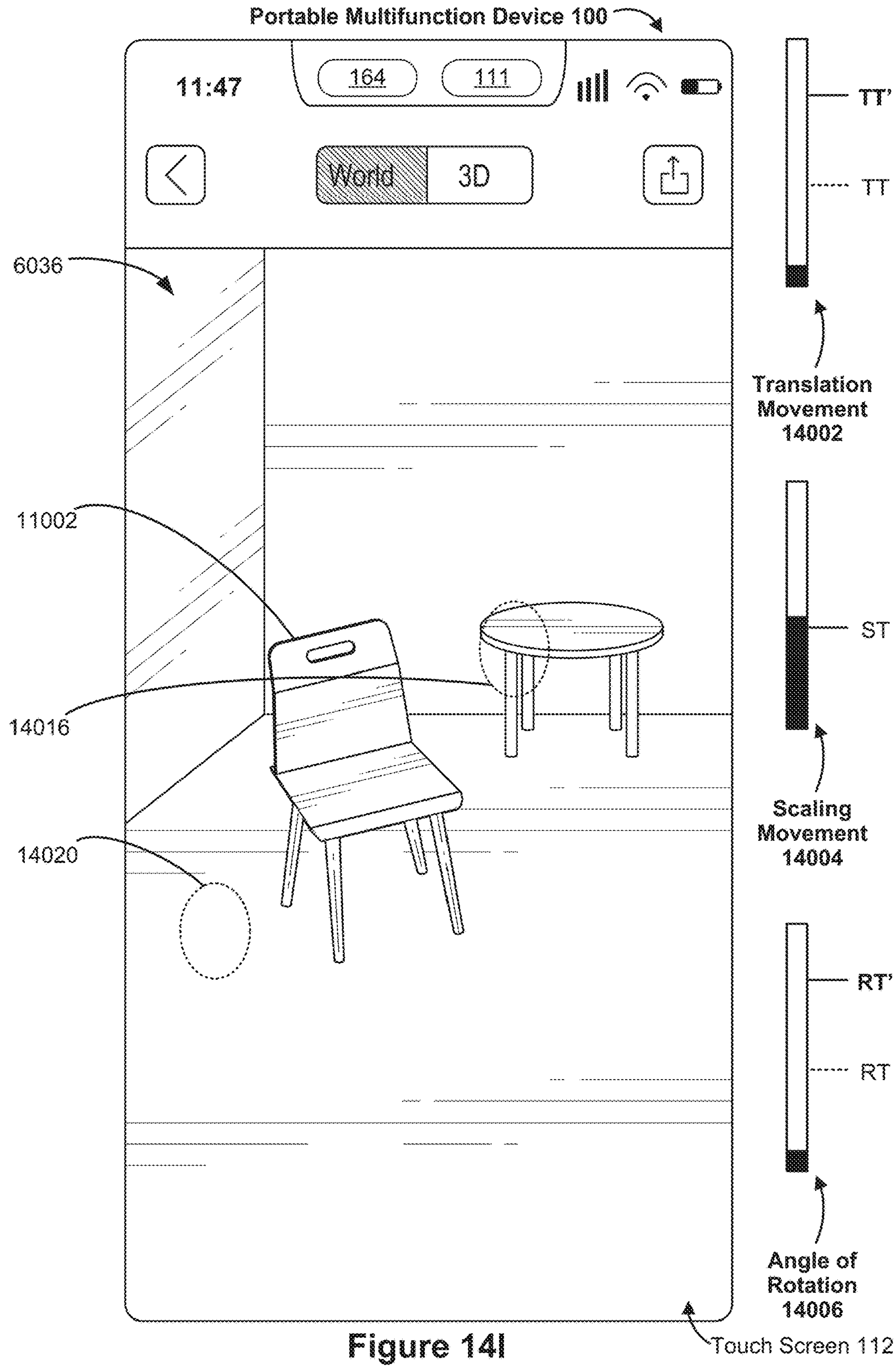
Figure 14J:
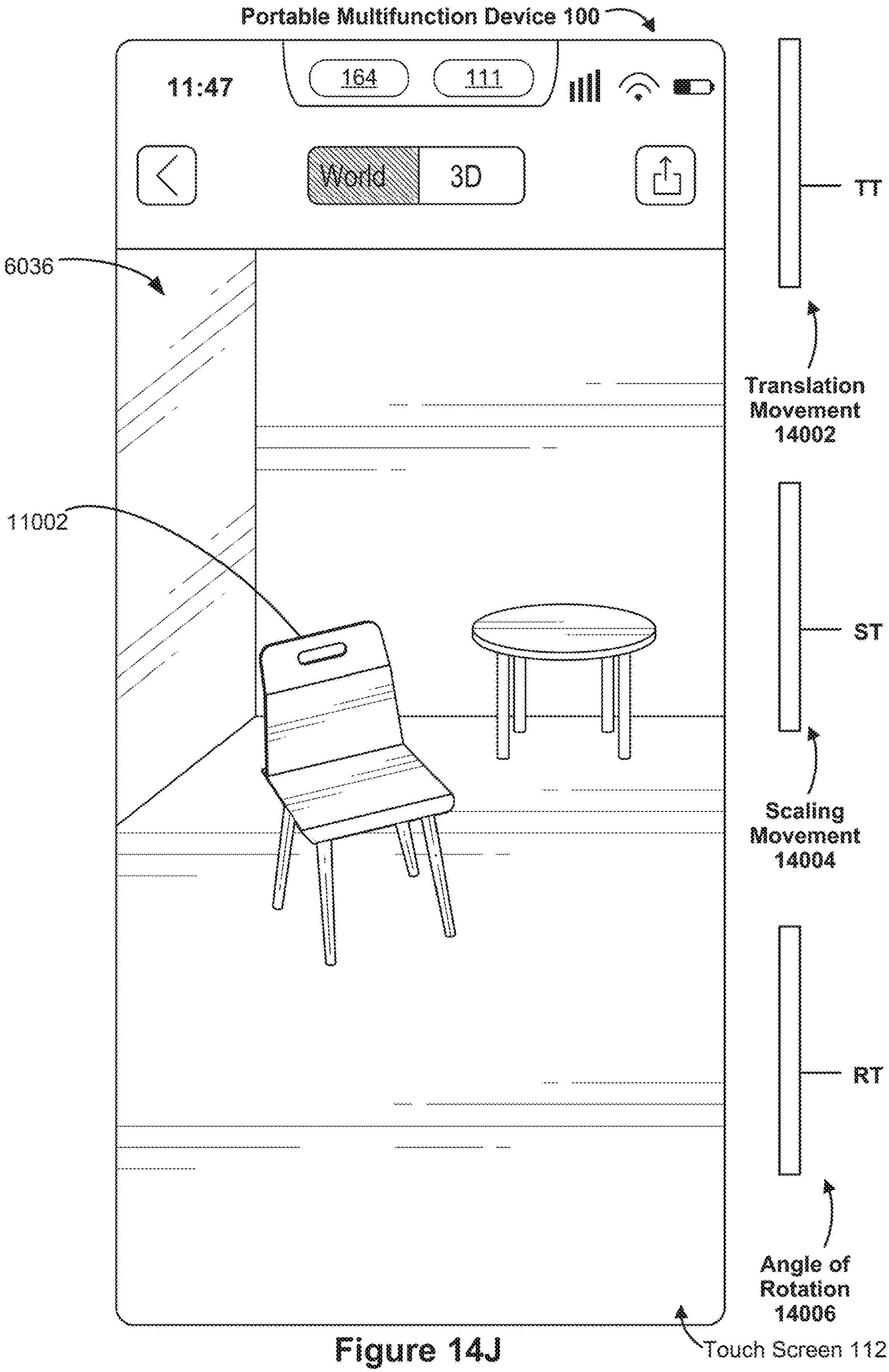
Figure 14K:
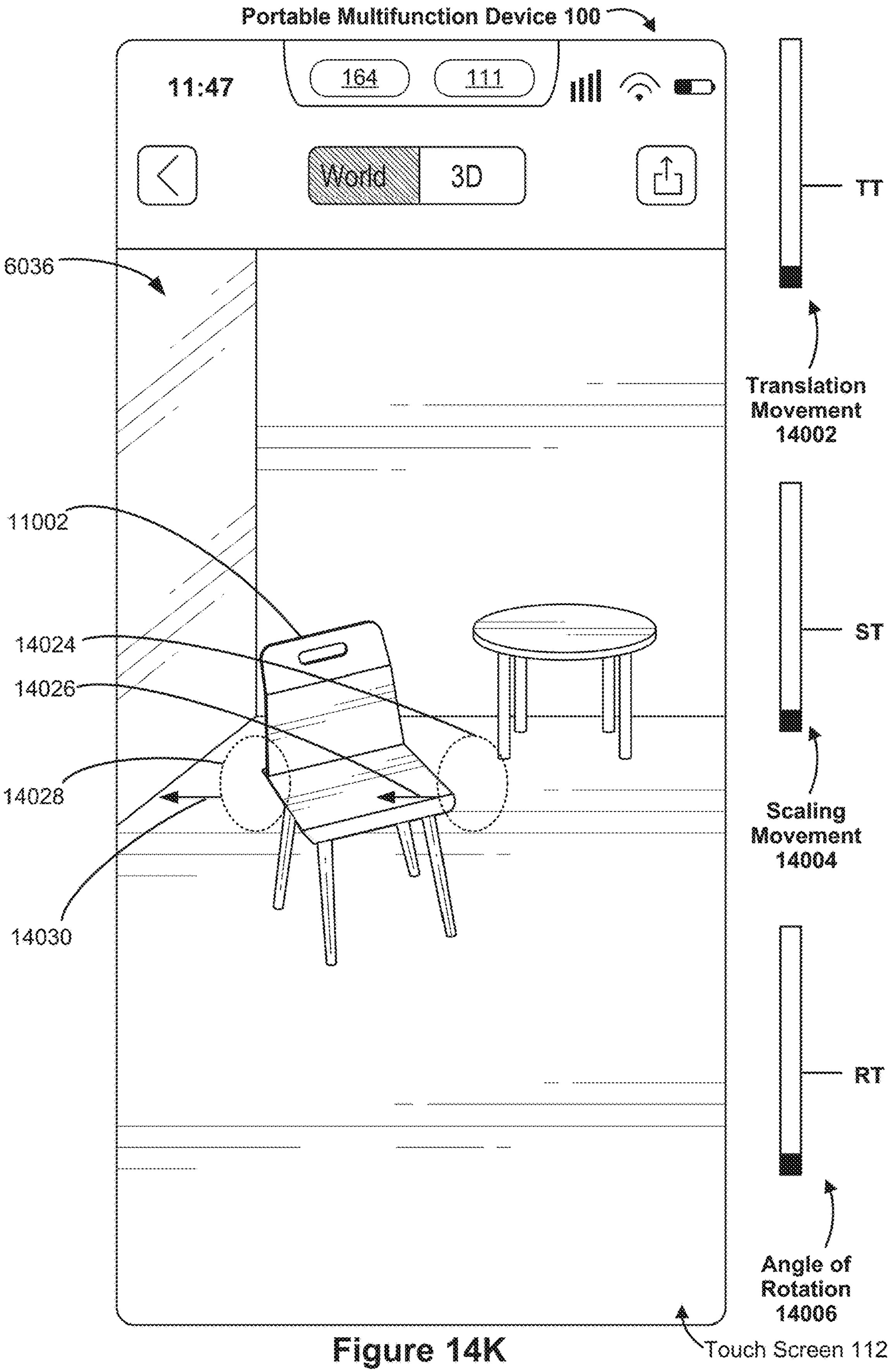
Figure 14L:
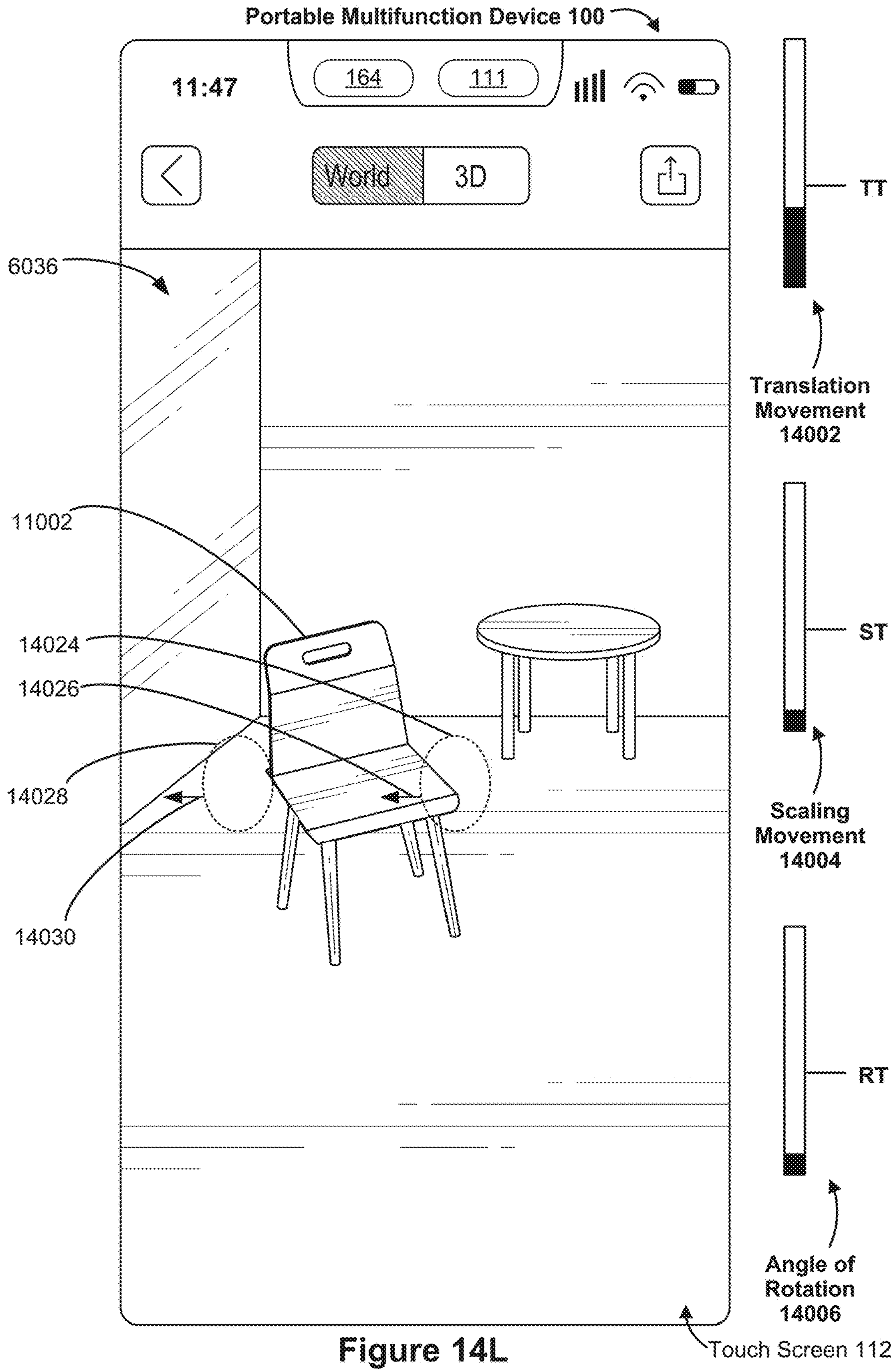
Figure 14M:
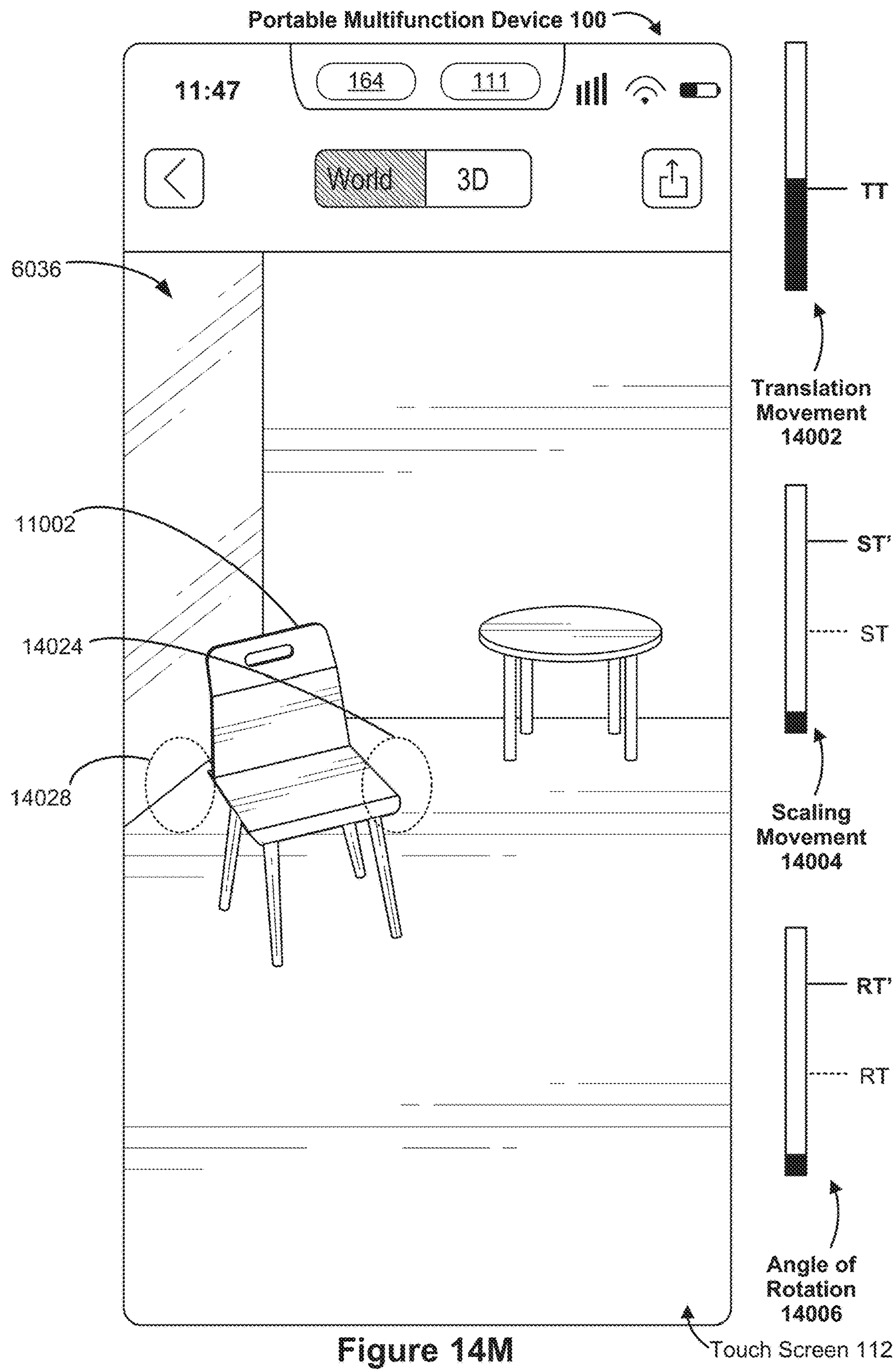
Figure 14N:
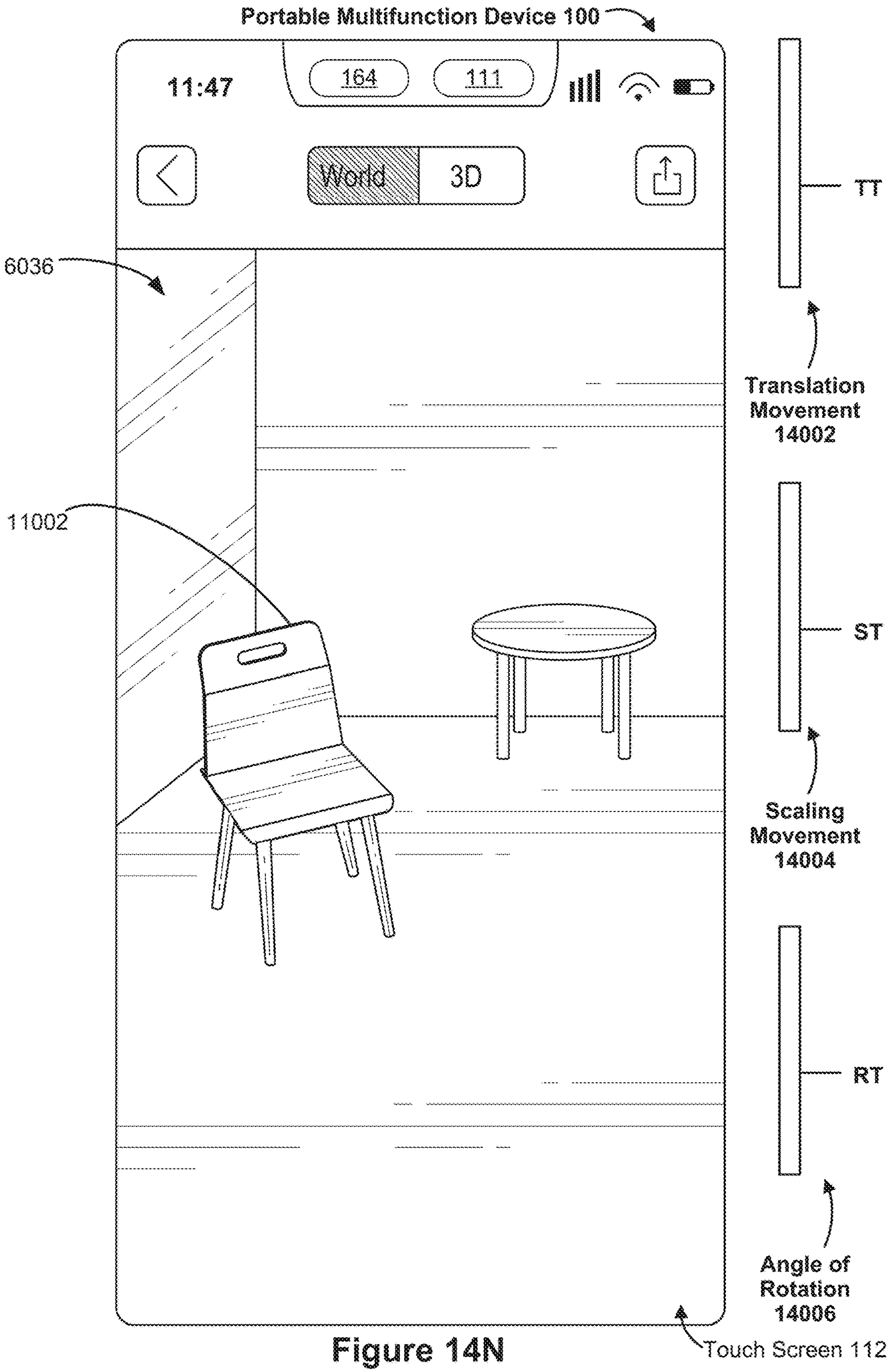
Figure 14O:
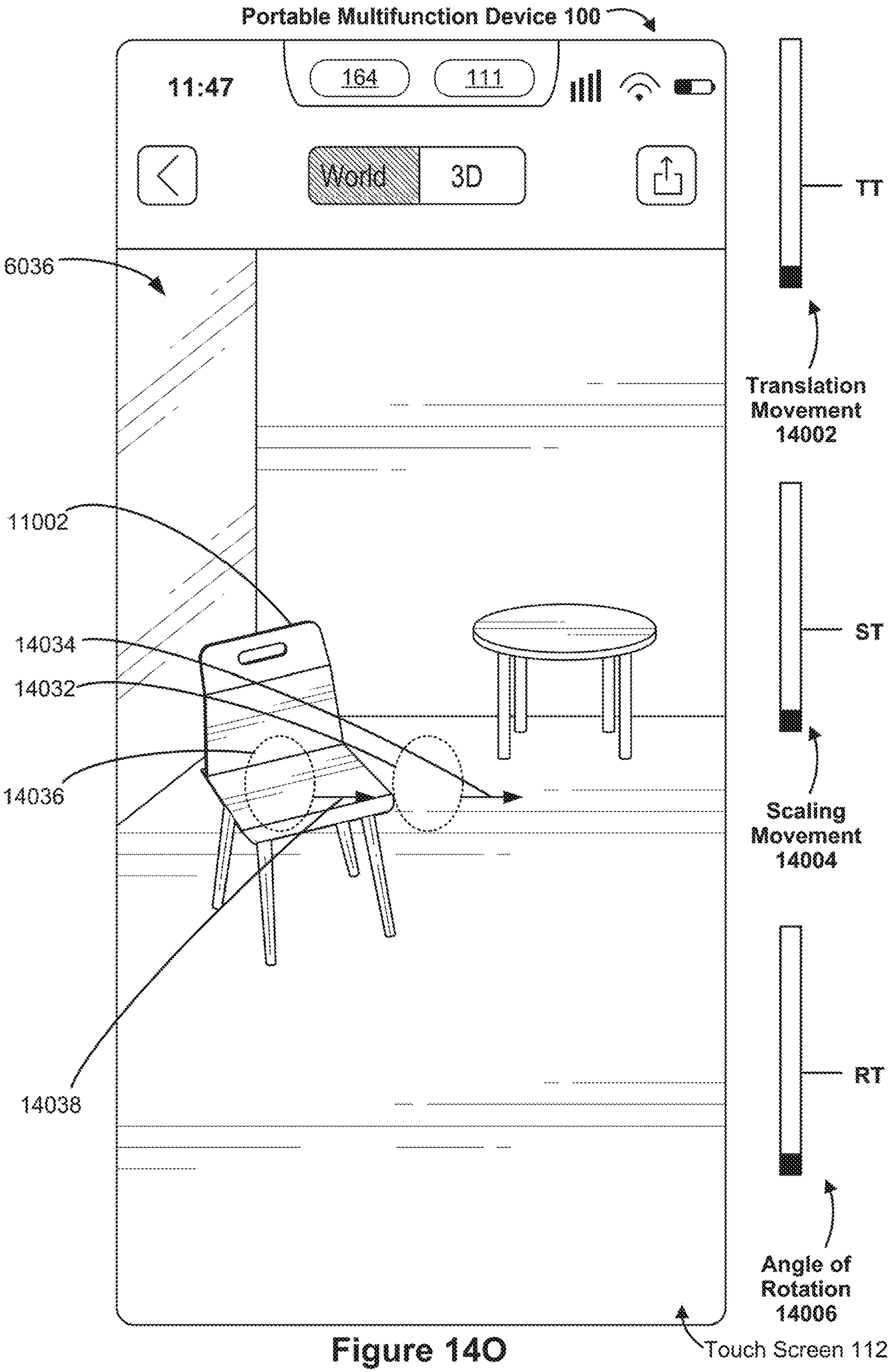
Figure 14P:
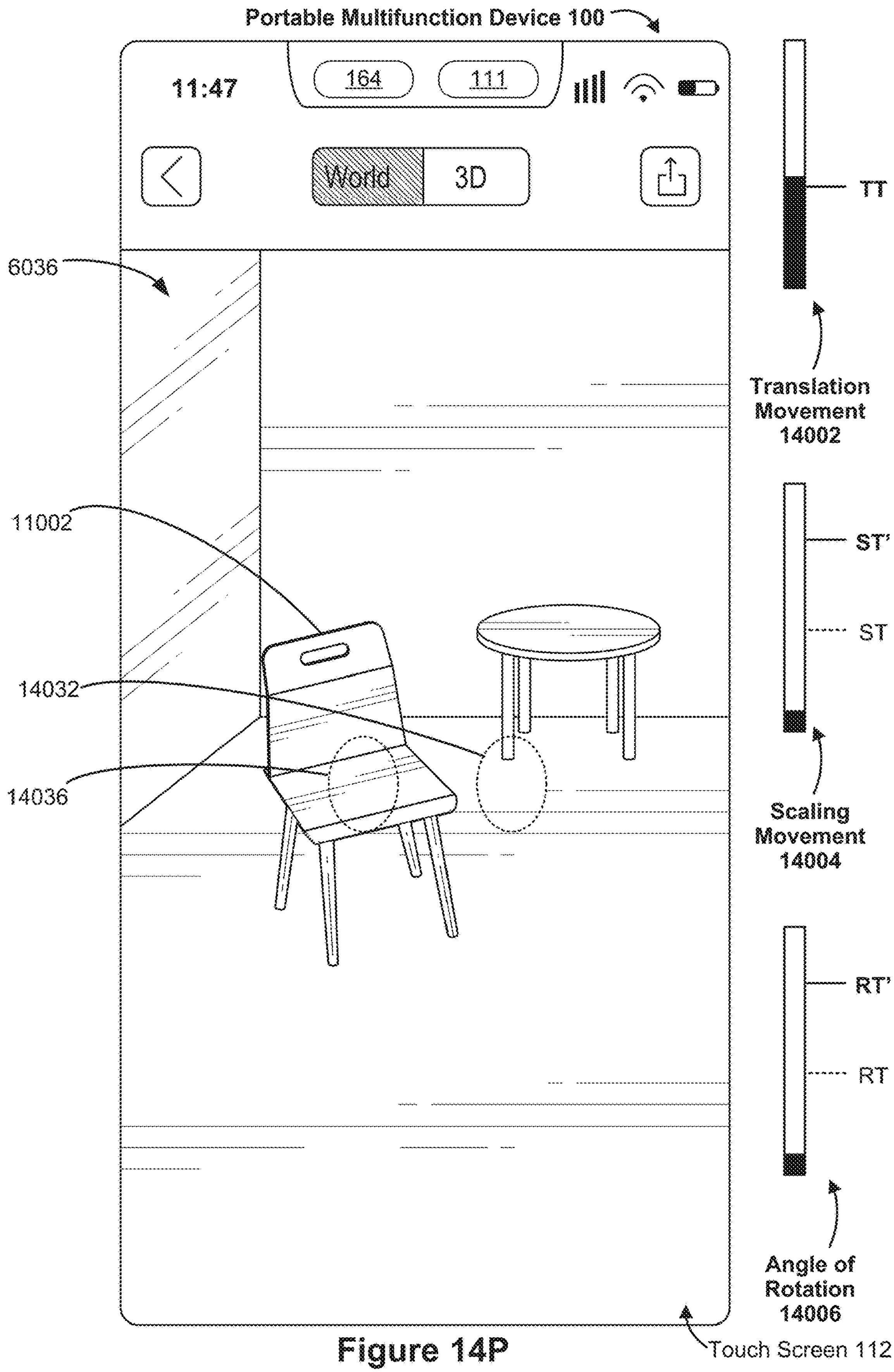
Figure 14Q:
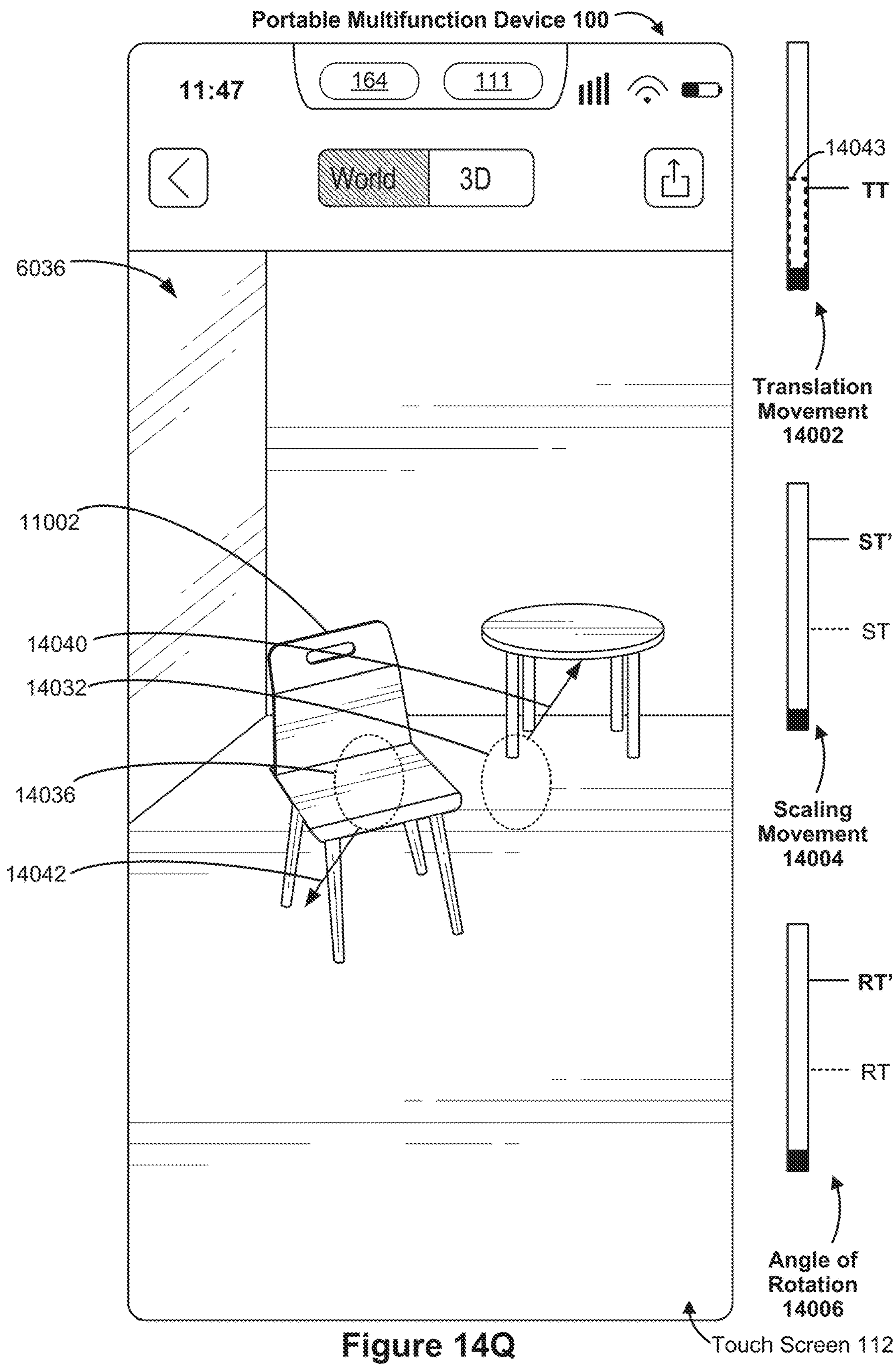
Figure 14R:
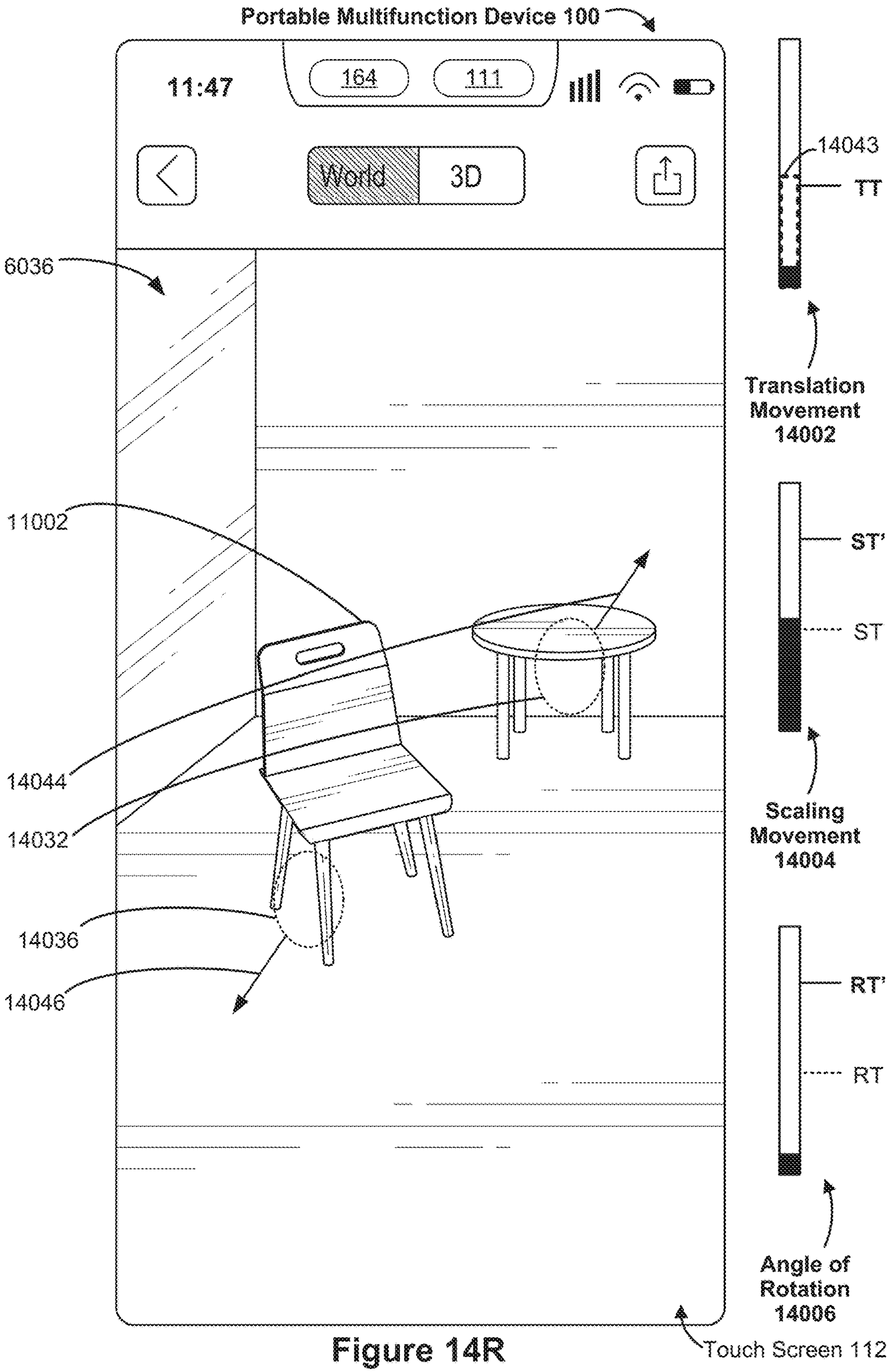
Figure 14S:
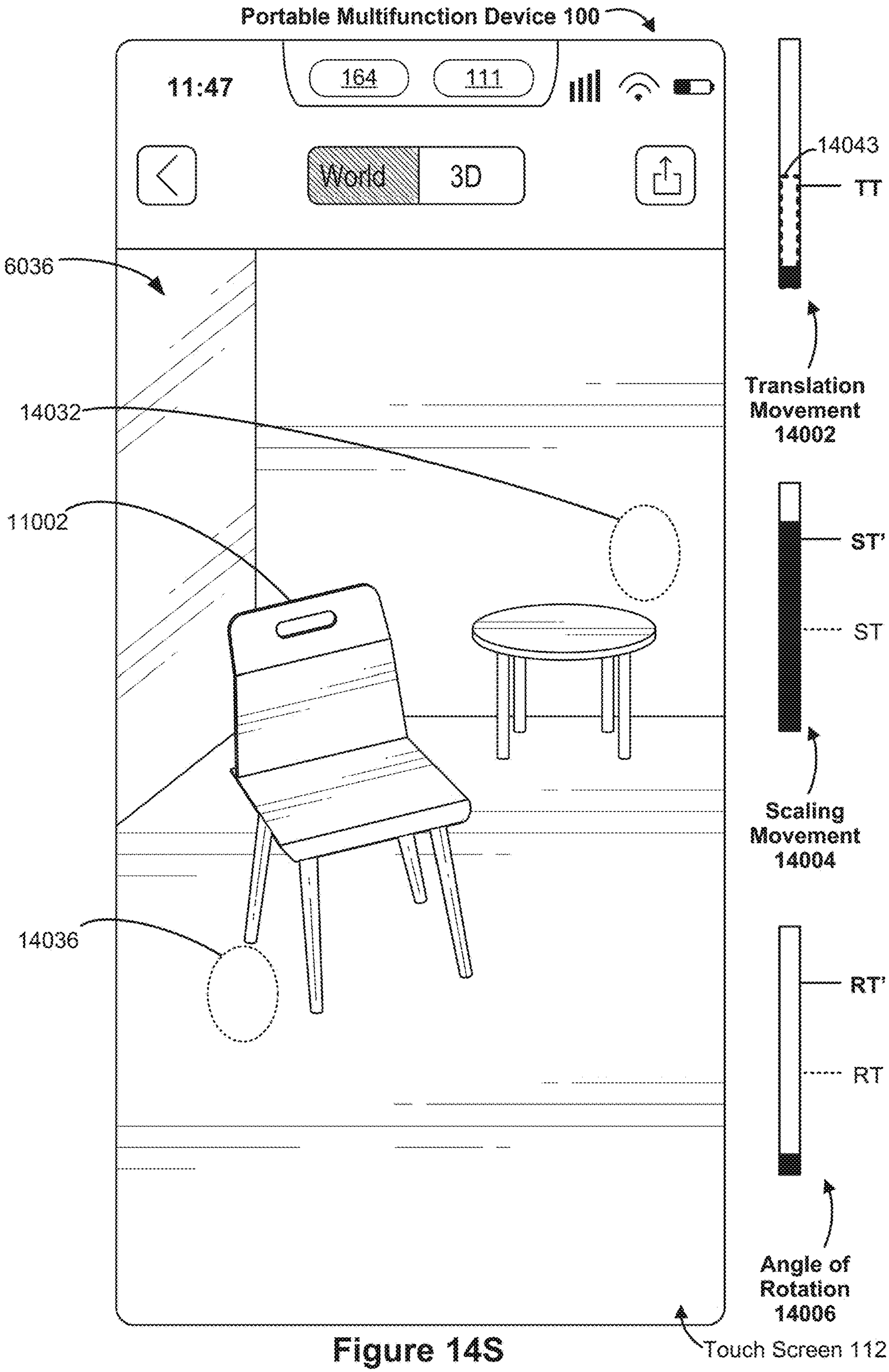
Figure 14T:
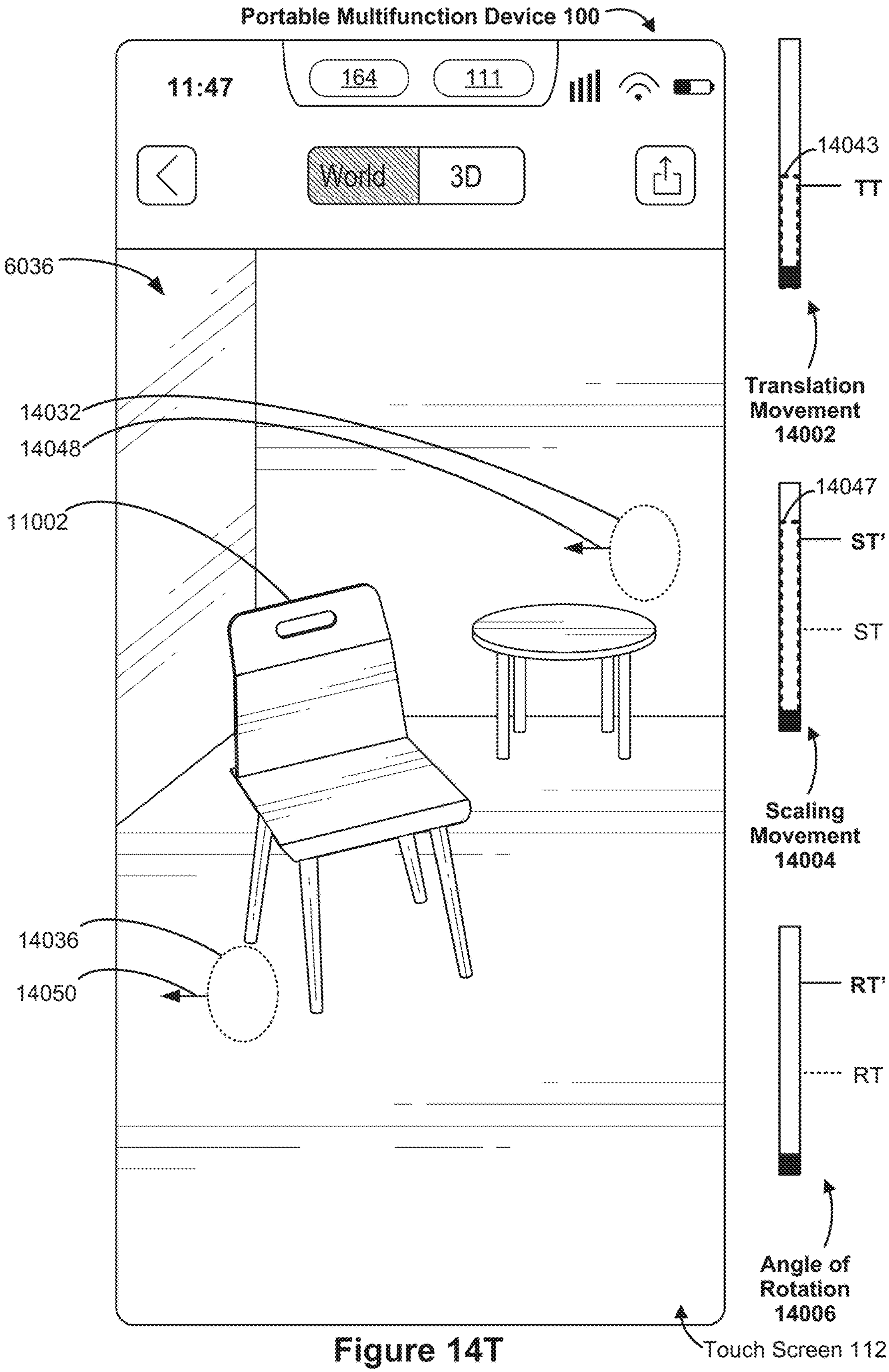
Figure 14U:
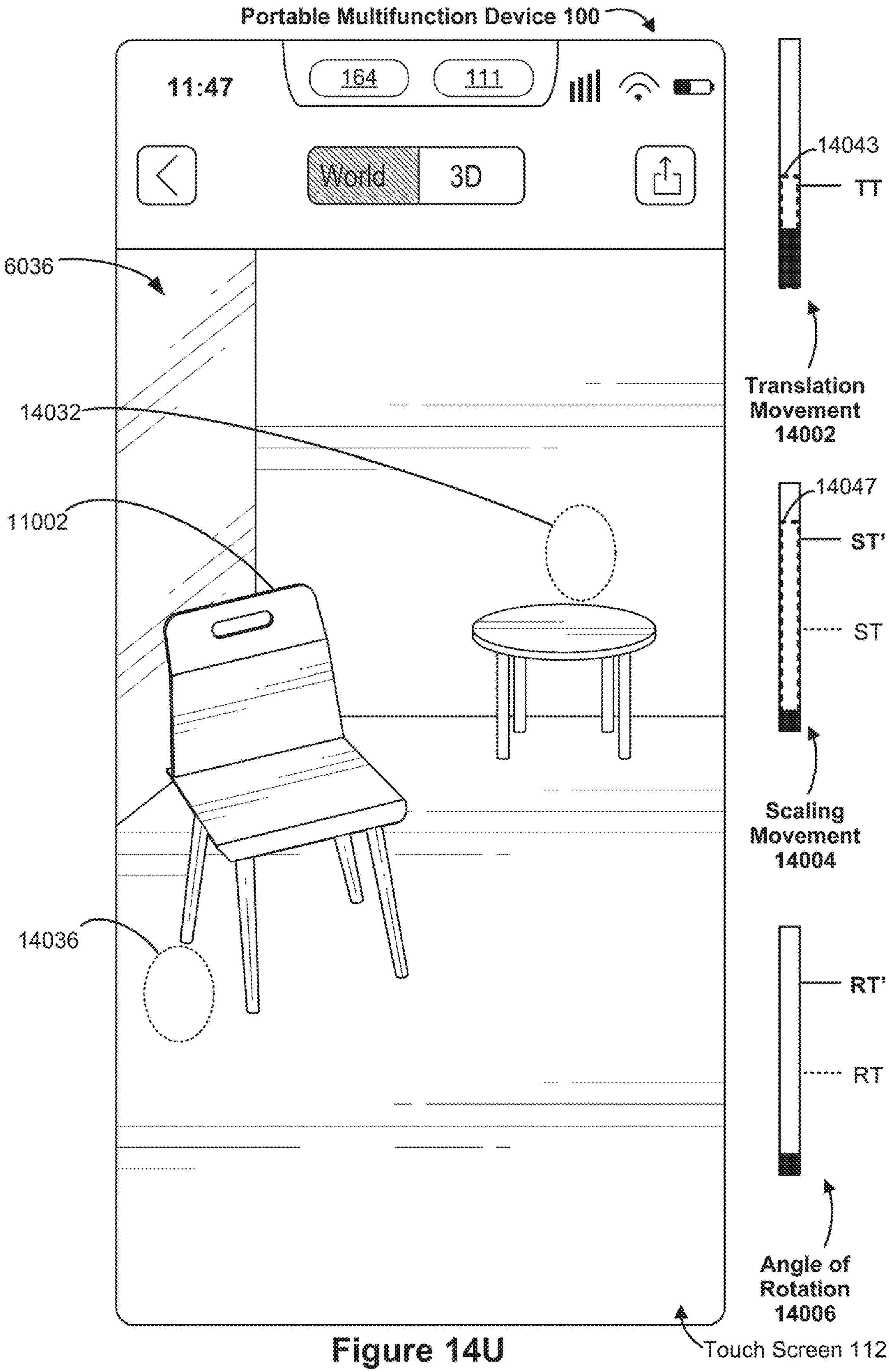
Figure 14V:
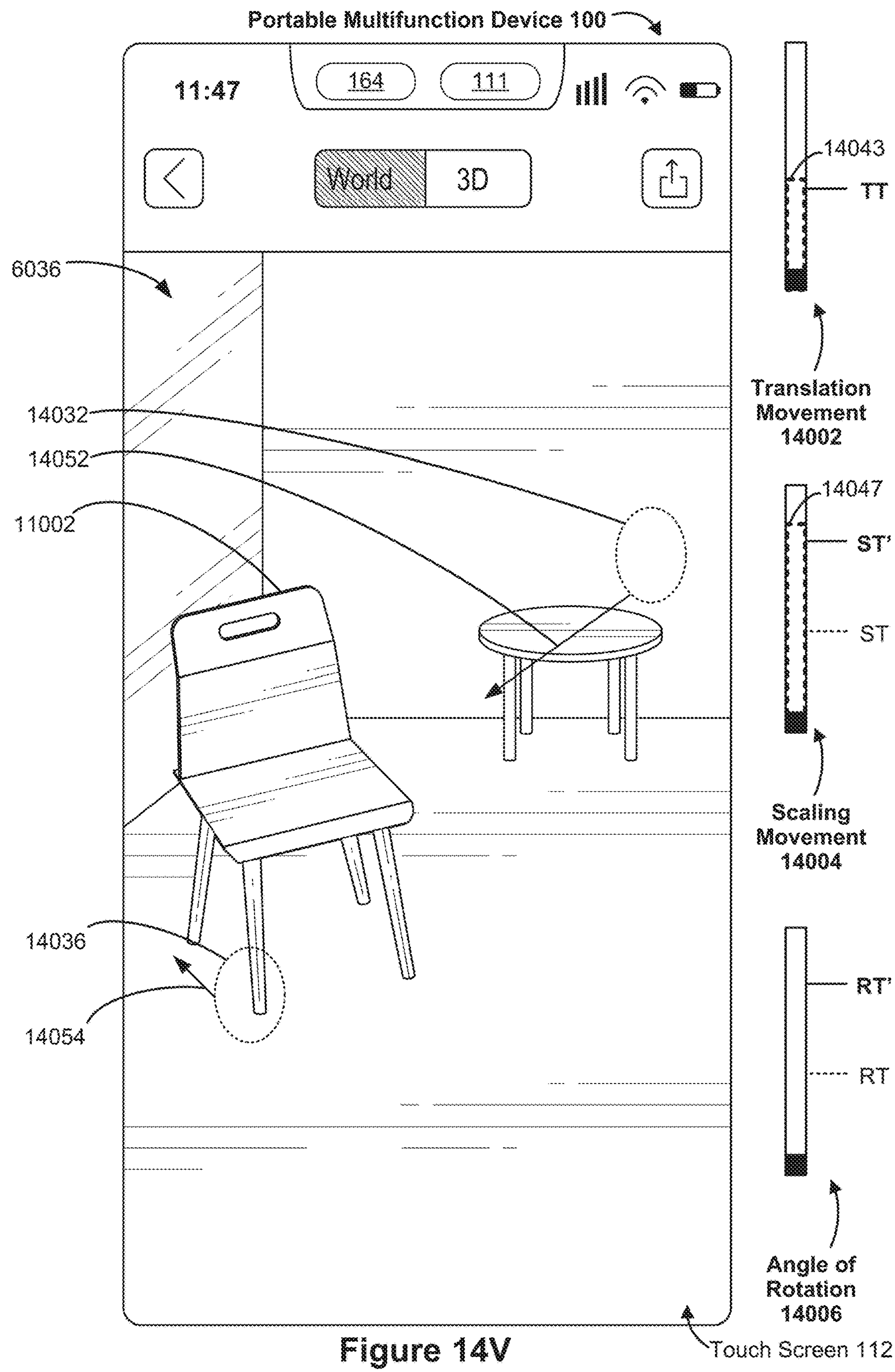
Figure 14W:
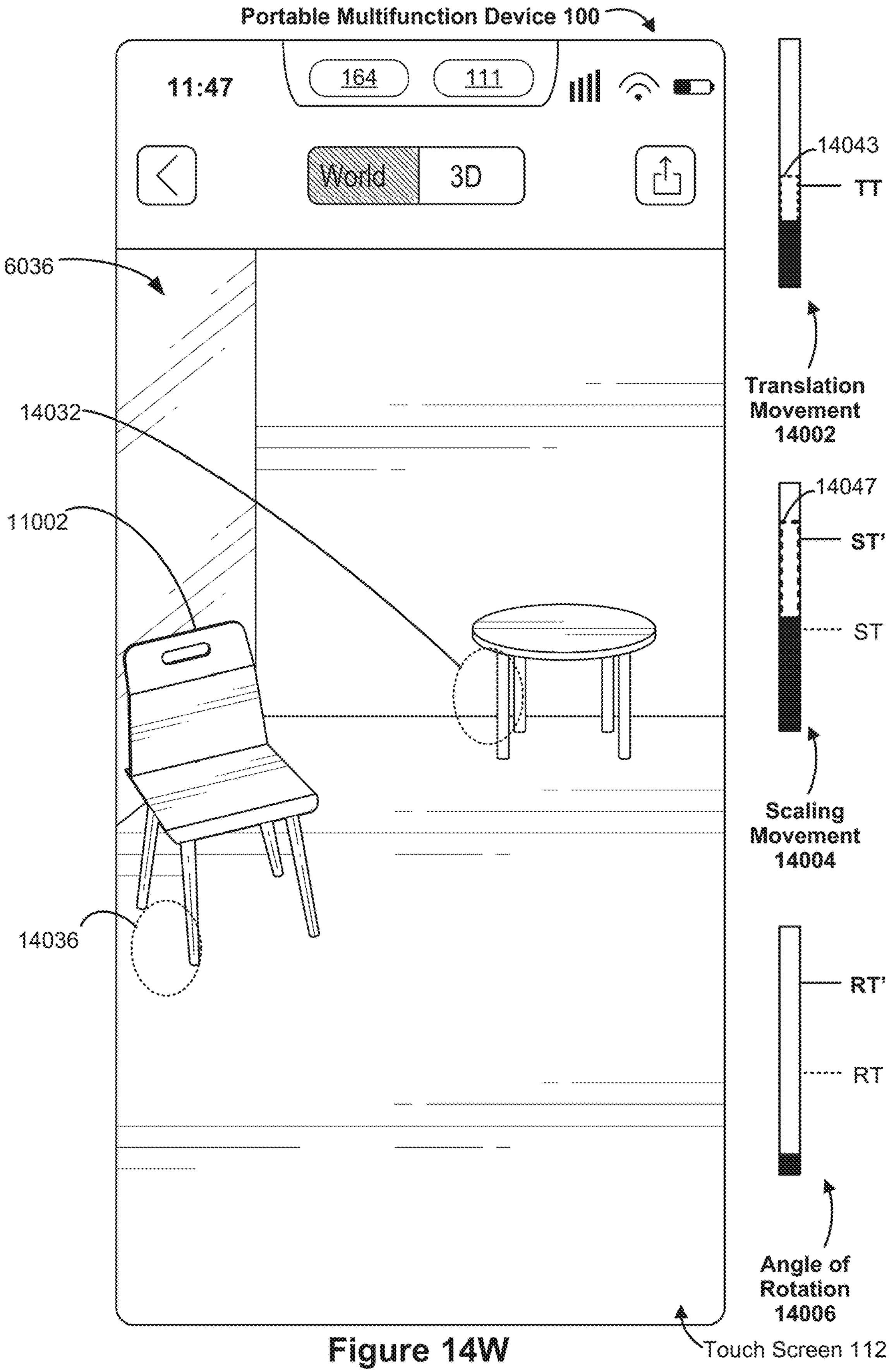
Figure 14X:
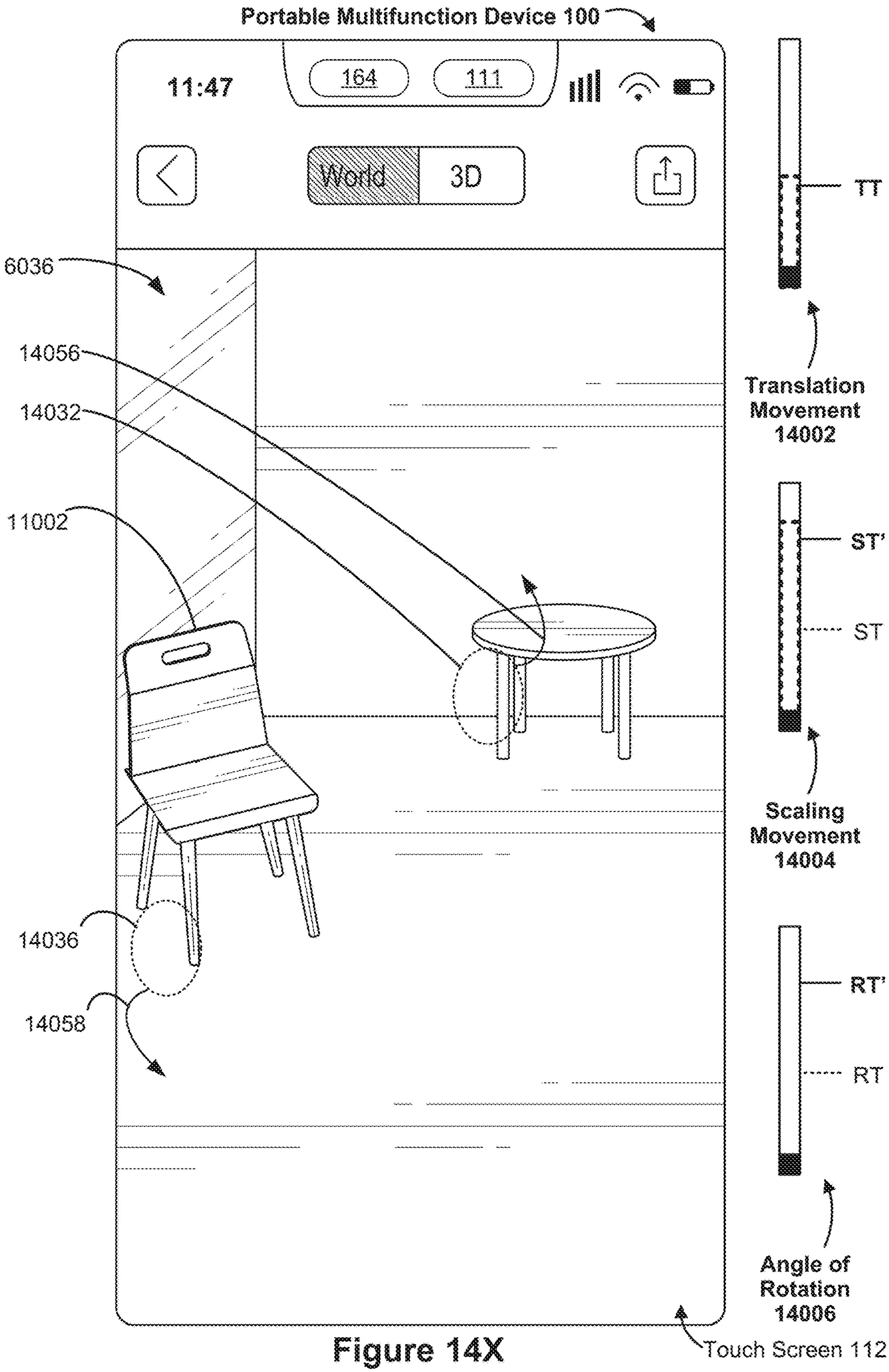
Figure 14Y:
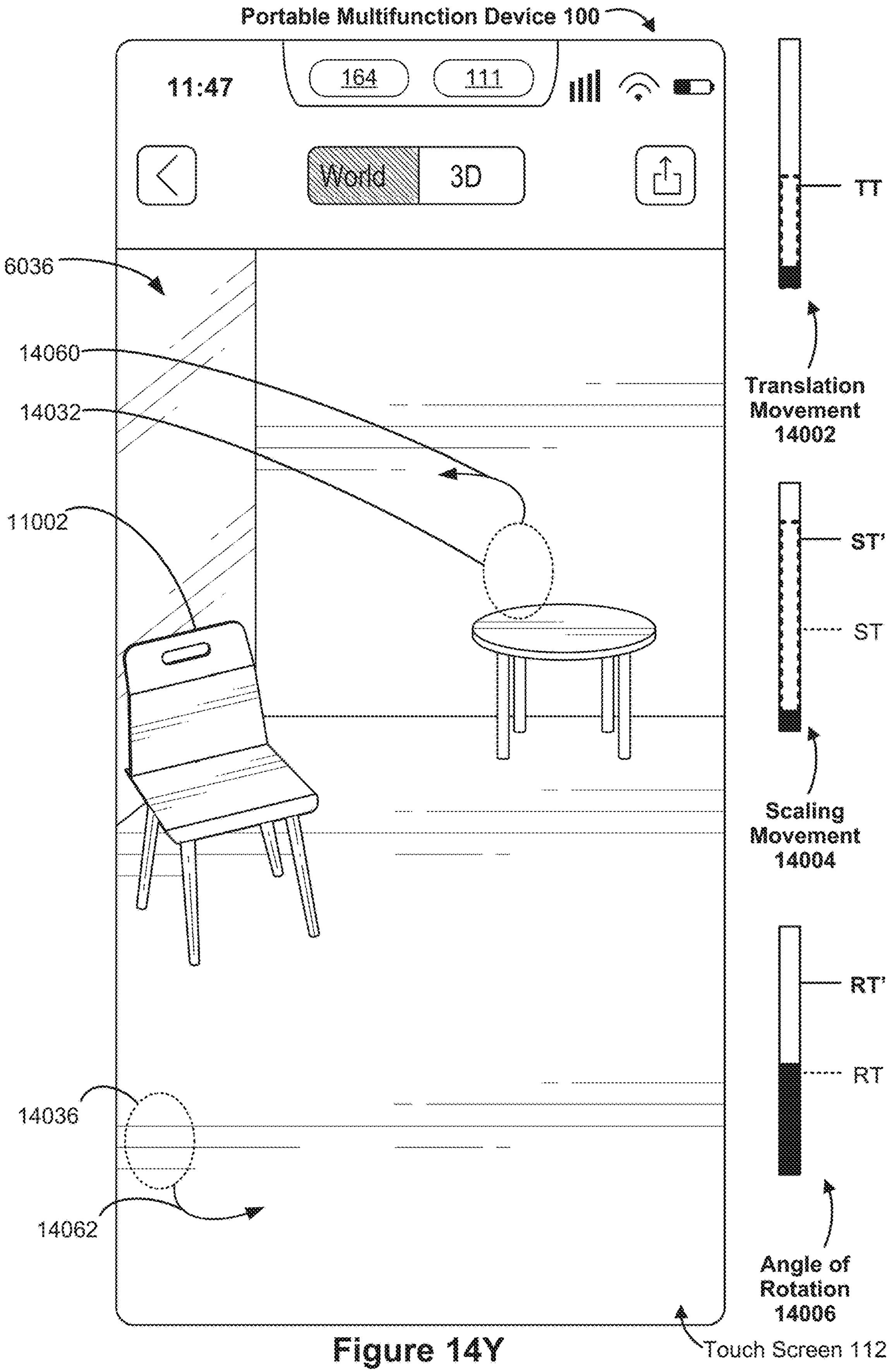
Figure 14Z:
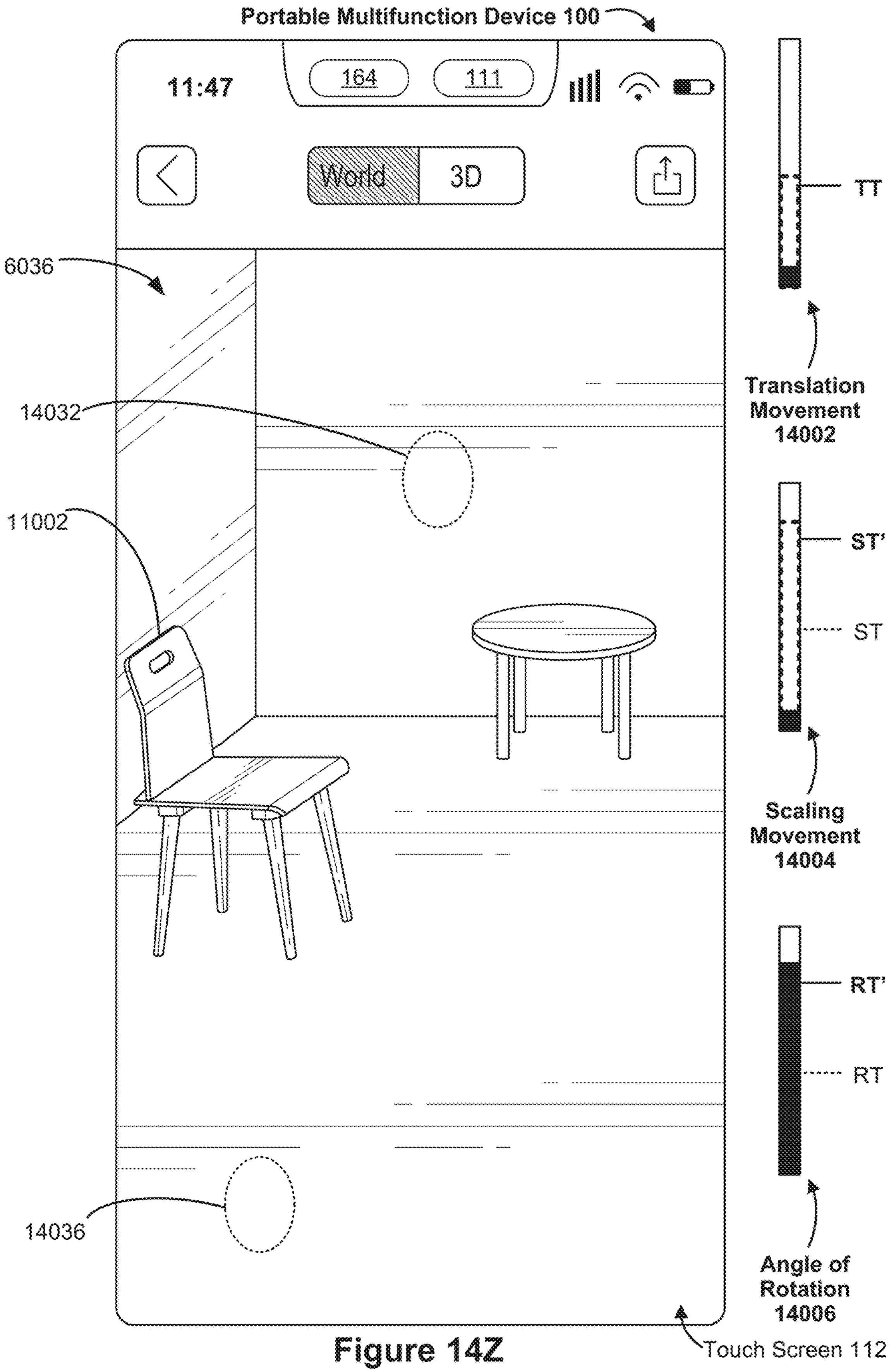
Figure 14A:
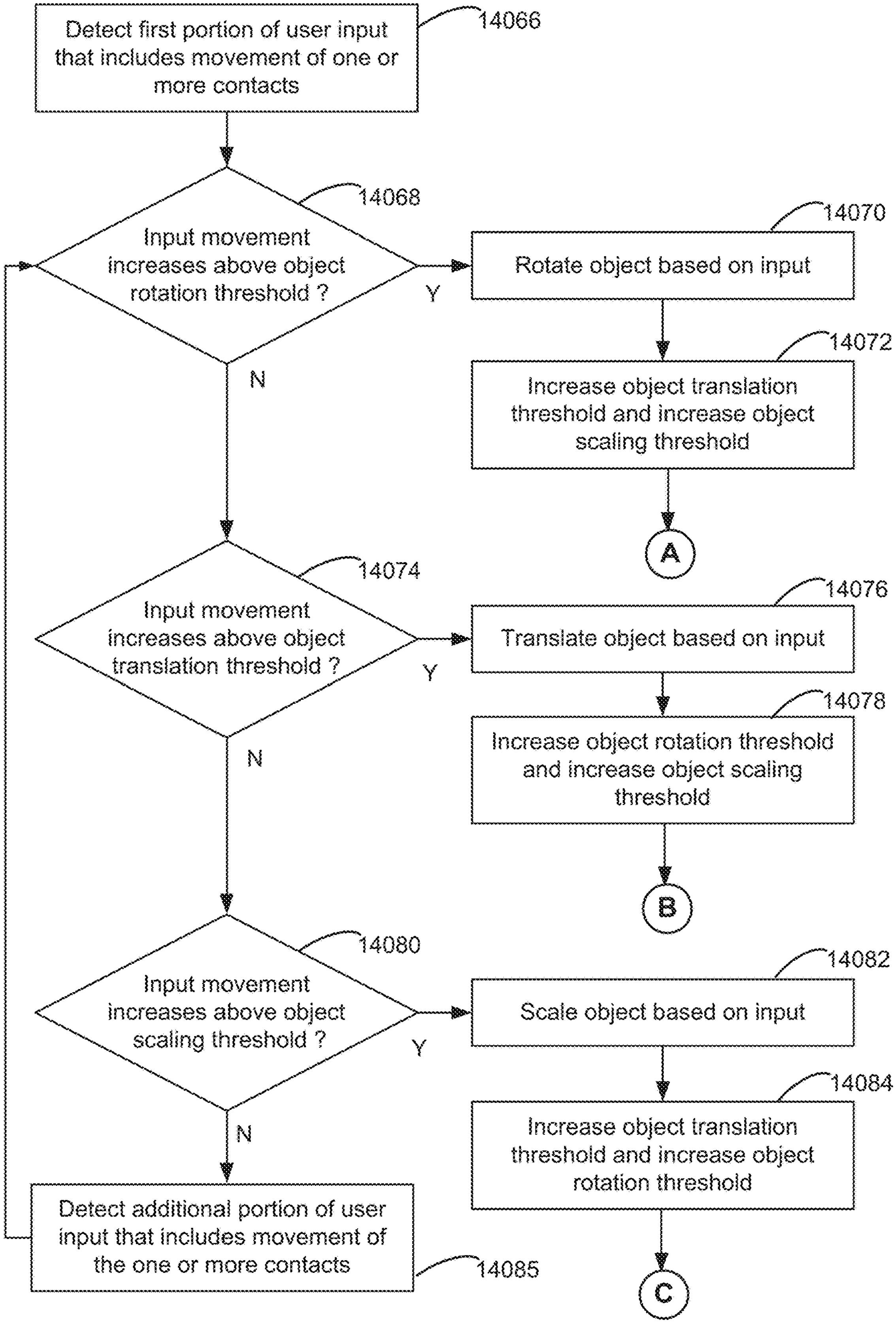
Figure 14A:
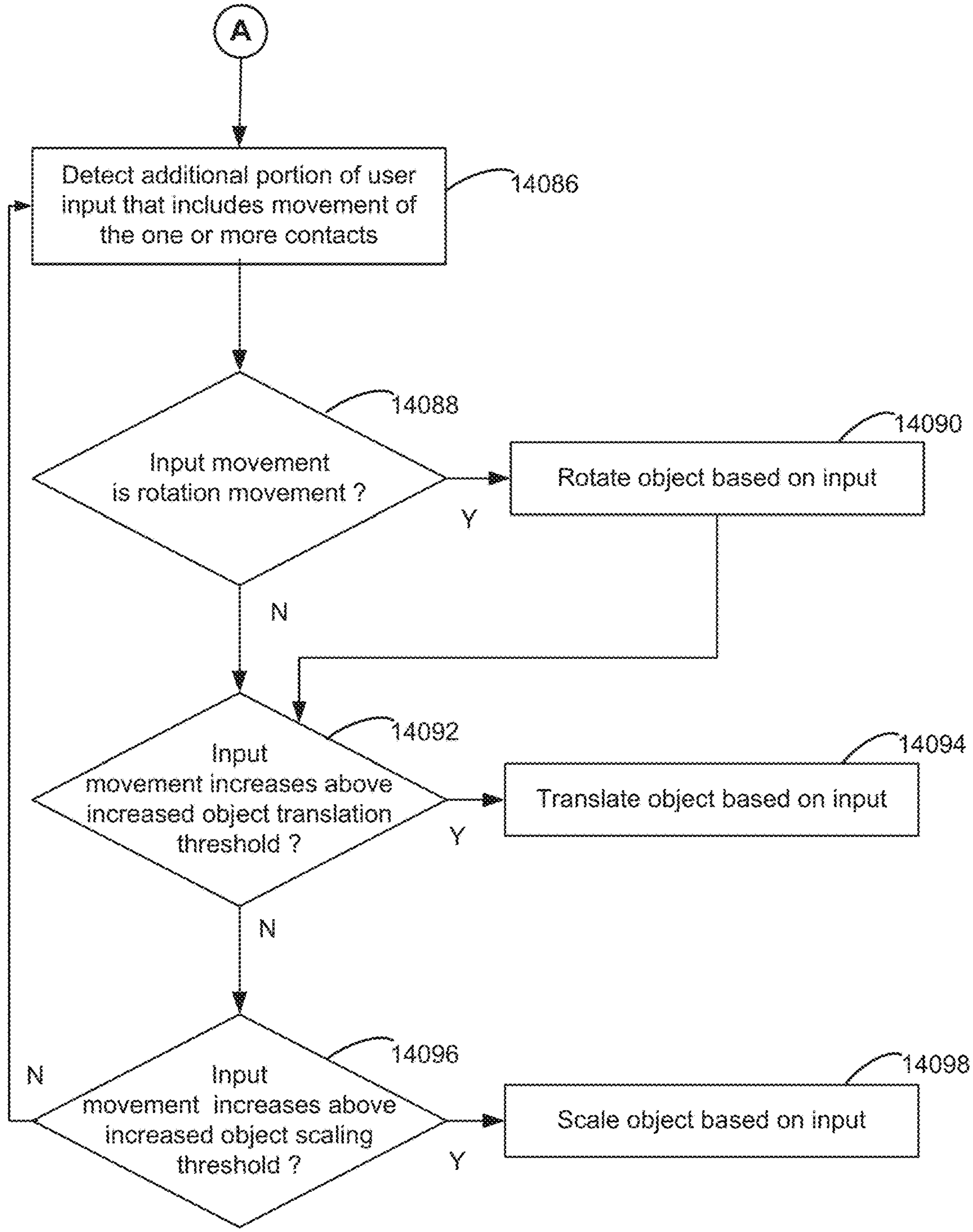
Figure 14A:
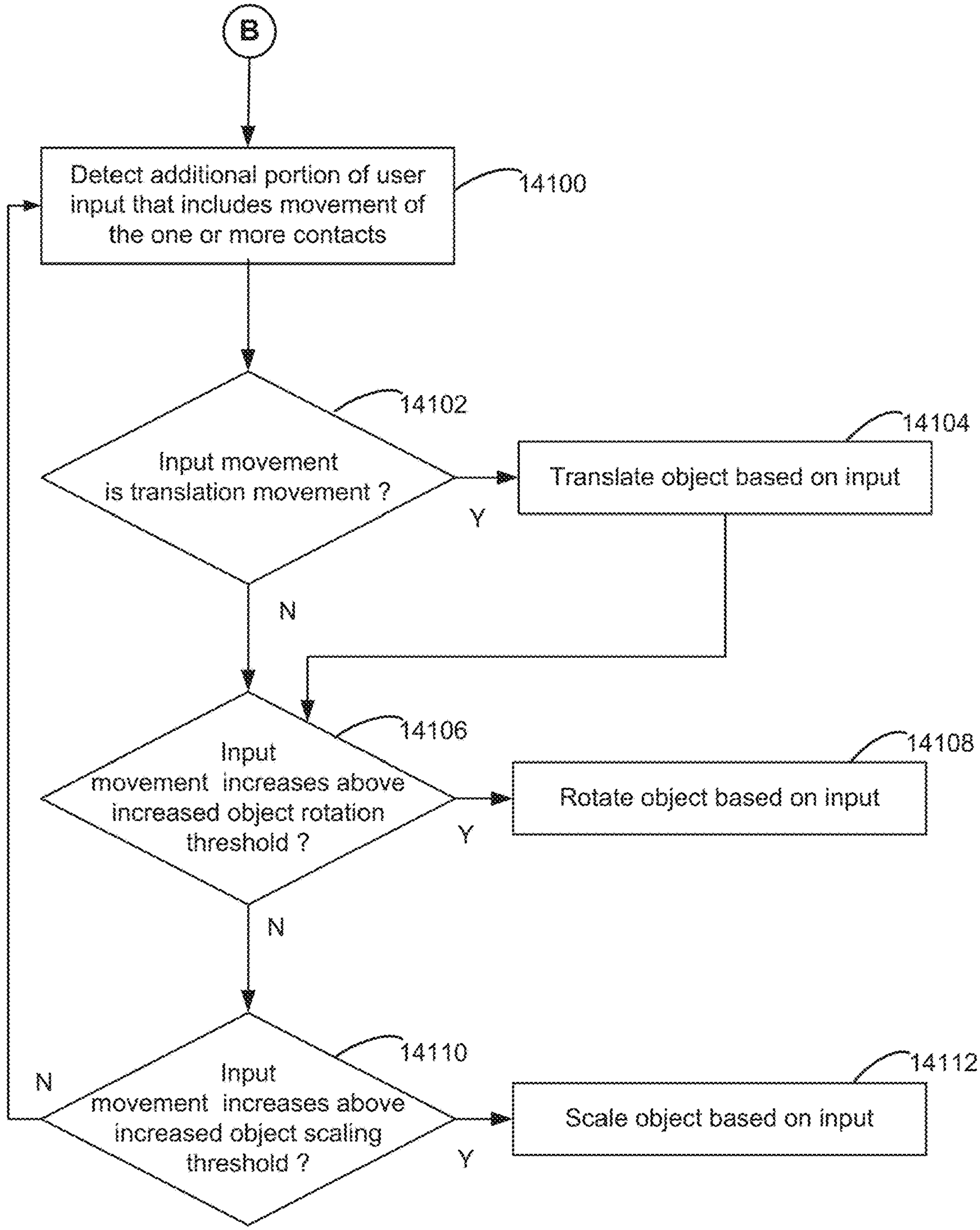
Figure 14A:
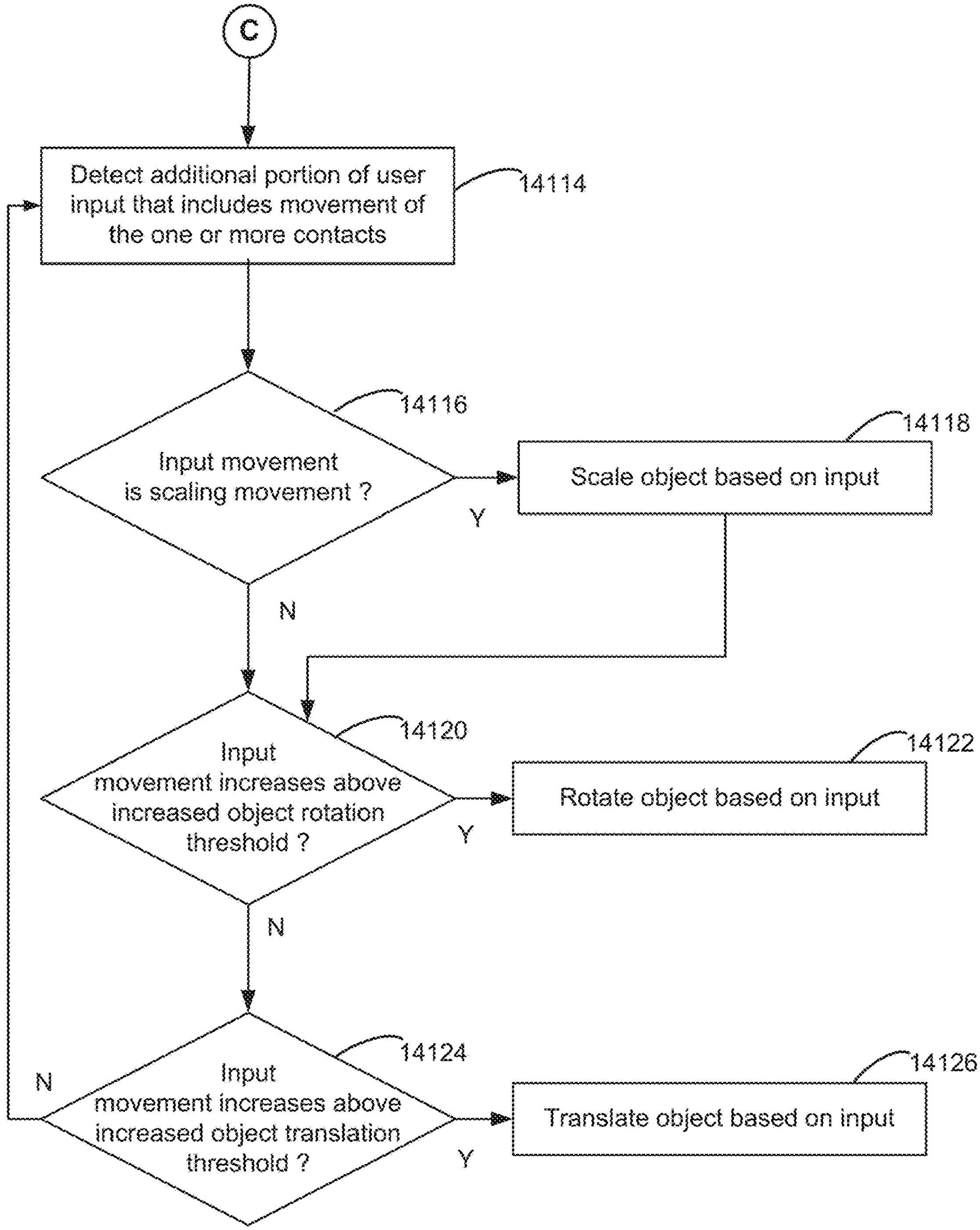

FIGS. 14A-14Z illustrate example user interfaces for, in accordance with a determination that a first threshold magnitude of movement is met for a first object manipulation behavior, increasing a second threshold magnitude of movement required for a second object manipulation behavior. The user interfaces in these figures are used to illustrate the processes described below, including the processes in FIGS. 8A-8E, 9A-9D, 10A-10D, 14AA-14AD, 16A-16G, 17A-17D, 18A-18I, 19A-19H, and 20A-20F. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

In FIG. 14A, virtual object 11002 is displayed in a user interface that includes field of view 6036 of the camera(s). As described further with regard to FIGS. 14B-14Z, translation movement meter 14002, scaling movement meter 14004, and rotation movement meter 14006 are used to indicate respective magnitudes of movement that correspond to object manipulation behaviors (e.g., a translation operation, a scaling operation, and/or a rotation operation). Translation movement meter 14002 indicates a magnitude of lateral (e.g., leftward or rightward) movement of a set of contacts on touch screen display 112. Scaling movement meter 14004 indicates a magnitude of increasing or decreasing distance between respective contacts in a set of contacts (e.g., a magnitude of a pinch or de-pinch gesture) on touch screen display 112. Rotation movement meter 14006 indicates a magnitude of rotational movement of a set of contacts on touch screen display 112.

FIGS. 14B-14E illustrate an input for rotating virtual object 11002 in the user interface that includes field of view 6036 of the one or more cameras. The input for rotating virtual object 11002 includes a gesture in which a first contact 14008 moves rotationally in a clockwise direction along a path indicated by arrow 14010 and a second contact 14012 moves rotationally in a clockwise direction along a path indicated by arrow 14014. In FIG. 14B, contacts 14008 and 14012 with touch screen 112 are detected. In FIG. 14C, contact 14008 has moved along a path indicated by arrow 14010 and contact 14012 has moved along a path indicated by arrow 14012. Because in FIG. 14C a magnitude of rotational movement of contact 14008 and contact 14012 has not reached threshold RT, virtual object 11002 has not yet rotated in response to the input. In FIG. 14D, a magnitude of rotational movement of contact 14008 and contact 14012 has increased above threshold RT and virtual object 11002 has rotated (relative to the position of virtual object 11002 shown in FIG. 14B) in response to the input. When the magnitude of rotational movement increases above threshold RT, the required magnitude of movement for scaling virtual object 11002 is increased (e.g., the scaling threshold ST has increased from ST to ST', as indicated at scaling movement meter 14004) and the required magnitude of movement for translating virtual object 11002 is increased (e.g., the translation threshold TT has increased from TT to TT', as indicated at translation movement meter 14002). In FIG. 14E, contact 14008 and contact 14012 have continued to move along the rotational paths indicated by arrows 14010 and 14014, respectively, and virtual object 11002 has continued to rotate in response to the input. In FIG. 14F, contacts 14008 and 14012 have lifted off of touch screen 112.

FIGS. 14G-14I illustrate an input for scaling (e.g., increasing the size of) virtual object 11002 in the user interface that includes field of view 6036 of the one or more cameras. The input for increasing the size of virtual object 11002 includes a gesture in which a first contact 14016 moves along a path indicated by arrow 14018 and a second contact 14020 moves along a path indicated by arrow 14022 (e.g., such that a distance between contact 14016 and contact 14020 increases). In FIG. 14G, contacts 14016 and 14020 with touch screen 112 are detected. In FIG. 14H, contact 14016 has moved along a path indicated by arrow 14018 and contact 14020 has moved along a path indicated by arrow 14022. Because in FIG. 14H a magnitude of movement of contact 14016 away from contact 14020 has not reached threshold ST, the size of virtual object 11002 has not yet been adjusted in response to the input. In FIG. 14I, a magnitude of scaling movement of contact 14016 and contact 14020 has increased above threshold ST and the size of virtual object 11002 has been increased (relative to the size of virtual object 11002 shown in FIG. 14H) in response to the input. When the magnitude of scaling movement increases above threshold ST, the required magnitude of movement for rotating virtual object 11002 is increased (e.g., the rotation threshold RT has increased from RT to RT', as indicated at rotation movement meter 14006) and the required magnitude of movement for translating virtual object 11002 is increased (e.g., the translation threshold TT has increased from TT to TT', as indicated at translation movement meter 14002). In FIG. 14J, contacts 14016 and 14020 have lifted off of touch screen 112.

FIGS. 14K-14M illustrate an input for translating virtual object 11002 (e.g., moving virtual object 11002 to the left) in the user interface that includes field of view 6036 of the one or more cameras. The input for moving virtual object 11002 includes a gesture in which a first contact 14024 moves along a path indicated by arrow 14026 and a second contact 14028 moves along a path indicated by arrow 1430 (e.g., such that contacts 14024 and contact 14028 both move leftward). In FIG. 14K, contacts 14024 and 14028 with touch screen 112 are detected. In FIG. 14L, contact 14024 has moved along a path indicated by arrow 14026 and contact 14028 has moved along a path indicated by arrow 14030. Because in FIG. 14L a magnitude of leftward movement of contacts 14024 and 14028 has not reached threshold TT, virtual object 11002 has not yet been moved in response to the input. In FIG. 14M, a magnitude of leftward movement of contact 14024 and contact 14028 has increased above threshold TT and the virtual object 11002 has been moved in the direction of the movement of contacts 14024 and 14028. When the magnitude of translational movement increases above threshold TT, the required magnitude of movement for scaling virtual object 11002 is increased (e.g., the scaling threshold ST has increased from ST to ST', as indicated at scaling movement meter 14004) and the required magnitude of movement for rotating virtual object 11002 is increased (e.g., the rotation threshold RT has increased from RT to RT', as indicated at rotation movement meter 14006). In FIG. 14N, contacts 14024 and 14028 have lifted off of touch screen 112.

FIGS. 14O-14Z illustrate an input that includes gestures for translating virtual object 11002 (e.g., moving virtual object 11002 to the right), scaling virtual object 11002 (e.g., increasing the size of virtual object 11002), and rotating virtual object 11002. In FIG. 14O, contacts 14032 and 14036 with touch screen 112 are detected. In FIGS. 14O-14P, contact 14032 moves along a path indicated by arrow 14034 and contact 14036 moves along a path indicated by arrow 14038. A magnitude of rightward movement of contacts 14032 and 14036 has increased above threshold TT and the virtual object 11002 has been moved in the direction of the movement of contacts 14032 and 14036. As a result of the satisfaction of threshold TT by movement of contacts 14032 and 14036, the required magnitude of movement for scaling virtual object 11002 is increased to ST' and the required magnitude of movement for rotating virtual object 11002 is to RT'. After the threshold TT has been satisfied (as indicated by the high water mark 14043 shown at translation movement meter 14002 in FIG. 14Q), any lateral movement of contact 14032 and 14036 will cause lateral movement of virtual object 11002.

In FIGS. 14Q-14R, contact 14032 moves along a path indicated by arrow 14040 and contact 14036 moves along a path indicated by arrow 14042. In FIG. 14R, the magnitude of movement of contact 14032 away from contact 14036 has exceeded the original scaling threshold ST, but has not reached the increased scaling threshold ST'. When the increased scaling movement threshold ST' is in effect, scaling does not occur until the magnitude of movement of contact 14032 away from contact 14036 increases above the increased scaling movement threshold ST', so the size of virtual object 11002 has not been changed from FIG. 14Q-14R. In FIGS. 14R-14S, the distance between contact 14032 and 14046 continues to increase as contact 14032 moves along a path indicated by arrow 14044 and contact 14036 moves along a path indicated by arrow 14046. In FIG. 14S, the magnitude of movement of contact 14032 away from contact 14036 has exceeded the increased scaling threshold ST' and the size of virtual object 11002 has increased. After the threshold ST' has been satisfied (as indicated by the high water mark 14047 shown at scaling movement meter 14004 in FIG. 14T), any scaling movement of contact 14032 and 14036 will cause scaling of virtual object 11002.

In FIGS. 14T-14U, contact 14032 moves along a path indicated by arrow 14048 and contact 14036 moves along a path indicated by arrow 14050. Because the threshold TT has been satisfied (as indicated by the high water mark 14043 shown at translation movement meter 14002), virtual object 11002 moves freely in the direction of the lateral movement of contacts 14032 and 14036.

In FIGS. 14V-14W, contact 14032 moves along a path indicated by arrow 14052 and contact 14036 moves along a path indicated by arrow 14054. The movement of the contacts 14032 and 14036 includes translational movement (leftward movement of contacts 14032 and 14036) and scaling movement (movement that decreases the distance between contact 14032 and contact 14036 (e.g., a pinch gesture)). Because the translation threshold TT has been satisfied (as indicated by the high water mark 14043 shown at translation movement meter 14002), virtual object 11002 moves freely in the direction of the lateral movement of contacts 14032 and 14036, and because the increased scaling threshold ST' has been satisfied (as indicated by the high water mark 14047 shown at scaling movement meter 14004), virtual object 11002 scales freely in response to the movement of contact 14032 toward contact 14036. From FIG. 14V to 14W, the size of virtual object 11002 has decreased and virtual object 11002 has moved leftward in response to the movement of contact 14032 along the path indicated by arrow 14052 and the movement of contact 14036 along the path indicated by arrow 14054.

In FIGS. 14X-14Z, contact 14032 moves rotationally in a counterclockwise direction along a path indicated by arrow 14056 and contact 14036 moves rotationally in a counterclockwise direction along a path indicated by arrow 14058. In FIG. 14Y, the magnitude of rotational movement of contact 14032 and contact 14036 has exceeded the original scaling threshold RT, but has not reached the increased scaling threshold RT'. When the increased scaling movement threshold RT' is in effect, rotation of virtual object 11002 does not occur until the magnitude of rotational movement of contacts 14032 and 14036 increases above the increased rotational movement threshold RT', so virtual object 11002 has not rotated from FIG. 14X-14Y. In FIGS. 14Y-14Z, contact 14032 and 14046 continue to move rotationally in a counterclockwise direction as contact 14032 moves along a path indicated by arrow 14060 and contact 14036 moves along a path indicated by arrow 14062. In FIG. 14Z, the magnitude of rotational movement of contact 14032 and contact 14036 has exceeded the increased scaling threshold RT' and the virtual object 11002 has rotated in response to the input.

FIGS. 14AA-14AD are flow diagrams illustrating operations for, in accordance with a determination that a first threshold magnitude of movement is met for a first object manipulation behavior, increasing a second threshold magnitude of movement required for a second object manipulation behavior. The operations described with regard to FIGS. 14AA-14AD are performed at an electronic device (e.g., device 300, FIG. 3, or portable multifunction device 100, FIG. 1A) having a display generation component (e.g., a display, a projector, a heads up display or the like) and a touch-sensitive surface (e.g., a touch-sensitive surface, or a touch-screen display that serves both as the display generation component and the touch-sensitive surface). Some operations described with regard to FIGS. 14AA-14AD are, optionally, combined and/or the order of some operations is, optionally, changed.

At operation 14066, a first portion of a user input that includes movement of one or more contacts is detected. At operation 14068, it is determined whether the movement of the one or more contacts (e.g., at a location that corresponds to a virtual object 11002) increases above an object rotation threshold (e.g., rotation threshold RT indicated by rotation movement meter 14006). In accordance with a determination that the movement of the one or more contacts increases above an object rotation threshold (e.g., as described with regard to FIGS. 14B-14D), the flow proceeds to operation 14070. In accordance with a determination that the movement of the one or more contacts does not increase above an object rotation threshold, the flow proceeds to operation 14074.

At operation 14070, the object (e.g., virtual object 11002) is rotated based on the first portion of the user input (e.g., as described with regard to FIGS. 14B-14D). At operation 14072, an object translation threshold is increased (e.g., from TT to TT', as described with regard to FIG. 14D), and an object scaling threshold is increased (e.g., from ST to ST', as described with regard to FIG. 14D). Flow proceeds from operation 14072 to operation 14086 of FIG. 14AB, as indicated at A.

At operation 14074, it is determined whether the movement of the one or more contacts (e.g., at a location that corresponds to a virtual object 11002) increases above an object translation threshold (e.g., translation threshold TT indicated by translation movement meter 14002). In accordance with a determination that the movement of the one or more contacts increases above an object translation threshold (e.g., as described with regard to FIGS. 14K-14M), the flow proceeds to operation 14076. In accordance with a determination that the movement of the one or more contacts does not increase above an object translation threshold, the flow proceeds to operation 14080.

At operation 14076, the object (e.g., virtual object 11002) is translated based on the first portion of the user input (e.g., as described with regard to FIGS. 14K-14M). At operation 14078, an object rotation threshold is increased (e.g., from RT to RT', as described with regard to FIG. 14M) and an object scaling threshold is increased (e.g., from ST to ST', as described with regard to FIG. 14M). Flow proceeds from operation 14078 to operation 14100 of FIG. 14AC, as indicated at B.

At operation 14080, it is determined whether the movement of the one or more contacts (e.g., at a location that corresponds to a virtual object 11002) increases above an object scaling threshold (e.g., scaling threshold ST indicated by scaling movement meter 14004). In accordance with a determination that the movement of the one or more contacts increases above an object scaling threshold (e.g., as described with regard to FIGS. 14G-14I), the flow proceeds to operation 14082. In accordance with a determination that the movement of the one or more contacts does not increase above an object scaling threshold, the flow proceeds to operation 14085.

At operation 14082, the object (e.g., virtual object 11002) is scaled based on the first portion of the user input (e.g., as described with regard to FIGS. 14G-14I). At operation 14084, an object rotation threshold is increased (e.g., from RT to RT', as described with regard to FIG. 14I) and an object translation threshold is increased (e.g., from TT to TT', as described with regard to FIG. 14I). Flow proceeds from operation 14084 to operation 14114 of FIG. 14AD, as indicated at C.

At operation 14085, an additional portion of user input that includes movement of the one or more contacts is detected. Flow proceeds from operation 14086 to operation 14066.

In FIG. 14AB, at operation 14086, an additional portion of user input that includes movement of the one or more contacts is detected. Flow proceeds from operation 14086 to operation 14088.

At operation 14088, it is determined whether the movement of the one or more contacts is rotation movement. In accordance with a determination that the movement of the one or more contacts is rotation movement, the flow proceeds to operation 14090. In accordance with a determination that the movement of the one or more contacts is not rotation movement, the flow proceeds to operation 14092.

At operation 14090, the object (e.g., virtual object 11002) is rotated based on the additional portion of the user input (e.g., as described with regard to FIGS. 14D-14E). Because the rotation threshold was previously met, the object rotates freely in accordance with additional rotation input.

At operation 14092, it is determined whether the movement of the one or more contacts increases above an increased object translation threshold (e.g., translation threshold TT' indicated by translation movement meter 14002 in FIG. 14D). In accordance with a determination that the movement of the one or more contacts increases above the increased object translation threshold, the flow proceeds to operation 14094. In accordance with a determination that the movement of the one or more contacts does not increase above the increased object translation threshold, the flow proceeds to operation 14096.

At operation 14094, the object (e.g., virtual object 11002) is translated based on the additional portion of the user input.

At operation 14096, it is determined whether the movement of the one or more contacts increases above an increased object scaling threshold (e.g., scaling threshold ST' indicated by scaling movement meter 14004 in FIG. 14D). In accordance with a determination that the movement of the one or more contacts increases above the increased object scaling threshold, the flow proceeds to operation 14098. In accordance with a determination that the movement of the one or more contacts does not increase above the increased object scaling threshold, the flow returns to operation 14086.

At operation 14098, the object (e.g., virtual object 11002) is scaled based on the additional portion of the user input.

In FIG. 14AC, at operation 14100, an additional portion of user input that includes movement of the one or more contacts is detected. Flow proceeds from operation 14100 to operation 14102.

At operation 14102, it is determined whether the movement of the one or more contacts is translation movement. In accordance with a determination that the movement of the one or more contacts is translation movement, the flow proceeds to operation 140104. In accordance with a determination that the movement of the one or more contacts is not translation movement, the flow proceeds to operation 14106.

At operation 14104, the object (e.g., virtual object 11002) is translated based on the additional portion of the user input. Because the translation threshold was previously met, the object translates freely in accordance with additional translation input.

At operation 14106, it is determined whether the movement of the one or more contacts increases above an increased object rotation threshold (e.g., rotation threshold RT' indicated by rotation movement meter 14006 in FIG. 14M). In accordance with a determination that the movement of the one or more contacts increases above the increased object rotation threshold, the flow proceeds to operation 14108. In accordance with a determination that the movement of the one or more contacts does not increase above the increased object rotation threshold, the flow proceeds to operation 14110.

At operation 14108, the object (e.g., virtual object 11002) is rotated based on the additional portion of the user input.

At operation 14110, it is determined whether the movement of the one or more contacts increases above an increased object scaling threshold (e.g., scaling threshold ST' indicated by scaling movement meter 14004 in FIG. 14M). In accordance with a determination that the movement of the one or more contacts increases above the increased object scaling threshold, the flow proceeds to operation 14112. In accordance with a determination that the movement of the one or more contacts does not increase above the increased object scaling threshold, the flow returns to operation 14100.

At operation 14112, the object (e.g., virtual object 11002) is scaled based on the additional portion of the user input.

In FIG. 14AD, at operation 14114, an additional portion of user input that includes movement of the one or more contacts is detected. Flow proceeds from operation 14114 to operation 14116.

At operation 14116, it is determined whether the movement of the one or more contacts is scaling movement. In accordance with a determination that the movement of the one or more contacts is scaling movement, the flow proceeds to operation 140118. In accordance with a determination that the movement of the one or more contacts is not scaling movement, the flow proceeds to operation 14120.

At operation 14118, the object (e.g., virtual object 11002) is scaled based on the additional portion of the user input. Because the scaling threshold was previously met, the object scales freely in accordance with additional scaling input.

At operation 14120, it is determined whether the movement of the one or more contacts increases above an increased object rotation threshold (e.g., rotation threshold RT' indicated by rotation movement meter 14006 in FIG. 14I). In accordance with a determination that the movement of the one or more contacts increases above the increased object rotation threshold, the flow proceeds to operation 14122. In accordance with a determination that the movement of the one or more contacts does not increase above the increased object rotation threshold, the flow proceeds to operation 14124.

At operation 14122, the object (e.g., virtual object 11002) is rotated based on the additional portion of the user input.

At operation 14124, it is determined whether the movement of the one or more contacts increases above an increased object translation threshold (e.g., translation threshold TT' indicated by translation movement meter 14002 in FIG. 14I). In accordance with a determination that the movement of the one or more contacts increases above the increased object translation threshold, the flow proceeds to operation 14126. In accordance with a determination that the movement of the one or more contacts does not increase above the increased object translation threshold, the flow proceeds to operation 14114.

Figure 15A:
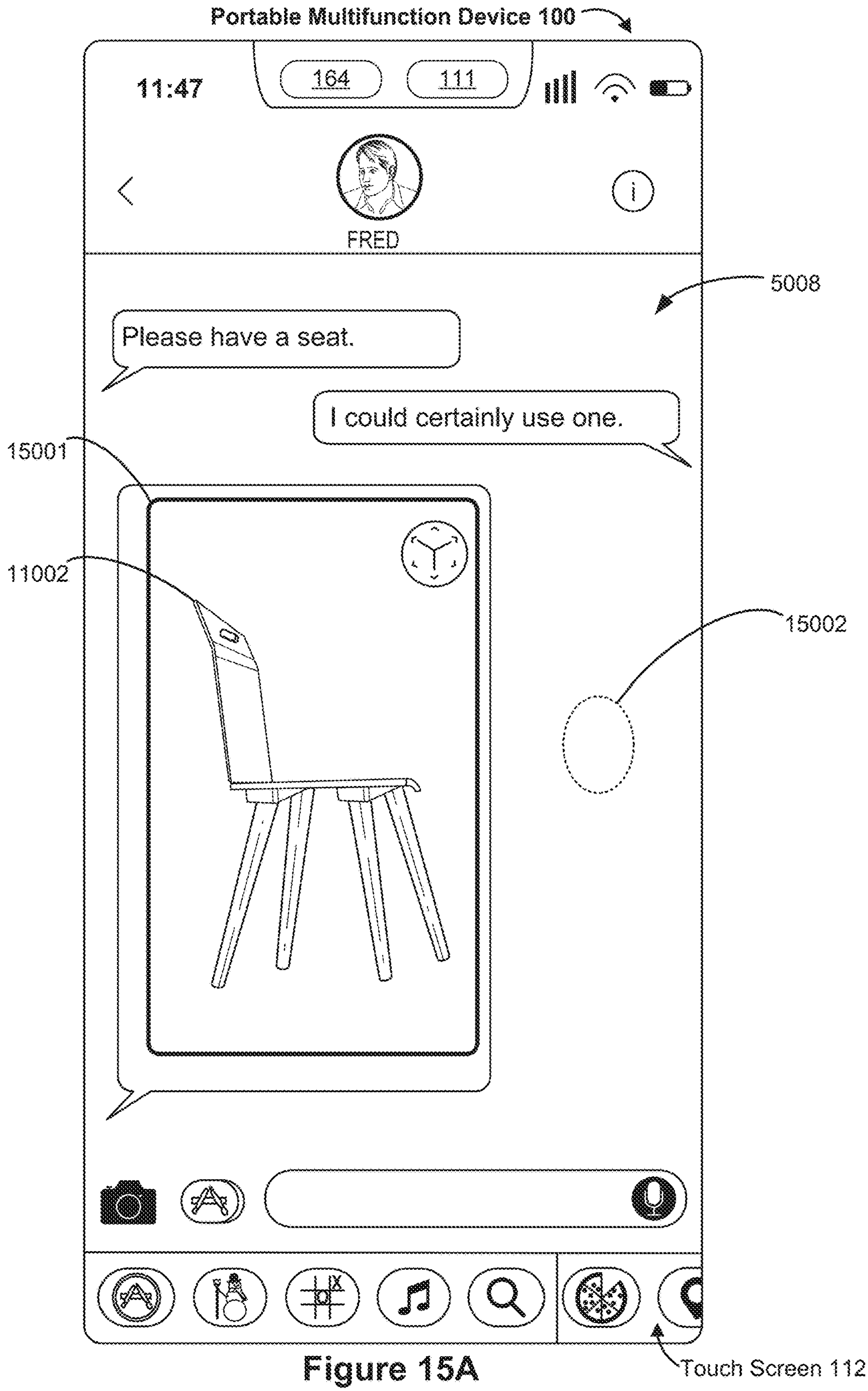
FIGS. 15A-15AI illustrate example user interfaces for generating an audio alert in accordance with a determination that movement of a device causes a virtual object to move outside of a displayed field of view of one or more device cameras, in accordance with some embodiments.

FIGS. 15A-15AI illustrate example user interfaces for generating an audio alert in accordance with a determination that movement of a device causes a virtual object to move outside of a displayed field of view of one or more device cameras. The user interfaces in these figures are used to illustrate the processes described below, including the processes in FIGS. 8A-8E, 9A-9D, 10A-10D, 16A-16G, 17A-17D, 18A-18I, 19A-19H, and 20A-20F. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIGS. 15A-15AI illustrate user interfaces and device operations that occur when an accessibility feature is active. In some embodiments, the accessibility feature includes a mode in which a decreased number of inputs or alternative inputs are usable for accessing device features (e.g., to increase the ease of accessing device features for users with limited ability to provide the input gestures described above). For example, the accessibility mode is a switch control mode in which a first input gesture (e.g., a swipe input) is used to advance or reverse through available device operations, and a selection input (e.g., a double tap input) is used to perform a currently indicated operation. As the user interacts with the device, audio alerts are generated (e.g., to provide feedback to the user to indicate that an operation has been performed, to indicate a current display status of a virtual object 11002 relative to a staging user interface or a field of view of one or more cameras of the device, etc.).

In FIG. 15A, a messaging user interface 5008 includes a two-dimensional representation of three-dimensional virtual object 11002. A selection cursor 15001 is shown surrounding three-dimensional virtual object 11002 (e.g., to indicate that a currently selected operation is an operation that will be performed on virtual object 11002). An input (e.g., a double tap input) by contact 15002 is detected for performing the currently indicated operation (e.g., displaying a three-dimensional representation of virtual object 11002 in staging user interface 6010). In response to the input, display of the messaging user interface 5060 is replaced by display of a staging user interface 6010, as shown in FIG. 15B.

Figure 15B:
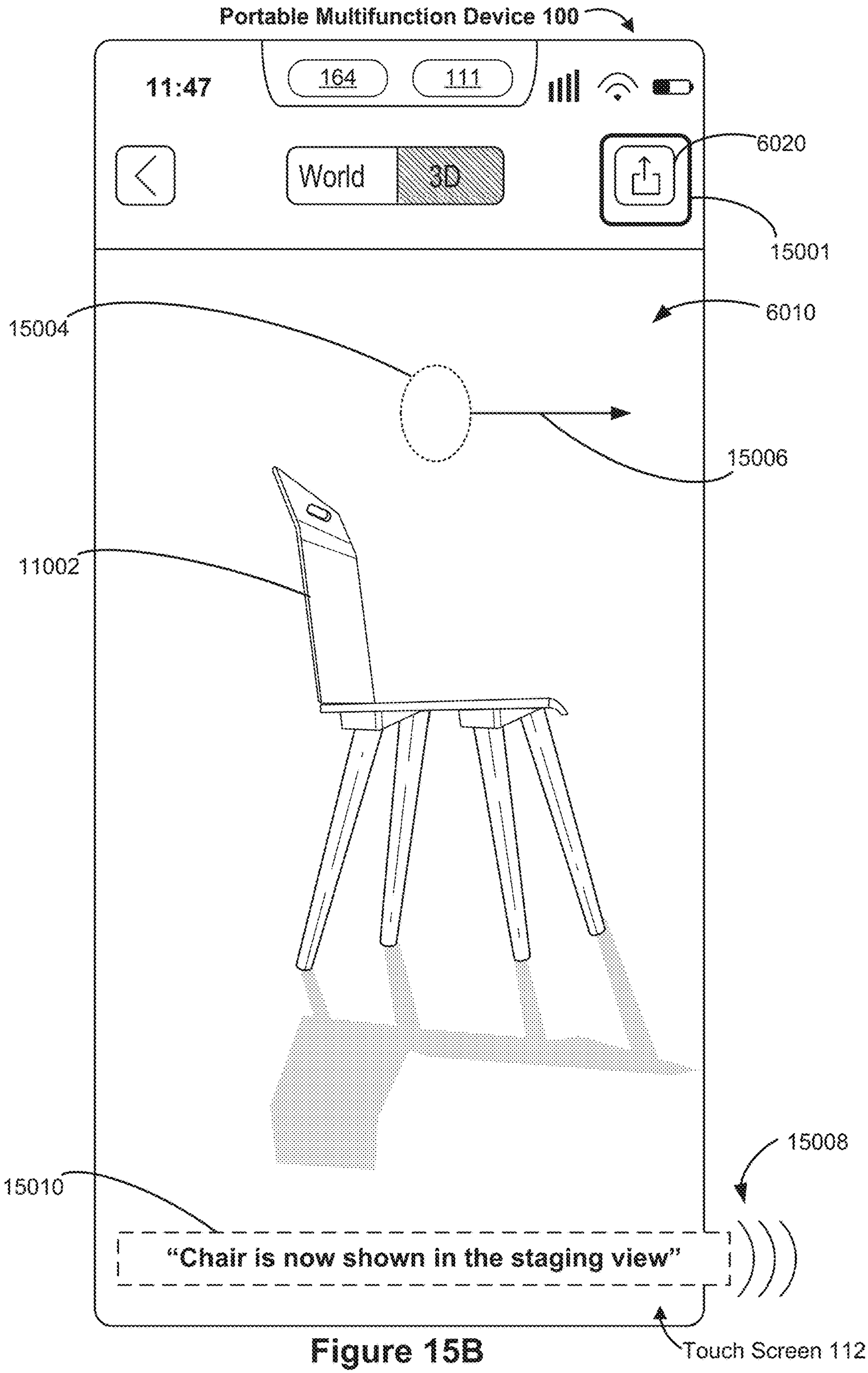

In FIG. 15B, virtual object 11002 is displayed in staging user interface 6010. An audio alert is generated (e.g., by device speaker 111), as indicated at 15008, to indicate a status of the device. For example, the audio alert 15008 includes an announcement, "chair is now shown in the staging view," as indicated at 15010.

In FIG. 15B, a selection cursor 15001 is shown surrounding share control 6020 (e.g., to indicate that a currently selected operation is a share operation). An input (e.g., a rightward swipe along a path indicated by arrow 15006) by contact 15004 is detected. In response to the input, the selected operation is advanced to a next operation.

Figure 15C:
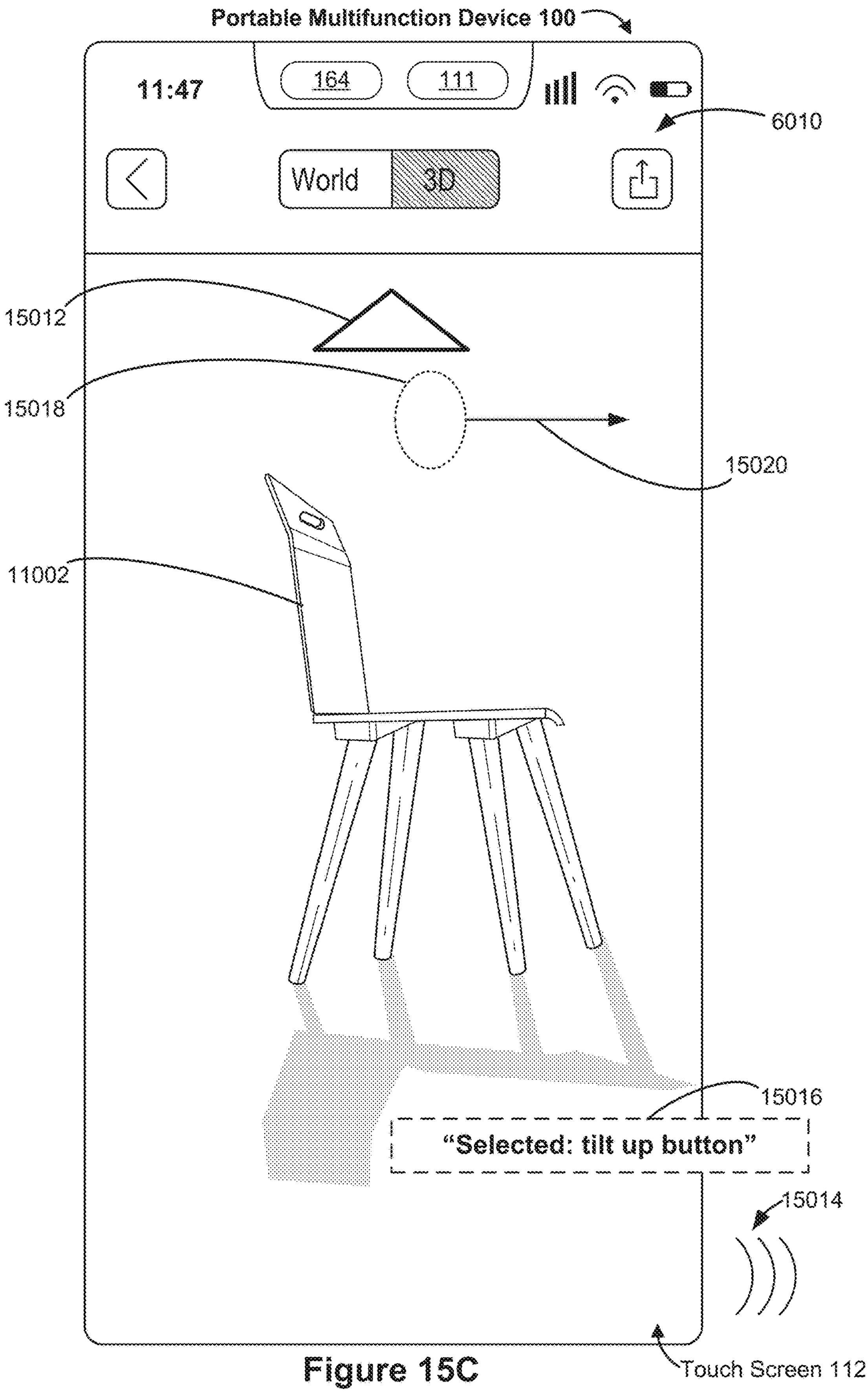

In FIG. 15C, a tilt up control 15012 is displayed (e.g., to indicate that a currently selected operation is an operation for tilting the displayed virtual object 11002 upward). An audio alert is generated, as indicated at 15014, to indicate a status of the device. For example, the audio alert includes an announcement, "selected: tilt up button," as indicated at 15016. An input (e.g., a rightward swipe along a path indicated by arrow 15020) by contact 15018 is detected. In response to the input, the selected operation is advanced to a next operation.

Figure 15D:
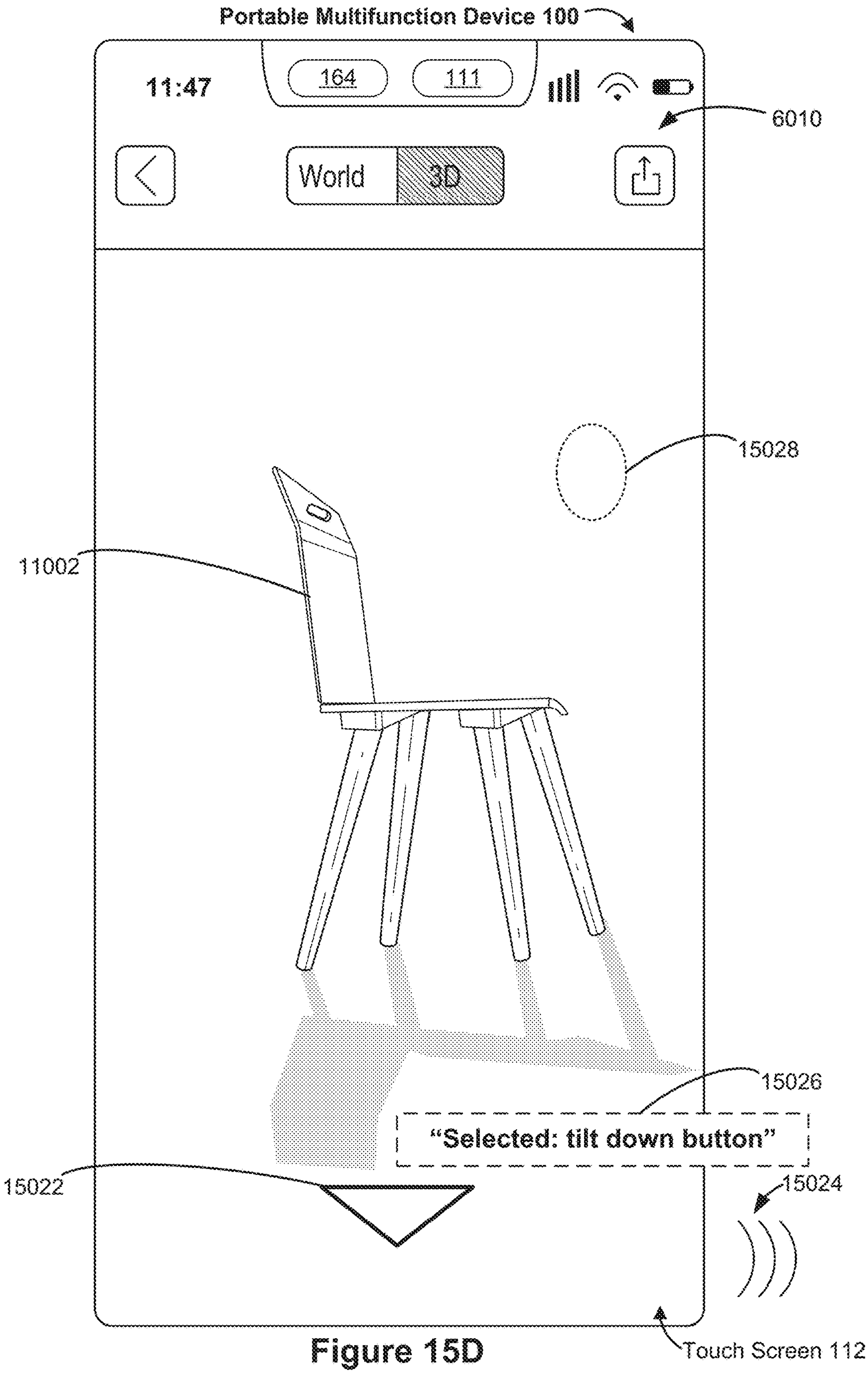

In FIG. 15D, a tilt down control 15022 is displayed (e.g., to indicate that a currently selected operation is an operation for tilting the displayed virtual object 11002 downward). An audio alert is generated, as indicated at 15024, to indicate a status of the device. For example, the audio alert includes an announcement, "selected: tilt down button," as indicated at 15026. An input (e.g., a double tap input) by contact 15028 is detected. In response to the input, the selected operation is performed (e.g., the virtual object 11002 is tilted downward in the staging view).

Figure 15E:
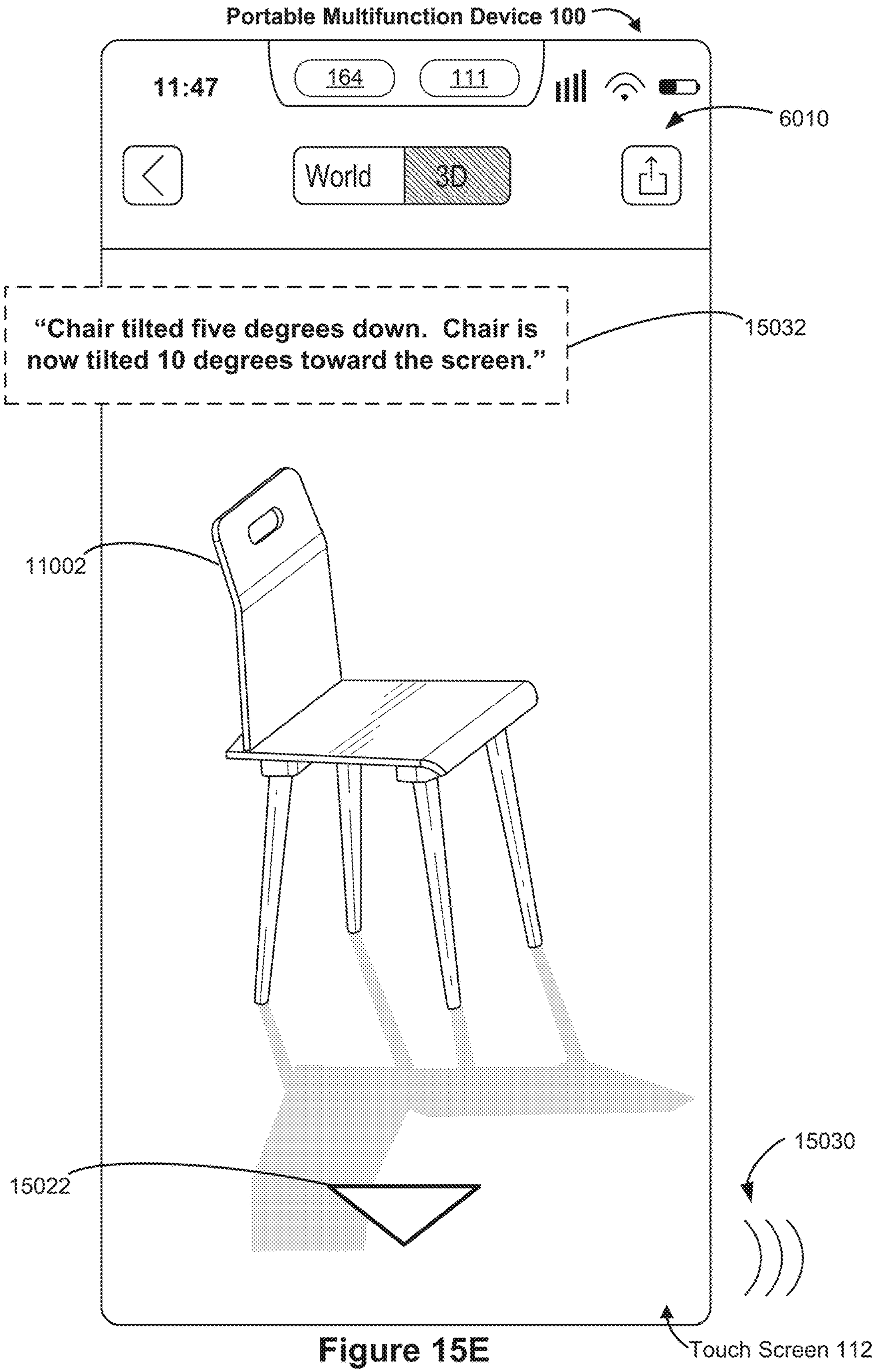

In FIG. 15E, the virtual object 11002 is tilted downward in the staging view. An audio alert is generated, as indicated at 15030, to indicate a status of the device. For example, the audio alert includes an announcement, "Chair tilted five degrees down. Chair is now tilted 10 degrees toward the screen," as indicated at 15032.

Figure 15F:
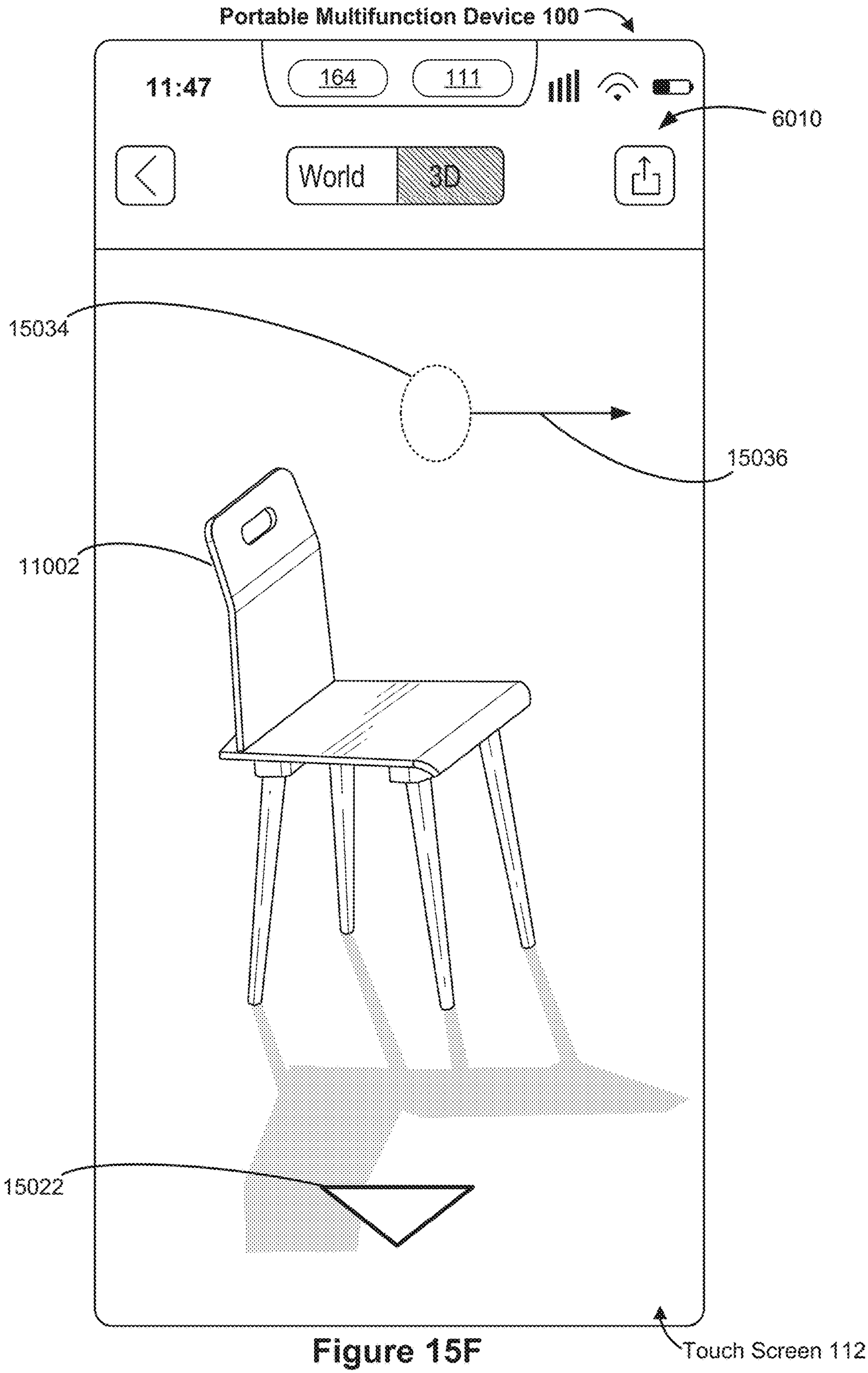

In FIG. 15F, an input (e.g., a rightward swipe along a path indicated by arrow 15036) by contact 15034 is detected. In response to the input, the selected operation is advanced to a next operation.

Figure 15G:
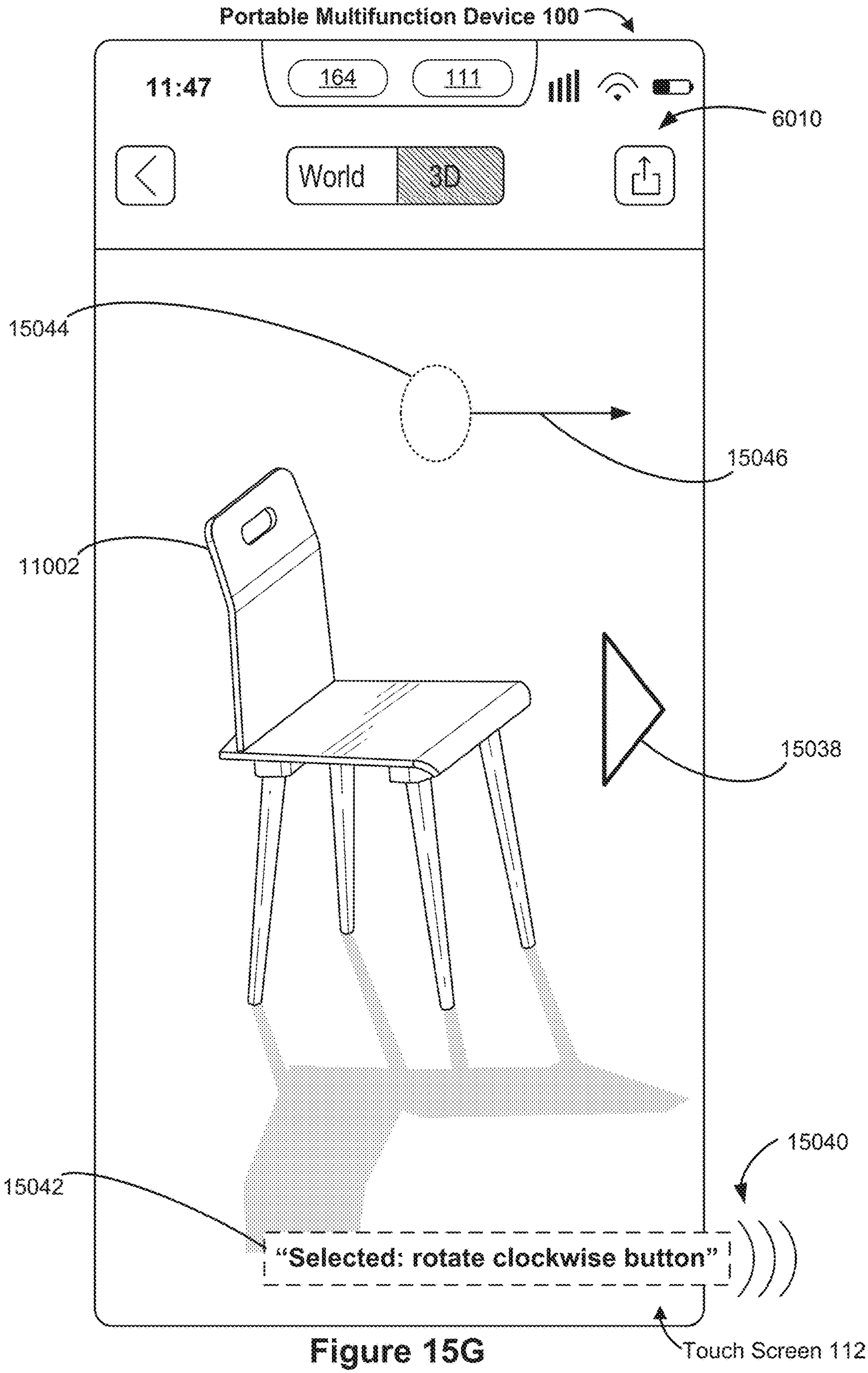

In FIG. 15G, a rotate clockwise control 15038 is displayed (e.g., to indicate that a currently selected operation is an operation for rotating the displayed virtual object 11002 clockwise). Audio alert 15040 includes an announcement, "selected: rotate clockwise button," as indicated at 15042. An input (e.g., a rightward swipe along a path indicated by arrow 15046) by contact 15044 is detected. In response to the input, the selected operation is advanced to a next operation.

Figure 15H:
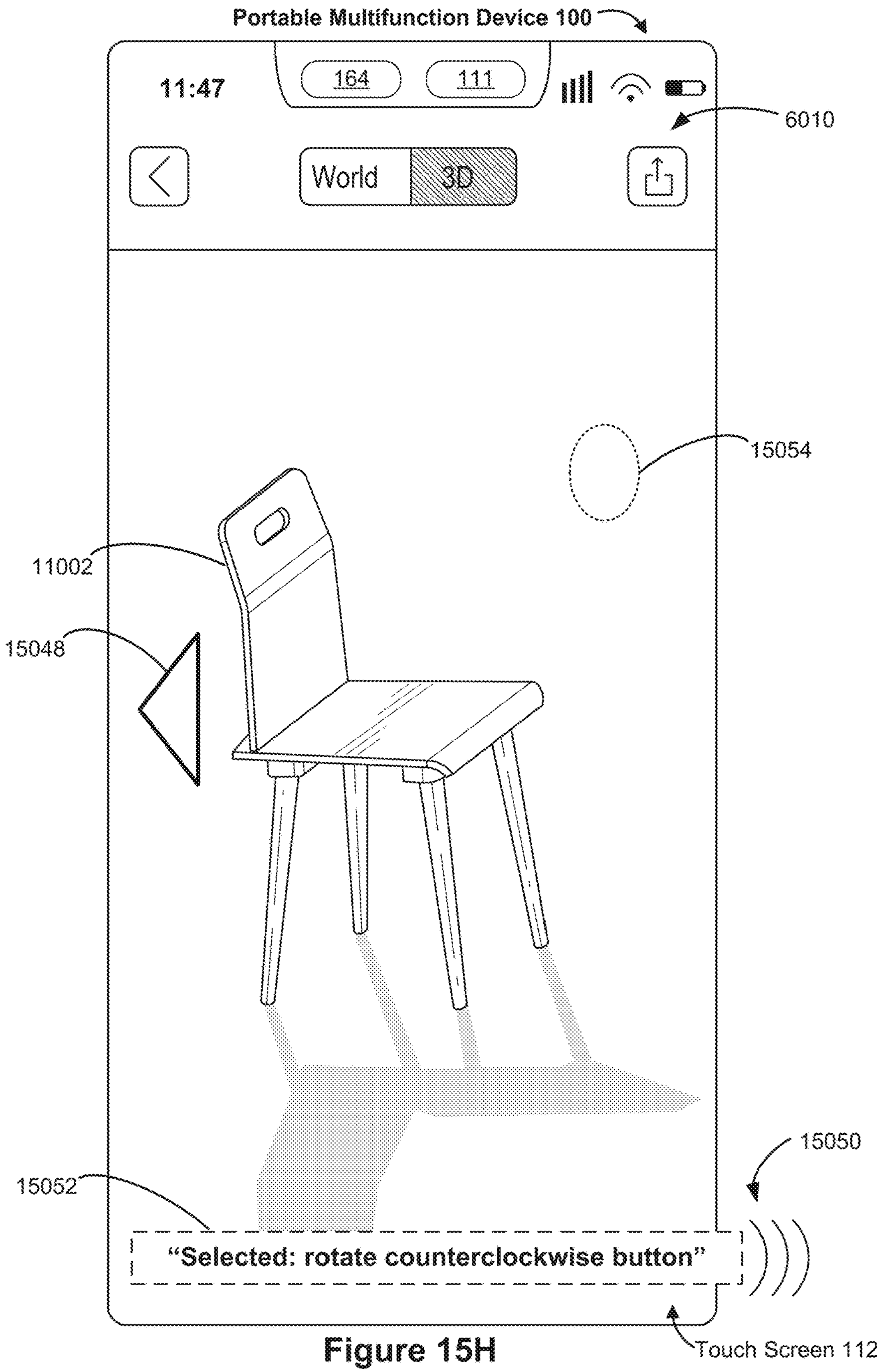

In FIG. 15H, a rotate counterclockwise control 15048 is displayed (e.g., to indicate that a currently selected operation is an operation for rotating the displayed virtual object 11002 counterclockwise). An audio alert 15050 includes an announcement, "selected: rotate counterclockwise button," as indicated at 15052. An input (e.g., a double tap input) by contact 15054 is detected. In response to the input, the selected operation is performed (e.g., the virtual object 11002 is rotated counterclockwise in the staging view, as indicated in FIG. 15I).

Figure 15I:
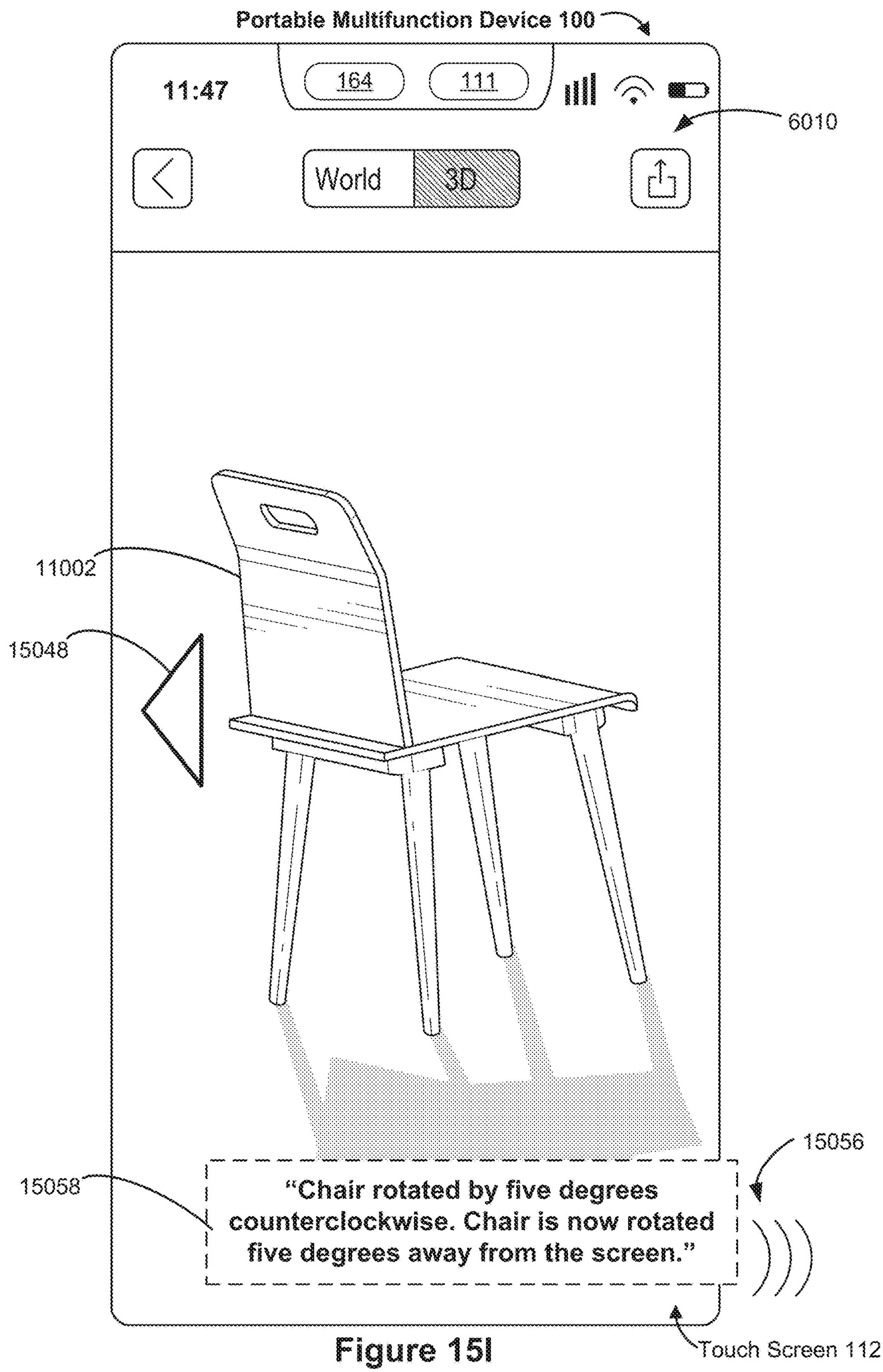

In FIG. 15I, audio alert 15056 includes an announcement, "Chair rotated by five degrees counterclockwise. Chair is now rotated five degrees away the screen," as indicated at 15058.

Figure 15J:
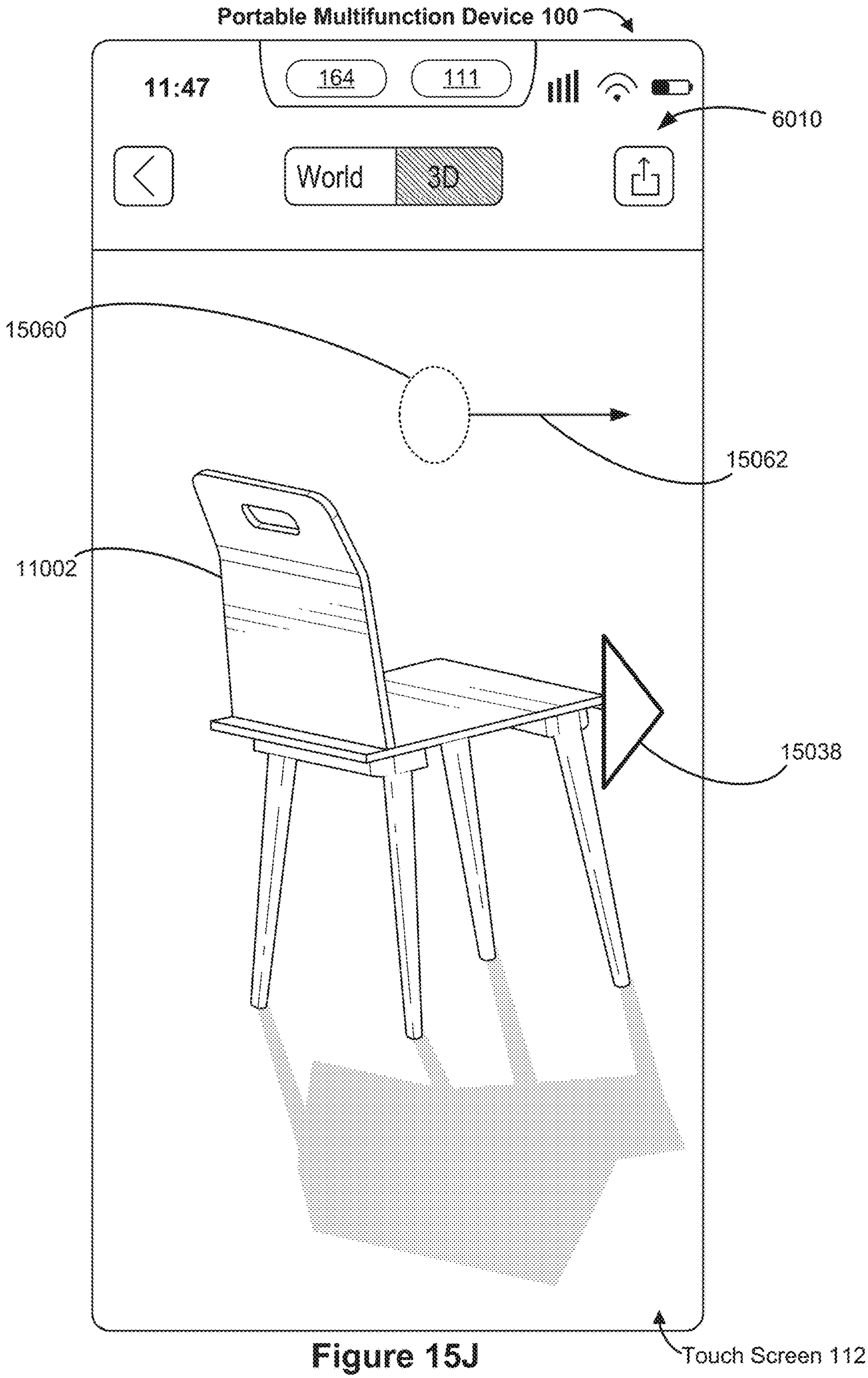

In FIG. 15J, an input (e.g., a rightward swipe along a path indicated by arrow 15062) by contact 15060 is detected. In response to the input, the selected operation is advanced to a next operation.

Figure 15K:
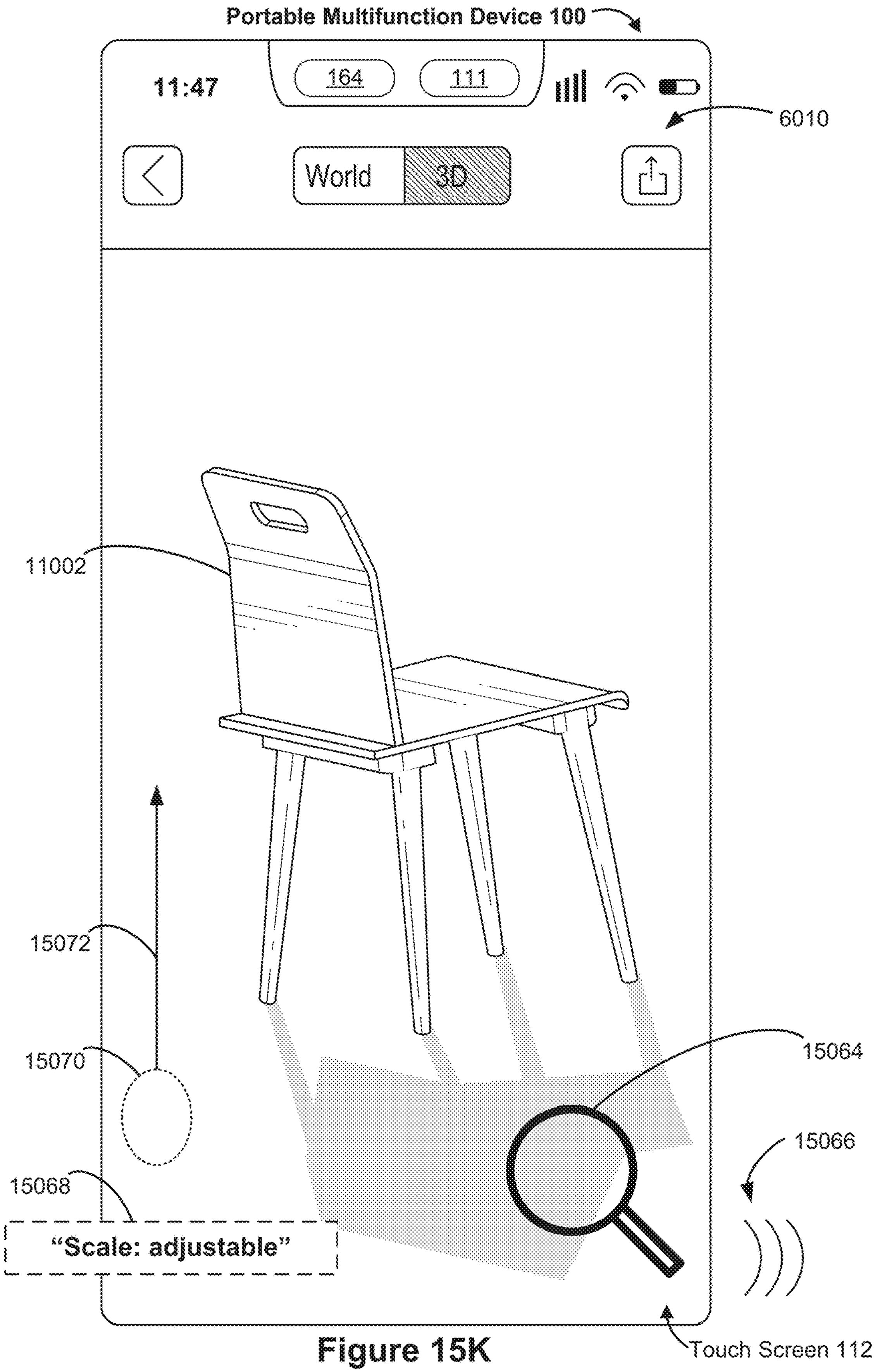

In FIG. 15K, a zoom control 15064 is displayed (e.g., to indicate that a currently selected operation is an operation for zooming the displayed virtual object 11002). Audio alert 15066 includes an announcement, "scale: adjustable," as indicated at 15068. The keyword "adjustable" in conjunction with a control name in the announcement indicates that a swipe input (e.g., a vertical swipe input) is usable to operate the control. For example, an upward swipe input is provided by contact 5070 as it moves upward along a path indicated by arrow 5072. In response to the input, the zoom operation is performed (e.g., the size of virtual object 11002 is increased, as indicated in FIGS. 15K-15L).

Figure 15L:
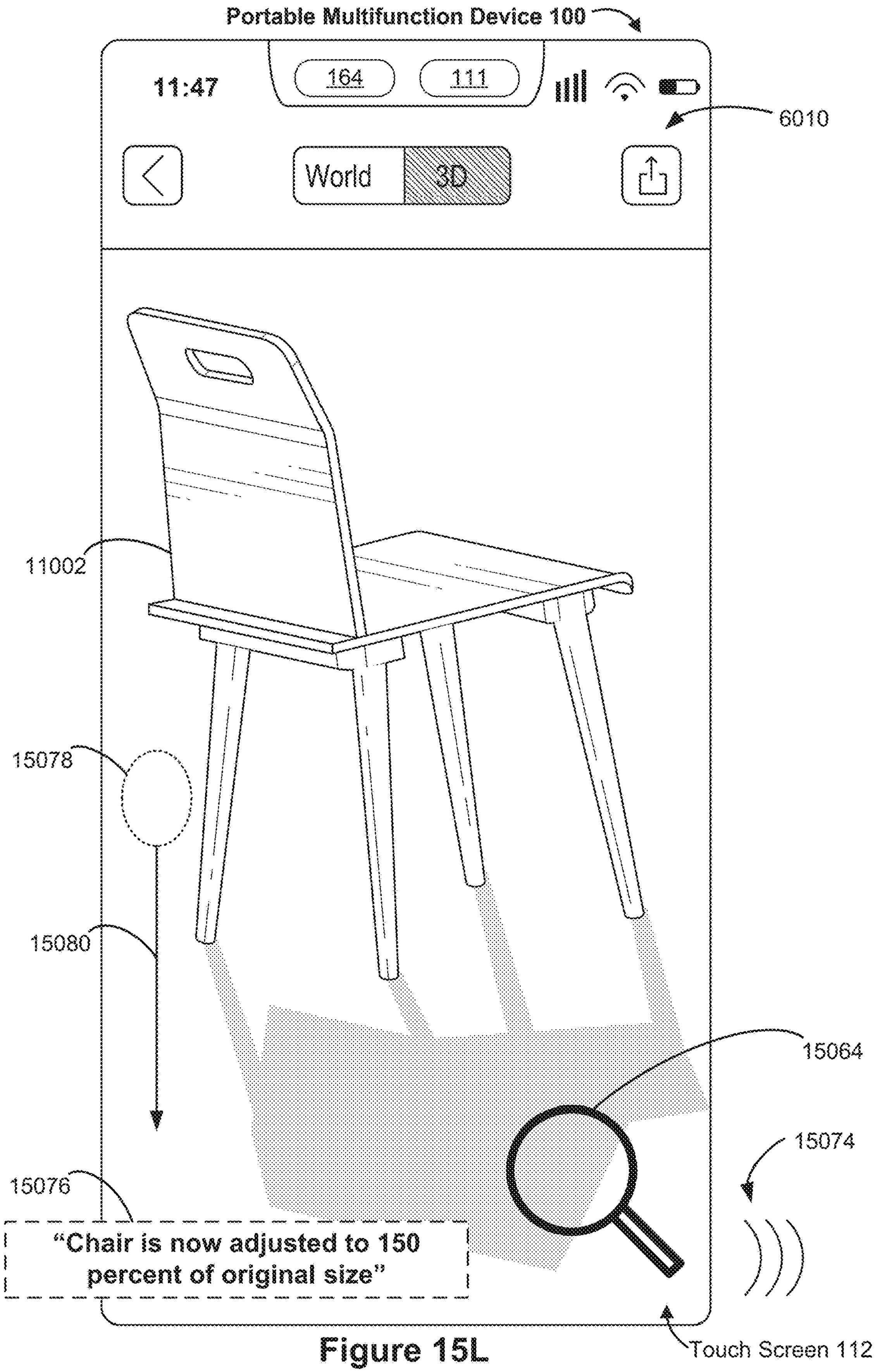

In FIG. 15L, audio alert 15074 includes an announcement, "Chair is now adjusted to 150 percent of original size," as indicated at 15076. An input for reducing the size of virtual object 11002 (e.g., a downward swipe input) is provided by contact 5078 that moves downward along a path indicated by arrow 5078. In response to the input, the zoom operation is performed (e.g., the size of virtual object 11002 is decreased, as indicated in FIGS. 15L-15M).

Figure 15M:
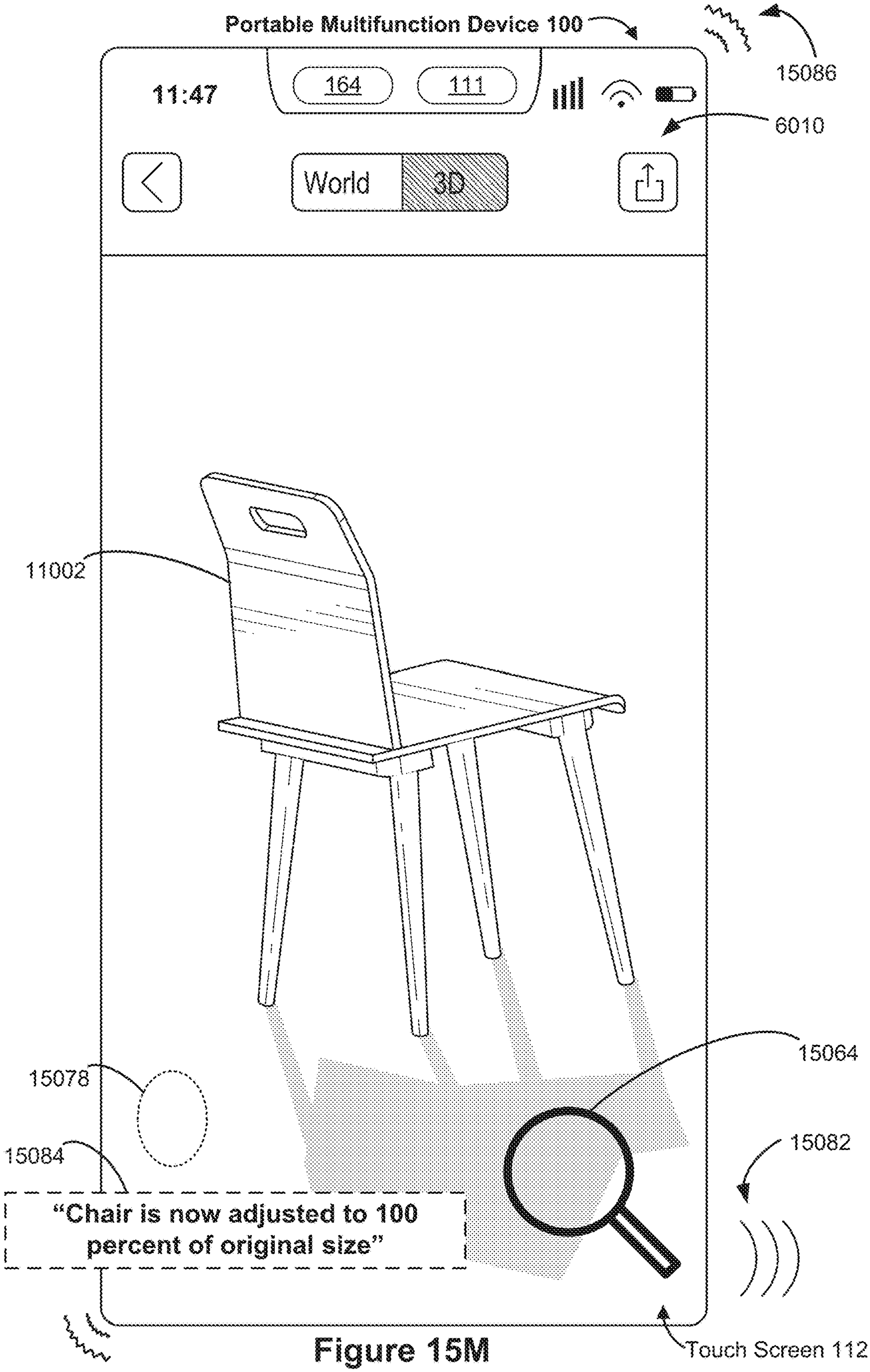

In FIG. 15M, audio alert 15082 includes an announcement, "Chair is now adjusted to 100 percent of original size," as indicated at 15084. Because the size of virtual object 11002 is adjusted to its originally displayed size in staging view 6010, a tactile output (as illustrated at 15086) occurs (e.g., to provide feedback indicating that the virtual object 11002 has returned to its original size).

Figure 15N:
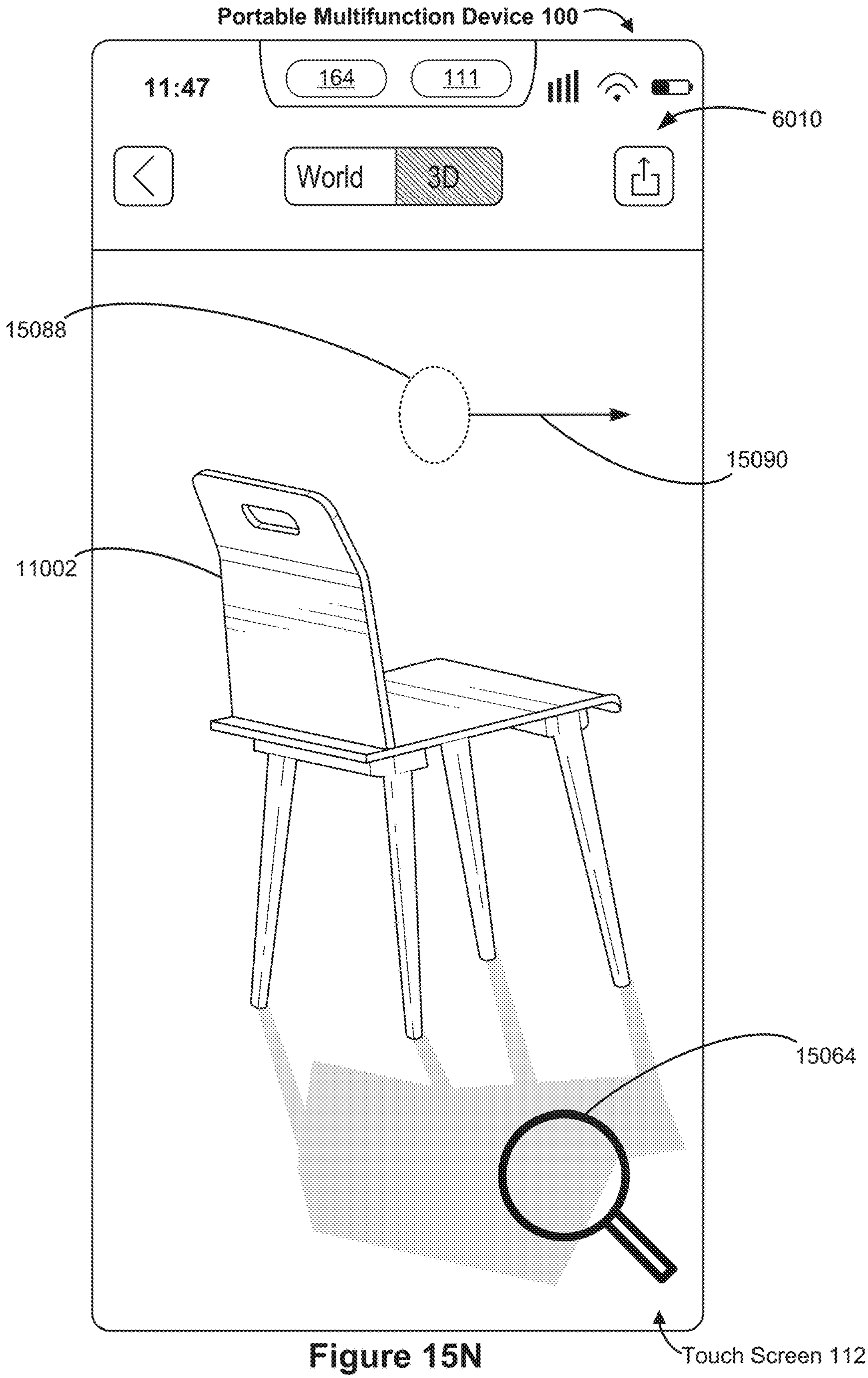

In FIG. 15N, an input (e.g., a rightward swipe along a path indicated by arrow 15090) by contact 15088 is detected. In response to the input, the selected operation is advanced to a next operation.

Figure 15O:
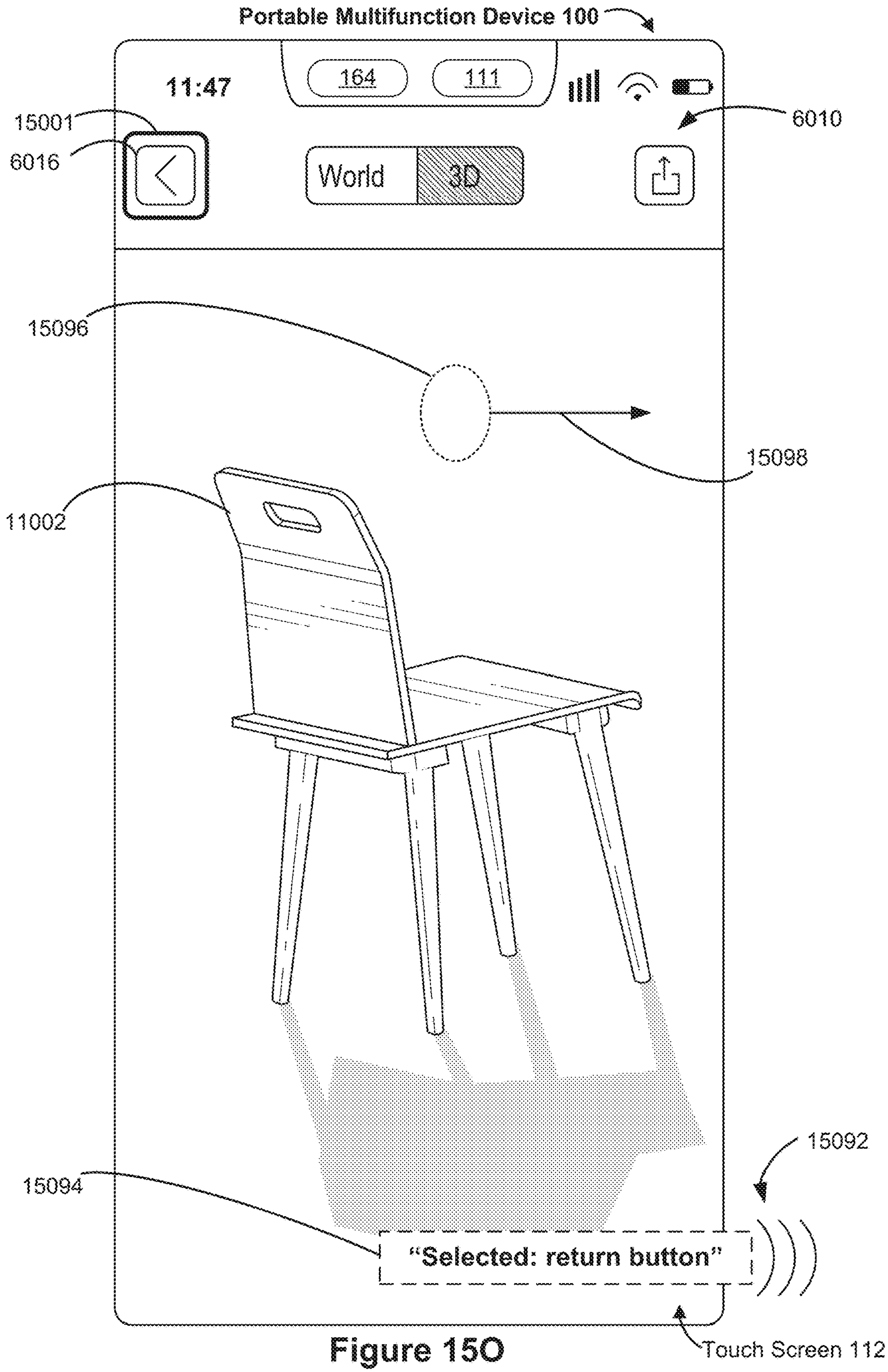

In FIG. 15O, a selection cursor 15001 is shown surrounding back control 6016 (e.g., to indicate that a currently selected operation is an operation for returning to the previous user interface). Audio alert 15092 includes an announcement, "selected: return button," as indicated at 15094. An input (e.g., a rightward swipe along a path indicated by arrow 15098) by contact 15096 is detected. In response to the input, the selected operation is advanced to a next operation.

Figure 15P:
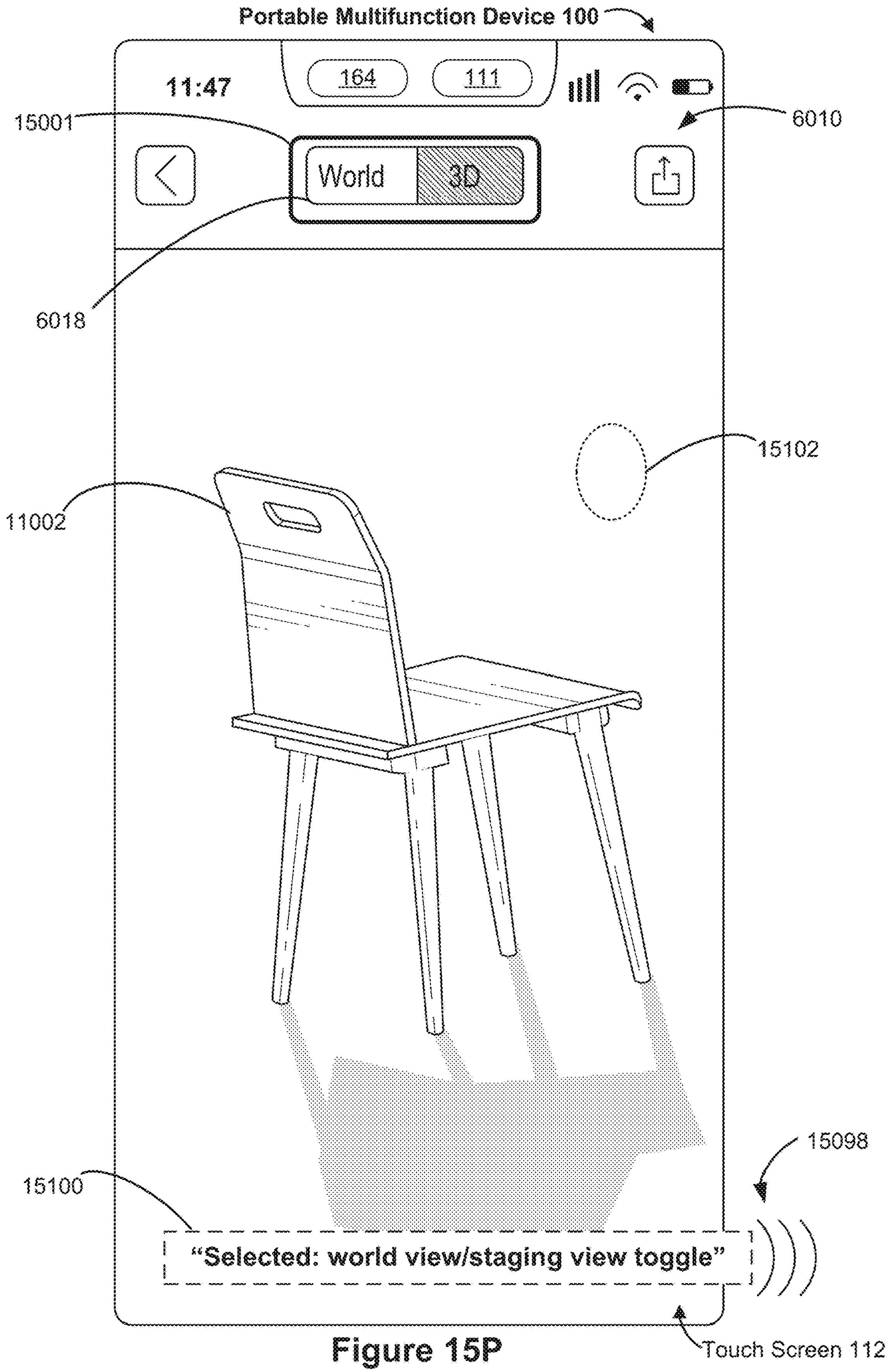

In FIG. 15P, a selection cursor 15001 is shown surrounding toggle control 6018 (e.g., to indicate that a currently selected operation is an operation for toggling between display of staging user interface 6010 and display of a user interface that includes field of view 6036 of the camera(s)). Audio alert 15098 includes an announcement, "selected: world view/staging view toggle," as indicated at 50100. An input (e.g., a double tap input) by contact 15102 is detected. In response to the input, display of staging user interface 6010 is replaced by display of a user interface that includes field of view 6036 of the camera(s) (as indicated in FIG. 15Q).

Figure 15Q:
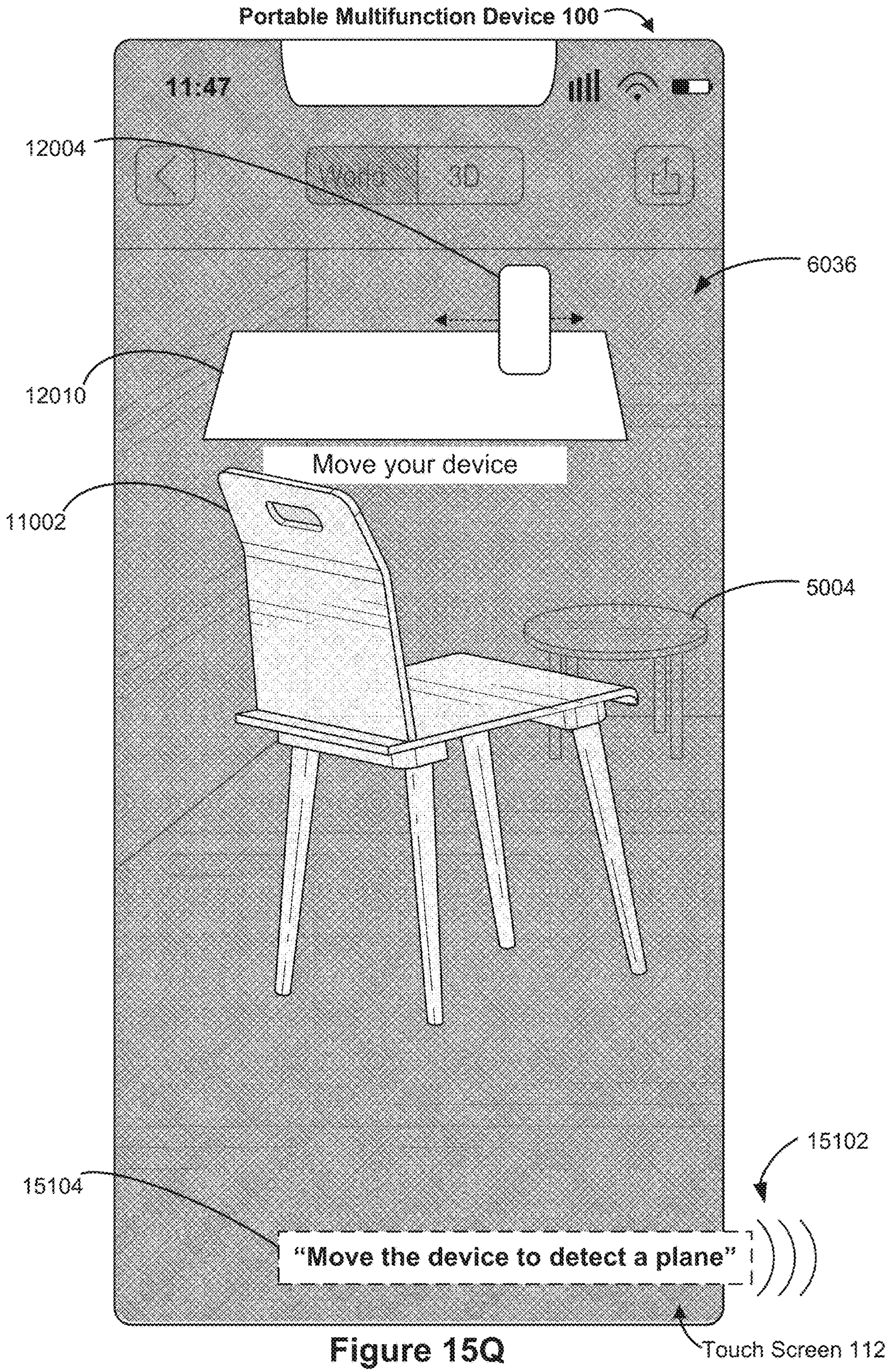
Figure 15R:
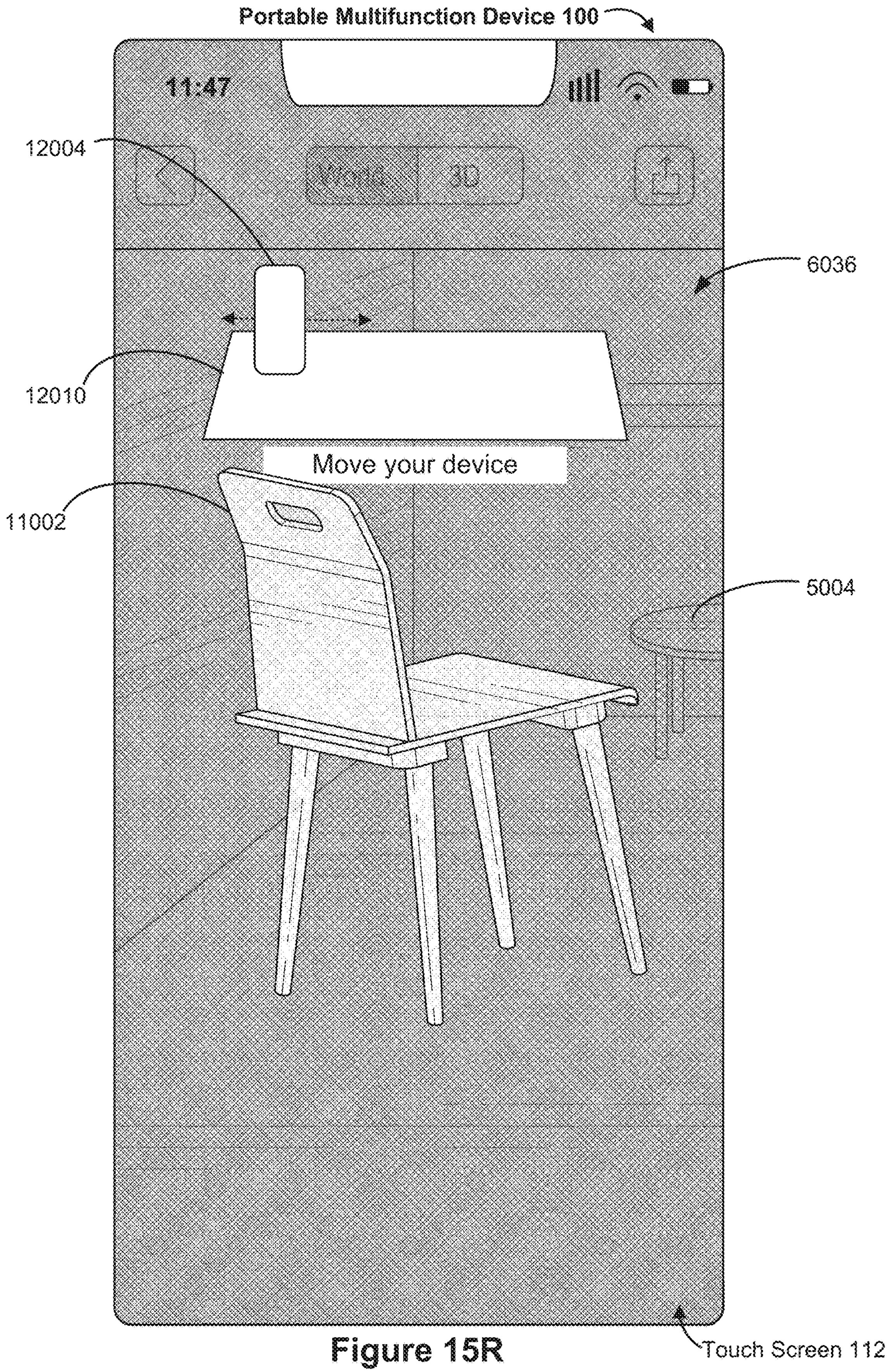
Figure 15S:
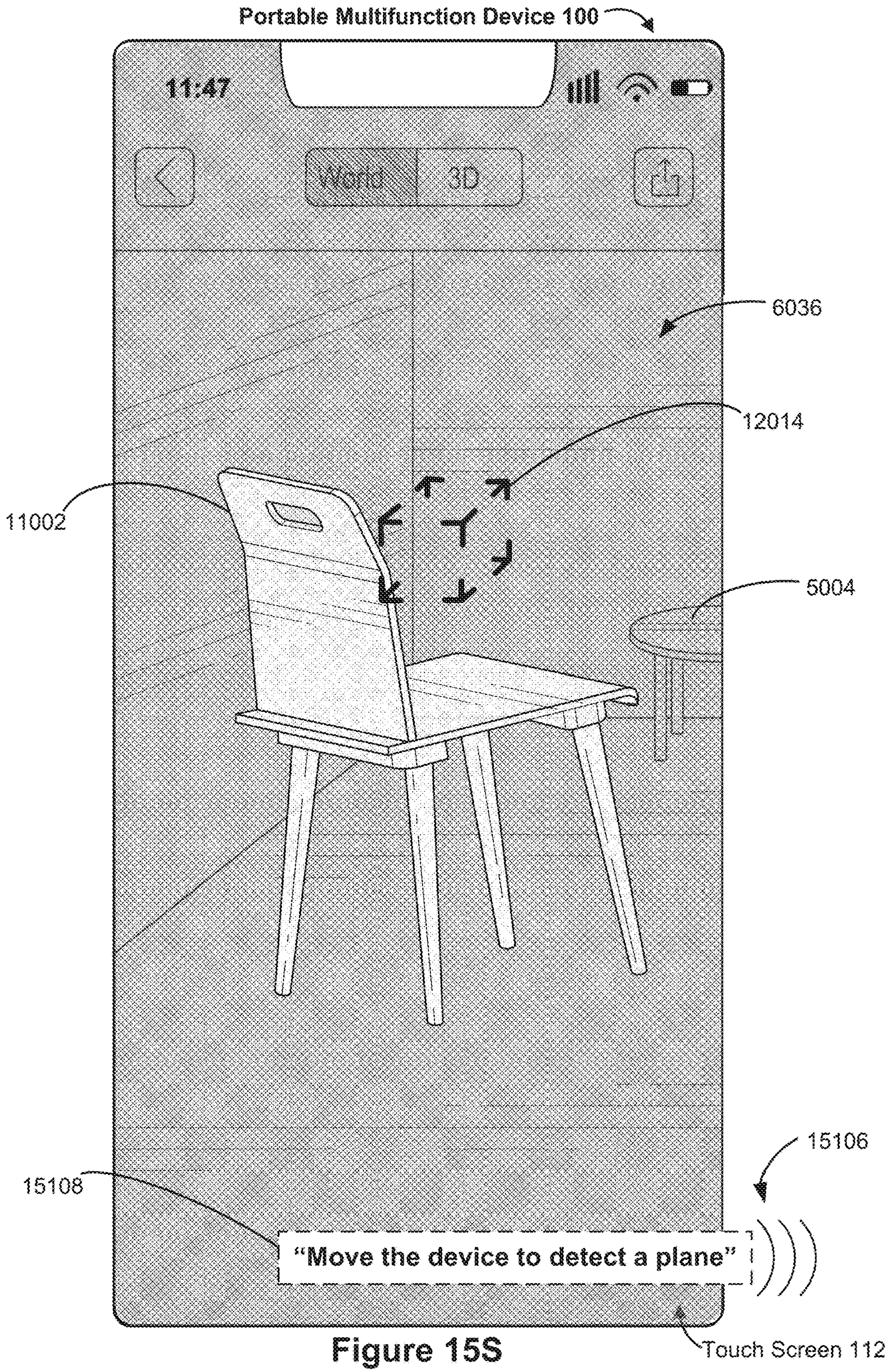

FIGS. 15Q-15T illustrate a calibration sequence that occurs when field of view 6036 of the camera(s) is displayed (e.g., because a plane that corresponds to virtual object 11002 has not yet been detected in field of view 6036 of the camera(s)). During the calibration sequence, a translucent representation of virtual object 11002 is displayed, field of view 6036 of the camera(s) is blurred, and a prompt that includes an animated image (including representation 12004 of device 100 and representation 12010 of a plane) is displayed to prompt the user to move the device. In FIG. 15Q, audio alert 15102 includes an announcement, "move the device to detect a plane," as indicated at 50104. From FIG. 15Q to FIG. 15R, device 100 is moved relative to physical environment 5002 (as indicated by, e.g., the changed position of table 5004 in field of view 6036 of the camera(s)). As a result of detection of the movement of device 100, a calibration user interface object 12014 is displayed, as indicated in FIG. 15S.

Figure 15T:
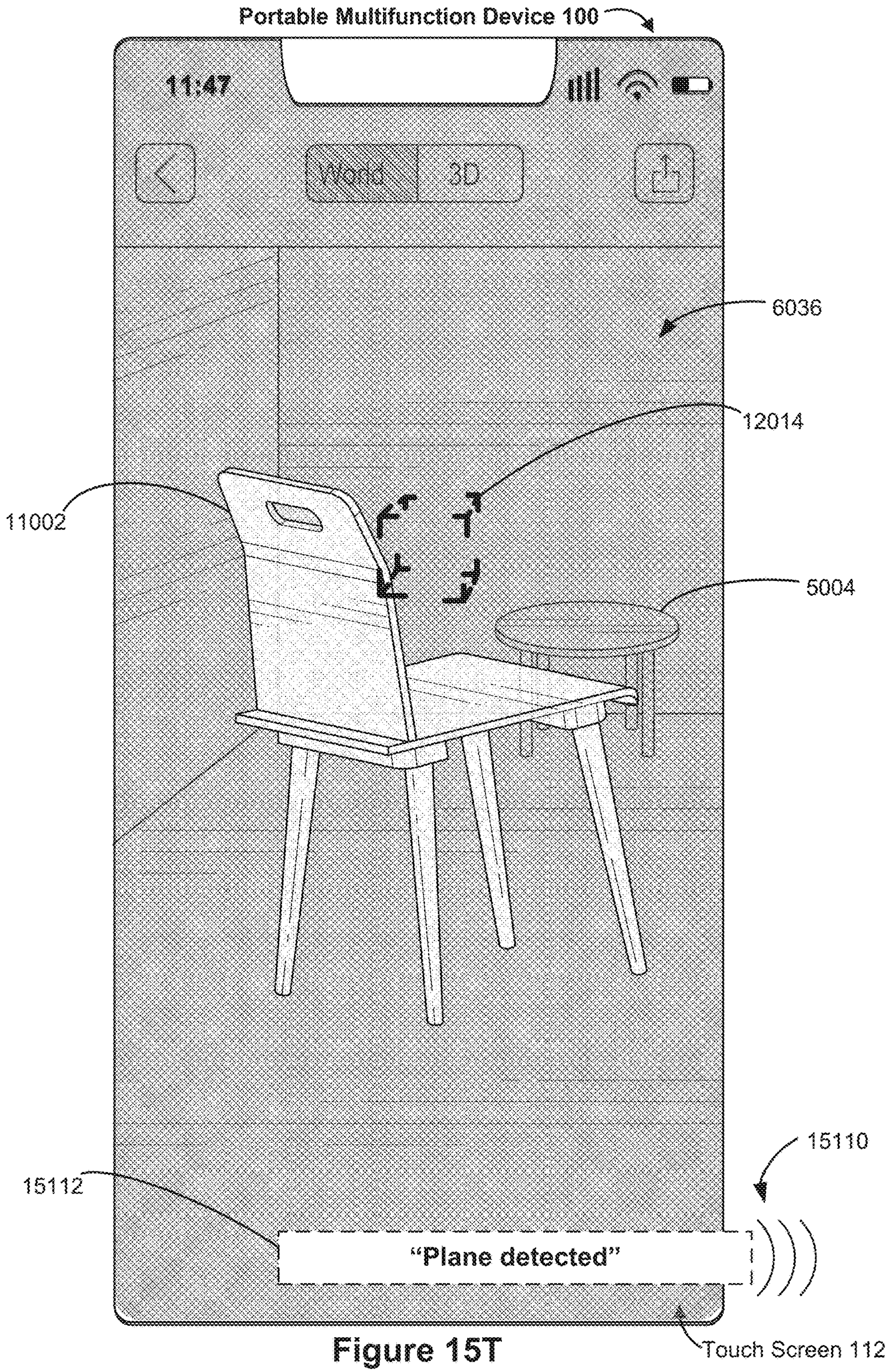
Figure 15U:
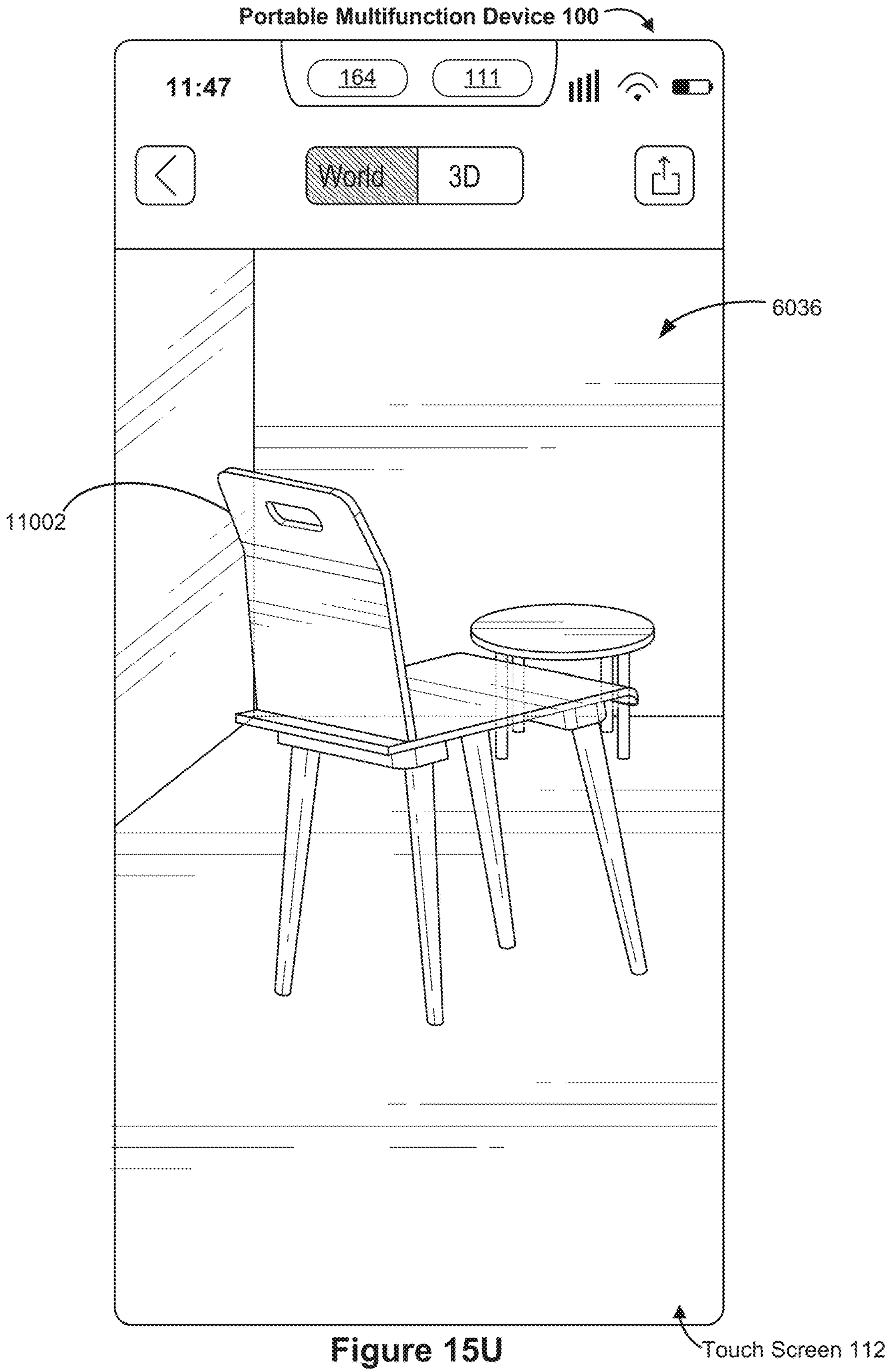
Figure 15V:
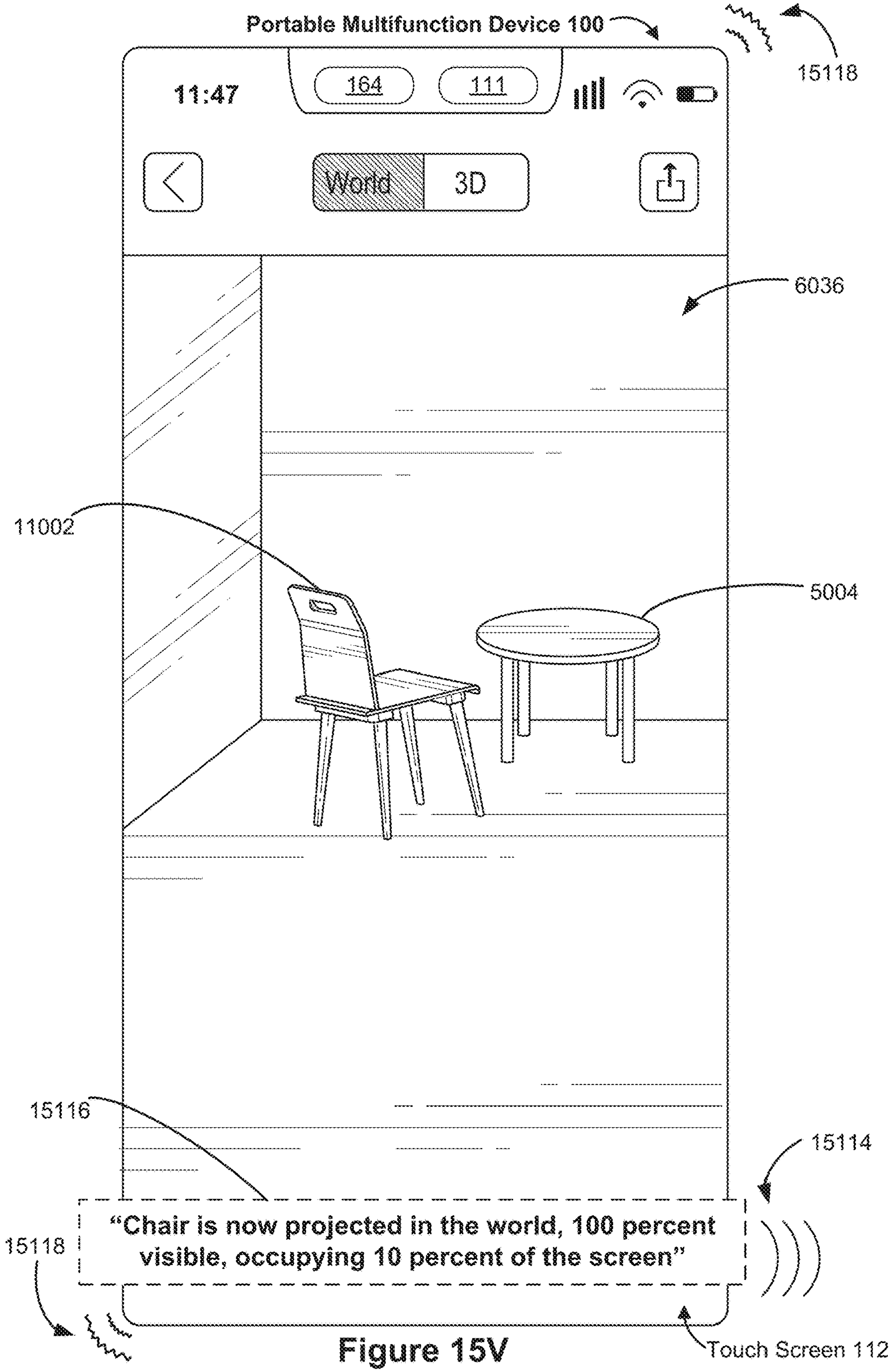

In FIG. 15S, audio alert 15106 includes an announcement, "move the device to detect a plane," as indicated at 50108. In FIGS. 15S-15T, calibration user interface object 12014 rotates as device 100 is moved relative to physical environment 5002 (as indicated by, e.g., the changed position of table 5004 in field of view 6036 of the camera(s)). In FIG. 15T, sufficient motion has occurred for a plane that corresponds to virtual object 11002 to be detected in field of view 6036 of the camera(s) and audio alert 15110 includes an announcement, "plane detected," as indicated at 50112. In FIGS. 15U-15V, the translucency of virtual object 11002 is reduced and virtual object 11002 is placed on the detected plane.

In FIG. 15V, audio alert 15114 includes an announcement, "chair is now projected in the world, 100 percent visible, occupying 10 percent of the screen," as indicated at 50116. Tactile output generators output a tactile output (as illustrated at 15118) to indicate that virtual object 11002 has been placed on a plane. Virtual object 11002 is displayed at a fixed position relative to physical environment 5002.

Figure 15W:
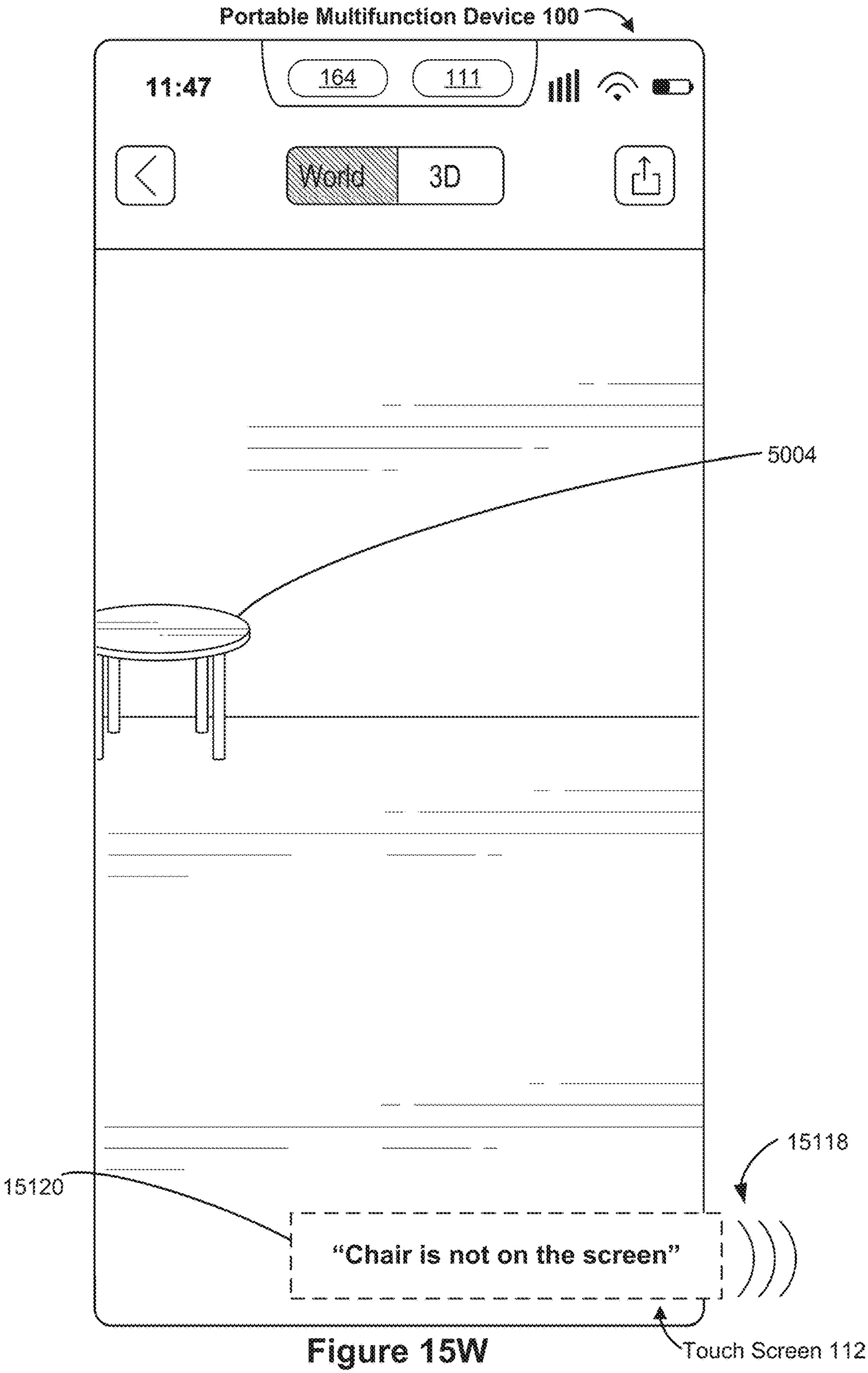

In FIGS. 15V-15W, device 100 is moved relative to physical environment 5002 (as indicated by, e.g., the changed position of table 5004 in field of view 6036 of the camera(s)) such that that virtual object 11002 is no longer visible in field of view 6036 of the camera(s). As a result of the movement of virtual object 11002 out of field of view 6036 of the camera(s), audio alert 15122 includes an announcement, "chair is not on the screen," as indicated at 50124.

Figure 15X:
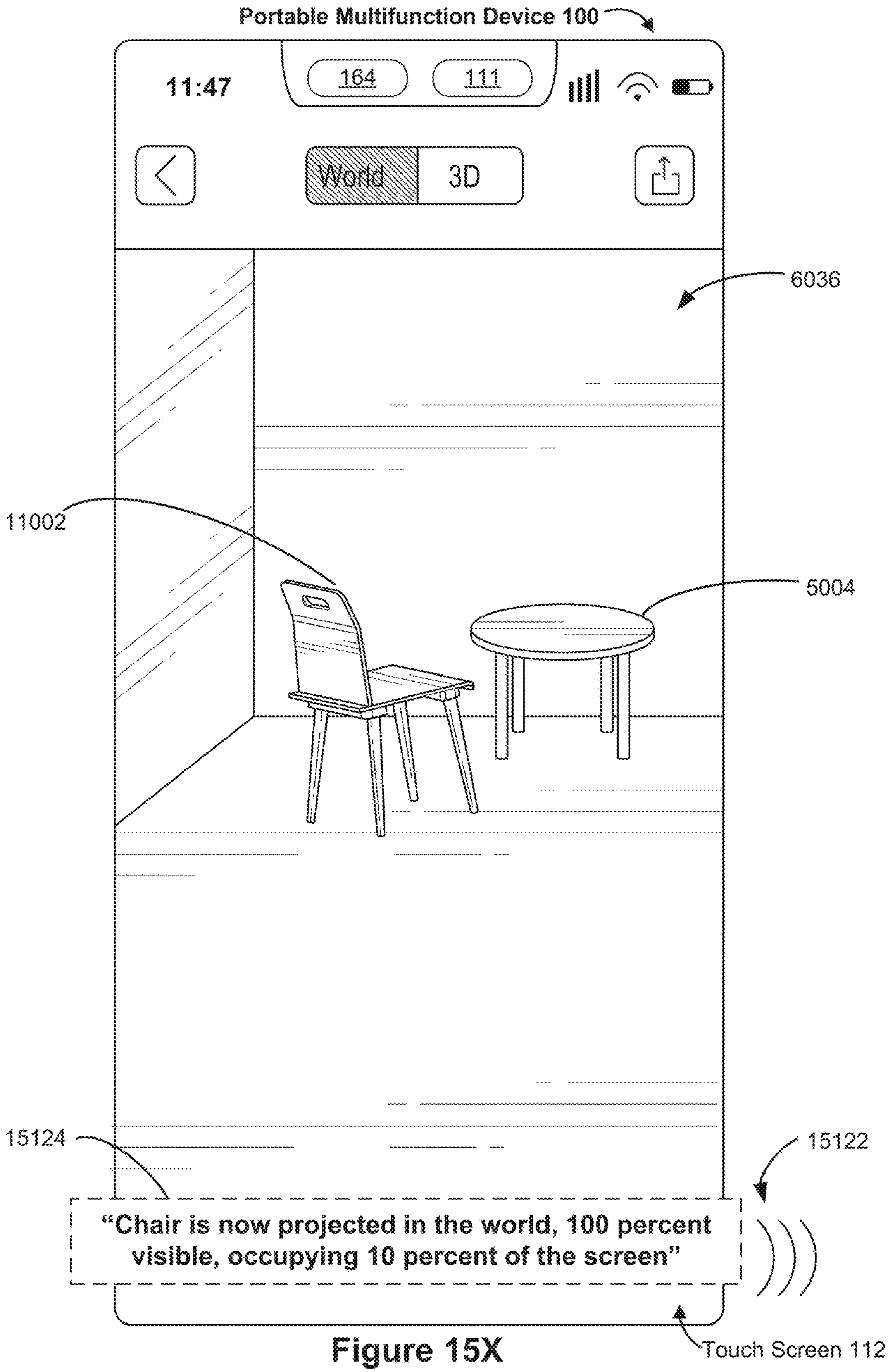

In FIGS. 15W-15X, device 100 has moved relative to physical environment 5002 such that virtual object 11002 is again visible in field of view 6036 of the camera(s) in FIG. 15X. As a result of the movement of virtual object 11002 into field of view 6036 of the camera(s), audio alert 15118 is generated, including an announcement, "chair is now projected in the world, 100 percent visible, occupying 10 percent of the screen," as indicated at 50120.

Figure 15Y:
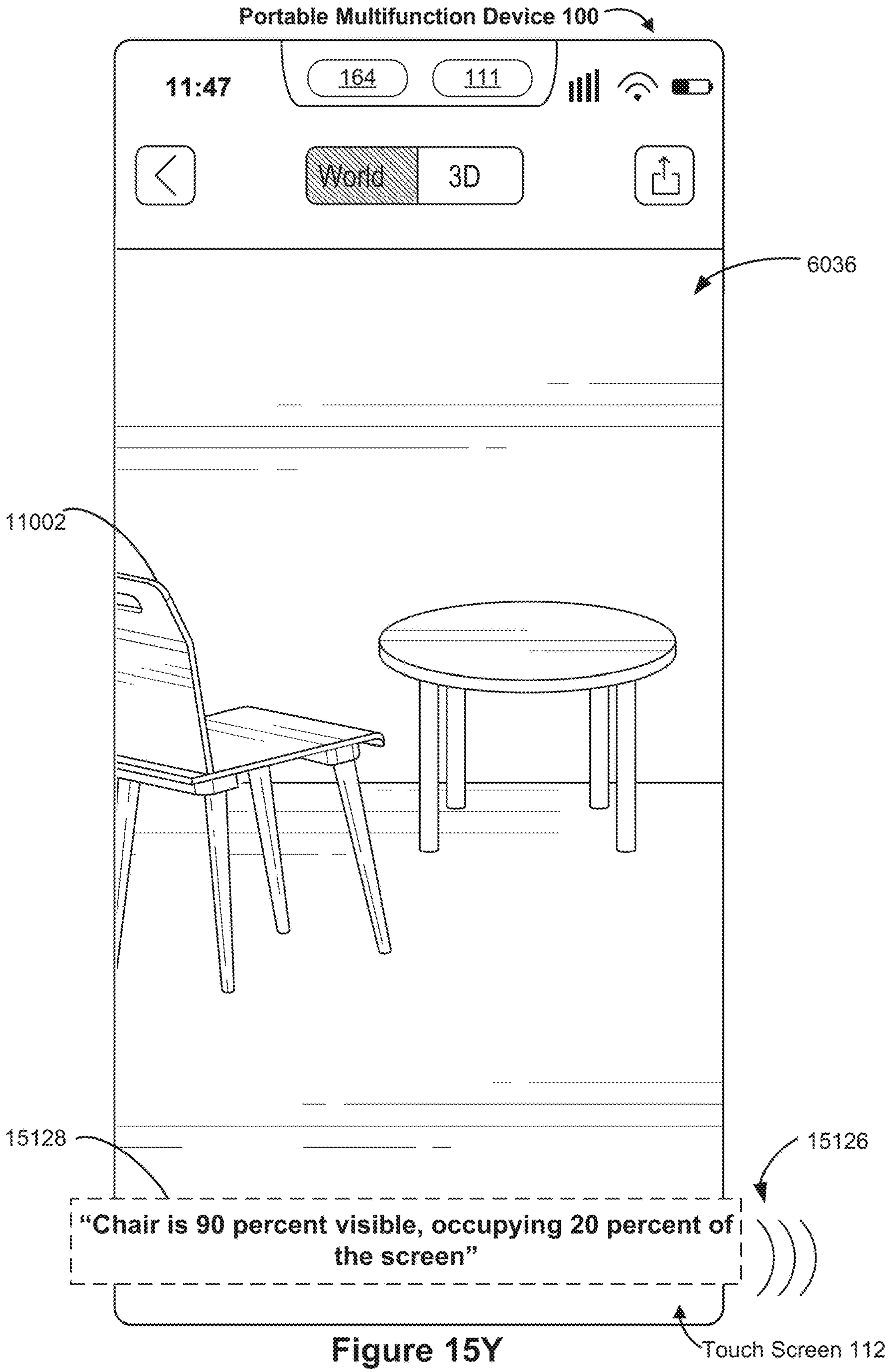

In FIGS. 15X-15Y, device 100 has moved relative to physical environment 5002 (e.g., such that device 100 is "closer" to virtual object 11002 as projected in field of view 6036 of the camera(s) and such that virtual object 11002 is partially visible in field of view 6036 of the camera(s) in FIG. 15Y). As a result of the movement of virtual object 11002 partially out of the field of view 6036 of the camera(s), audio alert 15126 includes an announcement, "chair is 90 percent visible, occupying 20 percent of the screen," as indicated at 50128.

Figure 15Z:
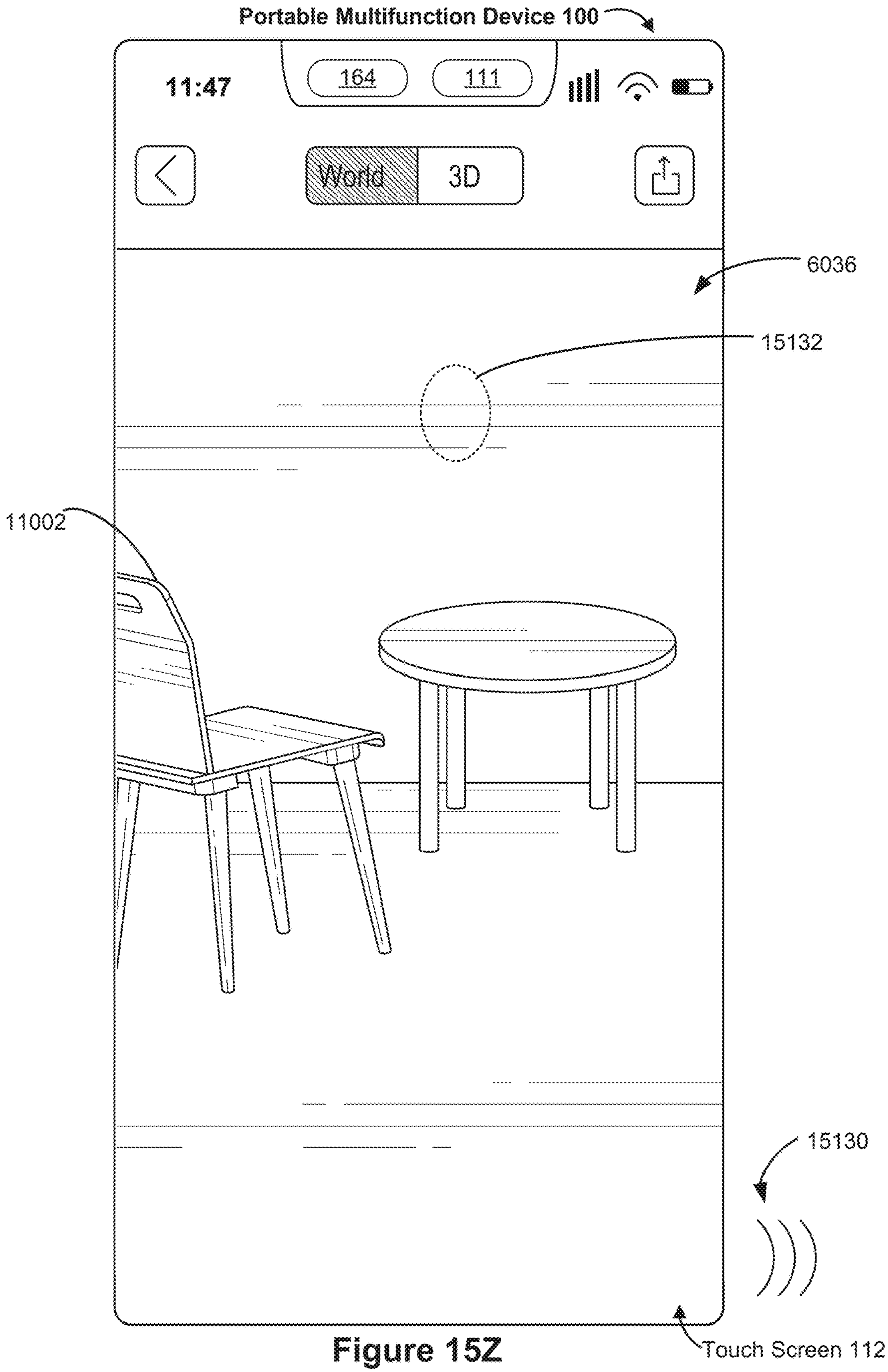
Figure 15A:
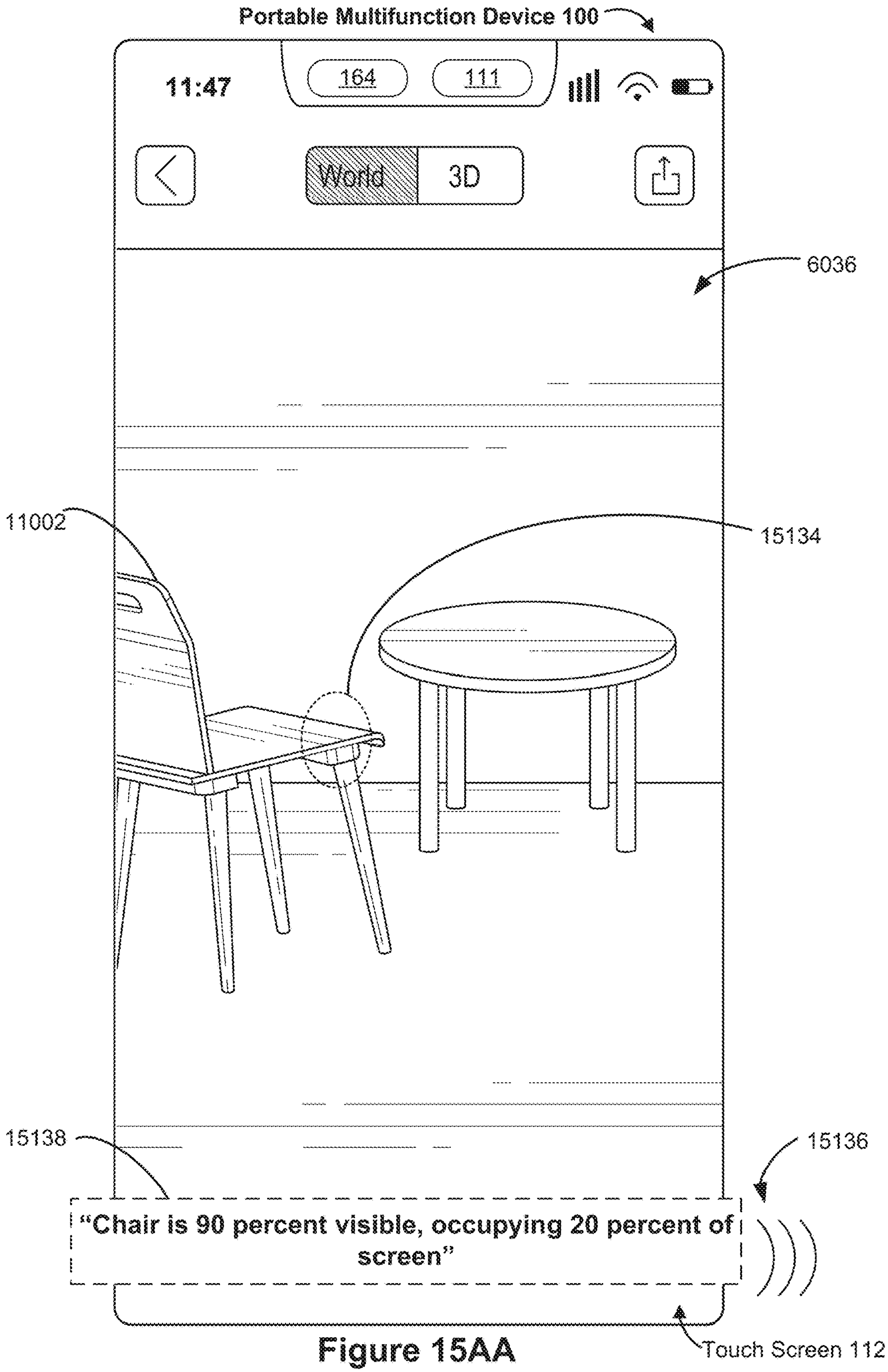
Figure 15A:
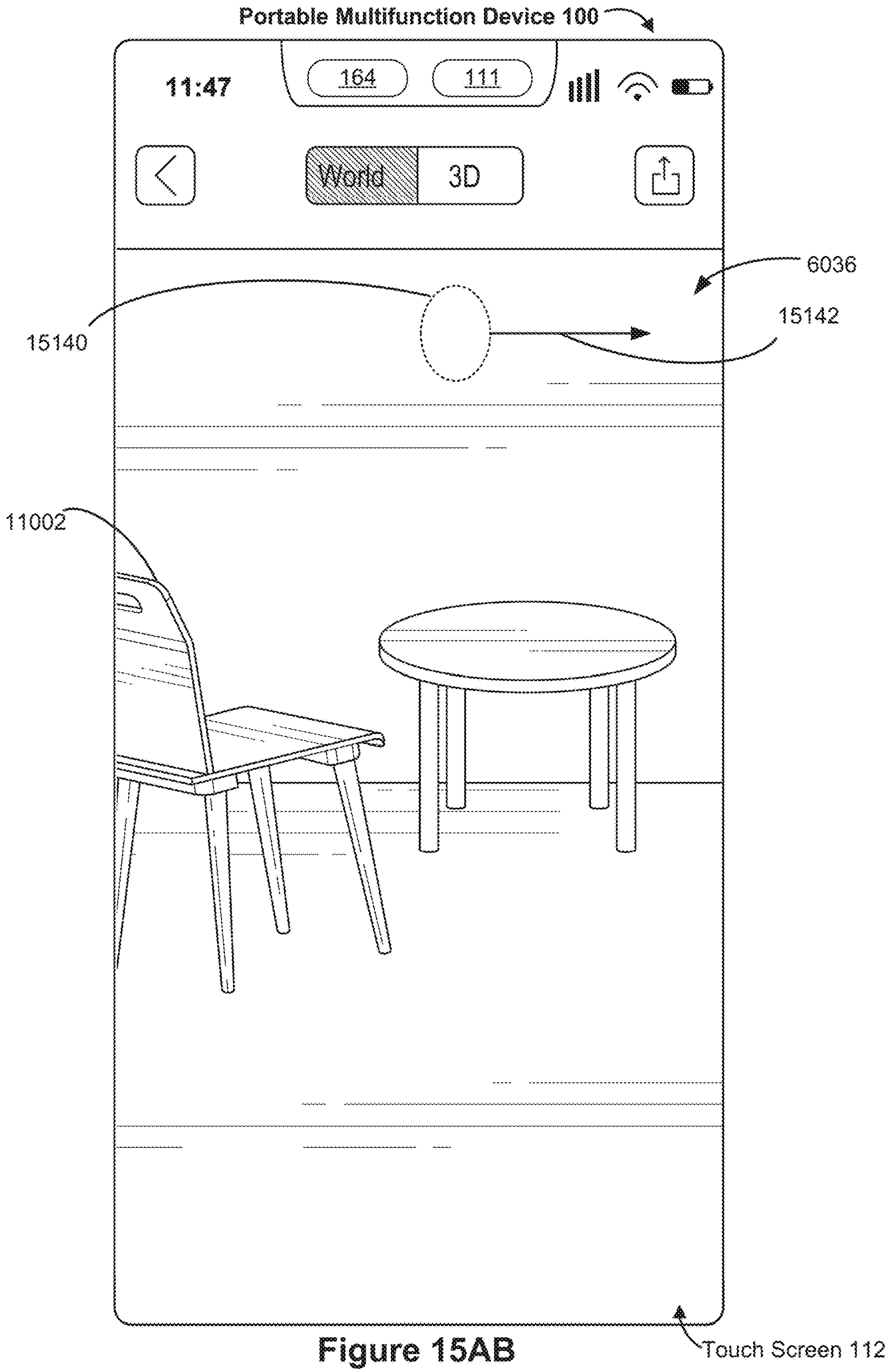
Figure 15A:
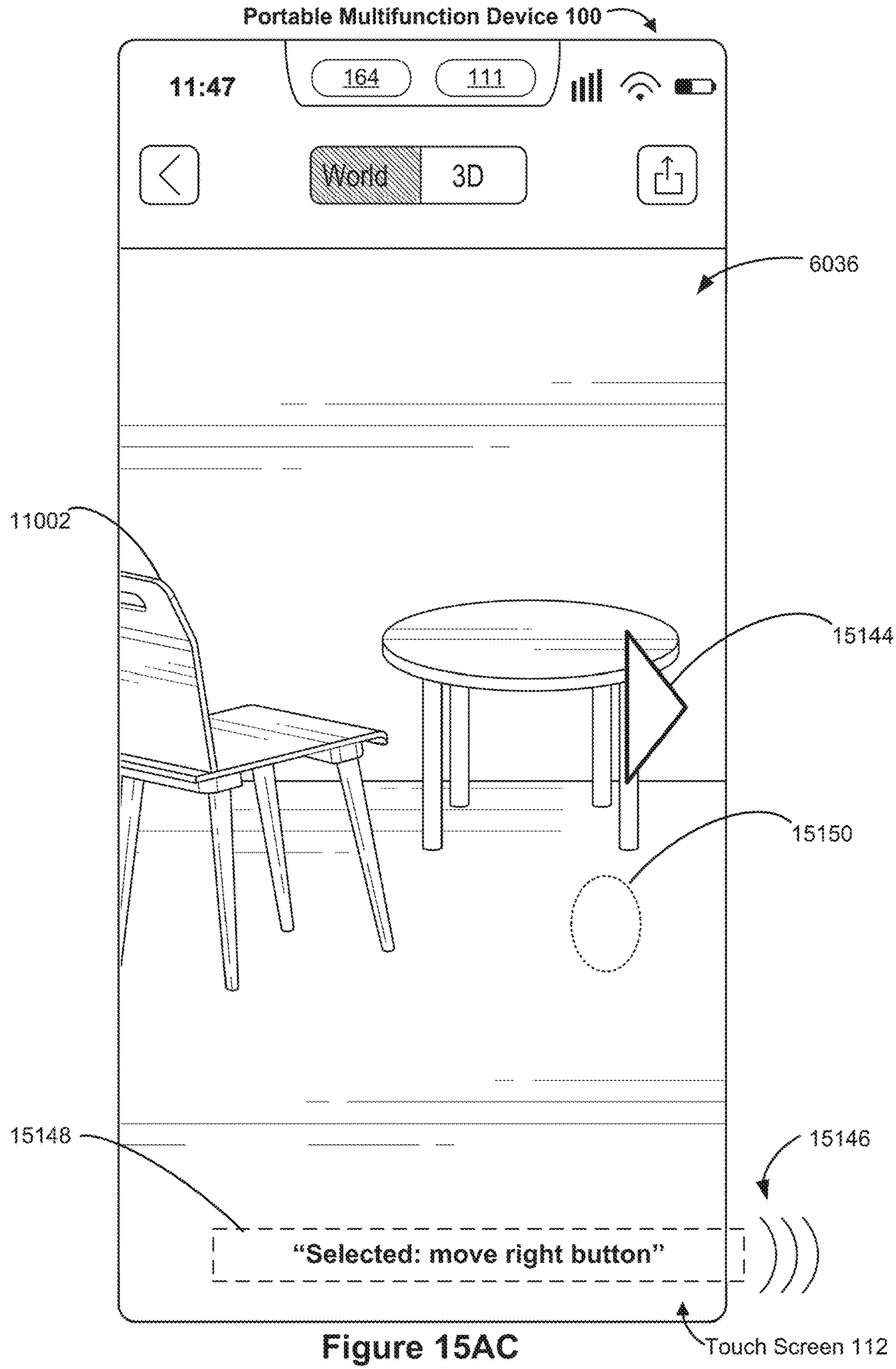
Figure 15A:
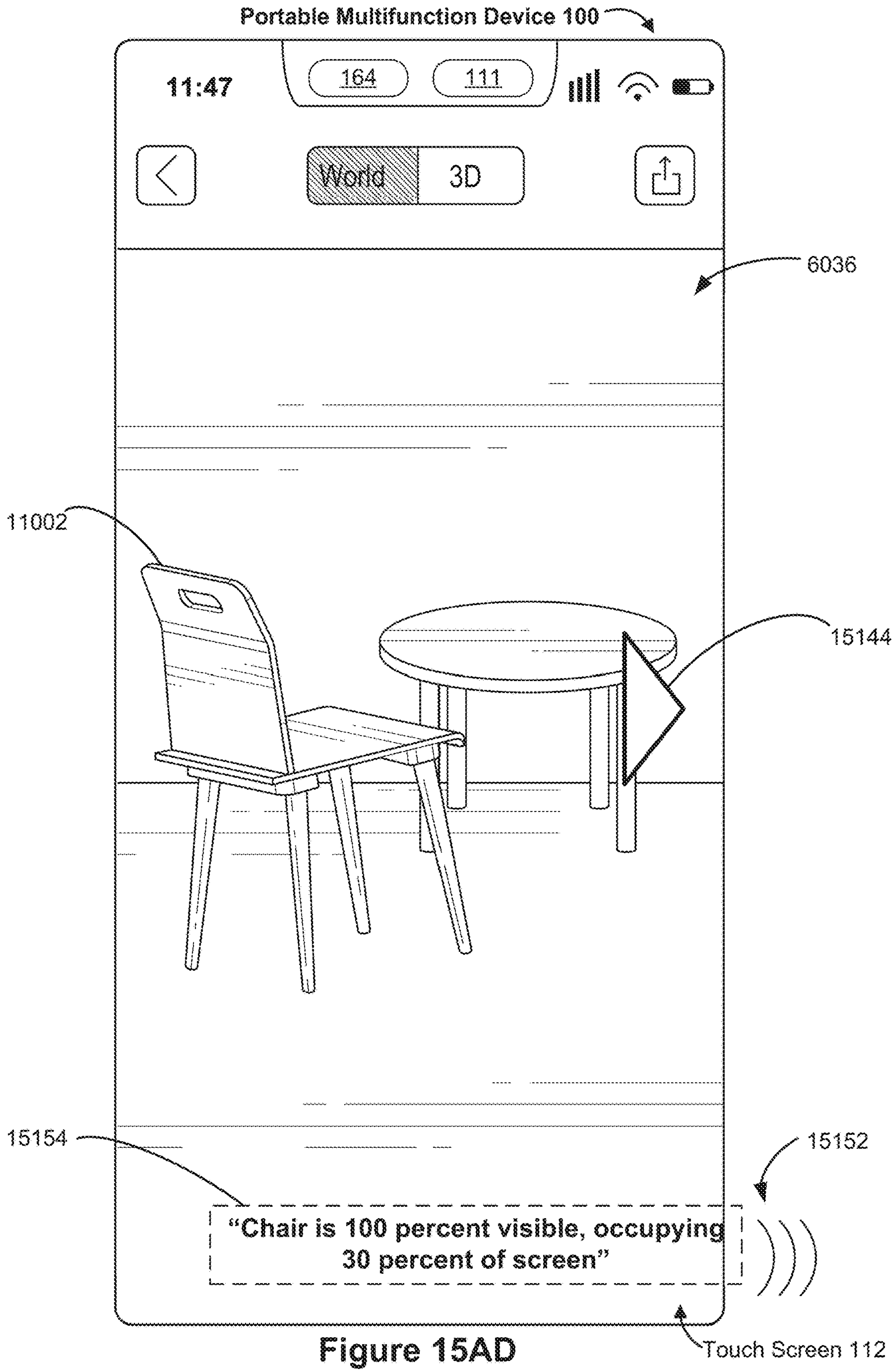
Figure 15A:
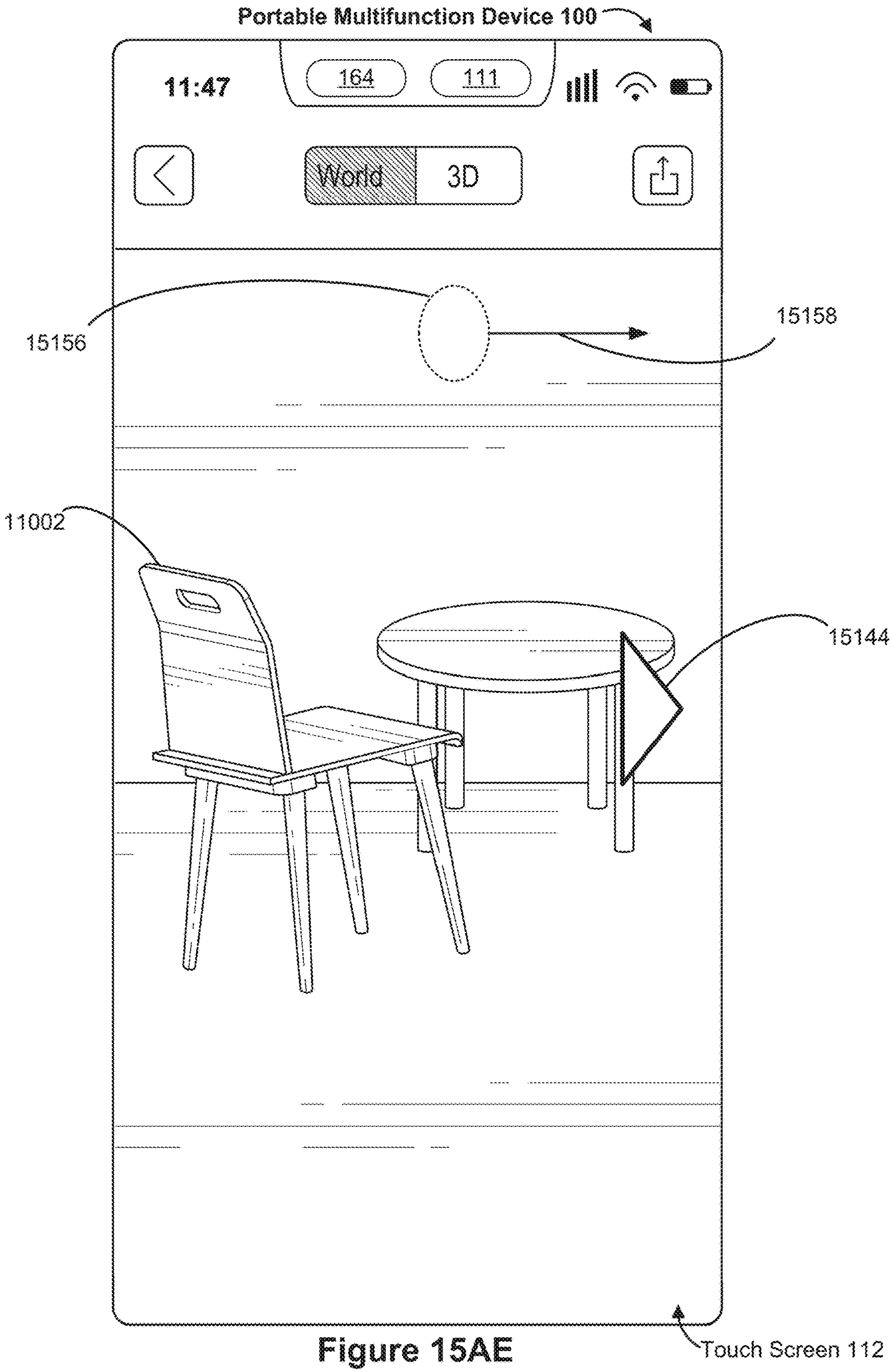
Figure 15A:
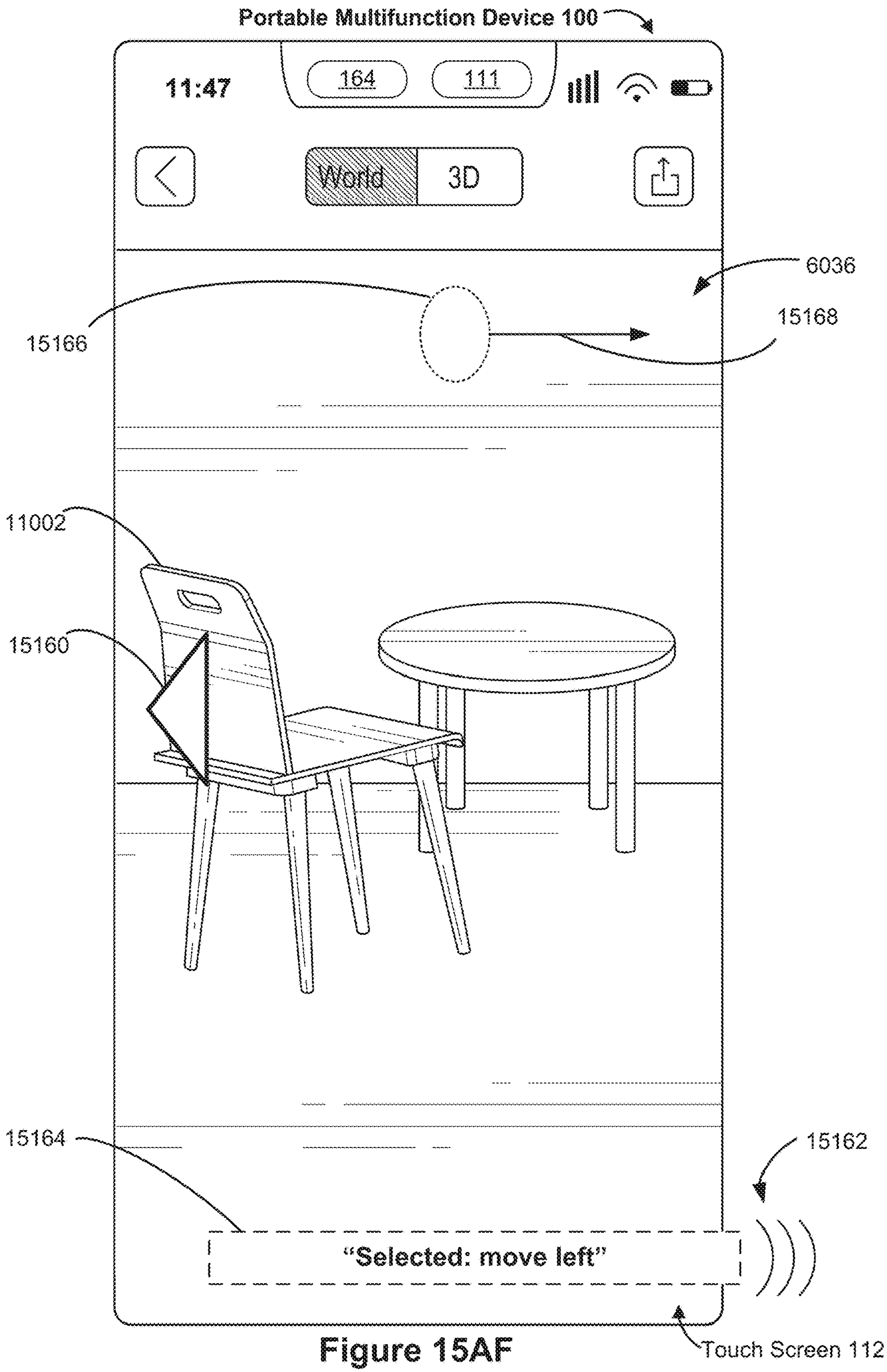
Figure 15A:
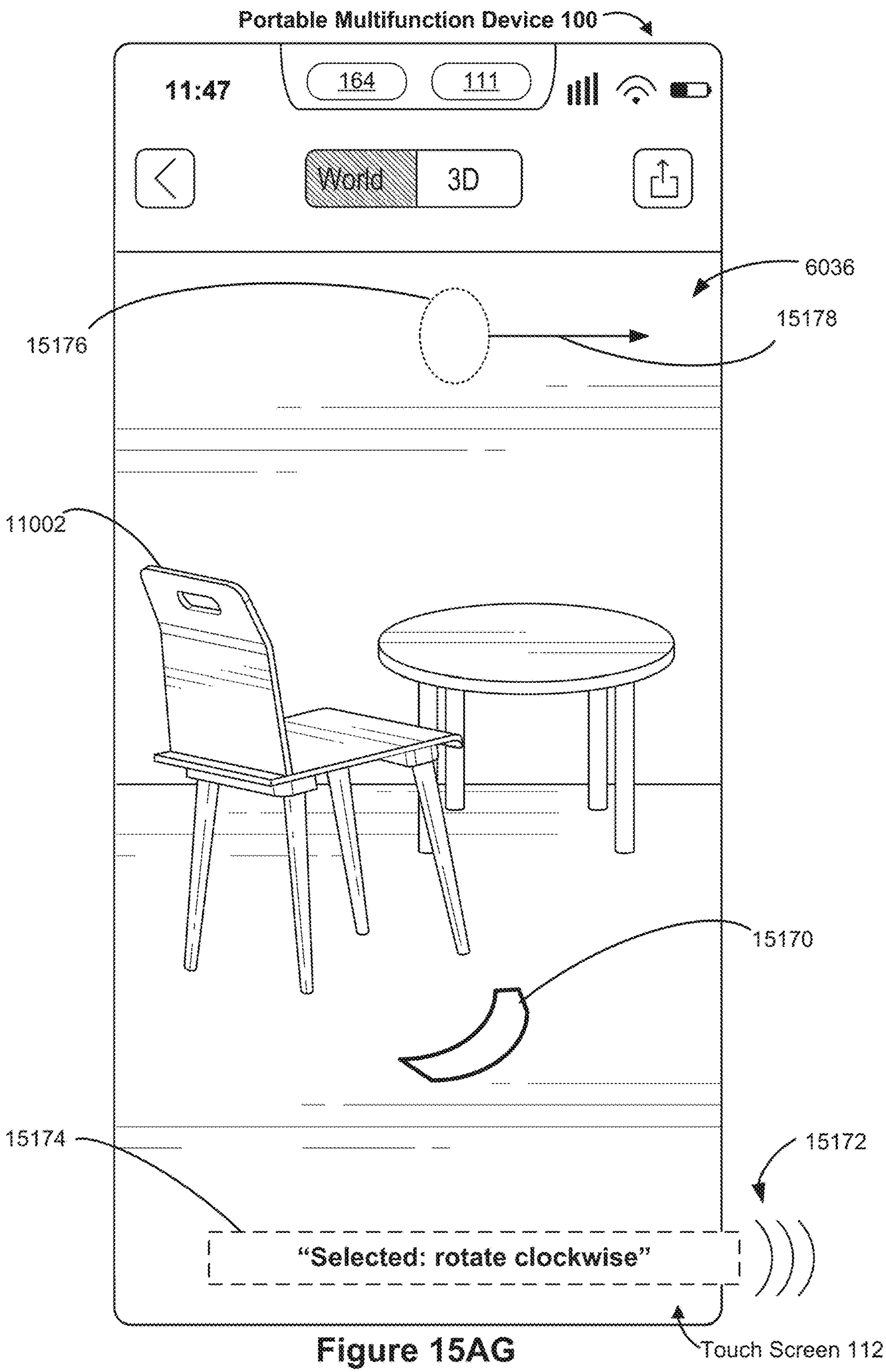
Figure 15A:
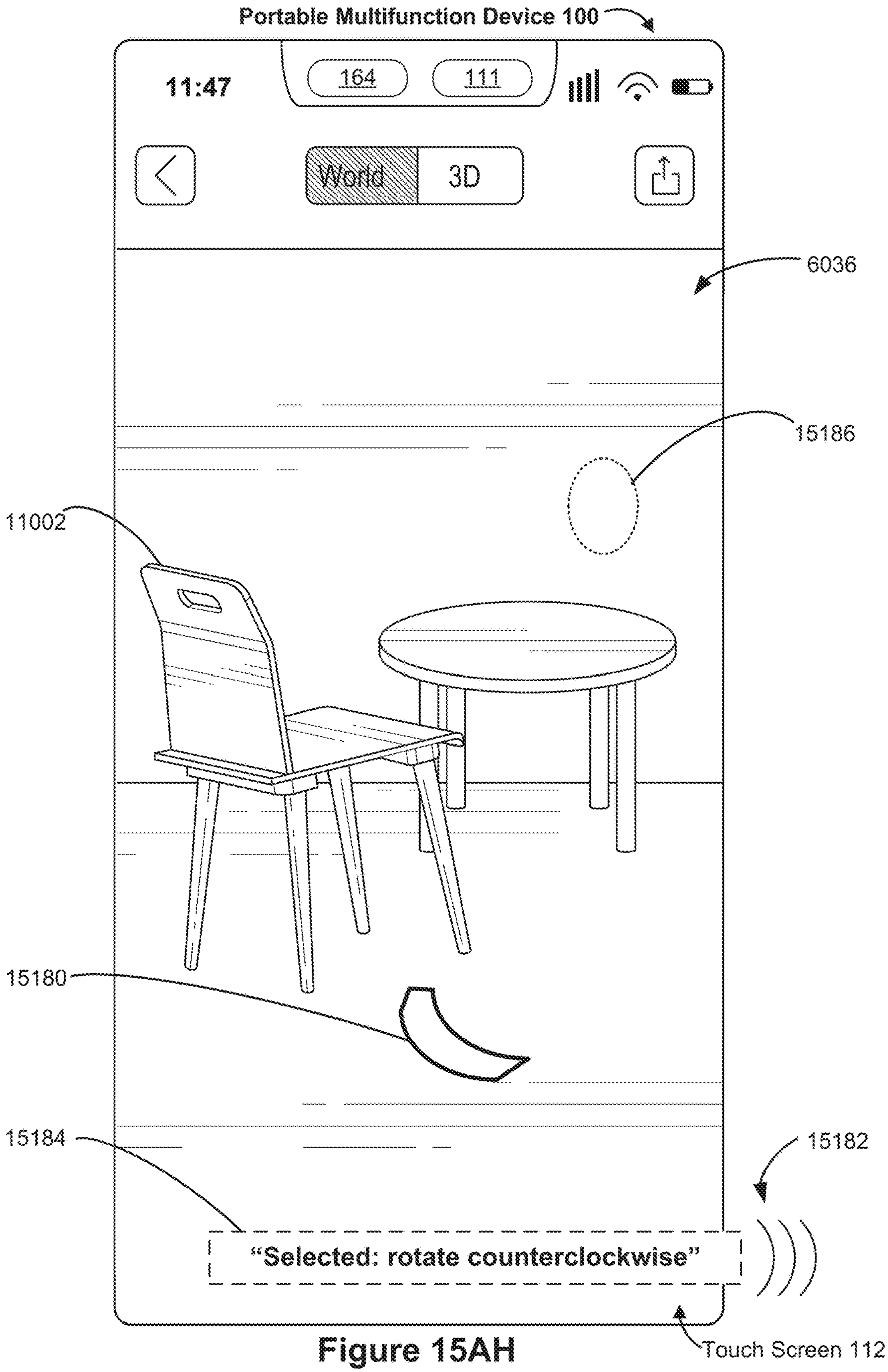
Figure 15A:
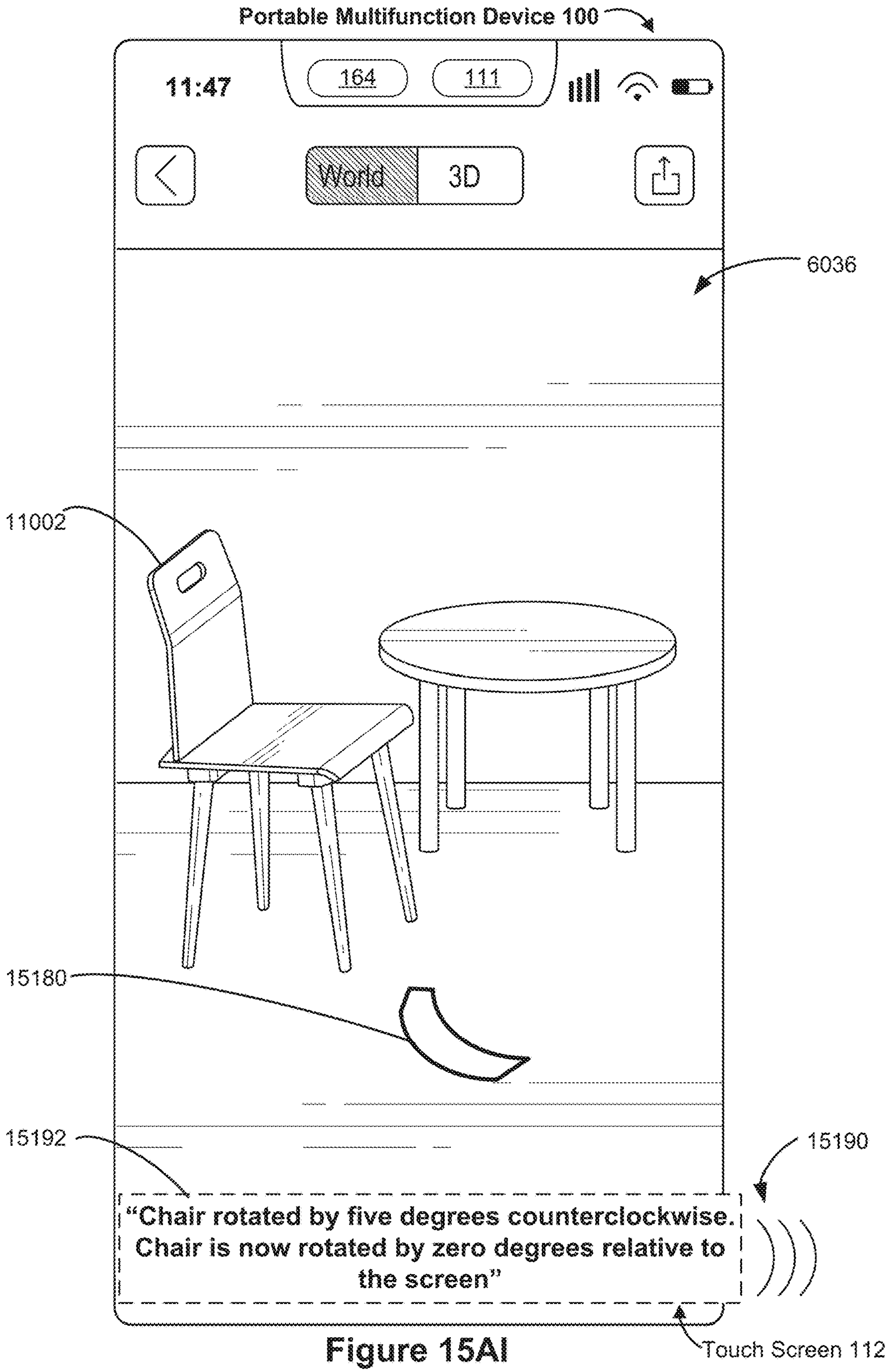
Figure 16A:
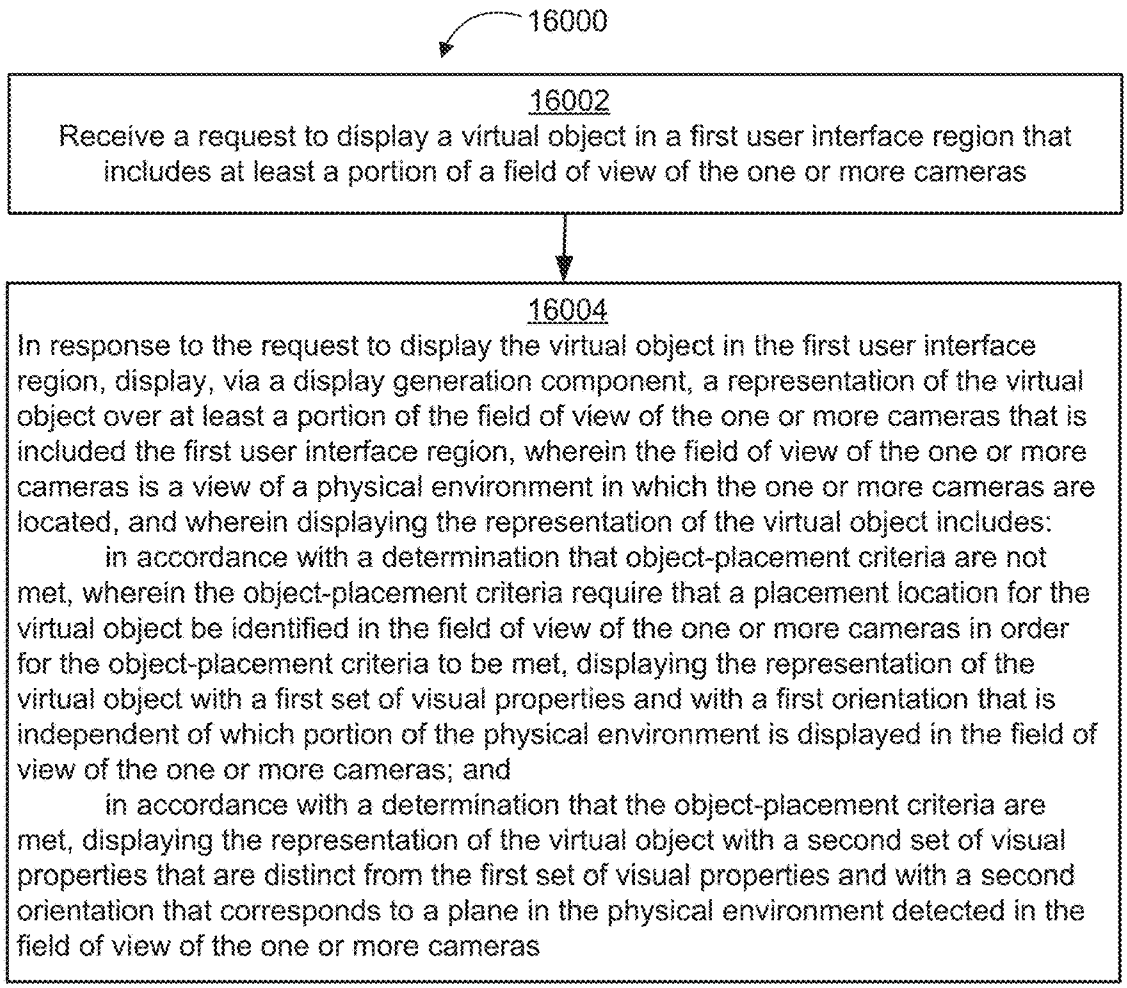
Figure 18E:
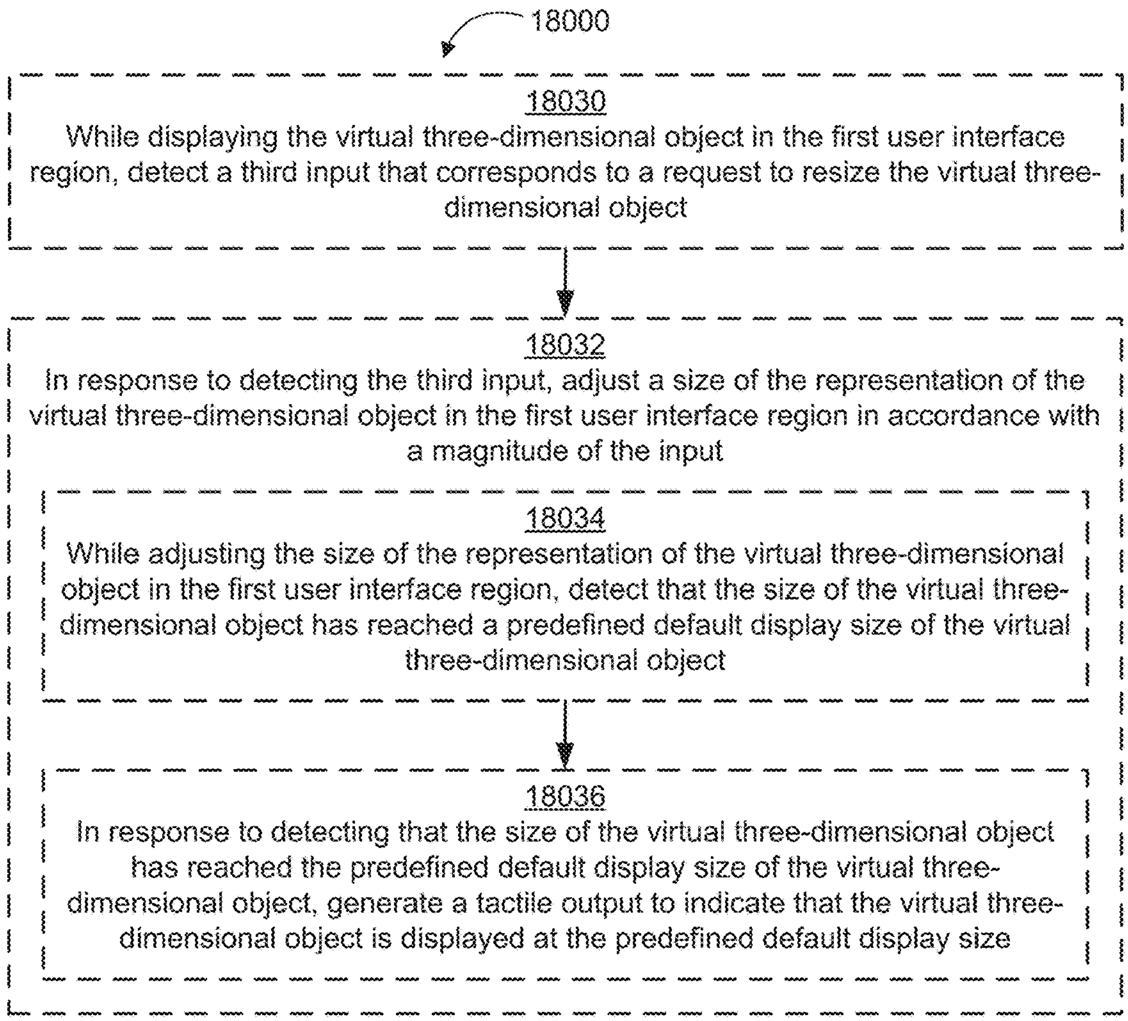
Figure 18G:
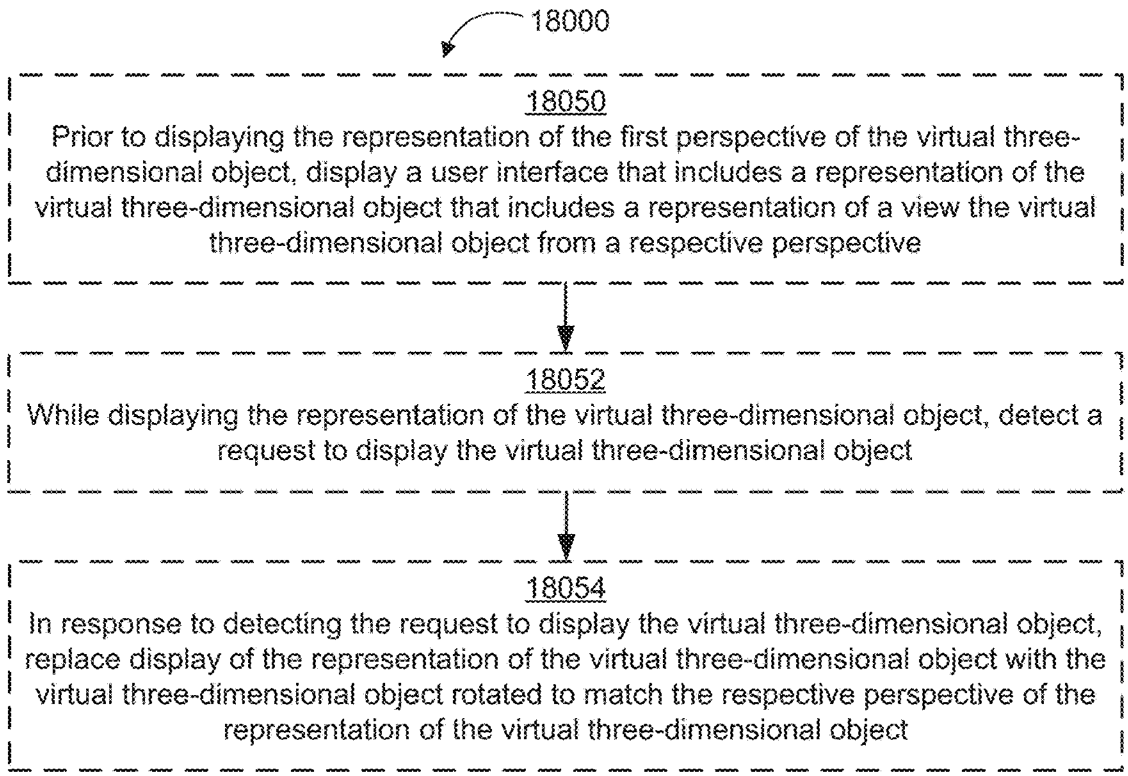

In some embodiments, an input provided at a location that corresponds to virtual object 11002 causes an audio message that includes verbal information about virtual object 11002 to be provided. In contrast, when an input is provided at a location that is away from virtual object 11002 and controls, an audio message that includes verbal information about virtual object 11002 is not provided. In FIG. 15Z, an audio output 15130 (e.g., a "click" or "buzz") occurs to indicate that contact 15132 is detected at a location that does not correspond to a location of a control or a virtual object 11002 in the user interface. In FIG. 15AA, an input by contact 15134 is detected at a location that corresponds to a location of virtual object 11002. In response to the input, an audio alert 15136 that corresponds to virtual object 11002 (e.g., indicating the status of virtual object 11002) is generated, including an announcement, "chair is 90 percent visible, occupying 20 percent of the screen," as indicated at 50138

FIGS. 15AB-15AI illustrate input for selection and performance of operations in a switch control mode while a user interface that includes field of view 6036 of the camera(s) is displayed.

In FIG. 15AB, an input (e.g., a rightward swipe along a path indicated by arrow 15142) by contact 15140 is detected. In response to the input, an operation is selected, as indicated at FIG. 15AC.

In FIG. 15AC, a rightward lateral movement control 15144 is displayed (e.g., to indicate that a currently selected operation is an operation for moving virtual object 11002 to the right). Audio alert 15146 includes an announcement, "selected: move right button," as indicated at 15148. An input (e.g., a double tap input) by contact 15150 is detected. In response to the input, the selected operation is performed (e.g., the virtual object 11002 is moved to the right in the field of view 6036 of the camera(s), as indicated in FIG. 15AD).

In FIG. 15AD, the movement of virtual object 11002 is reported by audio alert 15152 that includes an announcement, "chair is 100 percent visible, occupying 30 percent of the screen," as indicated at 15154.

In FIG. 15AE, an input (e.g., a rightward swipe along a path indicated by arrow 15158) by contact 15156 is detected. In response to the input, the selected operation is advanced to a next operation.

In FIG. 15AF, a leftward lateral movement control 15160 is displayed (e.g., to indicate that a currently selected operation is an operation for moving virtual object 11002 to the left). An audio alert 15162 includes an announcement, "selected: move left," as indicated at 15164. An input (e.g., a rightward swipe along a path indicated by arrow 15168) by contact 15166 is detected. In response to the input, the selected operation is advanced to a next operation.

In FIG. 15AG, a clockwise rotation control 15170 is displayed (e.g., to indicate that a currently selected operation is an operation for rotating virtual object 11002 clockwise). An audio alert 15172 includes an announcement, "selected: rotate clockwise," as indicated at 15174. An input (e.g., a rightward swipe along a path indicated by arrow 15178) by contact 15176 is detected. In response to the input, the selected operation is advanced to a next operation.

In FIG. 15AH, a counterclockwise rotation control 15180 is displayed (e.g., to indicate that a currently selected operation is an operation for rotating virtual object 11002 clockwise). An audio alert 15182 includes an announcement, "selected: rotate counterclockwise," as indicated at 15184. An input (e.g., a double tap input) by contact 15186 is detected. In response to the input, the selected operation is performed (e.g., the virtual object 11002 is rotated counterclockwise as indicated in FIG. 15AI).

In FIG. 15AI, an audio alert 15190 includes an announcement, "Chair rotated by five degrees counterclockwise. Chair is now rotated by zero degrees relative to the screen," as indicated at 15164.

In some embodiments, a reflection is generated on at least one surface (e.g., an underside surface) of an object (e.g., virtual object 11002). The reflection is generated using image data captured by one or more cameras of device 100. For example, the reflection is based on at least a portion of the captured image data (e.g., an image, a set of images, and/or video) that corresponds to a horizontal plane (e.g., floor plane 5038) detected in the field of view 6036 of the one or more cameras. In some embodiments, generating the reflection includes generating a spherical model that includes the captured image data (e.g., by mapping captured image data onto a model of a virtual sphere).

In some embodiments, a reflection generated on a surface of an object includes a reflection gradient (e.g., such that a portion of a surface that is closer to a plane has a higher magnitude of reflectivity than a portion of a surface that is further from the plane). In some embodiments, a magnitude of reflectivity of a reflection generated on a surface of an object is based on a reflectivity value of a texture that corresponds to the surface. For example, no reflection is generated at a non-reflective portion of the surface.

In some embodiments, the reflection is adjusted over time. For example, the reflection is adjusted as input is received for moving and/or scaling the object (e.g., as the object moves, a reflection of the object is adjusted to reflect a portion of the plane that is at a location that corresponds to the object). In some embodiments, the reflection is not adjusted when the object is rotated (e.g., around the z-axis).

In some embodiments, prior to displaying the object at a determined location (e.g., on a plane detected in the field of view 6036 of the camera(s) that corresponds to the object), no reflection is generated on the surface of the object. For example, no reflection is generated on a surface of an object when a translucent representation of the object is displayed (e.g., as described with regard to FIGS. 11G-11H) and/or when calibration is being performed (e.g., as described with regard to FIGS. 12B-12I).

In some embodiments, a reflection of an object is generated on one or more planes detected in the field of view 6036 of the camera(s). In some embodiments, no reflection of the object is generated in the field of view 6036 of the camera(s).

FIGS. 16A-16G are flow diagrams illustrating method 16000 of displaying a virtual object in a user interface that includes a field of view of one or more cameras using different visual properties depending on whether object-placement criteria are met. Method 16000 is performed at an electronic device (e.g., device 300, FIG. 3, or portable multifunction device 100, FIG. 1A) having a display generation component (e.g., a display, a projector, a heads up display or the like), one or more input devices (e.g., a touch-sensitive surface, or a touch-screen display that serves both as the display generation component and the touch-sensitive surface), and one or more cameras (e.g., one or more rear-facing cameras on a side of the device opposite from the display and the touch-sensitive surface). In some embodiments, the display is a touch-screen display and the touch-sensitive surface is on or integrated with the display. In some embodiments, the display is separate from the touch-sensitive surface. Some operations in method 16000 are, optionally, combined and/or the order of some operations is, optionally, changed.

The device receives (16002) (e.g., while a staging user interface that includes a movable representation of a virtual object is displayed, and before the field of view of the cameras is displayed) a request to display a virtual object (e.g., a representation of a three-dimensional model) in a first user interface region (e.g., an augmented reality viewer interface) that includes at least a portion of a field of view of the one or more cameras (e.g., the request is an input by a contact that is detected on a representation of the virtual object on a touch-screen display, or the contact is detected on an affordance (e.g., a tap on the "AR view" or "world view" button) that is concurrently displayed with a representation of the virtual object and that is configured to trigger display of an AR view when invoked by the first contact). For example, the request is an input to display virtual object 11002 in field of view 6036 of the one or more cameras, as described with regard to FIG. 11F.

In response to the request to display the virtual object in the first user interface region (e.g., the request to display the virtual object in a view of the physical environment surrounding the device), the device displays (16004), via the display generation component, a representation of the virtual object over at least a portion of the field of view of the one or more cameras that is included the first user interface region (e.g., the field of view of the one or more cameras are displayed in response to the request to display the virtual object in the first user interface region), wherein the field of view of the one or more cameras is a view of a physical environment in which the one or more cameras are located. For example, as described with regard to FIG. 11G, virtual object 11002 is displayed in field of view 6036 of the one or more cameras that is a view of physical environment 5002 in which the one or more cameras are located. Displaying the representation of the virtual object includes, in accordance with a determination that object-placement criteria are not met, wherein the object-placement criteria require that a placement location (e.g., a plane) for the virtual object be identified in the field of view of the one or more cameras in order for the object-placement criteria to be met (e.g., the object-placement criteria are not met when the device has not identified a location or plane for placing the virtual object relative to the field of view of the one or more cameras in the first user interface region (e.g., plane identification is still in progress, or there is not enough image data to identify the plane)), displaying the representation of the virtual object with a first set of visual properties (e.g., at a first translucency level, or a first brightness level, or a first saturation level, etc.) and with a first orientation that is independent of which portion of the physical environment is displayed in the field of view of the one or more cameras (e.g., the virtual object floats above the cameras' field of view with an orientation that is relative to a predefined plane independent of the physical environment (e.g., the orientation set in the staging view), and independent of the changes occurring in the camera's field of view (e.g., changes due to movement of the device relative to the physical environment)). For example, in FIGS. 11G-11H, because a placement location for virtual object 11002 has not been identified in field of view 6036 of the cameras, a translucent version of virtual object 11002 is displayed. As the device moves (as shown from FIG. 11G to FIG. 11H), the orientation of virtual object 11002 is unchanged. In some embodiments, the object-placement criteria include a requirement that the field of view is stable and provides a stationary view of the physical environment (e.g., the camera moves less than a threshold amount during at least a threshold amount of time, and/or at least a predetermined amount of time has elapsed since the request was received, and/or the camera has been calibrated for plane detection with sufficient prior movement of the device. In accordance with a determination that the object-placement criteria are met (e.g., the object-placement criteria are met when the device has not identified a location or plane for placing the virtual object relative to the field of view of the one or more cameras in the first user interface region), the device displays the representation of the virtual object with a second set of visual properties (e.g., at a second translucency level, or a second brightness level, or a second saturation level, etc.) that are distinct from the first set of visual properties and with a second orientation that corresponds to a plane in the physical environment detected in the field of view of the one or more cameras. For example, in FIG. 11I, because a placement location for virtual object 11002 has been identified (e.g., a plane the corresponds to the floor surface 5038 in physical environment 5002) in field of view 6036 of the cameras, a non-translucent version of virtual object 11002 is displayed. The orientation (e.g., the position on touch screen display 112) of virtual object 11002 has changed from the first orientation shown in FIG. 11H to the second orientation shown in FIG. 11I. As the device moves (as shown from FIG. 11I to FIG. 11J), the orientation of virtual object 11002 changes (because virtual object 11002 is now displayed at a fixed orientation relative to physical environment 5002). Displaying a virtual object with a first set of visual properties or a second set of visual properties, depending on whether object-placement criteria are met, provides visual feedback to the user (e.g., to indicate that a request to display the virtual object has been received, but that additional time and/or calibration information is needed for placing the virtual object in the field of view of the one or more cameras). Providing improved visual feedback to the user enhances the operability of the device and makes the user-device interface more efficient (e.g., by helping the user to provide proper inputs and avoid attempting to provide input for manipulating the virtual object prior to placement of the object at the second orientation that corresponds to the plane), which, additionally, reduces power usage and improves battery life of the device by enabling the user to use the device more quickly and efficiently.

In some embodiments, the device detects (16006) that the object-placement criteria are met while the representation of the virtual object is displayed with the first set of visual properties and the first orientation (e.g., a plane for placing the virtual object is identified while the virtual object is suspended in the translucent state over a view of the physical environment surrounding the device). Detecting that object-placement criteria are met while the virtual object is displayed with a first set of visual properties (e.g., in a translucent state), without requiring further user input for initiating detection of object placement criteria, reduces the number of inputs required for object placement. Reducing the number of inputs needed to perform an operation enhances the operability of the device and makes the user-device interface more efficient, which, additionally, reduces power usage and improves battery life of the device by enabling the user to use the device more quickly and efficiently.

In some embodiments, in response to detecting that the object-placement criteria are met, the device displays (16008), via the display generation component, an animated transition showing the representation of the virtual object moving (e.g., rotating, scaling, translating, and/or a combination of the above) from the first orientation to the second orientation and changing from having the first set of visual properties to having the second set of visual properties. For example, once the plane for placing the virtual object is identified in the camera's field of view, the virtual object is placed onto that plane with the visible adjustment of its orientation, size, and translucency (and the like). Displaying an animated transition from the first orientation to the second orientation (e.g., without requiring further user input to reorient the virtual object in the first user interface) reduces the number of inputs required for object placement. Reducing the number of inputs needed to perform an operation enhances the operability of the device and makes the user-device interface more efficient, which, additionally, reduces power usage and improves battery life of the device by enabling the user to use the device more quickly and efficiently.

In some embodiments, detecting that the object-placement criteria are met includes one or more of (16010): detecting that a plane has been identified in the field of view of the one or more cameras; detecting less than a threshold amount of movement between the device and the physical environment for at least a threshold amount of time (e.g., leading to a substantially stationary view of physical environment in the camera's field of view); and detecting that at least a predetermined amount of time has elapsed since receiving the request for displaying the virtual object in the first user interface region. Detecting that the object-placement criteria are met (e.g., by detecting a plane in the field of view of the one or more cameras without requiring user input to detect the plane) reduces the number of inputs required for object placement. Reducing the number of inputs needed to perform an operation enhances the operability of the device and makes the user-device interface more efficient, which, additionally, reduces power usage and improves battery life of the device by enabling the user to use the device more quickly and efficiently.

In some embodiments, the device detects (16012) first movement of the one or more cameras (e.g., rotation and/or translation of the device relative to the physical environment around the device) while the representation of the virtual object is displayed with the first set of visual properties and the first orientation (e.g., while the virtual object is suspended in the translucent state over a view of the physical environment surrounding the device) over a first portion of the physical environment (e.g., the first portion of the physical environment is visible to the user through the translucent virtual object) captured in the field of view of the one or more cameras. For example, in FIGS. 11G-11H, the one or more cameras move (as indicated by, e.g., the changed position of table 5004 in field of view 6036 of the cameras) while a translucent representation of virtual object 11002 is displayed. The walls and table of the physical environment, as captured in field of view 6036 of the cameras and displayed in the user interface, are visible through the translucent virtual object 11002. In response to detecting the first movement of the one or more cameras, the device displays (16014) the representation of the virtual object with the first set of visual properties and the first orientation over a second portion of the physical environment captured in the field of view of the one or more cameras, wherein the second portion of the physical environment is distinct from the first portion of the physical environment. For example, while the translucent version of the virtual object is displayed hovering over the physical environment shown in the field of view of the camera, the view of the physical environment within the field of view of the camera shifts and scales (e.g., behind the translucent virtual object) when the device moves relative to the physical environment. Therefore, during the movement of the device, the translucent version of the virtual object becomes overlaid on top of different portions of the physical environment represented in the field of view, as a result of the translation and scaling of the view of the physical environment within the field of view of the camera. For example, in FIG. 11H, field of view 6036 of the cameras displays a second portion of physical environment 5002 that is distinct from the first portion of physical environment 5002 displayed in FIG. 11G. The orientation of the translucent representation of virtual object 11002 does not change as the movement of the one or more cameras occurs in FIGS. 11G-11H. Displaying the virtual object with a first orientation in response to detecting movement of the one or more cameras provides visual feedback to the user (e.g., to indicate that the virtual object has not yet been placed at a fixed position relative to the physical environment and thus does not move as the portion of the physical environment captured in the field of view of the one or more cameras changes in accordance with movement of the one or more cameras). Providing improved visual feedback to the user enhances the operability of the device and makes the user-device interface more efficient (e.g., by helping the user to avoid attempting to provide input for manipulating the virtual object prior to placement of the object at the second orientation that corresponds to the plane), which, additionally, reduces power usage and improves battery life of the device by enabling the user to use the device more quickly and efficiently.

In some embodiments, the device detects (16016) second movement of the one or more cameras (e.g., rotation and/or translation of the device relative to the physical environment around the device) while the representation of the virtual object is displayed with the second set of visual properties and the second orientation (e.g., after the object-placement criteria have been met and the virtual object has been placed on a plane detected in the physical environment in the field of view of the cameras) over a third portion of the physical environment (e.g., direct view of the third portion of the physical environment (e.g., a portion of the detected plane that supports the virtual object) is blocked by the virtual object) captured in the field of view of the one or more cameras. For example, in FIGS. 11I-11J, the one or more cameras move (as indicated by, e.g., the changed position of table 5004 in field of view 6036 of the cameras) while a non-translucent representation of virtual object 11002 is displayed. In response to detecting the second movement of the device, the device maintains (16018) display of the representation of the virtual object with the second set of visual properties and the second orientation over the third portion of the physical environment captured in the field of view of the one or more cameras, while the physical environment as captured in the field of view of the one or more cameras moves (e.g., shifts and scales) in accordance with the second movement of the device, and the second orientation continues to correspond to the plane in the physical environment detected in the field of view of the one or more cameras. For example, after the non-translucent version of the virtual object is dropped at a resting location on a plane detected in the physical environment shown in the field of view of the camera, the virtual object's location and orientation is fixed relative to the physical environment within the field of view of the camera, and the virtual object will shift and scale with the physical environment in the field of view of the cameras as the device moves relative to the physical environment (e.g., the non-translucent representation of virtual object 11002 remains fixed at an orientation relative to the floor plane in physical environment 5002 as the movement of the one or more cameras occurs in FIGS. 11I-11J). Maintaining display of the virtual object at the second orientation in response to detecting movement of the one or more cameras provides visual feedback to the user (e.g., to indicate that the virtual object has been placed at a fixed position relative to the physical environment and thus moves as the portion of the physical environment captured in the field of view of the one or more cameras changes in accordance with movement of the one or more cameras). Providing improved visual feedback to the user enhances the operability of the device and makes the user-device interface more efficient (e.g., by helping the user to provide proper inputs for a virtual object that has placed at the second orientation that corresponds to the plane), which, additionally, reduces power usage and improves battery life of the device by enabling the user to use the device more quickly and efficiently.

In some embodiments, in accordance with a determination that the object-placement criteria are met (e.g., the object-placement criteria are met when the device has not identified a location or plane for placing the virtual object relative to the field of view of the one or more cameras in the first user interface region), the device generates (16020) (e.g., with one or more tactile output generators of the device) a tactile output in conjunction with displaying the representation of the virtual object with the second set of visual properties (e.g., at a reduced translucency level, or a higher brightness level, or a higher saturation level, etc.) and with the second orientation that corresponds to the plane in the physical environment detected in the field of view of the one or more cameras (e.g., the generation of the tactile output is synchronized with the completion of the transition to the non-translucent appearance of the virtual object and the completion of the rotation and translation of the virtual object to settle at the drop location on the plane detected in the physical environment). For example, as shown in FIG. 11I, a tactile output as indicated at 11010 is generated in conjunction with displaying the non-translucent representation of virtual object 11002 attached to a plane (e.g., floor surface 5038) that corresponds to virtual object 11002. Generating a tactile output in accordance with a determination that object-placement criteria are met provides the user with improved tactile feedback (e.g., indicating that the operation to place the virtual object was successfully executed). Providing improved feedback to the user enhances the operability of the device (e.g., by providing sensory information that allows a user to perceive that object-placement criteria have been met without cluttering the user interface with displayed information) and makes the user-device interface more efficient which, additionally, reduces power usage and improves battery life of the device by enabling the user to use the device more quickly and efficiently.

In some embodiments, while displaying the representation of the virtual object with the second set of visual properties and with the second orientation that corresponds to the plane in the physical environment detected in the field of view of the one or more cameras, the device receives (16022) an update regarding at least a location or an orientation of the plane in the physical environment detected in the field of view of the one or more cameras (e.g., the updated plane location and orientation is a result of more accurate calculation based on additional data accumulated after the initial plane detection result was used to place the virtual object, or more time-consuming computation methods (e.g., fewer approximations, etc.)). In response to receiving the update regarding at least the location or the orientation of the plane in the physical environment detected in the field of view of the one or more cameras, the device adjusts (16024) at least a location and/or an orientation of the representation of the virtual object in accordance with the update (e.g., gradually moving (e.g., translating and rotating) the virtual object closer to the updated plane). Adjusting a location and/or an orientation of a virtual object in response to receiving an update regarding a plane in the physical environment (e.g., without requiring user input for placing a virtual object relative to a plane) reduces the number of inputs needed to adjust the virtual object. Reducing the number of inputs needed to perform an operation enhances the operability of the device and makes the user-device interface more efficient, which, additionally, reduces power usage and improves battery life of the device by enabling the user to use the device more quickly and efficiently.

In some embodiments, the first set of visual properties include (16026) a first size and a first translucency level (e.g., before being dropped into the AR view, the object has a fixed size relative to the display and a fixed high translucency level) and the second set of visual properties include (16028) a second size that is distinct from the first size (e.g., once dropped in the AR view, the object is displayed with a simulated physical size in relation to the size and a drop location in the physical environment), and a second translucency level that is lower than (e.g., more opaque than) the first translucency level (e.g., the object is no longer translucent in the AR view). For example, in FIG. 11H, a translucent representation of virtual object 11002 is shown with a first size, and in FIG. 11I, a non-translucent representation of virtual object 11004 is shown with a second (smaller) size. Displaying a virtual object with a first size and a first translucency level or a second size and a second translucency level, depending on whether object-placement criteria are met, provides visual feedback to the user (e.g., to indicate that a request to display the virtual object has been received, but that additional time and/or calibration information is needed for placing the virtual object in the field of view of the one or more cameras). Providing improved visual feedback to the user enhances the operability of the device and makes the user-device interface more efficient (e.g., by helping the user to provide proper inputs and avoid attempting to provide input for manipulating the virtual object prior to placement of the object at the second orientation that corresponds to the plane), which, additionally, reduces power usage and improves battery life of the device by enabling the user to use the device more quickly and efficiently.

In some embodiments, the request to display the virtual object in the first user interface region (e.g., the AR view) that includes at least a portion of the field of view of the one or more cameras is received (16030) while the virtual object is displayed in a respective user interface (e.g., a staging user interface) that does not include at least a portion of the field of view of the one or more cameras (e.g., virtual object is oriented relative to a virtual stage that has an orientation that is independent of the physical environment of the device). The first orientation corresponds to an orientation of the virtual object while the virtual object is displayed in the respective user interface at a time when the request is received. For example, as described with regard to FIG. 11F, a request to display virtual object 11002 in a user interface that includes field of view 6036 of the cameras is received while staging user interface 6010 (that does not include the field of view of the cameras) is displayed. The orientation of virtual object 11002 in FIG. 11G, in which virtual object 11002 is displayed in a user interface that includes field of view 6036 of the cameras, corresponds to the orientation of virtual object 11002 in FIG. 11F, in which virtual object 11002 is displayed in staging user interface 6010. Displaying the virtual object in a first user interface (e.g., a displayed augmented reality view) with an orientation that corresponds to an orientation of the virtual object as displayed in a (previously displayed) interface (e.g., a staging user interface) provides visual feedback to the user (e.g., to indicate that object manipulation input provided while the staging user interface is displayed can be used to establish an orientation of the object in the AR view). Providing improved visual feedback to the user enhances the operability of the device and makes the user-device interface more efficient (e.g., by helping the user to provide proper inputs and avoid attempting to provide input for manipulating the virtual object prior to placement of the object at the second orientation that corresponds to the plane), which, additionally, reduces power usage and improves battery life of the device by enabling the user to use the device more quickly and efficiently.

In some embodiments, the first orientation corresponds to (16032) a predefined orientation (e.g., a default orientation such as the orientation that the virtual object is displayed at when it is first displayed in a respective user interface that does not include at least a portion of the field of view of the one or more cameras). Displaying the virtual object in a first user interface (e.g., a displayed augmented reality view) with a first set of visual properties and with a predefined orientation reduces power usage and improves battery life of the device (e.g., by allowing a pre-generated translucent representation of the virtual object to be displayed rather than rendering a translucent representation in accordance with an orientation established in a staging user interface).

In some embodiments, while displaying the virtual object in the first user interface region (e.g., the AR view) with the second set of visual properties and the second orientation that corresponds to the plane in the physical environment detected in the field of view of the one or more cameras, the device detects (16034) a request to change a simulated physical size of the virtual object (e.g., as a result of a scaling input (e.g., a pinch or de-pinch gesture directed to the virtual object)) from a first simulated physical size to a second simulated physical size (e.g., from 80% of the default size to 120% of the default size, or vice versa) relative to the physical environment captured in the field of view of the one or more cameras. For example, an input to decrease the simulated physical size of the virtual object 11002 is a pinch gesture as described with regard to FIGS. 11N-11P. In response to detecting the request to change the simulated physical size of the virtual object, the device gradually changes (16036) a displayed size of the representation of the virtual object in the first user interface region in accordance with a gradual change of the simulated physical size of the virtual object from the first simulated physical size to the second simulated physical size (e.g., the displayed size of the virtual object grows or shrinks while the displayed size of the physical environment captured in the field of view of the one or more cameras remains unchanged) and, during the gradual change of the displayed size of the representation of the virtual object in the first user interface region, in accordance with a determination that the simulated physical size of the virtual object has reached a predefined simulated physical size (e.g., 100% of the default size), the device generates a tactile output to indicate that the simulated physical size of the virtual object has reached the predefined simulated physical size. For example, as described with regard to FIGS. 11N-11P, the displayed size of the representation of virtual object 11002 gradually decreases in response to the pinch gesture input. In FIG. 110, when the displayed size of the representation of virtual object 11002 reaches 100% of the size of virtual object 11002 (e.g., the size of virtual object 11002 as originally displayed in the user interface that includes the field of view 6036 of the one or more cameras, as indicated in FIG. 11I), a tactile output is generated, as indicated at 11024. Generating a tactile output in accordance with a determination that the simulated physical size of the virtual object has reached a predefined simulated physical size provides the user with feedback (e.g., indicating that no further input is needed to return the simulated size of the virtual object to the predefined size). Providing improved tactile feedback enhances the operability of the device (e.g., by providing sensory information that allows a user to perceive that the predefined simulated physical size of the virtual object has been reached without cluttering the user interface with displayed information), which, additionally, reduces power usage and improves battery life of the device by enabling the user to use the device more quickly and efficiently.

In some embodiments, while displaying the virtual object in the first user interface region (e.g., the AR view) at the second simulated physical size of the virtual object (e.g., 120% of the default size, or 80% of the default size, as a result of a scaling input (e.g., a pinch or de-pinch gesture directed to the virtual object)) that is distinct from the predefined simulated physical size, the device detects (16038) a request to return the virtual object to the predefined simulated physical size (e.g., detecting a tap or double tap input on the touch-screen (e.g., on the virtual object, or alternatively, outside of the virtual object)). For example, after a pinch input has caused a reduction in size of virtual object 11002 (as described with regard to FIGS. 11N-11P), a double tap input is detected at a location that corresponds to the virtual object 11002 (as described with regard to FIG. 11R). In response to detecting the request to return the virtual object to the predefined simulated physical size, the device changes (16040) the displayed size of the representation of the virtual object in the first user interface region in accordance with a change of the simulated physical size of the virtual object to the predefined simulated physical size (e.g., the displayed size of the virtual object grows or shrinks while the displayed size of the physical environment captured in the field of view of the one or more cameras remains unchanged). For example, in response to the double tap input described with regard to FIG. 11R, the size of the virtual object 11002 returns to the size of virtual object 11002 as displayed in FIG. 11I (the size of virtual object 11002 as originally displayed in the user interface that includes the field of view 6036 of the one or more cameras). In some embodiments, in accordance with a determination that the simulated physical size of the virtual object has reached the predefined simulated physical size (e.g., 100% of the default size), the device generates a tactile output to indicate that the simulated physical size of the virtual object has reached the predefined simulated physical size. Changing the displayed size of a virtual object to a predefined size in response to detecting a request to return the virtual object to the predefined simulated physical size (e.g. by providing an option to adjust a displayed size precisely to a predefined simulated physical size, rather than requiring the user to estimate when input provided to adjust the display size is sufficient to display the virtual object at the predefined simulated physical size) reduces the number of inputs needed to display the object with a predefined size. Reducing the number of inputs needed to perform an operation enhances the operability of the device and makes the user-device interface more efficient, which, additionally, reduces power usage and improves battery life of the device by enabling the user to use the device more quickly and efficiently.

In some embodiments, the device selects the plane for setting the second orientation of the representation of the virtual object with the second set of visual properties in accordance with a respective position and orientation of the one or more cameras relative to the physical environment (e.g., a current position and orientation at the time when the object-placement criteria are met), wherein selecting the plane includes (16042): in accordance with a determination that the object-placement criteria were met when the representation of the virtual object was displayed over a first portion of the physical environment (e.g., the base of the translucent object is overlapping with a plane in the first portion of the physical environment) captured in the field of view of the one or more cameras (e.g., as a result of the device pointing in a first direction in the physical environment), selecting a first plane of multiple planes detected in the physical environment in the field of view of the one or more cameras (e.g., in accordance with a greater proximity between the object's base and the first plane on the display, and the greater proximity between the first plane and the first portion of the physical environment in the physical world) as the plane for setting the second orientation of the representation of the virtual object with the second set of visual properties; and in accordance with a determination that the object-placement criteria were met when the representation of the virtual object was displayed over a second portion of the physical environment (e.g., the base of the translucent object is overlapping with a plane in the second portion of the physical environment) captured in the field of view of the one or more cameras (e.g., as a result of the device pointing in a second direction in the physical environment), selecting a second plane of the multiple planes detected in the physical environment in the field of view of the one or more cameras (e.g., in accordance with a greater proximity between the object's base and the second plane on the display, and the greater proximity between the second plane and the second portion of the physical environment in the physical world) as the plane for setting the second orientation of the representation of the virtual object with the second set of visual properties, wherein the first portion of the physical environment is distinct from the second portion of the physical environment, and the first plane is distinct from the second plane. Selecting a first plane or a second plane as a plane relative to which a virtual object will be set (e.g., without requiring user input to designate which of many detected planes will be the plane relative to which the virtual object is set) reduces the number of inputs needed to select a plane. Reducing the number of inputs needed to perform an operation enhances the operability of the device and makes the user-device interface more efficient, which, additionally, reduces power usage and improves battery life of the device by enabling the user to use the device more quickly and efficiently.

In some embodiments, the device displays (16044) a snapshot affordance (e.g., a camera shutter button) concurrently with displaying the virtual object in the first user interface region (e.g., the AR view) with the second set of visual properties and the second orientation. In response to activation of the snapshot affordance, the device captures (16046) a snapshot image including a current view of the representation of the virtual object at a placement location in the physical environment in the field of view of the one or more cameras, with the second set of visual properties and the second orientation that corresponds to the plane in the physical environment detected in the field of view of the one or more cameras. Displaying a snapshot affordance for capturing a snapshot image of a current view of an object reduces the number of inputs needed to capture a snapshot image of an object. Reducing the number of inputs needed to perform an operation enhances the operability of the device and makes the user-device interface more efficient, which, additionally, reduces power usage and improves battery life of the device by enabling the user to use the device more quickly and efficiently.

In some embodiments, the device displays (16048) one or more control affordances (e.g., affordance to switch back to the staging user interface, affordance to exit the AR viewer, affordance to capture a snap shot, etc.) with the representation of the virtual object having the second set of visual properties in the first user interface region. For example, in FIG. 11J, a set of controls that includes back control 6016, toggle control 6018, and share control 6020 is displayed. While displaying the one or more control affordances with the representation of the virtual object having the second set of visual properties, the device detects (16050) that control-fading criteria are met (e.g., no user input has been detected on the touch-sensitive surface for a threshold amount of time (e.g., with or without movement of the device and update to the field of view of the cameras)). In response to detecting that the control fading criteria are met, the device ceases (16052) to display the one or more control affordances while continuing to display the representation of the virtual object having the second set of visual properties in the first user interface region including the field of view of the one or more cameras. For example, as described with regard to FIGS. 11K-11L, controls 6016, 6018, and 6020 gradually fade out and cease to be displayed when no user input is detected for a threshold amount of time. In some embodiments, after the control affordances are faded away, a tap input on the touch-sensitive surface or an interaction with the virtual object causes the device to redisplay the control affordances concurrently with the representation of the virtual object in the first user interface region. Automatically ceasing to display controls in response to determining that control fading criteria are met reduces the number of inputs needed to cease displaying controls. Reducing the number of inputs needed to perform an operation enhances the operability of the device and makes the user-device interface more efficient, which, additionally, reduces power usage and improves battery life of the device by enabling the user to use the device more quickly and efficiently.

In some embodiments, in response to the request to display the virtual object in the first user interface region: prior to displaying the representation of the virtual object over at least a portion of the field of view of the one or more cameras that is included the first user interface region, in accordance with a determination that calibration criteria are not met (e.g., because there is not sufficient amount of images from different viewing angles to generating dimension and spatial relationship data for the physical environment captured in the field of view of the one or more cameras), the device displays (16054) a prompt for the user to move the device relative to the physical environment (e.g., displaying a visual prompt to move the device and, optionally displaying a calibration user interface object (e.g., a bouncy wireframe ball or a cube that moves in accordance with movement of the device) in the first user interface region (e.g., the calibration user interface object is overlaid on a blurred image of the field of view of the one or more cameras), as described in greater detail below with reference to method 17000). Displaying a prompt for the user to move the device relative to the physical environment provides visual feedback to the user (e.g., to indicate that movement of the device is needed to obtain information for placing the virtual object in the field of view of the camera(s)). Providing improved visual feedback to the user enhances the operability of the device and makes the user-device interface more efficient (e.g., by helping the user to provide calibration input), which, additionally, reduces power usage and improves battery life of the device by enabling the user to use the device more quickly and efficiently).

It should be understood that the particular order in which the operations in FIGS. 16A-16G have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800, 900, 1000, 17000, 18000, 19000, and 20000) are also applicable in an analogous manner to method 16000 described above with respect to FIGS. 16A-16G. For example, contacts, inputs, virtual objects, user interface regions, fields of view, tactile outputs, movements, and/or animations described above with reference to method 16000 optionally have one or more of the characteristics of the contacts, inputs, virtual objects, user interface regions, fields of view, tactile outputs, movements, and/or animations described herein with reference to other methods described herein (e.g., methods 800, 900, 1000, 17000, 18000, 19000, and 20000). For brevity, these details are not repeated here.

FIGS. 17A-17D are flow diagrams illustrating method 17000 of displaying a calibration user interface object that is dynamically animated in accordance with movement of one or more cameras of a device. Method 17000 is performed at an electronic device (e.g., device 300, FIG. 3, or portable multifunction device 100, FIG. 1A) having a display generation component (e.g., a display, a projector, a heads up display or the like), one or more input devices (e.g., a touch-sensitive surface, or a touch-screen display that serves both as the display generation component and the touch-sensitive surface), one or more cameras (e.g., one or more rear-facing cameras on a side of the device opposite from the display and the touch-sensitive surface), and one or more attitude sensors (e.g., accelerometers, gyroscopes, and/or magnetometers) for detecting changes in attitude (e.g., orientation (e.g., rotation, yaw, and/or tilt angles) and position relative to the surrounding physical environment) of the device including the one or more cameras. Some operations in method 17000 are, optionally, combined and/or the order of some operations is, optionally, changed.

The device receives (17002) a request to display an augmented reality view of a physical environment (e.g., the physical environment surrounding the device including the one or more cameras) in a first user interface region that includes a representation of a field of view of the one or more cameras (e.g., the field of view captures at least a portion of the physical environment). In some embodiments, the request is a tap input detected on a button to switch from a staging view of a virtual object to an augmented reality view of the virtual object. In some embodiments, the request is a selection of an augmented reality affordance displayed next to a representation of a virtual object in a two-dimensional user interface. In some embodiments, the request is activation of an augmented reality measuring application (e.g., a measure app that facilitate measurements of the physical environment). For example, the request is a tap input detected at toggle 6018 for displaying virtual object 11002 in field of view 6036 of the one or more cameras, as described with regard to FIG. 12A.

In response to receiving the request to display the augmented reality view of the physical environment, the device displays (17004) the representation of the field of view of the one or more cameras (e.g., the device displays a blurred version of the physical environment in the field of view of the one or more cameras when the calibration criteria are not met). For example, the device displays a blurred representation of the field of view 6036 of the one or more cameras, as shown in FIG. 12E-1. In accordance with a determination that calibration criteria are not met for the augmented reality view of the physical environment (e.g., because there is not a sufficient amount of image data (e.g., from different viewing angles) to generate dimension and spatial relationship data for the physical environment captured in the field of view of the one or more cameras, because a plane that corresponds to the virtual object is not detected in the field of view of the one or more cameras, and/or because there is not sufficient information to begin or proceed with plane detection based on available image data from the cameras), the device displays (e.g., via the display-generation component, and in the first user interface region that includes the representation of the field of view of one or more cameras (e.g., a blurred version of the field of view)) a calibration user interface object (e.g., a scan prompt object, such as a bouncy cube or a wireframe object) that is dynamically animated in accordance with movement of the one or more cameras in the physical environment. For example, in FIGS. 12E-1 to 12I-1, calibration user interface object 12014 is displayed. Animation of calibration user interface object in accordance with movement of the one or more cameras is described with regard to, e.g., FIGS. 12E-1 to 12F-1. In some embodiments, analyzing the field of view of the one or more cameras to detect one or more planes (e.g., a floor, wall, table, etc.) in the field of view of the one or more cameras occurs when an initial part of an input that corresponds to the request to display the representation of the augmented reality view is received. In some embodiments, the analyzing occurs prior to receiving the request (e.g., while the virtual object is displayed in a staging view). Displaying the calibration user interface object includes: while displaying the calibration user interface object, detecting, via the one or more attitude sensors, a change in attitude (e.g., location and/or orientation (e.g., rotation, tilt, yaw angles)) of the one or more cameras in the physical environment; and, in response to detecting the change in attitude of the one or more cameras in the physical environment, adjusting at least one display parameter (e.g., orientation, size, rotation, or location on the display) of the calibration user interface object (e.g., a scan prompt object, such as a bouncy cube or a wireframe object) in accordance with the detected change in attitude of the one or more cameras in the physical environment. For example, FIGS. 12E-1 to 12F-1, which correspond to FIGS. 12E-2 to 12F-2, respectively, illustrate lateral movement of the device 100 relative to physical environment 5002, and a corresponding change in displayed field of view 6036 of the one or more cameras of the device. In FIGS. 12E-2 to 12F-2, calibration user interface object 12014 rotates in response to the movement of the one or more cameras.

While displaying the calibration user interface object (e.g., a scan prompt object, such as a bouncy cube or a wireframe object) that moves on the display in accordance with the detected change in attitude of the one or more cameras in the physical environment, the device detects (17006) that the calibration criteria are met. For example, as described with regard to FIGS. 12E-12J, the device determines that the calibration criteria are met in response to the movement of the device that occurs from 12E-1 to 12I-1.

In response to detecting that the calibration criteria are met, the device ceases (17008) to display the calibration user interface object (e.g., a scan prompt object, such as a bouncy cube or a wireframe object). In some embodiments, after the device ceases to display the calibration user interface object, the device displays the representation of the field of view of the cameras without the blurring. In some embodiments, a representation of the virtual object is displayed over the un-blurred representation of the field of view of the cameras. For example, in FIG. 12J, in response to the movement of the device described with regard to 12E-1 to 12I-1, the calibration user interface object 12014 is no longer displayed, and virtual object 11002 is displayed over the un-blurred representation 6036 of the field of view of the camera(s). Adjusting a display parameter of a calibration user interface object in accordance with movement of one or more cameras (e.g., device cameras that capture the physical environment of the device) provides visual feedback to the user (e.g., to indicate that movement of the device is needed for calibration). Providing improved visual feedback to the user enhances the operability of the device and makes the user-device interface more efficient (e.g., by helping the user to move the device in a manner that provides information needed to meet calibration criteria), which, additionally, reduces power usage and improves battery life of the device by enabling the user to use the device more quickly and efficiently.

In some embodiments, the request to display the augmented reality view of the physical environment (e.g., the physical environment surrounding the device including the one or more cameras) in the first user interface region that includes the representation of the field of view of the one or more cameras includes (17010) a request to display a representation of a virtual three-dimensional object (e.g., a virtual object having a three-dimensional model) in the augmented reality view of the physical environment. In some embodiments, the request is a tap input detected on a button to switch from a staging view of a virtual object to an augmented reality view of the virtual object. In some embodiments, the request is a selection of an augmented reality affordance displayed next to a representation of a virtual object in a two-dimensional user interface. For example, in FIG. 12A, an input by contact 12002 at a location that corresponds to toggle control 6018 is a request to display virtual object 11002 in a user interface that includes field of view 6036 of the cameras, as shown in FIG. 12B. Displaying an augmented reality view of a physical environment in response to a request to display a virtual object in the augmented reality view reduces the number of inputs needed (e.g., to display both the view of the physical environment and the virtual object). Reducing the number of inputs needed to perform an operation enhances the operability of the device and makes the user-device interface more efficient (e.g., by helping the user to provide calibration input), which, additionally, reduces power usage and improves battery life of the device by enabling the user to use the device more quickly and efficiently.

In some embodiments, the device displays (17012) (e.g., after the calibration criteria are met) the representation of the virtual three-dimensional object in the first user interface region that includes the representation of the field of view of the one or more cameras after ceasing to display the calibration user interface object. In some embodiments, in response to the request, after the calibration is completed and the field of view of the camera is displayed in full clarity, the virtual object drops to a predefined position and/or orientation relative to a predefined plane identified in the field of view of the one or more cameras (e.g., a physical surface, such as a vertical wall or horizontal floor surface that can serve as a support plane for the three-dimensional representation of the virtual object). For example, in FIG. 12J, the device has ceased to display the calibration user interface object 12014 that was displayed in FIGS. 12E-12I, and virtual object 11002 is displayed in a user interface that includes field of view 6036 of the cameras. Displaying a virtual object in a displayed augmented reality view after ceasing to display the calibration user interface object provides visual feedback (e.g., to indicate that calibration criteria have been met). Providing improved visual feedback to the user enhances the operability of the device and makes the user-device interface more efficient (e.g., by helping the user to provide proper inputs and avoid attempting to provide input for manipulating the virtual object before calibration criteria are met), which, additionally, reduces power usage and improves battery life of the device by enabling the user to use the device more quickly and efficiently.

In some embodiments, the device displays (17014) (e.g., before the calibration criteria are met) the representation of the virtual three-dimensional object in the first user interface region concurrently with the calibration user interface object (e.g., behind the calibration user interface object), wherein the representation of the virtual three-dimensional object remains at a fixed location in the first user interface region (e.g., the virtual three-dimensional object is not placed at a location in the physical environment) during the movement of the one or more cameras in the physical environment (e.g., while the calibration user interface object is moved in the first user interface region in accordance with the movement of the one or more cameras). For example, in FIGS. 12E-1 to 12I-1, a representation of virtual object 1102 is displayed concurrently with calibration user interface object 12014. As the device 100 that includes the one or more cameras moves (e.g., as illustrated in FIGS. 12E-1 to 12F-1 and corresponding FIGS. 12E-2 to 12F-2), virtual object 1102 remains at a fixed location in the user interface that includes field of view 6036 of the one or more cameras. Displaying a virtual object concurrently with a calibration user interface object provides visual feedback (e.g., to indicate the object for which calibration is being performed). Providing improved visual feedback to the user enhances the operability of the device and makes the user-device interface more efficient (e.g., by helping the user to provide calibration input that corresponds a plane relative to which the virtual object will be placed), which, additionally, reduces power usage and improves battery life of the device by enabling the user to use the device more quickly and efficiently.

In some embodiments, the request to display the augmented reality view of the physical environment (e.g., the physical environment surrounding the device including the one or more cameras) in the first user interface region that includes the representation of the field of view of the one or more cameras includes (17016) a request to display the representation of the field of view of the one or more cameras (e.g., with one or more user interface objects and/or controls (e.g., outlines of planes, objects, pointers, icons, markers, etc.)) without requesting display of a representation of any virtual three-dimensional object (e.g., a virtual object having a three-dimensional model) in the physical environment captured in the field of view of the one or more cameras. In some embodiments, the request is a selection of an augmented reality affordance displayed next to a representation of a virtual object in a two-dimensional user interface. In some embodiments, the request is activation of an augmented reality measuring application (e.g., a measure app that facilitate measurements of the physical environment). Requesting to display the representation of the field of view of the one or more cameras without requesting display of a representation of any virtual three-dimensional object provides feedback (e.g., by using the same calibration user interface object to indicate that calibration is needed regardless of whether a virtual object is displayed). Providing improved feedback to the user enhances the operability of the device and makes the user-device interface more efficient which, additionally, reduces power usage and improves battery life of the device by enabling the user to use the device more quickly and efficiently.

In some embodiments, in response to receiving the request to display the augmented reality view of the physical environment, the device displays (17018) the representation of the field of view of the one or more cameras (e.g., displaying a blurred version of the physical environment in the field of view of the one or more cameras when the calibration criteria are not met) and, in accordance with a determination that the calibration criteria are met for the augmented reality view of the physical environment (e.g., because there is a sufficient amount of image data (e.g., from different viewing angles) to generate dimension and spatial relationship data for the physical environment captured in the field of view of the one or more cameras, because a plane that corresponds to the virtual object has been detected in the field of view of the one or more cameras, and/or because there is sufficient information to begin or proceed with plane detection based on available image data from the cameras), the device forgoes display of the calibration user interface object (e.g., a scan prompt object, such as a bouncy cube or a wireframe object). In some embodiments, the scanning of the physical environment for planes begins while the virtual three-dimensional object is displayed in a staging user interface which enables the device to, in some circumstances (e.g., where the field of view of the cameras has moved sufficiently to provide enough data to detect one or more planes in the physical space) detect the one or more planes in the physical space before displaying the augmented reality view, so that the calibration user interface does not need to be displayed. Forgoing display of the calibration user interface object in accordance with a determination that the calibration criteria are met for the augmented reality view of the physical environment provides visual feedback to the user (e.g., the absence of the calibration user interface object indicates that calibration criteria have been met and movement of the device is not needed for calibration). Providing improved visual feedback to the user enhances the operability of the device and makes the user-device interface more efficient (e.g., by helping the user to avoid unnecessary movement of the device for the purpose of calibration), which, additionally, reduces power usage and improves battery life of the device by enabling the user to use the device more quickly and efficiently.

In some embodiments, the device displays (17020) (e.g., before the calibration criteria are met) a textual object (e.g., a textual description describing the error condition that is currently detected and/or a textual prompt requesting user action (e.g., to rectify the detected error condition)) in the first user interface region concurrently with the calibration user interface object that provides information about actions that can be taken by the user to improve calibration of the augmented reality view (e.g., next to the calibration user interface object). In some embodiments, the textual object provides a prompt to a user for movement of the device (e.g., with a currently detected error condition), such as "excessive movement," "low detail," "move closer," etc. In some embodiments, the device updates the textual object in accordance with the user's actions during the calibration process and new error conditions that are detected based on the user's actions. Displaying text concurrently with the calibration user interface object provides visual feedback to the user (e.g., providing a verbal indication of the type of movement needed for calibration). Providing improved visual feedback to the user enhances the operability of the device and makes the user-device interface more efficient (e.g., helping the user to provide proper inputs and reducing user mistakes when operating/interacting with the device), which, additionally, reduces power usage and improves battery life of the device by enabling the user to use the device more quickly and efficiently.

In some embodiments, in response to detecting that the calibration criteria are met (e.g., criteria met before the calibration user interface object was ever displayed, or criteria met after the calibration user interface object was displayed and animated for a period of time), the device displays (17022) a visual indication of a plane (e.g., displaying an outline around the detected plane, or highlighting the detected plane) detected in the physical environment captured in the field of view of the one or more cameras (e.g., after ceasing to display the calibration user interface object if the calibration user interface object was initially displayed). For example, in FIG. 12J, a plane (floor surface 5038) is highlighted to indicate that the plane has been detected in the physical environment 5002 as captured in the displayed field of view 6036 of the one or more cameras. Displaying a visual indication of a detected plane provides visual feedback (e.g., indicating that a plane has been detected in the physical environment captured by the device camera(s)). Providing improved visual feedback to the user enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some embodiments, in response to receiving the request to display the augmented reality view of the physical environment: in accordance with the determination that the calibration criteria are not met and before displaying the calibration user interface object, the device displays (17024) (e.g., via the display-generation component, and in the first user interface region that includes the representation of the field of view of one or more cameras (e.g., a blurred version of the field of view)) an animated prompt object (e.g., a scan prompt object, such as a bouncy cube or a wireframe object) that includes a representation of the device moving relative to a representation of a plane (e.g., the movement of the representation of the device relative to the representation of the plane indicates a required movement of the device to be effected by the user). For example, the animated prompt object includes representation 12004 of the device 100 that moves relative to representation 12010 of a plane, as described with regard to FIGS. 12B-12D. In some embodiments, the device ceases to display the animated prompt object when the device detects movement of the device (e.g., indicating that the user has started to move the device in a way that will enable calibration to proceed). In some embodiments, the device replaces display of the animated prompt object with the calibration user interface object when the device detects movement of the device and before calibration has been completed to guide the user further with respect to calibration of the device. For example, as described with regard to FIGS. 12C-12E, when movement of the device is detected (as shown in FIGS. 12C-12D), an animated prompt that includes representation 12004 of the device 100 ceases to be displayed and calibration user interface object 12014 is displayed in FIG. 12E. Displaying an animated prompt object that includes a representation of the device moving relative to a representation of a plane provides visual feedback to the user (e.g., to illustrate a type of movement of the device that is needed for calibration). Providing improved visual feedback to the user enhances the operability of the device and makes the user-device interface more efficient (e.g., by helping the user to move the device in a manner that provides information needed to meet calibration criteria), which, additionally, reduces power usage and improves battery life of the device by enabling the user to use the device more quickly and efficiently.

In some embodiments, adjusting at least one display parameter of the calibration user interface object in accordance with the detected change in attitude of the one or more cameras in the physical environment includes (17026): moving the calibration user interface object by a first amount in accordance with a first magnitude of movement of the one or more cameras in the physical environment; and moving the calibration user interface object by a second amount in accordance with a second magnitude of movement of the one or more cameras in the physical environment, wherein the first amount is distinct from (e.g., greater than) the second amount, and the first magnitude of movement is distinct from (e.g., greater than) the second magnitude of movement (e.g., the first and second magnitudes of the movement are measured based on movement in the same direction in the physical environment). Moving the calibration user interface object by an amount that corresponds to a magnitude of movement of the one or more (device) cameras provides visual feedback (e.g., indicating to the user that the movement of the calibration user interface object is a guide for movement of the device that is required for calibration). Providing improved visual feedback to the user enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some embodiments, adjusting at least one display parameter of the calibration user interface object in accordance with the detected change in attitude of the one or more cameras in the physical environment includes (17028): in accordance with a determination that the detected change in attitude of the one or more cameras corresponds to a first type of movement (e.g., sideways movement, such as leftward, rightward, or back and forth sideways movement) (and does not correspond to a second type of movement (e.g., vertical movement, such as upward, downward, or up and down movement)), moving the calibration user interface object based on the first type of movement (e.g., moving the calibration user interface object in a first manner (e.g., rotating the calibration user interface object around a vertical axis through the calibration user interface object)); and in accordance with a determination that the detected change in attitude of the one or more cameras corresponds to the second type of movement (and does not correspond to the first type of movement), forgoing moving the calibration user interface object based on the second type of movement (e.g., forgoing moving the calibration user interface object in the first manner or keeping the calibration user interface object stationary). For example, sideways movement of device 100 that includes one or more cameras (e.g., as described with regard to FIGS. 12F-1 to -2G-1 and FIGS. 12F-2 to 12G-2) causes calibration user interface object 12014 to rotate, whereas vertical movement of device 100 (e.g., as described with regard to FIGS. 12G-1 to 12H-1 and FIGS. 12G-2 to 12H-2), does not cause calibration user interface object 12014 to rotate. Forgoing movement of the calibration user interface object in accordance with a determination that the detected change in attitude of the device camera(s) corresponds to a second type of movement provides visual feedback (e.g., indicating to the user that the second type of movement of the one or more cameras is not required for calibration). Providing improved visual feedback to the user enhances the operability of the device and makes the user-device interface more efficient (e.g., by helping the user to avoid providing unnecessary input), which, additionally, reduces power usage and improves battery life of the device by enabling the user to use the device more quickly and efficiently.

In some embodiments, adjusting at least one display parameter of the calibration user interface object in accordance with the detected change in attitude of the one or more cameras in the physical environment includes (17030): moving the calibration user interface object (e.g., rotating and/or tilting) in accordance with the detected change in attitude of the one or more cameras in the physical environment without altering a characteristic display location (e.g., a location of a geometric center, or an axis of the calibration user interface object on the display) of the calibration user interface object over the first user interface region (e.g., the calibration user interface object is anchored to a fixed location on the display, while the physical environment moves within the field of view of the one or more cameras underneath the calibration user interface object). For example, in FIGS. 12E-1 to 12I-1, calibration user interface object 12014 rotates while remaining at a fixed location relative to display 112. Moving the calibration user interface object without altering a characteristic display location of the calibration user interface object provides visual feedback (e.g., indicating that the calibration user interface object is distinct from a virtual object that is placed at a location relative to a displayed augmented reality environment). Providing improved visual feedback to the user enhances the operability of the device and makes the user-device interface more efficient (e.g., by helping the user to avoid provide proper inputs and reduce user input mistakes), which, additionally, reduces power usage and improves battery life of the device by enabling the user to use the device more quickly and efficiently.

In some embodiments, adjusting at least one display parameter of the calibration user interface object in accordance with the detected change in attitude of the one or more cameras in the physical environment includes (17032): rotating the calibration user interface object about an axis that is perpendicular to a movement direction of the one or more cameras in the physical environment (e.g., the calibration user interface object rotates about the z-axis when the device (e.g., including the cameras) moves back and forth on the x-y plane, or the calibration user interface object rotates about the y-axis when the device (e.g., including the cameras) moves from side-to-side along the x-axis (e.g., the x-axis is defined as the horizontal direction relative to the physical environment and lies within the plane of the touch-screen display, for example)). For example, in FIGS. 12E-1 to 12G-1, calibration user interface object 12014 rotates about a vertical axis that is perpendicular to the sideways movement of device shown in FIGS. 12E-2 to 12G-2. Rotating the calibration user interface object about an axis that is perpendicular to movement of the device camera(s) provides visual feedback (e.g., indicating to the user that the movement of the calibration user interface object is a guide for movement of the device that is required for calibration). Providing improved visual feedback to the user enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some embodiments, adjusting at least one display parameter of the calibration user interface object in accordance with the detected change in attitude of the one or more cameras in the physical environment includes (17034): moving the calibration user interface object at a speed that is determined in accordance with a rate of change (e.g., movement speed of the physical environment) detected in the field of view of the one or more cameras. Moving the calibration user interface object at a speed determined in accordance with a change in attitude of the device camera(s) provides visual feedback (e.g., indicating to the user that the movement of the calibration user interface object is a guide for movement of the device that is required for calibration). Providing improved visual feedback to the user enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some embodiments, adjusting at least one display parameter of the calibration user interface object in accordance with the detected change in attitude of the one or more cameras in the physical environment includes (17036): moving the calibration user interface object in a direction that is determined in accordance with a direction of change (e.g., movement speed of the physical environment) detected in the field of view of the one or more cameras (e.g., the device rotates the calibration user interface object clockwise for movement of the device from right to left and rotates the calibration user interface object counterclockwise for movement of the device from left to right, or the device rotates the calibration user interface object counterclockwise for movement of the device from right to left and rotates the calibration user interface object clockwise for movement of the device from left to right). Moving the calibration user interface object in a direction that is determined in accordance with a change in attitude of the device camera(s) provides visual feedback (e.g., indicating to the user that the movement of the calibration user interface object is a guide for movement of the device that is required for calibration). Providing improved visual feedback to the user enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

It should be understood that the particular order in which the operations in FIGS. 17A-17D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800, 900, 1000, 16000, 18000, 19000, and 20000) are also applicable in an analogous manner to method 17000 described above with respect to FIGS. 17A-17D. For example, contacts, inputs, virtual objects, user interface regions, fields of view, tactile outputs, movements, and/or animations described above with reference to method 17000 optionally have one or more of the characteristics of the contacts, inputs, virtual objects, user interface regions, fields of view, tactile outputs, movements, and/or animations described herein with reference to other methods described herein (e.g., methods 800, 900, 1000, 16000, 18000, 19000, and 20000). For brevity, these details are not repeated here.

FIGS. 18A-18I are flow diagrams illustrating method 18000 of constraining rotation of a virtual object about an axis. Method 18000 is performed at an electronic device (e.g., device 300, FIG. 3, or portable multifunction device 100, FIG. 1A) having a display generation component (e.g., a display, a projector, a heads up display or the like), one or more input devices (e.g., a touch-sensitive surface, or a touch-screen display that serves both as the display generation component and the touch-sensitive surface), one or more cameras (e.g., one or more rear-facing cameras on a side of the device opposite from the display and the touch-sensitive surface), and one or more attitude sensors (e.g., accelerometers, gyroscopes, and/or magnetometers) for detecting changes in attitude (e.g., orientation (e.g., rotation, yaw, and/or tilt angles) and position relative to the surrounding physical environment) of the device including the one or more cameras. Some operations in method 18000 are, optionally, combined and/or the order of some operations is, optionally, changed.

The device displays (18002), by the display generation component, a representation of a first perspective of a virtual three-dimensional object in a first user interface region (e.g., a staging user interface or an augmented reality user interface). For example, virtual object 11002 is shown in staging user interface 6010, as shown in FIG. 13B.

While displaying the representation of the first perspective of the virtual three-dimensional object in the first user interface region on the display, the device detects (18004) a first input (e.g., a swipe input (e.g., by one or two finger contacts) on the touch-sensitive surface, or a pivot input (e.g., two finger rotation, or one finger contact pivots around another finger contact)) that corresponds to a request to rotate the virtual three-dimensional object relative to a display (e.g., a display plane corresponding to the display generation component, such as the plane of the touch-screen display) to display a portion of the virtual three-dimensional object that is not visible from the first perspective of the virtual three-dimensional object. For example, the request is an input as described with regard to FIGS. 13B-13C or an input as described with regard to FIGS. 13E-13F.

In response to detecting the first input (18006): in accordance with a determination that the first input corresponds to a request to rotate the three-dimensional object about a first axis (e.g., a first axis that is parallel to the plane of the display (e.g., the x-y plane) in a horizontal direction, such as an x axis), the device rotates the virtual three-dimensional object relative to the first axis by an amount that is determined based on a magnitude of the first input (e.g., a speed and/or distance of a swipe input along a vertical axis (e.g., y-axis) of the touch-sensitive surface (e.g., an corresponding x-y plane to the x-y plane of the display)) and is constrained by a limit on the movement restricting rotation of the virtual three-dimensional object by more than a threshold amount of rotation relative to the first axis (e.g., the rotation around the first axis is restricted to a range of +/−30 degree angle around the first axis, and rotation beyond the range is prohibited, irrespective of the magnitude of the first input). For example, as described with regard to FIGS. 13E-13G, rotation of the virtual object 11002 is constrained by a limit. In accordance with a determination that the first input corresponds to a request to rotate the three-dimensional object about a second axis (e.g., a second axis that is parallel to the plane of the display (e.g., the x-y plane) in a vertical direction, such as a y axis) that is different from the first axis, the device rotates the virtual three-dimensional object relative to the second axis by an amount that is determined based on a magnitude of the first input (e.g., a speed and/or distance of a swipe input along a horizontal axis (e.g., an x axis) of the touch-sensitive surface (e.g., an corresponding x-y plane to the x-y plane of the display)), wherein, for an input with a magnitude above a respective threshold, the device rotates the virtual three-dimensional object relative to the second axis by more than the threshold amount of rotation. In some embodiments, for rotation relative to the second axis, the device imposes a constraint on rotation that is greater than the constraint on rotation relative to the first axis (e.g., the three-dimensional object is allowed to rotate 60 degrees instead of 30 degrees). In some embodiments, for rotation relative to the second axis, the device does not impose a constraint on the rotation, such that the three-dimensional object can rotate freely about the second axis (e.g., for an input with a high enough magnitude such as a fast or long swipe input that includes movement of one or more contacts, the three-dimensional object can rotate by more than 360 degrees relative to the second axis). For example, a greater amount of rotation of the virtual object 11002 occurs about the y-axis in response to the input described with regard to FIGS. 13B-13C than the amount of rotation of the virtual object 11002 about the x-axis in response to the input described with regard to FIGS. 13E-13G. Determining whether to rotate an object by an amount that is constrained to a threshold amount or rotate the object by more than the threshold amount depending on whether the input is a request to rotate the object about a first axis or a second axis improves the ability to control different types of rotation operations. Providing additional control options without cluttering the user interface with additional displayed controls enhances the operability of the device and makes the user-device interface more efficient.

In some embodiments, in response to detecting the first input (18008): in accordance with a determination that the first input includes first movement of a contact across a touch-sensitive surface in a first direction (e.g., y-direction, vertical direction on the touch-sensitive surface), and that the first movement of the contact in the first direction meets first criteria for rotating the representation of the virtual object with respect to the first axis, wherein the first criteria include a requirement that the first input includes more than a first threshold amount of movement in the first direction in order for the first criteria to be met (e.g., the device does not initiate rotation of the three-dimensional object about the first axis until the device detects more than a first threshold amount of movement in the first direction), the device determines that the first input corresponds to a request to rotate the three-dimensional object about the first axis (e.g., x-axis, horizontal axis parallel to the display, or horizontal-axis through the virtual object); and in accordance with a determination the first input includes second movement of the contact across the touch-sensitive surface in a second direction (e.g., x-direction, horizontal direction on the touch-sensitive surface), and that the second movement of the contact in the second direction meets second criteria for rotating the representation of the virtual object with respect to the second axis wherein the second criteria include a requirement that the first input includes more than a second threshold amount of movement in the second direction in order for the second criteria to be met (e.g., the device does not initiate rotation of the three-dimensional object about the second axis until the device detects more than a second threshold amount of movement in the second direction), the device determines that the first input corresponds to a request to rotate the three-dimensional object about the second axis, (e.g., the vertical axis parallel to the display, or vertical axis through the virtual object), wherein the first threshold is greater than the second threshold (e.g., the user needs to swipe in the vertical direction by a greater amount to trigger a rotation around the horizontal axis (e.g., tilt the object forward or backward relative to the user), than to swipe in the horizontal direction to trigger a rotation around the vertical axis (e.g., rotate the object)). Determining whether to rotate an object by an amount that is constrained to a threshold amount or to rotate the object by more than the threshold amount, depending on whether the input is a request to rotate the object about a first axis or a second axis, improves the ability to control different types of rotation operations in response to an input that corresponds to a request to rotate the object. Providing additional control options without cluttering the user interface with additional displayed controls enhances the operability of the device and makes the user-device interface more efficient.

In some embodiments (18010), rotation of the virtual three-dimensional object relative to the first axis occurs with a first degree of correspondence between a characteristic value of a first input parameter (e.g., a swipe distance, or swipe speed) of the first input and an amount of rotation applied to the virtual three-dimensional object around the first axis, rotation of the virtual three-dimensional object relative to the second axis occurs with a second degree of correspondence between the characteristic value of the first input parameter (e.g., a swipe distance, or swipe speed) of the second input gesture and an amount of rotation applied to virtual three-dimensional object around the second axis, and the first degree of correspondence involves less rotation of the virtual three-dimensional object relative to the first input parameter than the second degree of correspondence does (e.g., the rotation around the first axis has more friction or catch than the rotation around the second axis). For example, a first amount of rotation of virtual object 11002 occurs in response to a swipe input, with a swipe distance $d_1$, for rotation about the y-axis (as described with regard to FIGS. 13B-13C), and a second amount of rotation of virtual object 11002, less than the first amount of rotation, occurs in response to a swipe input, with a swipe distance $d_1$, for rotation about the x-axis (as described with regard to FIGS. 13E-13G). Rotating a virtual object with a greater degree or a lesser degree of rotation in response to an input, depending on whether the input is a request to rotate the object about a first axis or a second axis, improves the ability to control different types of rotation operations in response to an input that corresponds to a request to rotate the object. Providing additional control options without cluttering the user interface with additional displayed controls enhances the operability of the device and makes the user-device interface more efficient.

In some embodiments, the device detects (18012) an end of the first input (e.g., the input includes movement of one or more contacts on the touch-sensitive surface and detecting an end of the first input includes detecting liftoff of the one or more contacts from the touch-sensitive surface). After (e.g., in response to) detecting the end of the first input, the device continues (18014) to rotate the three-dimensional object based on a magnitude of the first input prior to detecting the end of the input (e.g., based on a speed of movement of the contact just prior to liftoff of the contact), including: in accordance with a determination that the three-dimensional object is rotating relative to the first axis, slowing the rotation of the object relative to the first axis by a first amount that is proportional to the magnitude of the rotation of the three-dimensional object relative to the first axis (e.g., slowing rotation of the three-dimensional object around the first axis based on a first simulated physical parameter such as a simulated friction with a first coefficient of friction); and in accordance with a determination that the three-dimensional object is rotating relative to the second axis, slowing the rotation of the object relative to the second axis by a second amount that is proportional to the magnitude of the rotation of the three-dimensional object relative to the second axis (e.g., slowing rotation of the three-dimensional object around the second axis based on a second simulated physical parameter such as a simulated friction with a second coefficient of friction that is less than the first coefficient of friction) wherein the second amount is different from the first amount. For example, in FIGS. 13C-13D, virtual object 11002 continues to rotate after liftoff of contact 13002 that caused rotation of virtual object 11002 as described with regard to FIGS. 13B-13C. In some embodiments, the second amount is greater than the first amount. In some embodiments, the second amount is less than the first amount. Slowing rotation of a virtual object by a first amount or a second amount after detecting the end of an input, depending on whether the input is a request to rotate the object about a first axis or a second axis, provides visual feedback indicating that rotation operations are applied to the virtual object differently for rotation about the first axis and the second axis. Providing improved visual feedback to the user enhances the operability of the device and makes the user-device interface more efficient (e.g., by helping the user to provide proper inputs and avoid attempting to provide input for manipulating the virtual object prior to placement of the object at the second orientation that corresponds to the plane), which, additionally, reduces power usage and improves battery life of the device by enabling the user to use the device more quickly and efficiently.

In some embodiments, the device detects (18016) an end of the first input (e.g., the input includes movement of one or more contacts on the touch-sensitive surface and detecting an end of the first input includes detecting liftoff of the one or more contacts from the touch-sensitive surface). After (e.g., in response to) detecting the end of the first input (18018): in accordance with a determination that the three-dimensional object has been rotated beyond a respective rotation threshold relative to the first axis, the device reverses at least a portion of the rotation of the three-dimensional object relative to the first axis; and, in accordance with a determination that the three-dimensional object has not been rotated beyond the respective rotation threshold relative to the first axis, the device forgoes reversing the rotation of the three-dimensional object relative to the first axis. (e.g., ceasing rotation of the three-dimensional object relative to the first axis and/or continuing rotation of the three-dimensional object relative to the first axis in the direction of motion of the input by a magnitude determined by a magnitude of the input prior to detecting the end of the input). For example, after virtual object 11002 rotates beyond a rotation threshold, as described with regard to FIGS. 13E-13G, the rotation of virtual object 11002 is reversed, as illustrated by FIGS. 13G-13H. In some embodiments, the amount of reversing of the rotation of the three-dimensional object is determined based on how far the three-dimensional object has rotated beyond the respective rotation threshold (e.g., the rotation of the three-dimensional object is reversed by a greater amount relative to the first axis if the amount by which the rotation of the three-dimensional object rotated beyond the respective rotational threshold is greater as compared to a smaller amount of reversing the rotation relative to the first axis if the amount by which the rotation of the three-dimensional object rotated beyond the respective rotational threshold is smaller). In some embodiments, the reversing of the rotation is driven by a simulated physical parameter such as an elastic effect that pulls with a greater force the further the three-dimensional object is rotated beyond the respective rotation threshold relative to the first axis. In some embodiments, the reversing of rotation is in a direction of rotation that is determined based on the direction of rotation relative to the first axis that rotated beyond the respective rotation threshold (e.g., if the three-dimensional object was rotated so a top of the object moved backward into the display, the reversing of the rotation is rotating the top of the object forward out of the display; if the three-dimensional object was rotated so that a top of the object was rotated forward out of the display, the reversing of the rotation is rotating the top of the object backward into the display; if the three-dimensional object was rotated so a right side of the object moved backward into the display, the reversing of the rotation is rotating the right side of the object forward out of the display; and/or if the three-dimensional object was rotated so that a left side of the object was rotated forward out of the display, the reversing of the rotation is rotating the left side of the object backward into the display). In some embodiments, for example, where rotation relative to the second axis is constrained to a respective range of angles, a similar rubberbanding (e.g., conditional reversing of rotation) is performed for rotation about the second axis. In some embodiments, for example, where rotation relative to the second axis is not constrained such that the three-dimensional object allowed by the device to rotate 360 degrees, rubberbanding is not performed for rotation about the second axis (e.g., because the device does not impose a rotation threshold on rotation relative to the second axis). Reversing at least a portion of the rotation of the three-dimensional object relative to the first axis after detecting the end of an input, or forgoing reversing a portion of the rotation of the three-dimensional object relative to the first axis, depending on whether the object has been rotated beyond a rotation threshold, provides visual feedback indicating a rotation threshold applicable to rotation of the virtual object. Providing improved visual feedback to the user enhances the operability of the device and makes the user-device interface more efficient (e.g., by helping the user to avoid attempting to provide input for rotating the virtual object beyond the rotation threshold), which, additionally, reduces power usage and improves battery life of the device by enabling the user to use the device more quickly and efficiently.

In some embodiments (18020), in accordance with a determination that the first input corresponds to a request to rotate the three-dimensional object about a third axis (e.g., a third axis that is perpendicular to the plane of the display (e.g., the x-y plane), such as a z axis) that is different from the first axis and the second axis, the device forgoes rotating the virtual three-dimensional object relative to the third axis (e.g., the rotation around the z-axis is forbidden and the request to rotate the object around the z-axis is disregarded by the device). In some embodiments, the device provides an alert (e.g., a tactile output to indicate failure of the input). Forgoing rotation of a virtual object in accordance with a determination that a rotation input corresponds to a request to rotate the virtual object about a third axis provides visual feedback indicating that rotation about the third axis is restricted. Providing improved visual feedback to the user enhances the operability of the device and makes the user-device interface more efficient (e.g., by helping the user to avoid attempting to provide input for rotating the virtual object about the third axis), which, additionally, reduces power usage and improves battery life of the device by enabling the user to use the device more quickly and efficiently.

In some embodiments, the device displays (18022) a representation of a shadow cast by the virtual three-dimensional object while displaying the representation of the first perspective of the virtual three-dimensional object in the first user interface region (e.g., the staging user interface). The device varies a shape of the representation of the shadow in accordance with the rotation of the virtual three-dimensional object relative to the first axis and/or second axis. For example, a shape of shadow 13006 of virtual object 11002 varies from FIGS. 13B-13F as the virtual object 11002 rotates. In some embodiments, the shadow shifts and changes shape to indicate a current orientation of the virtual object relative to an invisible ground plane in the staging user interface that supports a predefined bottom side of the virtual object. In some embodiments, the surface of the virtual three-dimensional object appears to reflects light from a simulated light source located in a predefined direction in a virtual space represented in the staging user interface. Varying a shape of a shadow in accordance with rotation of a virtual object provides visual feedback (e.g., indicating a virtual plane (e.g., a stage of a staging view) relative to which the virtual object is oriented). Providing improved visual feedback to the user enhances the operability of the device and makes the user-device interface more efficient (e.g., by helping the user determine the proper direction for a swipe input to cause rotation about the first axis or the second axis), which, additionally, reduces power usage and improves battery life of the device by enabling the user to use the device more quickly and efficiently.

In some embodiments, while rotating the virtual three-dimensional object in the first user interface region (18024): in accordance with a determination that the virtual three-dimensional object is displayed with a second perspective that reveals a predefined bottom of the virtual three-dimensional object, the device forgoes display of the representation of the shadow with the representation of the second perspective of the virtual three-dimensional object. For example, the device does not display the shadow of the virtual object when the virtual object is being viewed from below (e.g., as described with regard to FIGS. 13G-13I). Forgoing display of a shadow of a virtual object in accordance with a determination that the bottom of the virtual object is displayed provides visual feedback (e.g., indicating that the object has rotated to a position that no longer corresponds to a virtual plane (e.g., a stage of a staging view)). Providing improved visual feedback to the user enhances the operability of the device and makes the user-device interface more efficient, which, additionally, reduces power usage and improves battery life of the device by enabling the user to use the device more quickly and efficiently.

In some embodiments, after rotating the virtual three-dimensional object in the first user interface region (e.g., the staging view), the device detects (18026) a second input that corresponds to a request to reset the virtual three-dimensional object (e.g., the second input is a double tap on the first user interface region) in the first user interface region. In response to detecting the second input, the device displays (18028) (e.g., through rotating and resizing the virtual object) a representation of a predefined original perspective (e.g., the first perspective, or a default starting perspective that is distinct from the first perspective (e.g., when the first perspective is the displayed perspective after user manipulation in the staging user interface)) of the virtual three-dimensional object in the first user interface region (e.g., in response to a double tap, the device resets the orientation of the virtual object to a predefined original orientation (e.g., upright with a front side facing the user, with a bottom side resting on a predefined ground plane)). For example, FIGS. 13I-13J illustrate an input that causes the perspective of virtual object 11002 to change from an altered perspective (as a result of the rotation input described with regard to FIGS. 13B-13G) to an original perspective in FIG. 13J (which is the same as the perspective virtual object 11002 shown in FIG. 13A). In some embodiments, in response to detecting the second input that corresponds to the instruction to reset the virtual three-dimensional object, the device also resizes the virtual three-dimensional object to reflect a default display size of the virtual three-dimensional object. In some embodiments, a double tap input resets both the orientation and the size of the virtual object in the staging user interface, while a double tap input resets only the size, but not the orientation of the virtual object in the augmented reality user interface. In some embodiments, the device requires that the double tap be directed to the virtual object in order to reset the size of the virtual object in the augmented reality user interface, while the device resets the orientation and size of the virtual object in response to double taps detected on the virtual object and double taps detected around the virtual object. In the augmented reality view, a single finger swipe drags the virtual object, rather than rotates the virtual object (e.g., unlike in the staging view). Displaying a predefined original perspective of a virtual object in response to detecting a request to reset the virtual object enhances the operability of the device and makes the user-device interface more efficient (e.g. by providing an option to reset the object rather than requiring the user to estimate when input provided to adjust properties of the object returns the object to the predefined original perspective). Reducing the number of inputs needed to perform an operation improves the operability of the device, which, additionally, reduces power usage and improves battery life of the device by enabling the user to use the device more quickly and efficiently.

In some embodiments, while displaying the virtual three-dimensional object in the first user interface region (e.g., the staging user interface), the device detects (18030) a third input that corresponds to a request to resize the virtual three-dimensional object (e.g., the third input is a pinch or de-pinch gesture directed to the virtual object represented on the first user interface region, the third input having a magnitude that meets the criteria (e.g., original or augmented criteria (as described in greater detail below with reference to method 19000)) for initiating the resize operation). In response to detecting the third input, the device adjusts (18032) a size of the representation of the virtual three-dimensional object in the first user interface region in accordance with a magnitude of the input. For example, in response to an input that includes a de-pinch gesture (e.g., as described with regard to FIGS. 6N-6O), the size of virtual object 11002 is decreased. In some embodiments, the device displays an indicator to indicate the current zoom level of the virtual object when the size of the representation of the virtual three-dimensional object is adjusted. In some embodiments, the device ceases to display the indicator of zoom level upon termination of the third input. Adjusting a size of a virtual object in accordance with a magnitude of an input for resizing the object enhances the operability of the device (e.g., by providing the option to resize the object by a desired amount). Reducing the number of inputs needed to perform an operation improves the operability of the device and makes the user-device interface more efficient, which, additionally, reduces power usage and improves battery life of the device by enabling the user to use the device more quickly and efficiently.

In some embodiments, while adjusting the size of the representation of the virtual three-dimensional object in the first user interface region (e.g., the staging user interface), the device detects (18034) that the size of the virtual three-dimensional object has reached a predefined default display size of the virtual three-dimensional object. In response to detecting that the size of the virtual three-dimensional object has reached the predefined default display size of the virtual three-dimensional object, the device generates (18036) a tactile output (e.g., a discrete tactile output) to indicate that the virtual three-dimensional object is displayed at the predefined default display size. FIG. 110 provides an example of a tactile output 11024 that is provided in response to detecting that a size of virtual object 11002 has reached a previous predefined size of virtual object 11002 (e.g., as described with regard to FIGS. 11M-110. In some embodiments, the device generates the same tactile output when the size of the virtual object is reset to the default display size in response to a double tap input. Generating a tactile output in accordance with a determination that the size of the virtual object has reached a predefined default display size provides the user with feedback (e.g., indicating that no further input is needed to return the simulated size of the virtual object to the predefined size). Providing improved tactile feedback enhances the operability of the device (e.g., by providing sensory information that allows a user to perceive that the predefined simulated physical size of the virtual object has been reached without cluttering the user interface with displayed information), which, additionally, reduces power usage and improves battery life of the device by enabling the user to use the device more quickly and efficiently.

In some embodiments, a visual indication of a zoom level (e.g., a slider that indicates a value that corresponds to a current zoom level) is displayed in the first user interface region (e.g., the staging user interface). As the size of the representation of the virtual three-dimensional object is adjusted, the visual indication of the zoom level is adjusted in accordance with the adjusted size of the representation of the virtual three-dimensional object.

In some embodiments, while displaying a representation of a third perspective of the virtual three-dimensional object in the first user interface region (e.g., the staging user interface), the device detects (18042) a fourth input that corresponds to a request for displaying the virtual three-dimensional object in a second user interface region (e.g., an augmented reality user interface) that includes a field of view of one or more cameras (e.g., the cameras embedded in the device). In response to detecting the fourth input, the device displays (18044), via the display generation component, a representation of the virtual object over at least a portion of the field of view of the one or more cameras that is included the second user interface region (e.g., the field of view of the one or more cameras are displayed in response to the request to display the virtual object in the second user interface region), wherein the field of view of the one or more cameras is a view of a physical environment in which the one or more cameras are located. Displaying the representation of the virtual object includes: rotating the virtual three-dimensional object about the first axis (e.g., the axis that is parallel to the plane of the display (e.g., the x-y plane) in the horizontal direction, such as an x axis) to a predefined angle (e.g., to a default yaw angle, such as 0 degree; or to an angle that is aligned (e.g., parallel) with a plane that is detected in the physical environment captured in the field of view of the one or more cameras). In some embodiments, the device displays an animation of the three-dimensional object gradually rotating relative to the first axis to the predefined angle. maintaining a current angle of the virtual three-dimensional object relative to the second axis (e.g., the axis that is parallel to the plane of the display (e.g., the x-y plane) in the vertical direction, such as a y axis). Rotating a virtual object about the first axis to a predefined angle in response to a request to display the virtual object in the field of view of the one or more cameras (e.g., without requiring further input to reposition the virtual object to a predefined orientation relative to a plane) enhances the operability of the device. Reducing the number of inputs needed to perform an operation improves the operability of the device and makes the user-device interface more efficient, which, additionally, reduces power usage and improves battery life of the device by enabling the user to use the device more quickly and efficiently.

In some embodiments, while displaying a representation of a fourth perspective of the virtual three-dimensional object in the first user interface region (e.g., the staging user interface), the device detects (18046) a fifth input that corresponds to a request for returning to a two-dimensional user interface including a two-dimensional representation of the virtual three-dimensional object. In response to detecting the fifth input, the device (18048): rotates (e.g., before displaying the two-dimensional representation of the virtual three-dimensional object and the two-dimensional user interface) the virtual three-dimensional object to show a perspective of the virtual three-dimensional object that corresponds to the two-dimensional representation of the virtual three-dimensional object; and displays the two-dimensional representation of the virtual three-dimensional object after the virtual three-dimensional object is rotated to show the respective perspective that corresponds to the two-dimensional representation of the virtual three-dimensional object. In some embodiments, the device displays an animation of the three-dimensional object gradually rotating to show the perspective of the virtual three-dimensional object that corresponds to the two-dimensional representation of the virtual three-dimensional object. In some embodiments, the device also resizes the virtual three-dimensional object during the rotation or after the rotation to match the size of the two-dimensional representation of the virtual three-dimensional object that is displayed in the two-dimensional user interface. In some embodiments, an animated transition is displayed to show the rotated virtual three-dimensional object moving toward the position of the two-dimensional representation (e.g., the thumbnail image of the virtual object) in the two-dimensional user interface, and settling into that position. Rotating a virtual three-dimensional object to a perspective that corresponds to a two-dimensional representation of the virtual three-dimensional object in response to an input for returning to displaying the two-dimensional representation of the virtual three-dimensional object provides visual feedback (e.g., to indicate that the displayed object is two dimensional). Providing improved visual feedback to the user enhances the operability of the device and makes the user-device interface more efficient (e.g., by helping the user to provide proper inputs and avoid attempting to provide input for rotating the two-dimensional object along axis for which rotation of the two-dimensional object is unavailable), which, additionally, reduces power usage and improves battery life of the device by enabling the user to use the device more quickly and efficiently.

In some embodiments, prior to displaying the representation of the first perspective of the virtual three-dimensional object, the device displays (18050) a user interface that includes a representation of the virtual three-dimensional object (e.g., a thumbnail or icon) that includes a representation of a view the virtual three-dimensional object from a respective perspective (e.g., a static representation such as a two dimensional image that corresponds to the virtual three-dimensional object). While displaying the representation of the virtual three-dimensional object, the device detects (18052) a request to display the virtual three-dimensional object (e.g., a tap input or other selection input directed to the representation of the virtual three-dimensional object). In response to detecting the request to display the virtual three-dimensional object, the device replaces (18054) display of the representation of the virtual three-dimensional object with the virtual three-dimensional object rotated to match the respective perspective of the representation of the virtual three-dimensional object. FIGS. 11A-11E provide an example of a user interface 5060 that displays a representation of virtual object 11002. In response to a request to display virtual object 11002, as described with regard to FIG. 11A, display of user interface 5060 is replaced by display of virtual object 11002 in a staging user interface 6010, as shown in FIG. 11E. The perspective of virtual object 11002 in FIG. 11E is the same as the perspective of the representation of virtual object 11002 in FIG. 11A. In some embodiments, the representation of the virtual three-dimensional object is scaled up (e.g., to a size that matches a size of the virtual three-dimensional object) before it is replaced with the virtual three-dimensional object. In some embodiments, the virtual three-dimensional object is initially displayed at a size of the representation of the virtual three-dimensional object and is subsequently scaled up. In some embodiments, during a transition from the representation of the virtual three-dimensional object to the virtual three-dimensional object, the device gradually enlarges the representation of the virtual three-dimensional object, cross fades the representation of the virtual three-dimensional object with the virtual three-dimensional object and then gradually enlarges the virtual three-dimensional object so as to create a smooth transition between the representation of the virtual three-dimensional object and the virtual three-dimensional object. In some embodiments, the initial location of the virtual three-dimensional object is selected to correspond to the location of the representation of the virtual three-dimensional object. In some embodiments, the representation of the virtual three-dimensional object is shifted to a location selected to correspond to the location in which the virtual three-dimensional object will be displayed. Replacing display of the (two-dimensional) representation of a virtual three-dimensional object with the virtual three-dimensional object rotated to match the perspective of the (two-dimensional) representation provides visual feedback (e.g., to indicate the three-dimensional object is the same object as the two-dimensional representation of the virtual three-dimensional object). Providing improved visual feedback to the user enhances the operability of the device and makes the user-device interface more efficient, which, additionally, reduces power usage and improves battery life of the device by enabling the user to use the device more quickly and efficiently.

In some embodiments, prior to displaying the first user interface, the device displays (18056) a two-dimensional user interface including a two-dimensional representation of the virtual three-dimensional object. While displaying the two-dimensional user interface including the two-dimensional representation of the virtual three-dimensional object, the device detects (18058) a first portion of a touch input (e.g., an increase in intensity of a contact) that meets preview criteria (e.g., the preview criteria require that an intensity of the press input exceeds a first intensity threshold (e.g., a light press intensity threshold) and/or the preview criteria require that a duration of the press input exceeds a first duration threshold) at a location on the touch-sensitive surface that corresponds to the two-dimensional representation of the virtual three-dimensional object. In response to detecting the first portion of the touch input that meets the preview criteria, the device displays (18060) a preview of the virtual three-dimensional object that is larger than the two-dimensional representation of the virtual three-dimensional object (e.g., the preview is animated to show different perspectives of the virtual three-dimensional object); In some embodiments, the device displays an animation of the three-dimensional object gradually enlarging (e.g., based on a duration or pressure of the input or based on a predetermined rate of animation). Displaying a preview of the virtual three-dimensional object (e.g., without replacing display of the currently displayed user interface with a different user interface) enhances the operability of the device (e.g., by enabling the user to display the virtual three-dimensional object and return to viewing the two-dimensional representation of the virtual three-dimensional object without having provide input for navigating between user interfaces). Reducing the number of inputs needed to perform an operation improves the operability of the device which, additionally, reduces power usage and improves battery life of the device by enabling the user to use the device more quickly and efficiently.

In some embodiments, while displaying the preview of the virtual three-dimensional object, the device detects (18062) a second portion of the touch input (e.g., by the same continuously maintained contact). In response to detecting the second portion of the touch input (18064): in accordance with a determination that the second portion of the touch input meets menu-display criteria (e.g., the menu-display criteria require that the contact moves by more than a threshold amount in a predefined direction (e.g., upward)), the device displays a plurality of selectable options (e.g., a sharing menu) corresponding a plurality of operations associated with the virtual object (e.g., sharing options, such as various means of sharing the virtual object with another device or user); and in accordance with a determination that the second portion of the touch input meets staging criteria (e.g., the staging criteria require that the intensity of the contact exceeds a second threshold intensity (e.g., a deep press intensity threshold) that is greater than the first threshold intensity), the device replaces display of the two-dimensional user interface including the two-dimensional representation of the virtual three-dimensional object with the first user interface including the virtual three-dimensional object. Displaying a menu associated with the virtual object or replacing display of a two-dimensional user interface including the two-dimensional representation of the virtual three-dimensional object with the first user interface including the virtual three-dimensional object, depending on whether staging criteria are met, enables the performance of multiple different types of operations in response to an input. Enabling the performance of multiple different types of operations with the first type of input increases the efficiency with which the user is able to perform these operations, thereby enhancing the operability of the device, which, additionally, reduces power usage and improves battery life of the device by enabling the user to use the device more quickly and efficiently.

In some embodiments, the first user interface includes (18066) a plurality of controls (e.g., buttons for switching to the world view, for going back, etc.). Prior to displaying the first user interface, the device displays (18068) a two-dimensional user interface including a two-dimensional representation of the virtual three-dimensional object. In response to detecting a request to display the virtual three-dimensional object in the first user interface, the device (18070) displays the virtual three-dimensional object in the first user interface without displaying a set of one or more controls associated with the virtual three-dimensional object; and after displaying the virtual three-dimensional object in the first user interface, the device displays the set of one or more controls. For example, as described with regard to FIGS. 11A-11E, display of a user interface 5060 that includes a two-dimensional representation of virtual object 11002 is displayed prior to staging user interface 6010. In response to a request to display virtual object 11002 in staging user interface 6010 (as described with regard to FIG. 11A), virtual object 11002 is displayed (as shown in FIGS. 11B-11C) without controls 6016, 6018, and 6020 of staging user interface 6010. In FIGS. 11D-11E, controls 6016, 6018, and 6020 of staging user interface 6010 fade into view in the user interface. In some embodiments, the set of one or more controls include a control for displaying the virtual three-dimensional object in an augmented reality environment where the virtual three-dimensional object is placed in a fixed position relative to a plane detected in a field of view of one or more cameras of the device. In some embodiments, in response to detecting the request to display the virtual three-dimensional object in the first user interface: in accordance with a determination that the virtual three-dimensional object is not ready be displayed in the first user interface (e.g., three-dimensional model of the virtual object is not completely loaded at the time when the first user interface is ready to be displayed) (e.g., loading time of the virtual object is more than a threshold amount of time (e.g., significant and perceivable to the user)), the device displays a portion of the first user interface (e.g., a background window of the first user interface) without displaying the plurality of controls on the first user interface; and in accordance with a determination that the virtual three-dimensional object is ready to be displayed in the first user interface (e.g., after the portion of the first user interface is displayed without the controls), the device displays (e.g., fading in) the virtual three-dimensional object in the first user interface; and the device displays (e.g., fading in) the controls after the virtual three-dimensional object is displayed in the first user interface. In response to detecting the request to display the virtual three-dimensional object in the first user interface and in accordance with a determination that the virtual three-dimensional object is ready to be displayed (e.g., the three-dimensional model of the virtual object has been loaded when the first user interface is ready to be displayed (e.g., loading time of the virtual object is less than the threshold amount of time (e.g., negligible and not perceivable to the user)): the device displays the first user interface with the plurality of controls on the first user interface; and the device displays (e.g., no fading in) the virtual three-dimensional object in the first user interface with the plurality of controls. In some embodiments, when existing the staging user interface to return to the two-dimensional user interface (e.g., in response to a request to "go back"), the controls fade out first, before the virtual three-dimensional object is transformed into the two-dimensional representation of the virtual three-dimensional object. Displaying controls after displaying a virtual three-dimensional object in a user interface provides visual feedback (e.g., indicating that controls to manipulate a virtual object are unavailable during an amount of time required to load the virtual object). Providing improved visual feedback to the user enhances the operability of the device and makes the user-device interface more efficient (e.g., by helping the user avoid providing input to manipulate the object while manipulation operations are unavailable during a loading time for the virtual object), which, additionally, reduces power usage and improves battery life of the device by enabling the user to use the device more quickly and efficiently.

It should be understood that the particular order in which the operations in FIGS. 18A-18I have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800, 900, 1000, 16000, 17000, 19000, and 20000) are also applicable in an analogous manner to method 18000 described above with respect to FIGS. 18A-18I. For example, contacts, inputs, virtual objects, user interface regions, fields of view, tactile outputs, movements, and/or animations described above with reference to method 18000 optionally have one or more of the characteristics of the contacts, inputs, virtual objects, user interface regions, fields of view, tactile outputs, movements, and/or animations described herein with reference to other methods described herein (e.g., methods 800, 900, 1000, 17000, 18000, 19000, and 20000). For brevity, these details are not repeated here.

FIGS. 19A-19H are flow diagrams illustrating method 19000 of, in accordance with a determination that a first threshold magnitude of movement is met for a first object manipulation behavior, increasing a second threshold magnitude of movement required for a second object manipulation behavior. Method 19000 is performed at an electronic device (e.g., device 300, FIG. 3, or portable multifunction device 100, FIG. 1A) having a display generation component (e.g., a display, a projector, a heads up display or the like) and a touch-sensitive surface (e.g., a touch-sensitive surface, or a touch-screen display that serves both as the display generation component and the touch-sensitive surface. Some operations in method 19000 are, optionally, combined and/or the order of some operations is, optionally, changed.

The device displays (19002), via the display generation component, a first user interface region that includes a user interface object (e.g., a user interface region including a representation of a virtual object) that is associated with a plurality of object manipulation behaviors, including a first object manipulation behavior (e.g., rotation of the user interface object around a respective axis) that is performed in response to inputs that meet first gesture-recognition criteria (e.g., rotation criteria) and a second object manipulation behavior (e.g., one of translation of the user interface object or scaling of the user interface object) that is performed in response to inputs that meet second gesture-recognition criteria (e.g., one of translation criteria and scaling criteria). For example, a displayed virtual object 11002 is associated with manipulation behaviors that include rotation around a respective axis (e.g., as described with regard to FIGS. 14B-14E), translation (e.g., as described with regard to FIGS. 14K-14M), and scaling (e.g., as described with regard to FIGS. 14G-14I).

While displaying the first user interface region, the device detects (19004) a first portion of an input directed to the user interface object (e.g., the device detects one or more contacts at locations on the touch-sensitive surface that correspond to display location of the user interface object), including detecting movement of one or more contacts across the touch-sensitive surface, and while the one or more contacts are detected on the touch-sensitive surface, the device evaluates movement of the one or more contacts with respect to both the first gesture-recognition criteria and the second gesture-recognition criteria.

In response to detecting the first portion of the input, the device updates an appearance of the user interface object based on the first portion of the input, including (19006): in accordance with a determination that the first portion of the input meets the first gesture-recognition criteria before meeting the second gesture-recognition criteria: changing the appearance of the user interface object (e.g., rotating the user interface object) in accordance with the first object manipulation behavior based on the first portion of the input (e.g., based on a direction and/or magnitude of the first portion of the input); and (e.g., without changing an appearance of the user interface object in accordance with the second object manipulation behavior) updating the second gesture-recognition criteria by increasing a threshold for the second gesture-recognition criteria (e.g., increasing a threshold required for a movement parameter (e.g., movement distance, speed, etc.) in the second gesture-recognition criteria). For example, in FIG. 14E, virtual object 1102 has rotated in accordance with a determination that rotation criteria have been met (before scaling criteria have been met), and a threshold ST for the scaling criteria is increased to ST'. In some embodiments, before the criteria for recognizing a gesture for rotating the object are met, it is relatively easy to initiate a translation or scaling operation on the object by meeting the criteria for recognizing a gesture for translation or scaling (assuming that the criteria for translating or scaling have not been met before). Once the criteria for recognizing the gesture for rotating the object are met, it becomes harder to initiate the translation or scaling operation on the object (e.g., the criteria for translation and scaling are updated with increased thresholds for the movement parameter), and the object manipulation is biased toward the manipulation behavior corresponding to the gesture that is already recognized and used to manipulate this object. In accordance with a determination that the input meets the second gesture-recognition criteria before meeting the first gesture-recognition criteria: the device changes the appearance of the user interface object (e.g., translating the user interface object or resizing the user interface object) in accordance with the second object manipulation behavior based on the first portion of the input (e.g., based on a direction and/or magnitude of the first portion of the input); and (e.g., without changing an appearance of the user interface object in accordance with the first object manipulation behavior) updates the first gesture-recognition criteria by increasing a threshold for the first gesture-recognition criteria (e.g., increasing a threshold required for a movement parameter (e.g., movement distance, speed, etc.) in the first gesture-recognition criteria). For example, in FIG. 14I, the size of virtual object 1102 has increased in accordance with a determination that scaling criteria have been met (before rotation criteria have been met), and a threshold RT for the rotation criteria is increased to RT'. In some embodiments, before the criteria for recognizing a gesture for translating or scaling the object is met, it is relatively easy to initiate rotation operation on the object by meeting the criteria for recognizing a gesture for rotation (assuming that the criteria for recognizing a gesture for rotating the object has not been met before). Once the criteria for recognizing the gesture for translating or scaling the object is met, it becomes harder to initiate the rotation operation on the object (e.g., the criteria for rotating the object are updated with increased threshold for the movement parameter), and the object manipulation behavior is biased toward the manipulation behavior corresponding to the gesture that is already recognized and used to manipulate this object. In some embodiments, the appearance of the user interface object is changed dynamically and continuously (e.g., showing different sizes, positions, perspectives, reflections, shadows, etc.) in accordance with the values of the respective movement parameter of the input. In some embodiments, the device follows a preset correspondence (e.g., respective correspondence for each type of manipulation behavior) between the movement parameter (e.g., a respective movement parameter for each type of manipulation behavior) and the changes made to the appearance of the user interface object (e.g., a respective aspect of the appearance for each type of manipulation behavior). Increasing a first threshold for input movement required for a first object manipulation when input movement increases above a second threshold for a second object manipulation enhances the operability of the device (e.g., by helping the user to avoid accidentally performing a second object manipulation while attempting to provide input for performing a first object manipulation). Improving the user's ability to control different types of object manipulation enhances the operability of the device and makes the user-device interface more efficient.

In some embodiments, after updating the appearance of the user interface object based on the first portion of the input, the device detects (19008) a second portion of the input (e.g., by the same continuously maintained contacts in the first portion of the input, or different contacts detected after termination (e.g., lift-off) of the contacts in the first portion of the input). In some embodiments, the second portion of the input is detected based on continuously detected inputs that are directed to the user interface object. In response to detecting the second portion of the input, the device updates (19010) the appearance of the user interface object based on the second portion of the input, including: in accordance with a determination that the first portion of the input met the first gesture-recognition criteria and the second portion of the input does not meet the updated second gesture-recognition criteria: (e.g., without regard to whether or not the second portion of the input meets the first gesture-recognition criteria or the original second gesture-recognition criteria) changing the appearance of the user interface object in accordance with the first object manipulation behavior based on the second portion of the input (e.g., based on a direction and/or magnitude of the second portion of the input) without changing the appearance of the user interface object in accordance with the second object manipulation behavior (e.g., even if the second portion of the input does meet the original second gesture-recognition criteria before they were updated); in accordance with a determination that the first portion of the input met the second gesture-recognition criteria and the second portion of the input does not meet the updated first gesture-recognition criteria: (e.g., without regard to whether or not the second portion of the input meets the second gesture-recognition criteria or the original first gesture-recognition criteria) changing the appearance of the user interface object in accordance with the second object manipulation behavior based on the second portion of the input (e.g., based on a direction and/or magnitude of the second portion of the input) without changing the appearance of the user interface object in accordance with the first object manipulation behavior (e.g., even if the second portion of the input does meet the original first gesture-recognition before it was updated).

In some embodiments (19012), while the appearance of the user interface object is changed in accordance with the first object manipulation behavior based on the second portion of the input after the first portion of the input met the first gesture-recognition criteria, the second portion of the input includes input that meets the second gesture-recognition criteria before the second gesture-recognition criteria were updated (e.g., with the original threshold(s) for the movement parameter(s) of the input in the second gesture-recognition criteria before the threshold(s) are increased) (e.g., the second portion of the input does not include input that meets the updated second gesture-recognition criteria).

In some embodiments (19014), while the appearance of the user interface object is changed in accordance with the second object manipulation behavior based on the second portion of the input after the first portion of the input met the second gesture-recognition criteria, the second portion of the input includes input that meets the first gesture-recognition criteria before the first gesture-recognition criteria were updated (e.g., with the original threshold(s) for the movement parameter(s) of the input in the first gesture-recognition criteria before the threshold(s) are increased) (e.g., the second portion of the input does not include input that meets the updated first gesture-recognition criteria).

In some embodiments (19016), while the appearance of the user interface object is changed in accordance with the first object manipulation behavior based on the second portion of the input after the first portion of the input met the first gesture-recognition criteria, the second portion of the input does not include input that meets the first gesture-recognition criteria (e.g., with the original threshold(s) for the movement parameter(s) of the input in the first gesture-recognition criteria). For example, after the first gesture-recognition criteria are met once, the input no long needs to continue to meet the first gesture-recognition criteria in order to cause the first object manipulation behavior.

In some embodiments (19018), while the appearance of the user interface object is changed in accordance with the second object manipulation behavior based on the second portion of the input after the first portion of the input met the second gesture-recognition criteria, the second portion of the input does not include input that meets the second gesture-recognition criteria (e.g., with the original threshold(s) for the movement parameter(s) of the input in the second gesture-recognition criteria). For example, after the second gesture-recognition criteria are met once, the input no long needs to continue to meet the second gesture-recognition criteria in order to cause the second object manipulation behavior. Performing a first object manipulation behavior when a second portion of the input includes movement that increases above an increased threshold enhances the operability of the device (e.g., by providing the user with the ability to intentionally perform a second object manipulation after performing a first object manipulation by meeting the increased criteria, without requiring the user to provide a new input). Reducing the number of inputs needed to perform an operation improves the operability of the device and makes the user-device interface more efficient, which, additionally, reduces power usage and improves battery life of the device by enabling the user to use the device more quickly and efficiently.

In some embodiments, updating the appearance of the user interface object based on the second portion of the input includes (19020): in accordance with a determination that the first portion of the input met the second gesture-recognition criteria and the second portion of the input meets the updated first gesture-recognition criteria: changing the appearance of the user interface object in accordance with the first object manipulation behavior based on the second portion of the input; and changing the appearance of the user interface object in accordance with the second object manipulation behavior based on the second portion of the input; and, in accordance with a determination that the first portion of the input met the first gesture-recognition criteria and the second portion of the input meets the updated second gesture-recognition criteria: changing the appearance of the user interface object in accordance with the first object manipulation behavior based on the second portion of the input; and changing the appearance of the user interface object in accordance with the second object manipulation behavior based on the second portion of the input. For example, after the first gesture-recognition criteria were met first, and the input then met the updated second gesture-recognition criteria, the input can now cause both the first and the second object manipulation behaviors. For example, after the second gesture-recognition criteria were met first, and the input then met the updated first gesture-recognition criteria, the input can now cause both the first and the second object manipulation behaviors. Updating the object in accordance with first object manipulation behavior and the second object manipulation behavior in response to a portion of the input detected after the second gesture-recognition criteria and updated first gesture-recognition criteria are met enhances the operability of the device (e.g., by providing the user with the ability to freely manipulate the object using first object manipulation and second object manipulation after satisfying an increased threshold without requiring the user to provide a new input). Reducing the number of inputs needed to perform an operation improves the operability of the device and makes the user-device interface more efficient, which, additionally, reduces power usage and improves battery life of the device by enabling the user to use the device more quickly and efficiently.

In some embodiments, after updating the appearance of the user interface object based on the second portion of the input (e.g., after both the first gesture-recognition criteria and updated second gesture-recognition criteria are met, or after both the second gesture-recognition criteria and the updated first gesture-recognition criteria are met), the device detects (19022) a third portion of the input (e.g., by the same continuously maintained contacts in the first and second portion of the input, or different contacts detected after termination (e.g., lift-off) of the contacts in the first portion and second portion of the input). In response to detecting the third portion of the input, the device updates (19024) the appearance of the user interface object based on the third portion of the input, including: changing the appearance of the user interface object in accordance with the first object manipulation behavior based on the third portion of the input; and changing the appearance of the user interface object in accordance with the second object manipulation behavior based on the third portion of the input. For example, after both the first gesture-recognition criteria and updated second gesture-recognition criteria were met, or after both the second gesture-recognition criteria and the updated first gesture-recognition criteria were met, the input can cause both the first and the second object manipulation behaviors subsequently without regard to the thresholds in the original or updated first and second gesture-recognition criteria. Updating the object in accordance with first object manipulation behavior and second object manipulation behavior in response to a portion of the input detected after the second gesture-recognition criteria and the updated first gesture-recognition criteria are met enhances the operability of the device (e.g., by providing the user with the ability to freely manipulate the object using first object manipulation and second object manipulation after demonstrating an intention to perform the first object manipulation type by satisfying an increased threshold, without requiring the user to provide a new input). Reducing the number of inputs needed to perform an operation improves the operability of the device and makes the user-device interface more efficient, which, additionally, reduces power usage and improves battery life of the device by enabling the user to use the device more quickly and efficiently.

In some embodiments (19026), the third portion of the input does not include input that meets the first gesture-recognition criteria or input that meets the second gesture-recognition criteria. For example, after both the first gesture-recognition criteria and updated second gesture-recognition criteria are met, or after both the second gesture-recognition criteria and the updated first gesture-recognition criteria are met, the input can cause both the first and the second object manipulation behaviors subsequently without regard to the thresholds in the original or updated first and second gesture-recognition criteria. Updating an object in accordance with the first object manipulation behavior and the second object manipulation behavior in response to a portion of the input detected after the second gesture-recognition criteria and the updated first gesture-recognition criteria are met enhances the operability of the device (e.g., by providing the user with the ability to freely manipulate the object using first object manipulation and second object manipulation after satisfying heightened criteria, without requiring the user to provide a new input). Reducing the number of inputs needed to perform an operation improves the operability of the device and makes the user-device interface more efficient, which, additionally, reduces power usage and improves battery life of the device by enabling the user to use the device more quickly and efficiently.

In some embodiments, the plurality of object manipulation behaviors includes (19028) a third object manipulation behavior (e.g., rotation of the user interface object around a respective axis) that is performed in response to inputs that meet third gesture-recognition criteria (e.g., scaling criteria). Updating the appearance of the user interface object based on the first portion of the input includes (19030): in accordance with a determination that the first portion of the input meets the first gesture-recognition criteria before meeting the second gesture-recognition criteria or meeting the third gesture-recognition criteria: changing the appearance of the user interface object (e.g., rotating the user interface object) in accordance with the first object manipulation behavior based on the first portion of the input (e.g., based on a direction and/or magnitude of the first portion of the input); and (e.g., without changing an appearance of the user interface object in accordance with the second object manipulation behavior) updating the second gesture-recognition criteria by increasing the threshold for the second gesture-recognition criteria (e.g., increasing a threshold required for a movement parameter (e.g., movement distance, speed, etc.) in the second gesture-recognition criteria). For example, before the criteria for recognizing a gesture for rotating the object are met, it is relatively easy to initiate a translation or scaling operation on the object by meeting the criteria for recognizing a gesture for translation or scaling (assuming that the criteria for translating or scaling have not been met before). Once the criteria for recognizing the gesture for rotating the object are met, it becomes harder to initiate the translation or scaling operation on the object (e.g., the criteria for translation and scaling are updated with increased thresholds for the movement parameter), and the object manipulation is biased toward the manipulation behavior corresponding to the gesture that is already recognized and used to manipulate this object. The device updates the third gesture-recognition criteria by increasing a threshold for the third gesture-recognition criteria (e.g., increasing a threshold required for a movement parameter (e.g., movement distance, speed, etc.) in the third gesture-recognition criteria). For example, before the criteria for recognizing a gesture for rotating the object are met, it is relatively easy to initiate a translation or scaling operation on the object by meeting the criteria for recognizing a gesture for translation or scaling (assuming that the criteria for translating or scaling have not been met before). Once the criteria for recognizing the gesture for rotating the object are met, it becomes harder to initiate the translation or scaling operation on the object (e.g., the criteria for translation and scaling are updated with increased thresholds for the movement parameter), and the object manipulation is biased toward the manipulation behavior corresponding to the gesture that is already recognized and used to manipulate this object. In accordance with a determination that the input meets the second gesture-recognition criteria before meeting the first gesture-recognition criteria or meeting the third gesture-recognition criteria: the device changes the appearance of the user interface object (e.g., translating the user interface object or resizing the user interface object) in accordance with the second object manipulation behavior based on the first portion of the input (e.g., based on a direction and/or magnitude of the first portion of the input); and (e.g., without changing an appearance of the user interface object in accordance with the first object manipulation behavior) updates the first gesture-recognition criteria by increasing a threshold for the first gesture-recognition criteria (e.g., increasing a threshold required for a movement parameter (e.g., movement distance, speed, etc.) in the first gesture-recognition criteria). For example, before the criteria for recognizing a gesture for translating or scaling the object is met, it is relatively easy to initiate rotation operation on the object by meeting the criteria for recognizing a gesture for rotation (assuming that the criteria for recognizing a gesture for rotating the object has not been met before). Once the criteria for recognizing the gesture for translating or scaling the object are met, it becomes harder to initiate the rotation operation on the object (e.g., the criteria for rotating the object are updated with increased threshold for the movement parameter), and the object manipulation behavior is biased toward the manipulation behavior corresponding to the gesture that is already recognized and used to manipulate this object. In some embodiments, the appearance of the user interface object is changed dynamically and continuously (e.g., showing different sizes, positions, perspectives, reflections, shadows, etc.) in accordance with the values of the respective movement parameter of the input. In some embodiments, the device follows a preset correspondence (e.g., respective correspondence for each type of manipulation behavior) between the movement parameter (e.g., a respective movement parameter for each type of manipulation behavior) and the changes made to the appearance of the user interface object (e.g., a respective aspect of the appearance for each type of manipulation behavior). The device updates the third gesture-recognition criteria by increasing a threshold for the third gesture-recognition criteria (e.g., increasing a threshold required for a movement parameter (e.g., movement distance, speed, etc.) in the third gesture-recognition criteria). For example, before the criteria for recognizing a gesture for rotating the object are met, it is relatively easy to initiate a translation or scaling operation on the object by meeting the criteria for recognizing a gesture for translation or scaling (assuming that the criteria for translating or scaling have not been met before). Once the criteria for recognizing the gesture for rotating the object are met, it becomes harder to initiate the translation or scaling operation on the object (e.g., the criteria for translation and scaling are updated with increased thresholds for the movement parameter), and the object manipulation is biased toward the manipulation behavior corresponding to the gesture that is already recognized and used to manipulate this object. In accordance with a determination that the input meets the third gesture-recognition criteria before meeting the first gesture-recognition criteria or meeting the second gesture-recognition criteria: the device changes the appearance of the user interface object (e.g., resizing the user interface object) in accordance with the third object manipulation behavior based on the first portion of the input (e.g., based on a direction and/or magnitude of the first portion of the input); and (e.g., without changing an appearance of the user interface object in accordance with the first object manipulation behavior and the second object manipulation behavior) the device updates the first gesture-recognition criteria by increasing a threshold for the first gesture-recognition criteria (e.g., increasing a threshold required for a movement parameter (e.g., movement distance, speed, etc.) in the first gesture-recognition criteria). For example, before the criteria for recognizing a gesture for translating or scaling the object are met, it is relatively easy to initiate rotation operation on the object by meeting the criteria for recognizing a gesture for rotation (assuming that the criteria for recognizing a gesture for rotating the object has not been met before). Once the criteria for recognizing the gesture for translating or scaling the object are met, it becomes harder to initiate the rotation operation on the object (e.g., the criteria for rotating the object are updated with increased threshold for the movement parameter), and the object manipulation behavior is biased toward the manipulation behavior corresponding to the gesture that is already recognized and used to manipulate this object. In some embodiments, the appearance of the user interface object is changed dynamically and continuously (e.g., showing different sizes, positions, perspectives, reflections, shadows, etc.) in accordance with the values of the respective movement parameter of the input. In some embodiments, the device follows a preset correspondence (e.g., respective correspondence for each type of manipulation behavior) between the movement parameter (e.g., a respective movement parameter for each type of manipulation behavior) and the changes made to the appearance of the user interface object (e.g., a respective aspect of the appearance for each type of manipulation behavior). The device updates the second gesture-recognition criteria by increasing the threshold for the second gesture-recognition criteria (e.g., increasing a threshold required for a movement parameter (e.g., movement distance, speed, etc.) in the second gesture-recognition criteria). For example, before the criteria for recognizing a gesture for rotating the object are met, it is relatively easy to initiate a translation or scaling operation on the object by meeting the criteria for recognizing a gesture for translation or scaling (assuming that the criteria for translating or scaling have not been met before). Once the criteria for recognizing the gesture for rotating the object are met, it becomes harder to initiate the translation or scaling operation on the object (e.g., the criteria for translation and scaling are updated with increased thresholds for the movement parameter), and the object manipulation is biased toward the manipulation behavior corresponding to the gesture that is already recognized and used to manipulate this object. Updating the object in accordance with a third object manipulation behavior in response to a portion of the input detected only when corresponding third gesture-recognition criteria are met enhances the operability of the device (e.g., by helping the user to avoid accidentally performing a third object manipulation while attempting to provide input for performing a first object manipulation or a second object manipulation). Reducing the number of inputs needed to perform an operation improves the operability of the device and makes the user-device interface more efficient, which, additionally, reduces power usage and improves battery life of the device by enabling the user to use the device more quickly and efficiently.

In some embodiments, the plurality of object manipulation behaviors include (19032) a third object manipulation behavior that is performed in response to inputs that meet third gesture-recognition criteria, the first portion of the input did not meet the third gesture-recognition criteria before meeting the first gesture-recognition criteria or the second gesture-recognition criteria, the device updated the third gesture-recognition criteria by increasing a threshold for the third gesture-recognition criteria after the first portion of the input met the first gesture-recognition criteria or the second gesture-recognition criteria, the second portion of the input did not meet the updated third gesture-recognition criteria (e.g., the device updated the third gesture-recognition criteria by increasing a threshold for the third gesture-recognition criteria after the first portion of the input had met one of the first or second gesture-recognition criteria) before meeting the updated first gesture-recognition criteria or the updated second gesture-recognition criteria. In response to detecting the third portion of the input (19034): in accordance with a determination that the third portion of the input meets the updated third gesture-recognition criteria (e.g., without regard to whether or not the third portion of the input meets the first or second gesture-recognition criteria (e.g., updated or original)), the device changes the appearance of the user interface object in accordance with the third object manipulation behavior based on the third portion of the input (e.g., based on a direction and/or magnitude of the third portion of the input) (e.g., while changing the appearance of the user interface object in accordance with the first and second object manipulation behaviors (e.g., even if the third portion of the input does not meet the original first and second gesture-recognition criteria)). In accordance with a determination that the third portion of the input does not meet the updated third gesture-recognition criteria, the device forgoes changing the appearance of the user interface object in accordance with the third object manipulation behavior based on the third portion of the input (e.g., while changing the appearance of the user interface object in accordance with the first and second object manipulation behaviors (e.g., even if the third portion of the input does not meet the original first and second gesture-recognition criteria). Updating the object in accordance with a first object manipulation behavior, a second object manipulation behavior, and a third object manipulation behavior in response to a portion of the input detected after second gesture-recognition criteria, updated first gesture-recognition criteria, and updated third gesture-recognition criteria are met enhances the operability of the device (e.g., by providing the user with the ability to freely manipulate the object using first, second, and third object manipulation types after establishing an intention to perform all three object manipulation types by satisfying the increased thresholds, without requiring the user to provide a new input). Reducing the number of inputs needed to perform an operation improves the operability of the device and makes the user-device interface more efficient, which, additionally, reduces power usage and improves battery life of the device by enabling the user to use the device more quickly and efficiently.

In some embodiments (19036), the third portion of the input met the updated third gesture-recognition criteria. After updating the appearance of the user interface object based on the third portion of the input (e.g., after both the first gesture-recognition criteria and updated second and third gesture-recognition criteria are met, or after both the second gesture-recognition criteria and the updated first and third gesture-recognition criteria are met), the device detects (19038) a fourth portion of the input (e.g., by the same continuously maintained contacts in the first, second, and third portions of the input, or different contacts detected after termination (e.g., lift-off) of the contacts in the first portion, second, and third portions of the input). In response to detecting the fourth portion of the input, the device updates (19040) the appearance of the user interface object based on the fourth portion of the input, including: changing the appearance of the user interface object in accordance with the first object manipulation behavior based on the fourth portion of the input; changing the appearance of the user interface object in accordance with the second object manipulation behavior based on the fourth portion of the input; and changing the appearance of the user interface object in accordance with the third object manipulation behavior based on the fourth portion of the input. For example, after the first gesture-recognition criteria and updated second and third gesture-recognition criteria are met, or after the second gesture-recognition criteria and the updated first and third gesture-recognition criteria are met, the input can cause all three types of manipulation behaviors subsequently without regard to the thresholds in the original or updated first, second, and third gesture-recognition criteria.

In some embodiments, the fourth portion of the input does not include (19042): input that meets the first gesture-recognition criteria, input that meets the second gesture-recognition criteria, or input that meets the third gesture-recognition criteria. For example, after the first gesture-recognition criteria and updated second and third gesture-recognition criteria are met, or after the second gesture-recognition criteria and the updated first and third gesture-recognition criteria are met, the input can cause all three types of manipulation behaviors subsequently without regard to the thresholds in the original or updated first, second, and third gesture-recognition criteria. Requiring a number of concurrently detected contacts for a gesture enhances the operability of the device (e.g., by helping the user to avoid accidentally performing an object manipulation while providing input with less than the required number of concurrently detected contacts). Reducing the number of inputs needed to perform an operation improves the operability of the device and makes the user-device interface more efficient, which, additionally, reduces power usage and improves battery life of the device by enabling the user to use the device more quickly and efficiently.

In some embodiments (19044), the first gesture-recognition criteria and the second gesture-recognition criteria (and the third gesture-recognition criteria) both require a first number of concurrently detected contacts (e.g., two contacts) in order to be met. In some embodiments, a single finger gesture can also be used for translation, and the single finger translation threshold is lower than the two-finger translation threshold. In some embodiments, the original and updated movement thresholds set for a two-finger translation gesture are 40 points and 70 points movement by centroid of the contacts, respectively. In some embodiments, the original and updated movement thresholds set for a two-finger rotation gesture are 12 degrees and 18 degrees of rotational movement by the contacts, respectively. In some embodiments, the original and updated movement thresholds set for a two-finger scaling gesture are 50 points (contact-to-contact distance) and 90 points, respectively. In some embodiments, the threshold set for single finger drag gesture is 30 points.

In some embodiments (19046), the first object manipulation behavior changes a zoom level or displayed size of the user interface object (e.g., resizing the object by a pinch gesture (e.g., movement of contacts toward one another, e.g., after the pinch gesture is recognized based on the first gesture-recognition criteria (e.g., original or updated))) and the second object manipulation behavior changes a rotational angle of the user interface object (e.g., changing a viewing perspective of the user interface object around an external or internal axis by a twist/pivot gesture (e.g., movement of contacts around a common locus, e.g., after the twist/pivot gesture is recognized by the second gesture-recognition criteria (e.g., original or updated))). For example, the first object manipulation behavior changes a displayed size of virtual object 11002 as described with regard to FIGS. 14G-14I and the second object manipulation behavior changes a rotational angle of virtual object 11002 as described with regard to FIGS. 14B-14E. In some embodiments, the second object manipulation behavior changes a zoom level or displayed size of the user interface object (e.g., resizing the object by a pinch gesture (e.g., movement of contacts toward one another, e.g., after the pinch gesture is recognized based on the second gesture-recognition criteria (e.g., original or updated))) and the first object manipulation behavior changes a rotational angle of the user interface object (e.g., changing a viewing perspective of the user interface object around an external or internal axis by a twist/pivot gesture (e.g., movement of contacts around a common locus, e.g., after the twist/pivot gesture is recognized by the first gesture-recognition criteria (e.g., original or updated))).

In some embodiments (19048), the first object manipulation behavior changes a zoom level or displayed size of the user interface object (e.g., resizing the object by a pinch gesture (e.g., movement of contacts toward one another, e.g., after the pinch gesture is recognized based on the first gesture-recognition criteria (e.g., original or updated))) and the second object manipulation behavior changes a position of the user interface object in the first user interface region (e.g., dragging the user interface object by a one-finger or two-finger drag gesture (e.g., movement of contacts in a respective direction, e.g., after the drag gesture is recognized by the second gesture-recognition criteria (e.g., original or updated))). For example, the first object manipulation behavior changes a displayed size of virtual object 11002 as described with regard to FIGS. 14G-14I and the second object manipulation behavior changes a position of virtual object 11002 in a user interface as described with regard to FIGS. 14B-14E. In some embodiments, the second object manipulation behavior changes a zoom level or displayed size of the user interface object (e.g., resizing the object by a pinch gesture (e.g., movement of contacts toward one another, e.g., after the pinch gesture is recognized based on the second gesture-recognition criteria (e.g., original or updated))) and the first object manipulation behavior changes a position of the user interface object in the first user interface region (e.g., dragging the user interface object by a one-finger or two-finger drag gesture (e.g., movement of contacts in a respective direction, e.g., after the drag gesture is recognized by the first gesture-recognition criteria (e.g., original or updated))).

In some embodiments (19050), the first object manipulation behavior changes a position of the user interface object in the first user interface region (e.g., dragging the object by a one-finger or two-finger drag gesture (e.g., movement of contacts in a respective direction, e.g., after the drag gesture is recognized by the first gesture-recognition criteria (e.g., original or updated))) and the second object manipulation behavior changes a rotational angle of the user interface object (e.g., changing a viewing perspective of the user interface object around an external or internal axis by a twist/pivot gesture (e.g., movement of contacts around a common locus, e.g., after the twist/pivot gesture is recognized by the second gesture-recognition criteria (e.g., original or updated))). For example, the first object manipulation behavior changes a position of virtual object 11002 in a user interface as described with regard to FIGS. 14B-14E and the second object manipulation behavior changes a rotational angle of virtual object 11002 as described with regard to FIGS. 14B-14E. In some embodiments, the second object manipulation behavior changes a position of the user interface object in the first user interface region (e.g., dragging the object by a one-finger or two-finger drag gesture (e.g., movement of contacts in a respective direction, e.g., after the drag gesture is recognized by the second gesture-recognition criteria (e.g., original or updated))) and the first object manipulation behavior changes a rotational angle of the user interface object (e.g., changing a viewing perspective of the user interface object around an external or internal axis by a twist/pivot gesture (e.g., movement of contacts around a common locus, e.g., after the twist/pivot gesture is recognized by the first gesture-recognition criteria (e.g., original or updated))).

In some embodiments (19052), the first portion of the input and the second portion of the input are provided by a plurality of continuously maintained contacts. The device re-establishes (19054) the first gesture-recognition criteria and the second gesture-recognition criteria (e.g., with the original thresholds) to initiate additional first and second object-manipulation behaviors after detecting lift-off of the plurality of continuously maintained contacts. For example, after lift-off of the contacts, the device reestablishes the gesture-recognition thresholds for rotation, translation, and scaling for a newly detected touch input. Re-establishing a threshold for input movement after an input is ended by lift-off of the contacts enhances the operability of the device (e.g., by reducing the extent of input required for performing an object manipulation by resetting increased movement thresholds each time a new input is provided). Reducing the extent of input needed to perform an operation improves the operability of the device and makes the user-device interface more efficient, which, additionally, reduces power usage and improves battery life of the device by enabling the user to use the device more quickly and efficiently.

In some embodiments (19056), the first gesture-recognition criteria correspond to rotation in around a first axis, and the second gesture-recognition criteria correspond to rotation around a second axis that is orthogonal to the first axis. In some embodiments, instead of updating thresholds for different types of gestures, the updating also applies to thresholds set for different sub-types of manipulation behavior (e.g., rotation around a first axis vs. rotation around a different axis) within a type of manipulation behavior corresponding to a recognized gesture type (e.g., twist/pivot gesture). For example, once rotation around a first axis is recognized and performed, the threshold set of rotation around a different axis is updated (e.g., increased) and has to be overcome by the subsequent input in order to trigger rotation around the different axis. Increasing a threshold for input movement required for rotating an object about a first axis when input movement increases above a threshold for input movement required for rotating an object about a second axis enhances the operability of the device (e.g., by helping the user to avoid accidentally rotating an object about a second axis while attempting to rotating the object about a first axis). Reducing the number of inputs needed to perform an operation improves the operability of the device and makes the user-device interface more efficient, which, additionally, reduces power usage and improves battery life of the device by enabling the user to use the device more quickly and efficiently.

It should be understood that the particular order in which the operations in FIGS. 19A-19H have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800, 900, 1000, 16000, 17000, 18000, and 20000) are also applicable in an analogous manner to method 19000 described above with respect to FIGS. 19A-19H. For example, contacts, inputs, virtual objects, user interface regions, fields of view, tactile outputs, movements, and/or animations described above with reference to method 19000 optionally have one or more of the characteristics of the contacts, inputs, virtual objects, user interface regions, fields of view, tactile outputs, movements, and/or animations described herein with reference to other methods described herein (e.g., methods 800, 900, 1000, 16000, 17000, 18000, and 20000). For brevity, these details are not repeated here.

FIGS. 20A-20F are flow diagrams illustrating method 20000 of generating an audio alert in accordance with a determination that movement of a device causes a virtual object to move outside of a displayed field of view of one or more device cameras. Method 20000 is performed at an electronic device (e.g., device 300, FIG. 3, or portable multifunction device 100, FIG. 1A) having a display generation component (e.g., a display, a projector, a heads up display or the like), one or more input devices (e.g., a touch-sensitive surface, or a touch-screen display that serves both as the display generation component and the touch-sensitive surface), one or more audio output generators, and one or more cameras. Some operations in method 20000 are, optionally, combined and/or the order of some operations is, optionally, changed.

The device displays (20002) (e.g., in response to a request to place a virtual object in an augmented reality view of a physical environment surrounding the device including the camera (e.g., in response to a tap on the "world" button displayed with the staging view of the virtual object)), via the display generation component, a representation of a virtual object in a first user interface region that includes a representation of a field of view of one or more cameras (e.g., the first user interface region is a user interface displaying the augmented reality view of the physical environment surrounding the device including the camera), wherein the displaying includes maintaining a first spatial relationship between the representation of the virtual object and a plane detected within a physical environment that is captured in the field of view of the one or more cameras (e.g., the virtual object is displayed with an orientation and a position on the display such that a fixed angle between the representation of the virtual object and the plane is maintained (e.g., the virtual object appears to stay at a fixed location on the plane or roll along the field of view plane). For example, as shown in FIG. 15V, virtual object 11002 is displayed in a user interface region that includes field of view 6036 of one or more cameras.

The device detects (20004) movement of the device (e.g., lateral movement and/or rotation of the device, including the one or more cameras) that adjusts the field of view of the one or more cameras. For example, as described with regard to FIGS. 15V-15W, movement of device 100 adjusts the field of view of one or more cameras.

In response to detecting movement of the device that adjusts the field of view of the one or more cameras (20006): the device adjusts display of the representation of the virtual object in the first user interface region in accordance with the first spatial relationship (e.g., orientation and/or position) between the virtual object and the plane detected within the field of view of the one or more cameras as the field of view of the one or more cameras is adjusted, and, in accordance with a determination that the movement of the device causes more than a threshold amount (e.g., 100%, 50%, or 20%) of the virtual object to move outside of a displayed portion of the field of view of the one or more cameras (e.g., because the spatial relationship between the representation of the virtual object and the plane detected within the physical environment that is captured in the field of view of the one or more cameras remains fixed during movement of the device relative to the physical environment), the device generates, via the one or more audio output generators, a first audio alert (e.g., a voice announcement indicating that more than a threshold amount of the virtual object is no longer displayed in the camera view). For example, as described with regard to FIG. 15W, in response to movement of device 100 that causes virtual object 11002 to move outside of a displayed portion of the field of view 6036 of the one or more cameras, audio alert 15118 is generated. Generating an audio output in accordance with a determination that movement of a device causes a virtual object to move outside of a displayed augmented reality view provides the user with feedback indicating an extent to which movement of the device has affected display of the virtual object relative to the augmented reality view. Providing improved feedback to the user enhances the operability of the device (e.g., by providing information that allows a user to perceive whether a virtual object has moved off of the display without cluttering the display with additional displayed information and without requiring the user to view the display) and makes the user-device interface more efficient which, additionally, reduces power usage and improves battery life of the device by enabling the user to use the device more quickly and efficiently.

In some embodiments, outputting the first audio alert includes (20008) generating an audio output that indicates an amount of the virtual object that remains visible on the displayed portion of the field of view of the one or more cameras (e.g., the amount of the virtual object that remains visible is measured relative to the total size of the virtual object from the current viewing perspective (e.g., 20%, 25%, 50%, etc.)) (e.g., the audio output says, "object x is 20% visible."). For example, in response to movement of device 100 that causes virtual object 11002 to move partially outside of a displayed portion of the field of view 6036 of the one or more cameras, as described with regard to FIGS. 15X-15Y, audio alert 15126 is generated that includes announcement 15128 indicating, "chair is 90 percent visible, occupying 20 percent of screen." Generating an audio output that indicates an amount of a virtual object visible in a displayed augmented reality view provides the user with feedback (e.g., indicating an extent to which movement of the device changed the degree to which the virtual object is visible). Providing improved feedback to the user (e.g., by providing information that allows a user to perceive whether a virtual object has moved off of the display without cluttering the display with additional displayed information and without requiring the user to view the display) enhances the operability of the device and makes the user-device interface more efficient which, additionally, reduces power usage and improves battery life of the device by enabling the user to use the device more quickly and efficiently.

In some embodiments, outputting the first audio alert includes (20010) generating an audio output that indicates an amount of the displayed portion of the field of view that is occluded by the virtual object (e.g., the amount of the augmented reality view of the physical environment that is occupied by the virtual object (e.g., 20%, 25%, 50%, etc.)) (e.g., the audio output includes an announcement says, "object x occupying 15% of the world view"). In some embodiments, the audio output also includes a description of the action perform by the user that caused the changes in the display state of the virtual object. For example, the audio output includes an announcement that says, "device moved to the left; object x is 20% visible, occupying 15% of the world view." For example, in FIG. 15Y, audio alert 15126 is generated that includes announcement 15128 indicating, "chair is 90 percent visible, occupying 20 percent of screen." Generating an audio output that indicates an amount of the augmented reality view that is occluded by the virtual object provides the user with feedback (e.g., indicating an extent to which movement of the device changed the degree to which augmented reality view is occluded). Providing improved feedback to the user enhances the operability of the device (e.g., by providing information that allows a user to perceive the size of the virtual object relative to the display without cluttering the display with additional displayed information and without requiring the user to view the display) and makes the user-device interface more efficient which, additionally, reduces power usage and improves battery life of the device by enabling the user to use the device more quickly and efficiently.

In some embodiments, the device detects (20012) an input by a contact at a location on the touch-sensitive surface that corresponds to the representation of the field of view of the one or more cameras (e.g., detecting a tap input or double tap input on a portion of the touch-screen that displays the augmented reality view of the physical environment). In response to detecting the input, and in accordance with a determination that the input is detected at a first location on the touch-sensitive surface that corresponds to a first portion of the field of view of the one or more cameras that is not occupied by the virtual object, the device generates (20014) a second audio alert (e.g., a click or buzz that indicates a failure to locate the virtual object in the tapped region). For example, as described with regard to FIG. 15Z, in response to an input detected at a location on touch screen 112 that corresponds to a portion of field of view 6036 of the one or more cameras that is not occupied by virtual object 11002, the device generates an audio alert 15130. In some embodiments, in response to detecting the input, in accordance with a determination that the input is detected at a second location that corresponds to a second portion of the field of view of the one or more cameras that is occupied by the virtual object, forgoing generating the second audio alert. In some embodiments, instead of generating the second audio alert to indicate the user's failure to locate the virtual object, the device generates a different audio alert indicating that the user has located the virtual object. In some embodiments, instead of generating the second audio alert, the device outputs an audio announcement describing an operation that is performed on the virtual object (e.g., "Object x selected." "Object x is resized to a default size" "Object x is rotated to a default orientation." etc.) or the state of the virtual object (e.g., Object x, 20% visible, occupying 15% of the world view."). Generating an audio output in response to an input detected at a location that corresponds to a part of the displayed augmented reality view not occupied by the virtual object provides the user with feedback (e.g., indicating that the input must be provided at a different location (e.g., to obtain information about the virtual object and/or perform an operation)). Providing improved feedback to the user enhances the operability of the device (e.g., by providing information that allows a user to perceive whether the input successfully connected with a virtual object without cluttering the display with additional displayed information and without requiring the user to view the display), and makes the user-device interface more efficient which, additionally, reduces power usage and improves battery life of the device by enabling the user to use the device more quickly and efficiently.

In some embodiments, outputting the first audio alert includes generating (20016) an audio output that indicates an operation that is performed with respect to the virtual object (e.g., before generating the audio output, the device determines the currently selected operation and performs the operation in response to an input (e.g., a double tap) confirming the user's intent to execute the currently selected operation) and a resulting state of the virtual object after the performance of the operation. For example, the audio output includes an announcement that says, "device moved to the left; object x is 20% visible, occupying 15% of the world view," "object x is rotated clockwise by 30 degrees; object is 50 degrees rotated around the y-axis," or "object x enlarged by 20% and occupies 50% of the world view." For example, as described with regard to FIGS. 15AH-15AI, in response to performance of a rotation operation with respect to virtual object 11002, audio alert 15190 is generated that includes announcement 15192 indicating "Chair is rotated by five degrees counterclockwise. Chair is now rotated by zero degrees relative to the screen." Generating an audio output that indicates an operation performed on the virtual object provides the user with feedback indicating how provided input affects a virtual object. Providing improved feedback to the user enhances the operability of the device (e.g., by providing information that allows a user to perceive how an operation has altered a virtual object without cluttering the display with additional displayed information and without requiring the user to view the display) and makes the user-device interface more efficient which, additionally, reduces power usage and improves battery life of the device by enabling the user to use the device more quickly and efficiently.

In some embodiments (20018), the resulting state of the virtual object after performance of the operation is described in the audio output in the first audio alert in relation to a reference frame corresponding to the physical environment captured in the field of view of the one or more cameras (e.g., after manipulating object (e.g., in response to a touch-based gesture or movement of the device), the device generates a voice over describing the new state of object (e.g., rotated 30 degrees, rotated 60 degrees, or moved left, relative to the initial position/orientation of the virtual object when it was initially placed into the augmented reality view of the physical environment)). For example, as described with regard to FIGS. 15AH-15AI, in response to performance of a rotation operation with respect to virtual object 11002, audio alert 15190 is generated that includes announcement 15192 indicating "Chair is rotated by five degrees counterclockwise. Chair is now rotated by zero degrees relative to the screen." In some embodiments, the operation includes movement of the device relative to the physical environment (e.g., causing movement of the virtual object relative to the representation of the portion of the physical environment captured in the field of view of the one or more cameras), and the voice over describes the new state of the virtual object in response to the movement of the device relative to the physical environment. Generating an audio output that indicates a state of the virtual object after an operation is performed on the object provides the user with feedback that allows a user to perceive how an operation has altered a virtual object. Providing improved feedback to the user enhances the operability of the device (e.g., by providing information that allows a user to perceive how an operation has altered virtual object without cluttering the display with additional displayed information and without requiring the user to view the display) and makes the user-device interface more efficient which, additionally, reduces power usage and improves battery life of the device by enabling the user to use the device more quickly and efficiently.

In some embodiments, the device detects (20020) additional movement of the device (e.g., lateral movement and/or rotation of the device, including the one or more cameras) that further adjusts the field of view of the one or more cameras after generation of the first audio alert. For example, as described with regard to FIGS. 15W-15X, movement of device 100 further adjusts the field of view of one or more cameras (following adjustment of the field of view of one or more cameras that occurs in response to movement of device 100 from 15V-15W). In response to detecting the additional movement of the device that further adjusts the field of view of the one or more cameras (20022): the device adjusts display of the representation of the virtual object in the first user interface region in accordance with the first spatial relationship (e.g., orientation and/or position) between the virtual object and the plane detected within the field of view of the one or more cameras as the field of view of the one or more cameras is further adjusted, and, in accordance with a determination that the additional movement of the device causes more than a second threshold amount (e.g., 50%, 80%, or 100%) of the virtual object to move into a displayed portion of the field of view of the one or more cameras (e.g., because the spatial relationship between the representation of the virtual object and the plane detected within the physical environment that is captured in the field of view of the one or more cameras remains fixed during movement of the device relative to the physical environment), the device generates, via the one or more audio output generators, a third audio alert (e.g., an audio output that includes an announcement indicating that more than a threshold amount of the virtual object is moved back into the camera view). For example, as described with regard to FIG. 15X, in response to movement of device 100 that causes virtual object 11002 to move into a displayed portion of the field of view 6036 of the one or more cameras, audio alert 15122 is generated (e.g., including the announcement, "Chair is now projected in the world, 100 percent visible, occupying 10 percent of the screen"). Generating an audio output in accordance with a determination that movement of a device causes a virtual object to move into a displayed augmented reality view provides the user with feedback indicating an extent to which movement of the device has affected display of the virtual object relative to the augmented reality view. Providing improved feedback to the user enhances the operability of the device (e.g., by providing information that allows a user to perceive whether a virtual object has moved into the display without cluttering the display with additional displayed information and without requiring the user to view the display) and makes the user-device interface more efficient which, additionally, reduces power usage and improves battery life of the device by enabling the user to use the device more quickly and efficiently.

In some embodiments, while displaying the representation of the virtual object in the first user interface region and a first object manipulation type of a plurality of object manipulation types applicable to the virtual object is currently selected for the virtual object, the device detects (20024) a request to switch to another object manipulation type applicable to the virtual object (e.g., detecting a swipe input by a contact (e.g., including movement of the contact in a horizontal direction) at a location on the touch-sensitive surface that corresponds to a portion of the first user interface region that displays the representation of the field of view of the one or more cameras). For example, as described with regard to FIG. 15AG, while a clockwise rotation control 15170 is currently selected, a swipe input is detected for switching to counterclockwise rotation control 15180 (for rotating virtual object 15160 counterclockwise). In response to detecting the request to switch to another object manipulation type applicable to the virtual object, the device generates (20026) an audio output that names a second object manipulation type among a plurality of object manipulation types applicable to the virtual object (e.g., the audio output includes an announcement that says, "rotate object around x-axis," "resize object," or "move object on the plane," etc.), wherein the second object manipulation type is distinct from the first object manipulation type. For example, in FIG. 15AH, in response to detection of the request described with regard to 15AG, audio alert 15182 is generated, including announcement 15184 ("selected: rotate counterclockwise"). In some embodiments, the device iterates through a predefined list of applicable object manipulation types in response to consecutive swipe inputs in the same direction. In some embodiments, in response to detecting a swipe input in the reverse direction from the immediately preceding swipe input, the device generates an audio output that includes an announcement that names a previously announced object manipulation type applicable to the virtual object (e.g., the one before the last announced object manipulation type). In some embodiments, the device does not display a corresponding control for each object manipulation types applicable to the virtual object (e.g., there is no button or control displayed for operations that are initiated by gestures (e.g., rotation, resizing, translation, etc.)). Generating an audio output in response to a request to switch an object manipulation type provides the user with feedback indicating that the switch operation has been performed. Providing improved feedback to the user enhances the operability of the device Providing improved feedback to the user enhances the operability of the device (e.g., by providing information that confirms that an switching input was successfully performed without cluttering the display with additional displayed information and without requiring the user to view the display) and makes the user-device interface more efficient which, additionally, reduces power usage and improves battery life of the device by enabling the user to use the device more quickly and efficiently.

In some embodiments, after generating (20028) an audio output that names the second object manipulation type among the plurality of object manipulation types applicable to the virtual object (e.g., the audio output includes an announcement that says, "rotate object around x-axis," "resize object," or "move object on the plane," etc.), the device detects a request to execute an object manipulation behavior corresponding to a currently selected object manipulation type (e.g., detecting a double tap input by a contact at a location on the touch-sensitive surface that correspond to a portion of the first user interface region that displays the representation of the field of view of the one or more cameras)). For example, as described with regard to FIG. 15AH, a double tap input is detected for rotating virtual object 11002 counterclockwise. In response to detecting the request to perform the object manipulation behavior corresponding to the currently selected object manipulation type, the device executes (20030) an object manipulation behavior that corresponds to the second object manipulation type (e.g., rotating the virtual object around the y axis by 5 degrees, or increasing the size of the object by 5%, or moving the object on the plane by 20 pixels) (e.g., adjusting display of the representation of the virtual object in the first user interface region in accordance with the second object manipulation type). For example, in FIG. 15AI, in response to detection of the request described with regard to 15AH, virtual object 11002 is rotated counterclockwise. In some embodiments, the device, in addition to executing the object manipulation behavior that corresponds to the second object manipulation type, outputs an audio output that includes an announcement that indicates the object manipulation behavior that is executed with respect to the virtual object and a resulting state of the virtual object after the execution of the object manipulation behavior. For example, in FIG. 15AI, audio output 15190 is generated that includes announcement 15192 ("Chair rotated by five degrees counterclockwise.

Chair is now rotated by zero degrees relative to the screen"). Performing an object manipulation operation in response to an input detected while the operation is selected provides an additional control option for performing the operation (e.g., allowing the user to perform the operation by providing a tap input rather than requiring a two-contact input). Providing an additional control option for providing an input without cluttering the user interface with additional displayed controls enhances the operability of the device (e.g., by providing users that have limited ability to provide multi-contact gestures with an option for manipulating the object) and makes the user-device interface more efficient which, additionally, reduces power usage and improves battery life of the device by enabling the user to use the device more quickly and efficiently.

In some embodiments, in response to detecting the request to switch to another object manipulation type applicable to the virtual object (20032): in accordance with a determination that the second object manipulation type is a continuously adjustable manipulation type, the device generates an audio alert in conjunction with the audio output that names the second object manipulation type, to indicate that the second object manipulation type is a continuously adjustable manipulation type (e.g., outputting an audio output that says "adjustable" after the audio announcement that names the second object manipulation type (e.g., "rotate object clockwise around the y axis")); the device detects a request to execute the object manipulation behavior that corresponds to the second object manipulation type, including detecting a swipe input at a location on the touch-sensitive surface that corresponds to a portion of the first user interface region that displays the representation of the field of view of the one or more cameras (e.g., after detecting a double tap input by a contact at a location on the touch-sensitive surface that correspond to a portion of the first user interface region that displays the representation of the field of view of the one or more cameras)); and in response to detecting the request to execute the object manipulation behavior corresponding to the second object manipulation type, the device executes the object manipulation behavior corresponding to the second object manipulation type by an amount that corresponds to a magnitude of the swipe input (e.g., rotating the virtual object around the y axis by 5 degrees or 10 degrees, or increasing the size of the object by 5% or 10%, or moving the object on the plane by 20 pixels or 40 pixels, depending on whether the magnitude of the swipe input is a first amount or a second amount that is larger than the first amount). For example, as described with regard to FIGS. 15J-15K, while a rotate clockwise control 15038 is currently selected, a swipe input is detected for switching to a zoom control 15064. Audio alert 15066 is generated that includes announcement 15068 ("scale: adjustable"). As described with regard to FIGS. 15K-15L, an swipe input is detected for zooming in on virtual object 11002, and, in response to the input, a zoom operation is performed on virtual object 11002 (in the illustrative example of FIGS. 15K-15L, an input for continuously adjustable manipulation is detected while staging view interface 6010 is displayed, but it will be recognized that a similar input may be detected at a location on the touch-sensitive surface that corresponds to a portion of the first user interface region that displays the representation of the field of view of the one or more cameras). In some embodiments, the device, in addition to executing the second object manipulation behavior, outputs an audio announcement that indicates the amount of the object manipulation behavior that is executed with respect to the virtual object and a resulting state of the virtual object after the execution of the object manipulation behavior by that amount. Performing an object manipulation operation in response to a swipe input provides an additional control option for performing the operation (e.g., allowing the user to perform the operation by providing a swipe input rather than requiring a two-contact input). Providing an additional control option for providing an input without cluttering the user interface with additional displayed controls (e.g., by providing users that have limited ability to provide multi-contact gestures with an option for manipulating the object) and makes the user-device interface more efficient which, additionally, reduces power usage and improves battery life of the device by enabling the user to use the device more quickly and efficiently.

In some embodiments, prior to displaying the representation of the virtual object in the first user interface region, the device displays (20034) the representation of the virtual object in a second user interface region (e.g., a staging user interface), wherein the second user interface region does not include a representation of the field of view of one or more cameras (e.g., the second user interface region is a staging user interface in which the virtual object can be manipulated (e.g., rotated, resized, and moved) without maintaining a fixed relationship to a plane detected in the physical environment captured in the field of view of the cameras). While displaying the representation of the virtual object in the second user interface region and a first operation of a plurality of operations applicable to the virtual object is currently selected for the virtual object, the device detects (20036) a request to switch to another operation applicable to the virtual object (e.g., including a request to switch an object manipulation type applicable to the virtual object in the second user interface region (e.g., resize, rotate, tilt, etc.) or a user interface operation applicable to the virtual object in the second user interface region (e.g., go back to 2D user interface, drop object into the augmented reality view of the physical environment)) (e.g., detecting the request includes detecting a swipe input by a contact (e.g., including movement of the contact in a horizontal direction) at a location on the touch-sensitive surface that corresponds to the first user interface region). For example, as described with regard to FIGS. 15F-15G, while staging user interface 6010 is displayed and a tilt down control 15022 is currently selected, a swipe input is detected for switching to rotate clockwise control 15038. In response to detecting the request to switch to another operation applicable to the virtual object in the second user interface region, the device generates (20038) an audio output that names a second operation among the plurality of operations applicable to the virtual object (e.g., the audio output includes an announcement that says, "rotate object around x-axis," "resize object," "tilt the object toward the display," or "display object in the augmented reality view," etc.), wherein the second operation is distinct from the first operation. In some embodiments, the device iterates through a predefined list of applicable operations in response to consecutive swipe inputs in the same direction. For example, in FIG. 15G, in response to detection of the request described with regard to 15F, audio alert 15040 is generated, including the announcement 15042 ("selected: rotate clockwise button"). Generating an audio output that names a selected operation type in response to a request to switch an operation type provides the user with feedback indicating that a switching input was successfully received. Generating an audio output that names a selected operation type in response to a request to switch an operation type provides the user with feedback indicating that a switching input was successfully received. Providing improved feedback to the user enhances the operability of the device (e.g., by providing information that allows a user to perceive when a selected control has changed without cluttering the display with additional displayed information and without requiring the user to view the display) and makes the user-device interface more efficient which, additionally, reduces power usage and improves battery life of the device by enabling the user to use the device more quickly and efficiently.

In some embodiments, prior to displaying the representation of the virtual object in the first user interface region (20040): while displaying the representation of the virtual object in a second user interface region (e.g., a staging user interface) that does not include a representation of the field of view of the one or more cameras (e.g., the second user interface region is a staging user interface in which the virtual object can be manipulated (e.g., rotated, resized, and moved) without maintaining a fixed relationship to a plane in the physical environment), the device detects a request to display a representation of the virtual object in the first user interface region that includes a representation of the field of view of the one or more cameras (e.g., detecting a double tap input when a currently selected operation is "display the object in the augmented reality view" and after the device has just outputted an audio announcement that names the currently selected operation in response to a swipe input (e.g., received right before the double tap input)). For example, as described with regard to FIGS. 15P-15V, while staging user interface 6010 is displayed and toggle control 6018 is selected, a double tap input is detected to display a representation of virtual object 11002 to a user interface region that includes a representation of field of view 6036 of the one or more cameras. In response to detecting the request to display a representation of the virtual object in the first user interface region that includes a representation of the field of view of the one or more cameras: the device displays a representation of the virtual object in the first user interface region in accordance with the first spatial relationship between the representation of the virtual object and the plane detected within the physical environment that is captured in the field of view of the one or more cameras (e.g., the rotational angle and size of the virtual object in the staging view is maintained in the augmented reality view when the virtual object is dropped into physical environment represented in the augmented reality view, and the tilt angle is reset in the augmented reality view in accordance with the orientation of the plane detected in the physical environment captured in the field of view); and the device generates a fourth audio alert indicating that the virtual object is placed in the augmented reality view in relation to the physical environment captured in the field of view of the one or more cameras. For example, as described with regard to FIG. 15V, in response to the input for displaying a representation of virtual object 11002 in a user interface region that includes a representation of field of view 6036 of the one or more cameras, a representation of virtual object 11002 is displayed in a user interface region that includes a of field of view 6036 of the one or more cameras and audio alert 15114 is generated including announcement 15116 ("chair is now projected in the world, 100 percent visible, occupying 10 percent of the screen"). Generating an audio output in response to a request to place an object in an augmented reality view provides the user with feedback indicating that the operation to place the virtual object was successfully executed. Providing improved feedback to the user enhances the operability of the device (e.g., by providing information that allows a user to perceive that the object is displayed in the augmented reality view without cluttering the display with additional displayed information and without requiring the user to view the display) and makes the user-device interface more efficient which, additionally, reduces power usage and improves battery life of the device by enabling the user to use the device more quickly and efficiently.

In some embodiments, the third audio alert indicates (20042) information about an appearance of the virtual object relative to the portion of the field of view of the one or more cameras (e.g., the third audio alert includes an audio output that includes an announcement that says, "object x is placed in the world, object x is 30% visible, occupying 90% of the screen."). For example, as described with regard to FIG. 15V, audio alert 15114 is generated including announcement 15116 ("chair is now projected in the world, 100 percent visible, occupying 10 percent of the screen"). Generating an audio output that indicates an appearance of a virtual object visible relative to a displayed augmented reality view provides the user with feedback (e.g., indicating an extent to placement of the object in the augmented reality view affected the appearance of the virtual object). Providing improved feedback to the user enhances the operability of the device (e.g., by providing information that allows a user to perceive how the object is displayed in the augmented reality view without cluttering the display with additional displayed information and without requiring the user to view the display) and makes the user-device interface more efficient which, additionally, reduces power usage and improves battery life of the device by enabling the user to use the device more quickly and efficiently.

In some embodiments, the device generates (20044) a tactile output in conjunction with placement of the virtual object in the augmented reality view in relation to the physical environment captured in the field of view of the one or more cameras. For example, when the object is placed on the plane detected in the field of view of the cameras, the device generates a tactile output indicating landing of the object onto the plane. In some embodiments, the device generates a tactile output when the object reaches a predefined default size during resizing of the object. In some embodiments, the device generates a tactile output for each operation that is performed with respect to the virtual object (e.g., for each rotation by a preset angular amount, for dragging the virtual object onto a different plane, for resetting the object to an original orientation and/or size, etc.). In some embodiments, these tactile outputs precede the corresponding audio alerts describing the operation that is performed and the result state of the virtual object. For example, as described with regard to FIG. 15V, tactile output 15118 is generated in conjunction with placement of virtual object 11002 is field of view 6036 of the one or more cameras. Generating a tactile output in conjunction with placement of a virtual object in relation to the physical environment captured by the one or more cameras provides the user with feedback (e.g., indicating that the operation to place the virtual object was successfully executed). Providing improved feedback to the user enhances the operability of the device (e.g., by providing sensory information that allows a user to perceive that placement of the virtual object has occurred without cluttering the user interface with displayed information) and makes the user-device interface more efficient which, additionally, reduces power usage and improves battery life of the device by enabling the user to use the device more quickly and efficiently.

In some embodiments, the device displays (20046) a first control at a first location in the first user interface region (e.g., among a plurality of controls displayed at different locations in the first user interface region) concurrently with a representation of the field of view of the one or more cameras. In accordance with a determination that control-fading criteria are met (e.g., the control-fading criteria are met when the first user interface region is displayed for at least a threshold amount of time without a touch input being detected on the touch-sensitive surface), the device ceases (20048) to display the first control in the first user interface region (e.g., along with all the other controls in the first user interface region) while maintaining display of the representation of the field of view of the one or more cameras in the first user interface region (e.g., controls are not redisplayed when the user moves the device relative to the physical environment). While displaying the first user interface region without displaying the first control in the first user interface region, the device detects (20050) a touch input at a respective location on the touch-sensitive surface that corresponds to the first location in the first user interface region. In response to detecting the touch input, the device generates (20052) a fifth audio alert including an audio output that specifies an operation corresponding to the first control (e.g., "go back to staging view" or "rotate object around the y-axis"). In some embodiments, the device also redisplays the first control at the first location in response to detecting the touch input. In some embodiments, redisplaying the control and making it the currently selected control upon a touch input at the usual location of the control on the display provides a quicker way to access the control than scanning through the available controls using a series of swipe inputs once the user is aware of the locations of the controls on the display. Automatically ceasing to display a control in response to determining that control-fading criteria are met reduces the number of inputs needed to cease displaying controls. Reducing the number of inputs needed to perform an operation enhances the operability of the device and makes the user-device interface more efficient, which, additionally, reduces power usage and improves battery life of the device by enabling the user to use the device more quickly and efficiently.

It should be understood that the particular order in which the operations in FIGS. 20A-20F have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800, 900, 1000, 16000, 17000, 18000, and 20000) are also applicable in an analogous manner to method 20000 described above with respect to FIGS. 20A-20F. For example, contacts, inputs, virtual objects, user interface regions, fields of view, tactile outputs, movements, and/or animations described above with reference to method 20000 optionally have one or more of the characteristics of the contacts, inputs, virtual objects, user interface regions, fields of view, tactile outputs, movements, and/or animations described herein with reference to other methods described herein (e.g., methods 800, 900, 1000, 16000, 17000, 18000, and 19000). For brevity, these details are not repeated here.

The operations described above with reference to FIGS. 8A-8E, 9A-9D, 10A-10D, 16A-16G, 17A-17D, 18A-18I, 19A-19H, and 20A-20F are, optionally, implemented by components depicted in FIGS. 1A-1B. For example, display operations 802, 806, 902, 906, 910, 1004, 1008, 16004, 17004, 18002, 19002, and 20002; detection operations 804, 904, 908, 17006, 18004, 19004, and 20004; changing operation 910, receiving operations 1002, 1006, 16002, and 17002; ceasing operations 17008; rotation operation 18006; update operation 19006; adjust operation 20006; and generation operation 20006 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:

at a device having a display, a touch-sensitive surface, and one or more cameras:

displaying a first representation of a virtual object in a first user interface on the display, wherein the first representation of the virtual object is a two-dimensional representation of the virtual object;

while displaying the first representation of the virtual object in the first user interface on the display, detecting a first input by a first contact at a location on the touch-sensitive surface that corresponds to the first representation of the virtual object on the display;

in response to detecting the first input by the first contact and in accordance with a determination that the first input by the first contact meets first criteria, displaying a second representation of the virtual object in a second user interface that is different from the first user interface, wherein the second representation of the virtual object is a three-dimensional representation of the virtual object;

while displaying the second representation of the virtual object in the second user interface, detecting a sequence of one or more second inputs directed to the second user interface;

in response to detecting the sequence of one or more second inputs directed to the second user interface:

in accordance with a determination that the sequence of one or more second inputs include an input that corresponds to a first request to manipulate the virtual object in the second user interface, changing a first display property of the second representation of the virtual object within the second user interface based on the sequence of one or more second inputs; and in accordance with a determination that the sequence of one or more second inputs include an input that corresponds to a second request to manipulate the virtual object in the second user interface, changing a second display property of the second representation of the virtual object within the second user interface based on the sequence of one or more second inputs;

while displaying the second representation of the virtual object in the second user interface with an appearance based on the change in the first display property and the change in the second display property, detecting a third input directed to the second user interface; and in response to detecting the third input directed to the second user interface:

in accordance with a determination that the third input corresponds to a request to display the virtual object in an augmented reality environment, displaying a third representation of the virtual object with a representation of a field of view of the one or more cameras, wherein:

the third representation of the virtual object is displayed with a value for the first display property that is selected based on the change in the first display property that occurred in response to the sequence of one or more second inputs;

the third representation of the virtual object is displayed with a value for the second display property that is selected independent of the change in the second display property that occurred in response to the sequence of one or more second inputs; and the third representation of the virtual object is displayed with an appearance that concurrently has both the value for the first display property that is selected based on the change in the first display property that occurred in response to the sequence of one or more second inputs and the value for the second display property that is selected independent of the change in the second display property that occurred in response to the sequence of one or more second inputs.

2. The method of claim 1, wherein the first criteria include criteria that are satisfied when the first input includes a tap input by the first contact at a location on the touch-sensitive surface that corresponds to a virtual object indicator.

3. The method of claim 1, wherein the first criteria include criteria that are satisfied when the first contact is maintained at the location on the touch-sensitive surface that corresponds to the first representation of the virtual object with less than a threshold amount of movement for at least a predefined threshold amount of time.

4. The method of claim 1, wherein:

the device includes one or more sensors to detect intensities of contacts with the touch-sensitive surface; and the first criteria include criteria that are satisfied when a characteristic intensity of the first contact increases above a first intensity threshold.

5. The method of claim 1, including:

in response to detecting the first input by the first contact and in accordance with a determination that the first input by the first contact meets second criteria, wherein the second criteria require that the first input includes movement of the first contact in a direction across the touch-sensitive surface for more than a threshold distance, scrolling the first user interface in a direction that corresponds to the direction of movement of the first contact.

6. The method of claim 1, including:

in response to detecting the first input by the first contact and in accordance with a determination that the first input by the first contact meets third criteria, displaying the third representation of the virtual object with the representation of the field of view of the one or more cameras.

7. The method of claim 6, wherein:

the device includes one or more device orientation sensors;

the method includes, in response to detecting the first input by the first contact, determining, by the one or more device orientation sensors, a current device orientation of the device; and the third criteria require that the current device orientation be within a first range of orientations in order for the third criteria to be met.

8. The method of claim 1, including:

in response to detecting at least an initial portion of the first input by the first contact:

activating the one or more cameras; and analyzing the field of view of the one or more cameras to detect one or more planes in the field of view of the one or more cameras.

9. The method of claim 8, wherein:

the device includes one or more tactile output generators; and the method includes, in response to detecting a respective plane in the field of view of the one or more cameras, outputting, with the one or more tactile output generators, a tactile output to indicate the detection of a respective plane in the field of view of the one or more cameras.

10. The method of claim 1, wherein a size of the third representation of the virtual object on the display is determined based on a simulated real-world size of the virtual object and a distance between the one or more cameras and a location in the field of view of the one or more cameras with which the third representation of the virtual object has a fixed spatial relationship.

11. The method of claim 1, wherein the third input that corresponds to the request to display the virtual object in an augmented reality environment includes an input that drags the second representation of the virtual object.

12. The method of claim 1, including, while displaying the second representation of the virtual object in the second user interface, detecting a fourth input that meets respective criteria for redisplaying the first user interface; and, in response to detecting the fourth input:

ceasing to display the second representation of the virtual object in the second user interface; and redisplaying the first representation of the virtual object in the first user interface.

13. The method of claim 1, including:

while displaying the third representation of the virtual object with the representation of the field of view of the one or more cameras, detecting a fifth input that meets respective criteria for redisplaying the second user interface; and, in response to detecting the fifth input:

ceasing to display the third representation of the virtual object and the representation of the field of view of the one or more cameras; and redisplaying the second representation of the virtual object in the second user interface.

14. The method of claim 1, including, while displaying the third representation of the virtual object with the representation of the field of view of the one or more cameras, detecting a sixth input that meets respective criteria for redisplaying the first user interface; and, in response to detecting the sixth input:

ceasing to display the third representation of the virtual object and the representation of the field of view of the one or more cameras; and redisplaying the first representation of the virtual object in the first user interface.

15. The method of claim 1, including:

in response to detecting the first input by the first contact and in accordance with a determination that the first input by the first contact meets the first criteria, continuously displaying the virtual object when transitioning from displaying the first user interface to displaying the second user interface, including displaying an animation of the first representation of the virtual object in the first user interface transforming into the second representation of the virtual object in the second user interface.

16. The method of claim 1, including:

in response to detecting the third input directed to the second user interface and in accordance with a determination that the third input directed to the second user interface corresponds to the request to display the virtual object in the augmented reality environment, continuously displaying the virtual object when transitioning from displaying the second user interface to displaying a third user interface including the field of view of the one or more cameras, including displaying an animation of the second representation of the virtual object in the second user interface transforming into the third representation of the virtual object in the third user interface including the field of view of the one or more cameras.

17. The method of claim 1, wherein the third representation of the virtual object is displayed with a value for the second display property that is selected based on a location of the third representation of the virtual object relative to the representation of the field of view of the one or more cameras.

18. The method of claim 1, wherein the first display property corresponds to a displayed rotation of the virtual object and the second display property corresponds to a displayed size of the virtual object.

19. A computer system, comprising:

a display;

a touch-sensitive surface;

one or more cameras;

one or more processors; and memory storing one or more programs, wherein the one or more programs are configured to be executed by the one or more processors, the one or more programs including instructions for:

displaying a first representation of a virtual object in a first user interface on the display, wherein the first representation of the virtual object is a two-dimensional representation of the virtual object;

while displaying the first representation of the virtual object in the first user interface on the display, detecting a first input by a first contact at a location on the touch-sensitive surface that corresponds to the first representation of the virtual object on the display;

in response to detecting the first input by the first contact and in accordance with a determination that the first input by the first contact meets first criteria, displaying a second representation of the virtual object in a second user interface that is different from the first user interface, wherein the second representation of the virtual object is a three-dimensional representation of the virtual object;

while displaying the second representation of the virtual object in the second user interface, detecting a sequence of one or more second inputs directed to the second user interface;

in response to detecting the sequence of one or more second inputs directed to the second user interface:

in accordance with a determination that the sequence of one or more second inputs include an input that corresponds to a first request to manipulate the virtual object in the second user interface, changing a first display property of the second representation of the virtual object within the second user interface based on the sequence of one or more second inputs; and in accordance with a determination that the sequence of one or more second inputs include an input that corresponds to a second request to manipulate the virtual object in the second user interface, changing a second display property of the second representation of the virtual object within the second user interface based on the sequence of one or more second inputs;

while displaying the second representation of the virtual object in the second user interface with an appearance based on the change in the first display property and the change in the second display property, detecting a third input directed to the second user interface; and in response to detecting the third input directed to the second user interface:

in accordance with a determination that the third input corresponds to a request to display the virtual object in an augmented reality environment, displaying a third representation of the virtual object with a representation of a field of view of the one or more cameras, wherein:

the third representation of the virtual object is displayed with a value for the first display property that is selected based on the change in the first display property that occurred in response to the sequence of one or more second inputs;

the third representation of the virtual object is displayed with a value for the second display property that is selected independent of the change in the second display property that occurred in response to the sequence of one or more second inputs; and the third representation of the virtual object is displayed with an appearance that concurrently has both the value for the first display property that is selected based on the change in the first display property that occurred in response to the sequence of one or more second inputs and the value for the second display property that is selected independent of the change in the second display property that occurred in response to the sequence of one or more second inputs.

20. The computer system of claim 19, wherein the first criteria include criteria that are satisfied when the first input includes a tap input by the first contact at a location on the touch-sensitive surface that corresponds to a virtual object indicator.

21. The computer system of claim 19, wherein the first criteria include criteria that are satisfied when the first contact is maintained at the location on the touch-sensitive surface that corresponds to the first representation of the virtual object with less than a threshold amount of movement for at least a predefined threshold amount of time.

22. The computer system of claim 19, wherein:

the computer system includes one or more sensors to detect intensities of contacts with the touch-sensitive surface; and the first criteria include criteria that are satisfied when a characteristic intensity of the first contact increases above a first intensity threshold.

23. The computer system of claim 19, wherein the one or more programs include instructions for:

in response to detecting the first input by the first contact and in accordance with a determination that the first input by the first contact meets second criteria, wherein the second criteria require that the first input includes movement of the first contact in a direction across the touch-sensitive surface for more than a threshold distance, scrolling the first user interface in a direction that corresponds to the direction of movement of the first contact.

24. The computer system of claim 19, wherein the one or more programs include instructions for:

in response to detecting the first input by the first contact and in accordance with a determination that the first input by the first contact meets third criteria, displaying the third representation of the virtual object with the representation of the field of view of the one or more cameras.

25. The computer system of claim 24, wherein:

the computer system includes one or more device orientation sensors;

the one or more programs include instructions for, in response to detecting the first input by the first contact, determining, by the one or more device orientation sensors, a current device orientation of the computer system; and the third criteria require that the current device orientation be within a first range of orientations in order for the third criteria to be met.

26. The computer system of claim 19, wherein the one or more programs include instructions for:

in response to detecting at least an initial portion of the first input by the first contact:

activating the one or more cameras; and analyzing the field of view of the one or more cameras to detect one or more planes in the field of view of the one or more cameras.

27. The computer system of claim 26, wherein:

the computer system includes one or more tactile output generators; and the one or more programs include instructions for, in response to detecting a respective plane in the field of view of the one or more cameras, outputting, with the one or more tactile output generators, a tactile output to indicate the detection of a respective plane in the field of view of the one or more cameras.

28. The computer system of claim 19, wherein a size of the third representation of the virtual object on the display is determined based on a simulated real-world size of the virtual object and a distance between the one or more cameras and a location in the field of view of the one or more cameras with which the third representation of the virtual object has a fixed spatial relationship.

29. The computer system of claim 19, wherein the third input that corresponds to the request to display the virtual object in an augmented reality environment includes an input that drags the second representation of the virtual object.

30. The computer system of claim 19, wherein the one or more programs include instructions for:

while displaying the second representation of the virtual object in the second user interface, detecting a fourth input that meets respective criteria for redisplaying the first user interface; and, in response to detecting the fourth input:

ceasing to display the second representation of the virtual object in the second user interface; and redisplaying the first representation of the virtual object in the first user interface.

31. The computer system of claim 19, wherein the one or more programs include instructions for:

while displaying the third representation of the virtual object with the representation of the field of view of the one or more cameras, detecting a fifth input that meets respective criteria for redisplaying the second user interface; and, in response to detecting the fifth input:

ceasing to display the third representation of the virtual object and the representation of the field of view of the one or more cameras; and redisplaying the second representation of the virtual object in the second user interface.

32. The computer system of claim 19, wherein the one or more programs include instructions for:

while displaying the third representation of the virtual object with the representation of the field of view of the one or more cameras, detecting a sixth input that meets respective criteria for redisplaying the first user interface; and, in response to detecting the sixth input:

ceasing to display the third representation of the virtual object and the representation of the field of view of the one or more cameras; and redisplaying the first representation of the virtual object in the first user interface.

33. The computer system of claim 19, wherein the one or more programs include instructions for:

in response to detecting the first input by the first contact and in accordance with a determination that the first input by the first contact meets the first criteria, continuously displaying the virtual object when transitioning from displaying the first user interface to displaying the second user interface, including displaying an animation of the first representation of the virtual object in the first user interface transforming into the second representation of the virtual object in the second user interface.

34. The computer system of claim 19, wherein the one or more programs include instructions for:

in response to detecting the third input directed to the second user interface and in accordance with a determination that the third input directed to the second user interface corresponds to the request to display the virtual object in the augmented reality environment, continuously displaying the virtual object when transitioning from displaying the second user interface to displaying a third user interface including the field of view of the one or more cameras, including displaying an animation of the second representation of the virtual object in the second user interface transforming into the third representation of the virtual object in the third user interface including the field of view of the one or more cameras.

35. The compute system of claim 19, wherein the third representation of the virtual object is displayed with a value for the second display property that is selected based on a location of the third representation of the virtual object relative to the representation of the field of view of the one or more cameras.

36. The computer system of claim 19, wherein the first display property corresponds to a displayed rotation of the virtual object and the second display property corresponds to a displayed size of the virtual object.

37. A non-transitory computer readable storage medium storing one or more programs, the one or more programs comprising instructions, which, when executed by a computer system with a display, a touch-sensitive surface, and one or more cameras, cause the computer system to:

display a first representation of a virtual object in a first user interface on the display, wherein the first representation of the virtual object is a two-dimensional representation of the virtual object;

while displaying the first representation of the virtual object in the first user interface on the display, detect a first input by a first contact at a location on the touch-sensitive surface that corresponds to the first representation of the virtual object on the display;

in response to detecting the first input by the first contact and in accordance with a determination that the first input by the first contact meets first criteria, display a second representation of the virtual object in a second user interface that is different from the first user interface, wherein the second representation of the virtual object is a three-dimensional representation of the virtual object;

while displaying the second representation of the virtual object in the second user interface, detect a sequence of one or more second inputs directed to the second user interface;

in response to detecting the sequence of one or more second inputs directed to the second user interface:

in accordance with a determination that the sequence of one or more second inputs include an input that corresponds to a first request to manipulate the virtual object in the second user interface, change a first display property of the second representation of the virtual object within the second user interface based on the sequence of one or more second inputs; and in accordance with a determination that the sequence of one or more second inputs include an input that corresponds to a second request to manipulate the virtual object in the second user interface, change a second display property of the second representation of the virtual object within the second user interface based on the sequence of one or more second inputs;

while displaying the second representation of the virtual object in the second user interface with an appearance based on the change in the first display property and the change in the second display property, detect a third input directed to the second user interface; and in response to detecting the third input directed to the second user interface:

in accordance with a determination that the third input corresponds to a request to display the virtual object in an augmented reality environment, display a third representation of the virtual object with a representation of a field of view of the one or more cameras, wherein:

the third representation of the virtual object is displayed with a value for the first display property that is selected based on the change in the first display property that occurred in response to the sequence of one or more second inputs;

the third representation of the virtual object is displayed with a value for the second display property that is selected independent of the change in the second display property that occurred in response to the sequence of one or more second inputs; and the third representation of the virtual object is displayed with an appearance that concurrently has both the value for the first display property that is selected based on the change in the first display property that occurred in response to the sequence of one or more second inputs and the value for the second display property that is selected independent of the change in the second display property that occurred in response to the sequence of one or more second inputs.

38. The non-transitory computer readable storage medium of claim 37, wherein the first criteria include criteria that are satisfied when the first input includes a tap input by the first contact at a location on the touch-sensitive surface that corresponds to a virtual object indicator.

39. The non-transitory computer readable storage medium of claim 37, wherein the first criteria include criteria that are satisfied when the first contact is maintained at the location on the touch-sensitive surface that corresponds to the first representation of the virtual object with less than a threshold amount of movement for at least a predefined threshold amount of time.

40. The non-transitory computer readable storage medium of claim 37, wherein:

the computer system includes one or more sensors to detect intensities of contacts with the touch-sensitive surface; and the first criteria include criteria that are satisfied when a characteristic intensity of the first contact increases above a first intensity threshold.

41. The non-transitory computer readable storage medium of claim 37, wherein the one or more programs include instructions, which, when executed by the computer system, cause the computer system to:

in response to detecting the first input by the first contact and in accordance with a determination that the first input by the first contact meets second criteria, wherein the second criteria require that the first input includes movement of the first contact in a direction across the touch-sensitive surface for more than a threshold distance, scroll the first user interface in a direction that corresponds to the direction of movement of the first contact.

42. The non-transitory computer readable storage medium of claim 37, wherein the one or more programs include instructions, which, when executed by the computer system, cause the computer system to:

in response to detecting the first input by the first contact and in accordance with a determination that the first input by the first contact meets third criteria, display the third representation of the virtual object with the representation of the field of view of the one or more cameras.

43. The non-transitory computer readable storage medium of claim 42, wherein:

the computer system includes one or more device orientation sensors;

the one or more programs include instructions for, in response to detecting the first input by the first contact, determining, by the one or more device orientation sensors, a current device orientation of the computer system; and the third criteria require that the current device orientation be within a first range of orientations in order for the third criteria to be met.

44. The non-transitory computer readable storage medium of claim 37, wherein the one or more programs include instructions, which, when executed by the computer system, cause the computer system to:

in response to detecting at least an initial portion of the first input by the first contact:

activate the one or more cameras; and analyze the field of view of the one or more cameras to detect one or more planes in the field of view of the one or more cameras.

45. The non-transitory computer readable storage medium of claim 44, wherein:

the computer system includes one or more tactile output generators; and the one or more programs include instructions, which, when executed by the computer system, cause the computer system to, in response to detecting a respective plane in the field of view of the one or more cameras, output, with the one or more tactile output generators, a tactile output to indicate the detection of a respective plane in the field of view of the one or more cameras.

46. The non-transitory computer readable storage medium of claim 37, wherein a size of the third representation of the virtual object on the display is determined based on a simulated real-world size of the virtual object and a distance between the one or more cameras and a location in the field of view of the one or more cameras with which the third representation of the virtual object has a fixed spatial relationship.

47. The non-transitory computer readable storage medium of claim 37, wherein the third input that corresponds to the request to display the virtual object in an augmented reality environment includes an input that drags the second representation of the virtual object.

48. The non-transitory computer readable storage medium of claim 37, wherein the one or more programs include instructions, which, when executed by the computer system, cause the computer system to:

while displaying the second representation of the virtual object in the second user interface, detect a fourth input that meets respective criteria for redisplaying the first user interface; and, in response to detecting the fourth input:

cease to display the second representation of the virtual object in the second user interface; and redisplay the first representation of the virtual object in the first user interface.

49. The non-transitory computer readable storage medium of claim 37, wherein the one or more programs include instructions, which, when executed by the computer system, cause the computer system to:

while displaying the third representation of the virtual object with the representation of the field of view of the one or more cameras, detect a fifth input that meets respective criteria for redisplaying the second user interface; and, in response to detecting the fifth input:

cease to display the third representation of the virtual object and the representation of the field of view of the one or more cameras; and redisplay the second representation of the virtual object in the second user interface.

50. The non-transitory computer readable storage medium of claim 37, wherein the one or more programs include instructions, which, when executed by the computer system, cause the computer system to:

while displaying the third representation of the virtual object with the representation of the field of view of the one or more cameras, detect a sixth input that meets respective criteria for redisplaying the first user interface; and, in response to detecting the sixth input:

cease to display the third representation of the virtual object and the representation of the field of view of the one or more cameras; and redisplay the first representation of the virtual object in the first user interface.

51. The non-transitory computer readable storage medium of claim 37, wherein the one or more programs include instructions, which, when executed by the computer system, cause the computer system to:

in response to detecting the first input by the first contact and in accordance with a determination that the first input by the first contact meets the first criteria, continuously display the virtual object when transitioning from displaying the first user interface to displaying the second user interface, including displaying an animation of the first representation of the virtual object in the first user interface transforming into the second representation of the virtual object in the second user interface.

52. The non-transitory computer readable storage medium of claim 37, wherein the one or more programs include instructions, which, when executed by the computer system, cause the computer system to:

in response to detecting the third input directed to the second user interface and in accordance with a determination that the third input directed to the second user interface corresponds to the request to display the virtual object in the augmented reality environment, continuously display the virtual object when transitioning from displaying the second user interface to displaying a third user interface including the field of view of the one or more cameras, including displaying an animation of the second representation of the virtual object in the second user interface transforming into the third representation of the virtual object in the third user interface including the field of view of the one or more cameras.

53. The non-transitory computer readable storage medium of claim 37, wherein the third representation of the virtual object is displayed with a value for the second display property that is selected based on a location of the third representation of the virtual object relative to the representation of the field of view of the one or more cameras.

54. The non-transitory computer readable storage medium of claim 37, wherein the first display property corresponds to a displayed rotation of the virtual object and the second display property corresponds to a displayed size of the virtual object.

* * * * *